US007331542B2

(12) United States Patent
Cocciadiferro et al.

(10) Patent No.: US 7,331,542 B2
(45) Date of Patent: Feb. 19, 2008

(54) FILM UNWIND SYSTEM WITH HINGED SPINDLE AND ELECTRONIC CONTROL OF WEB TENSION

(75) Inventors: Edward Cocciadiferro, Fletcher, NC (US); Lynn Noble, Mashpee, MA (US)

(73) Assignee: Intellipack, Tulsa, OK (US)

(*) Notice: Subject to any disclaimer, the term of this patent is extended or adjusted under 35 U.S.C. 154(b) by 103 days.

(21) Appl. No.: 10/623,868

(22) Filed: Jul. 22, 2003

(65) Prior Publication Data

US 2005/0029391 A1 Feb. 10, 2005

Related U.S. Application Data

(60) Provisional application No. 60/469,040, filed on May 9, 2003.

(51) Int. Cl.
*B65H 16/04* (2006.01)

(52) U.S. Cl. ................ 242/597; 242/597.3; 242/597.5; 242/597.6; 242/578

(58) Field of Classification Search ............. 242/559.1, 242/597.1, 598.2, 597, 573.9, 597.3, 597.5, 242/597.6, 186.1, 578
See application file for complete search history.

(56) References Cited

U.S. PATENT DOCUMENTS 2,185,780 A * 1/1940 Uytenbogaart .............. 242/578
2,353,651 A * 7/1944 Colson .................... 242/559.1

(Continued)

FOREIGN PATENT DOCUMENTS

GB 2 357 389 6/2001

(Continued)

OTHER PUBLICATIONS

Allied Motion, Emoteq Corp., Engineered Motion Technology Brushless Motors and Drives, dated pulled from internet Feb. 20, 1923, file://C:\Documents %20and%20Settings\Administrator\Local%Settings\Temp\GW}000... (4 pgs).

(Continued)

*Primary Examiner*—Peter M. Cuomo
*Assistant Examiner*—Sang Kim
(74) *Attorney, Agent, or Firm*—Smith, Gambrell & Russell LLP

(57) ABSTRACT

A film supply apparatus supplying film in a foam-in-bag system having a film feeding device for feeding film from a film source to a location for bag formation, a bag forming apparatus, a foam material dispenser positioned for feeding foam material for reception in a bag of the bag forming apparatus, and a web tensioning system with a web tensioning driver in driving communication with the film source and which is in communication with a controller for monitoring the film feed and web tension states and directing adjustments in the web tension system. The web tensioning driver is arranged to move film backwards or in a direction opposite to a direction of film feed induced by the film feeding means and with the film source including a roll of film and the web tensioning system including a drive transmission in communication with the roll of film for rotational driving of the roll of film and also in communication with web tensioning driver. There is further featured a spindle support for supporting the roll of film and a roll film core drive insert.

13 Claims, 253 Drawing Sheets

U.S. PATENT DOCUMENTS

| | | | | |
|---|---|---|---|---|
| 2,890,836 | A | 6/1959 | Gusmer et al. | |
| 3,156,425 | A | 11/1964 | Mynchenberg | |
| 3,267,822 | A | 8/1966 | Harrison | |
| 3,269,278 | A | 8/1966 | Olstad | |
| 3,393,291 | A | 7/1968 | Tucker | |
| 3,553,059 | A | 1/1971 | Stohlquist | |
| 3,596,428 | A | 8/1971 | Young et al. | |
| 3,596,846 | A * | 8/1971 | Johnston | 242/597.3 |
| 3,601,328 | A | 8/1971 | McClung | |
| 3,799,465 | A * | 3/1974 | Erny | 242/597.3 |
| 3,829,034 | A * | 8/1974 | Mickelson | 242/597.3 |
| 3,976,230 | A | 8/1976 | Sperry | |
| 4,171,781 | A | 10/1979 | Kral et al. | |
| 4,235,064 | A | 11/1980 | Wenger | |
| 4,376,365 | A | 3/1983 | Moertel | |
| 4,383,656 | A | 5/1983 | Campbell | |
| 4,390,953 | A | 6/1983 | Johnstone | |
| 4,613,092 | A * | 9/1986 | Nakai et al. | 242/573.9 |
| 4,659,031 | A * | 4/1987 | Saraisky | 242/613.5 |
| 4,674,268 | A | 6/1987 | Gavronsky et al. | |
| 4,741,486 | A * | 5/1988 | Ancona et al. | 242/597.4 |
| 4,800,708 | A | 1/1989 | Sperry | |
| 4,854,109 | A | 8/1989 | Pinarer et al. | |
| 4,898,327 | A | 2/1990 | Sperry et al. | |
| 4,983,007 | A | 1/1991 | James et al. | |
| 4,999,975 | A | 3/1991 | Willden et al. | |
| 5,027,583 | A | 7/1991 | Chelak | |
| 5,139,151 | A | 8/1992 | Chelak | |
| 5,322,234 | A | 6/1994 | Robert et al. | |
| 5,335,483 | A | 8/1994 | Gavronsky et al. | |
| 5,376,219 | A | 12/1994 | Sperry et al. | |
| 5,548,535 | A | 8/1996 | Zvonar | |
| 5,575,435 | A | 11/1996 | Sperry et al. | |
| 5,679,208 | A | 10/1997 | Sperry et al. | |
| 5,727,370 | A | 3/1998 | Sperry | |
| 5,871,170 | A * | 2/1999 | Morales et al. | 242/592 |
| 6,003,288 | A | 12/1999 | Sperry et al. | |
| 6,116,669 | A * | 9/2000 | Scaglia | 294/67.22 |
| 6,302,604 | B1 * | 10/2001 | Bryant et al. | 400/619 |
| 6,311,740 | B1 | 11/2001 | Sperry et al. | |
| 6,472,638 | B1 | 10/2002 | Sperry et al. | |
| 6,948,673 | B1 * | 9/2005 | Sato | 242/160.4 |
| 2002/0044305 | A1 | 4/2002 | Kawai et al. | |
| 2003/0047860 | A1 | 3/2003 | Takamatsu | |

FOREIGN PATENT DOCUMENTS

| | | |
|---|---|---|
| JP | 11-268096 | 10/1999 |
| JP | 2000-155613 | 6/2000 |
| WO | WO 2004/101252 | 11/2004 |
| WO | WO 2004/102294 | 11/2004 |

OTHER PUBLICATIONS

Faulhaber, Brushless DC Motor Information, pulled from internet Apr. 23, 2002, www.micromo.com (1 page).

AccuPak® Menu Direct Polyurethane Foam Packaging System, Flexible Products Company, (29 pages) (Nov. 1998).

Flexible Products "AccuPak Menu Direct", Supplemental Information Attachment I, AccuPak Menu Direct Wiring Diagram (1 page) with two pages of additional information under the heading "AccuPak 24—Heater Control Settings" (date not available) (presumed corresponds to Nov. 1998 date in AC above).

Flexible Products "AccuPak Menu Direct", Supplemental Information Attachment II, Heater Assembly (heated channel hose and wire connector interchange) (3 pgs) (date not available) (presumed corresponds to Nov. 1998 date in AC above).

Flexible Products "AccuPak Menu Direct", Supplemental Information Sheet, Attachment III, Manifold and Tubing Assembly Schematic (date not available) (presumed corresponds to Nov. 1998 date in AC above).

SpeedyPacker™ Foam-In-Bag Packaging System, User's Guide, Sealed Air Corporation, dated Jul. 2, 1996.

AccuFlow 20D, Electronic Manual, Flexible Products Company, Revised Oct. 21, 1998, (38 pages).

Instapak 901/970 Foam Packaging System, User's Guide, (1998).

International Search Report (PCT/ISA/210) issued in connection with PCT/US2004/014423 mailed Oct. 22, 2004.

* cited by examiner

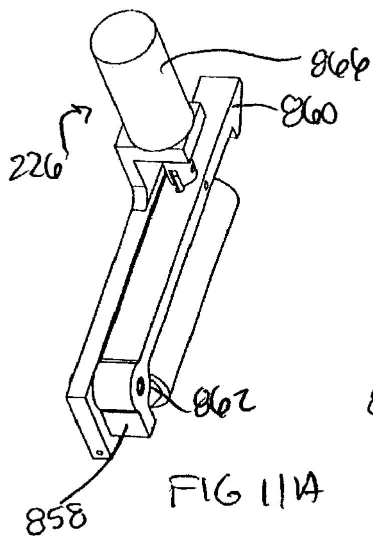
FIG 11A
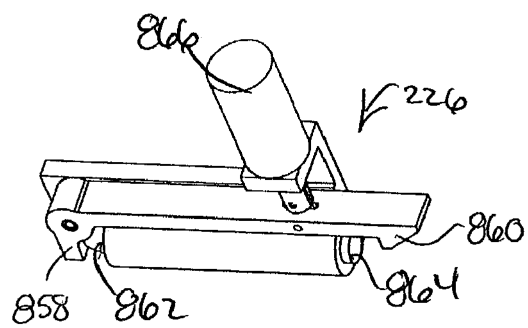
FIG. 11B
FIG. 11D
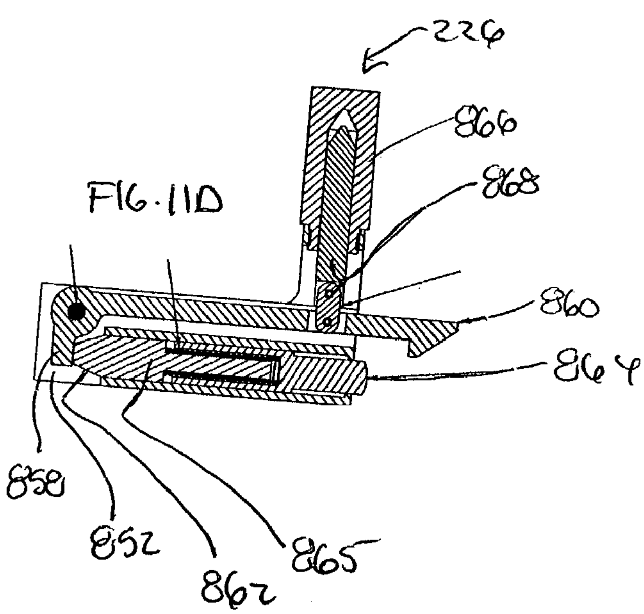
FIG. 11C
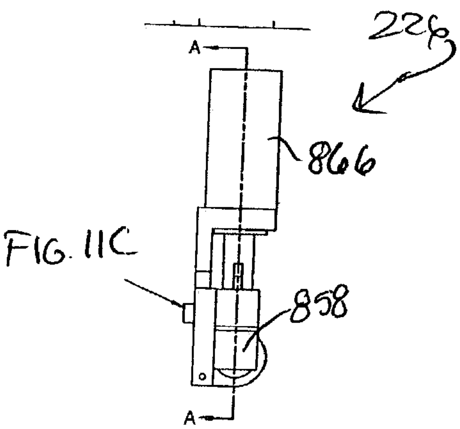

FIG 15A
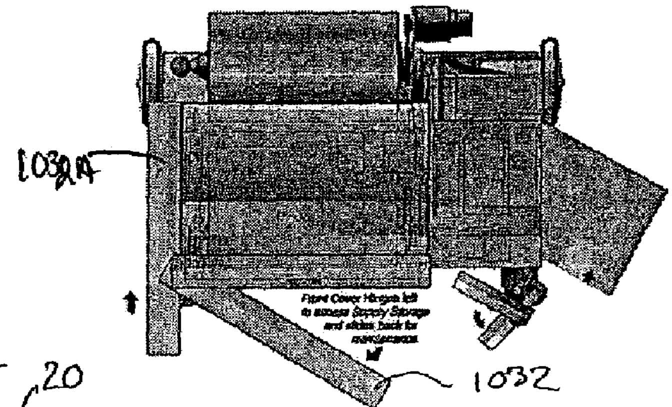
FIG. 15
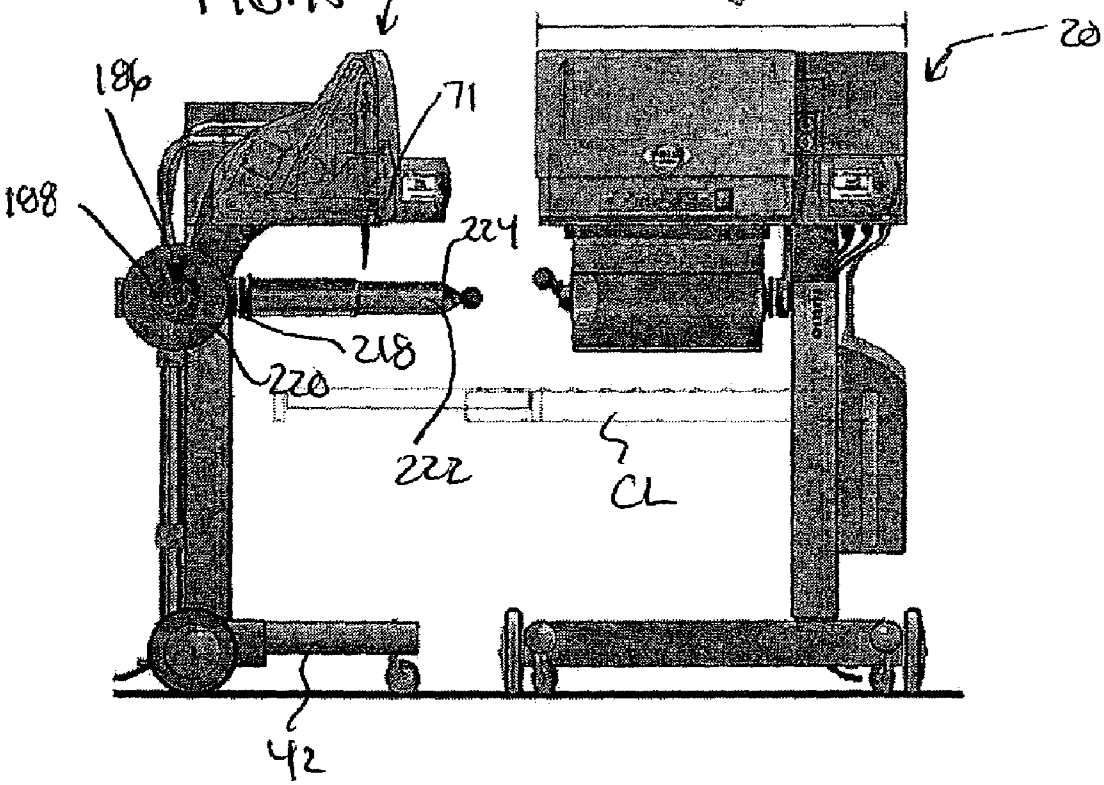
FIG-15B

Dp
360
354
θ
355
358
365
364
367
362
368
366
Da
366'
312
R
L3
L2
L1
L4
376
Dc
370
352
Dm 380
390

B
B
388
302
394
D3
389
D4

395
392

490
483
5.8"
484
404
494

402
400
480
404
402
404
490

494
488
486
15.0"
402
404
490
482

404
490
488
Cover hinges up
for filling
492
484
Solvent Funnel Area
402
Solvent Bottle
486
Sheet metal sleeve
holds bottle to machine
482
480
Plate to mount sleeve to lifter
484

109C
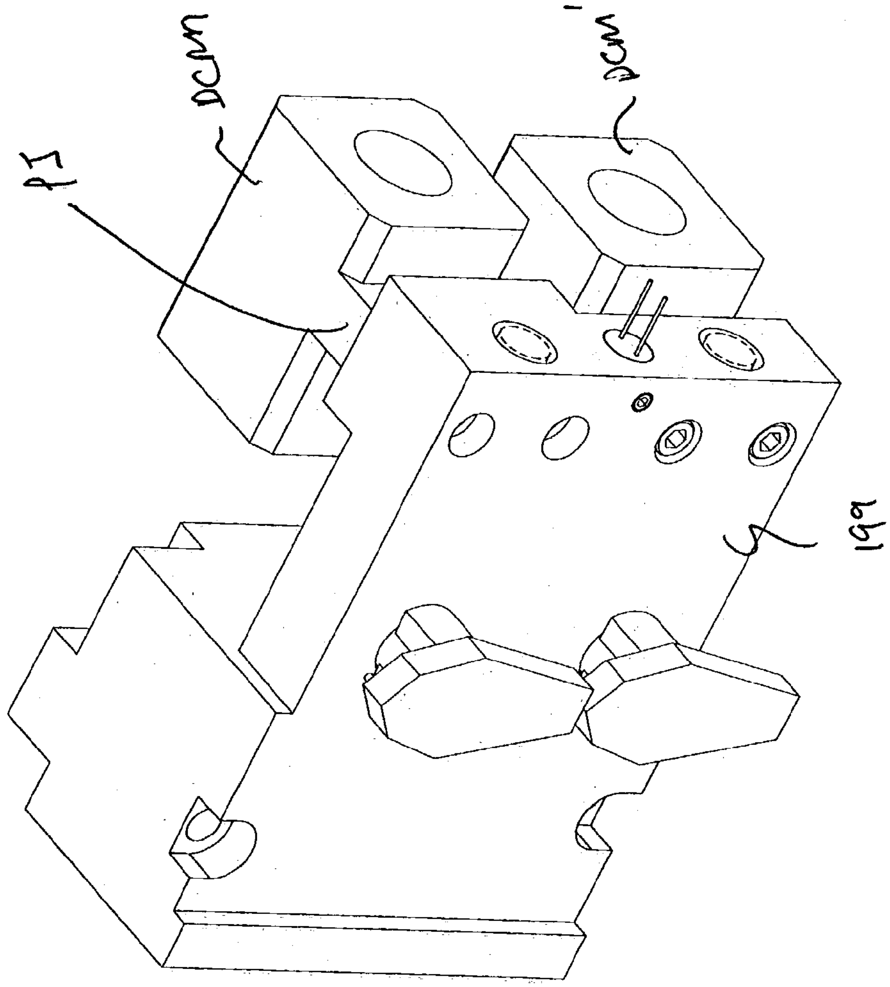

1116
1102
1116

Legend

Top/Bottom X-Seal, X-cut

Edge Seal

Chemical Dispensing/Tip Cleaning

Chemical Temperature Control
(Hoses)

Chemical Pressure

Solvent System Control

FILM UNWIND SYSTEM WITH HINGED SPINDLE AND ELECTRONIC CONTROL OF WEB TENSION

CROSS REFERENCE TO RELATED APPLICATIONS

Priority under 35 U.S.C. § 119(e) is claimed relative to the Provisional Patent Application referenced as "G" in the Table immediately below, which was filed on May 9, 2003. The disclosure of each of the 15 provisional applications A to O set forth below is incorporated herein by reference.

TABLE 1

| REF. ID. | Ser. No. | FILED | TITLE |
|---|---|---|---|
| A | 60/468,942 | May 9, 2003 | Dispenser Assembly With Mixing Module Design |
| B | 60/469,034 | May 9, 2003 | Bagger With Integrated, Inline Chemical Pumps |
| C | 60/469,035 | May 9, 2003 | Mixing Module Drive Mechanism |
| D | 60/469,037 | May 9, 2003 | Mixing Module Mounting Method |
| E | 60/469,038 | May 9, 2003 | Dispenser Tip Management System |
| F | 60/469,039 | May 9, 2003 | Hinged Front Access Panel For Bag Module Of, For Example, A Foam In Bag Dispenser |
| G | 60/469,040 | May 9, 2003 | Improved Film Unwind System With Hinged Spindle And Electronic Control Of Web Tension |
| H | 60/469,042 | May 9, 2003 | Exterior Configuration Of A Foam-In-Bag Dispenser Assembly |
| I | 60/468,988 | May 9, 2003 | Bag Forming System Edge Seal |
| J | 60/468,989 | May 9, 2003 | Improved Heater Wire |
| K | 60/468,982 | May 9, 2003 | Foam-In-Bag Dispenser System With Internet Connection |
| L | 60/468,983 | May 9, 2003 | Ergonomically Improved Push Buttons |
| M | 60/488,010 | Jun. 18, 2003 | Control System For A Foam-In-Bag Dispenser |
| N | 60/488,102 | Jun. 18, 2003 | A System And Method For Providing Remote Monitoring Of A Manufacturing Device |
| O | 60/488,009 | Jun. 18, 2003 | Push Buttons And Control Panels Using Same |

FIELD OF THE INVENTION

The present invention is directed at a dispensing system and components therefore, with a preferred embodiment featuring a foam-in-bag dispensing apparatus and components having application in the foam-in-bag system and, in some instances, utility alone or in combination with other systems. The present invention is also directed at a method of manufacturing a foam-in-bag apparatus, as well as the above noted components, and a method of using a foam-in-bag system to produce foam filled bags, and a method of using the above noted components.

BACKGROUND OF THE INVENTION

Over the years a variety of material dispensers have been developed including those directed at dispensing foamable material such as polyurethane foam which involves mixing certain chemicals together to form a polymeric product while at the same time generating gases such as carbon dioxide and water vapor. If those chemicals are selected so that they harden following the generation of the carbon dioxide and water vapor, they can be used to form "hardened" (e.g., a cushionable quality in a proper fully expanded state) polymer foams in which the mechanical foaming action is caused by the gaseous carbon dioxide and water vapor leaving the mixture.

In particular techniques, synthetic foams such as polyurethane foam are formed from liquid organic resins and polyisocyanates in a mixing chamber (e.g., a liquid form of isocyanate, which is often referenced in the industry as chemical "A", and a multi-component liquid blend called polyurethane resin, which is often referenced in the industry as chemical "B"). The mixture can be dispensed into a receptacle, such as a package or a foam-in-place bag (see e.g., U.S. Pat. Nos. 4,674,268, 4,800,708 and 4,854,109), where it reacts to form a polyurethane foam.

A particular problem associated with certain foams is that, once mixed, the organic resin and polyisocyanate generally react relatively rapidly so that their foam product tends to accumulate in all openings through which the material passes. Furthermore, some of the more useful polymers that form foamable compositions are adhesive. As a result, the foamable composition, which is often dispensed as a somewhat viscous liquid, tends to adhere to objects that it strikes and then harden in place. Many of these adhesive foamable compositions tenaciously stick to the contact surface making removal particularly difficult. Solvents are often utilized in an effort to remove the hardened foamable composition from surfaces not intended for contact, but even with solvents (particularly when considering the limitations on the type of solvents suited for worker contact or exposure) this can prove to be a difficult task. The undesirable adhesion can take place in the general region where chemicals A and B first come in contact (e.g., a dispenser mixing chamber) or an upstream location, as in individual injection ports, in light of the expansive quality of the mix, or downstream as in the outlet tip of the dispenser or, in actuality, anywhere in the vicinity of the dispensing device upon, for instance, a misaiming, misapplication or leak (e.g., a foam bag with leaking end or edge seals). For example, a "foam-up" in a foam-in-bag dispenser, where the mixed material is not properly confined within a receiving bag, can lead to foam hardening in every nook and cranny of the dispensing system making complete removal not reasonably attainable, particularly when considering the configuration of the prior art systems.

Because of this adhesion characteristic, steps have been taken in the prior art to attempt to preclude contact of chemicals A and B at non-desired locations as well as precluding the passage of mixed chemicals A/B from traveling to undesired areas or from dwelling in areas such as the discharge passageway for aiming the A/B chemical mixture. Examples of injection systems for such foamable compositions and their operation are described in U.S. Pat. Nos. 4,568,003 and 4,898,327, and incorporated herein by reference. As set forth in both of these patents, in a typical dispensing cartridge, the mixing chamber for the foam precursors is a cylindrical core having a bore that extends longitudinally there through. The core is typically formed from a fluorinated hydrocarbon polymer such as polytetrafluoroethylene ("PTFE" or "TFE"), fluorinated ethylene propylene ("FEP") or perfluoroalkoxy ("PFA"). Polymers of this type are widely available from several companies, and one of the most familiar designations for such materials is "Teflon", the trademark used by DuPont for such materials. For the sake of convenience and familiarity, such materials will be referred to herein as "Teflon", although it will be understood that materials having the above and below described qualities are available from companies other than DuPont and can be used if otherwise appropriate.

While features of the present invention are applicable to single component dispensing systems, the present invention is particularly suited for systems that have a plurality of openings (usually two) arranged in the core in communication with the bore for supplying mixing material such as organic resin and polyisocyanate to the bore, which acts as a mixing chamber. In a preferred embodiment of the invention, there is utilized a combination valving and purge rod positioned to slide in a close tolerance, "interference", fit within the bore to control the flow of organic resin and polyisocyanate from the openings into the bore and the subsequent discharge of the foam from the cartridge.

Teflon material and many of the related polymers have the ability to "cold flow" or "creep". This cold flow distortion of the Teflon is both beneficial (e.g., allowing for the conformance of material about surfaces intended to be sealed off) and a cause of several problems, including the potential for the loss of the fit between the bore and the valving rod as well as the fit between the openings (e.g., ports) through which the separate precursors enter the bore for mixing and then dispensing. In many of the prior art systems utilizing Teflon, the Teflon core is fitted in the cartridge under a certain degree of compression in order to help prevent leaks in a manner in which a gasket is fitted under stress for the same purpose. This compression also encourages the Teflon to creep into any gaps or other openings that may be adjacent to it which can be either good or bad depending on the movement and what surface is being contacted or discontinued from contact in view of the cold flow.

Under these prior art systems, however, over time the sealing quality of the core is lost at least to some extent allowing for an initial build up of the hardenable material which can lead to a cycle of seal degradation and worsening build up of hardened material. This in turn can lead to a variety of problems including the partial blockage of chemical inlet ports so as to alter the desired flow mix and degrade the quality of foam produced. In other words, in typical injection cartridges the separate foam precursors enter the bore through separate entry ports. Polyurethane foam tends to build up at the area at which the precursor exits the port and enters the mixing chamber. Such buildups cause spraying in the output stream, and dispensing of the mixture in an improper ratio. The build up of hardened material can also lead to partial blockage of the dispenser's exit outlet causing a misaiming of the dispensed flow into contact with an undesirable surface (e.g., the operator or various nooks and crannies in the dispenser). Another source of improper foam output is found in a partially or completely blocked off dispenser outlet tip that, if occurs, can lead the foam spray in undesirable areas or system shutdown if the outlet becomes so blocked as to preclude output. A variety of prior art systems have been developed in an effort avoid tip blockage, particularly in automated systems, as in foam-in-bag systems, which impose additional requirements due to the typical high usage level and the less ready access to the tip as compared to a hand-held dispenser. The prior art systems include, for example, porous tips with solvent flush systems. However, over time these tips tend to load up with hardened foam and eventually become ineffective.

The build of hardened/adhesive material over time can lead to additional problems such as the valve rod and even a purge only rod, becoming so adhered within its region of reciprocal travel that either the driver mechanism is unable to move the rod (leading to an oft seen shut down signal generation in many common prior art systems) or a component along the drive train breaks off which is often the annular recessed valve rod engagement location relative to some prior art designs.

The above described dispensing device has utility in the packing industry such as hand held dispensers which can be used, for instance, to fill in cavities between an object being packed and a container (e.g., cardboard box) in which the object is positioned. Manufacturers who produce large quantities of a particular product also achieve efficiencies in utilizing automated dispensing devices which provide for automated packaging filling such as by controlled filling of a box conveyed past the dispenser (e.g., spraying into a box having a protective covering over the product), intermediate automated formation of molded foam bodies, or the automatic fabrication of foam filled bags, which can also either be preformed or placed in a desired location prior to full expansion of the foam whereupon the bag conforms in shape to the packed object as it expands out to its final shape.

With dispensing devices like the hand held and foam-in-bag dispensing apparatus described above, there is also a need to provide the chemical(s) (e.g., chemicals "A" and "B") from their respective sources (typically a large container such as a 55 gallon container for each respective chemical) in the desired state (e.g., the desired flow rate, volume, pressure, and temperature). Thus, even with a brand new dispenser, there are additional requirements involved in attempting to achieve a desired foam product. Under the present state of the art a variety of pumping techniques have arisen which feature individual pumps designed for insertion into the chemical source containers coupled with a controller provided in an effort to maintain the desired flow rate characteristics through monitoring pump characteristics. The individual in "barrel" pumps typically feature a tachometer used in association with a controller attempting to maintain the desired flow rate of chemical to the dispenser by adjustment in pump output. The tachometers used in the prior art are relatively sensitive equipment and prone to breakdowns.

In an effort to address the injection of chemicals into the mixing chamber at the desired temperature(s) there has been developed heater systems positioned in the chemical conduits extending between the chemical supply and the dispenser, these heaters include temperature sensors (thermisters) and can be adjusted in an effort to achieve the desired temperature in the chemical leaving the feed line or conduit. Reference is made to, for example, U.S. Pat. Nos. 2,890,836 and 3,976,230, which references are incorporated by reference. These chemical conduit heater wires suffer from a variety of drawbacks such as (a) poor sensor (e.g., thermistors) responsiveness due to non head-on flow positioning of the sensor or difficulty in manipulating the sensor without breakage to be in the proper orientation, (b) difficulty in positioning the tip of the heater wire close enough to the dispenser to avoid cold shot formation and associated material stretch limitations in the heater wire conduit needed to avoid stretching and separation of the dispenser from the tip of the heater wire when the other "fixed" end originates from the pump control region, (c) increased pump weight and an increase in the length and cost associated with the leads extending from the heater wire tip to heater wire control and power source locations at the pump end, (d) an associated increase in electromagnetic interference (EMI) due to the longer "umbilical" cords and thermister leads, (e) poor thermister reliability in its heavy flex location within the interior of the heater wire, (f) difficulty in feeding heater elements within the outer protective chemical conduit, and (g) cost and production limitations in the overall heater wire and conduit length requiring relatively close positioning of the chemical driven source to the dispenser location.

As noted above, in the packaging industry, a variety of devices have been developed to automatically fabricate foam filled bags for use as protective inserts in packages. Some examples of these foam-in-bag fabrication devices can be seen in U.S. Pat. Nos. 5,376,219; 4,854,109; 4,983,007; 5,139,151; 5,575,435; 5,679,208; 5,727,370 and 6,311,740. In addition to the common occurrence of foam dispenser system lock up, cleaning downtime requirements, poor mix performance in prior art foam-in-bag systems, a dispenser system featuring an apparatus for automatically fabricating foam filled bags introduces some added complexity and operator problems. For example, an automated foam-in-bag system adds additional complexity relative to film supply, film tracking and tensioning, bag sealing/cutting, bag venting, film feed blockage. Thus, in addition to the variety of problems associated with the prior art attempts to provide chemicals to the dispenser in the proper rate, keeping the dispenser cartridge operational, and feeding film properly, the prior art foam-in-bag systems also represent a particular source of additional problems for the operators. These additional problems include, for example, attempting to understand and operate a highly complicated, multi-component assembly for feeding, sealing, tracking and/or supplying film to the bag formation area; high breakdown or misadjustment occurrence due to the number of components and complex arrangement of the components; high service requirements (also due in part to the number of components and high complexity of the arrangement in the components); poor quality bag formation, often associated with poor film tracking performance, difficulty in achieving proper bag seals and cuts, particularly when taking into consideration the degrading and contamination of heater wires due to, for example, foam build up and the inability to accurately monitor current heated wire temperature application, difficulty in formation and maintaining clear bag vent holes, as well as the inevitable foam contamination derivable from a number of sources such as the dispenser and/or bag leakage, and clean up requirements in general and when foam spillage occurs.

Another particularly problematic area associated with the prior art foam-in-bag system lies in the area of heated resistance wire replacement, both in regard to edge sealing and in regard to the cross-cutting sealing systems. In the prior art systems, there is often required delicate operator manipulation (see for example U.S. Pat. No. 5,376,219) with certain tools to achieve removal and reinsertion of broken, or worn, heated wires (which is a common occurrence in the thin heated resistance wires used in the industry to form the seals and cuts).

In addition, prior art systems suffer from other drawbacks, such as relatively slow bag formation and a slow throughput of completed bags which, in some systems, is partially due to a reverse feed requirement to break an upper, not-yet-completely formed bag from a completed bag adhered together by a bond formed by the earlier melted and presently cooled plastic material on the heated cross-cut wire.

The prior art mixing cartridge driven mechanisms for reciprocating valve rods has also shown in the field to be inadequate as they are subject to often breakdowns and often quickly become unable to achieve rod reciprocation after a minor build up of foam in the cartridge. An additional problem associated with the mixing chamber used on fixed dispenser embodiments such as a foam-in-bag dispenser is the difficulty in proper removal and mounting of a mixing module in the support housing. Prior art systems also suffer from hose and cable management (e.g., electronics, chemical supply and solvent supply) difficulties due to their becoming tangled and in a state of disarray so as to present obstacles to operators and potential equipment malfunctions due to cable or hose interference with moving components or the hoses/cables becoming disconnected and/or damaged.

The pump equipment of prior art systems are also prone to malfunction including the degrading of seals (e.g., isocyanate forms hardened crystals when exposed to air which can quickly degrade soft seals). The pumping systems currently used in the field are also subject to relatively rapid deterioration as they often operate at high rates during usage due to, for example, general inefficiency in driving the chemical from its source to the dispenser outlet. The common usage of in-barrel pump systems also introduces limitations in chemical source locations (e.g., typically a 20 foot range limitation for standard heater wire conduit and in barrel pump systems), which can make for difficulties in some operator facilities where it is required or preferred to have the chemical source located at a greater distance from the dispenser. The common usage of in-barrel pumps for prior-art dispenser systems also presents a requirement for multiple chemical sources to achieve the required one-to-one chemical source and pump combination, which in particularly problematic for operators running numerous dispenser systems.

Prior art foam-in-bag systems, in presumably an effort to accurately dispense foam into the bag, locate the dispenser within the bag being formed (e.g., all dispenser components placed between the film left and right side edges and above the end seal of the bag). These prior art arrangements present problems from the stand point of the placement of the dispenser and its various components such as filters, chemical valving lines, and other components required for accessing a mixing module, all in the bag formation region. This positioning places those components in an area highly prone to chemical contact even with a properly functioning dispenser. Efforts have been made in the prior art to protect the dispenser through the use of covers, but these covers have shown to be highly ineffective in protecting the components. Once foam hardens on the components they are often made even more difficult to access when servicing is desired. Also, the non-smooth, multi-protrusion and edge presentment design of prior art foam dispensers, in addition to making cleaning impractical, have a tendency to create film tracking problems and/or require added guidance members to avoid film/dispenser contact.

In addition to the difficulty in achieving proper wire temperature levels in the chemical conduit heater wires, there has also been experienced difficulty in achieving proper end and edge sealing/cutting, and venting wire temperatures in prior art foam-in-bag systems. There is also associated with prior art systems problems in achieving proper positioning and in gaining access for servicing heater wires. The two most common prior art systems take different approaches with a first utilizing a rolling heater wire which presents added complexity in power supply as well as difficulty in removing and re-inserting heater wires. The second approach uses a non-rolling drag technique (e.g., U.S. Pat. No. 6,472,638) that, while being easy to remove and re-insert, has experienced difficulty in the field in maintaining a proper location of the exposed heater wire relative to the film being driven thereby, which is due in part to a tendency for the heated seal wires becoming more and more embedded in the underlying support.

Film replenishment in the prior art systems has also proven to be difficult. Accessing prior art systems to remove the emptied roll and to replace it with a new role, which can be relatively heavy as in 25 lbs. or so, is only achieved with great difficulty due to the insertion location being in the rear, intermediate region of a typical foam-in-bag system design. This location is highly straining on the operator.

Many prior art foam-in-bag systems and other automated dispending systems have shown in the field to have high service requirements due to, for example, breakdowns and rapid supply usage requirements (e.g., film, solvent, precursor chemicals, etc.). There is thus a great deal of servicing associated with prior art systems as in problem solving and in maintaining adequate supply levels. The prior art systems suffer from the problem of difficult and often non-adequate servicing which can be operator or service representative induced (e.g., failing to monitor own supply levels or anticipating level of usage or difficulty in responding timely to service requests which are often on an emergency or rush basis as any down time can be highly disruptive to an operator in timely meeting orders).

As can be seen there are numerous potential areas that can create problems in the field of dispensing.

SUMMARY OF THE INVENTION

An embodiment of the invention features a film supply apparatus for a foam-in-bag dispenser system, comprising a support member, and a spindle supported by the support member, the spindle having a support extension for receiving a roll of film for use. There is additionally provided a spindle-to-support connector, with the spindle-to-support connector supporting the spindle for adjustment of the spindle between a film feed to dispenser mode position and a film roll replacement position different than the film feed to dispenser mode position. The spindle-to-support connector preferably includes a hinge which provides for rotation of the spindle between the film feed to dispenser mode position and the film roll replacement position and the spindle is arranged along a longitudinal axis coinciding with an axis of roll rotation during feed out of film, and wherein the film roll replacement position falls on an axis which is at least 25 degrees away from the longitudinal axis. A rotation out angle of 60 to 120 degrees from the longitudinal axis is preferred.

There is also featured in an embodiment of the invention a roll retention latch provided at a free end of the spindle that includes a handle member which is adjustable between a first position where the roll is axially slideable off the spindle and a latch position wherein the roll is precluded from axial sliding off of the spindle. In addition, the support extension is preferably adjustable in axial length for accommodating different axial length film rolls and features a spindle latch for fixing the spindle in the film feed to dispenser mode position, the latch including a latch component which is positioned for sliding contact with a latch reception component supported by the spindle such that a rotation of the spindle from the film roll replacement position to the film feed to dispenser mode position automatically moves the latch into a latch state following deflection. The spindle latch also preferably includes a release facilitator which includes means for pushing the spindle out from the film feed to dispenser mode position to film roll replacement position. An embodiment of the invention features a spindle that has two axially spaced film roll mounting surfaces of different diameter, with the interior one being larger in diameter than the other mounting surface which mounting surfaces are dimensioned relative to core inserts of the film roll which core inserts are dimensioned of different sizes so as to limit mounting of the film roll in only one axial orientation.

In other words, an embodiment of the invention features two core plugs that are installed one into each end of the roll core. The left end of the roll core has a core plug called the "roll support, small end" core plug, which has no spline and simply slides over the small diameter mounting surface end of the roll spindle when it is being placed in its final mount position. The right end of the roll core has a core plug called the "roll drive spline" core plug, which preferably has the locking spline feature described above for mating with a spindle spline on the roll spindle itself. The inside diameter of the "roll support, small end" core plug is smaller than the inside diameter of the "roll drive spline" core plug so the roll can only slide onto the spindle in the correct orientation. If an operator tries to slide the roll on the wrong way, (i.e., with the "roll support, small end" as the leading end), the film roll will not fit onto the spindle as the inside diameter of the "roll support, small end" core plug is not sufficient to clear the larger diameter of the spindle mounting surface closest to the spline drive. However, when oriented the correct way, the larger diameter "roll drive spline" core plug is able to slide along the larger diameter spindle mounting surface and the smaller diameter "roll support, small end" core plug is designed for sliding on the smaller diameter mounting surface of the spindle.

The present invention also features a film supply apparatus for use in a dispenser, comprising a film source support for supporting a film source, a film source driver, a film source drive transmission in driving communication with the film source driver; a film feed roller set positioned downstream with respect to film travel to the film source support, and a film feed driver in driving communication with the film feed roller set. The film source drive transmission is preferably in driving communication with the film source supported on the film source support to provide film web tensioning in the film being drawn by the film feed roller set. The film source support includes a spindle for receiving a roll of film and the film source drive transmission includes a film source engagement member supported on the spindle, with the film source engagement member includes a plurality of projections for engagement with a core insert of the film roll supported on the spindle. In a preferred embodiment the engagement member includes an annular ring having a plurality of circumferentially spaced projections separated by clearance areas which is placed in driving engagement with a film roll with a film core having a drive transmission core insert, the core insert comprising an annular ring with a plurality of projections and clearance spaces therebetween which are arranged for rotational driving transmission upon meshing with the annular ring of the engagement member. The film roll also preferably includes a non-drive core insert which is positioned at an opposite end of the film core and is supported by the spindle. The projections of the engagement member include tapered first contact extensions and base sections of greater thickness and having side walls for rotational driving transmission to the film roll.

In a preferred embodiment, the spindle is adjustable in length to accommodate different length roll cores. An embodiment of the invention also features a controller which is in communication with the film feed driver and is also in communication with the film feed driver, with the controller including means for moving the film in a reverse direction opposite a direction of film feed induced by the feed roller set and wherein the controller preferably further includes means for inducing tension in the film during idle periods wherein the film feed roller set is not operating and wherein the film source includes a film roll support for supporting a film roll and the controller determines film roll diameter by comparing film feed velocity to angular velocity of the film roll while unwinding. The controller also taking into consideration the rotational momentum of the film roll in taking into consideration what level of torque to be generated by the film source driver to maintain a desired tension state in the film. In addition, the controller preferably includes means for decreasing the level of torque upon an initiation or start up of film feed by the film feed roller set, means for increasing the level of torque upon the film feed roller set discontinuing film feed drive. The controller further preferably means for monitoring an amount of film left on the roll and increases torque levels upon determining lowered amounts of film remaining on the film roll as well as means for generating a system shut down upon determination of a speed increase in the film source driver due to a removal of torque resistance upon film run out, and preferably means for generating a system shut down upon determination of a film jam based on a relationship determination between the encoder levels of the feed roller set continuing movement and with the film feed source driver sensing film tension levels deviating from a normal range of feed roller draw tensioning in the film. The relative relationship between the encoder output to the controller also is used by monitoring means of the controller for determining film roll diameter from the data provided by the encoders. Also, the film is passed by a foam dispensing unit located downstream with respect to film travel direction from the film source and upstream of the film feed roller set with the film preferably being C-fold film and wherein the dispenser is arranged with respect to film feed travel such that a C-fold edge travels outward of a forward end of the dispenser and the feed roller set includes an edge sealer which joins free edge portions of the C-fold film following travel of the free edge portions along opposite side walls of the dispenser.

A preferred embodiment has the film supply apparatus provided with a film source driver that is arranged to move film backwards or in a direction opposite to a direction of film feed induced by the film feed roller set. There is also preferably provided an idler roller over which the film travels in going between the film source support and the film feed roller set, and the film supply apparatus further comprising film web tracking adjustment means which alters the idler roller orientation to have the film properly track in traveling through the film feed roller set.

An additional embodiment of the invention features a film supply apparatus for supplying film in a foam-in-bag system, comprising a film feeding means for feeding film from a film source to a location for bag formation, a bag forming apparatus, a foam material dispenser positioned for feeding foam material for reception in a bag of the bag forming apparatus, and a web tensioning system having a web tensioning driver in driving communication with the film source and which is in communication with a controller for monitoring the film feed and web tension states and directing adjustments in the web tension system. The preferred embodiment features a web tensioning driver that is arranged to move film backwards or in a direction opposite to a direction of film feed induced by the film feeding means and with the film source including a roll of film and the web tensioning system including a drive transmission in communication with the roll of film for rotational driving of the roll of film and also in communication with web tensioning driver. There is further featured a spindle support for supporting the roll of film and wherein the drive transmission includes a spindle drive having a plurality of projections for engagement with a core insert of the film roll supported on the spindle with the spindle drive preferably including an annular ring having a plurality of circumferentially spaced projections separated by clearance areas. Also the film roll is provided with a roll drive insert secured at an end of the roll and which is dimensioned for meshing rotation drive engagement with the spindle drive with the roll drive comprising an annular ring with a plurality of projections and clearance spaces therebetween which are arranged for rotational driving transmission upon meshing with the spindle drive.

The present invention also features a method of supplying film to a foam-in-bag dispenser comprising feeding film from a film source past a foam dispenser with film feeding means and maintaining a tension state in the film being fed by the film feeding means with a web tension system which is in driving engagement with the film source by way of a drive transmission connection to the film source, and with a preferred embodiment featuring a step of monitoring a state of web tension with a controller which receives input data from both the film feeding means and the web tension system. There is also featured a step of shutting down the film feeding means upon a sensed film run out based on a comparison of data input from the film feeding means and the web tensioning system. In a preferred method, there is provided a film source that is a roll of film on a core and the web tension system includes a drive engagement member that meshes in rotational drive transmission fashion with the core.

The invention also includes a film roll core insert for use in a web tension system of a foam-in-bag system, comprising an annular ring dimensioned for securement within a core end of film roll and having rotation drive meshing means for rotational drive engagement with a driver of the web tension system.

BRIEF DESCRIPTION OF THE DRAWINGS

FIG. 11A shows an upper perspective view of the spindle lock in position and release mechanism of the present invention.

FIG. 11B shows as alternate perspective view of the mechanism in FIG. 11A.

FIG. 11C shows an end elevational view of the mechanism in FIG. 11A.

FIG. 11D shows a cross-sectional view of the mechanism in FIG. 11A.

FIG. 89A shows a perspective view of the inner magnet assembly for the in-line pump assembly.

FIG. 89B shows a cross-sectional view of the inner magnet assembly.

FIG. 90 shows a cross-sectional view of the output manifold assembly.

FIG. 91 shows a bottom plan view of the outlet manifold.

FIG. 92 shows the bearing shaft used in the in-line pump assembly.

FIG. 93 shows in perspective the geroter pump head.

FIG. 93A shows an exploded view of the geroter pump head.

FIG. 94 shows a cross-sectional view of the geroter pump head from a first orientation.

FIG. 95 shows a cross-section view of the geroter pump head from a different orientation.

FIG. 96 shows the plates of the geroter pump from an inside or interior surface plate perspective.

FIG. 97 shows the plates of the geroter pump from an outside surface plate perspective.

FIG. 98 illustrates flex coupling for use in the pump assembly.

Figure 99:
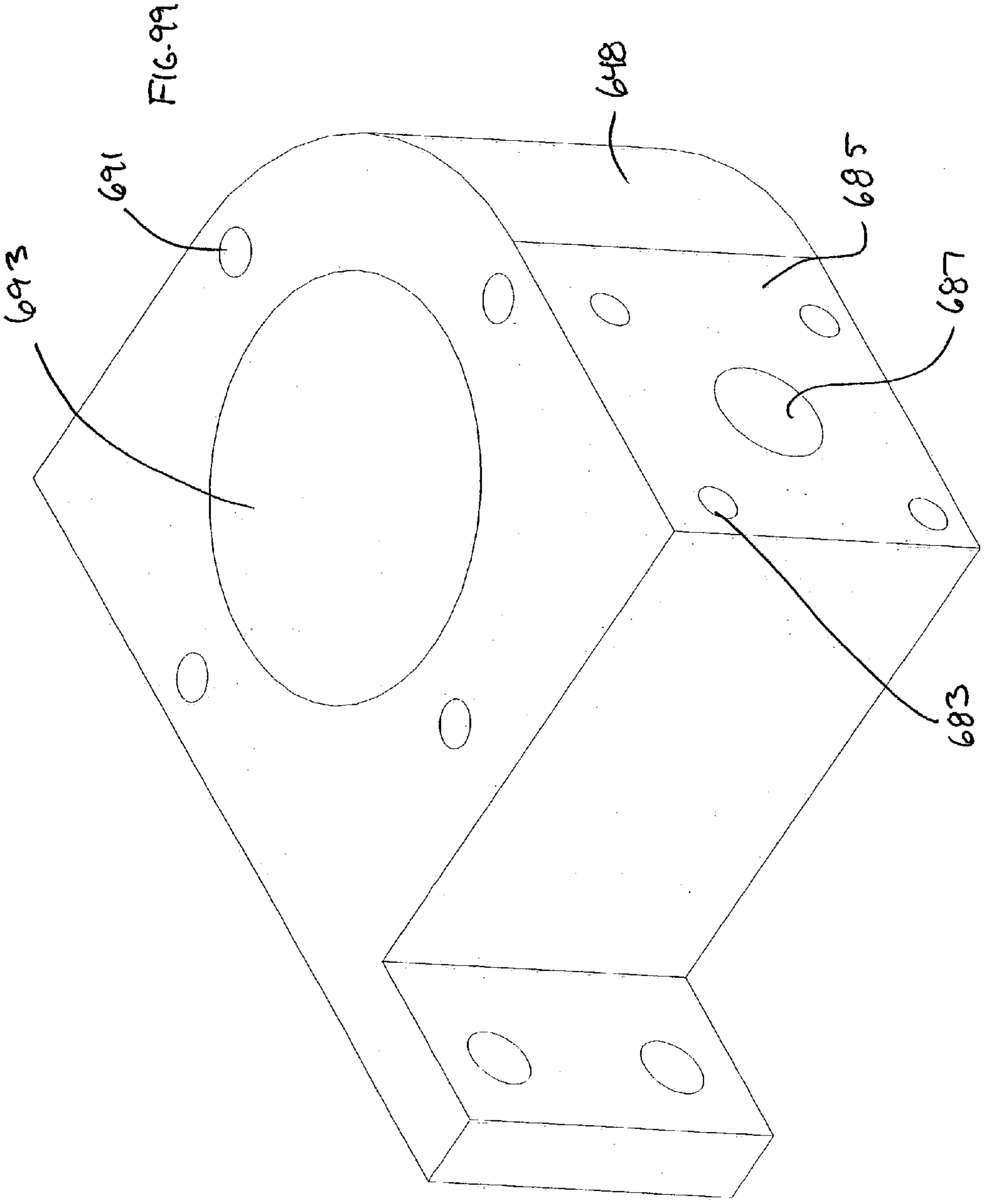

FIG. 99 shows an upper perspective view of the chemical inlet manifold.

Figure 100:
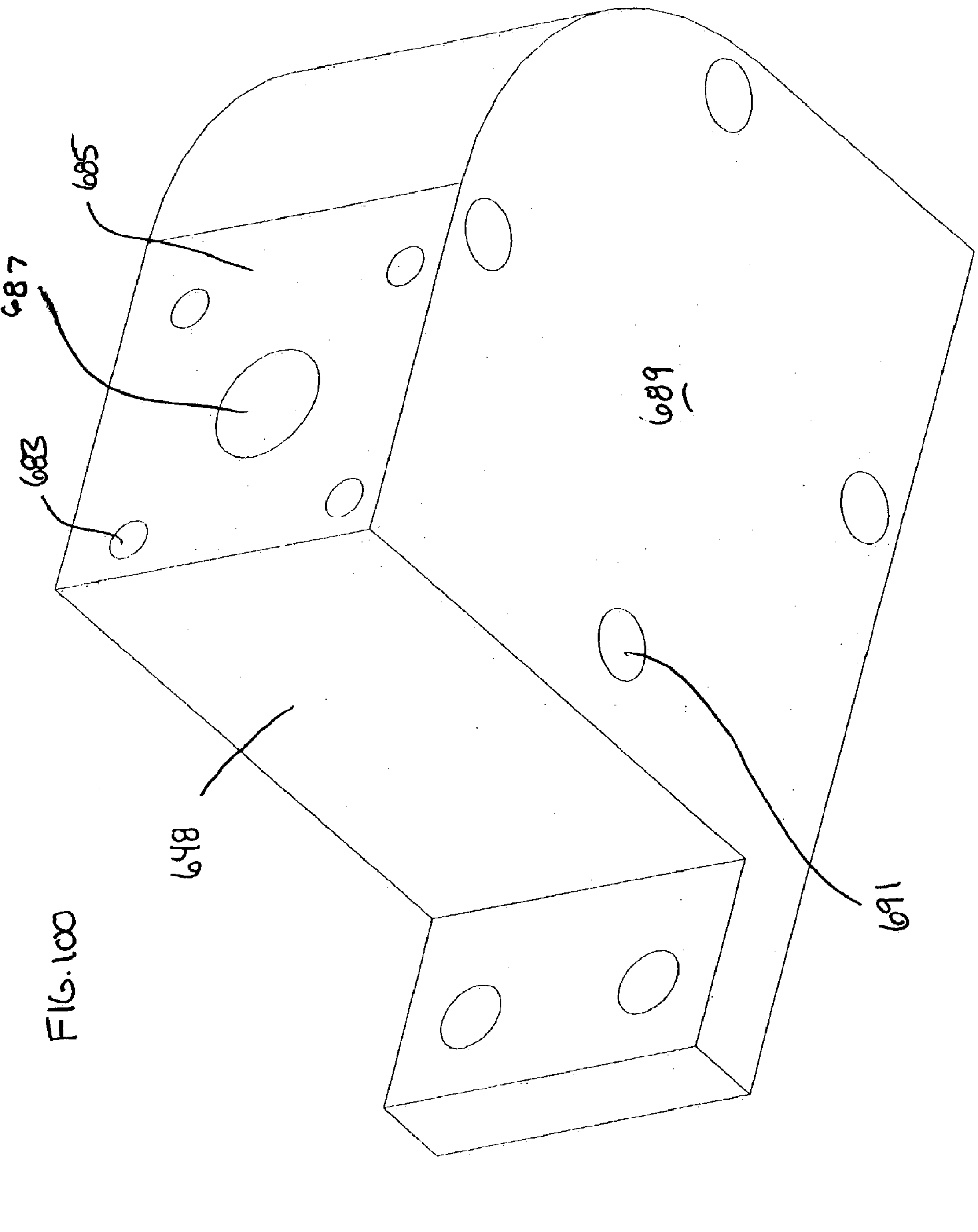

FIG. 100 shows a lower perspective view of the chemical inlet manifold.

Figure 101:
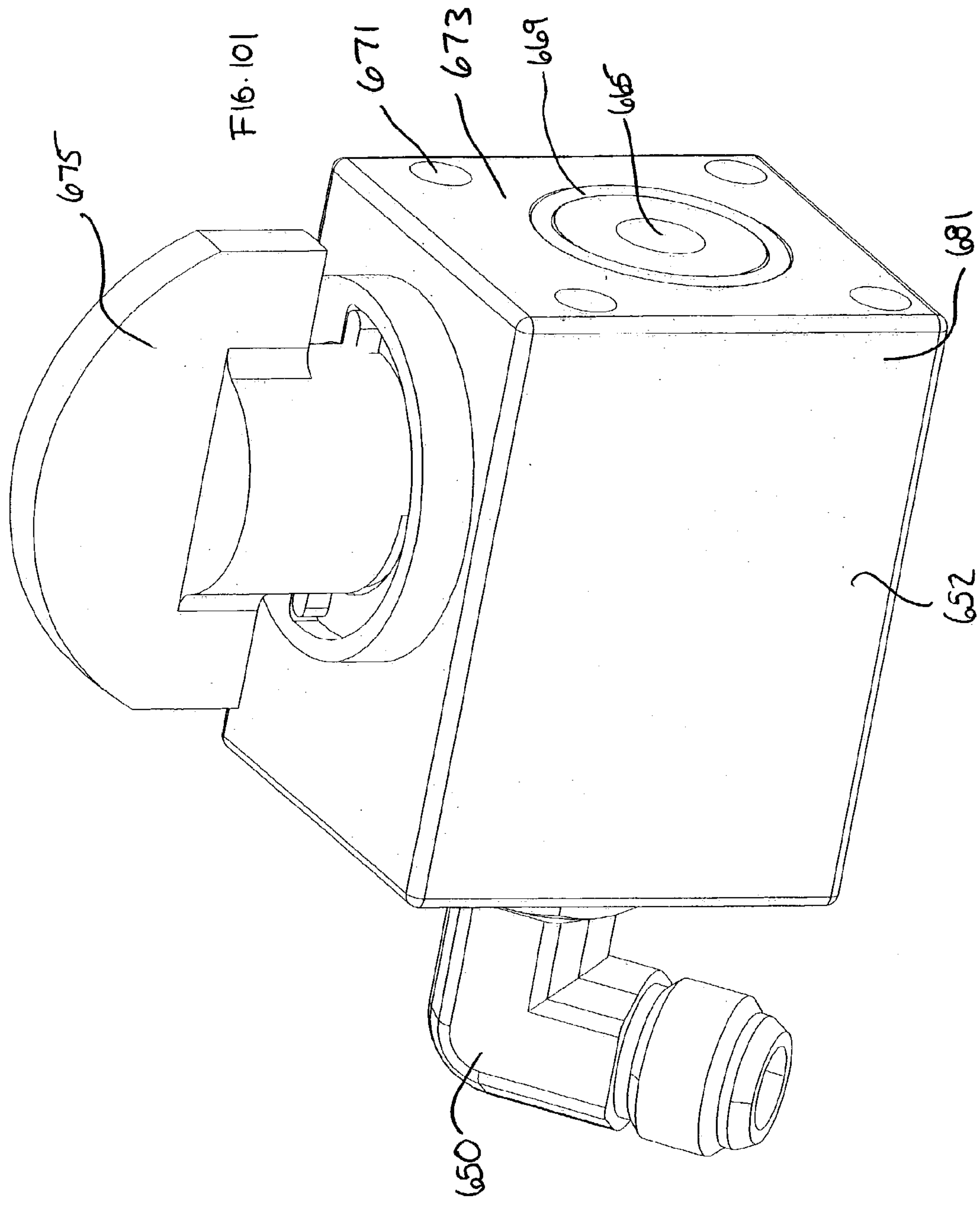

FIG. 101 shows a perspective view of a chemical inlet valve manifold.

Figure 102:
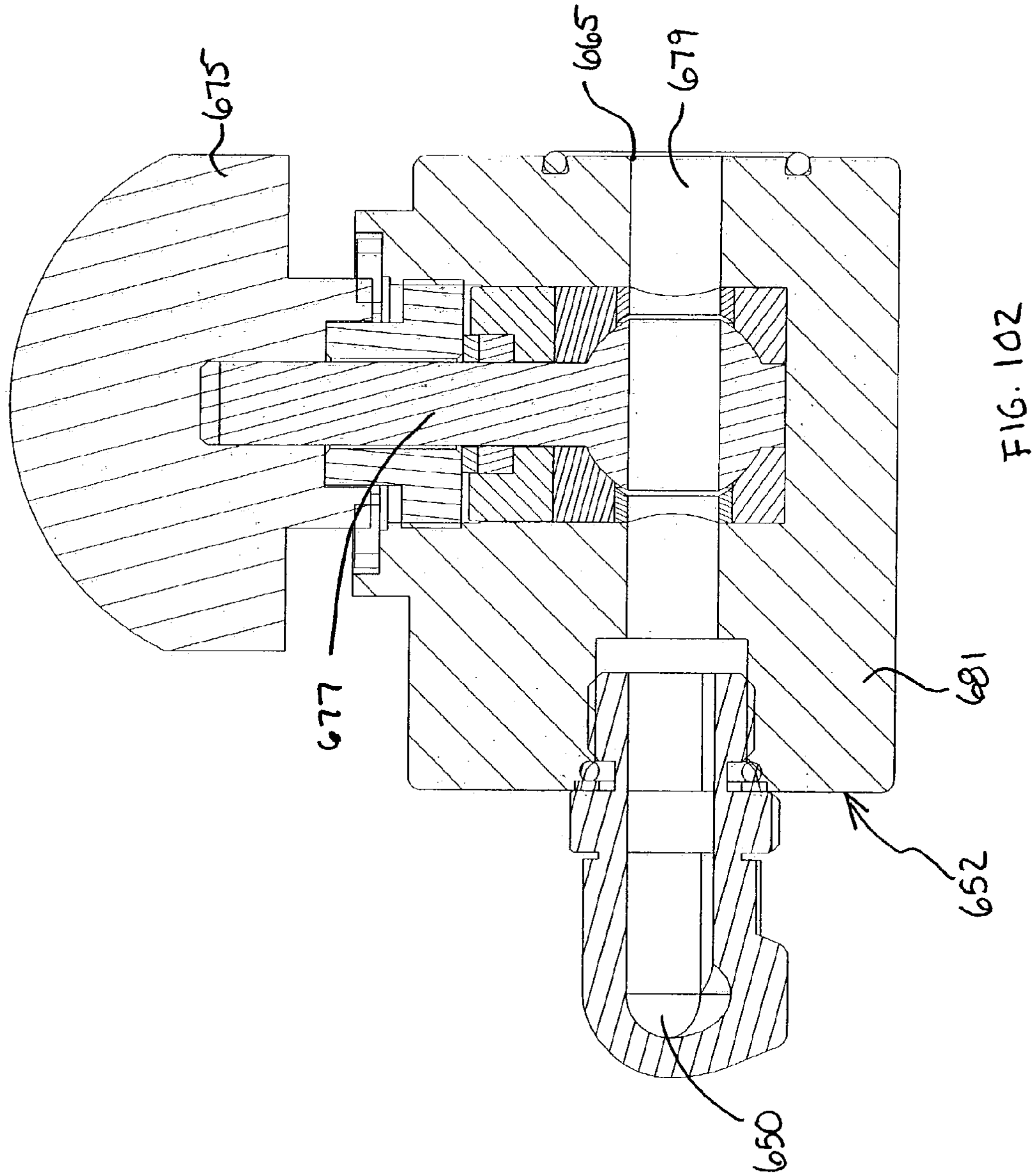

FIG. 102 shows a cross-sectional view of the chemical inlet valve manifold.

Figure 103:
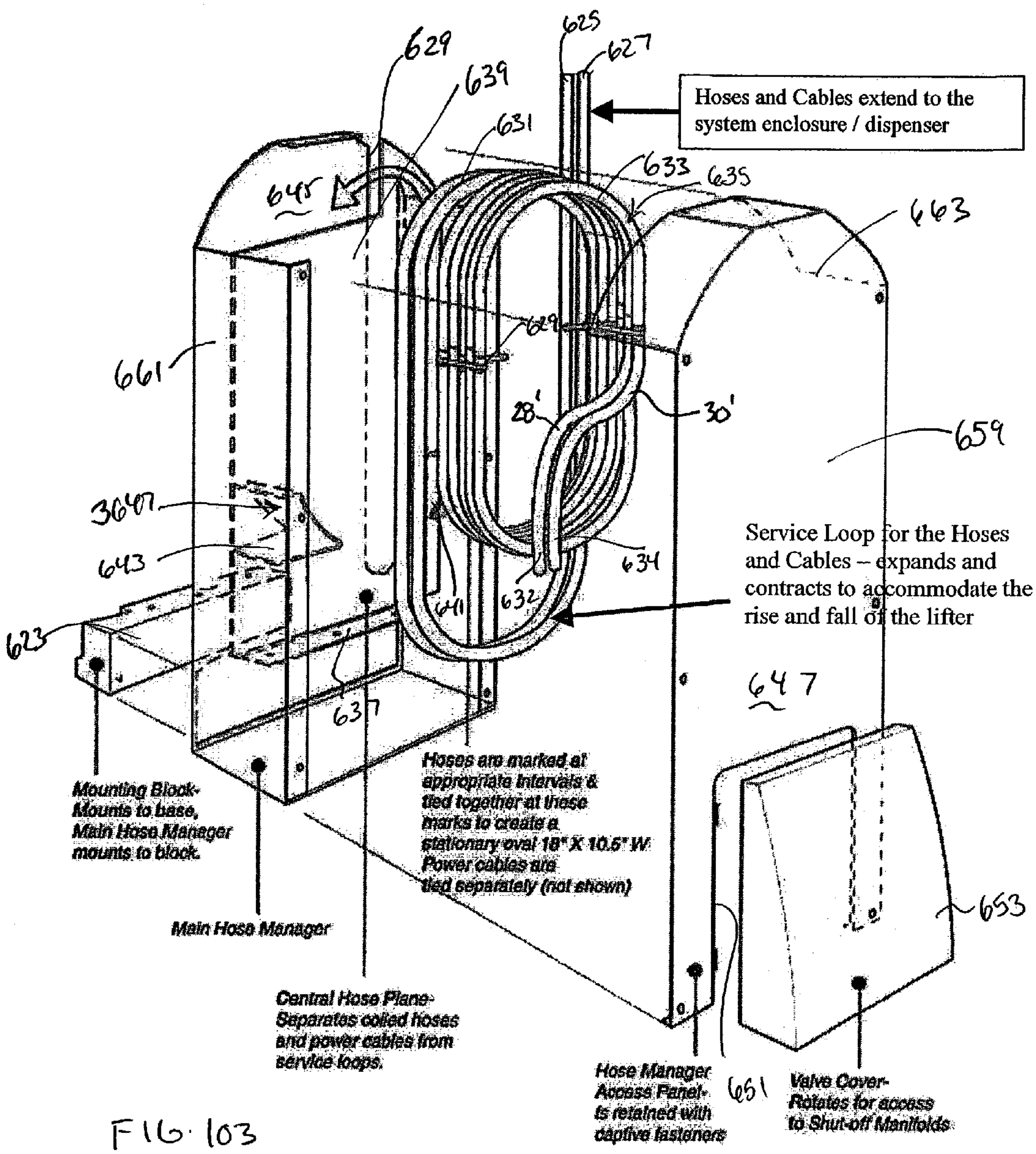

FIG. 103 illustrates the hose and cable management means of the present invention.

Figure 104:
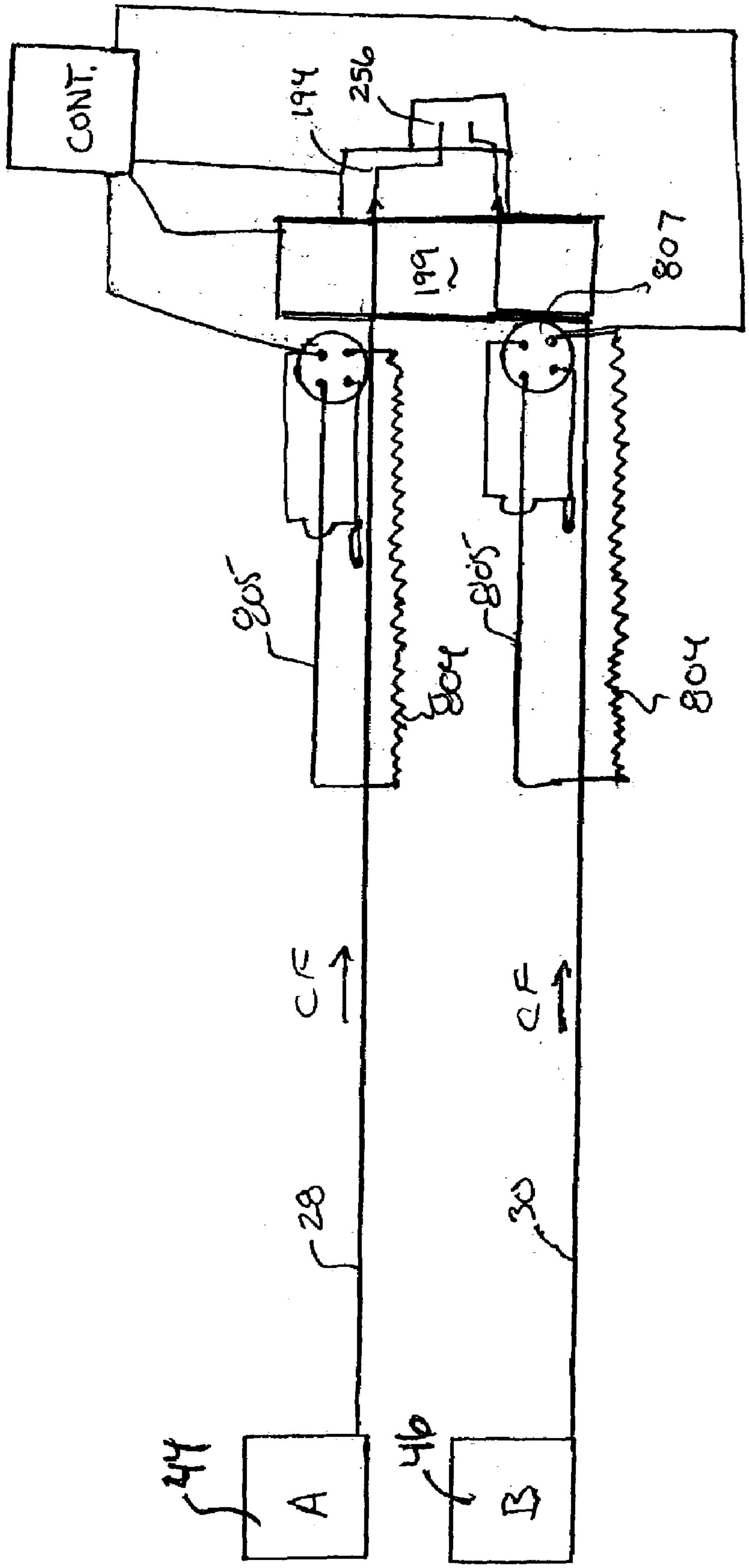

FIG. 104 shows a schematic depiction of the heated chemical conduit circuitry.

Figure 105:
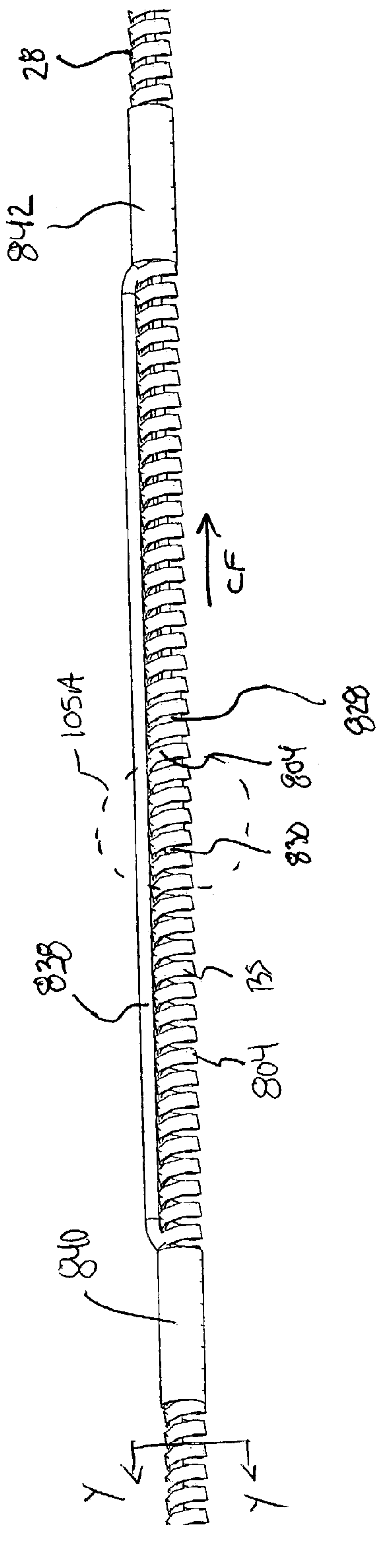

FIG. 105 shows a section of the heated chemical conduit where the thermister or temperature sensor is provided and the bypass return leg for the heater circuit.

Figure 105A:
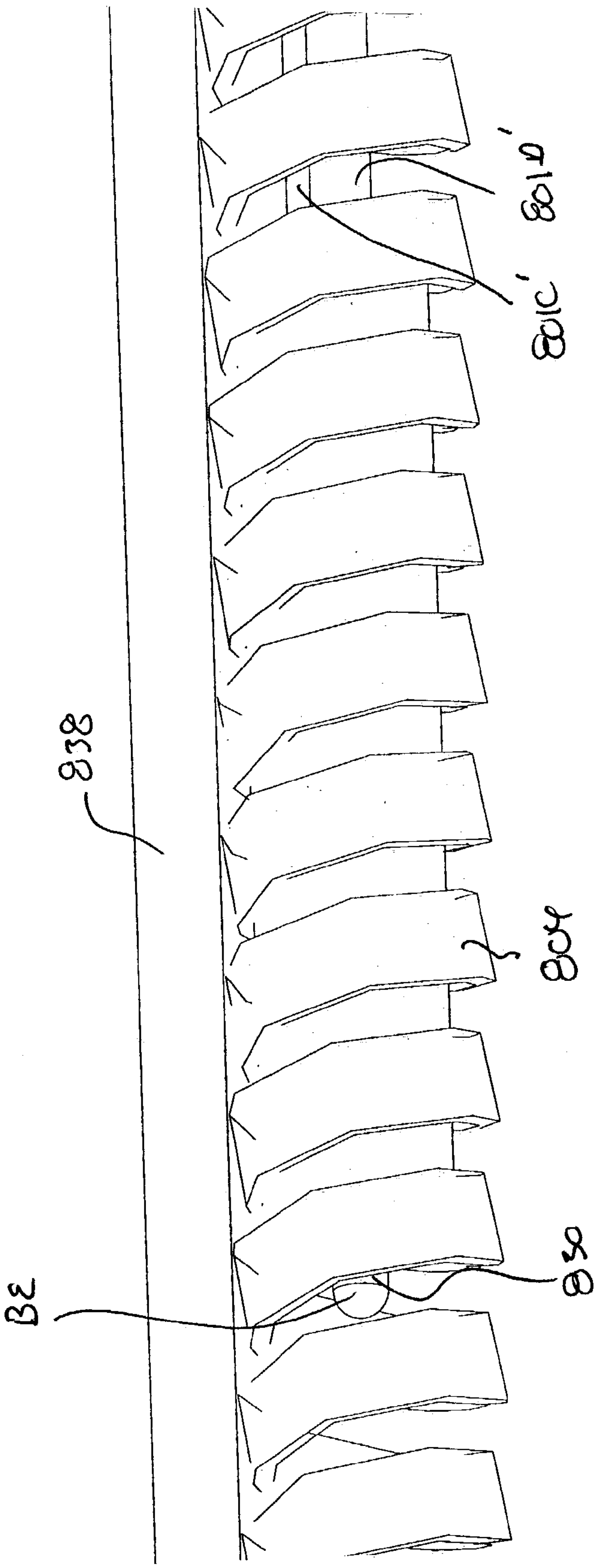

FIG. 105A shows an enlarged view of the thermister section of the heater coil.

Figure 106:
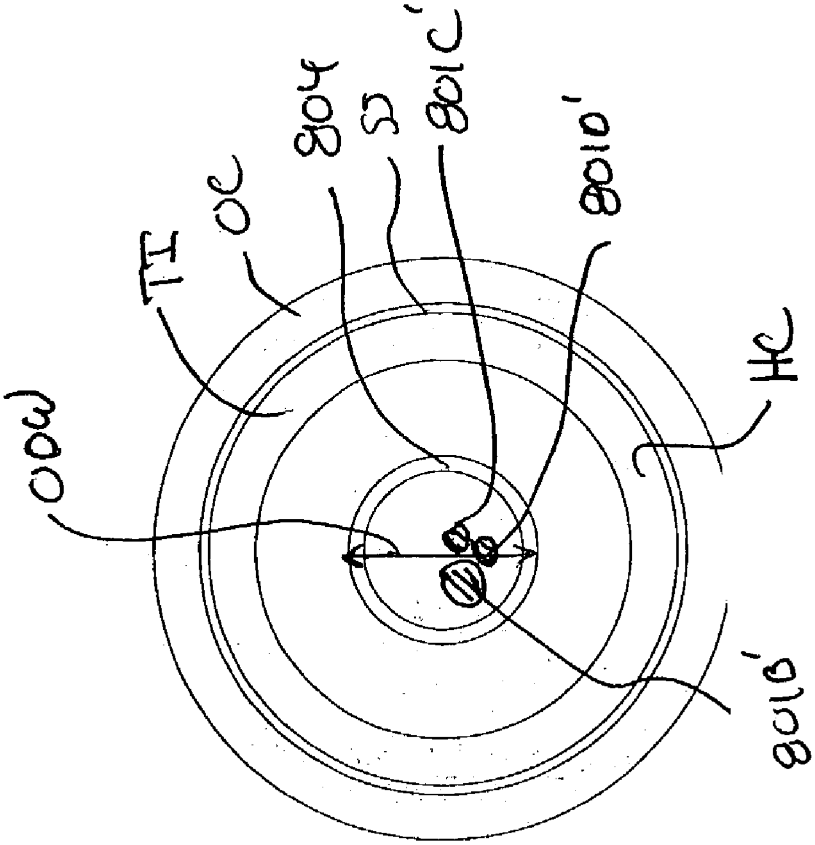

FIG. 106 provides a cross-sectional view of a non-thermister section of the heated chemical conduit taken along cross-section line Y-Y in FIG. 106.

Figure 107:
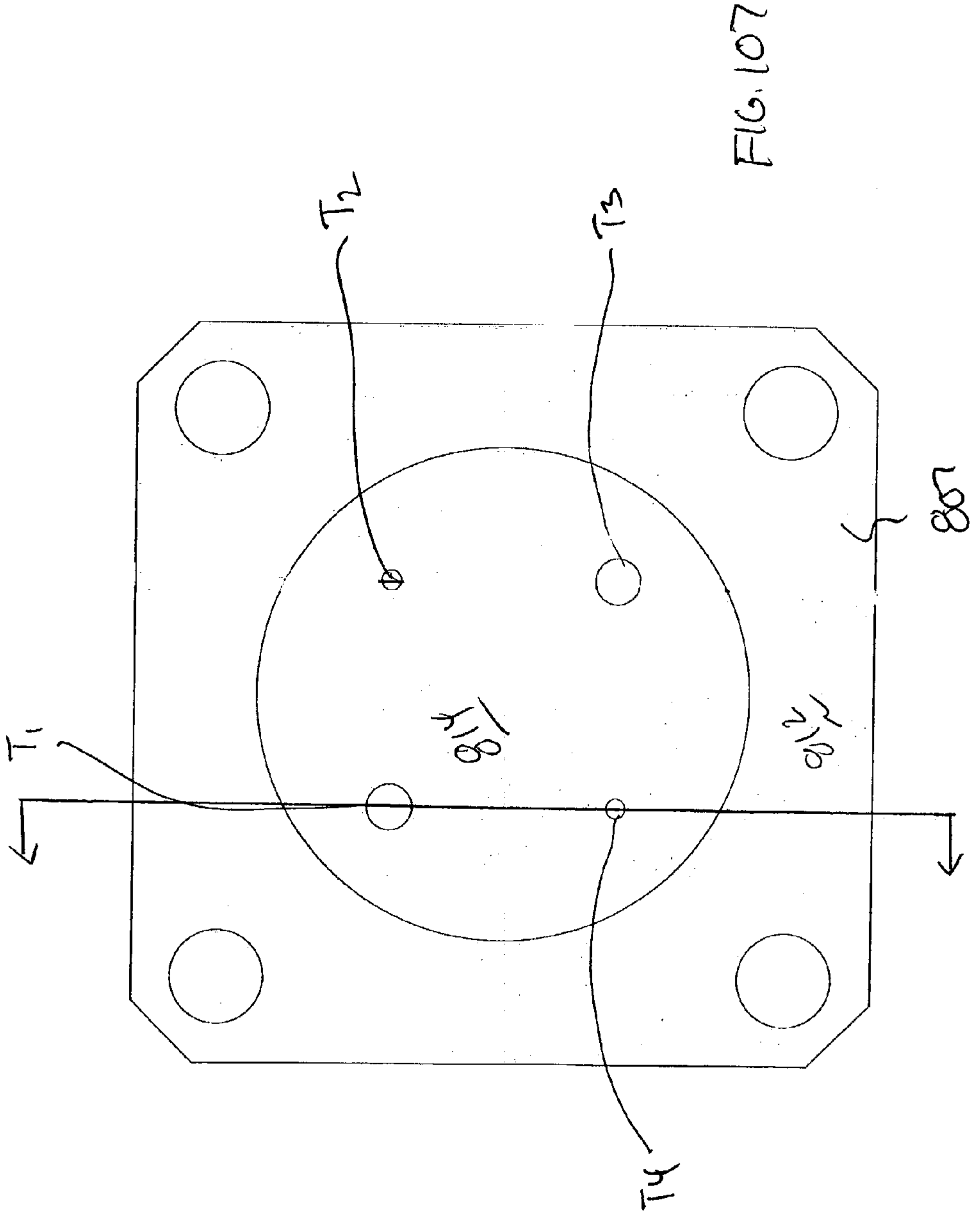

FIG. 107 shows a front face elevational view of the feed through block of the chemical conduit heating system.

Figure 108:
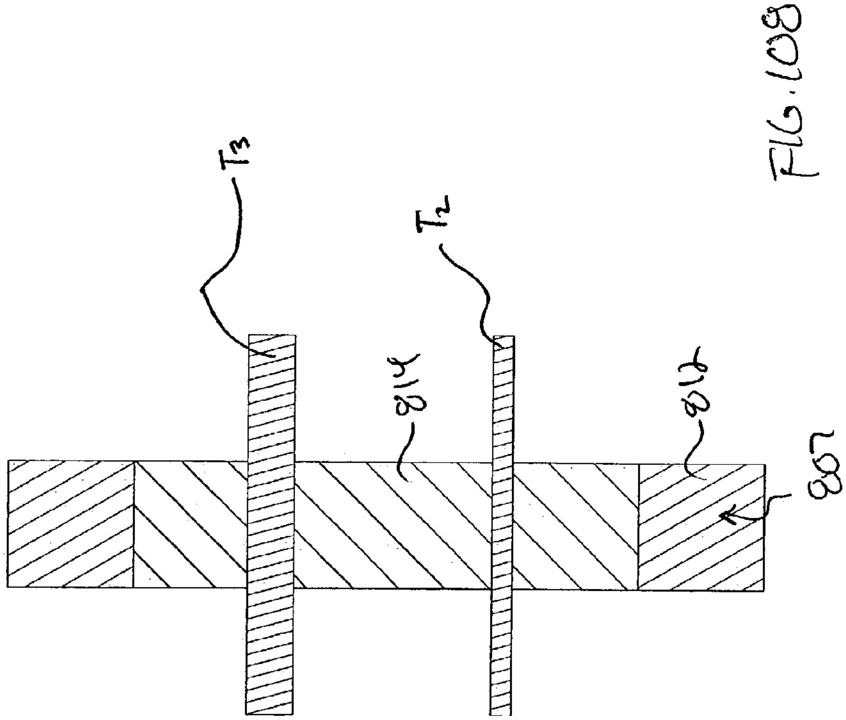

FIG. 108 shows a side elevational view of the feed through block.

Figure 109:
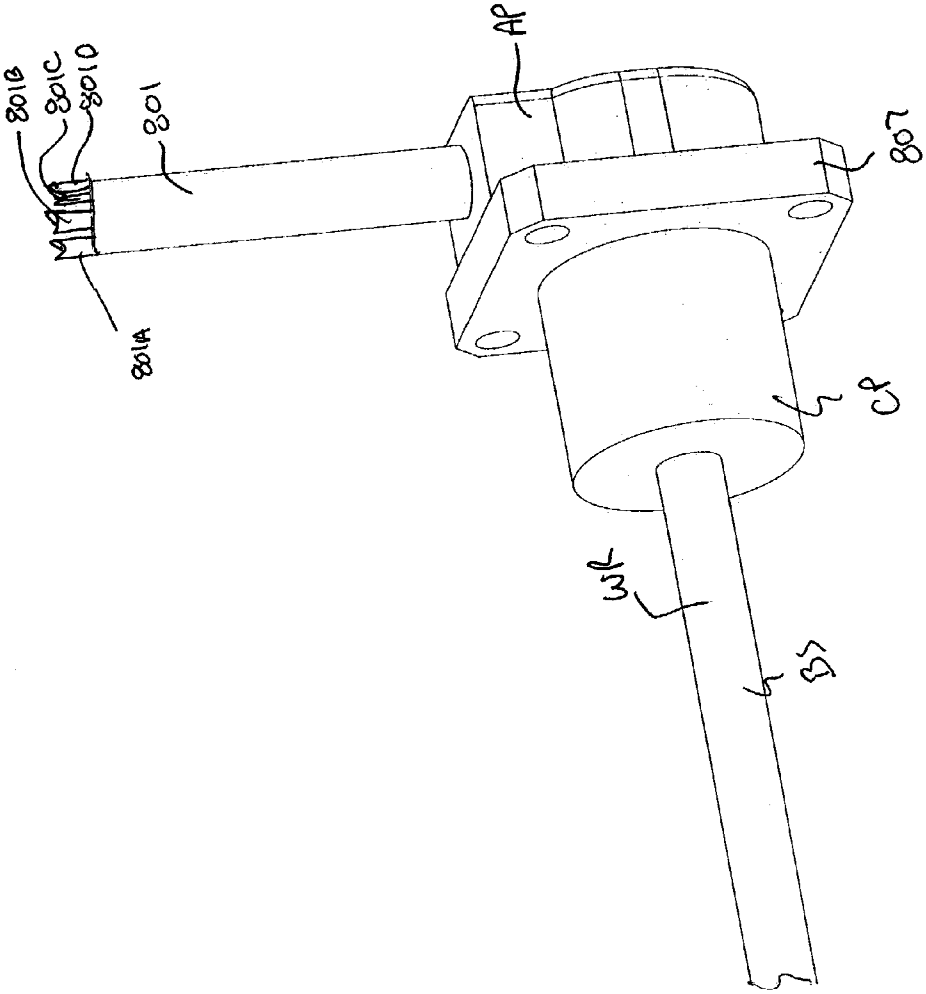

FIG. 109 illustrates the feed through assembly used in the chemical hose heater wire system for introducing electricity to the heater wire across an air/chemical interface.

Figure 109A:
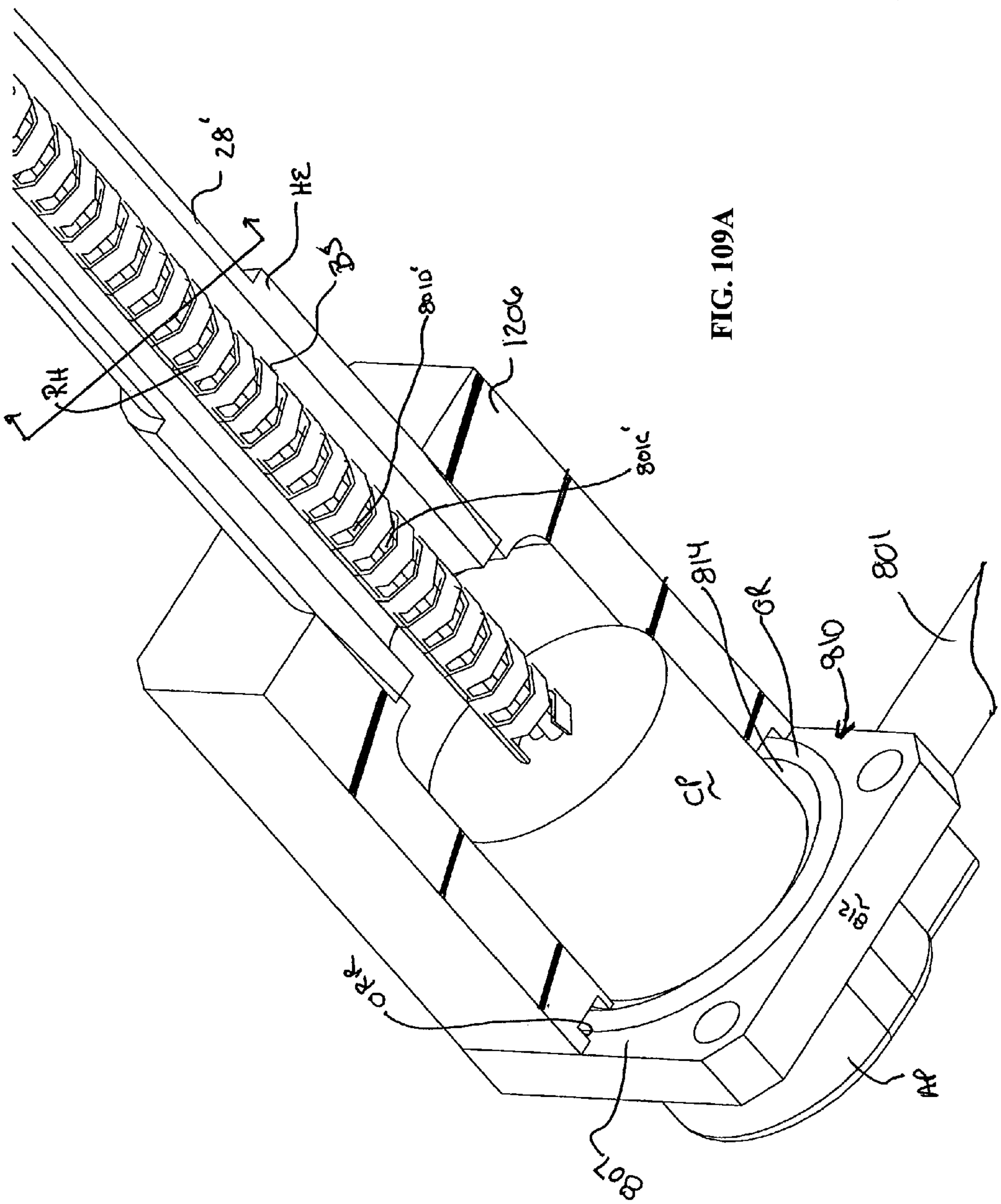

FIG. 109A shows a cut-away view of the feed through assembly.

Figure 109B:
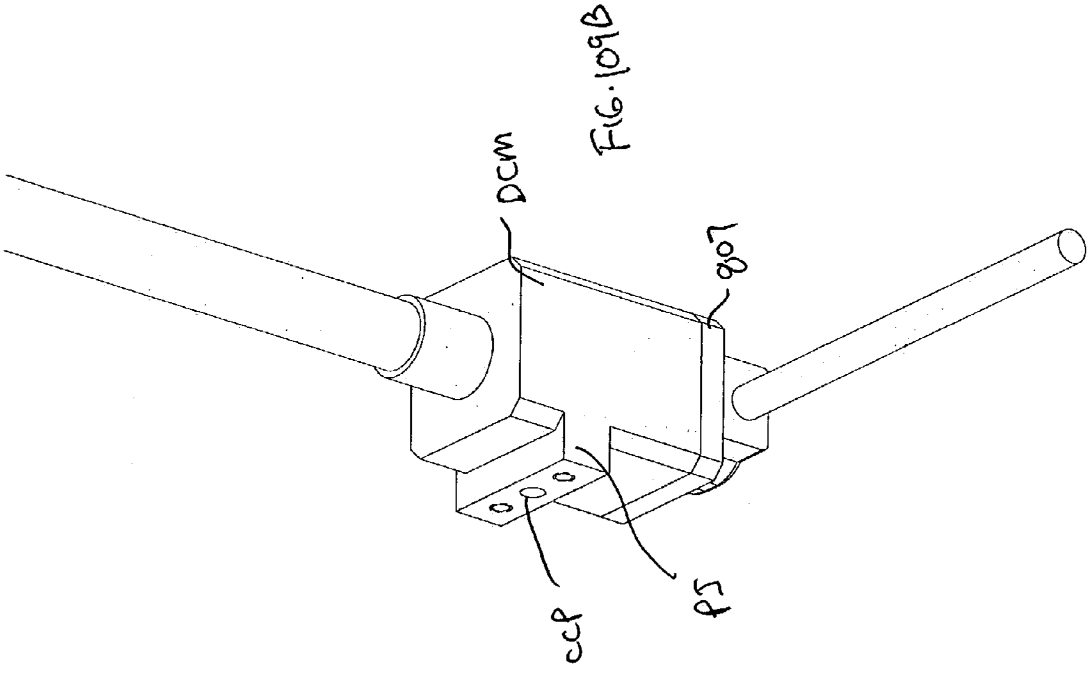

FIG. 109B shows a perspective view of the feed through assembly.

FIG. 109C shows a perspective view of the main manifold and heated chemical hose manifolds in combination.

Figure 110:
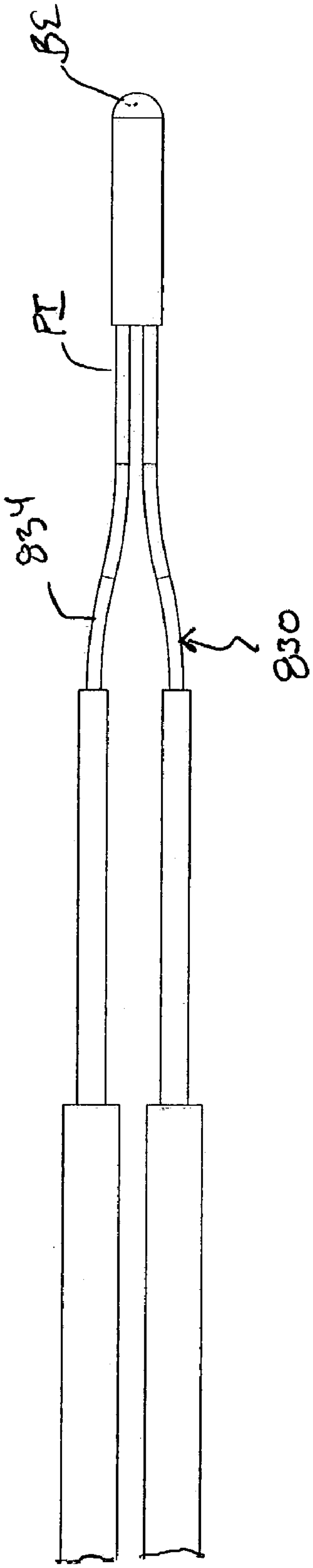

FIG. 110 illustrates a preferred embodiment of the chemical temperature sensing unit which includes a thermister in the illustrated embodiment.

Figure 110A:
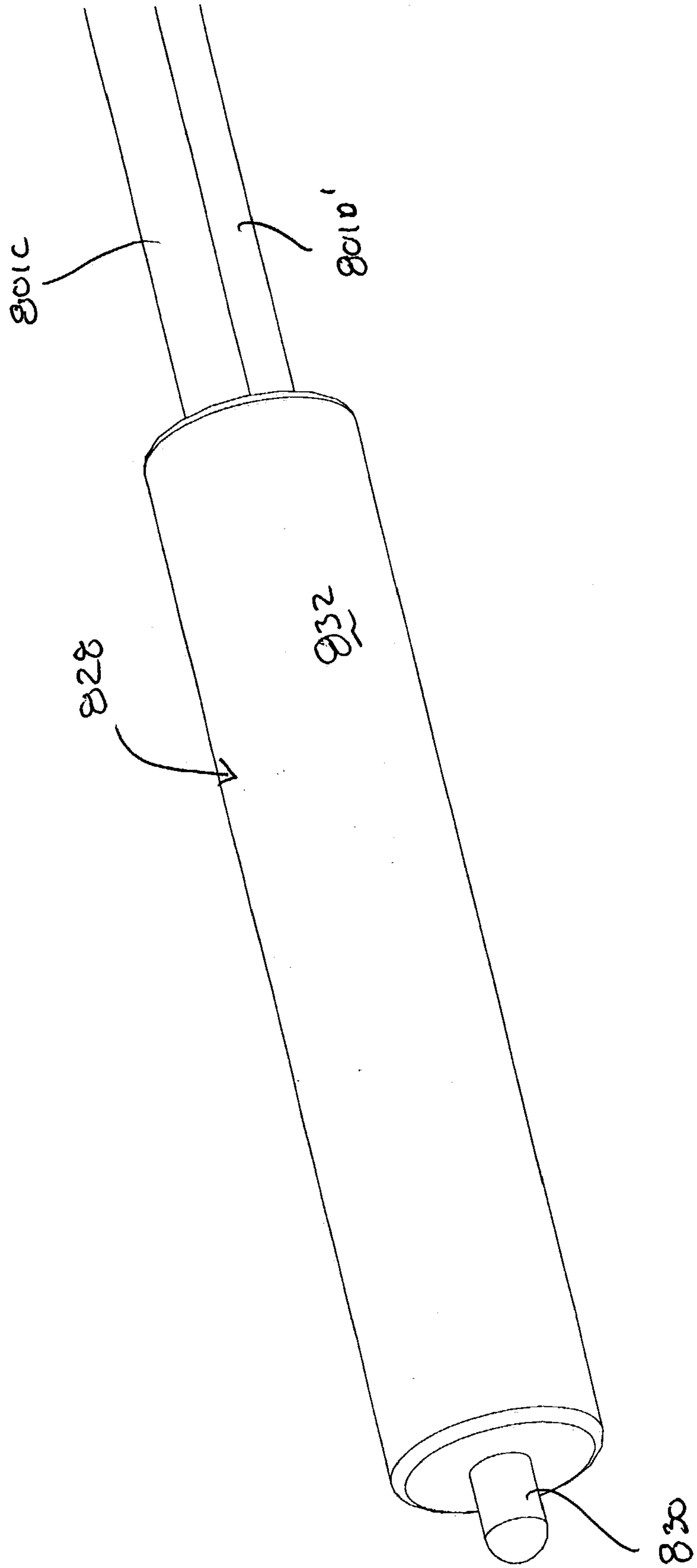

FIG. 110A shows the sensing unit of FIG. 110 encapsulated as part of a chemical conduit sensing device.

Figure 111:
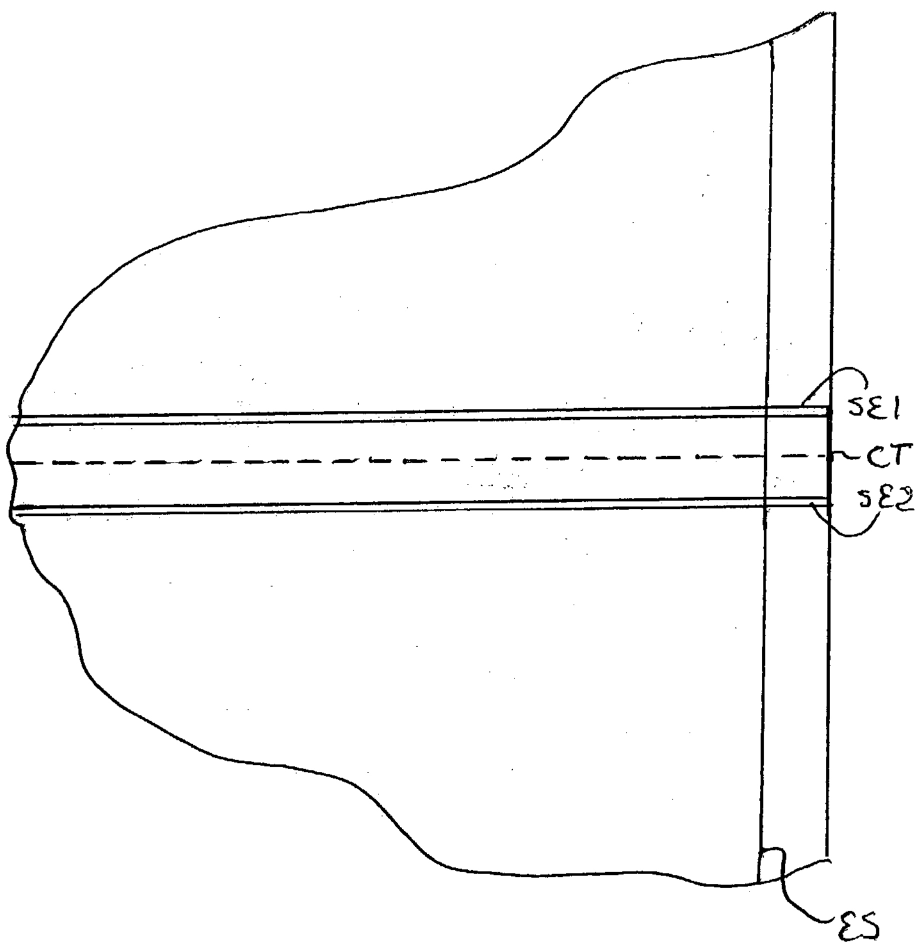

FIG. 111 shows a cut-away view of the seal-cut-seal or SE-CT-SE sequence provided by the end seal forming jaw set assembly.

Figure 112:
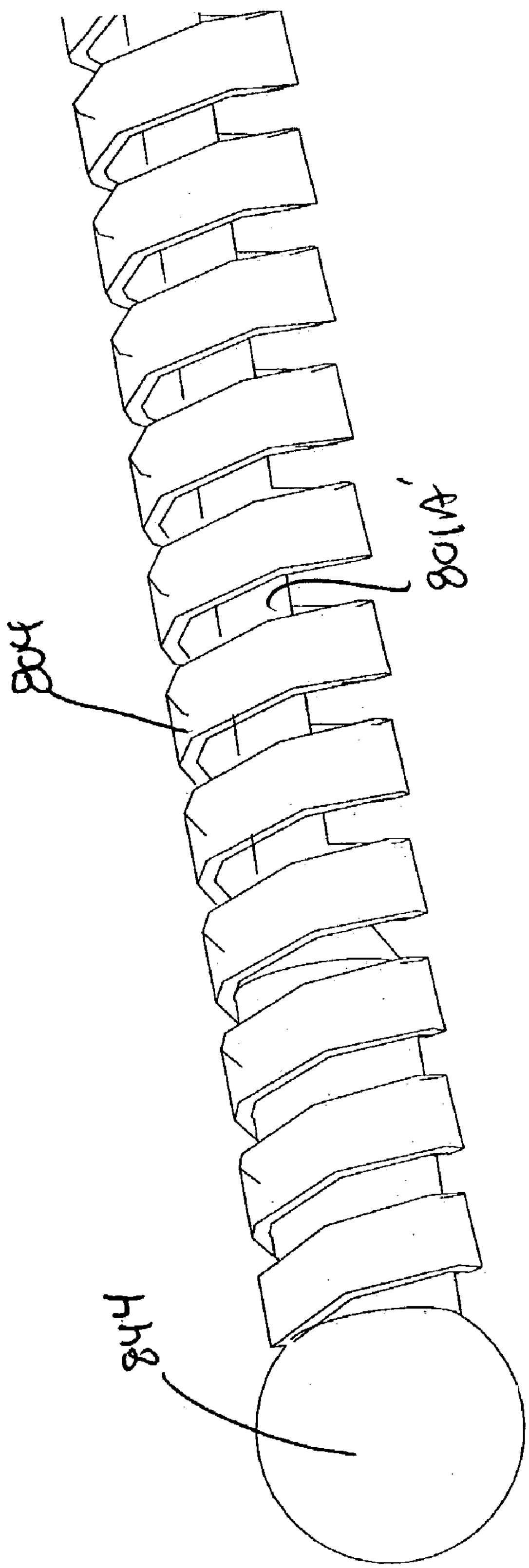

FIG. 112 shows the free end of the coiled chemical hose heater wire having a crimped "true" ball end for threaded insertion of the heater wire into the chemical hose.

Figure 113:
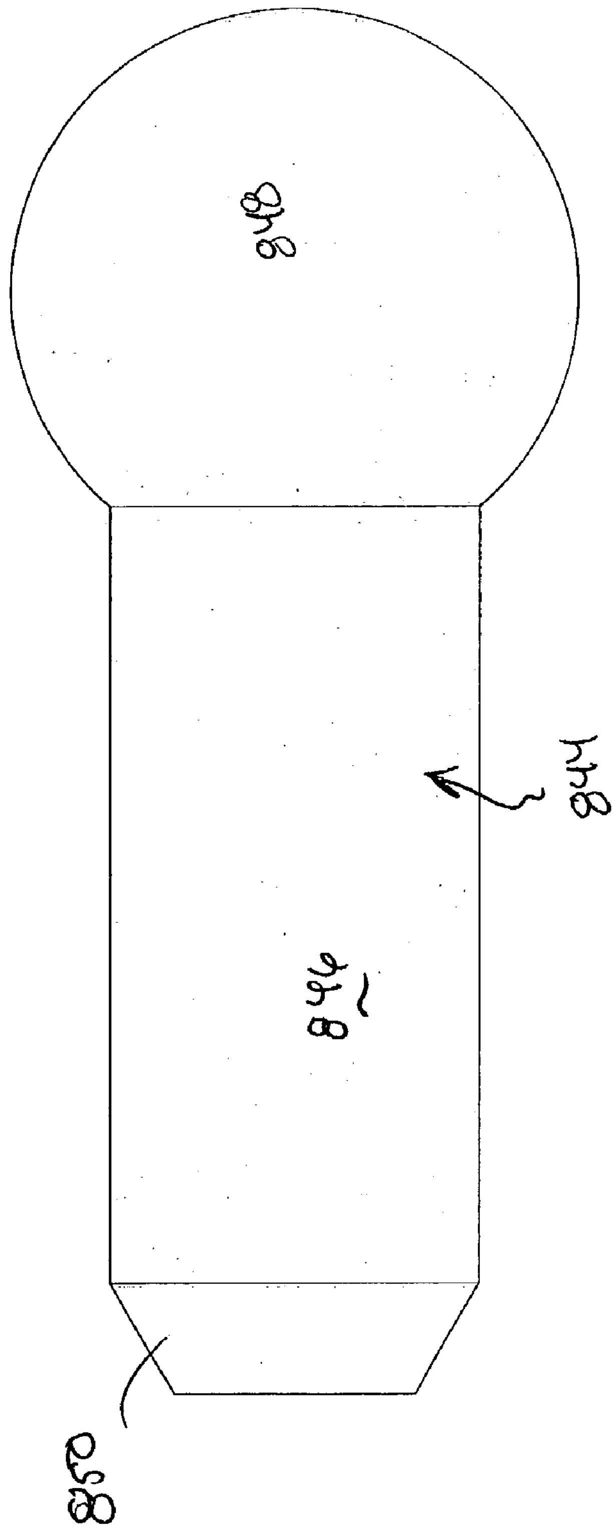

FIG. 113 shows the threading tip means of the present invention alone.

Figure 113A:
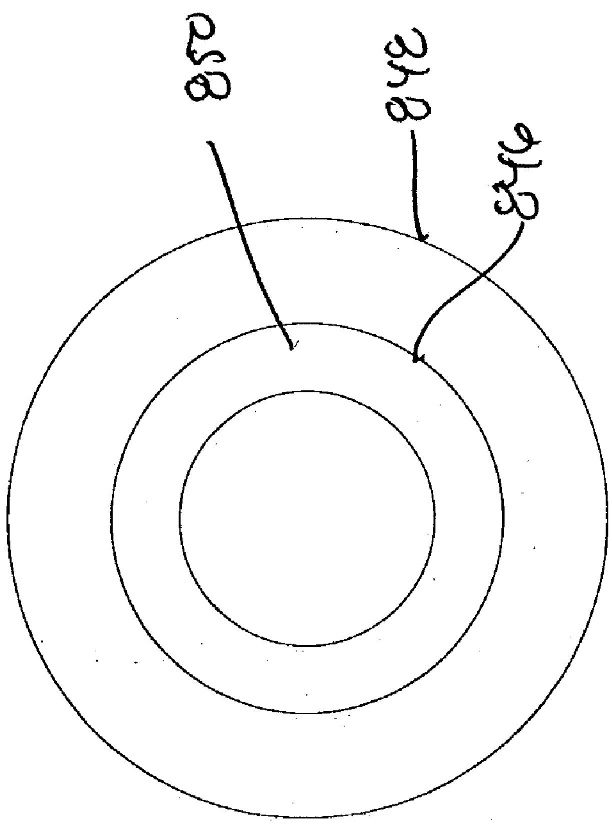

FIG. 113A shows an end view of the tip shown in FIG. 113.

Figure 114:
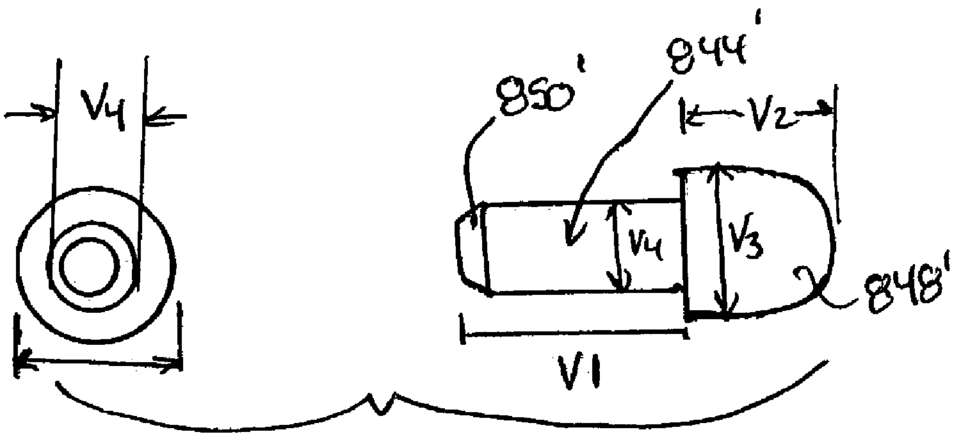

FIG. 114 shows a side view of the tip used on the second tip embodiment.

Figure 115:
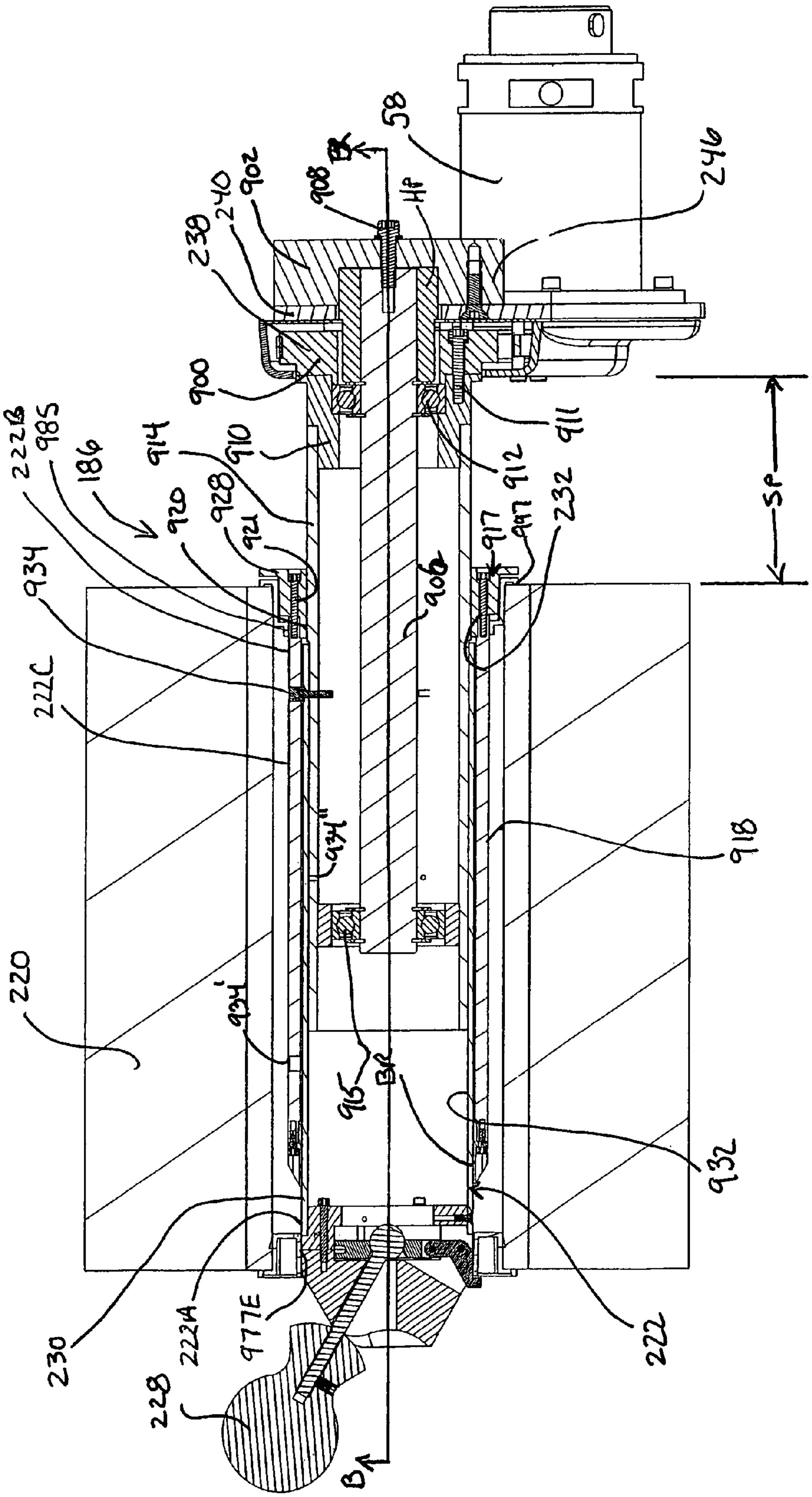
Figure 116:
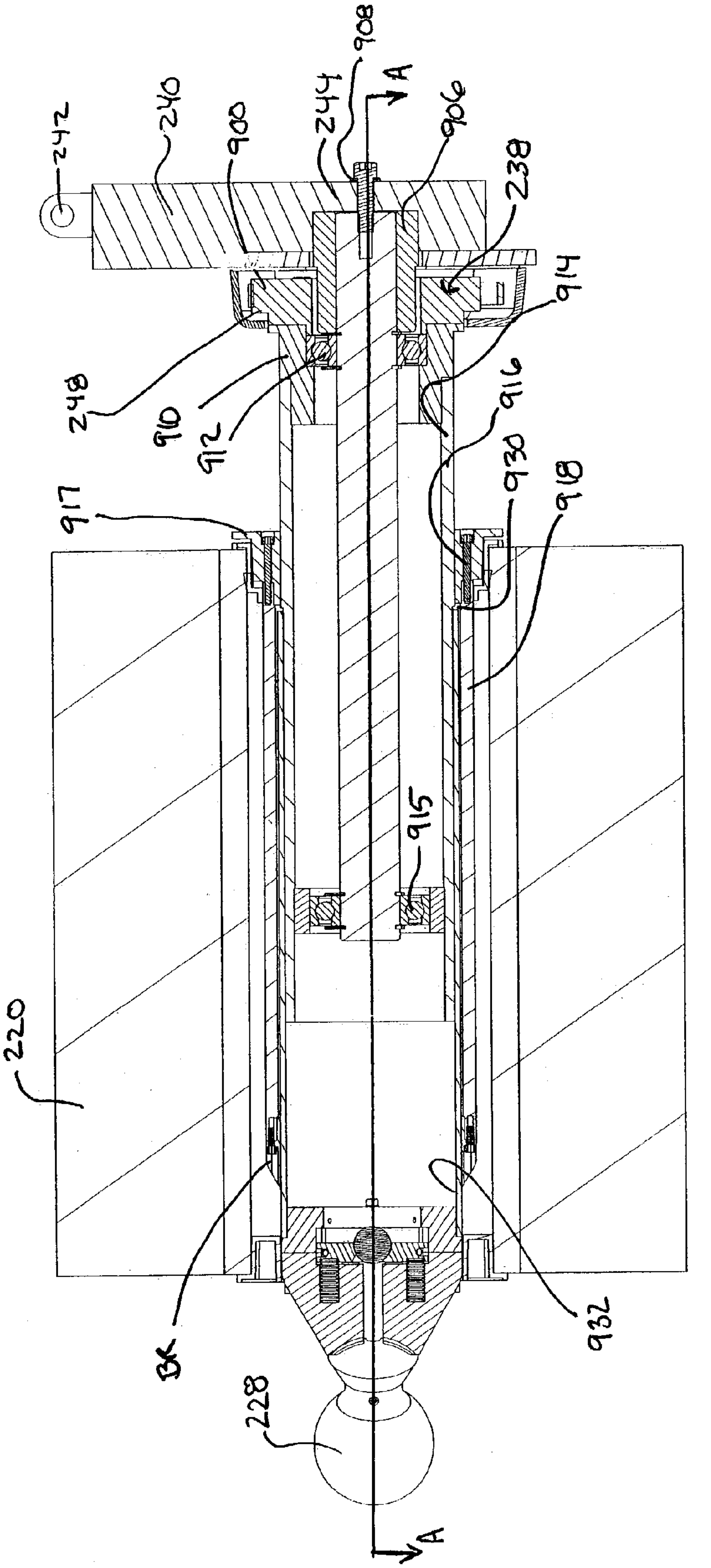

FIG. 115 shows a cross-sectional view of the spindle with spline drive assembly of the present invention taken along cross-section line A-A in FIG. 116.

FIG. 116 shows a cross-sectional view of the spindle with spline drive assembly taken along cross-section line B-B in FIG. 115.

Figure 117:
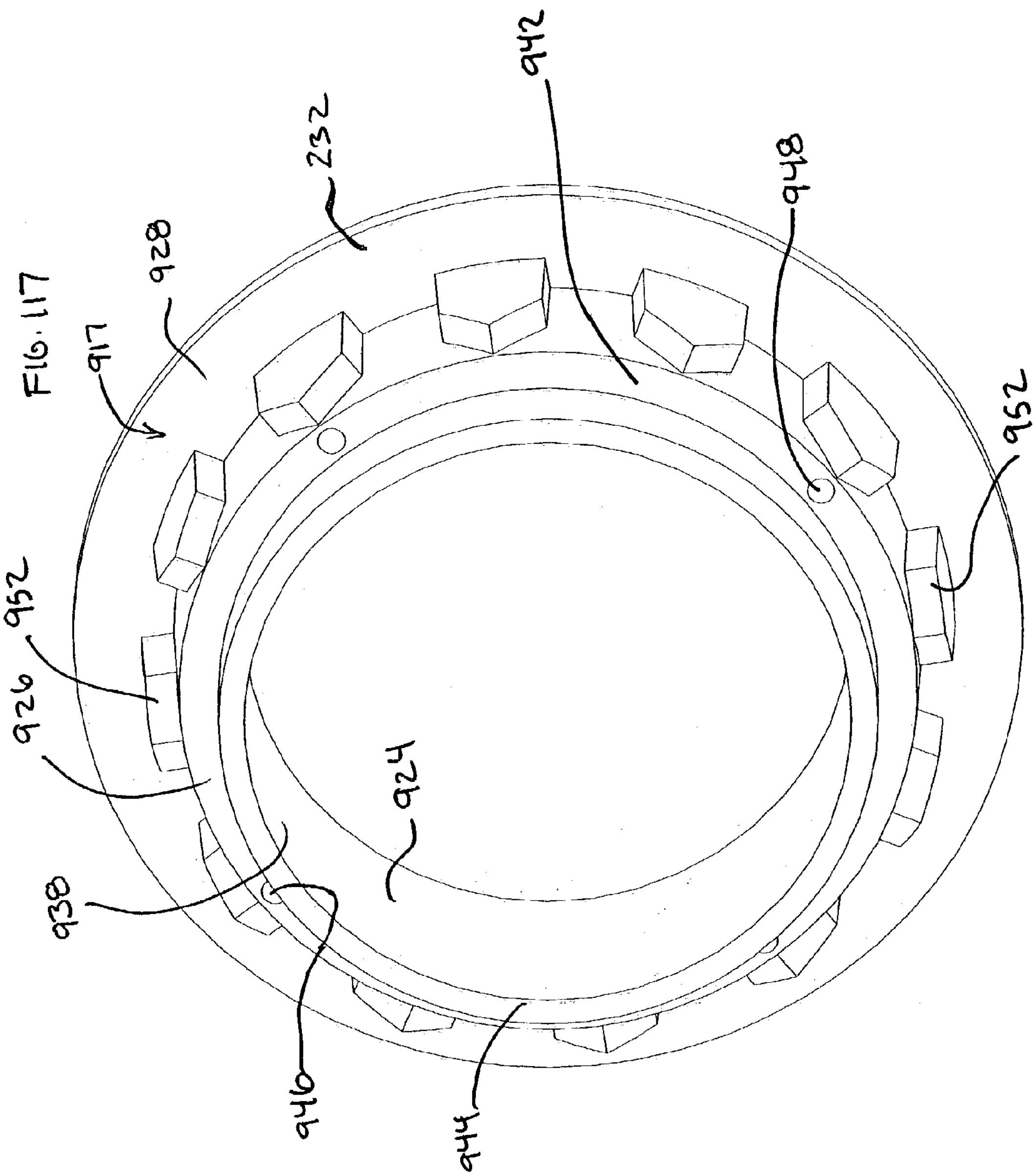

FIG. 117 shows a perspective view of the spindle spline drive or engagement member of the spindle spline drive assembly with emphases on the tooth drive side.

Figure 118:
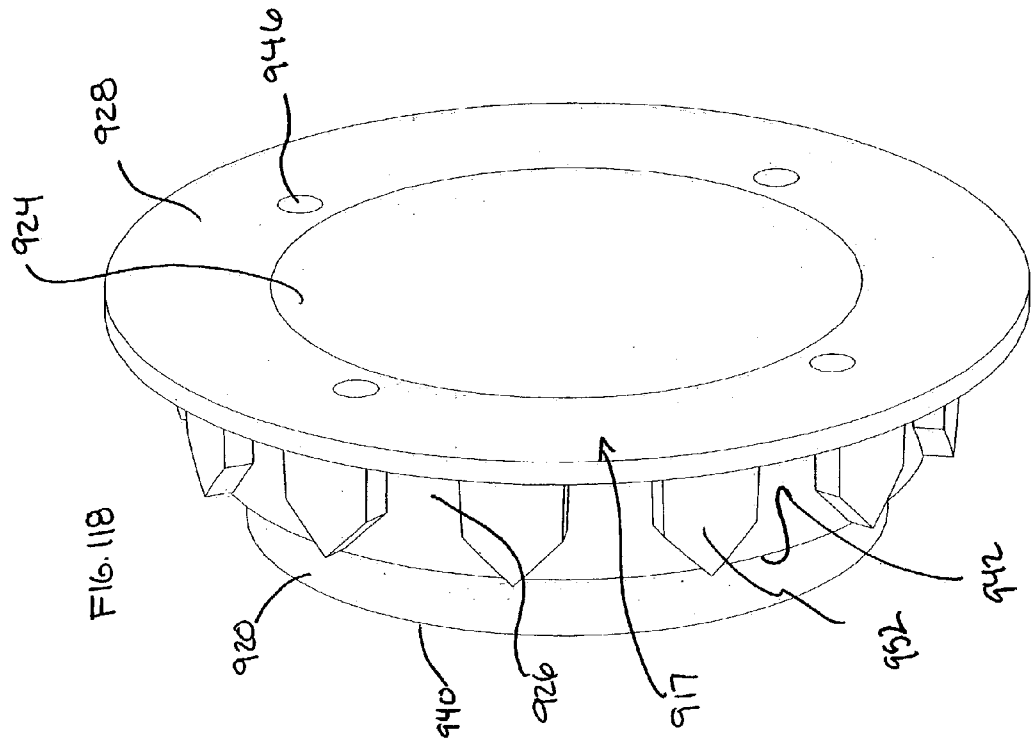

FIG. 118 shows a perspective view of the spindle spline drive with emphasis on the non-roll contact side.

Figure 119:
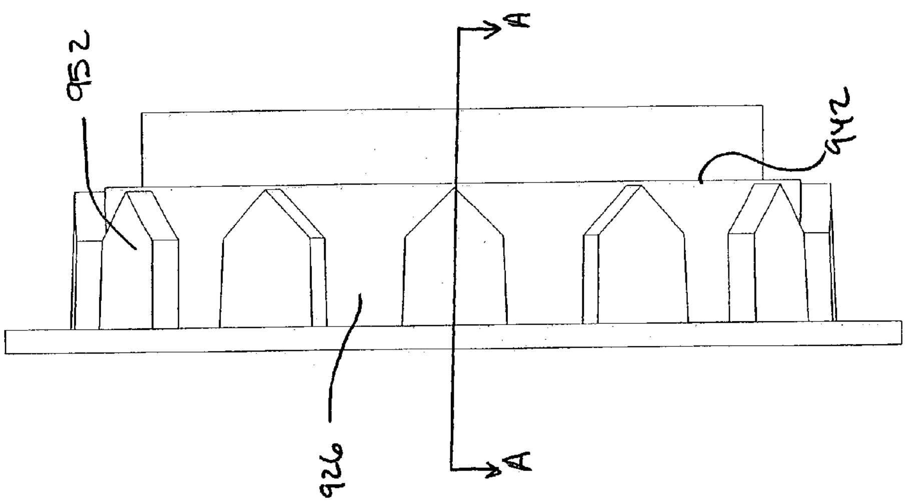

FIG. 119 provides a side elevational view of the spindle spline drive's engagement member.

Figure 120:
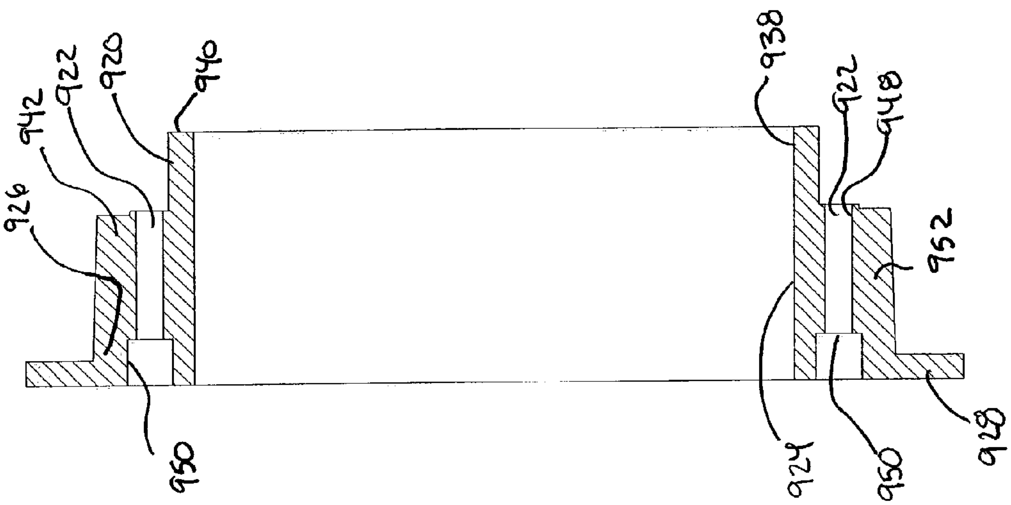

FIG. 120 shows a cross-sectional view taken along A-A in FIG. 119.

Figure 121:
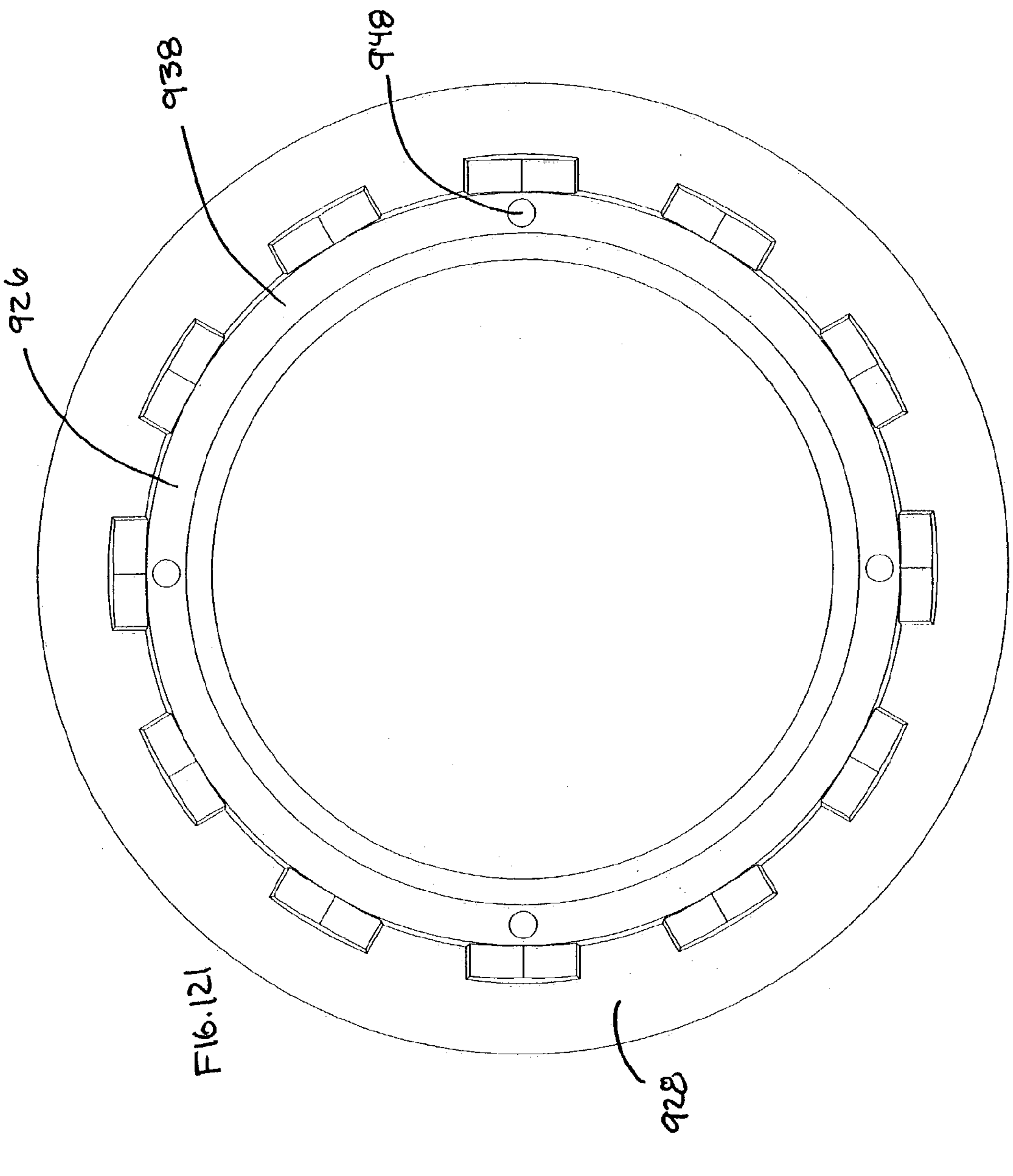

FIG. 121 provide a front elevational view of the spindle spline drive from the roll facing side.

Figure 122:
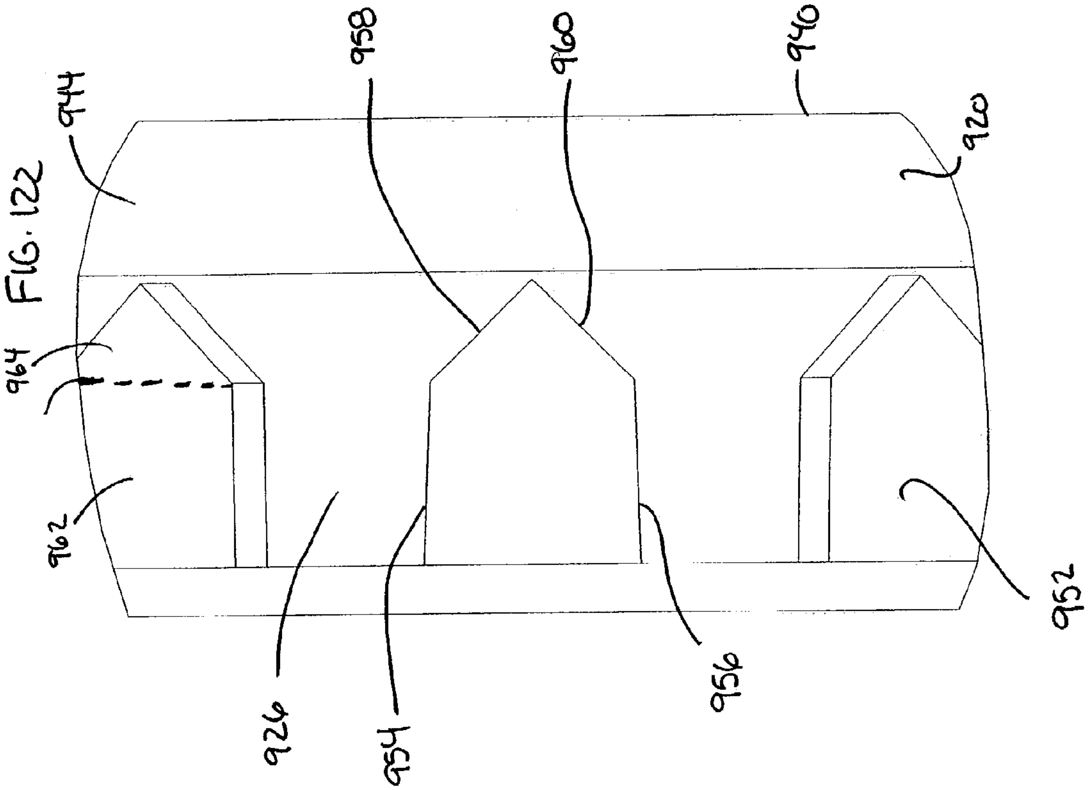

FIG. 122 provides an enlarged view of a section of FIG. 119.

Figure 123:
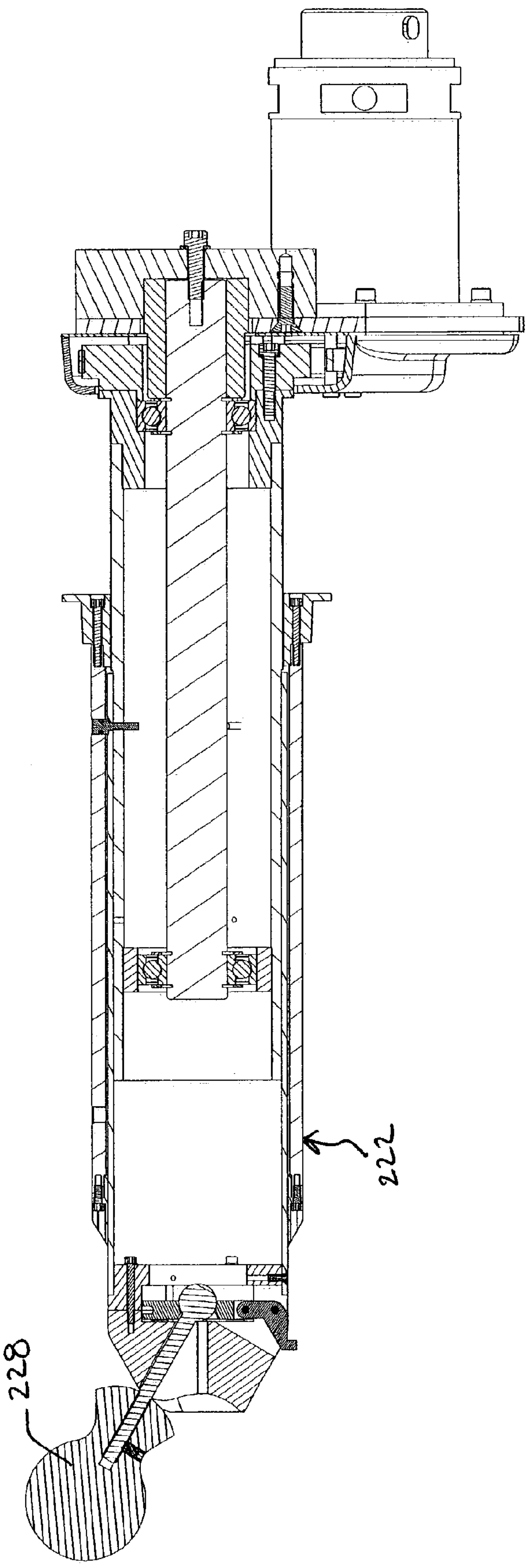
Figure 124:
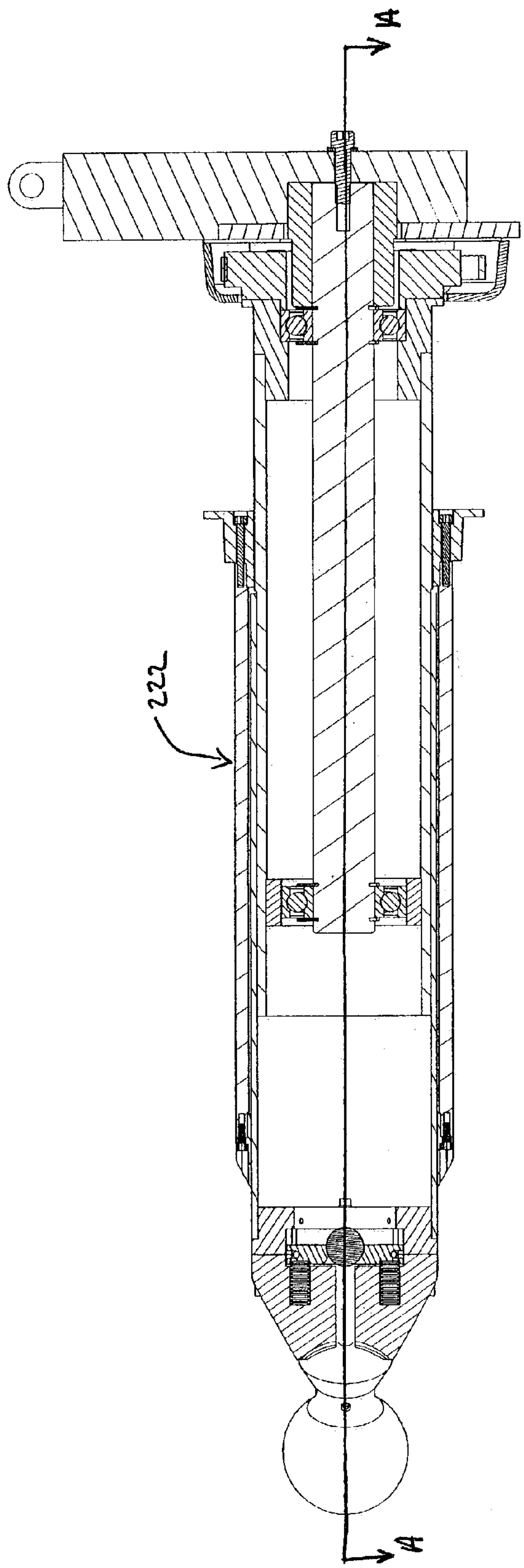

FIG. 123 shows a cross-sectional view of a compacted version of the spindle or film support means set for handling shorter width films taken along cross-section line A-A in FIG. 124.

FIG. 124 shows a cross-sectional view taken along cross-section line B-B in FIG. 123.

Figure 125:
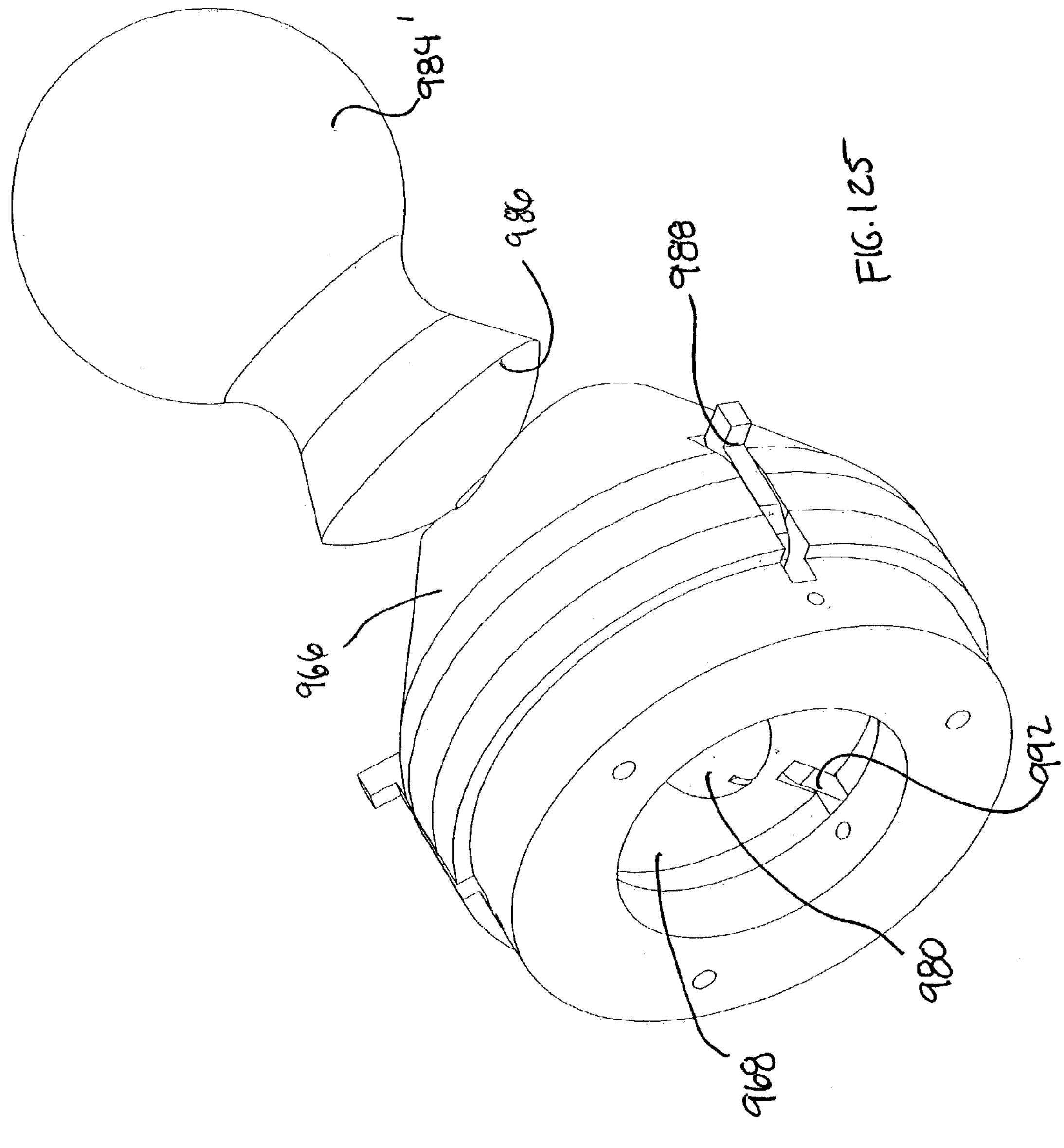

FIG. 125 shows a perspective view of the roll latch mechanism in a locked state.

Figure 126:
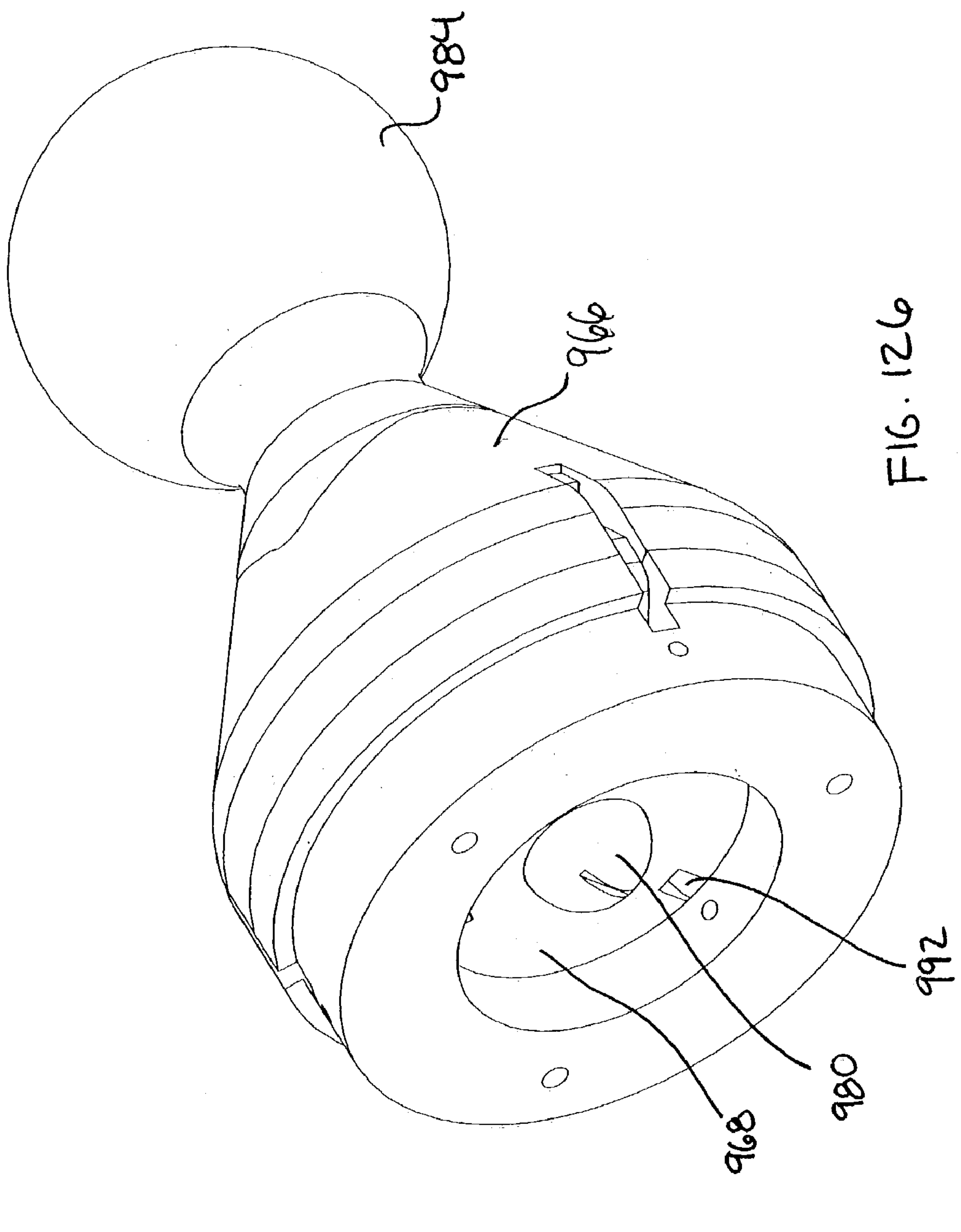

FIG. 126 shows the roll latch mechanism in an unlocked state.

Figure 127:
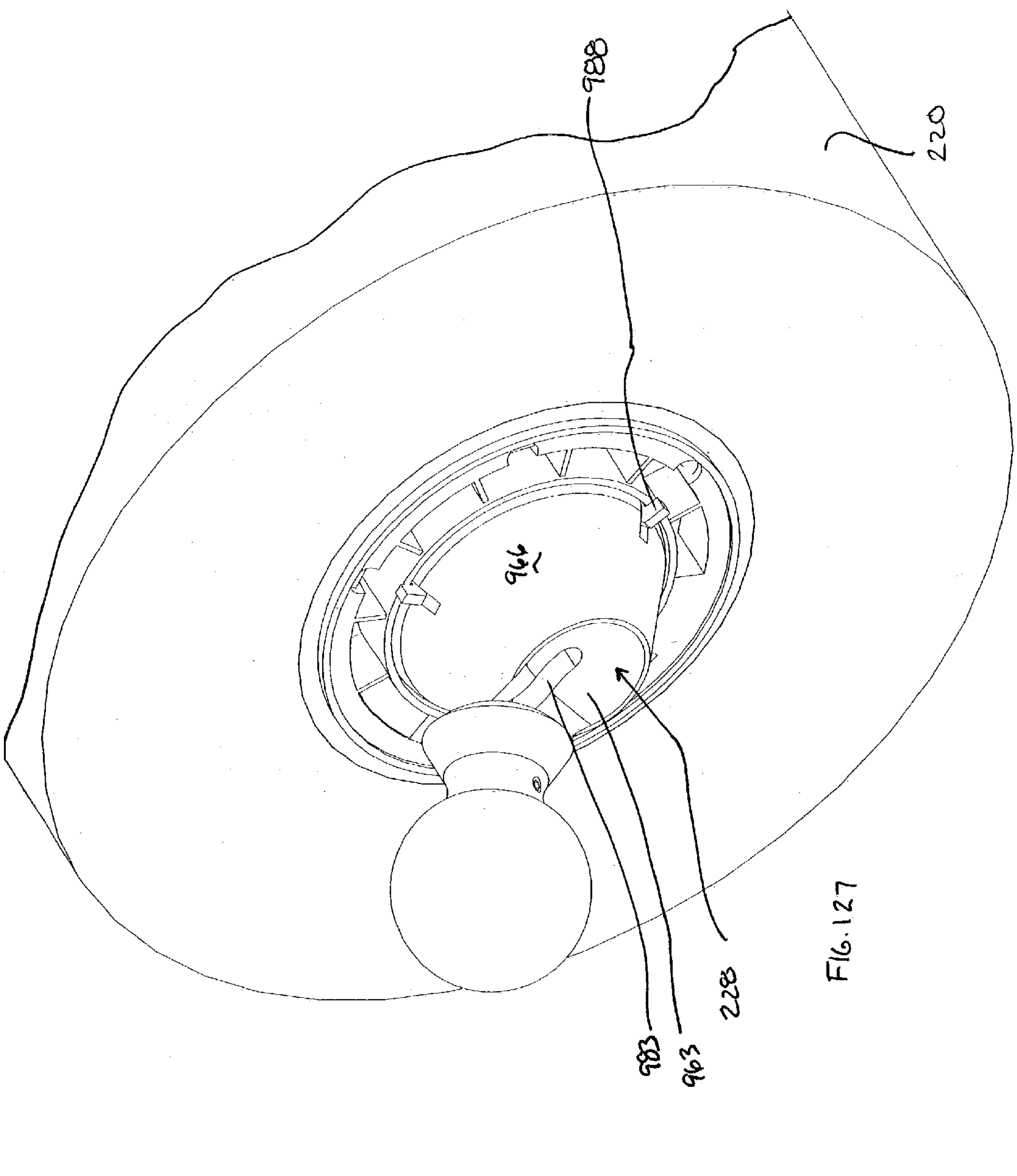

FIG. 127 shows the roll latch mechanism in operation locking a roll of film.

Figure 128:
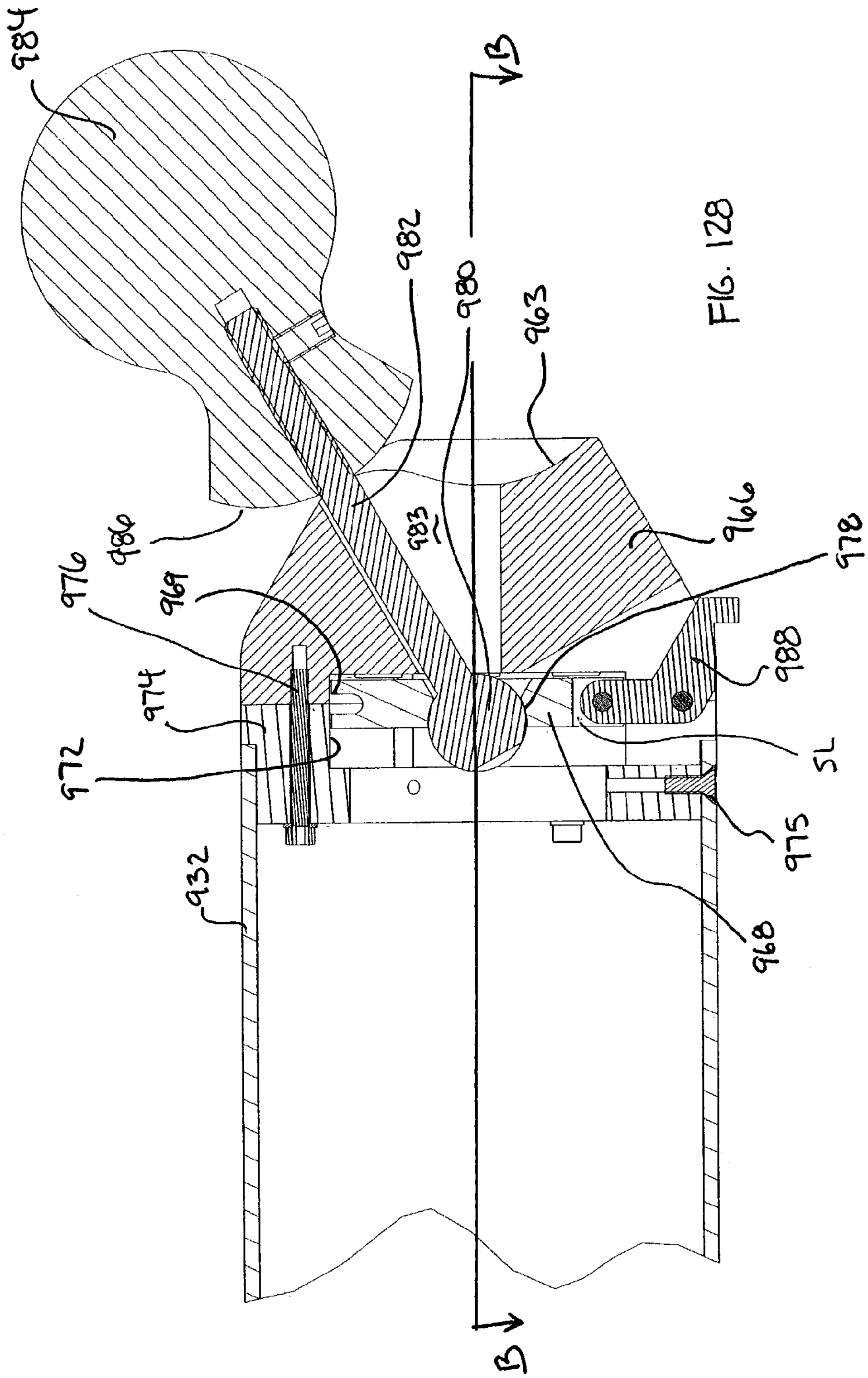
Figure 129:
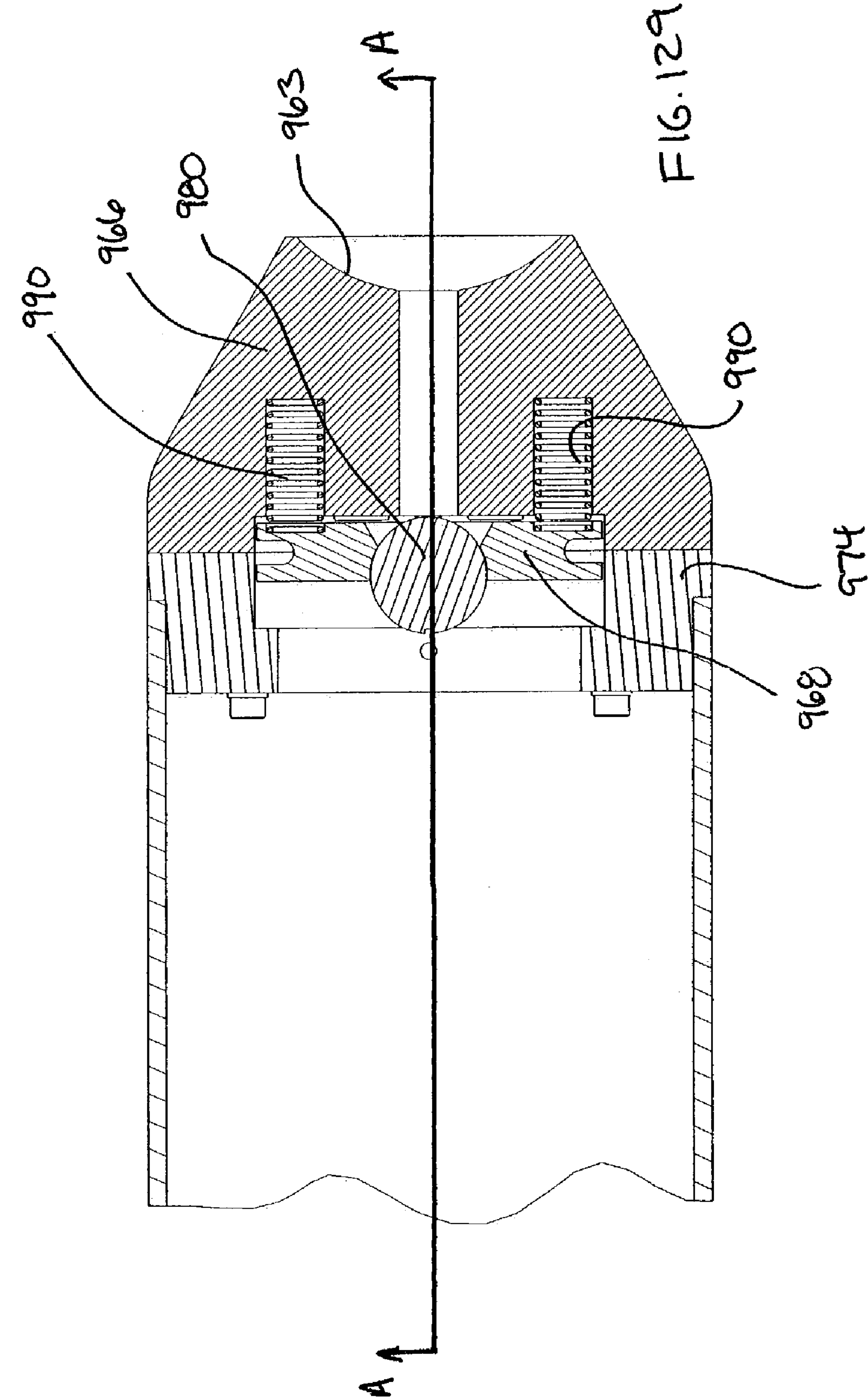

FIG. 128 shows a cross-sectional view of the roll latch mechanism taken along cross-section A-A line in FIG. 129.

FIG. 129 shows a cross-sectional view of the roll latch mechanism taken along cross-sectional line B-B in FIG. 128.

Figure 130:
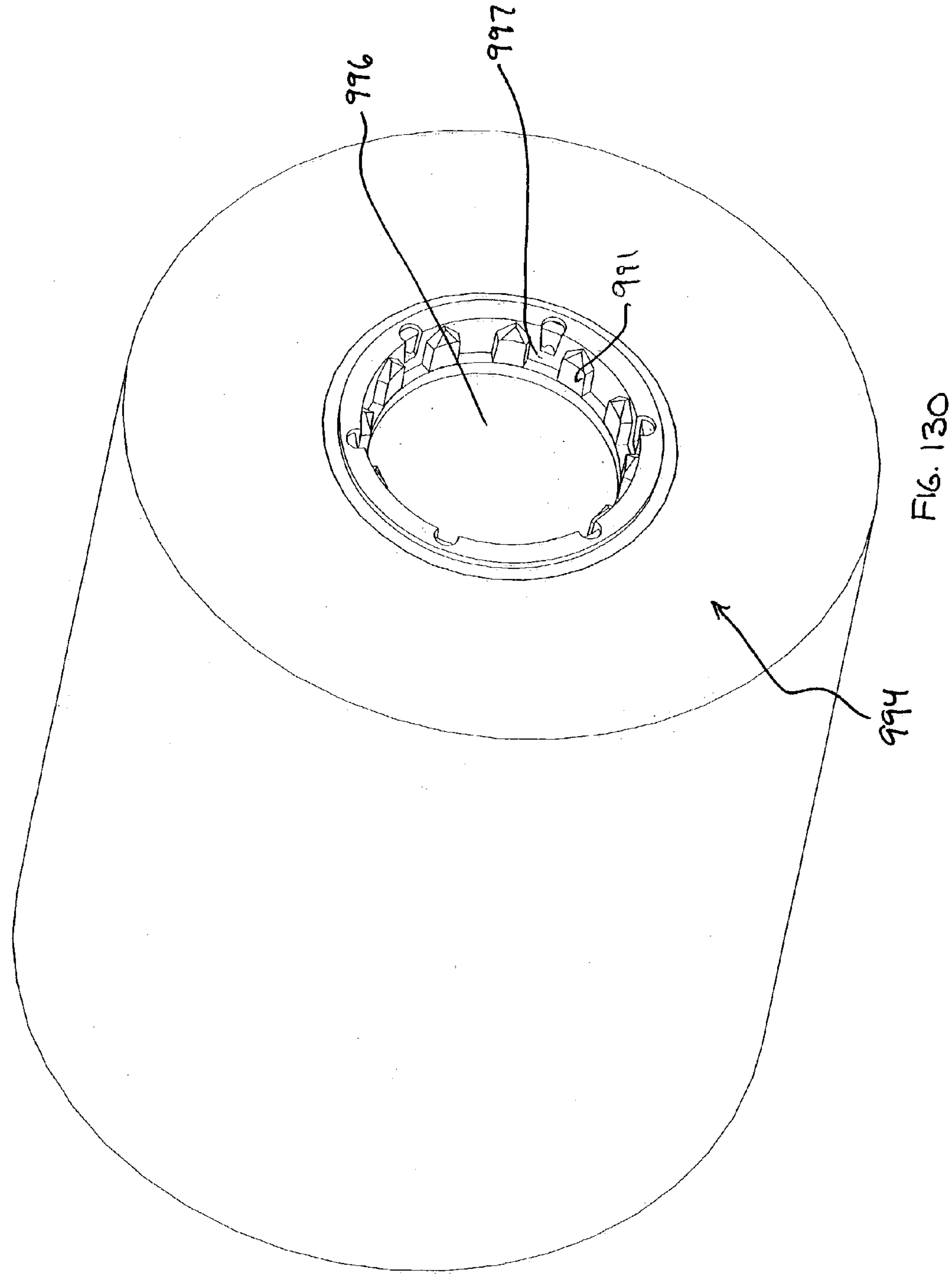

FIG. 130 shows a perspective view of a film roll with core and opposite end core plugs or inserts.

Figure 131:
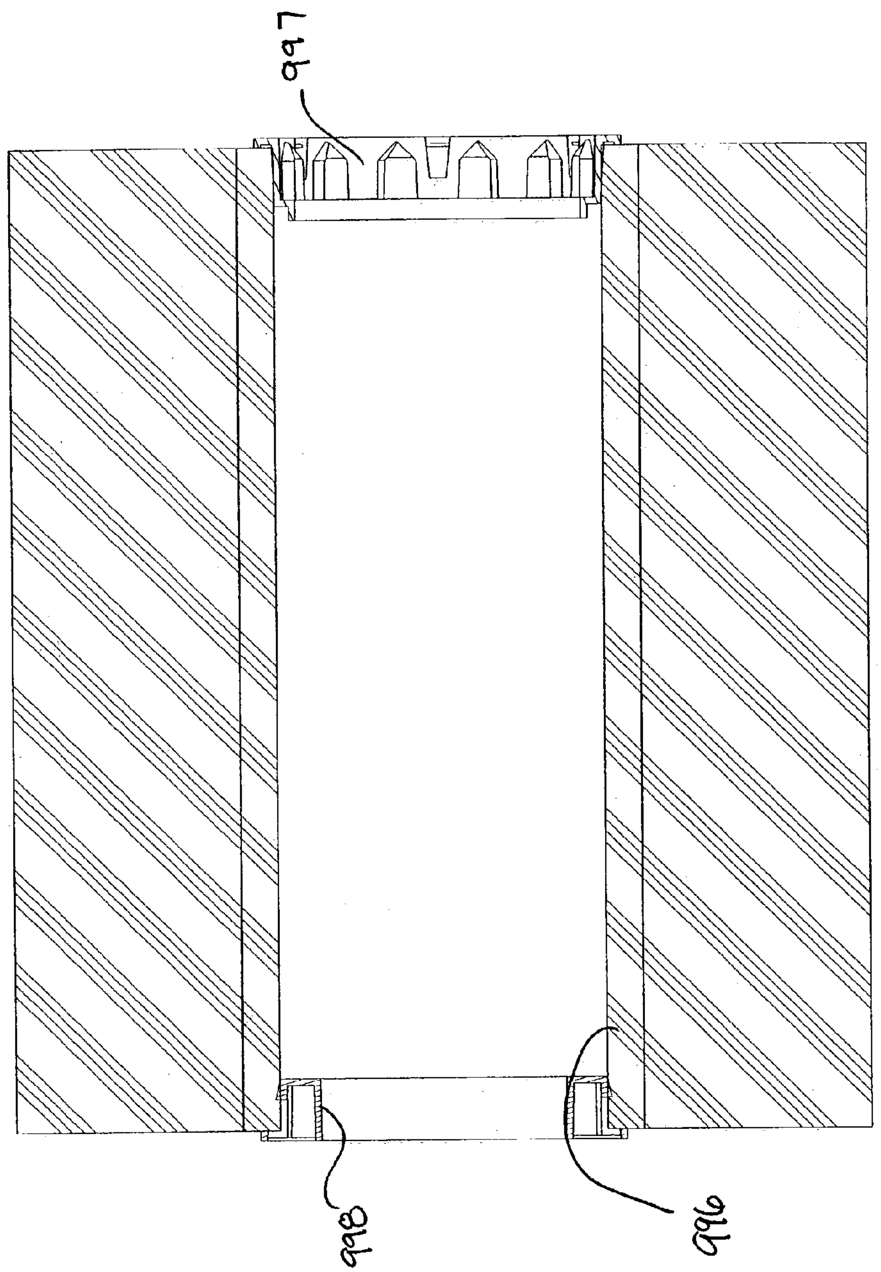

FIG. 131 show a cross-sectional view of FIG. 130.

FIG. 132, 133, 134 and 134A provide varying views of the roll film drive core plug.

FIG. 135, 136, 137 and 138 provide various views of the roll film non-drive support plug.

Figure 139:
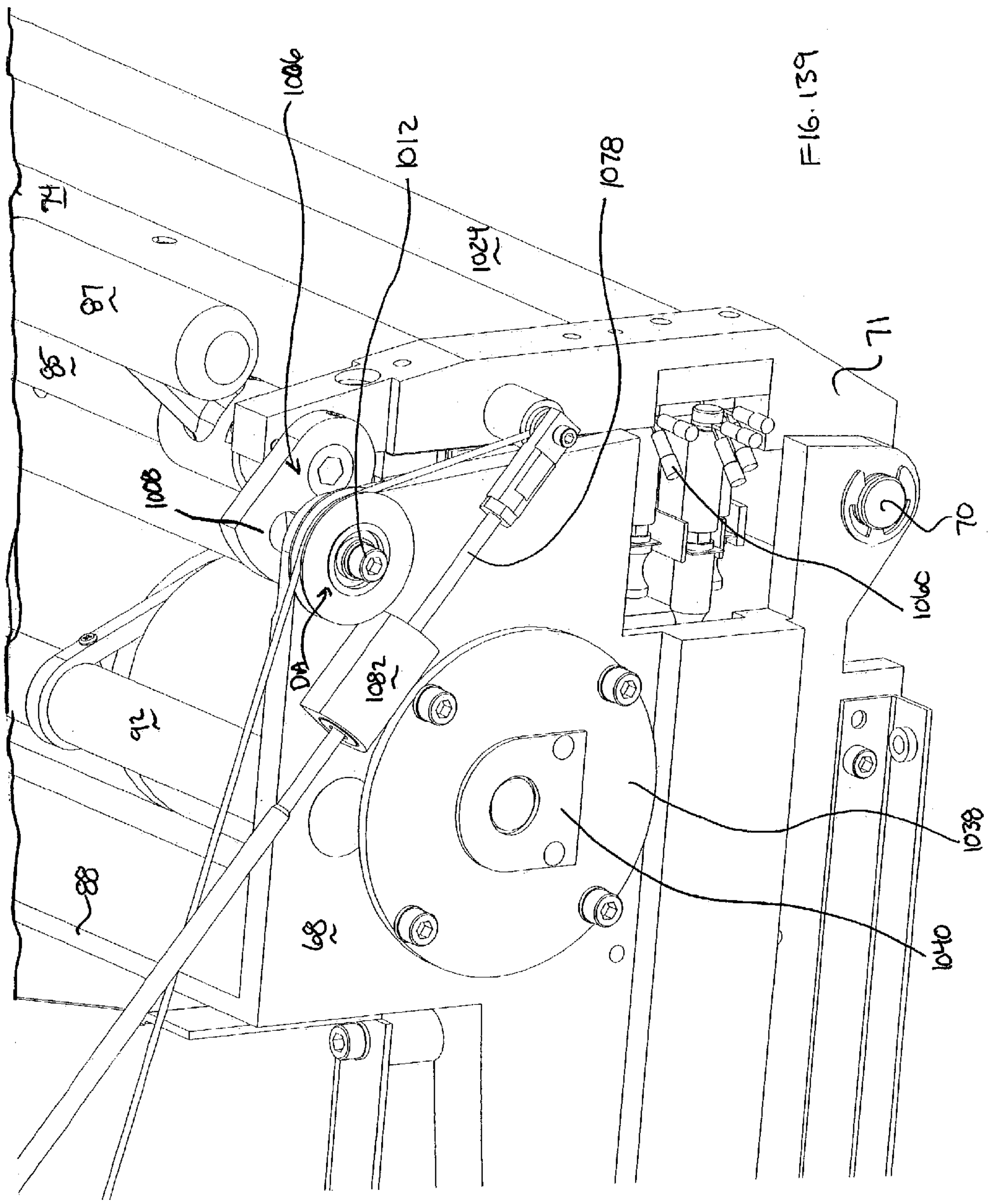

FIG. 139 provides a cut-away, enlarged view of the roller set assembly and door latch assembly for the front access panel.

Figure 140:
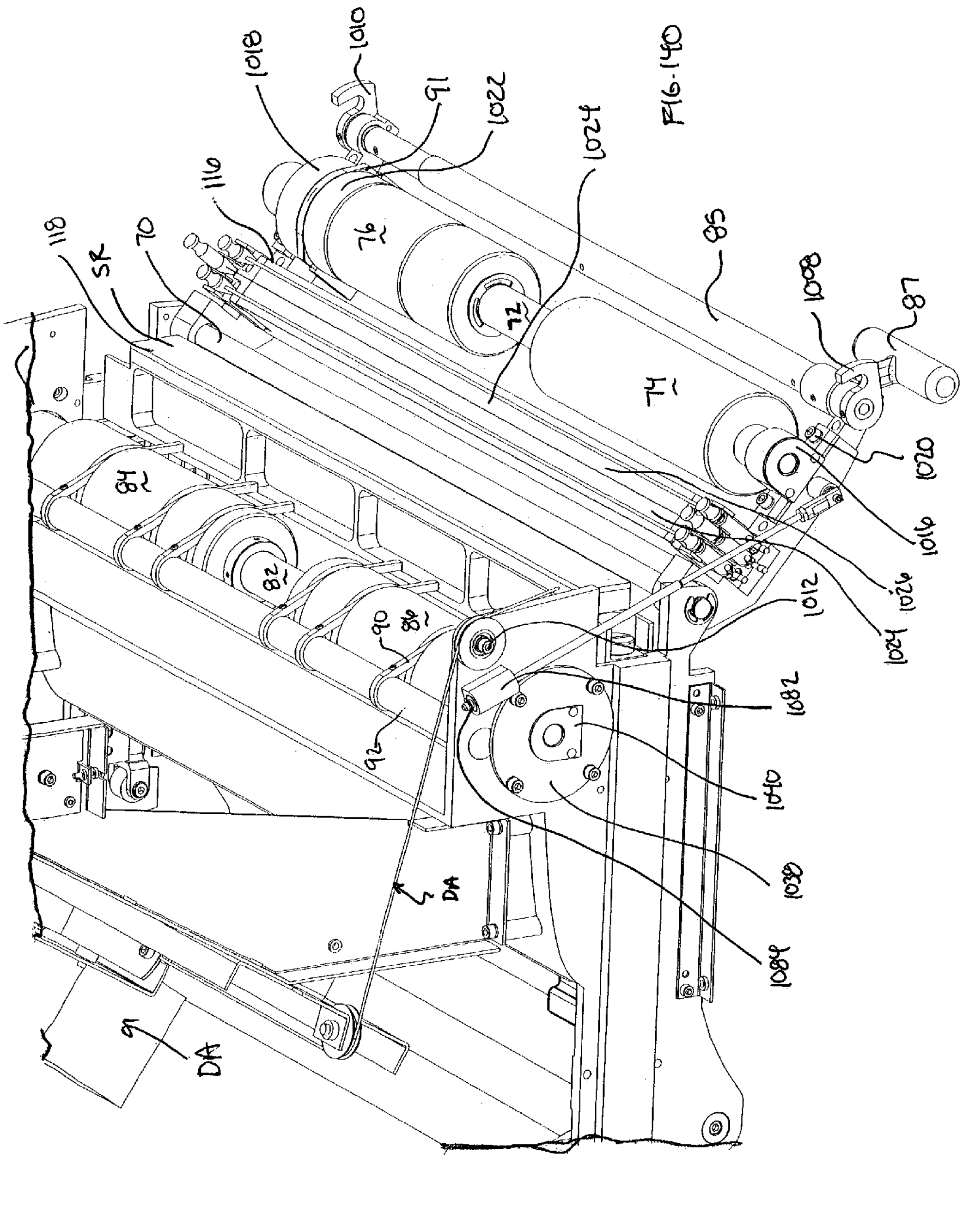

FIG. 140 shows a view of the front access panel in an open state.

Figure 141:
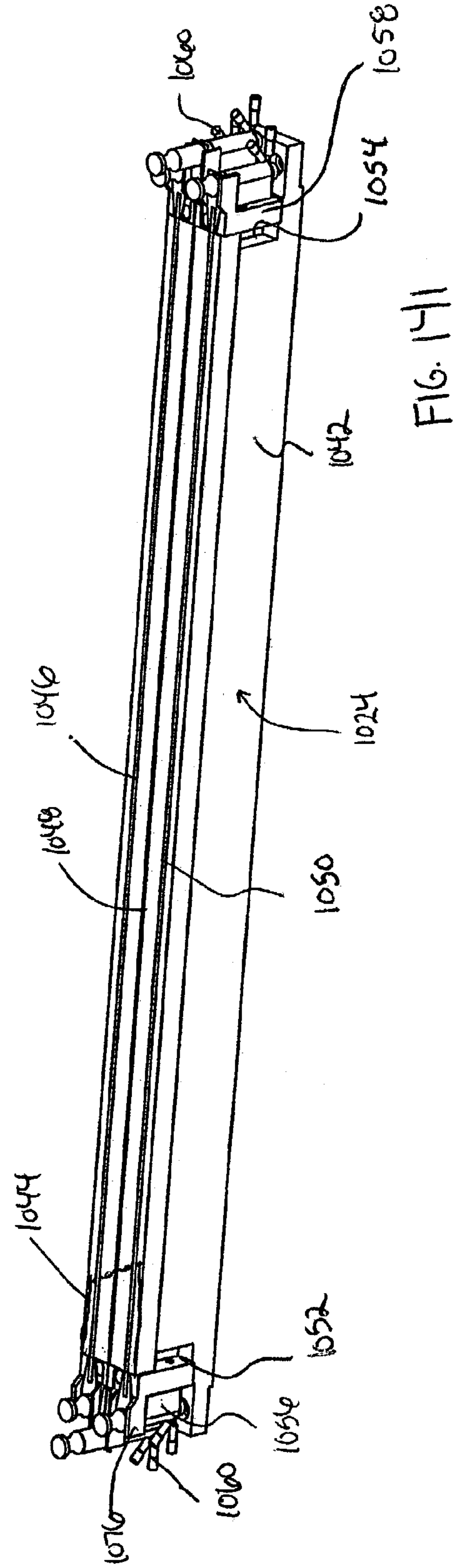

FIG. 141 shows the heater jaw assembly.

Figure 142:
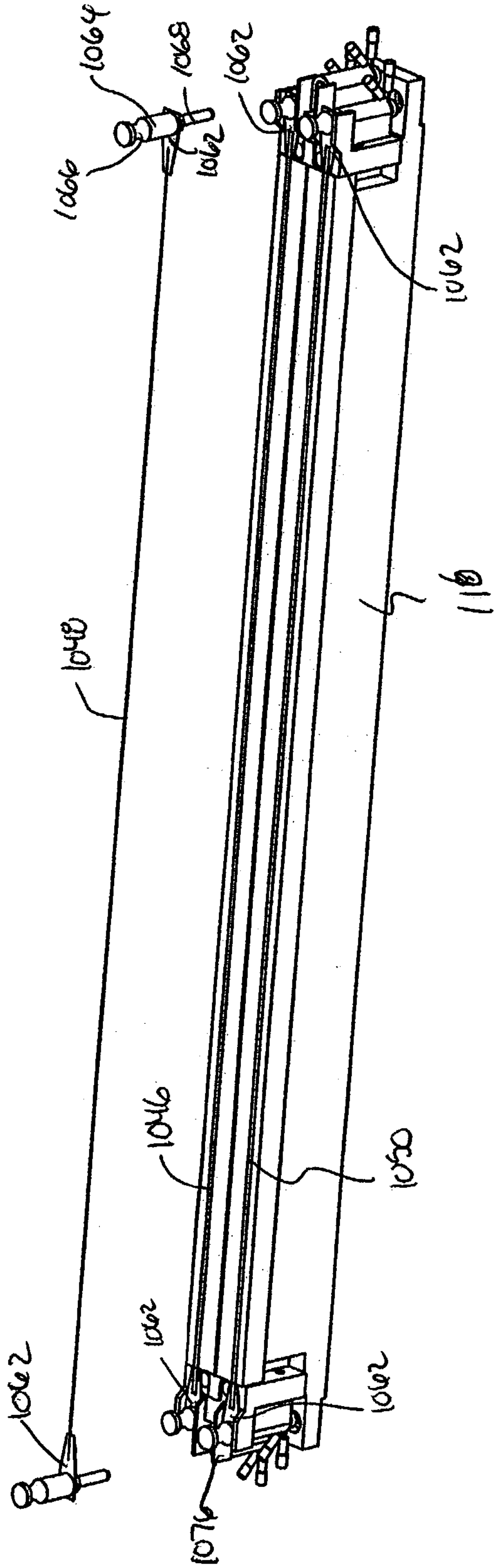

FIG. 142 shows the same view of FIG. 141 but with one of the heater jaw heater wires removed.

Figure 143:
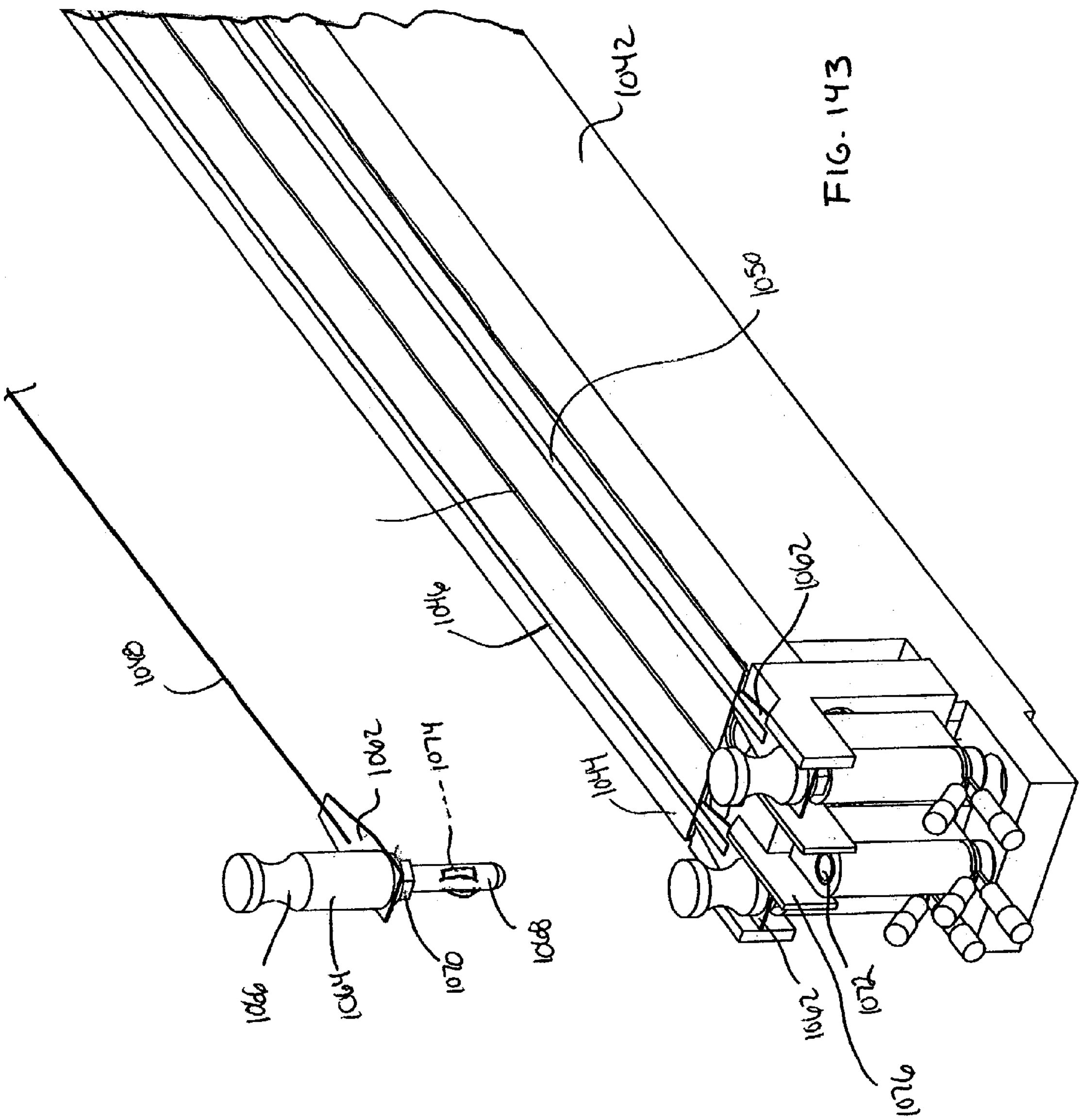

FIG. 143 shows an enlarged view of the left end of FIG. 142.

Figure 144:
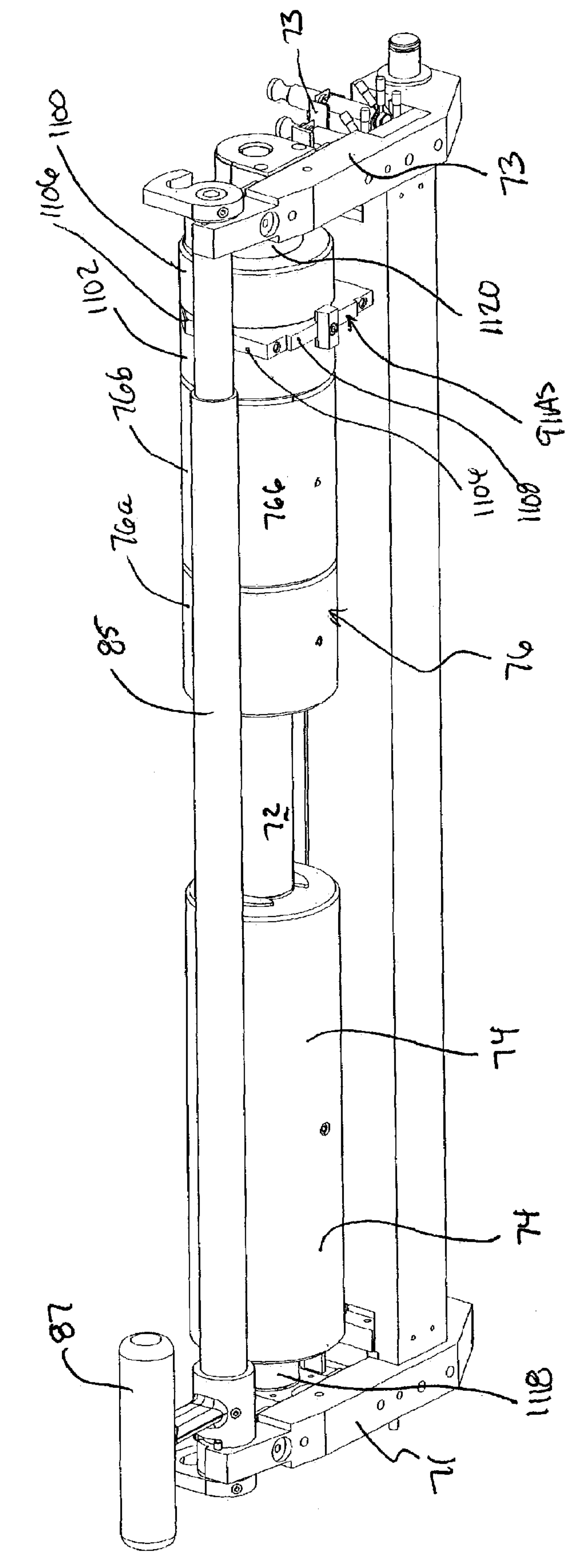

FIG. 144 shows the assembly support by the front panel frame sections.

Figure 145:
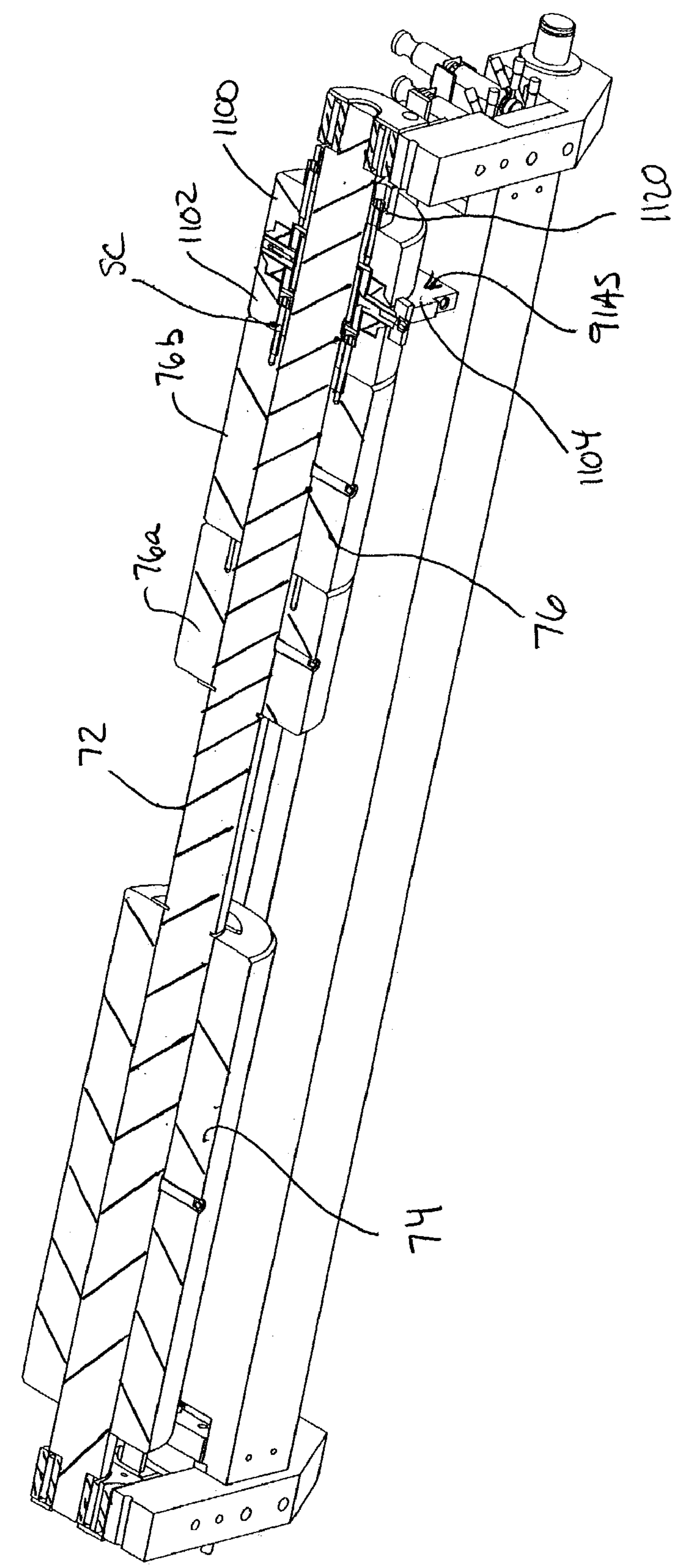

FIG. 145 shows a cross-sectional view of the roller assembly of FIG. 144.

Figure 146:
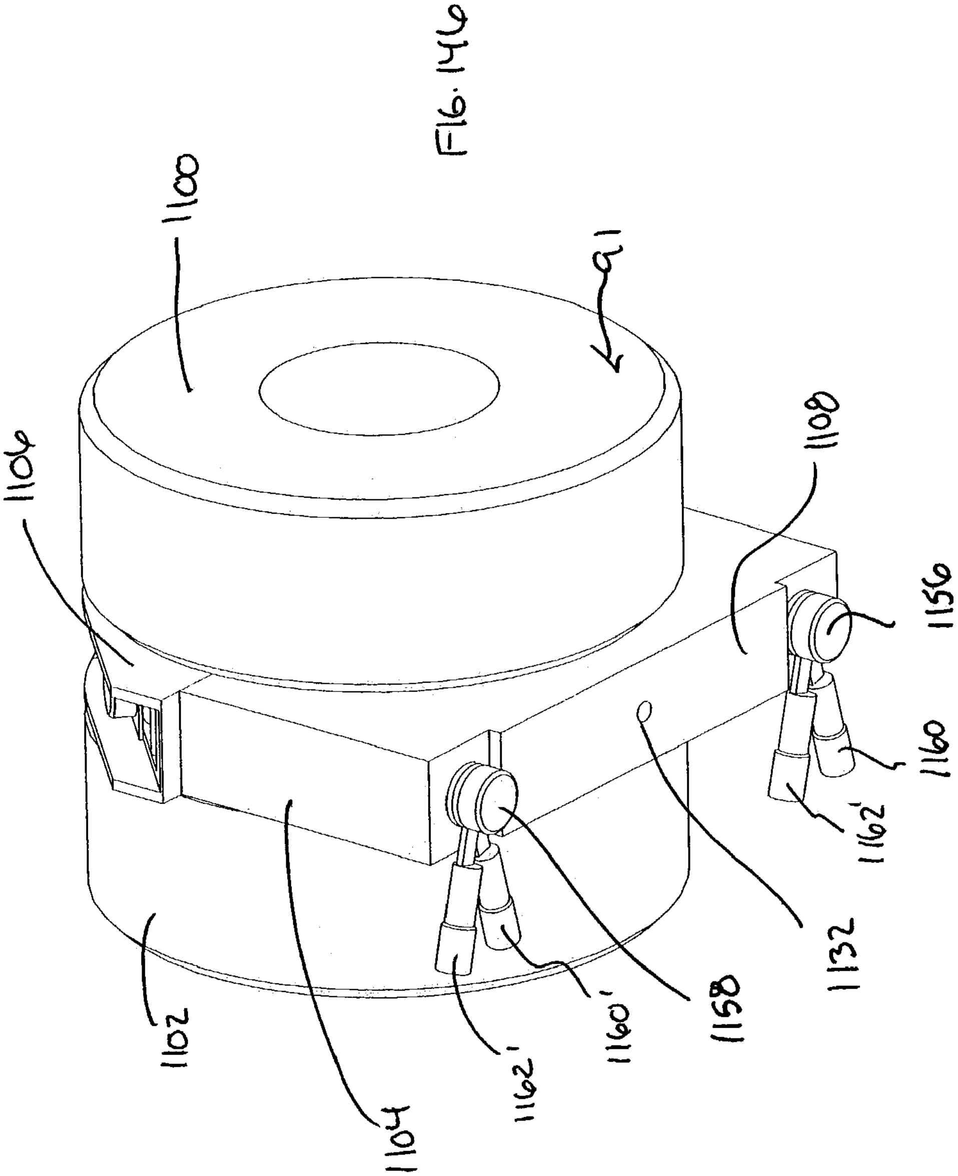
Figure 146A:
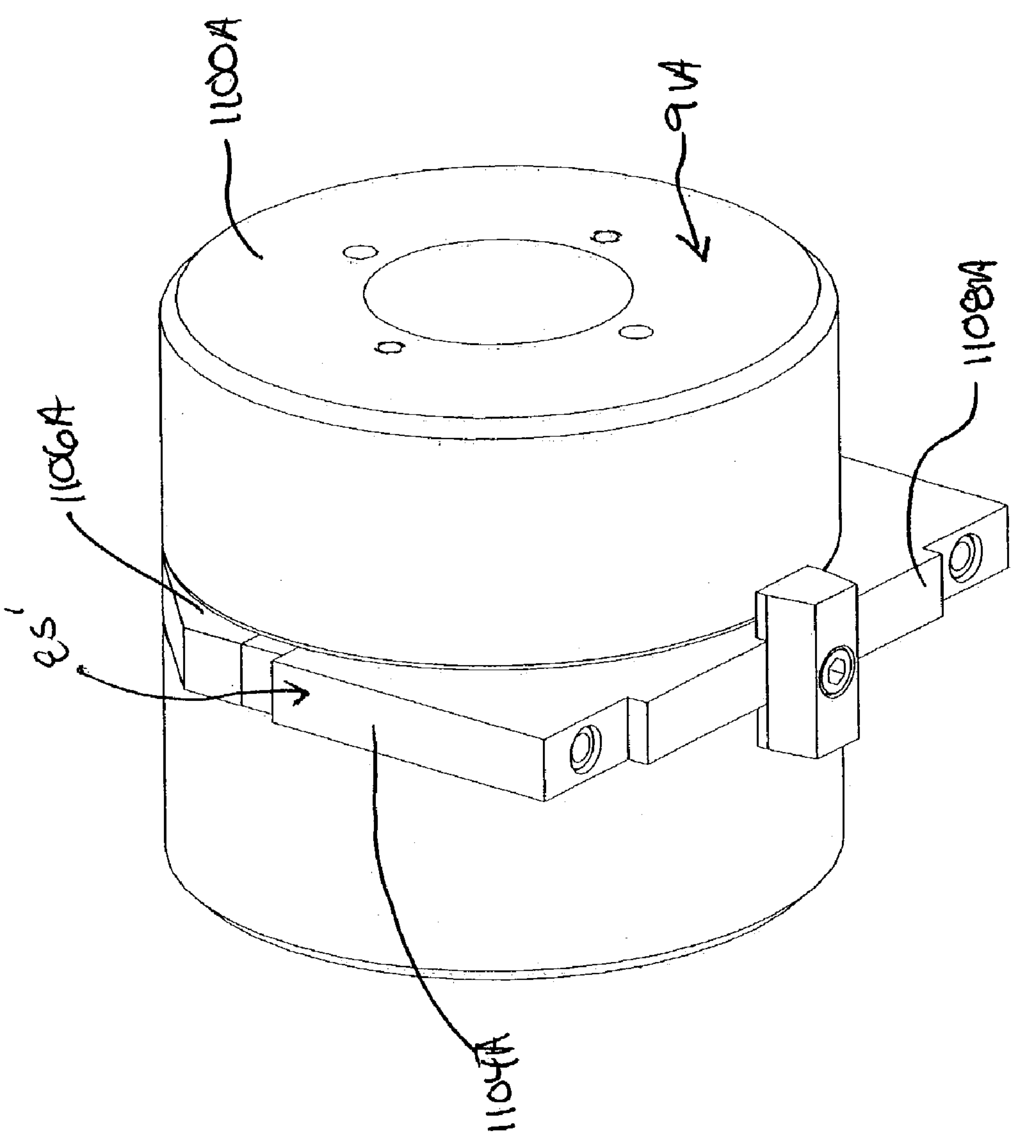

FIG. 146 shows a first perspective view of a first embodiment of edge sealer assembly from the electrical contact side.

146A shows a first perspective view of a second embodiment of edge sealer assembly from the electrical contact side.

Figure 147:
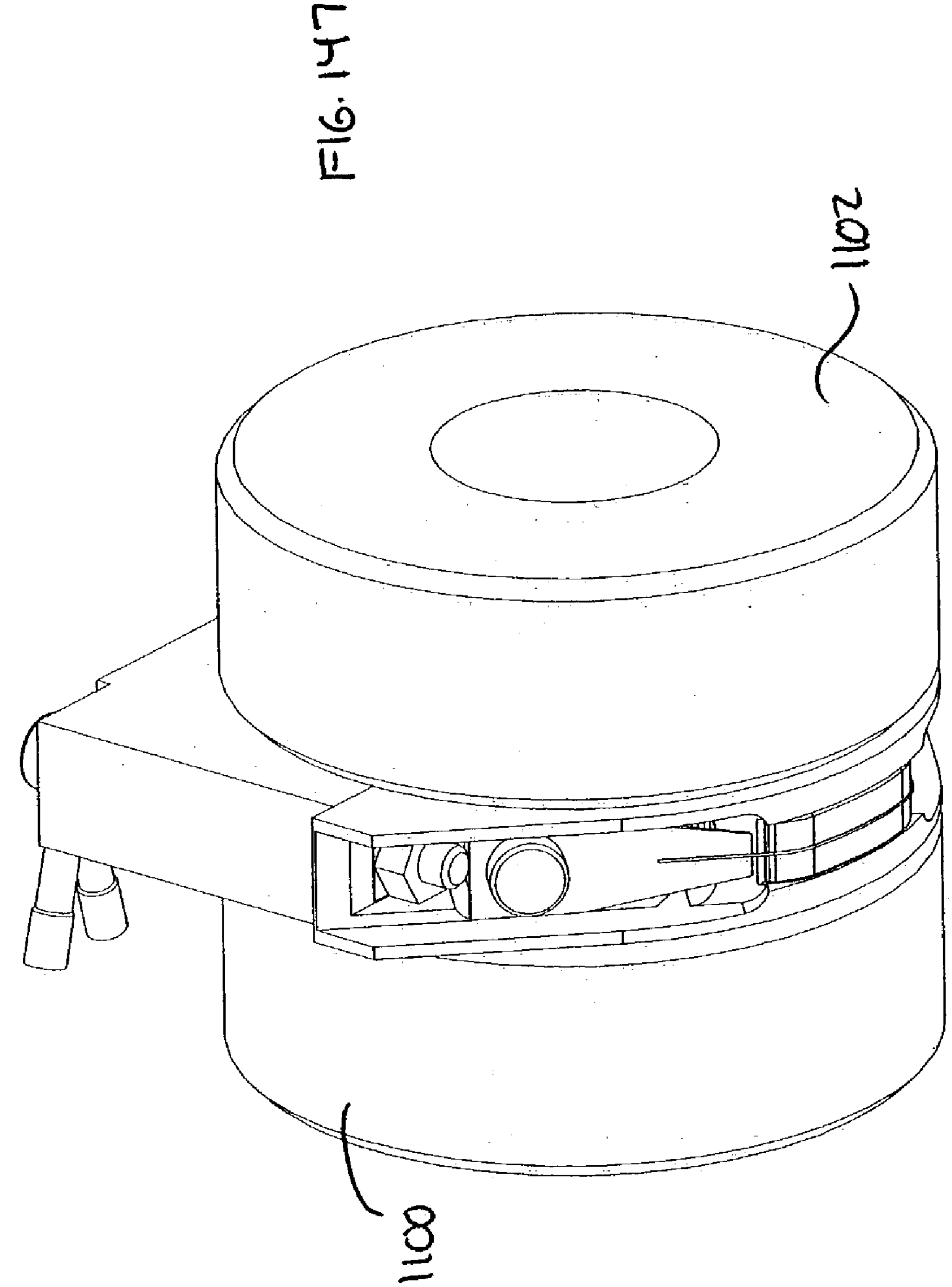

FIG. 147 shows a second perspective view of the first embodiment of the edge sealer assembly from the heater wire side.

Figure 147A:
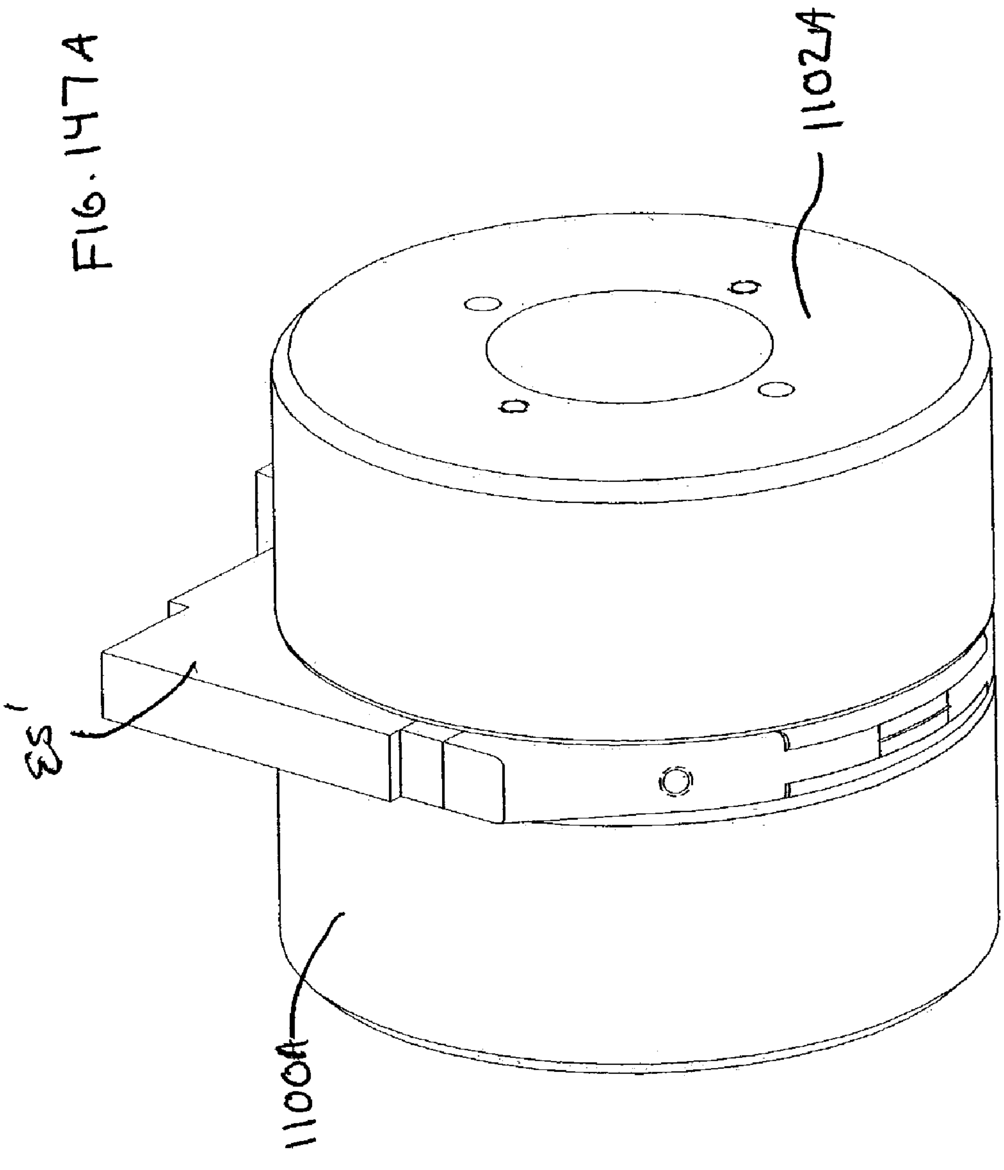

FIG. 147A shows a second perspective view of the second embodiment of the edge sealer assembly from the heater wire side.

Figure 148:
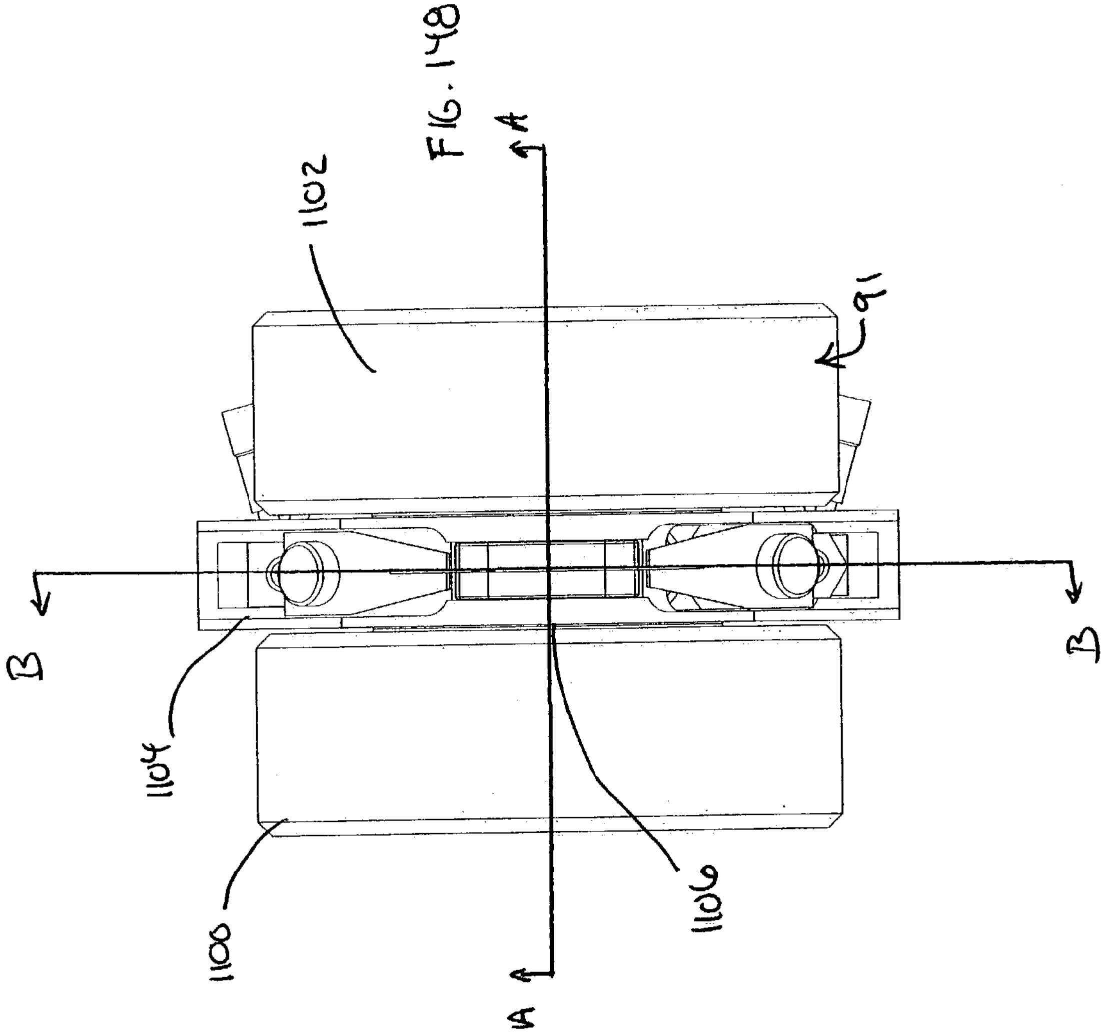

FIG. 148 shows an elevational view of the heater wire side of the first embodiment of the edge sealer assembly.

Figure 148A:
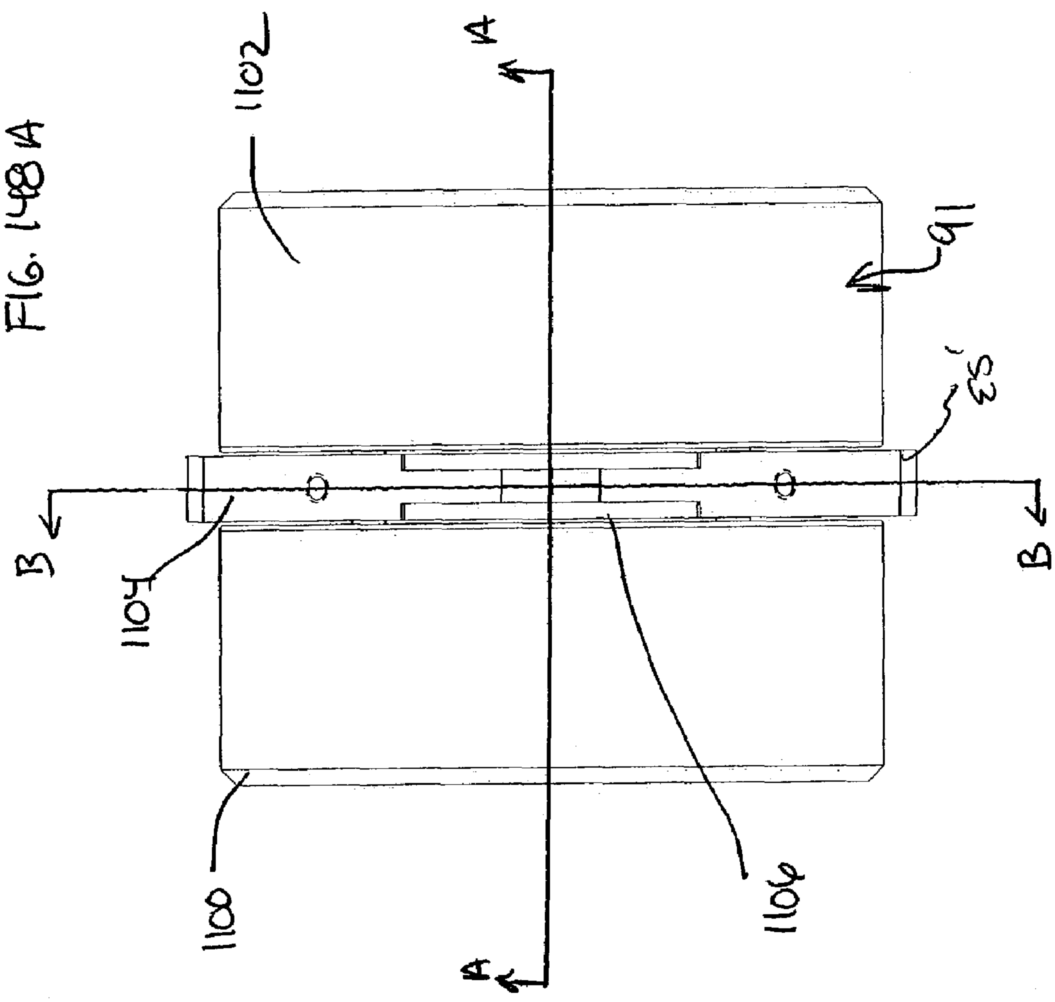

FIG. 148A shows an elevational view of the heater wire side of the second embodiment of the edge sealer assembly.

Figure 149:
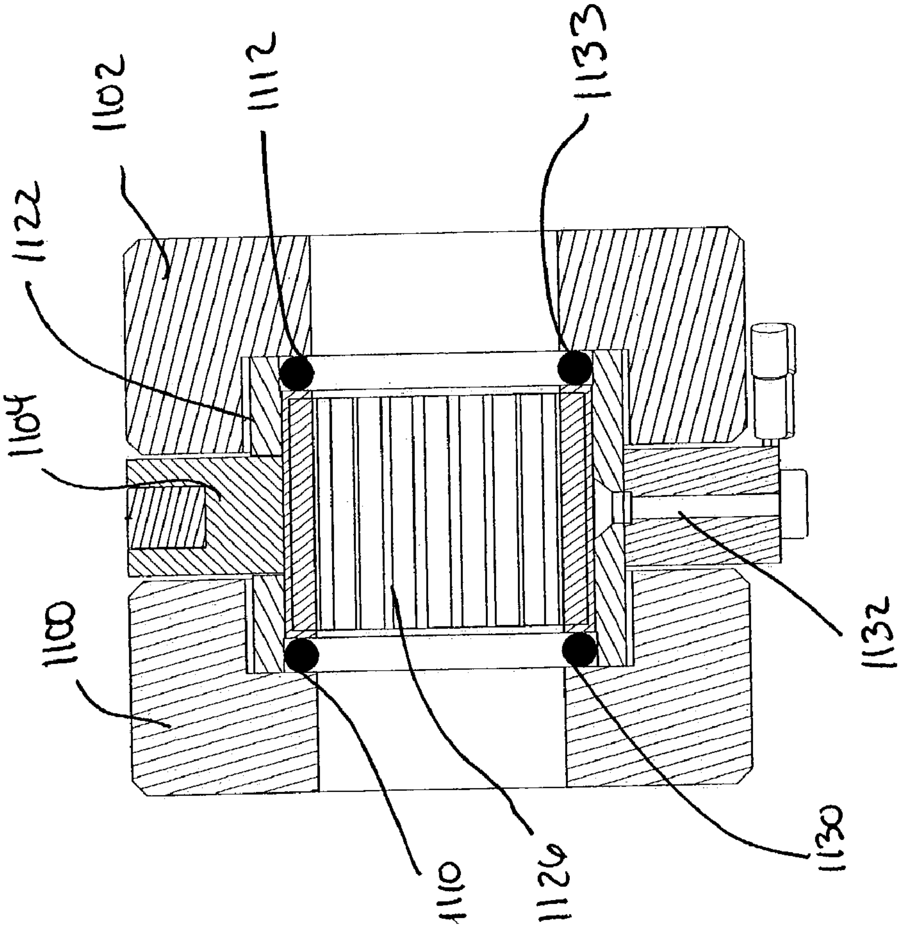

FIG. 149 shows a cross-sectional view taken along cross-section line A-A in FIG. 148.

Figure 149A:
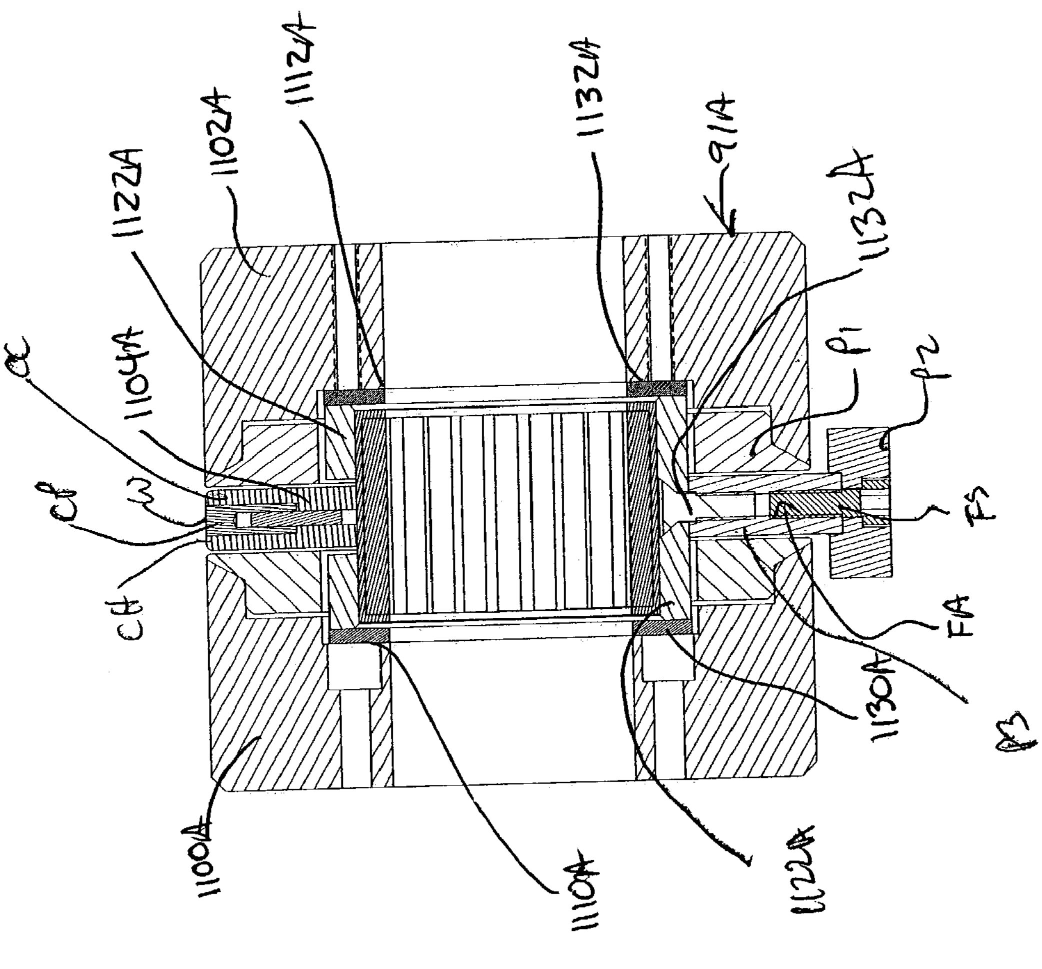

FIG. 149A shows a cross-sectional view taken along cross-section line A-A in FIG. 148A.

Figure 150:
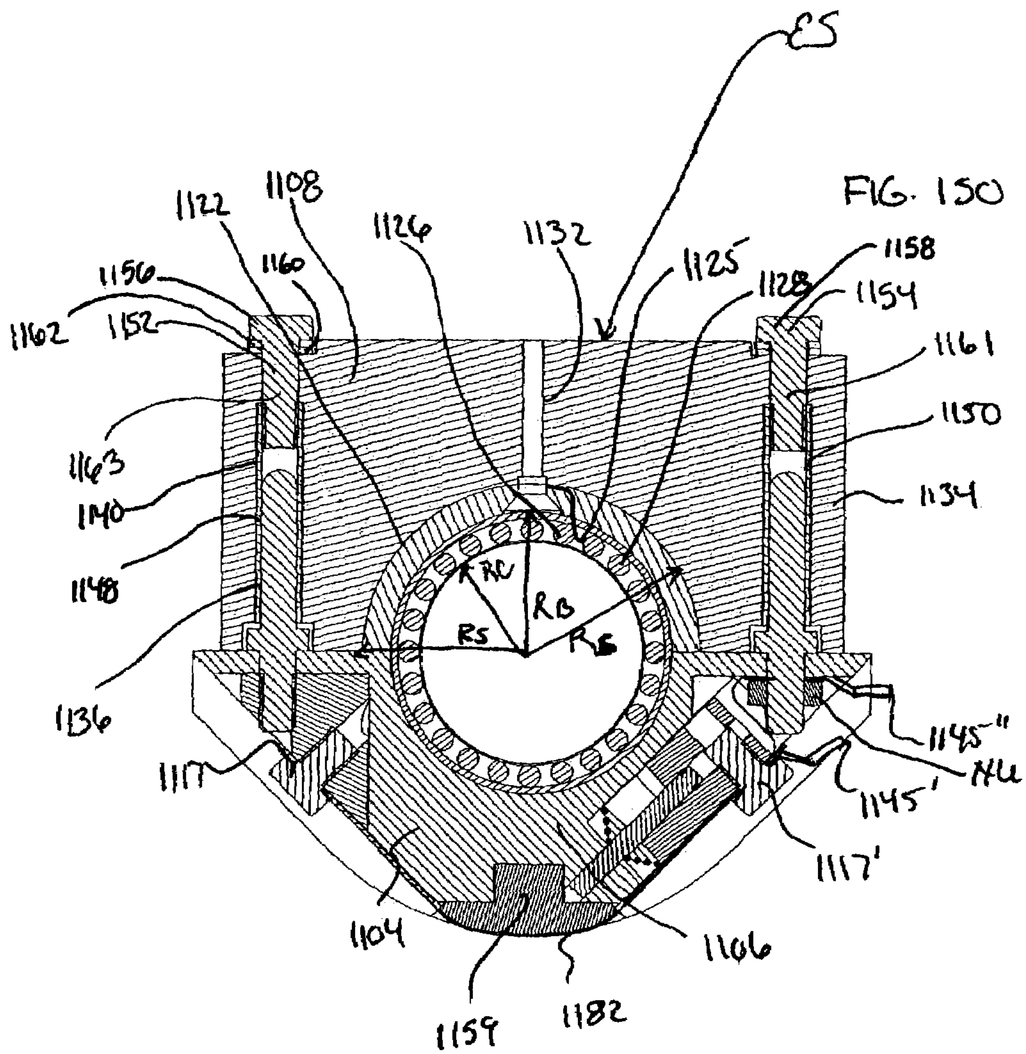

FIG. 150 shows a cross-sectional view taken along cross-section line B-B in FIG. 148.

Figure 150A:
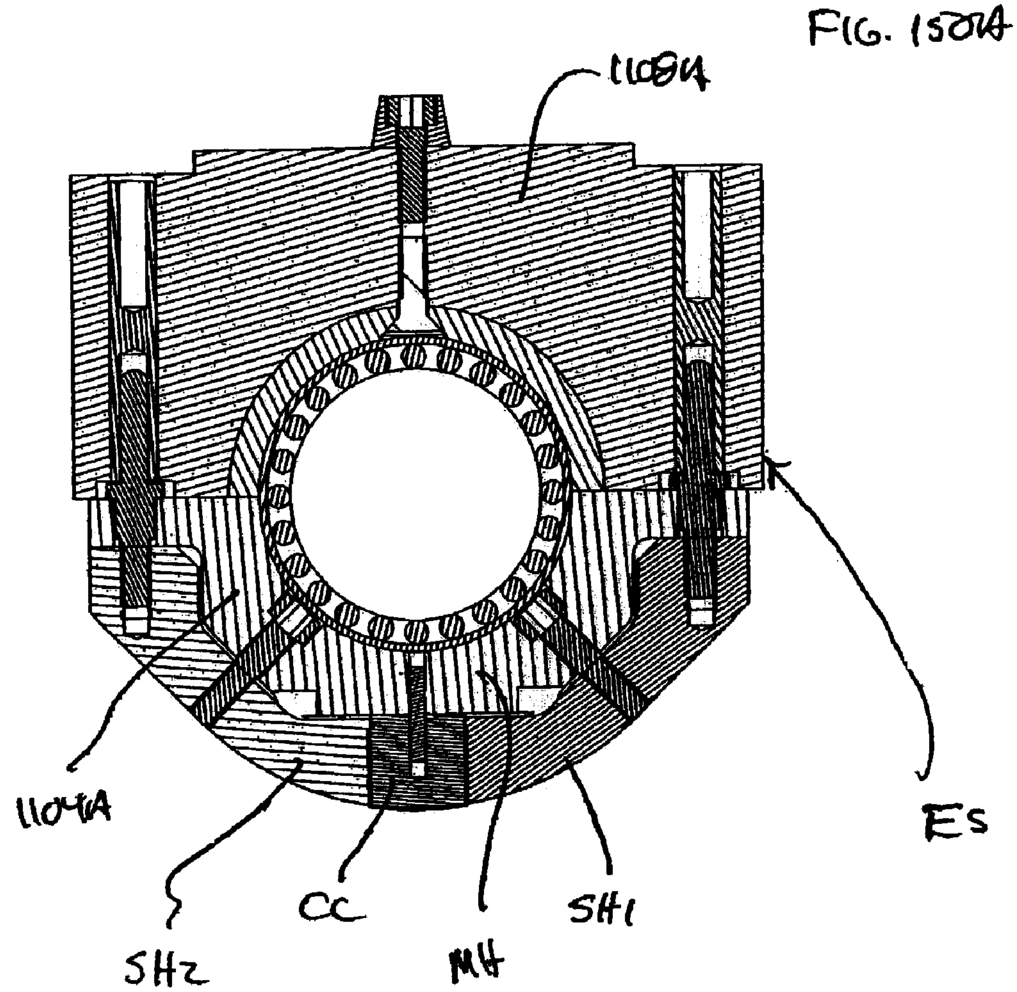

FIG. 150A shows a cross-sectional view taken along cross-section line B-B in FIG. 148A.

Figure 151:
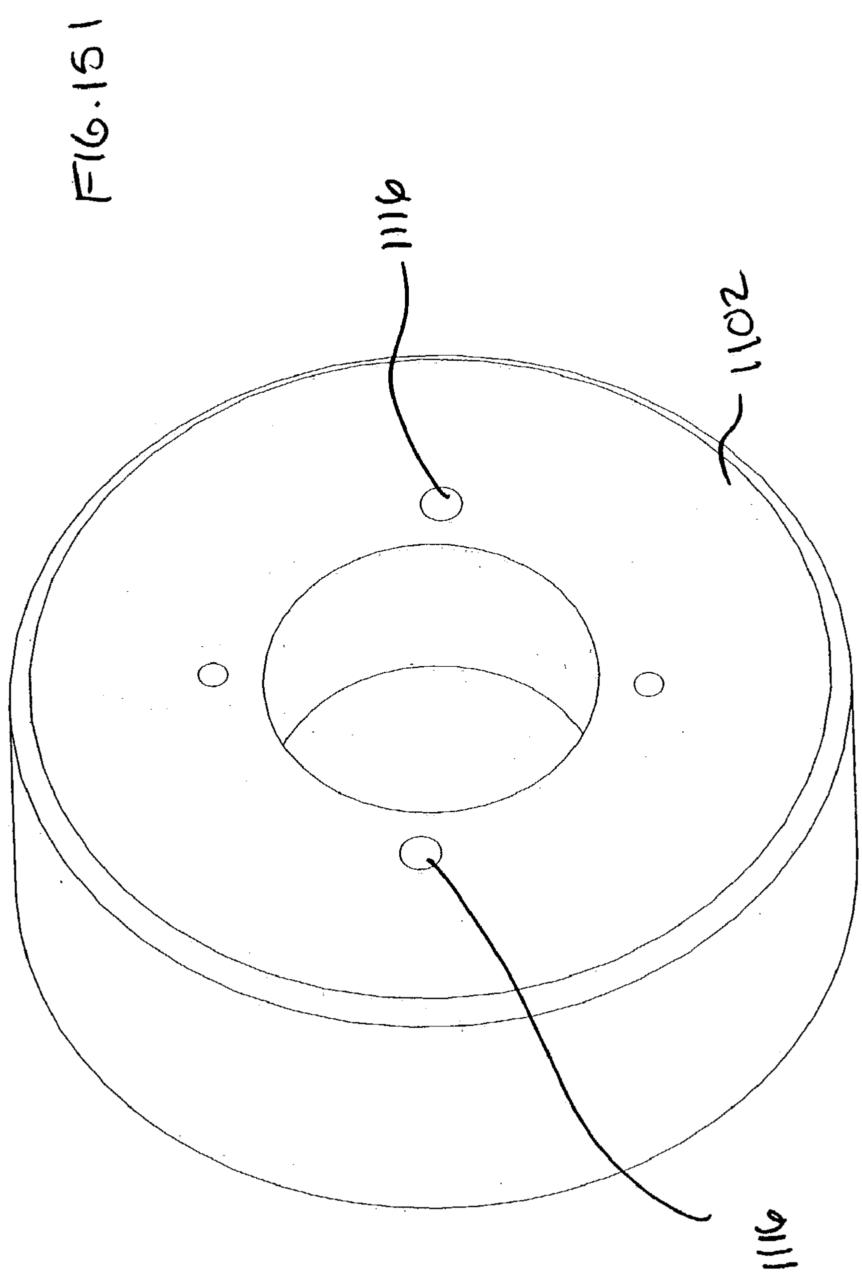

FIG. 151 shows the interior side of one of the two sub-rollers of the first embodiment of the edge seal assembly.

Figure 151A:
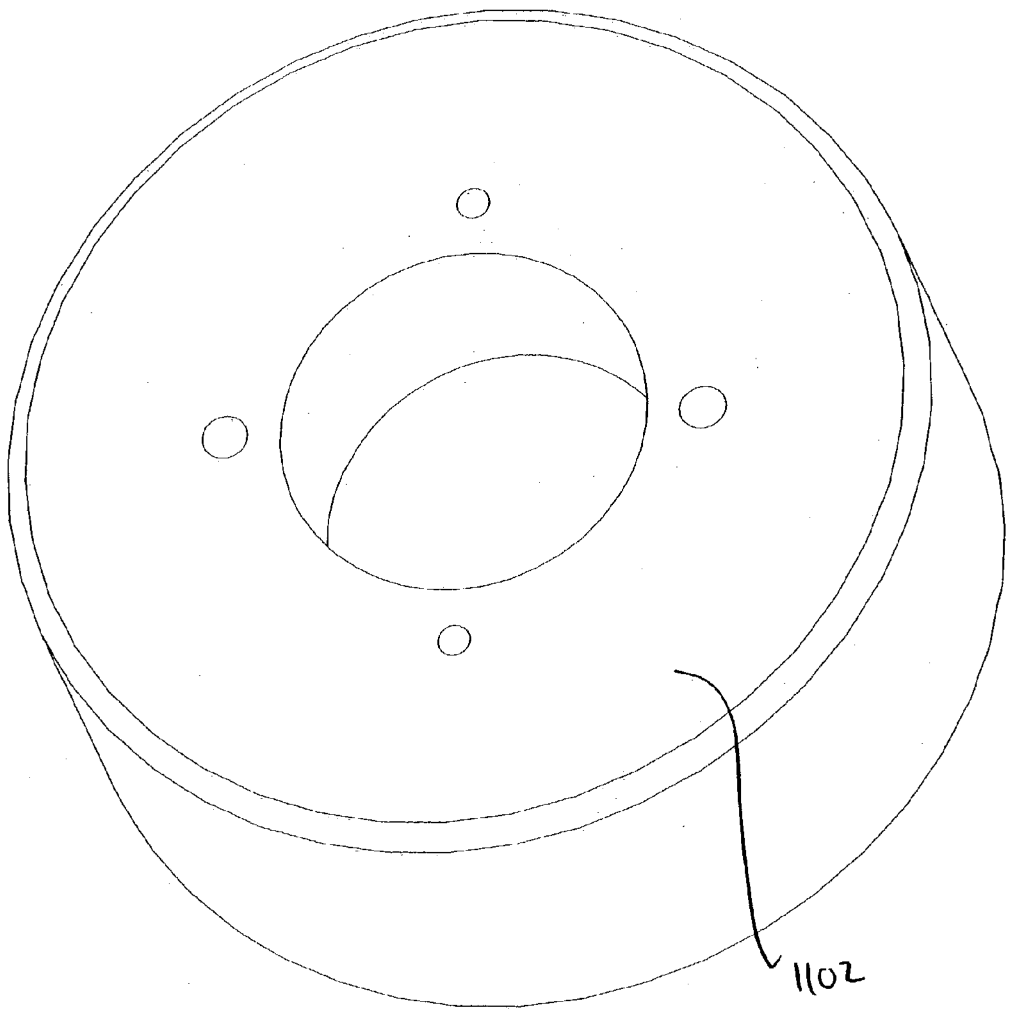

FIG. 151A shows the interior side of one of the two sub-rollers of the second embodiment of the edge seal assembly.

Figure 152:
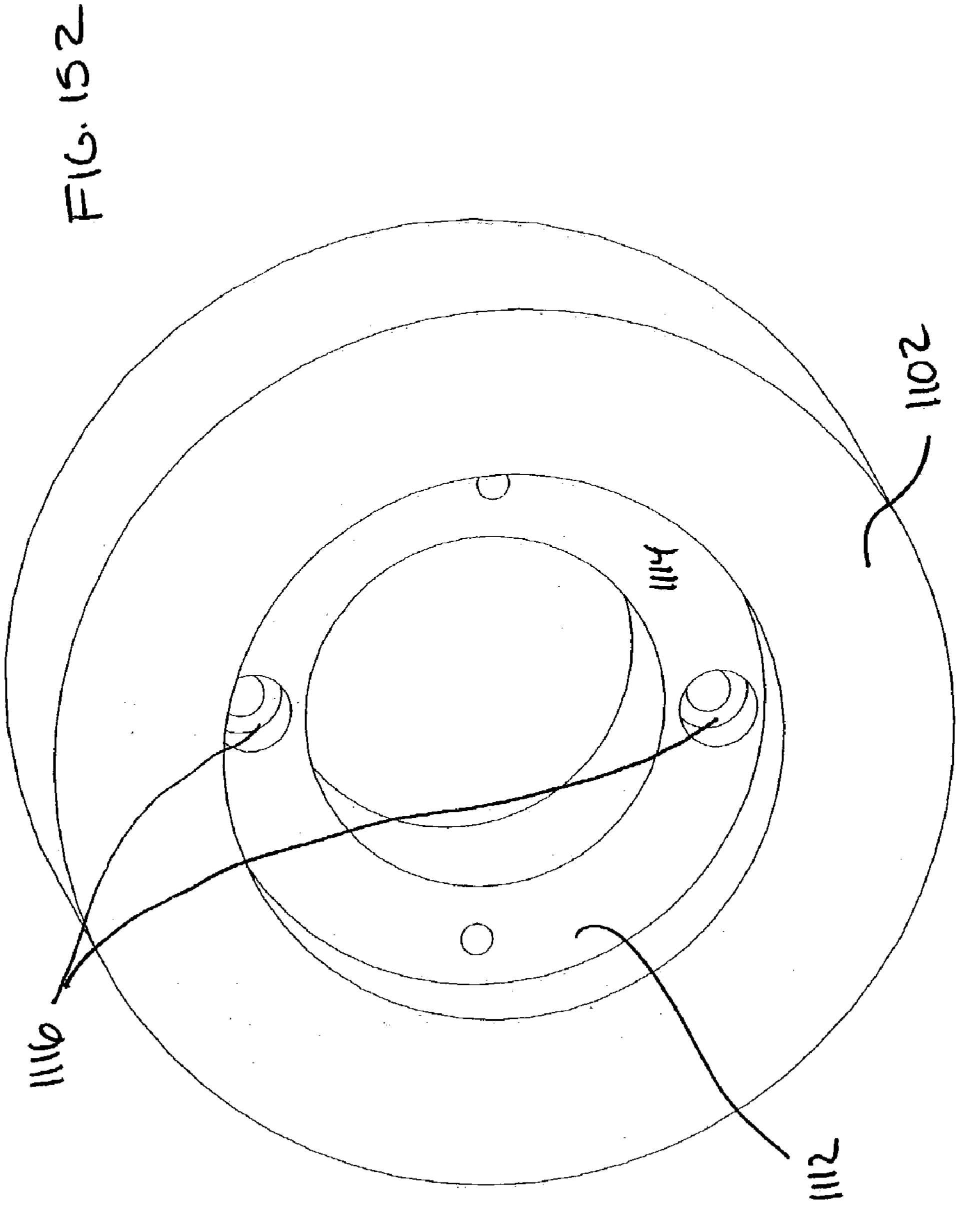

FIG. 152 shows the exterior side of the sub-roller in FIG. 151.

Figure 152A:
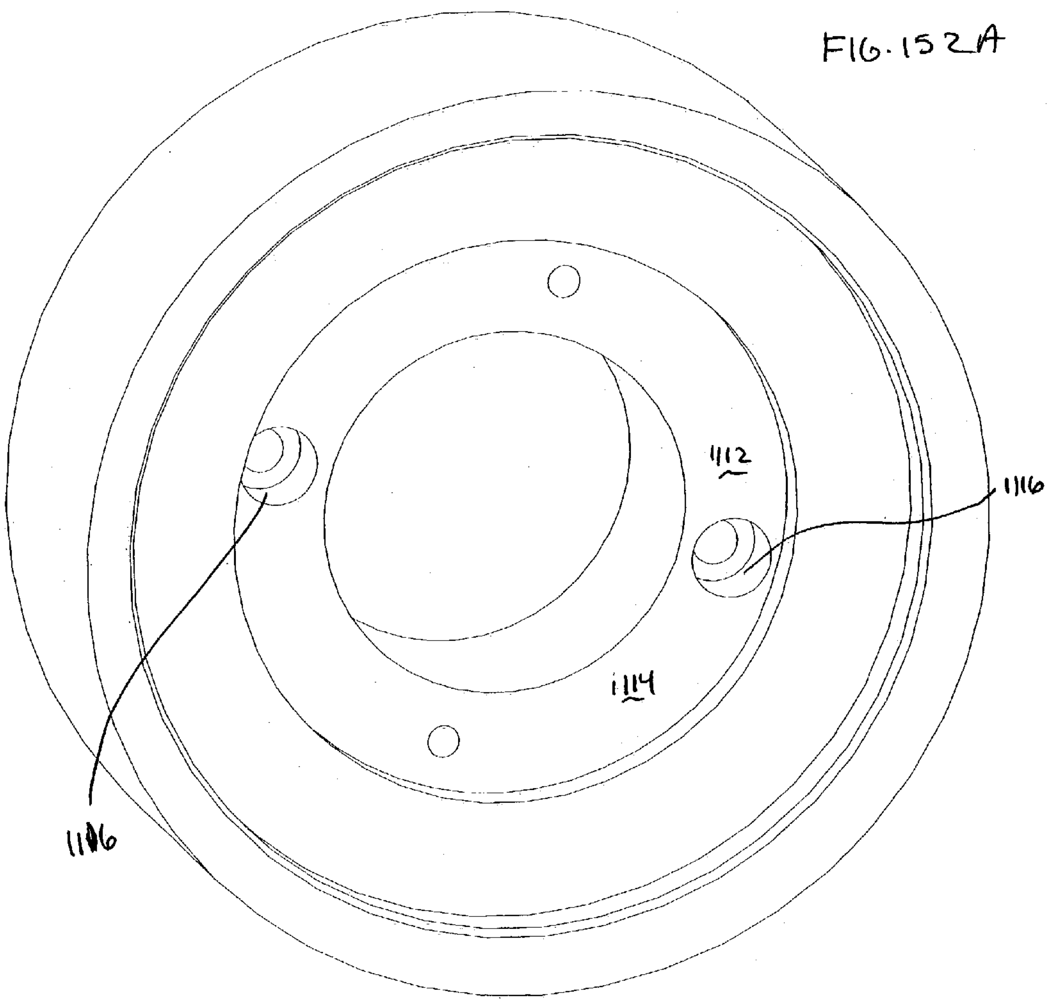

FIG. 152A shows the exterior side of the sub-roller in FIG. 151A.

Figure 153:
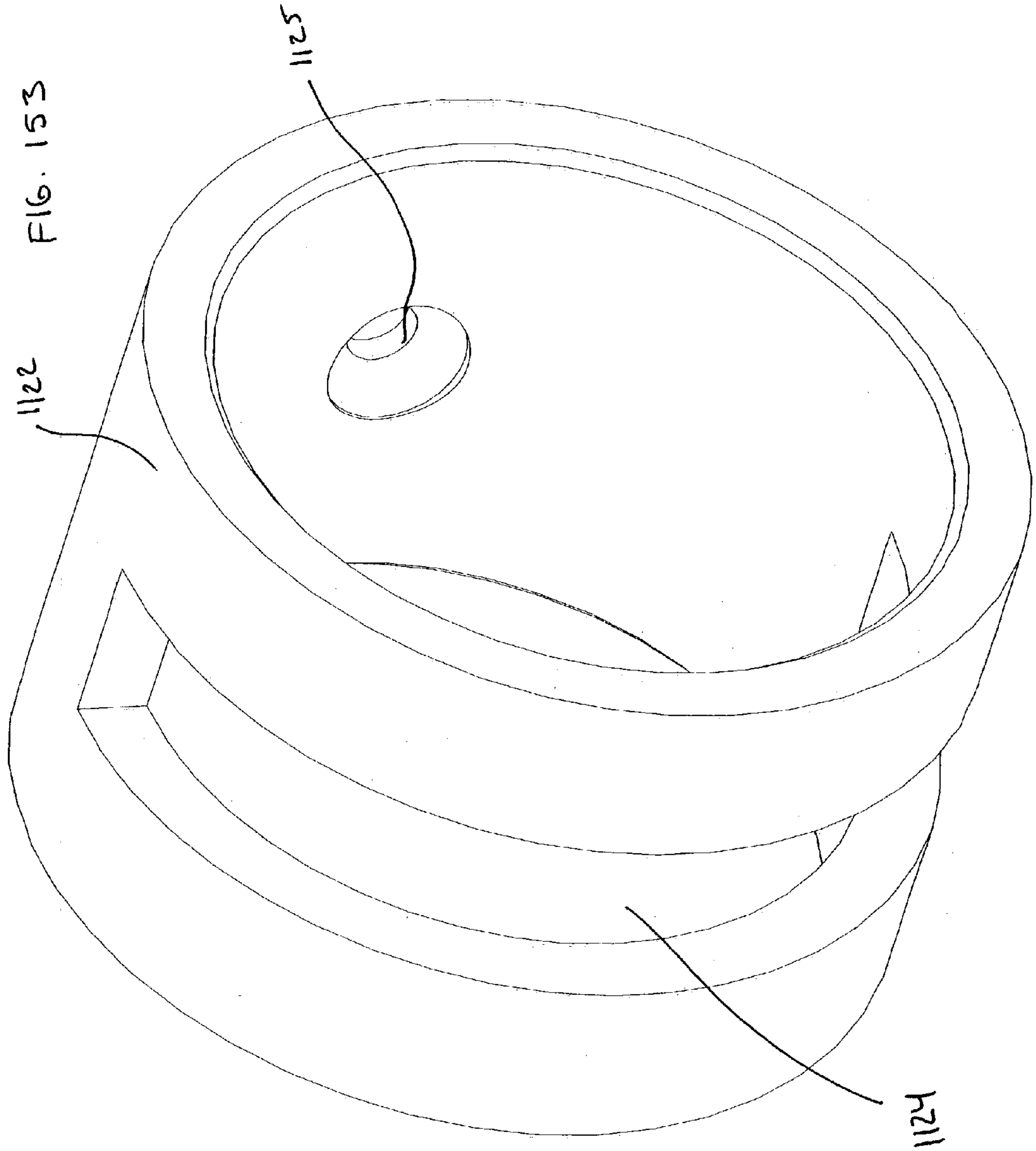

FIG. 153 shows the internal sleeve of the first embodiment of the edge seal assembly.

Figure 154:
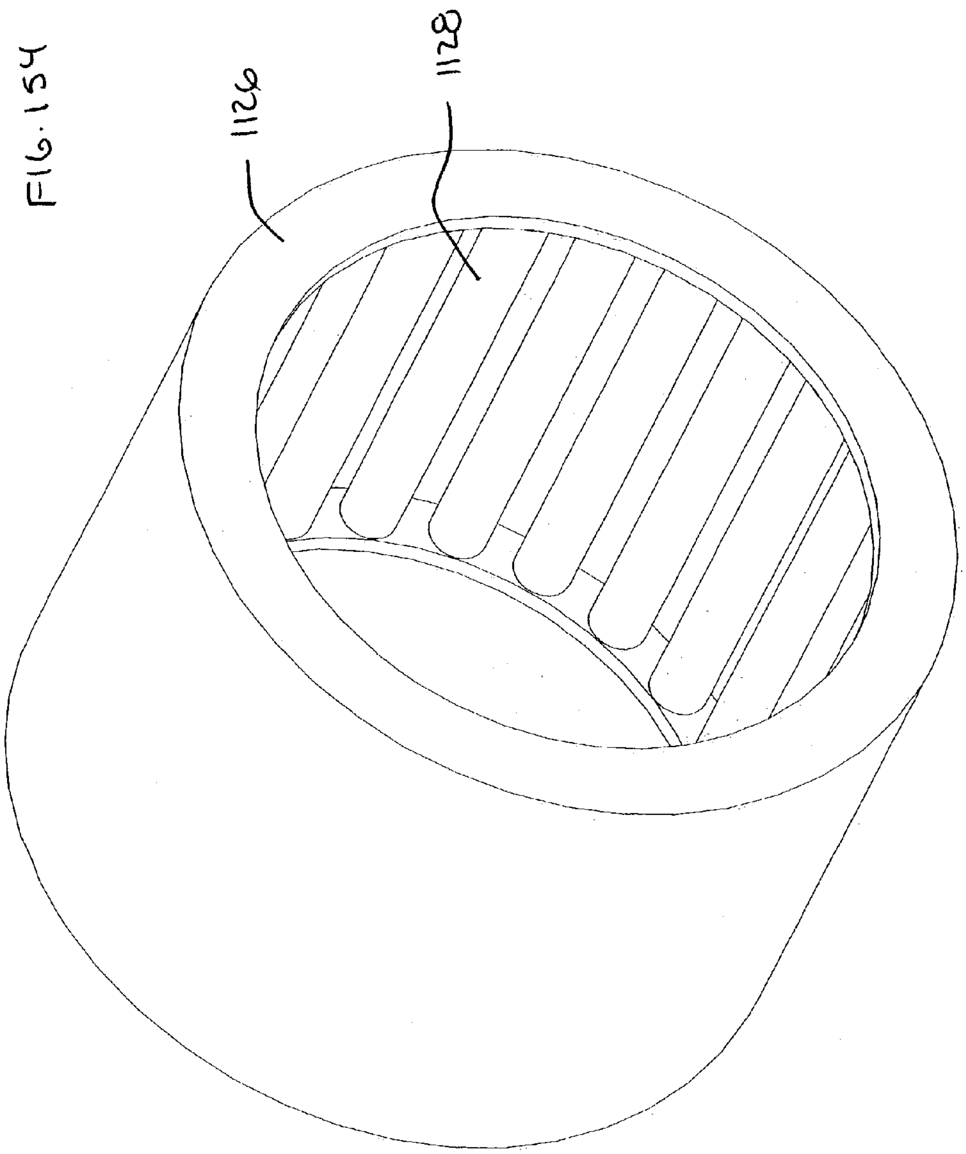

FIG. 154 shows the roller bearing of the first embodiment of the edge seal assembly which is received by the sleeve and receives the driven roller set shaft.

Figure 155:
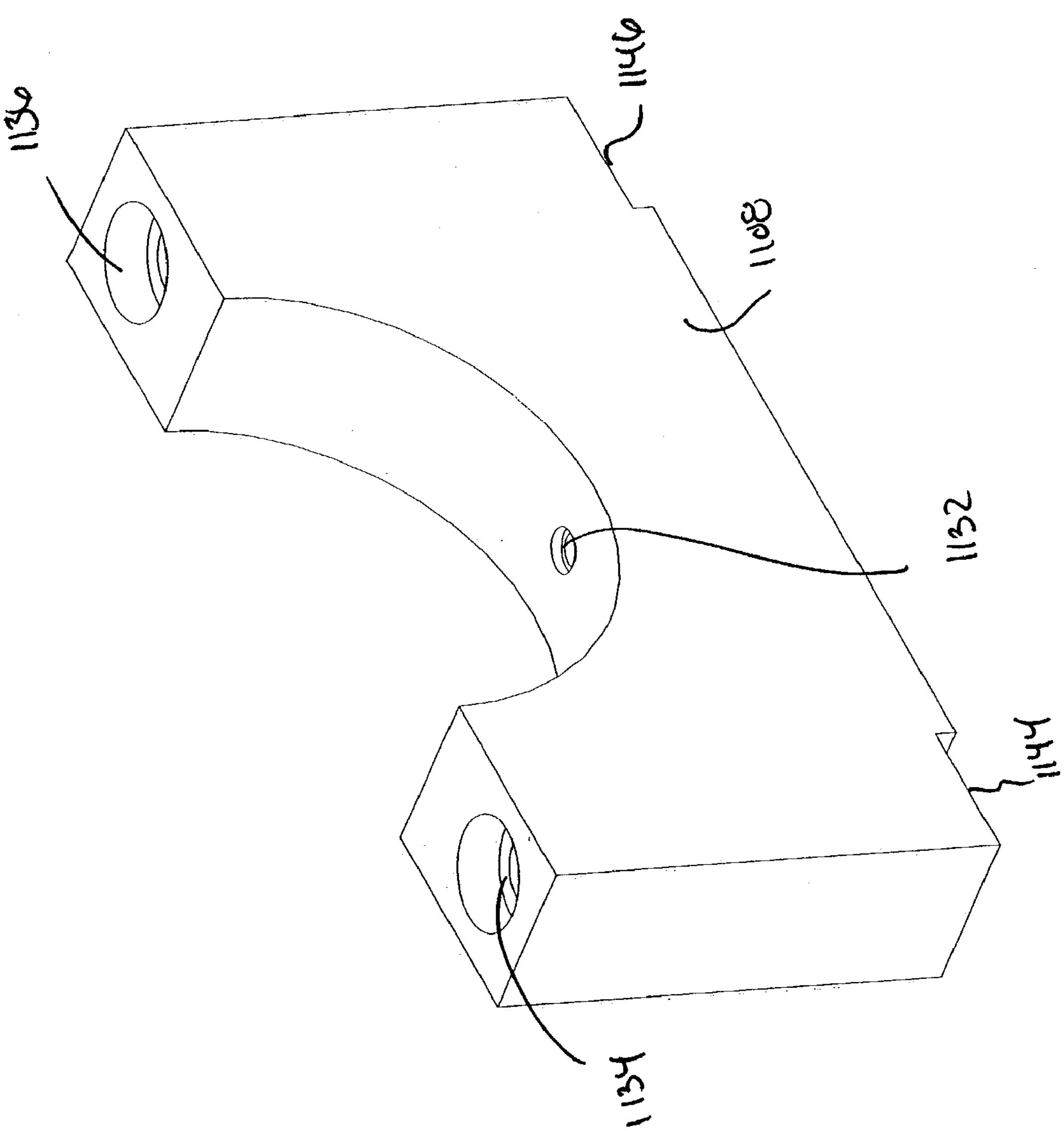

FIG. 155 shows a perspective view of the arbor base of the first embodiment of the edge seal assembly.

Figure 155A:
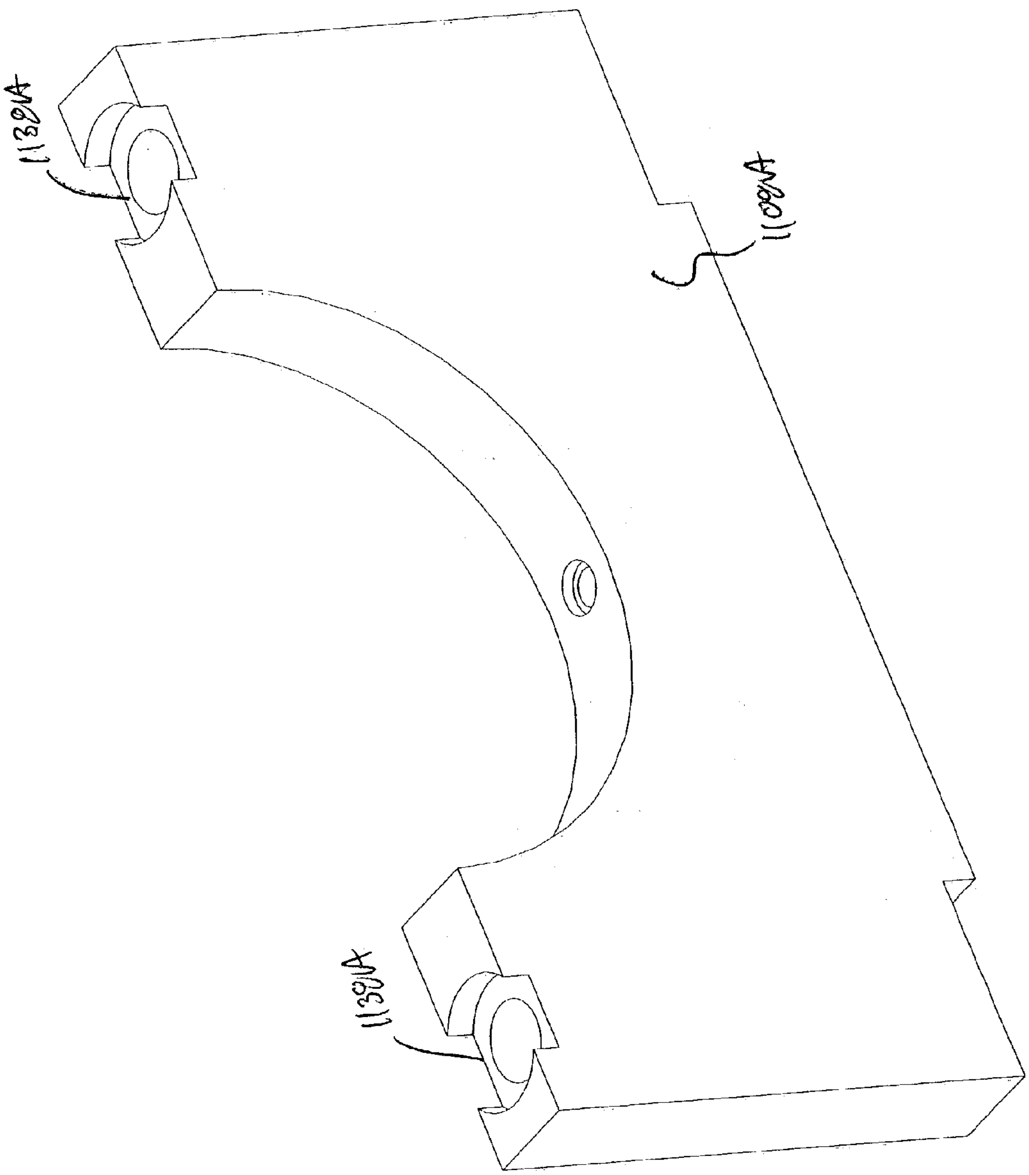

FIG. 155A shows a perspective view of the arbor base of the second embodiment of the edge seal assembly.

FIG. 156 shows a cross-sectional view of the arbor base shown in FIG. 155.

Figure 156A:
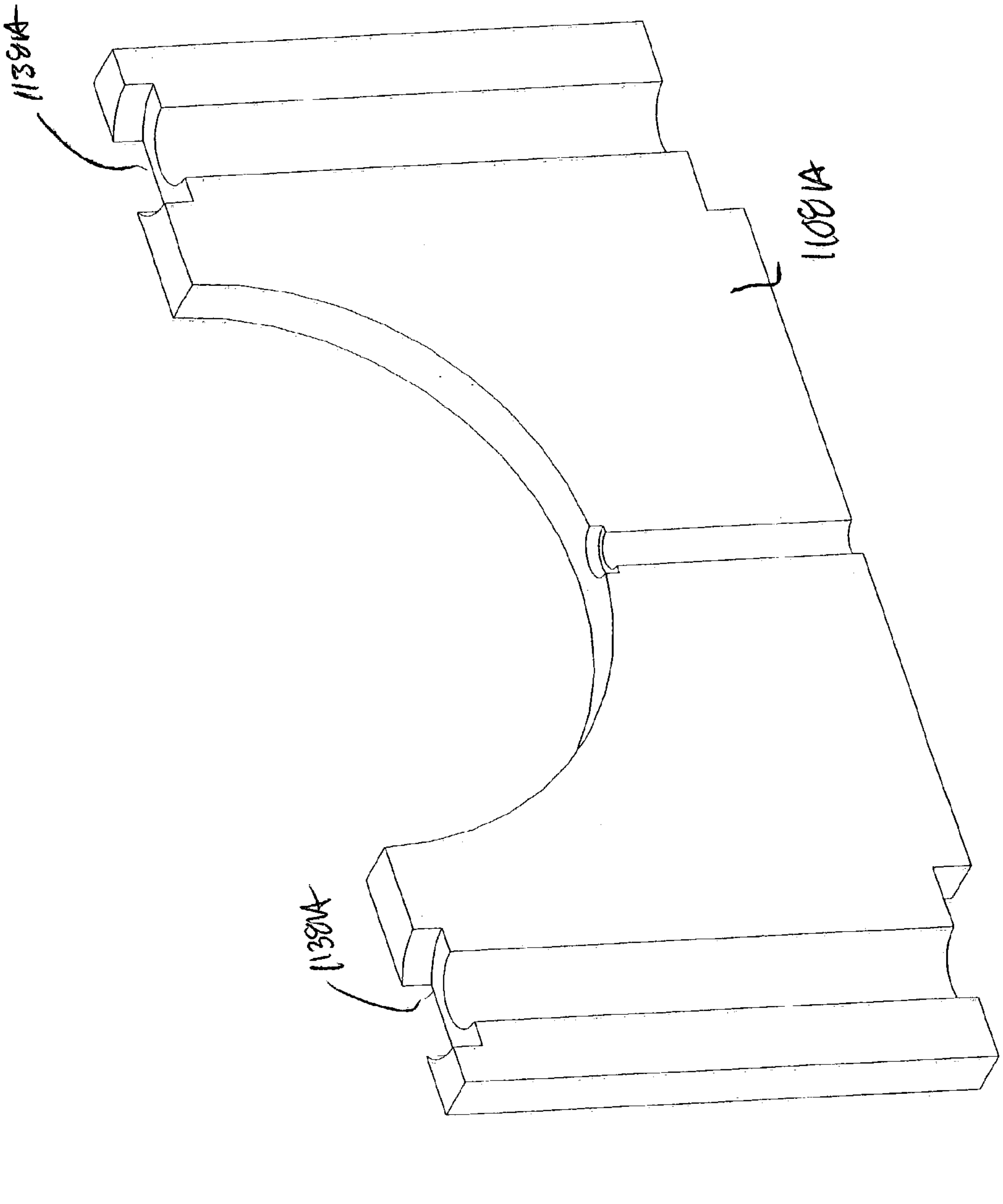

FIG. 156A shows a cross-sectional view of the arbor base shown in FIG. 155A.

Figure 157:
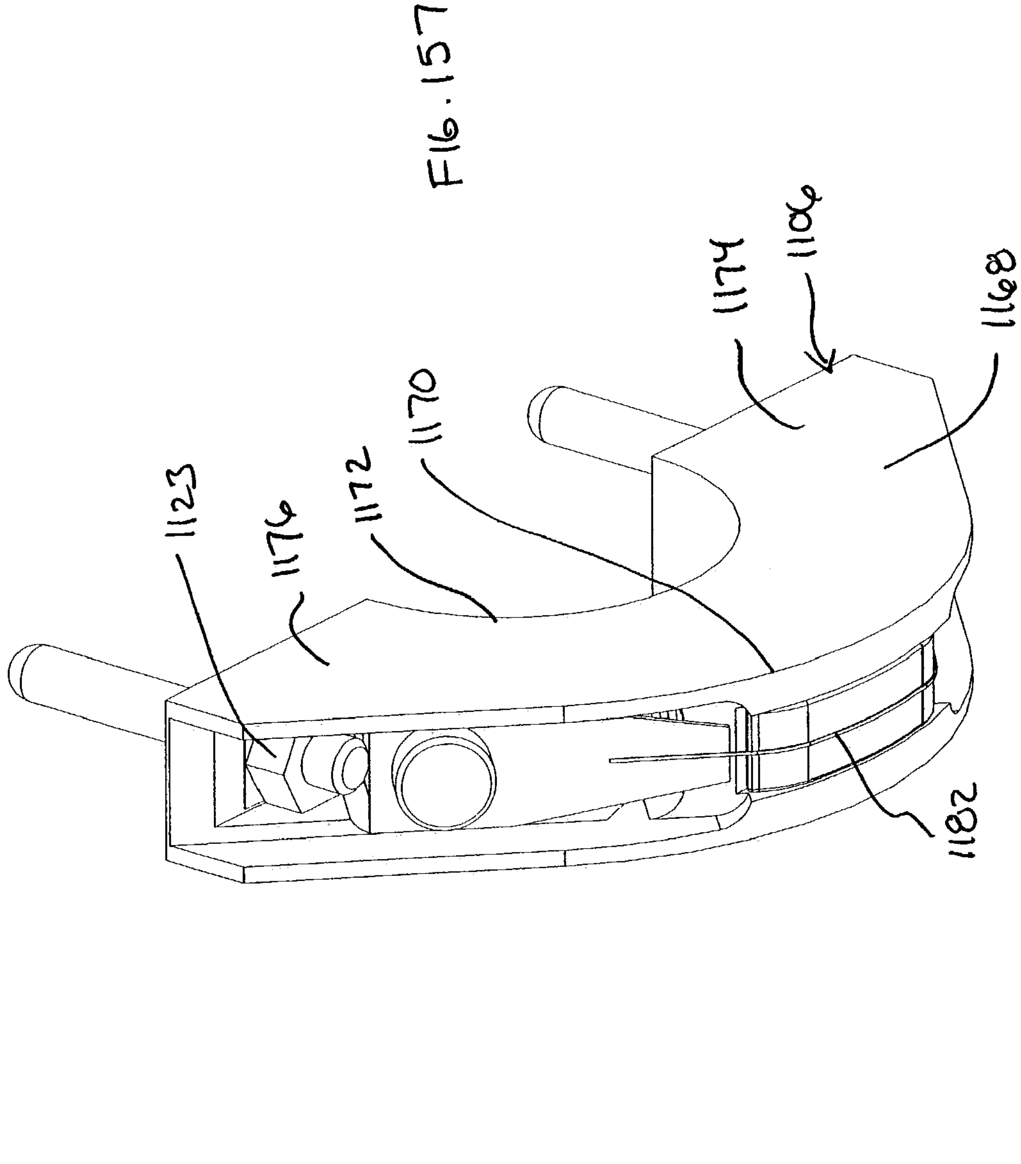

FIG. 157 shows a perspective view directed at the heater wire side of the arbor mechanism of the first embodiment of the edge seal assembly.

Figure 157A:
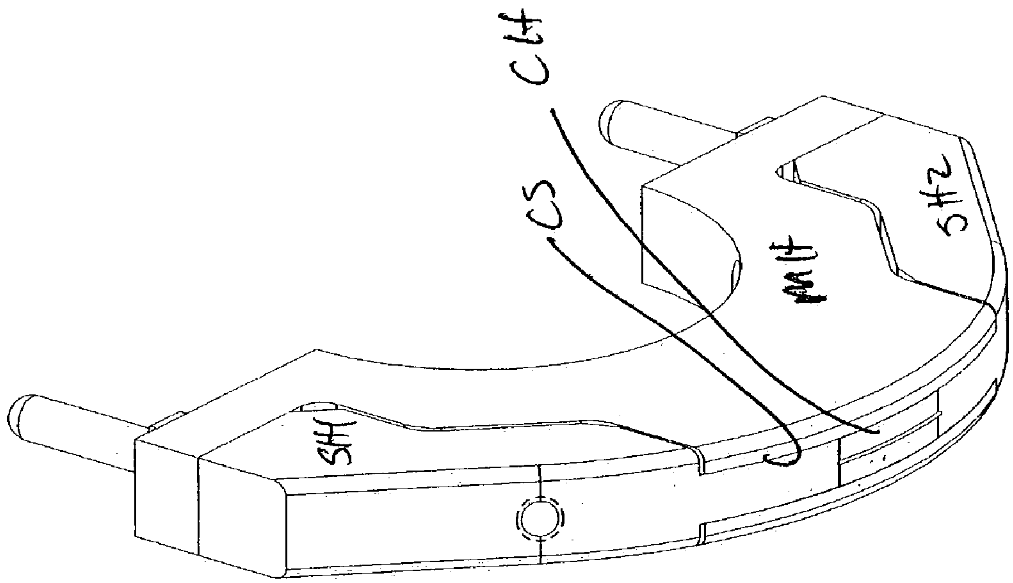

FIG. 157A shows a perspective view directed at the heater wire side of the arbor mechanism of the second embodiment of the edge seal assembly.

Figure 158:
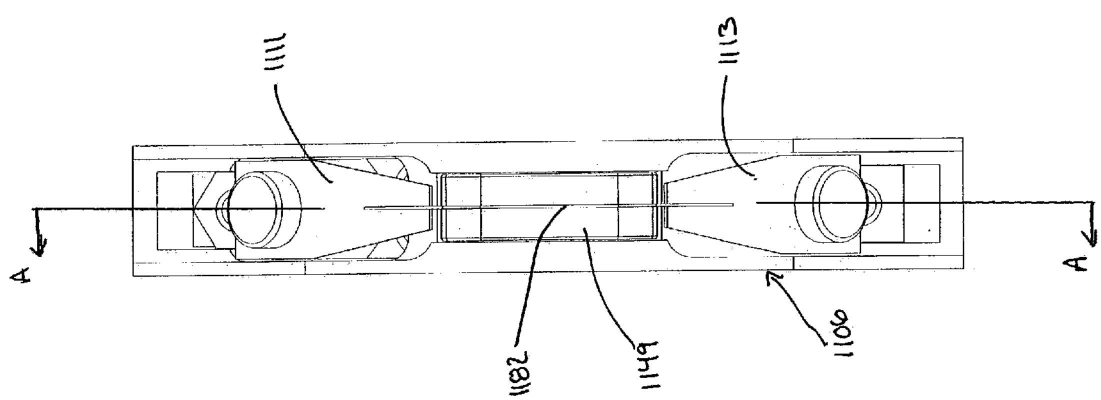

FIG. 158 shows an elevational view of the heater wire side of the arbor assembly first embodiment of the edge seal assembly.

Figure 158A:
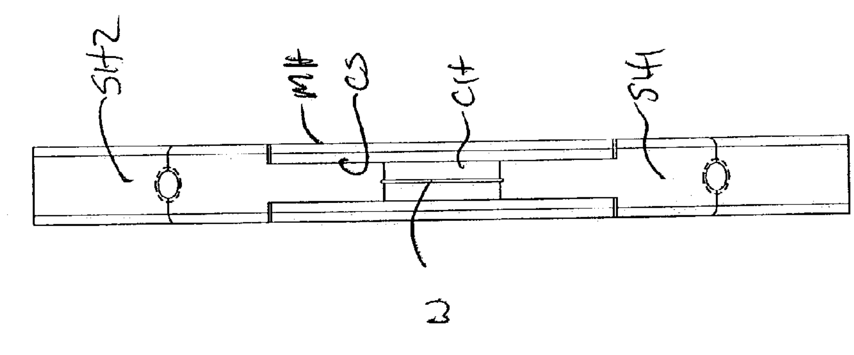

FIG. 158A shows an elevational view of the heater wire side of the arbor assembly second embodiment of the edge seal assembly.

Figure 159:
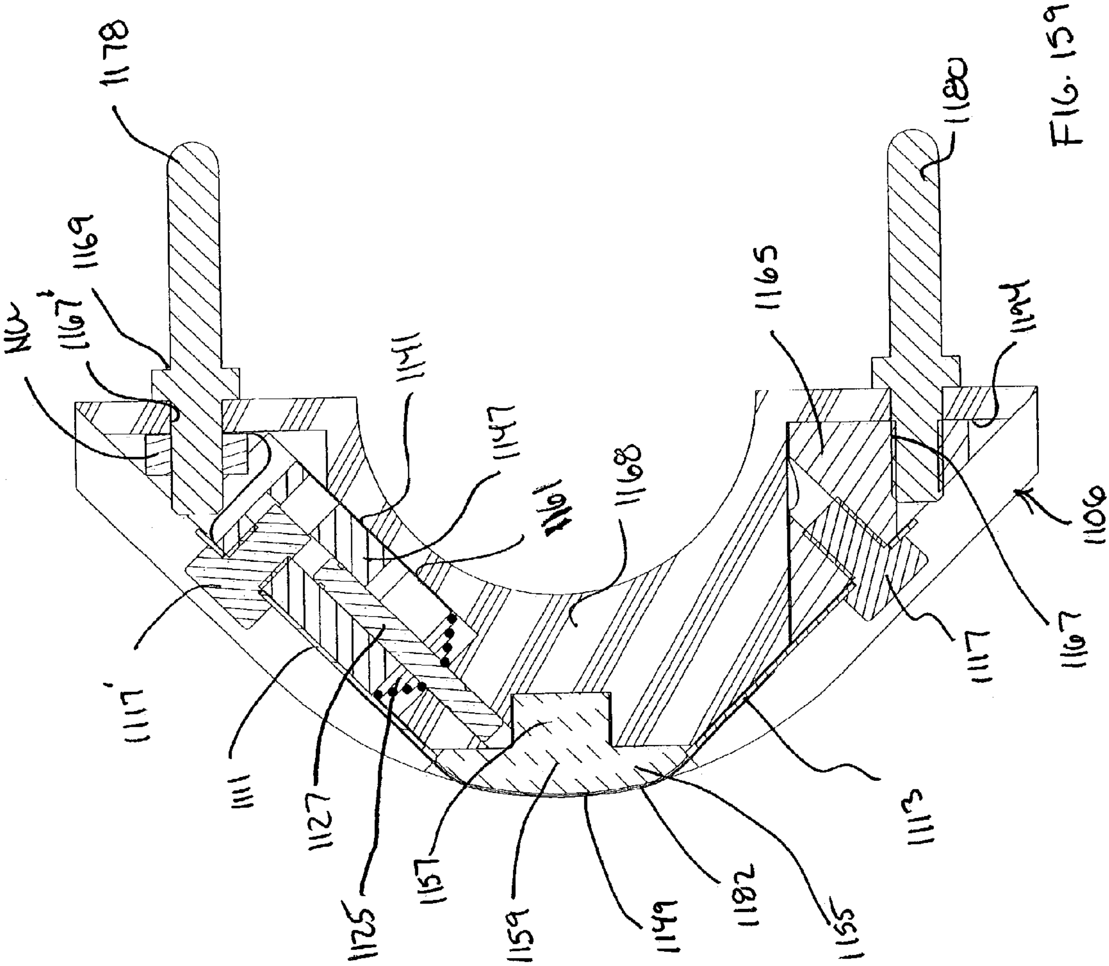

FIG. 159 shows a cross-sectional view taken along A-A in FIG. 158.

Figure 159A:
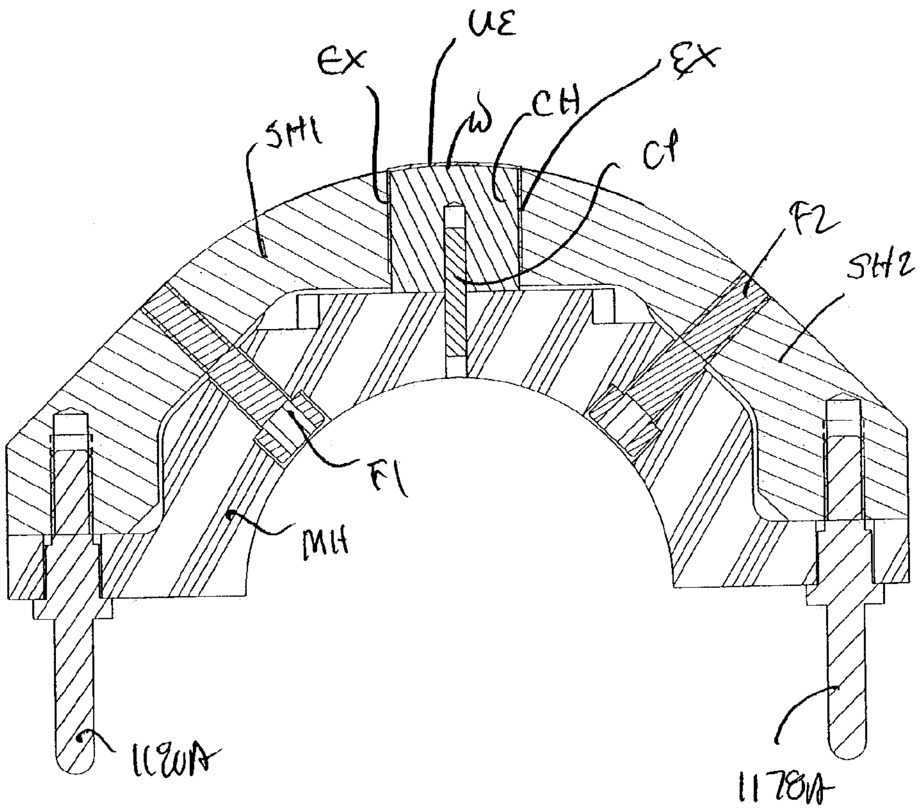

FIG. 159A shows a cross-sectional view taken along A-A in FIG. 158A.

Figure 160:
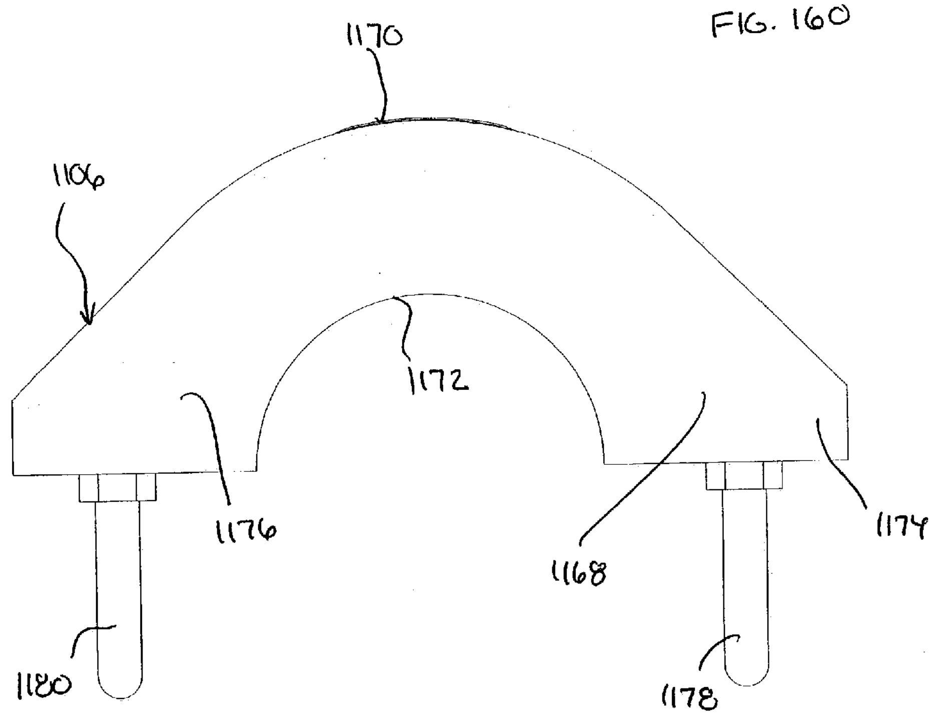

FIG. 160 shows a side view of the arbor assembly first embodiment of the edge seal assembly.

Figure 160A:
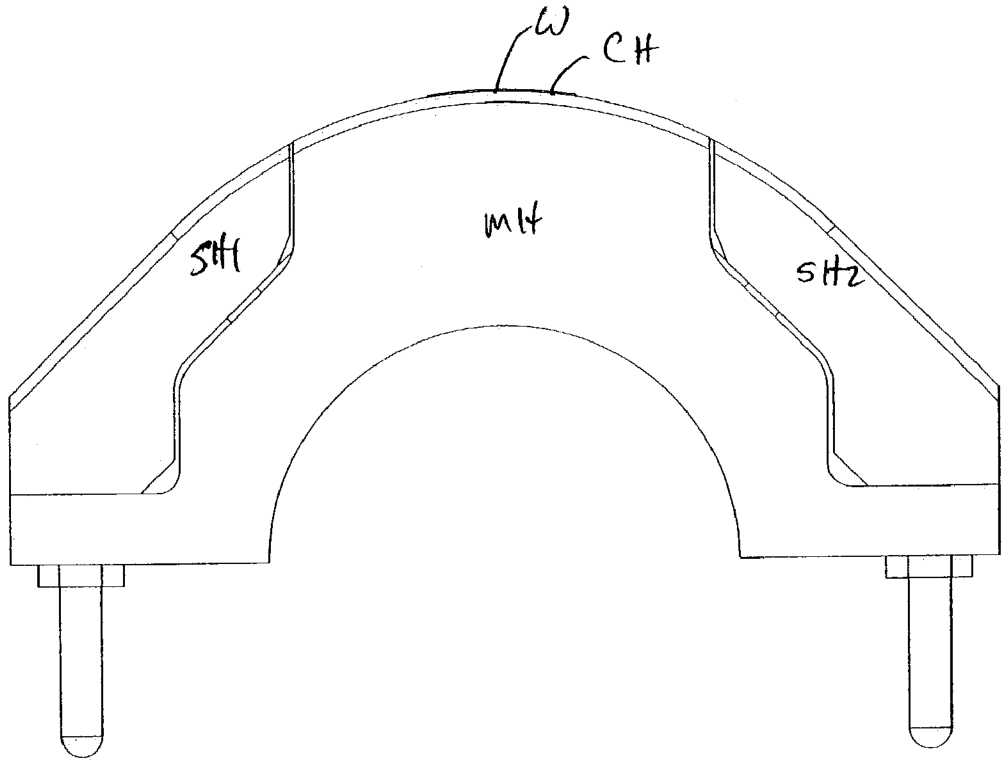

FIG. 160A shows a side view of the arbor assembly of the second embodiment.

Figure 161:
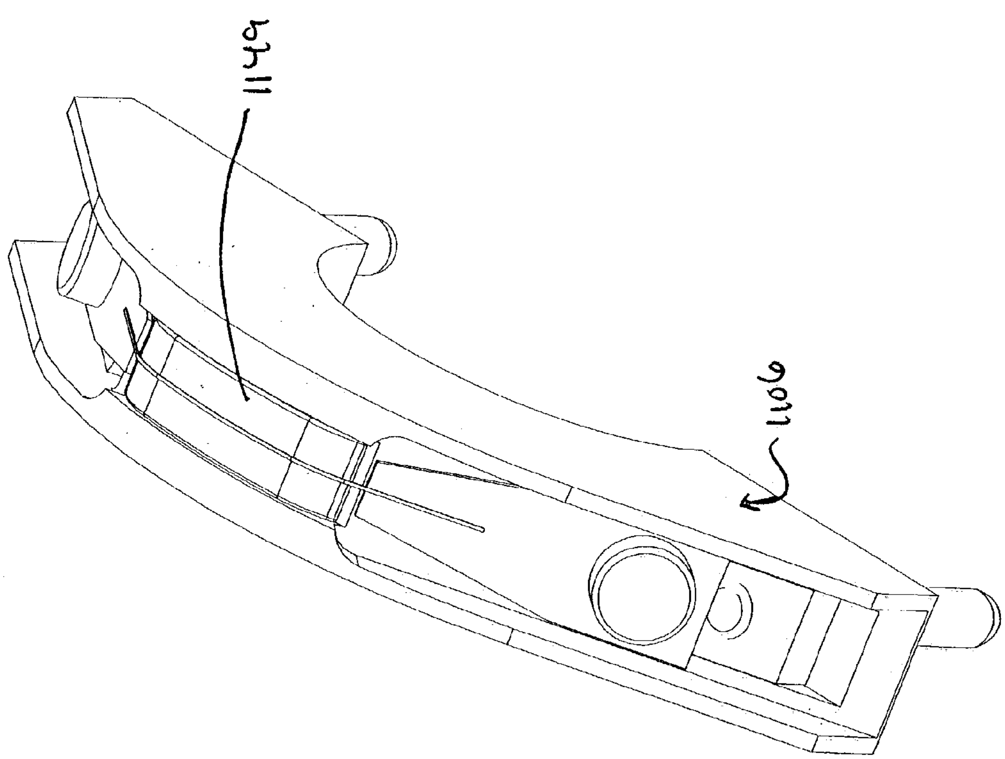
Figure 161A:
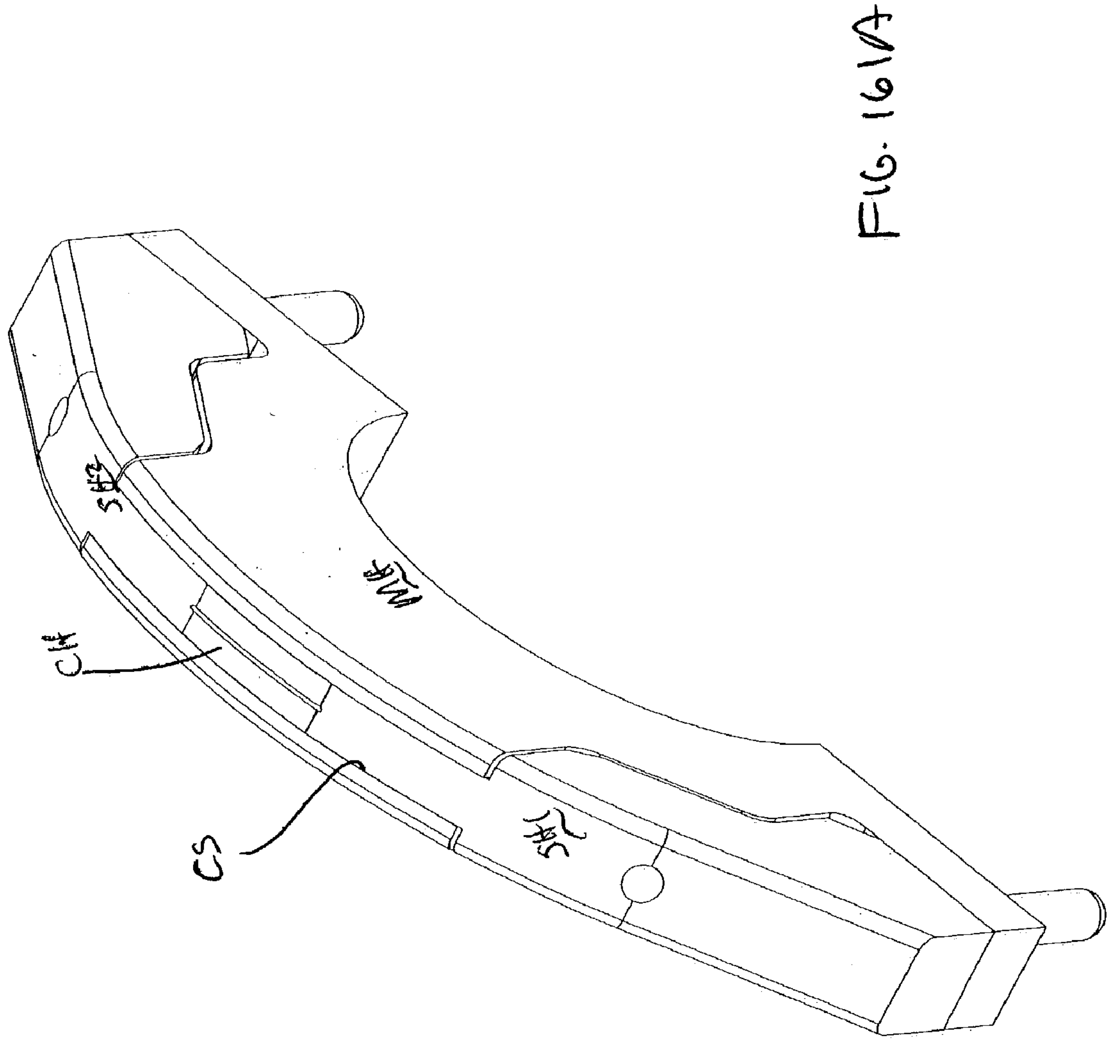
Figure 162:
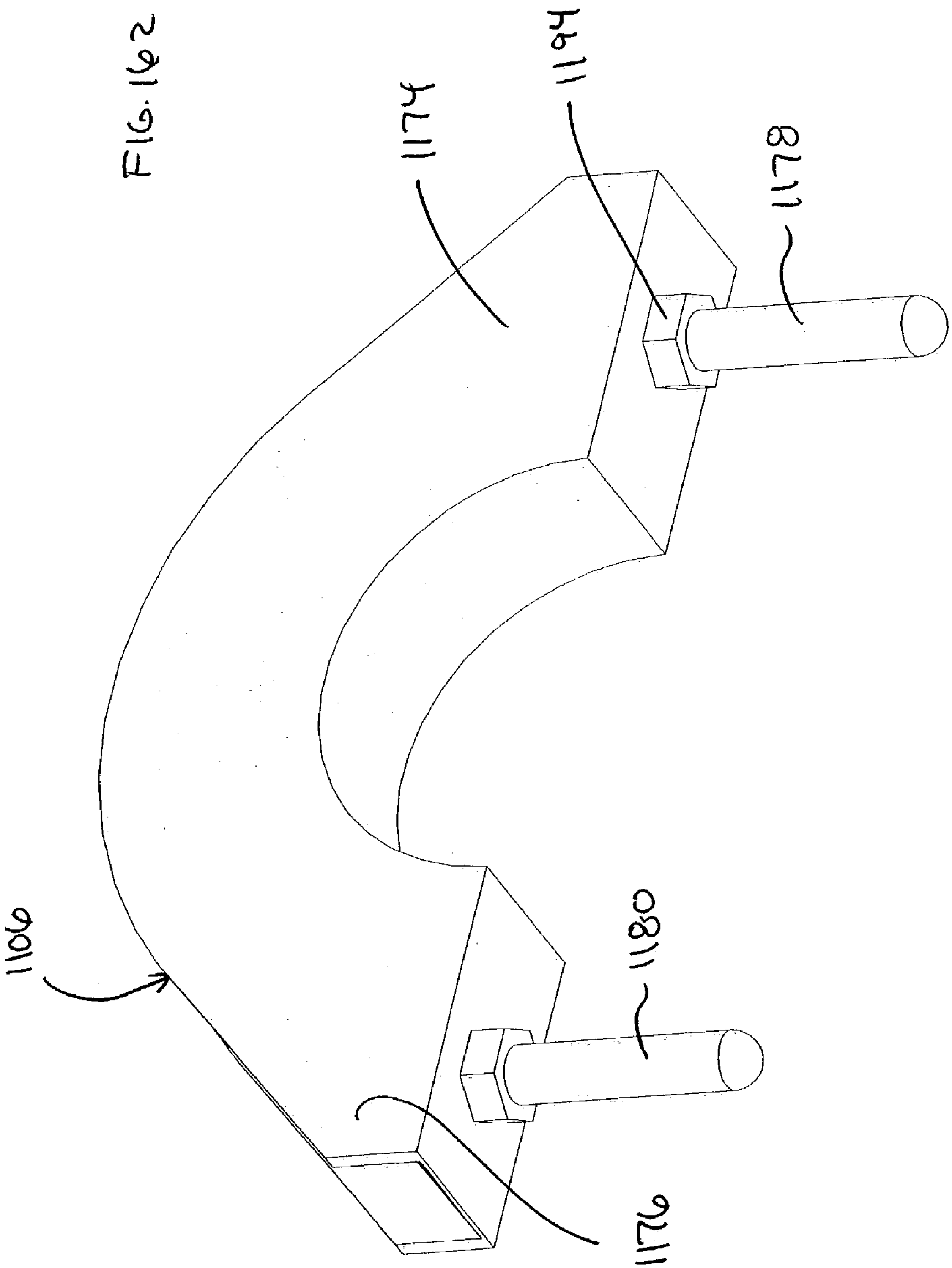
Figure 162A:
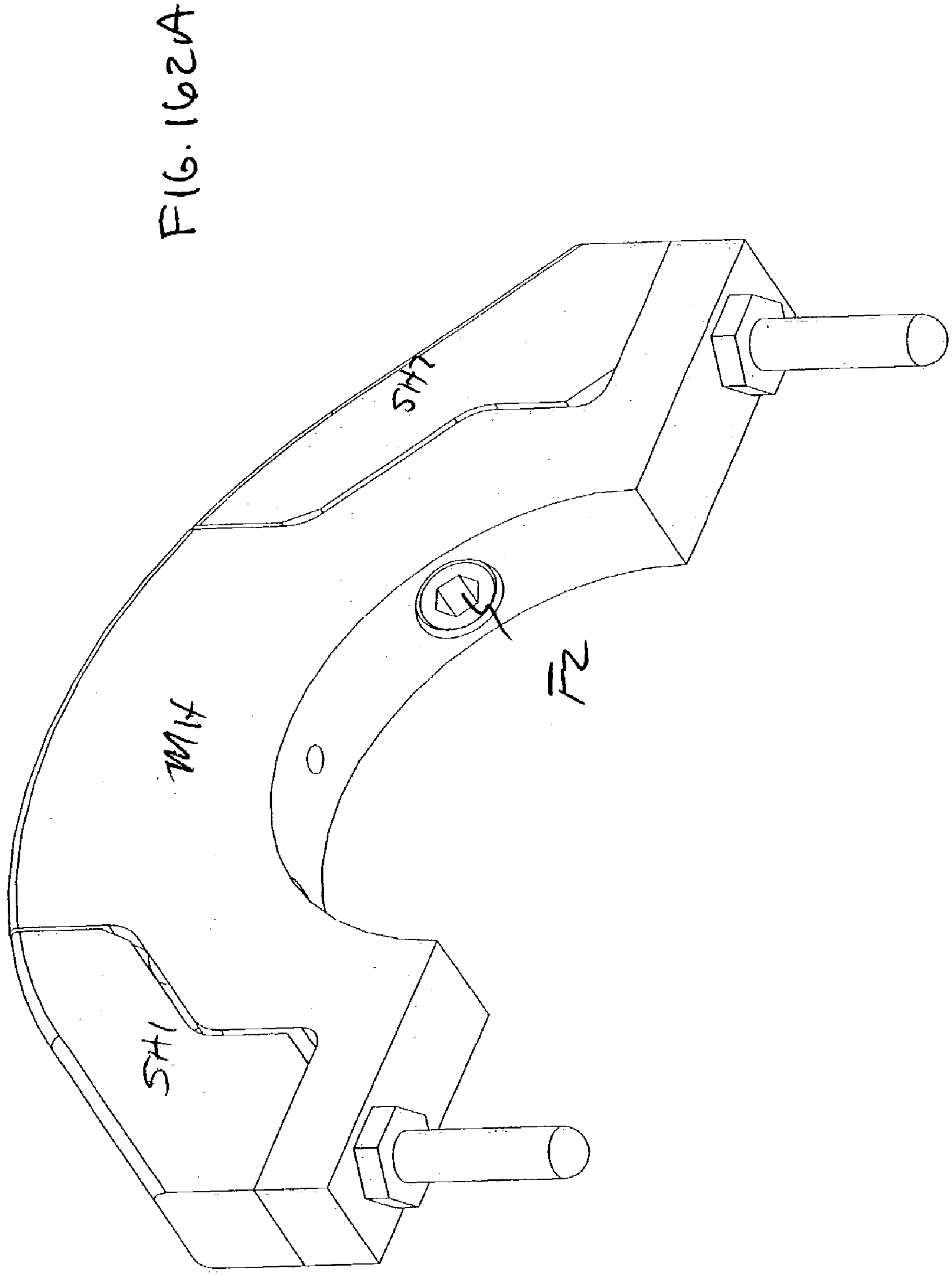
Figure 163:
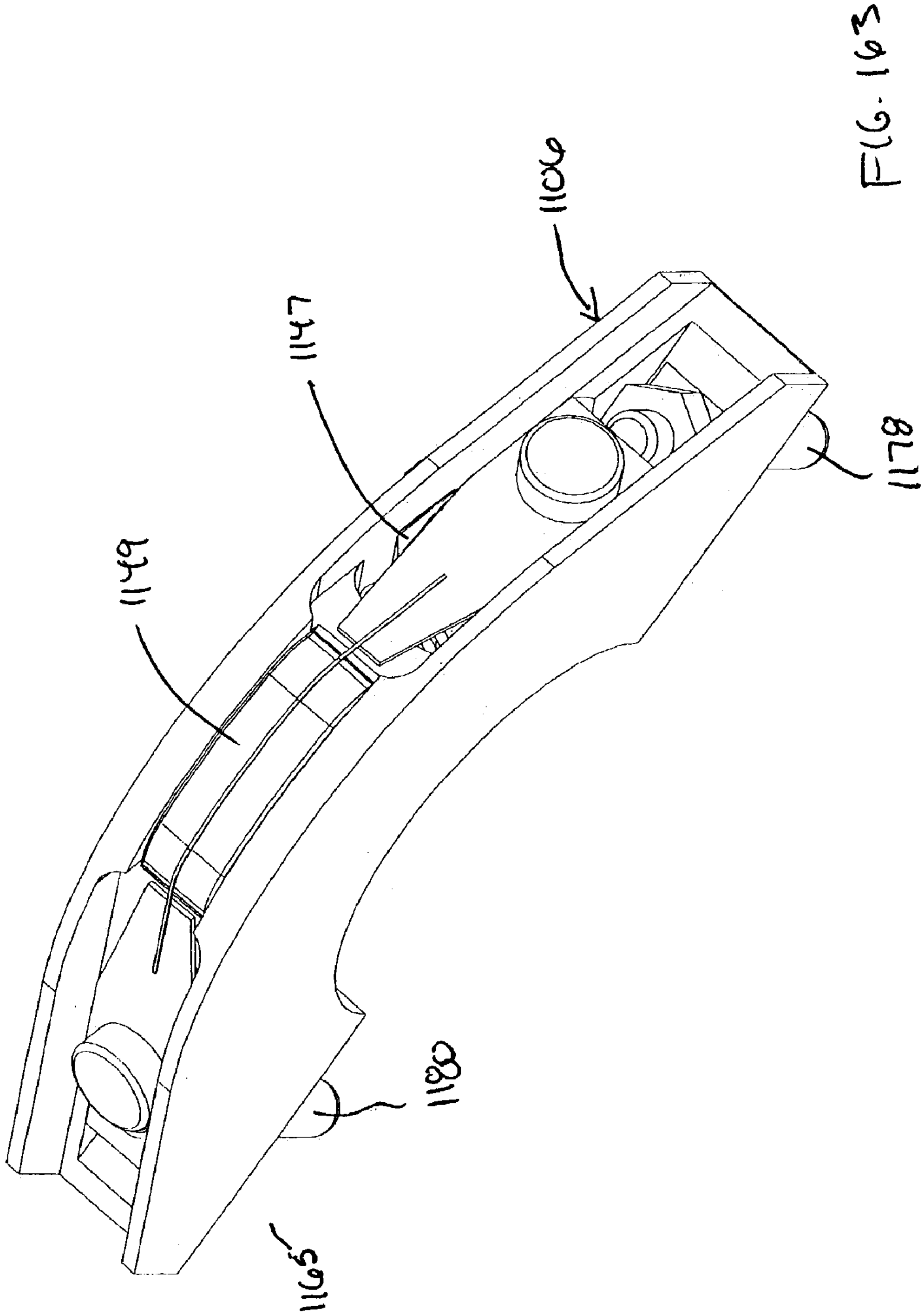
Figure 163A:
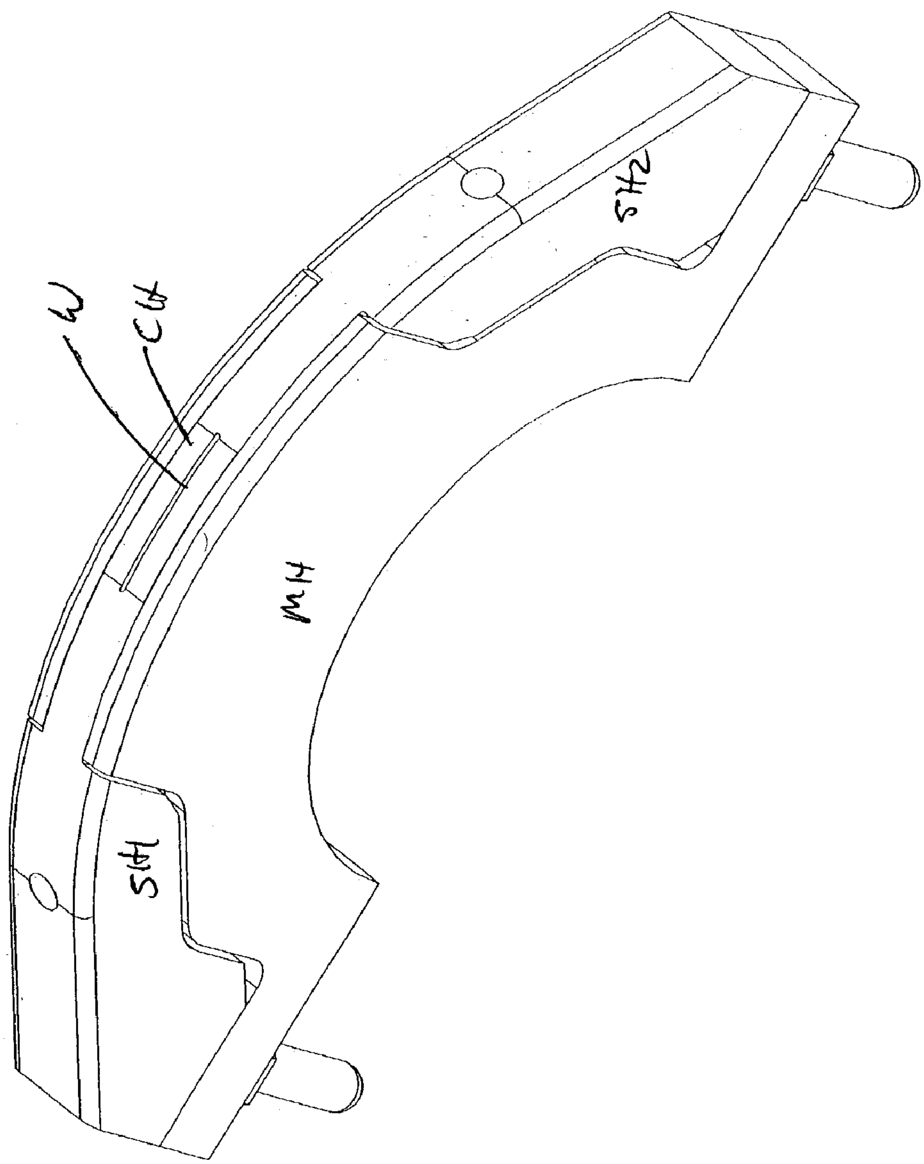

FIGS. 161 to 163 show alternate perspective views of the arbor assembly edge seal assembly with FIGS. 161 and 163 illustrating the seal wire tensioning means.

FIGS. 161A to 163A show alternate perspective views of the arbor assembly edge seal assembly of the second embodiment.

FIGS. 164 to 169 show various illustrations of the arbor housing with the edge seal wire and associated tensioning means removed for added clarity as to the receiving housing.

FIGS. 164A to 169A show various illustrations of the arbor housing with the edge seal wire and associated shoes removed for added clearly as to the receiving housing.

Figure 170:
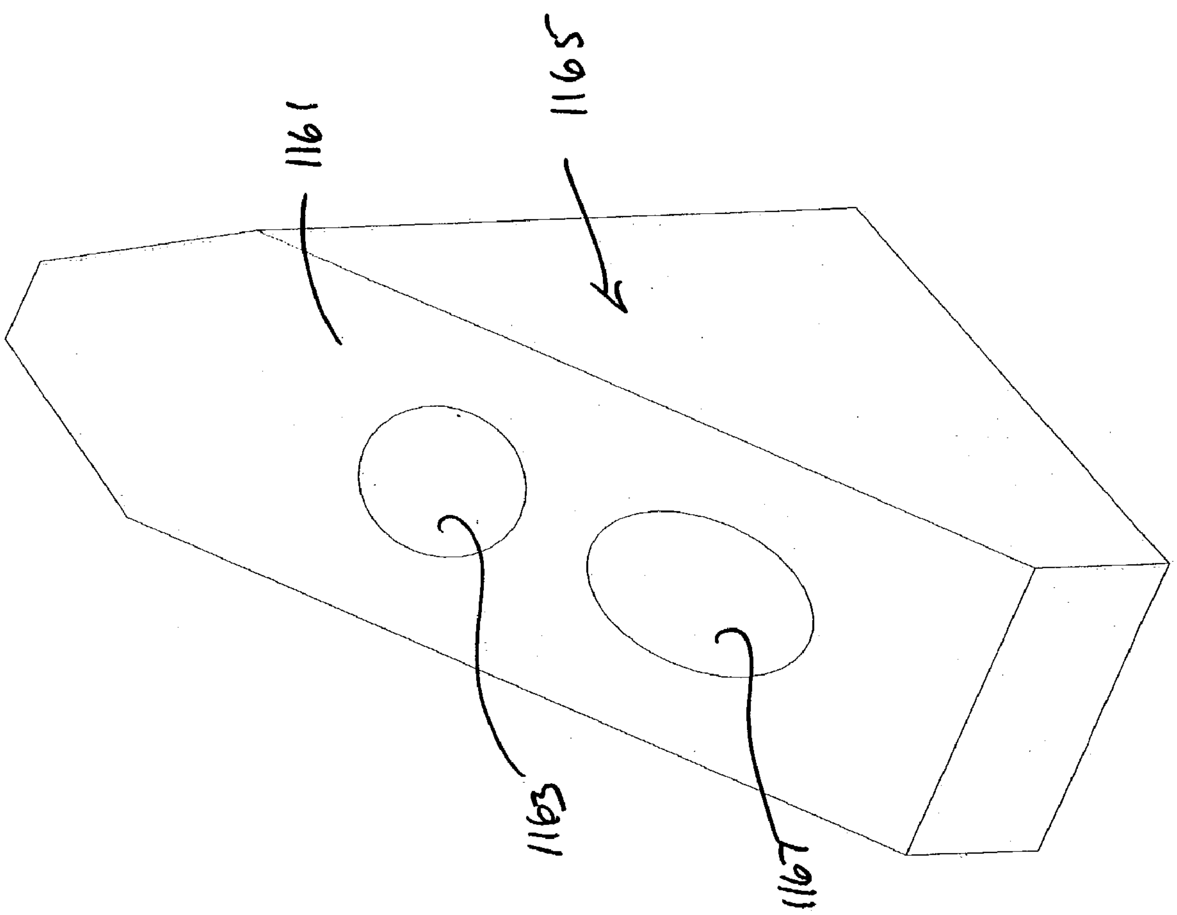
Figure 172:
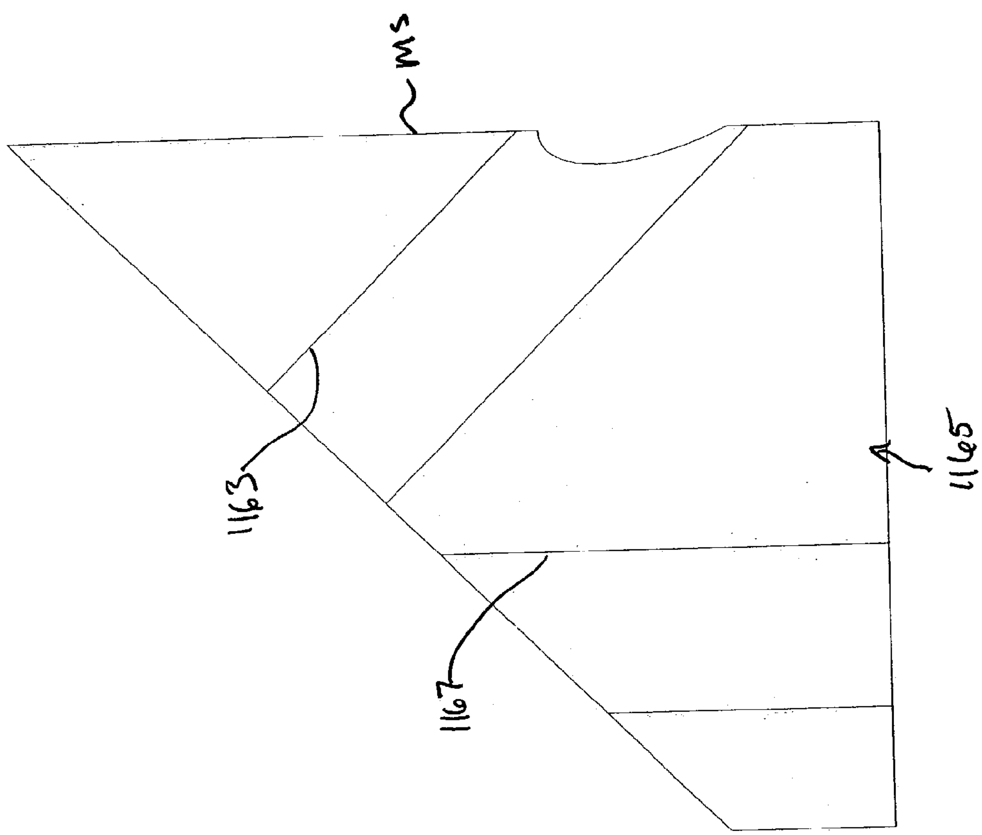

FIGS. 170 and 172 show perspective views of the wire end connector of the first edge seal embodiment.

Figure 170A:
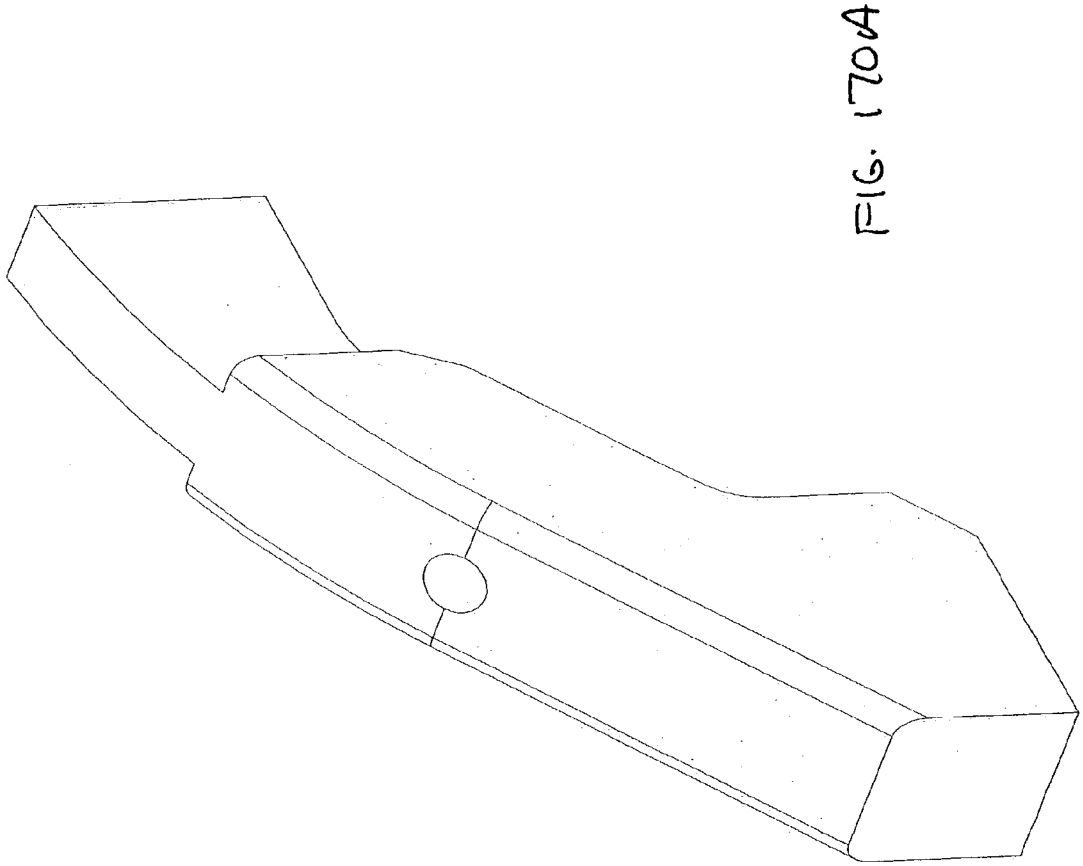
Figure 172A:
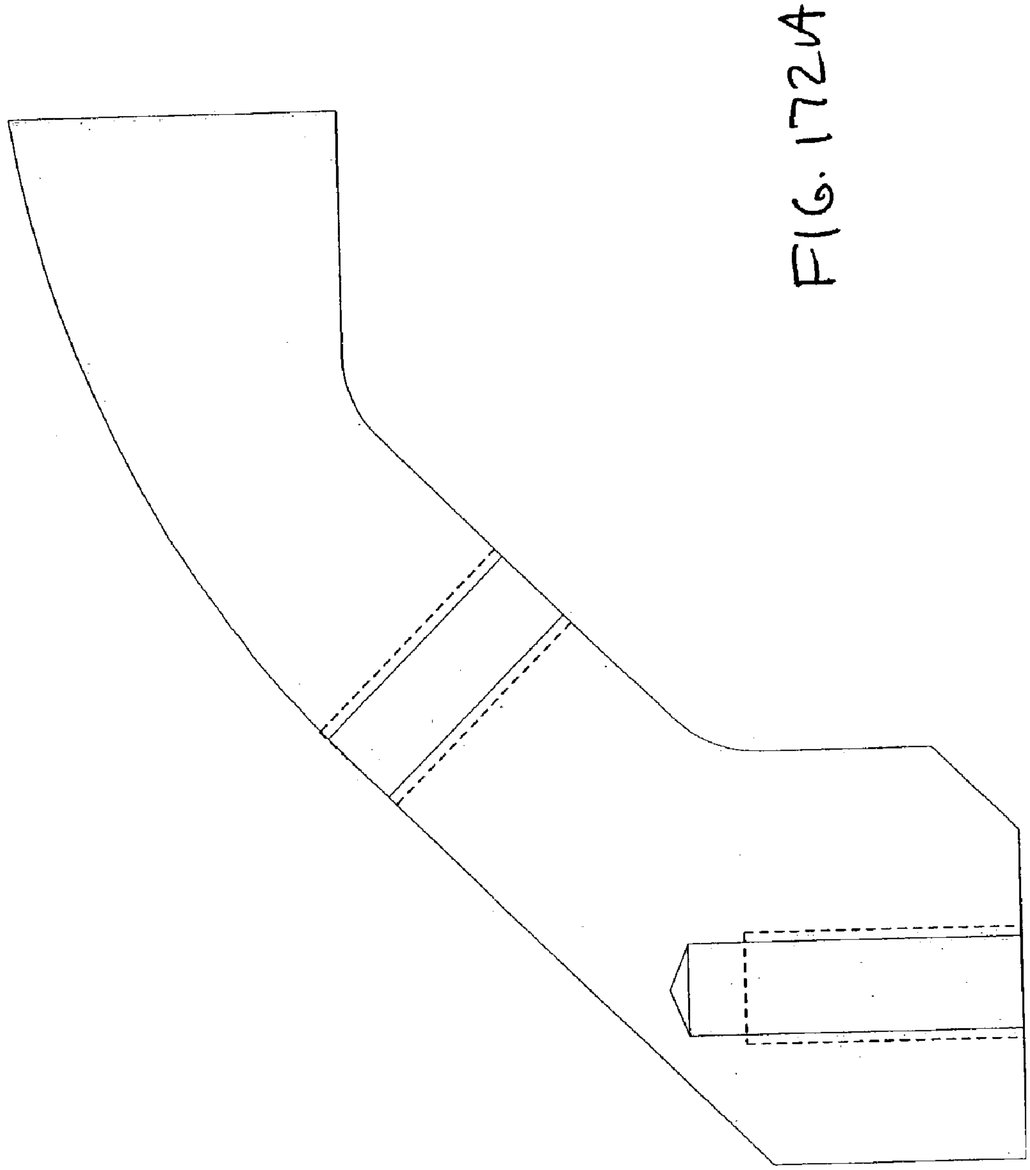

FIGS. 170A and 172A show perspective views of a shoe conductors of the second edge seal embodiment.

FIG. 173 shows a cross-sectional view of a wire connector.

Figure 173A:
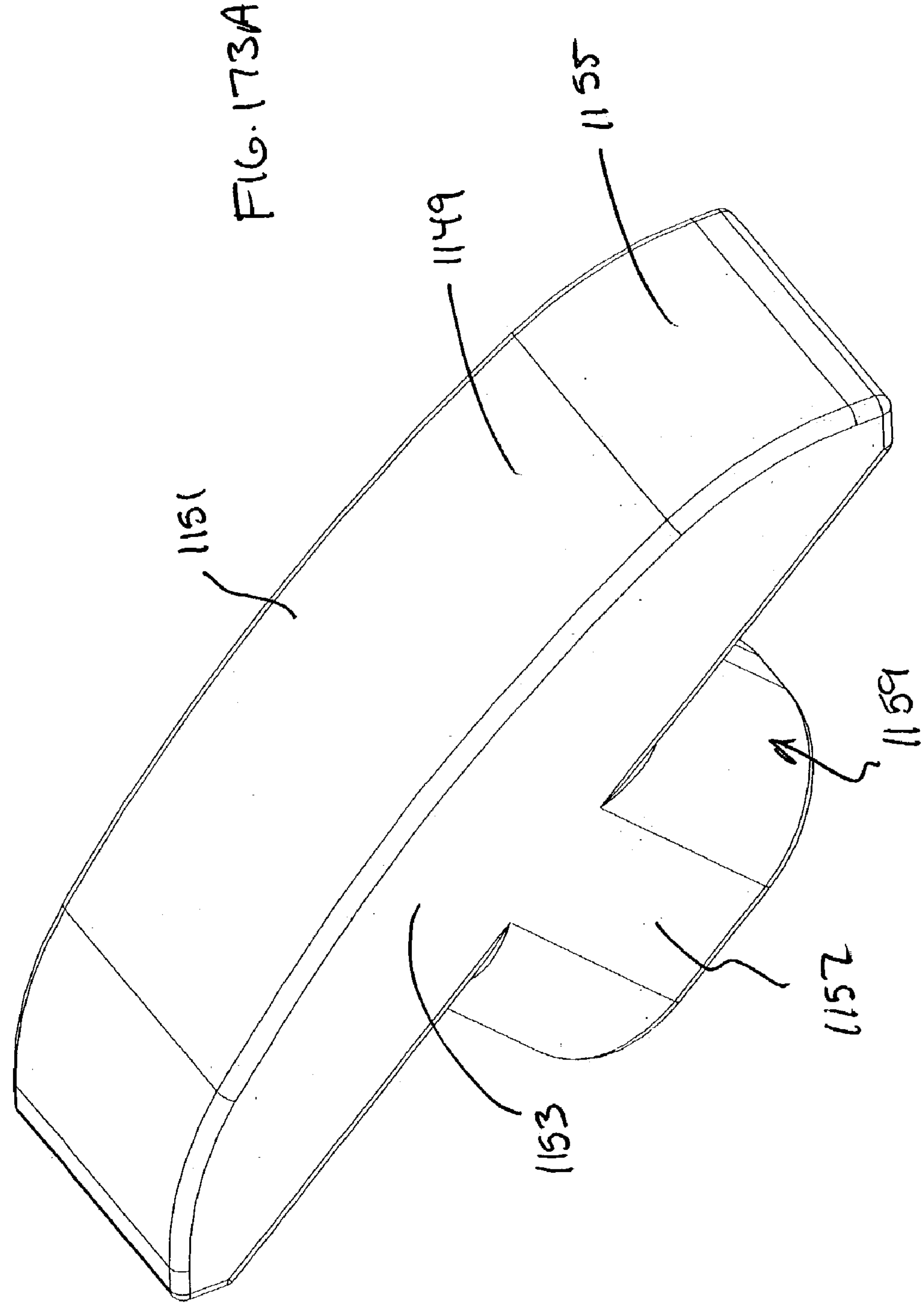
Figure 173B:
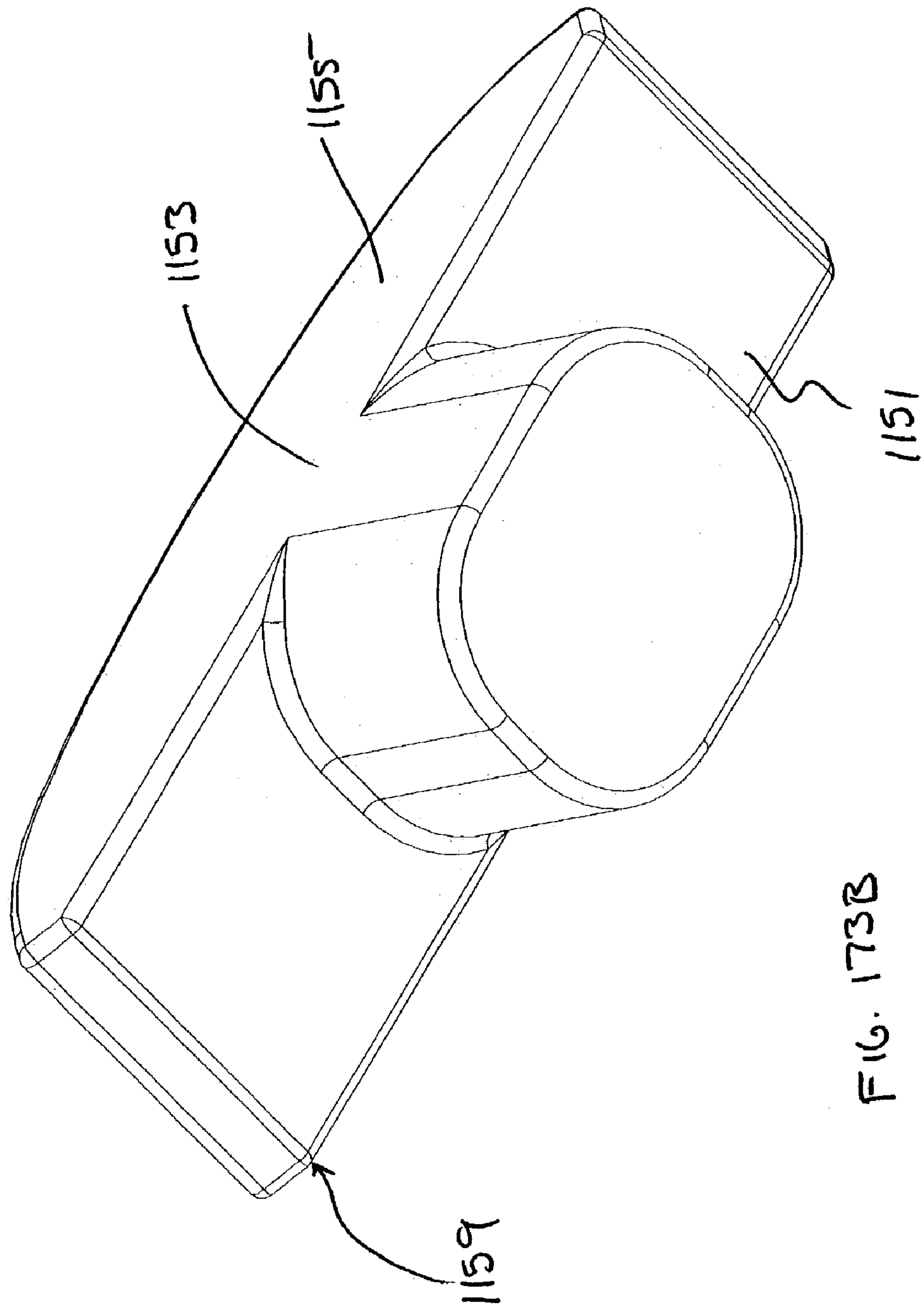

FIGS. 173A and 173B illustrate the ceramic head insert used in the arbor assembly in the first embodiment of the edge seal assembly.

Figure 173C:
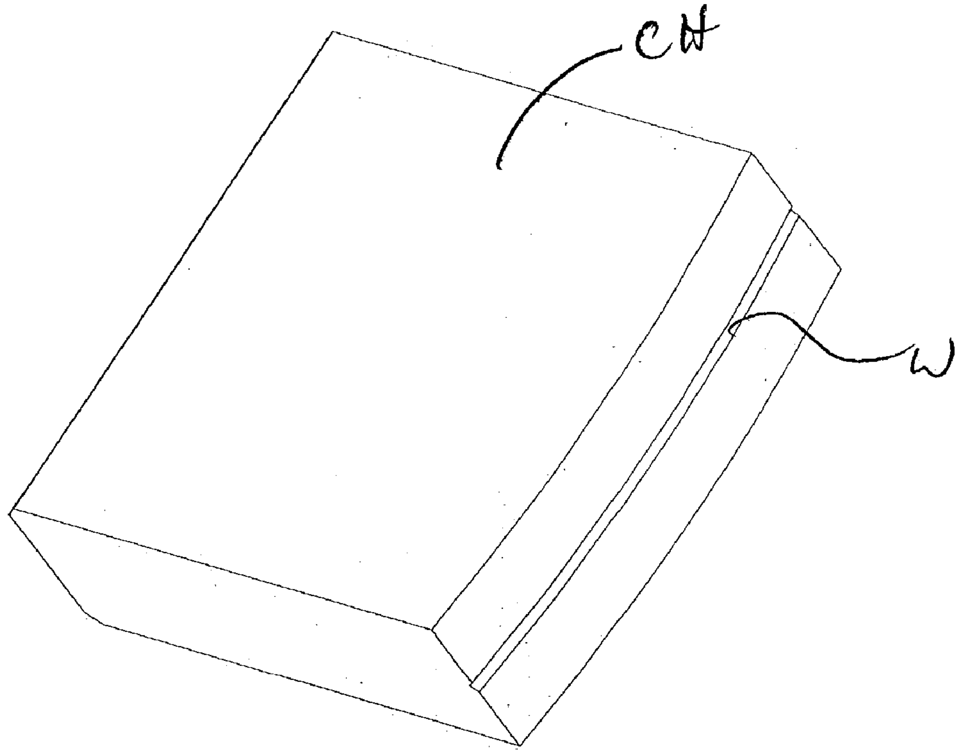
Figure 173D:
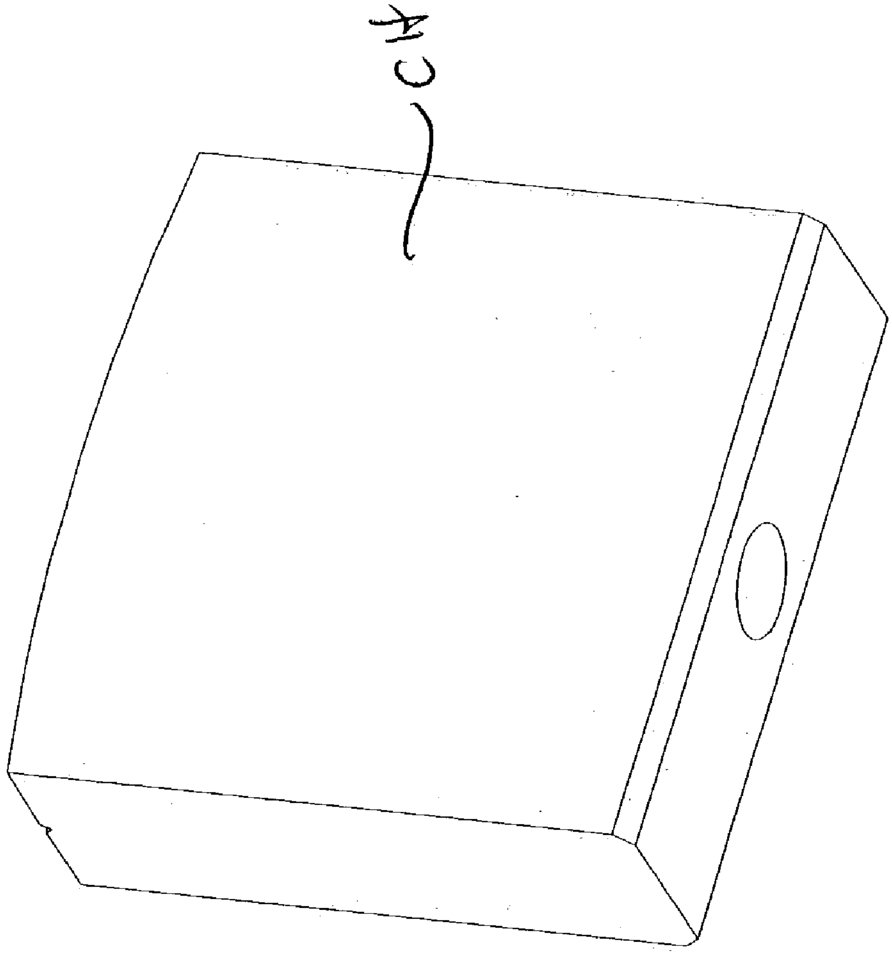

FIGS. 173C and 173D illustrate the head insert used in the arbor assembly of the second edge seal assembly embodiment.

Figure 174:
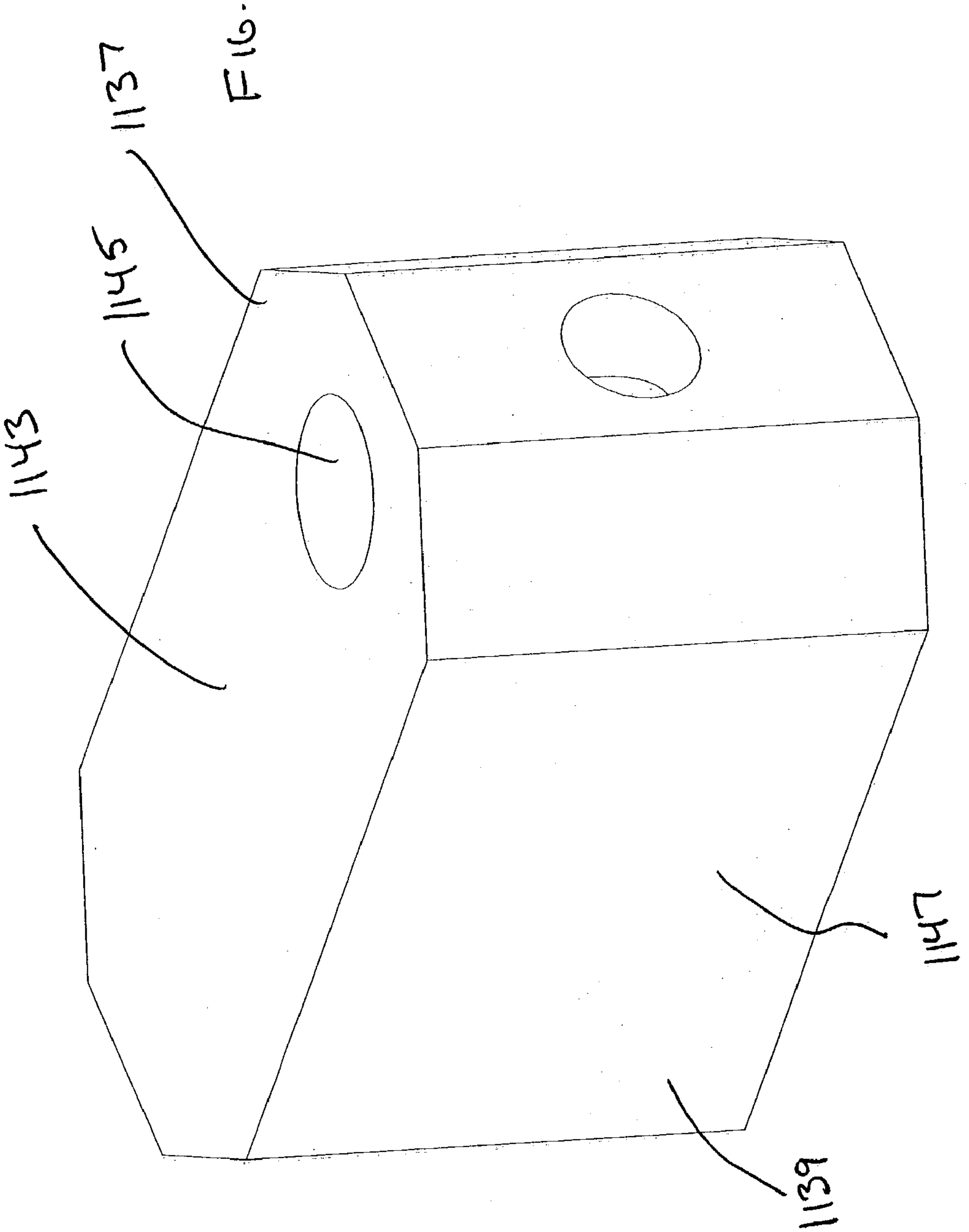
Figure 175:
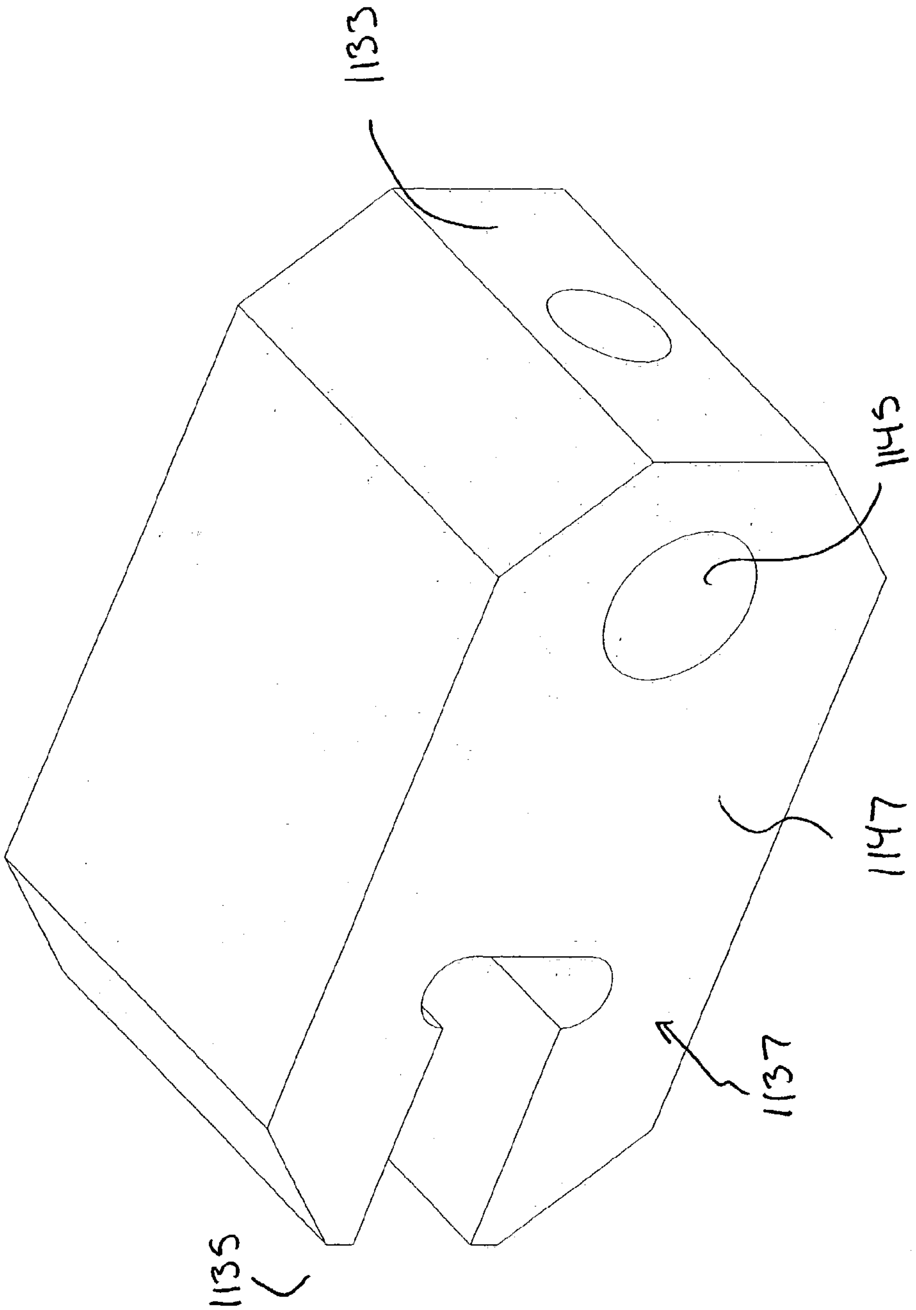
Figure 176:
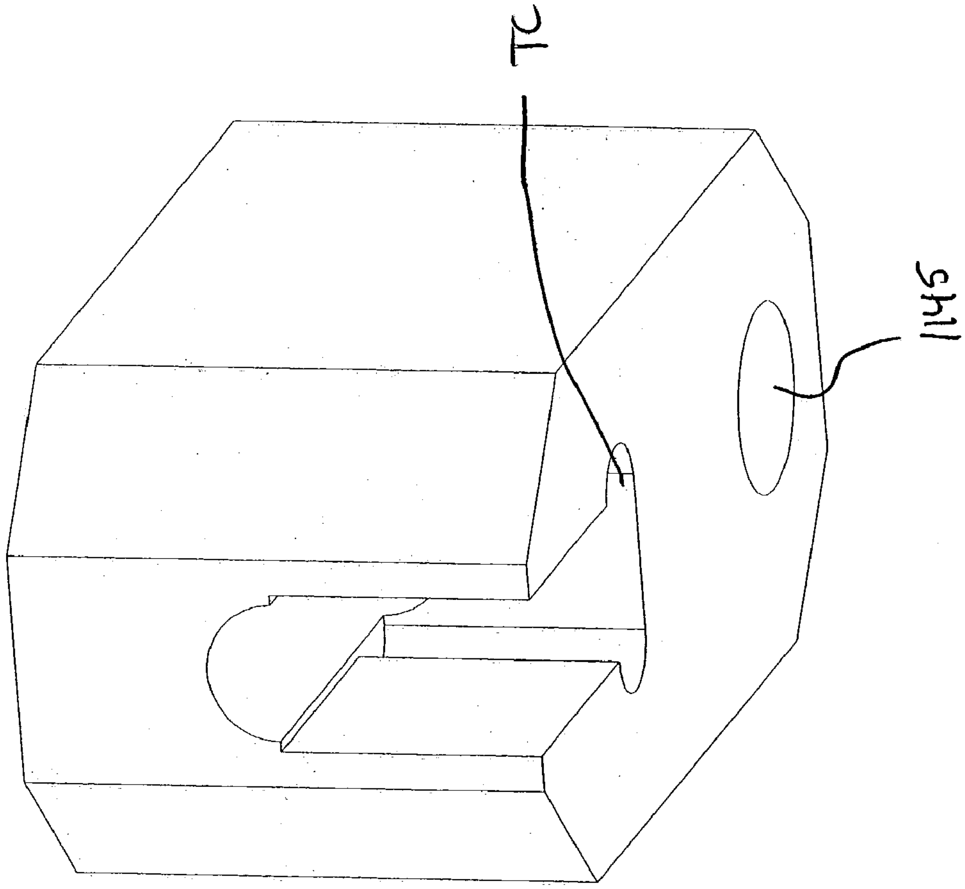

FIGS. 174 to 176 illustrate alternate perspective views of the edge wire tensioner block or moving mounting block.

Figure 177:
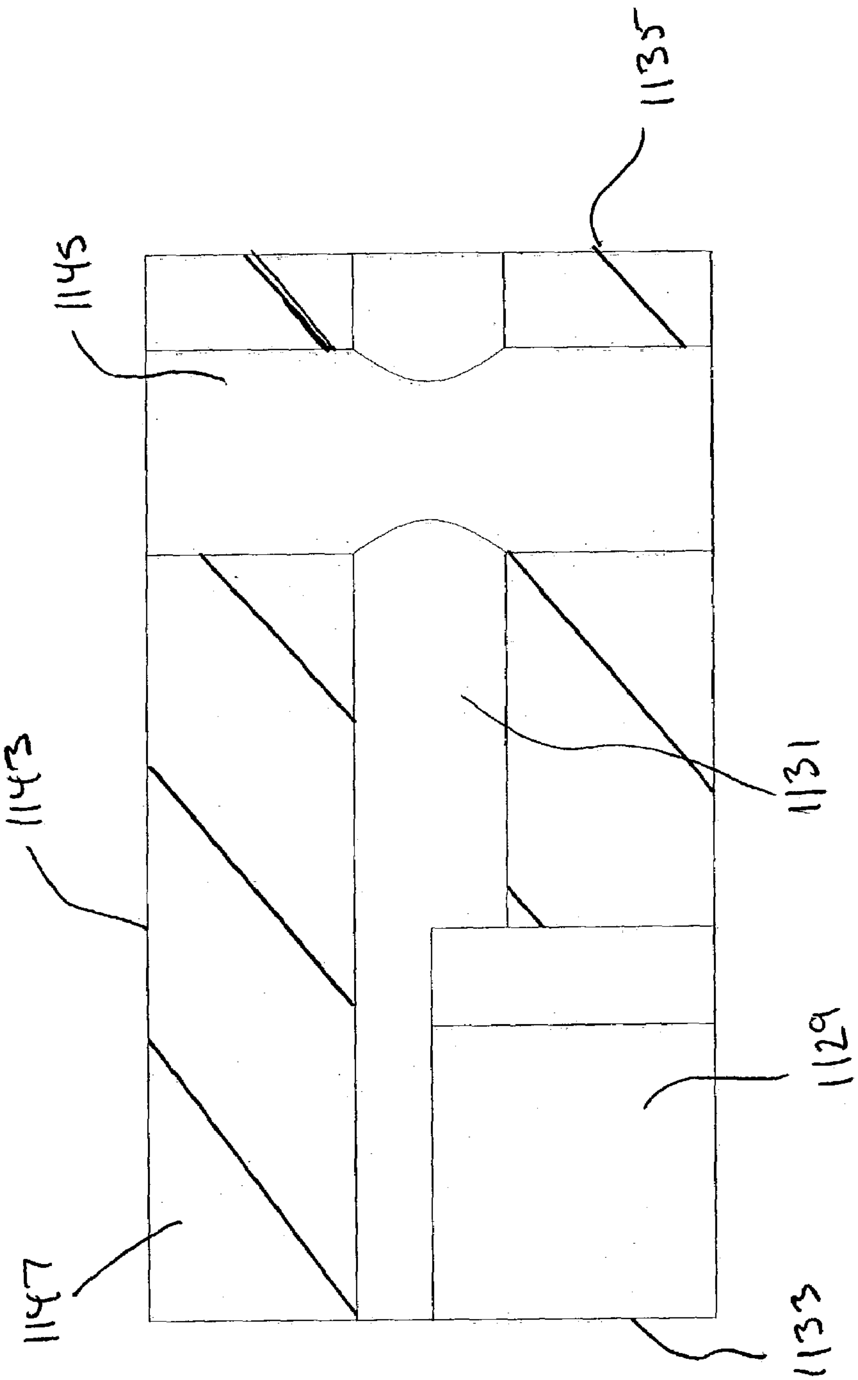

FIG. 177 shows a cross-sectional view of the tensioner block.

Figure 178:
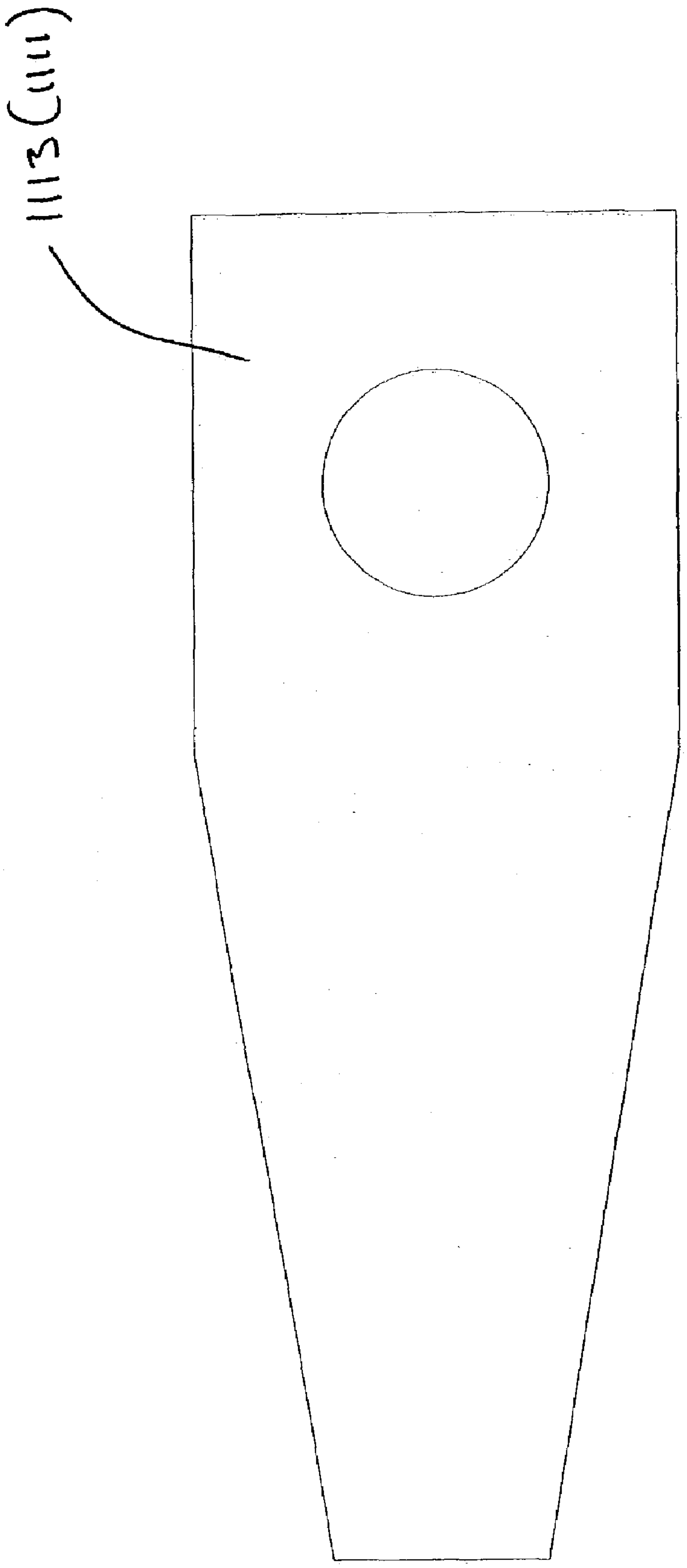

FIG. 178 shows a heater wire end connector in the wire tensioning assembly.

Figures 179, 180, 181, 182, 183, 184, 185:
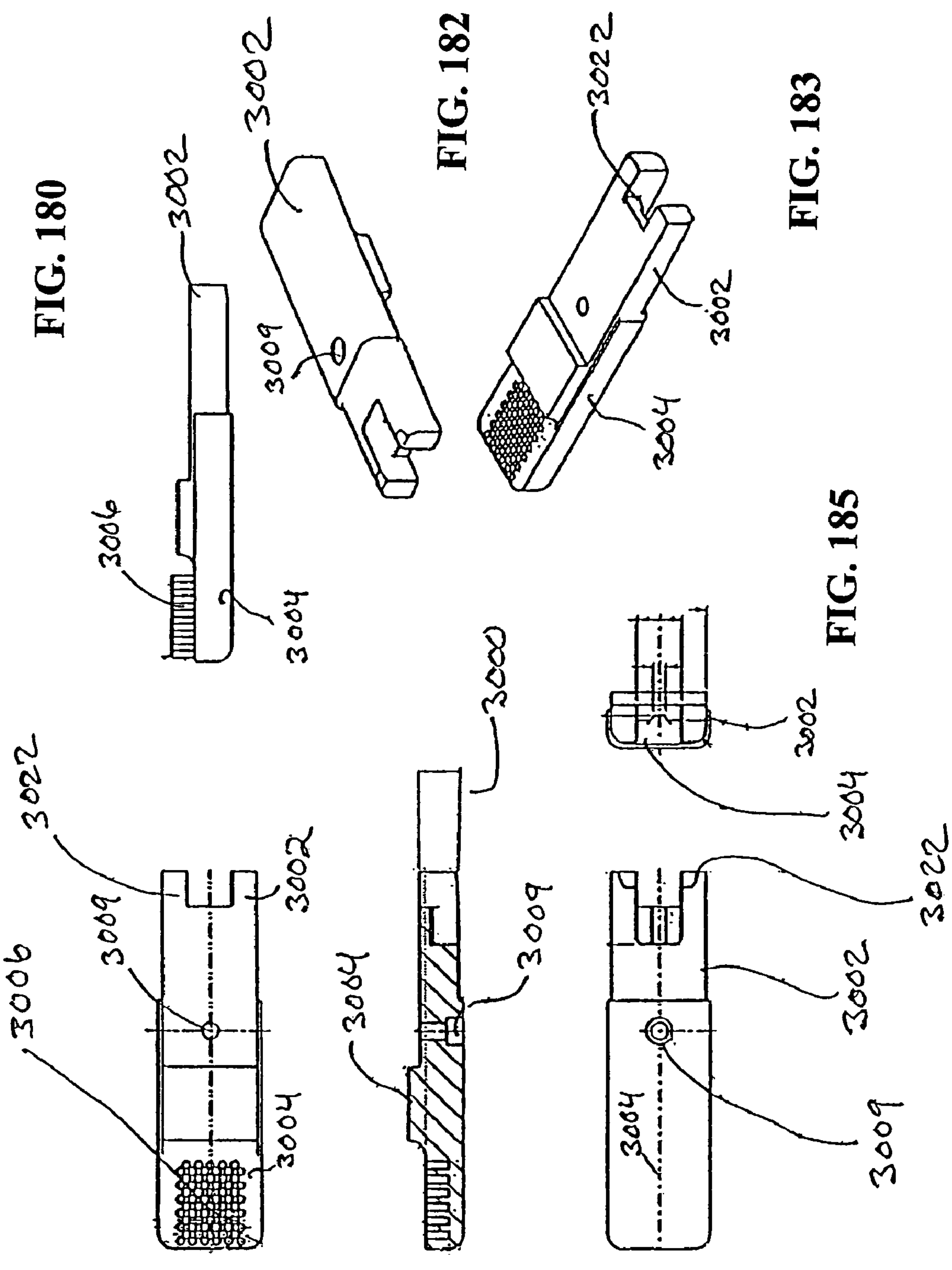

FIG. 179 shows a top plan view of the tip cleaning brush base.

FIG. 180 shows a side elevational view of that which is shown in FIG. 179 with added bristles.

FIG. 181 shows a cross-sectional view of the brush base.

FIG. 182 shows a bottom perspective view of the brush base.

FIG. 183 shows a top plan view of the brush base.

FIG. 184 shows a bottom plan view of the brush base.

FIG. 185 shows an end view of the brush base.

Figure 186:
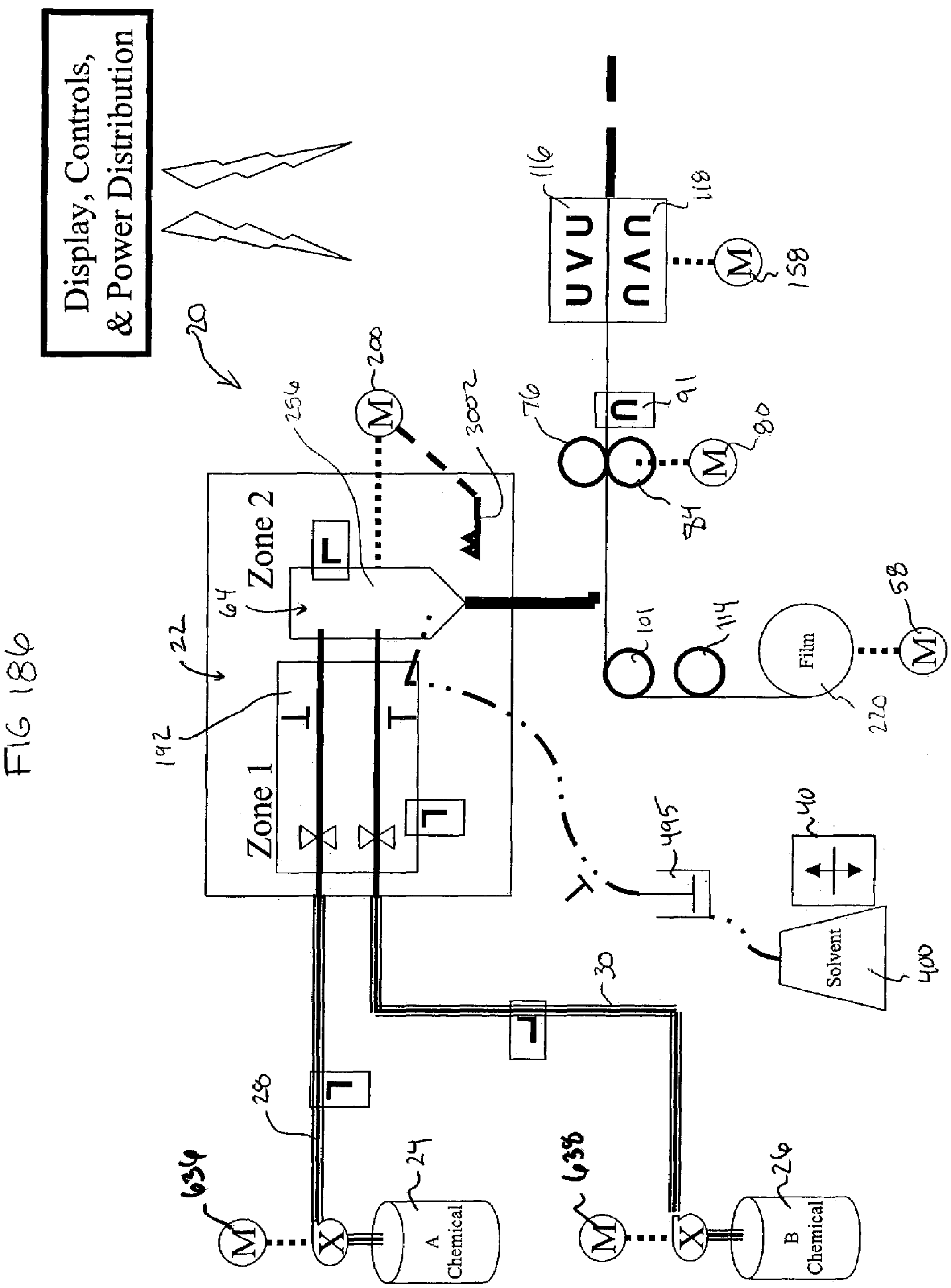

FIG. 186 shows an overall dispenser assembly sub-systems schematic view of the display, controls and power distribution for a preferred foam-in-bag dispenser embodiment.

Figure 186A:
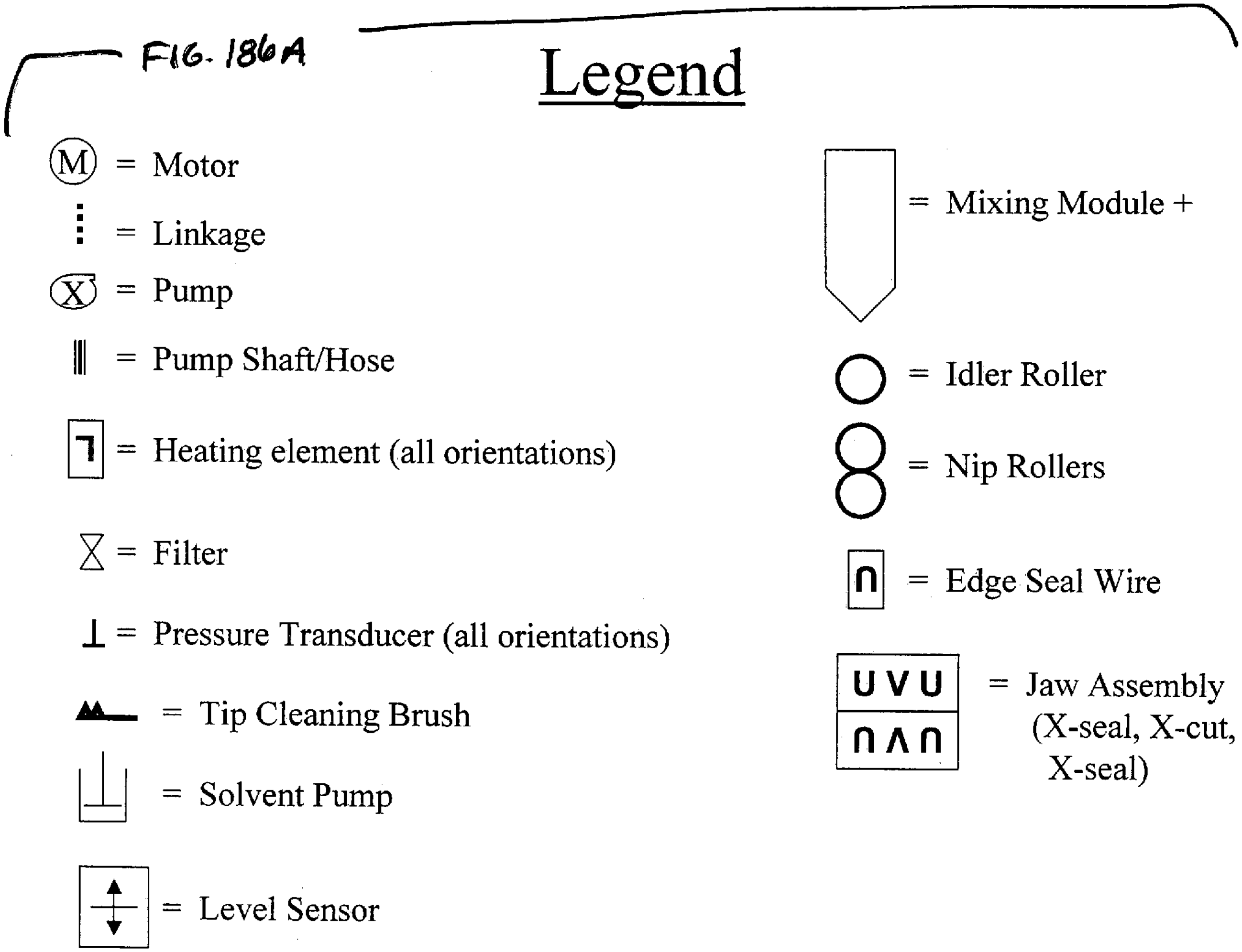

FIG. 186A provides a legend key for the features shown schematically in FIG. 186.

Figure 187:
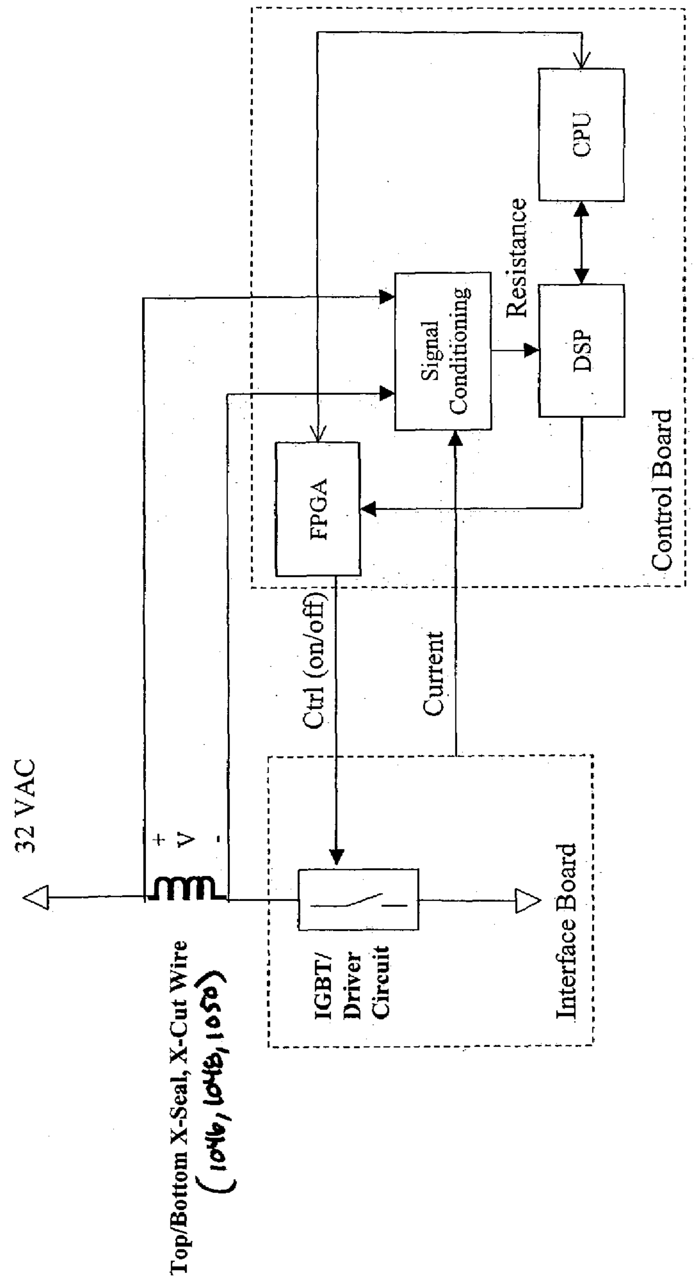

FIG. 187 shows a schematic view of the control, interface and power distribution features for the heated cross cut and cross seal wires in the bag forming assembly of the present invention.

Figure 188:
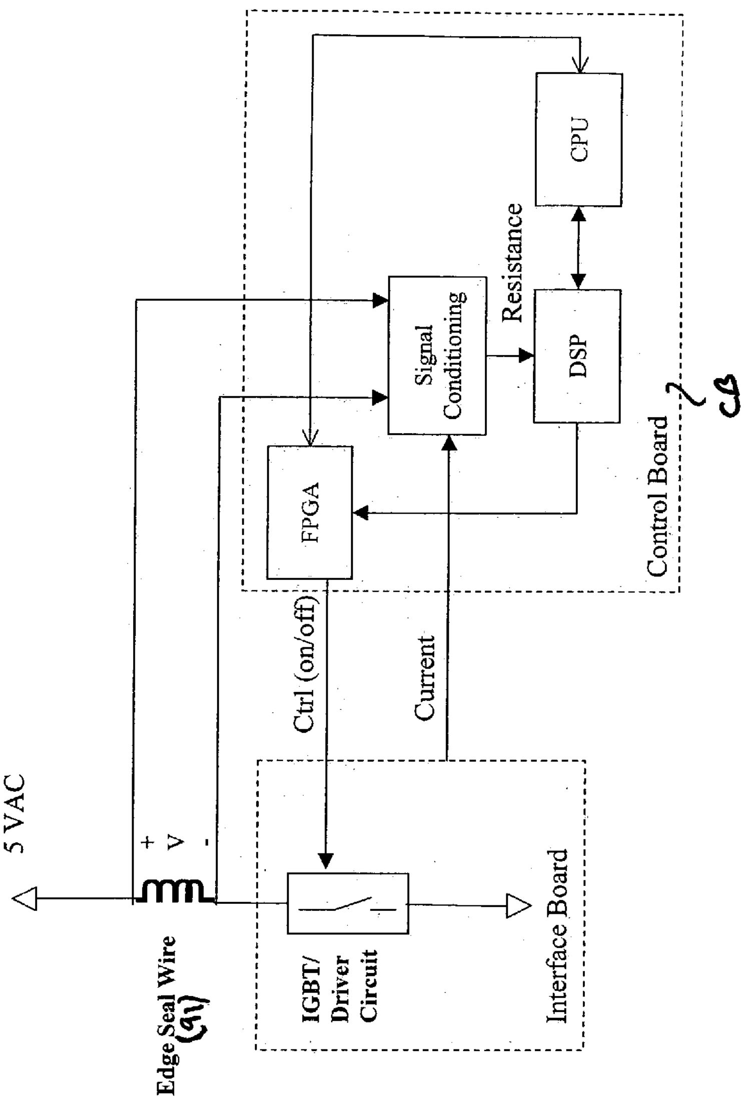

FIG. 188 shows a schematic view of the control, interface and power distribution features for the heated edge seal wire.

Figure 189:
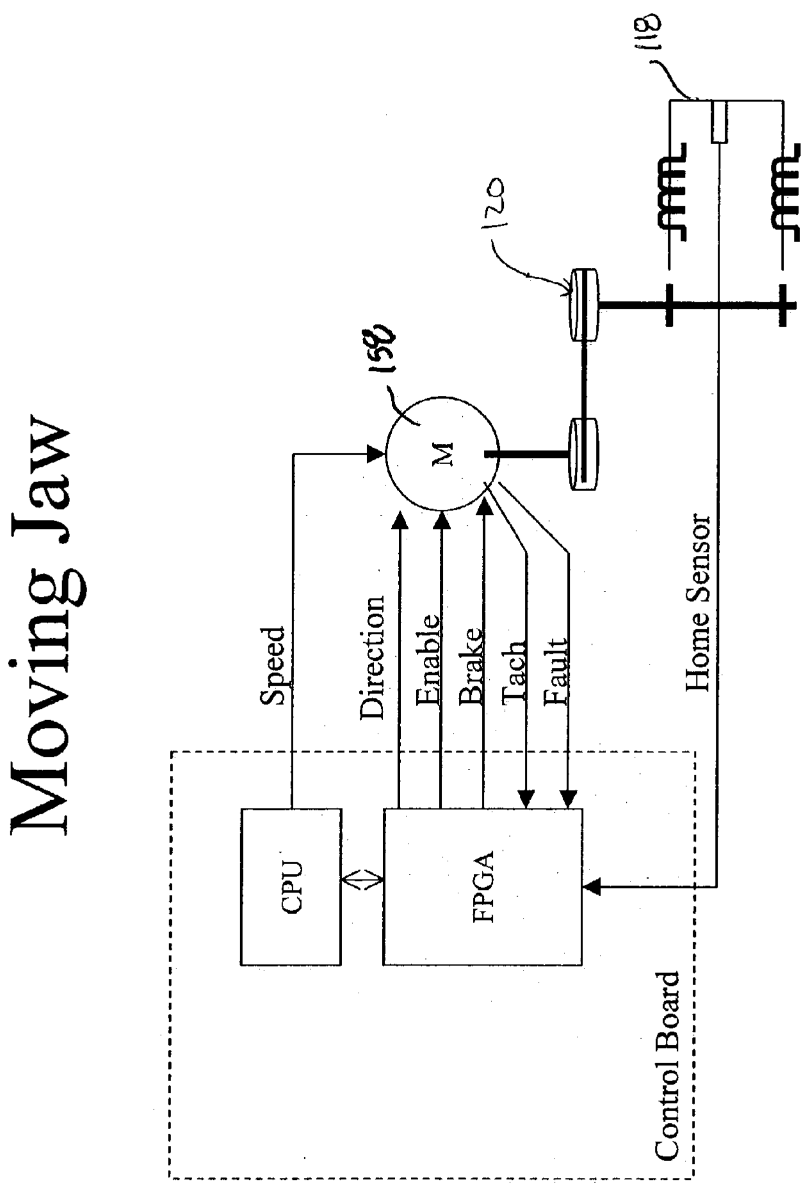

FIG. 189 shows a schematic view of the controls, interface and power distribution features for the moving jaw with cross cut and seal wiring.

Figure 190:
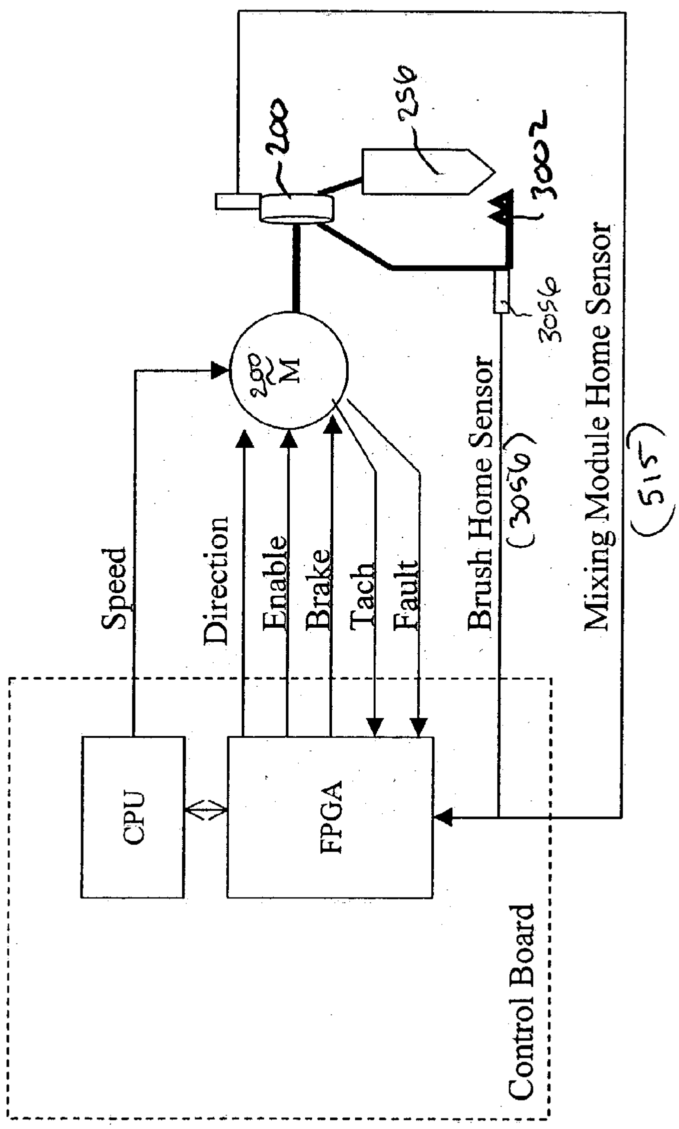

FIG. 190 shows a schematic view of the control, interface and power distribution features for the rod moving mechanism for chemical dispensing and the dispenser tip cleaning system.

Figure 191:
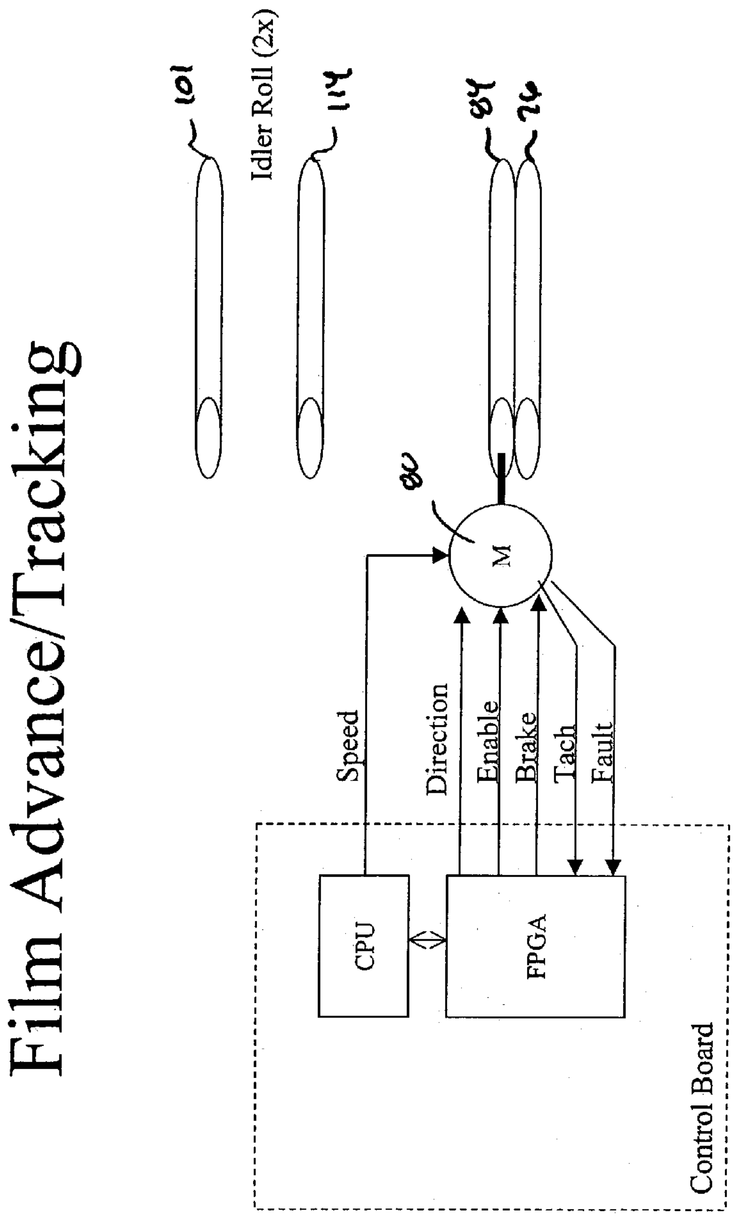

FIG. 191 shows an illustration of the control, interface and power distribution features for the film advance and tracking system of the present invention.

Figure 192:
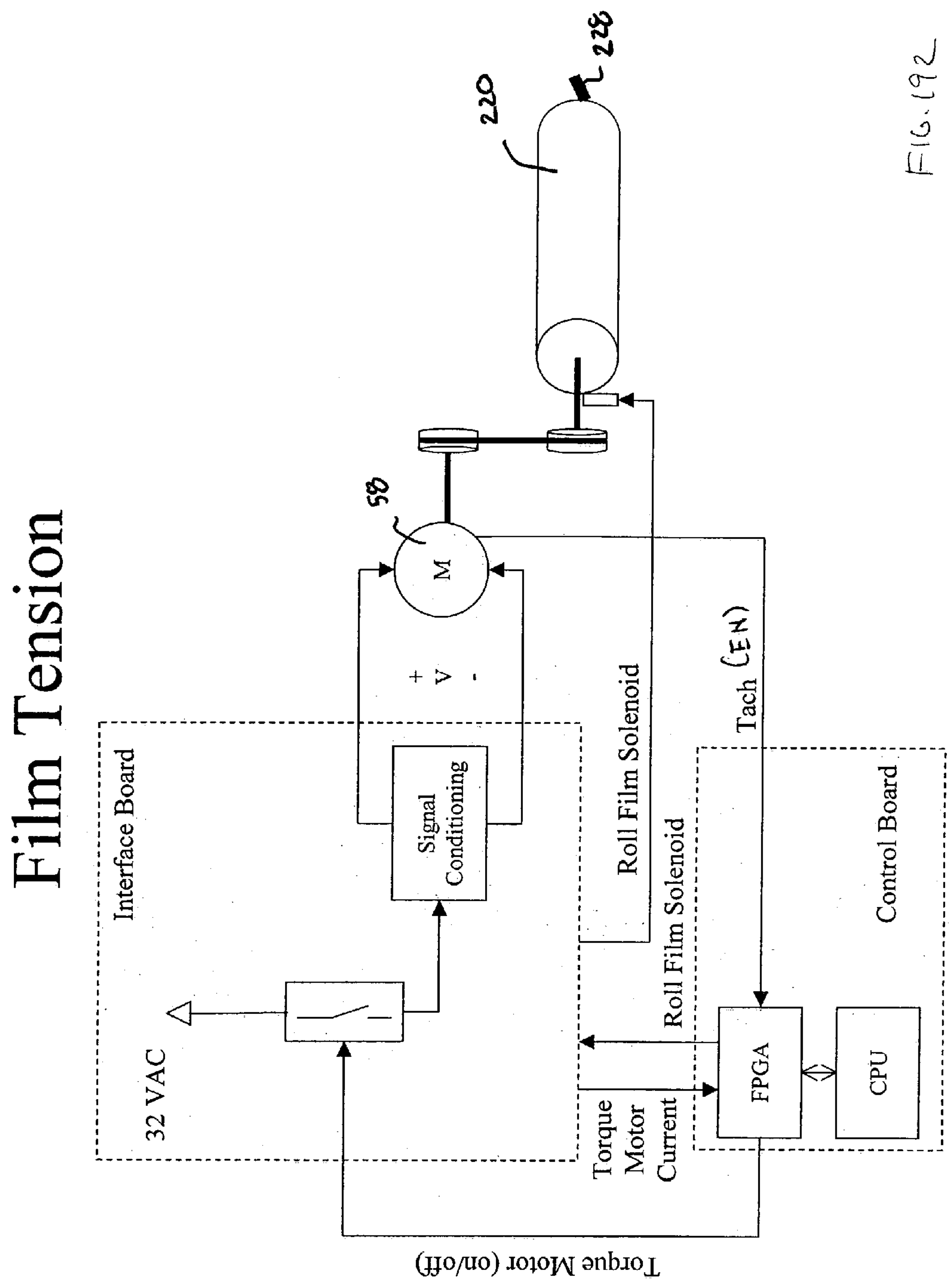

FIG. 192 shows an illustration of the control, interface and power distribution features for the film web tensioning system of the present invention.

Figure 193:
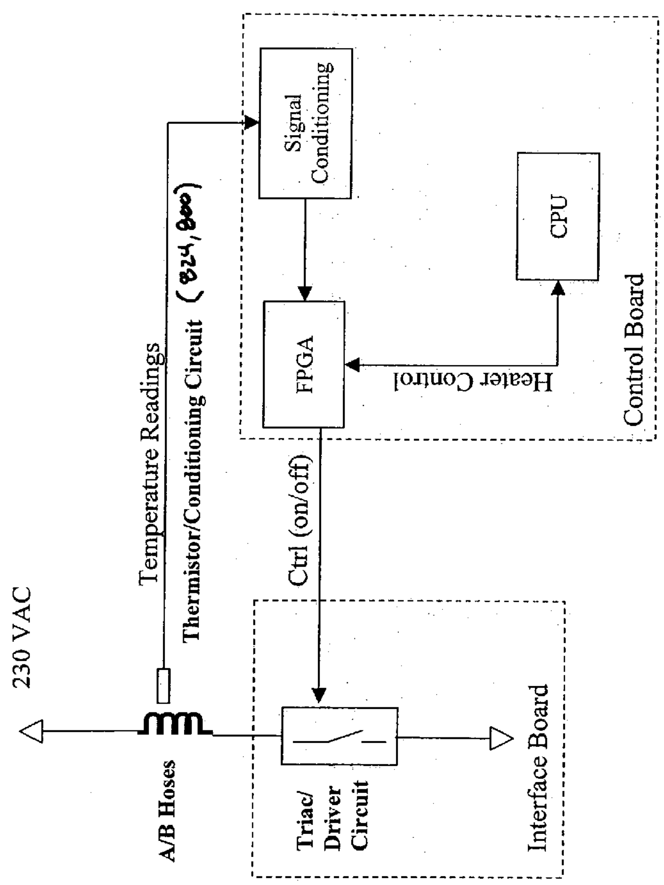

FIG. 193 shows an illustration of the control, interface and power distribution features for the heated and temperature monitored chemical hoses of the present invention.

Figure 194:
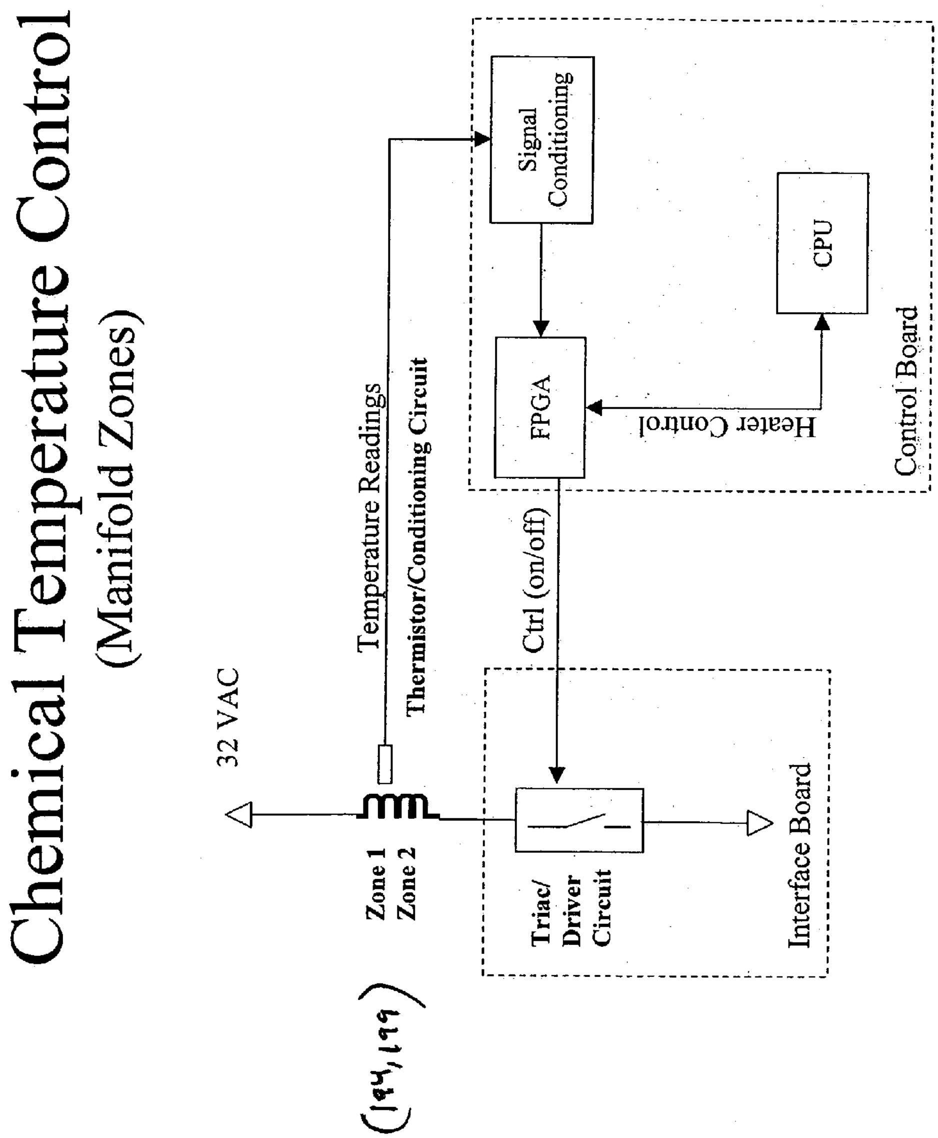

FIG. 194 shows an illustration of the control, interface and power distribution features for the heaters used in the main manifold and dispenser housing to maintain the chemical flowing therethrough at the desired set temperature through use of heater cartridges in the main manifold and dispenser housing adjacent flow passageways formed in the manifold and housing.

Figure 195:
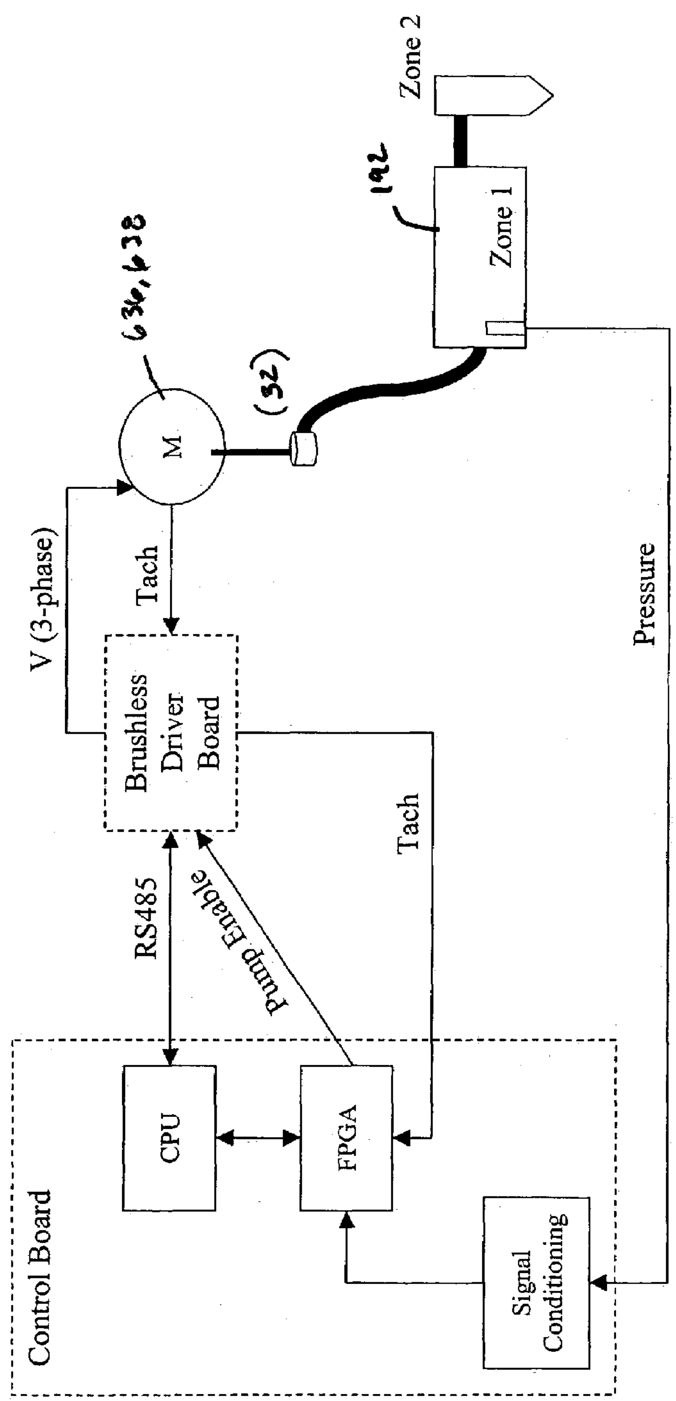
Figure 196:
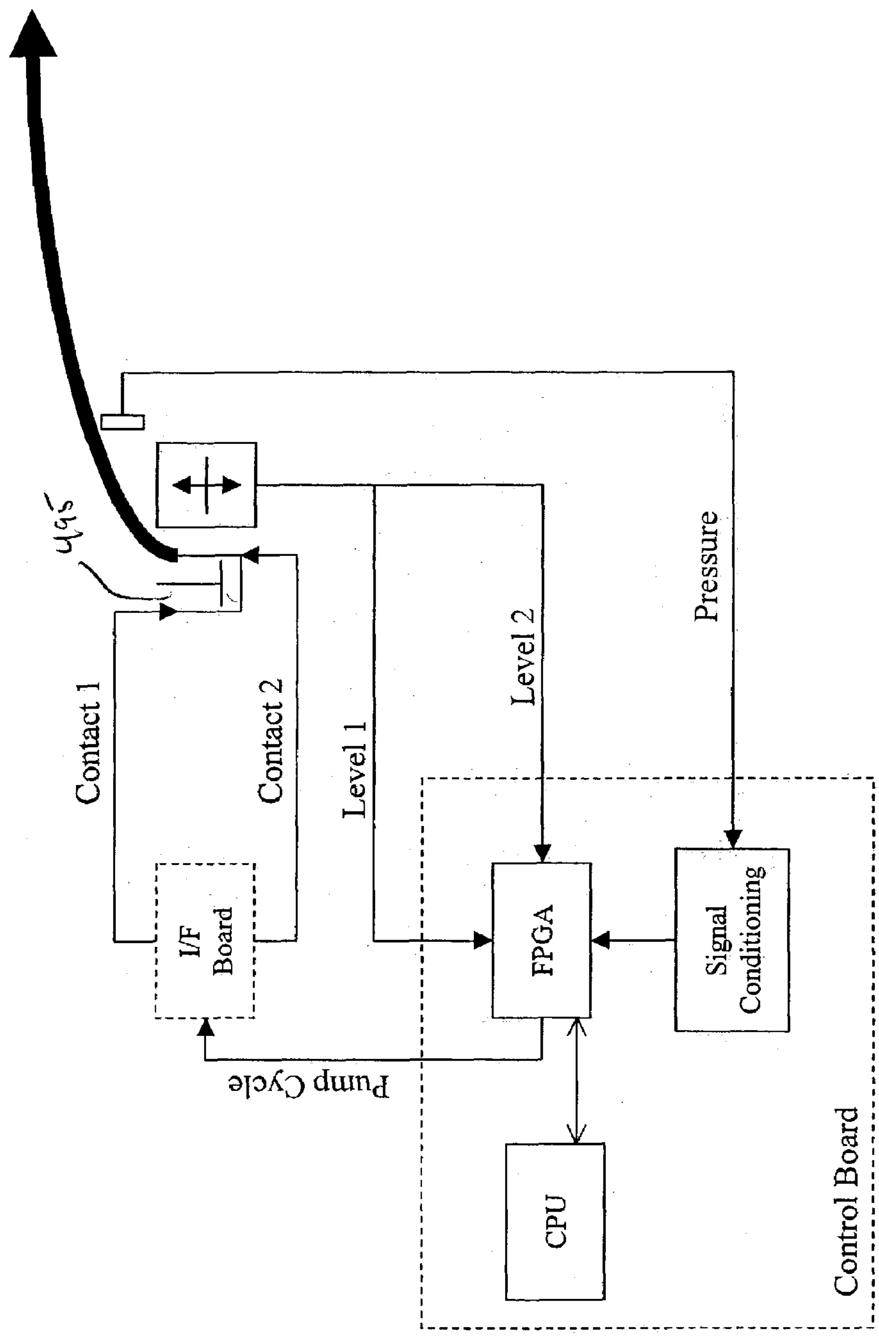

FIG. 195 shows an illustration of the control, interface and power distribution features for the pump system feeding chemical to the dispenser FIG. 196 shows an illustration of the control, interface and power distribution features of the solvent supply system.

Figure 197:
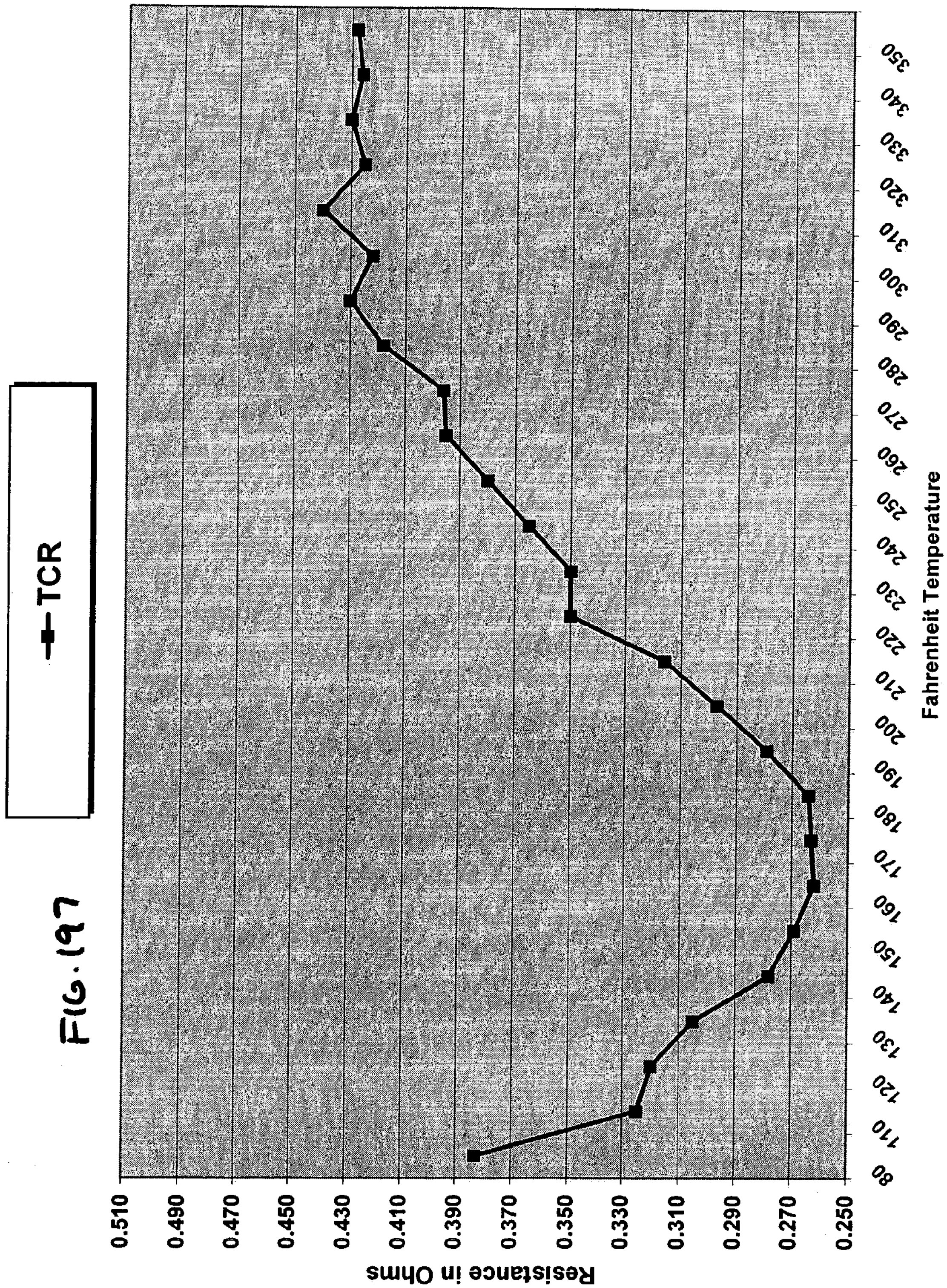

FIG. 197 shows plotted TCR values based on the temperature and resistance values set forth in Table 1 of the present application.

Figure 198:
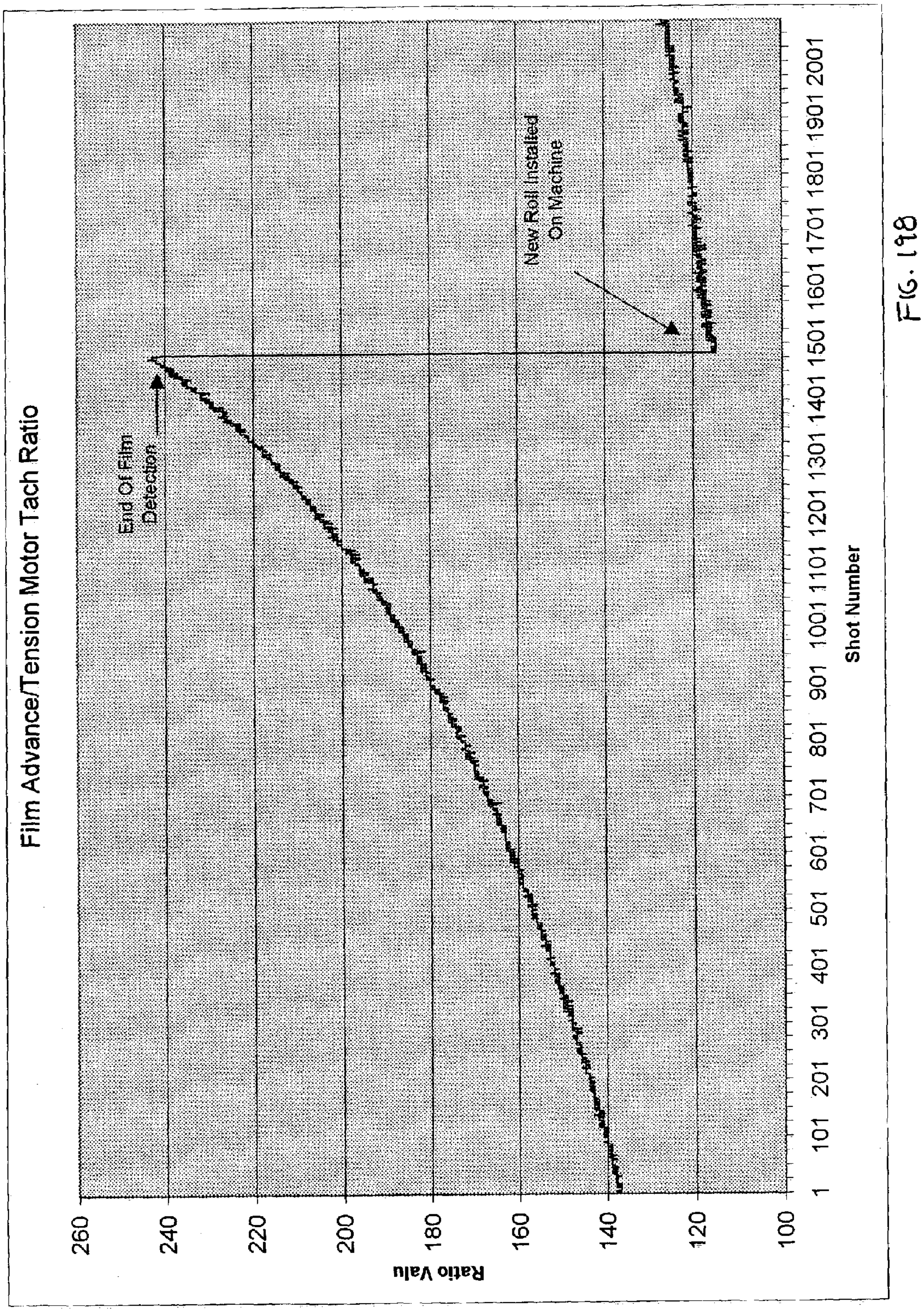

FIG. 198 shows a comparison of ratio value (ratio of accumulated tachometer pulses of film tension motor divided by the accumulated tachometer pulses of film advance motor) versus number of dispenser shots brought about by a control board comparison of the encoder signals from the respective film advance and film tension motors.

Figure 199:
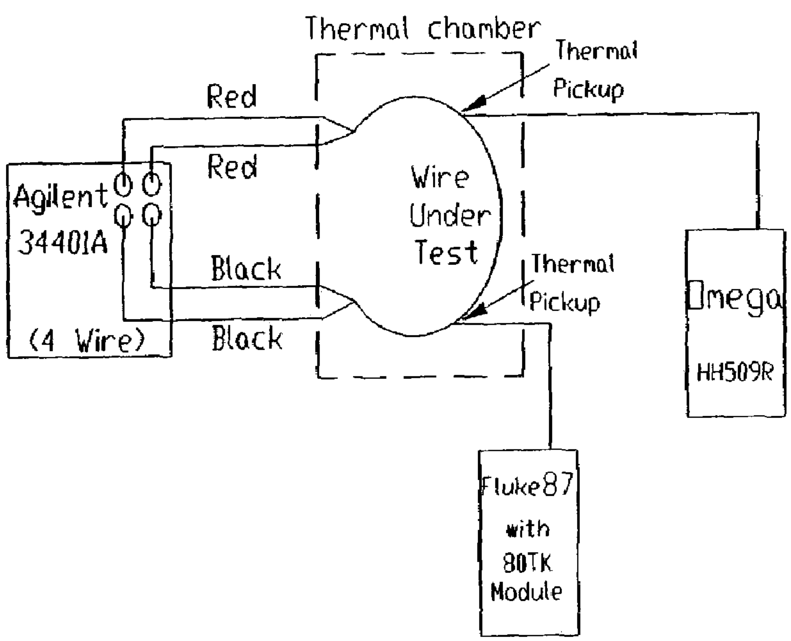

FIG. 199 shows a testing apparatus for use in testing temperature versus resistance for heater wires.

DETAILED DESCRIPTION OF THE PREFERRED EMBODIMENTS

Figure 1:
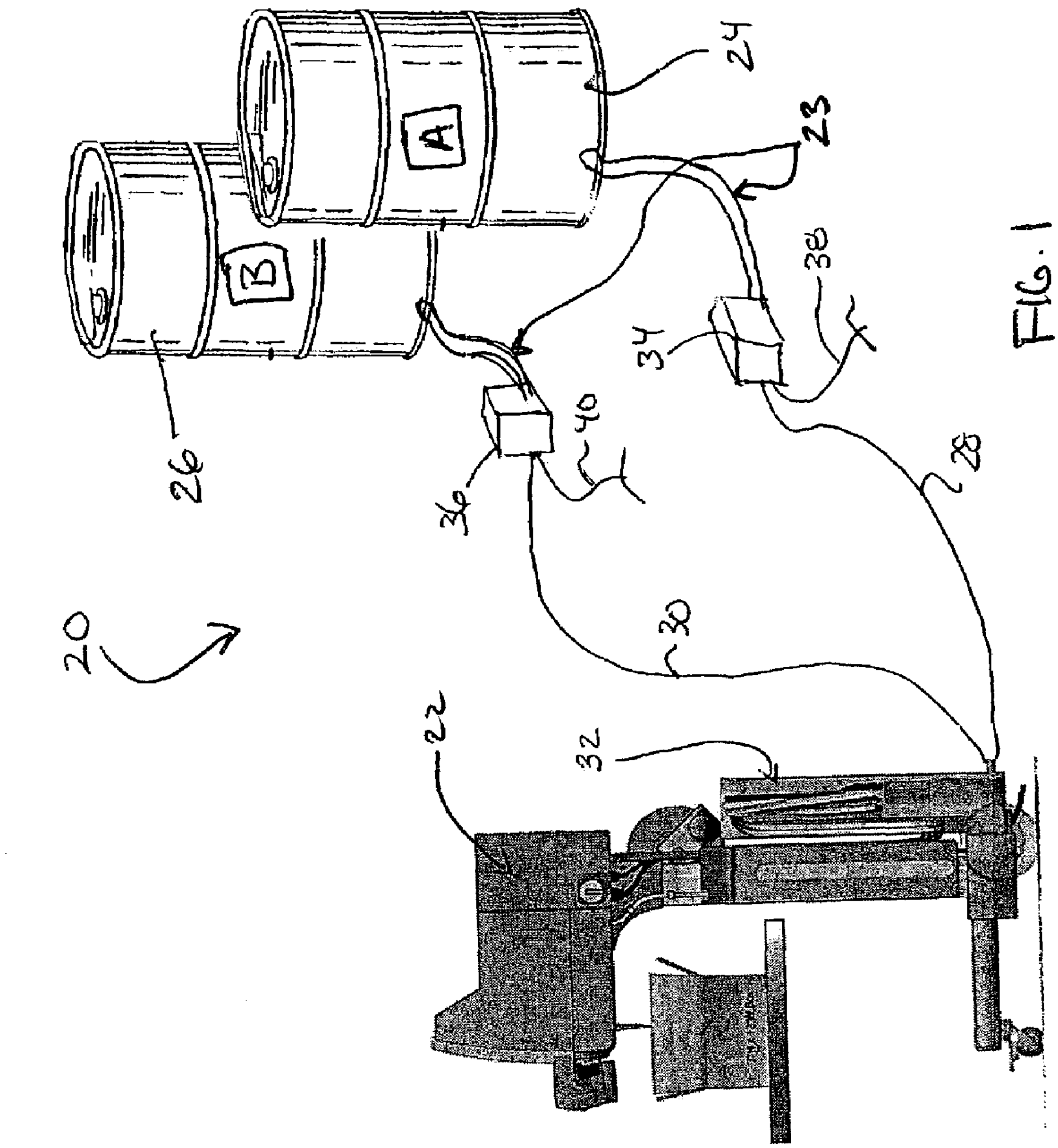
FIG. 1 shows an embodiment of the dispensing system of the present invention.

FIG. 1 illustrates a preferred embodiment of the dispensing system 20 of the present invention which comprises dispenser system 22 in communication with the chemical supply system 23 comprising chemical supply container 24 (supplying chemical component A) and chemical supply container 26 (supplying chemical component B). Chemical hoses 28 (chemical A) and 30 (chemical B) provide fluid communication between respective chemical supply containers 24, 26 and in-line pump system 32 mounted on dispenser system 22. Dispenser system 22 includes in-line pump system 32 that is in communication with chemical supply containers that are either in proximity (40 feet or less)

to the dispenser system 22 or remote (e.g., greater than 40 feet) from where the dispenser system 22 is located. This allows the containers to be situated in a more convenient or less busy area of the plant, as it is often not practical to store chemicals in close proximity to the machine (e.g., sometimes 100 to 500 feet separation of dispenser and chemicals is desirable).

Thus the present invention has a great deal of versatility as to how the dispenser system is to be set up relative to the chemical source. For example, "in-barrel pumps," while available for use as a chemical drive component in one chemical supply system 23 of the present invention, are less preferred as they have a limited reach as they have the electric resistance heaters that is positioned between the chemical supply and the dispenser. The normal chemical hose length is 20 feet, but typically at least five feet of this length is required to route the hoses and cables out of the system enclosure and part way down the support stem. This means that the chemical drums for many prior art "in barrel" pump systems can be no more than 15 feet away from the dispenser system, which is not feasible in many plants. The in barrel pumps can to some extent be modified with longer chemical hoses and pump cables (e.g., chemical hose internal electric resistance heater wires), but there is a practical limit on how far these hoses can extend, since they are light duty and susceptible to mechanical damage, kinking, and crushing. Another limitation, for various electrical and electromagnetic interference (EMI) reasons, is the cable length from the drive board in the enclosure to the "in barrel" pumps. Because of these reasons it is estimated that a practical length limit on the pump cable for such systems is 30 to 40 feet without industry unacceptable modifications or enhancements (expensive) to the controls or to the cable construction. As a number of installations require that the containers be stored hundreds of feet (e.g., 100 to 500 feet or more) away from the system, the estimated practical limit of 30 to 40 feet for such hoses is not enough for many requirements. The present invention is designed to accommodate these long length installation requirements.

FIG. 1 further illustrates feed pumps 34, and 36 associated with chemical supply containers 24, and 26. Feed pumps 34, and 36 provide a positive pressure to the in-line pump system so as to provide positive pressure on their input ports to avoid problems like cavitations, or starvation of the pumping means (e.g., a gerotor based pump system) and to reliably suck chemical out of the bottom of the supply containers even if the in-line pumps are far away (e.g., over 100 feet). Short runs of hose length between the containers and the positive pressure feed pumps can be handled by attaching a dip tube to the inlet end of the feed hose, or by simply attaching the feed hose to the bottom of the container via valves and connectors.

The positive pressure feed pumps are preferably located in or near the chemical supply containers, are preferably air driven, and preferably produce between 50 and 200 psi of pressure at the input port of each in-line pump. Rather than individual feed pumps, a common feed pump system is provided in a preferred embodiment having an output capacity to supply chemical to multiple systems all dispensing at the same time. FIG. 1 illustrates a multiple chemical conduit arrangement wherein feed pumps 34 and 36 feed chemical to more than one dispenser system at the same time with lines 28 and 30 feeding dispenser system 22 and lines 38 and 40 feeding a second dispenser system (not shown). A single feed pump with manifold assembly can also be used to distribute chemicals A and B to multiple locations. Under the present invention the feed pumps can have expanded capacity such as a capacity to feed 4 to 5 systems simultaneously. The ability to run multiple systems from a single set of supply containers sets the in-line pump option provided by the present invention apart from in-barrel pump based systems, which can only feed one system per set of containers.

Figure 2:
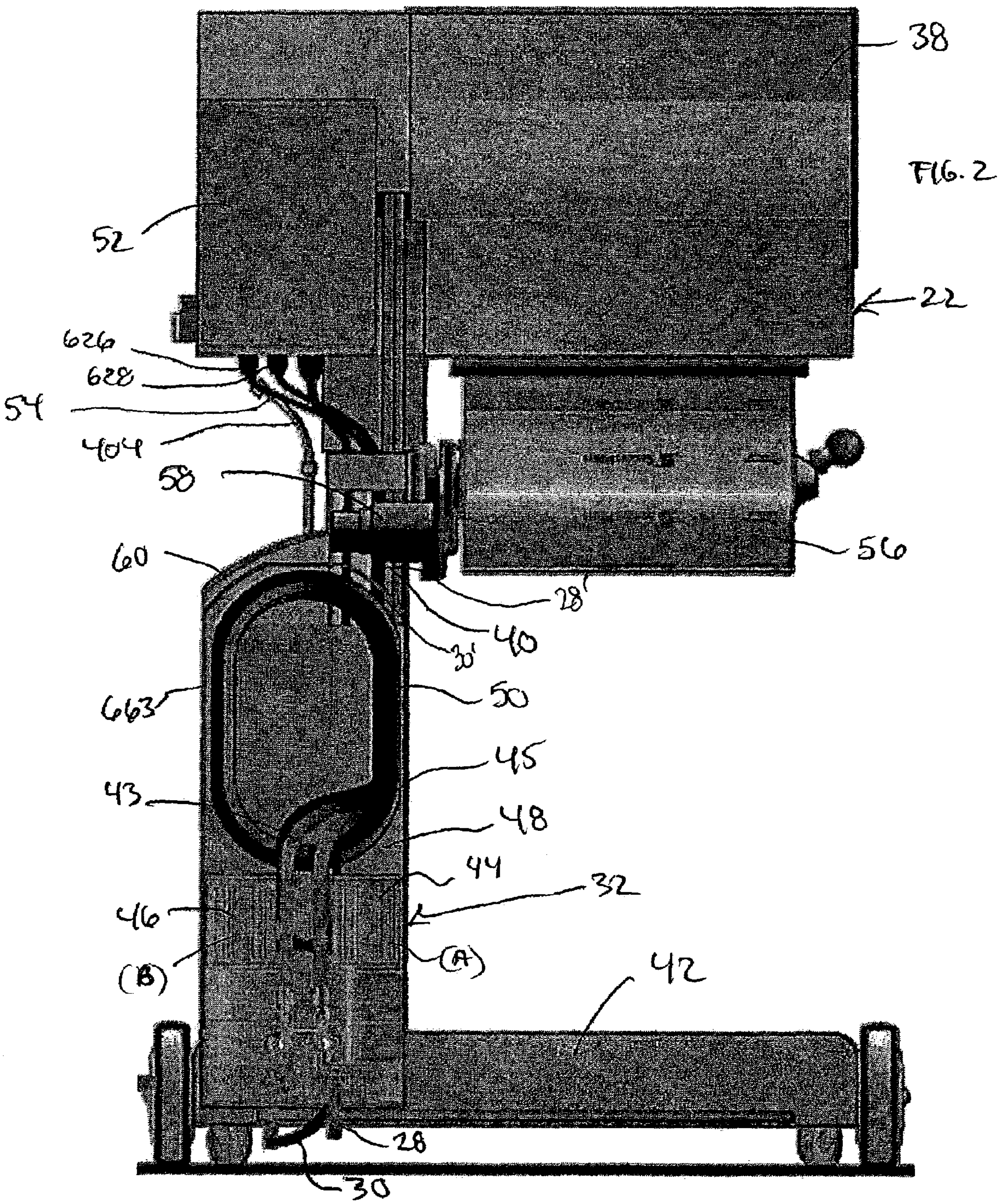
FIG. 2 shows a rear elevational view of a dispenser system embodiment used in the dispensing system.

FIG. 2 provides a rear elevational view of dispenser system 22 which includes exterior housing 38 supported on telescoping support assembly 40 which in a preferred embodiment comprises a lifter (e.g., electric motor driven gear and rack system with inner and outer telescoping sleeves) and is mounted on base 42 (e.g., a roller platform base to provide some degree of mobility). Further mounted on base 42 is in-line pump system 32 comprising in line chemical A pump 44 and in line chemical B pump 46 housing output or downstream chemical supply conduit sections 43 and 45 that extend into hose manager assembly 48 containing heated coiled hoses and cables set 50. The rear view shown in FIG. 2 also illustrates control console 52 and communication links generally represented by communication lines 54. Film roll reception assembly 56 and film roll driver 58 extends out from support assembly 40.

Figure 3:
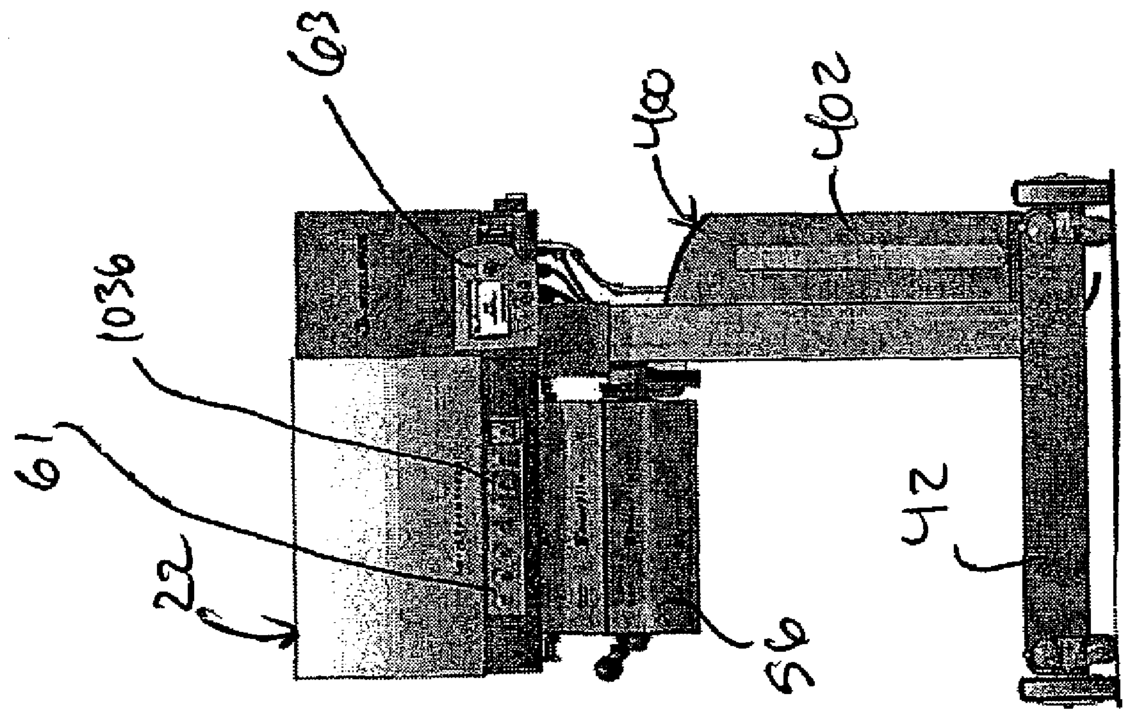
FIG. 3 shows a front view of the dispenser system.

FIG. 3 provides a front view of dispenser assembly 22 including first and second control panels 61 and 63 having an improved finger contact means as described in co-pending U.S. Provisional Patent Application Ser. No. 60/488,009 filed on Jul. 18, 2003, and entitled Push Buttons And Control Panels Using Same, and which is incorporated herein by reference.

Figure 4:
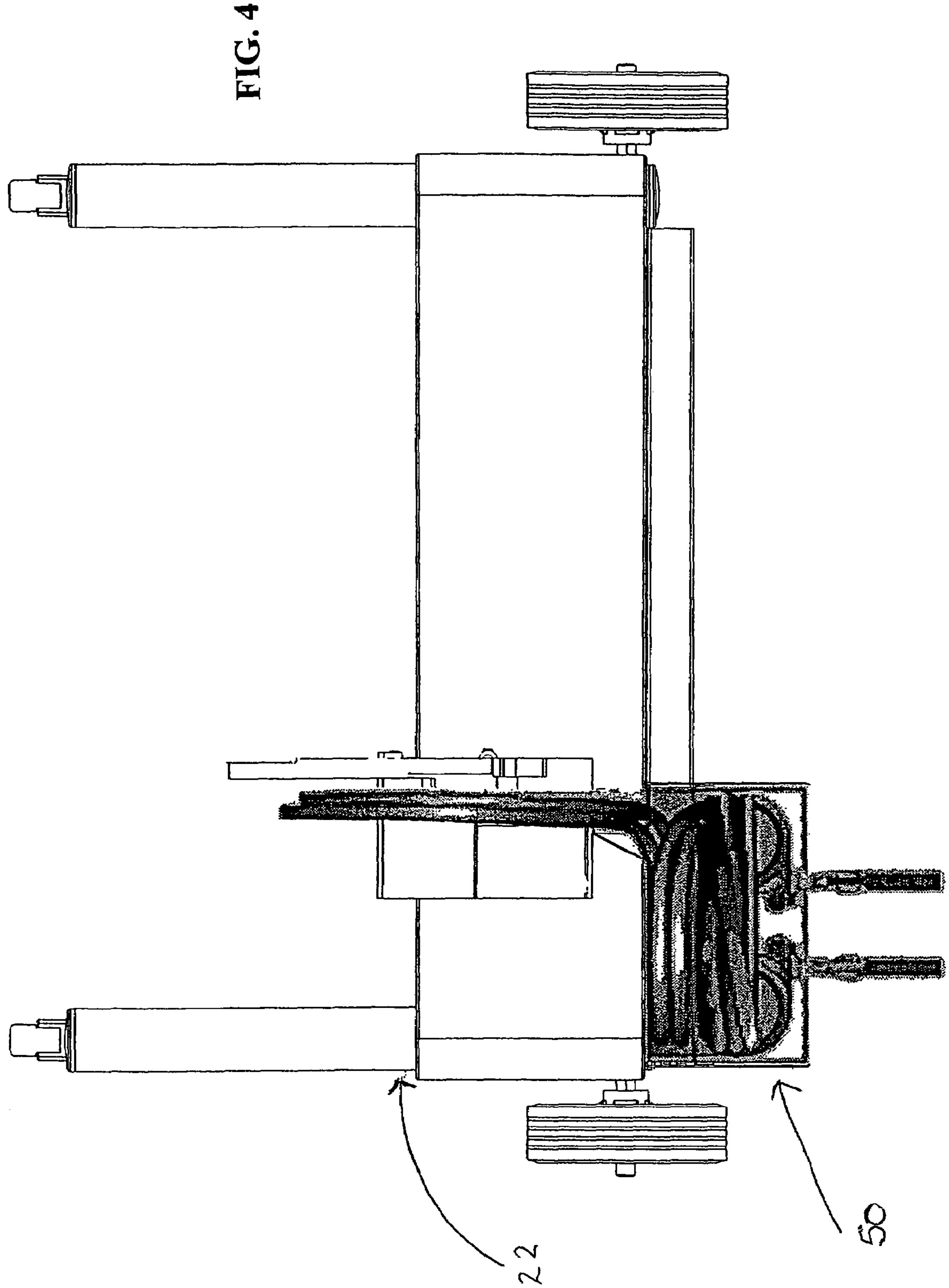
FIG. 4 provides a top plan view of the dispenser system's coiled conduit feature.
Figure 5:
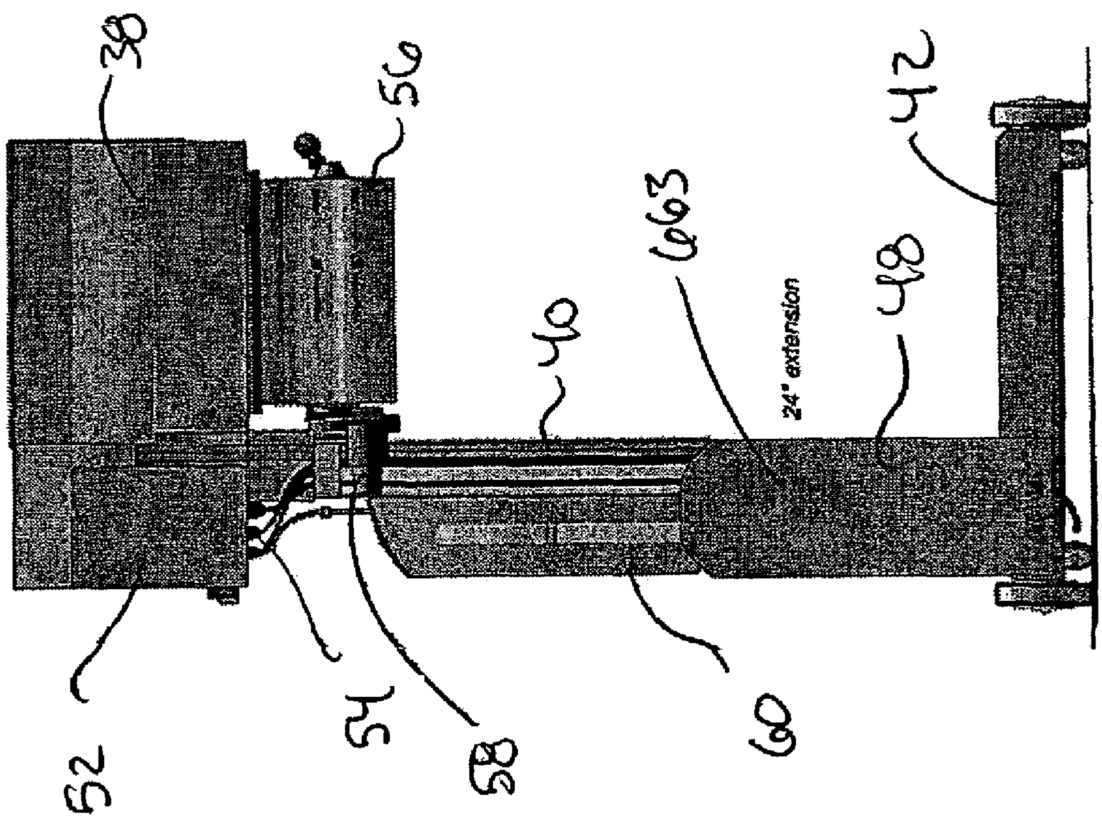
FIG. 5 shows a view similar to FIG. 2, but with the lifter extended.

FIG. 4 provides a top plan view of dispending system 22 with heated coiled hoses and cables set 50 emphasized relative to the rest of the system 22 shown with dotted lines. FIG. 5 provides a similar rear elevational view as in FIG. 2, except with extendable support assembly 40 being in a maximum extension state (e.g., a 15 to 40 inch extension with a 24 inch extension being well suited ergonomically from a collapsed maximum height of 3 to 5 feet being illustrative for the dispenser). With reference to FIG. 5 and the front view of FIG. 1 there is seen solvent container 60 which is fixed to extendable support 40 and rides up and down with the moving component of lifter or extendable support 40.

Figure 6:
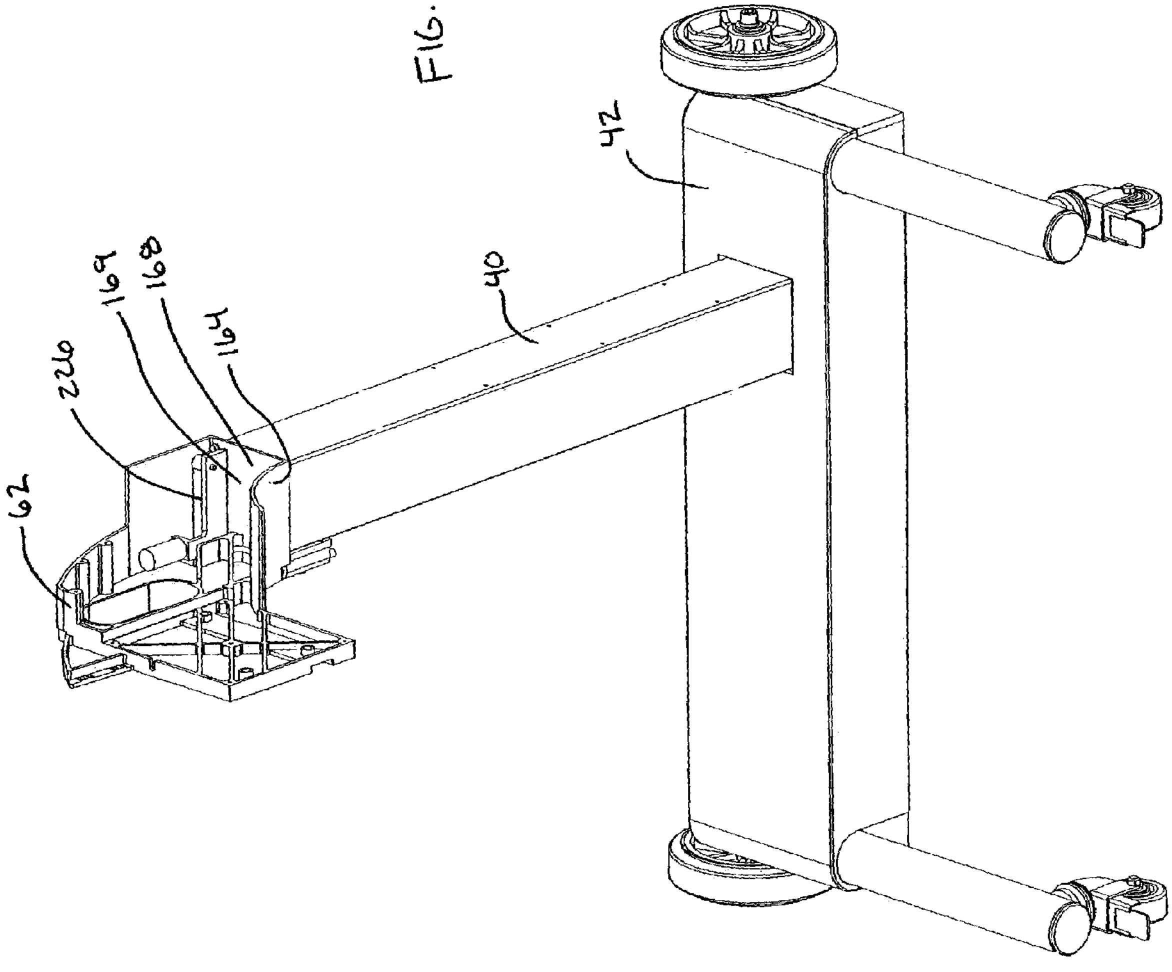
FIG. 6 shows a base and extendable support assembly of the dispenser system.

FIG. 6 illustrates base 42 and lifter or extendable support assembly 40 (e.g., preferably a hydraulic (air pressure) or gear/rack combination or some other telescoping or slide lift arrangement) extending up from base and having bagger and dispenser assembly support mount 62. FIG. 6 also illustrates the mobile nature of base 42 which is a wheeled assembly.

Figure 11:
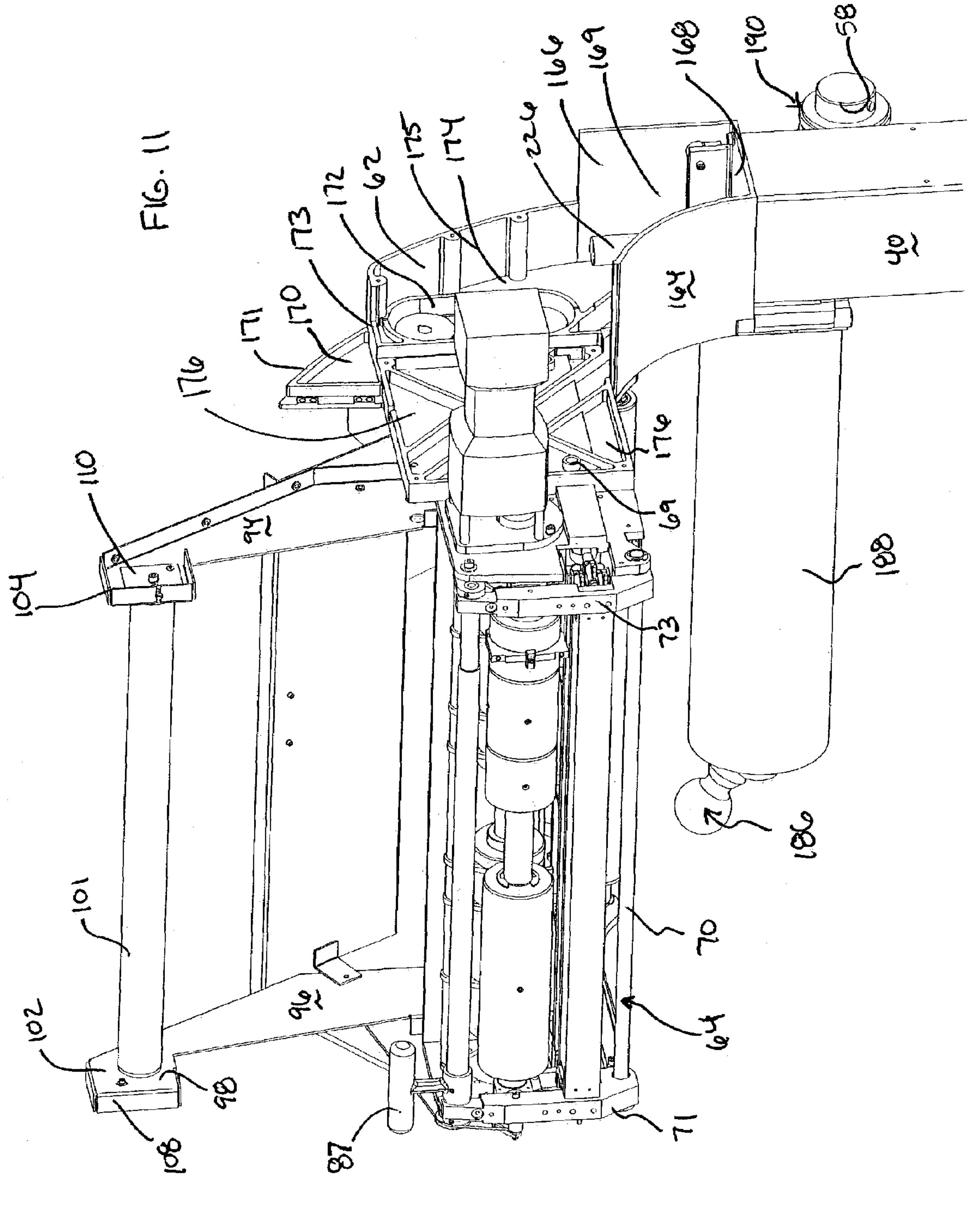
FIG. 11 shows a front perspective view of the bag forming assembly mounted on the support base.
Figure 12:
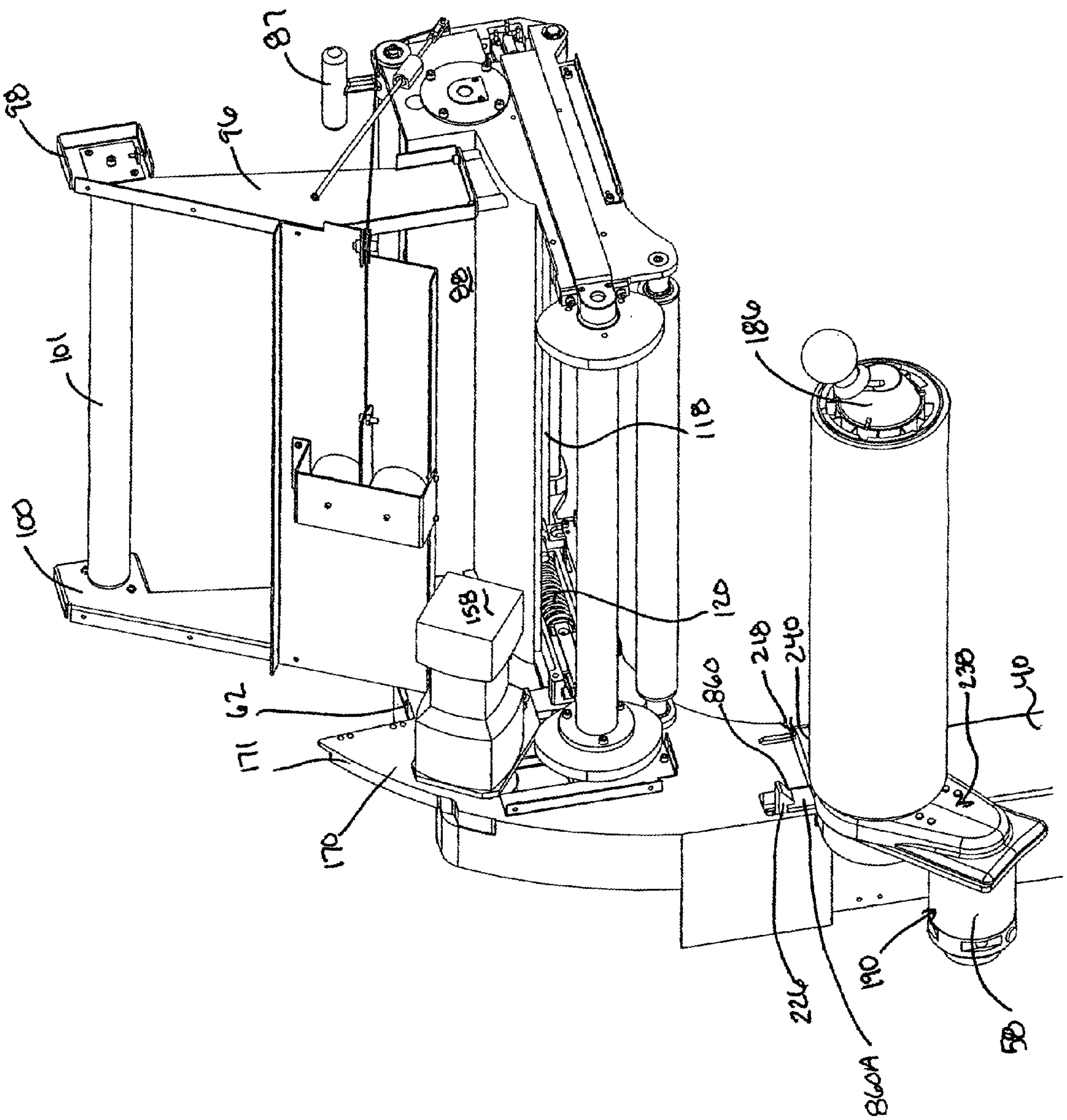
FIG. 12 shows a rear perspective view of that which is shown in FIG. 11.

FIGS. 7-10 shows foam-in-bag assembly or "bagger assembly" 64 (with dispenser removed for added clarity) that is designed to be mounted in cantilever fashion on support mount or bracket 62 as shown in FIGS. 11 and 12. Bagger assembly 64 comprises framework 65 having first side frame 66 (shown on the right side relative to a front view in FIG. 7) and second side frame 68 (shown on the left side in the front view FIG. 7). Side frame 66 has means for mounting bagger assembly 64 to support bracket 62 (e.g., a set of bolts 69 as shown in FIG. 11). Framework 65 further includes front pivot rod 70 extending between the two interior sides of side frames 66, and 68, as well as front face pivot frame sections 71 and 73 which are pivotally supported by pivot rod 70. Rod 70 also extends through the lower end of front face pivot frame sections 71 and 73 to provide a rotation support for sections 71, 73. Driver roller shaft 72, supporting left and right driven or follower nip rollers 74 and 76, also extends between and is supported by side frames 66 and 68. While in a latched state the upper ends of pivot frame sections 71, 73 are also supported (locked in closed position) by door latch rod 85 with handle latch 87.

Figure 7:
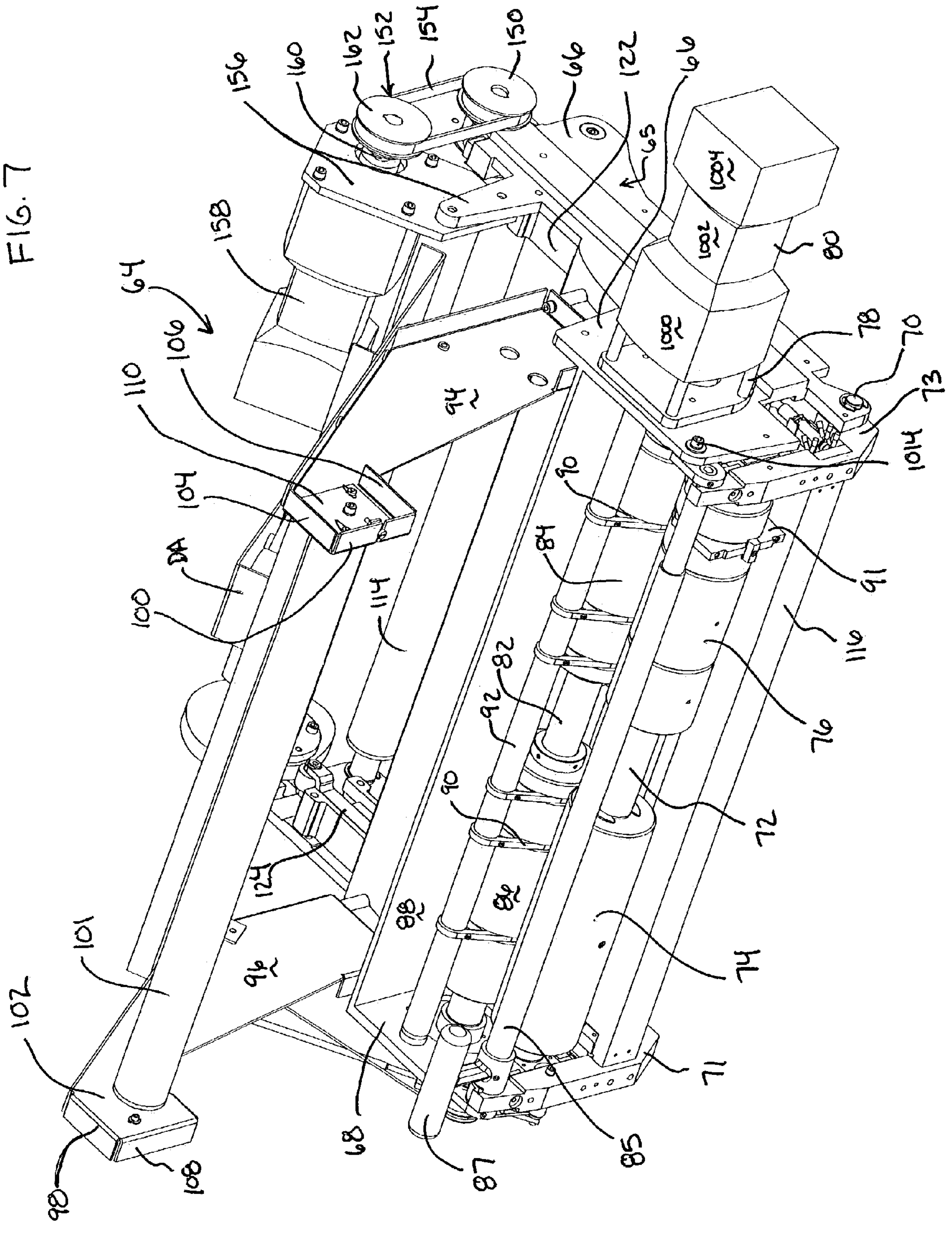
FIG. 7 shows a front perspective view of a bag forming assembly.

First frame structure 66 further includes mounting means 78 for roller shaft drive motor 80 in driving engagement with drive shaft 82 extending between and supported by frame structures 66 and 68. Drive shaft 82 supports drive nip rollers 84 and 86. Framework 65 further comprises back frame structure 88 preferably formed as a single piece unit with side frame structures 66 and 68. Driven roller shaft 72 and driver roller shaft 82 are in parallel relationship and spaced apart so as to place the driven nip rollers 74, 76, and drive nip rollers 84, 86 in a film drive relationship with a preferred embodiment featuring a motor driven drive roller set 84, 86 formed of a compressible, high friction material such as an elastomeric material (e.g., synthetic rubber) and the opposite, driven roller 74, 76 is preferably formed of a knurled aluminum nip roller set (although alternate arrangement are also featured as in both sets being formed of a compressible material like rubber). The roller sets are placed in a state of compressive contact by way of the relative diameters of the nip rollers and rotation axis spacing of shafts 72, and 82 when pivot frame sections 71, 73 are in their roller drive operation state. FIG. 7 further illustrates door latch rod 85 rotatably supported at its opposite ends by pivot frame sections 71, 73 and having door latch (with handle) 87 fixedly secured to the left end of door latch rod 85. As explained in greater detail below, latch 87 provides for the pivoting open of pivot frame sections 71, 73 of the hinged access door means about pivot rod 70 into an opened access mode. While in a latched state, the upper ends of pivot frame sections 71, 73 are also supported (locked in closed position) by door latch rod 85.

Figure 8:
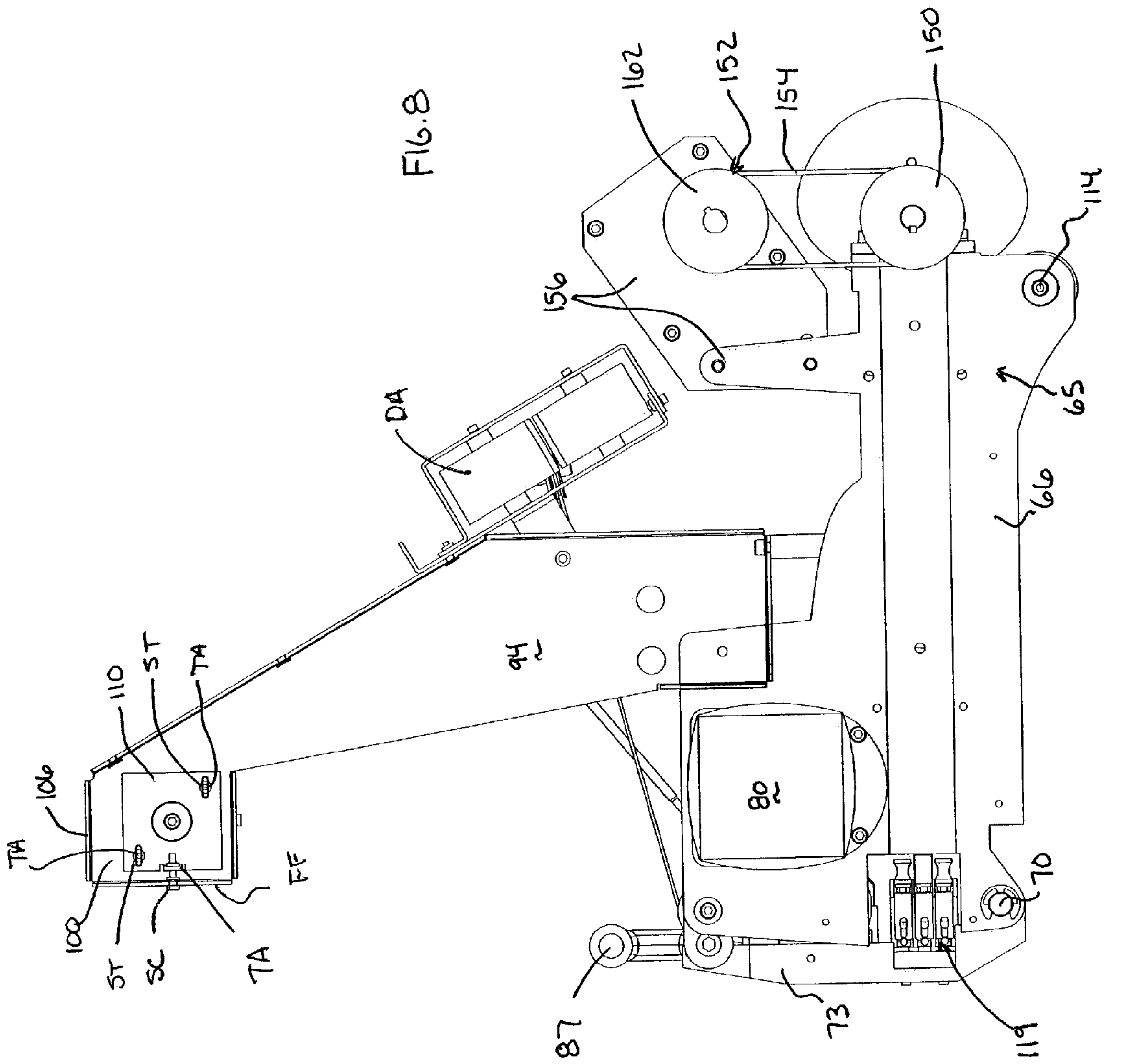
FIG. 8 shows a right side elevational view of the bag forming assembly.
Figure 9:
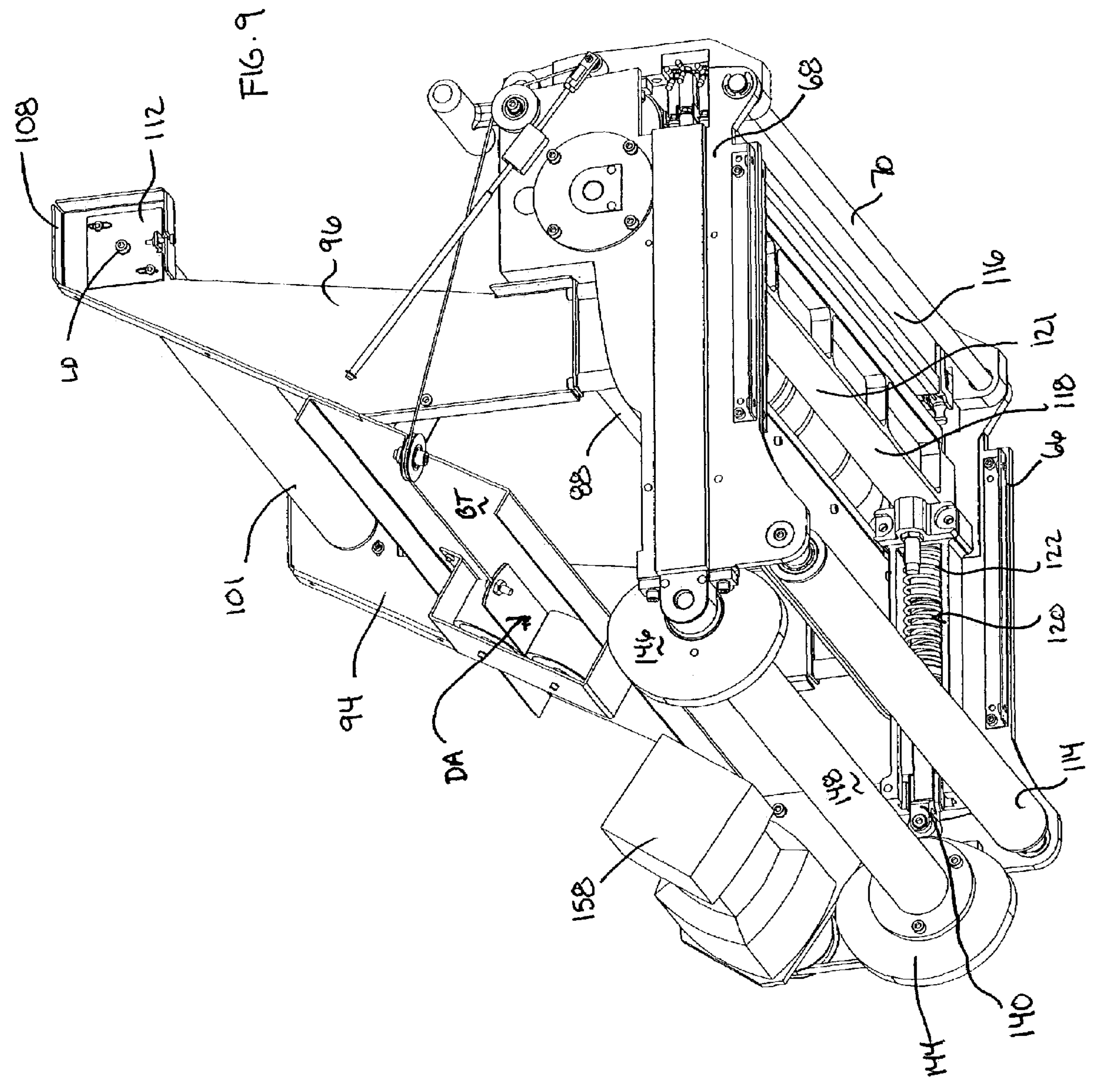
FIG. 9 shows a rear perspective view of the bag forming assembly.

Drive nip rollers 84 and 86 have slots formed for receiving film pinch preventing means 90 (e.g., canes 90) that extend around rod 92 with rod 92 extending between first and second frames 66, 68 and parallel to the rotation axes of shafts 72 and 82. FIG. 7 further illustrates bag film edge sealer 91 shown received within a slot in roller 76 and positioned to provide edge sealing to a preferred C-fold film supply. Rear frame structure 88 has secured to its rear surface, at opposite ends, idler roller supports 94 and 96 extending up (e.g., 8 to 15 inches or a preferred 11 inches) from the nip roller contact location. Idler roller supports 94, 96 include upper ends 98 and 100 each having means for receiving a respective end of upper idler roller 101 (e.g., a roller shaft reception aperture or bearing support). As shown in FIG. 7, ends 98, 100 present opposing parallel face walls 102, 104 and outward flanges 106, 108. Within the confines of flanges 106, and 108 there is provided first and second idler roller adjustment mechanisms 110, and 112. In a preferred embodiment, one of the adjustment mechanisms provides vertical adjustment as to the rotation axis of idler roller 101 while the other provides front to back horizontal adjustment to the same idler roller 101 rotation axis. FIG. 8 illustrates the horizontal track adjustment means of the present invention which, in combination with the opposite vertical adjustment track plate, helps ensure the film properly tracks through the nip roller (retains a right angle film edge relationship to the roller axis while traveling a pre-set preferably generally centered or intermediate path through the nip roller set). Sliding plate 110 is retained in a frictional slide relationship with surface 100 by way of slide tabs TA extending through elongated horizontal slots SL at opposite corners of the plate. On the front flange 100 FF there is supported adjustment screw SC extending into engagement with tab TA on sliding plate 110 receiving an end of the idle roller 101. Upon rotation of screw SC, plate 110 is shifted together with the end of the idler roller. The opposite side is just the same but for there being a vertical adjustment relationship as shown in FIG. 9. In this way, idler roller 101 can be adjusted to accommodate any roller assembly position deviation that can lead to non-proper tracking and also can be used to avoid wrinkled or non-smooth bag film contact. Also, idler roller 101 is preferably a steel or metal roller and not a plastic roller to avoid static charge build up relative to the preferred plastic film supplied. Idler roller is also preferably of the type having roller bearings positioned at its ends (not shown) for smooth performance and smooth, unwrinkled film feed.

With reference particularly to FIGS. 7 and 9, second or lower idler roller 114 is shown arranged parallel to drive roller shaft 82 and supported between left and right side frames 66 and 68. Idler roller 114 preferably has a common roller/bearing design with that of idler roller 101. Also, these figures show first (preferably fixed in position when locked in its operative position) end or cross-cut seal support block or jaw 116 positioned forward of a vertical plane passing through the nip roller contact location and below the axis of rotation of drive shaft 82. End seal jaw 116, which preferably is operationally fixed in position, is shown having a solid block base of a high strength (not easily deformed over an extended length) material that is of sufficient heat wire heat resistance (e.g., a steel block with a zinc and/or chrome exterior plating), and extends between left and right frame structures 66, and 68, but again, like driven shaft 72 and rollers 74, 76, is preferably supported on pivot frame sections 71, 73 and extends parallel with driven shaft 72. FIG. 7 illustrates block 116 rigidly fixed at its ends to the opposing, interior sides of pivot frame sections 71, and 73 for movement therewith when latch 87 is released.

Movable end film sealer and cutter jaw 118 (FIG. 9) is secured to end sealer shifting assembly 120 is positioned adjacent fixed jaw 116 with fixed jaw having sealer and cutter electrical supply means 119 with associated electric connections (FIG. 8) supported on the opposite ends of jaw 116 positioned closest to the front or closest to the operator. End sealer shifting assembly 120 is positioned rearward and preferably at a common central axis height level relative to end seal contact block 116. During formation of a bag heater jaw 116 supports a cutter heated wire in-between above and below positioned seal forming wires (e.g., for a total of three vertically spaced apart heater wires) with of, for example ⅛ to ¾ inch equal spacing with ¼ to ½ inch spacing being well suited for providing the seal (SE) cut (CT) seal (SE) sequence in the bag just formed and the bag in the process of being formed. The SE-CT-SE sequence is illustrated in FIG. 111 which, in conjunction with edge seal ES, forms a complete bag from a preferred C-film source. With the SE-CT-SE arrangement there is provided a more assured bottom bag formation and there is avoided the problems associated with prior art devices that rely on the end or cross-cut only as the means for sealing. For example, if for any reason a perfect end seal is not secured during the cut formation, there can result massive foam spillage and build up as the foam mix is at its most liquid and least foam development stage when the dispenser first shoots the shot into the just formed bag bottom.

A preferred embodiment features a combination end film sealer means and cutter means 119 (e.g., see FIGS. 141 to 143) having three independently controlled cross-cut/cross-seal resistance wire mechanisms preferably extending across the full length of the face of block 116. These wires are connected at their ends with quick release wire end holders.

This end seal and cutter on the fixed block 116 (after access panel locked in place) works in conjunction with movable sealer shifting assembly or jaw support assembly 120. As also explained below, the heater and sealer wires are sensed and thus in communication with a controller such as one associated with a main processor for the system or a dedicated heater wire monitoring sub-processing as illustrated in FIG. 186. Venting preferably takes place on the side with the edge seal ES through a temporary lowering of heat below the sealing temperature as the film is fed past or some alternate means as in adjacent mechanical or heat associated slicing or opening techniques. Block 118 also has a forward face positioned rearward (farther away from operator) of the above mentioned nip roller vertical plane when in a stand-by state and is moved into an end seal location when shifting assembly is activated and, in this way, there is provided room for bag film feed past until end sealer shifting assembly 120 is activated.

A first embodiment of sealer shifting assembly 120 is shown in FIGS. 9, and 9A to 9E and comprises first and second sealer support rod assemblies 122, 124 each having a front a forward end with reception blocks 121, 123 having a recess area securement means for receiving and securing jaw 118. The securement means is preferably in the form of an elongated (end threaded) rod, 126 (FIG. 9E) extending through a respective one of blocks 121, 123 and into threaded engagement with a respective jaw extension 141, 143 laterally external to the main or contact body of jaw 118. The supported rod assemblies 122, 124 are preferably designed the same, but for their mirror image orientation. Rod 126 has a rear end extending through cylinder extensions 147 (FIG. 9B) and out through block 125 and out the rear of block 125 and having blocking member 117 (e.g., threaded cup). Rod 126 is surrounded by cylindrical sleeve SL extending between cap 117 and jaw extension 143. Spring 130 surrounds sleeve SL and extends into contact with jaw extension 143, at one end and, at an opposite end, abuts cup 147 as well as threaded low friction sleeve FS received within block 125. Spring or biasing means 130 is preferably a preloaded spring (e.g., 6" free state at 80 lb/in spring preloaded to about 110 lbs) to bias block 118 forward against the limiting end of the rod 126 (threaded end and cap 117). With the rear end of rod 126 slidingly received within housing block 125 and having blocking protrusion 117 to prevent inadvertent release, there is allowed for absorption of additional compression on the spring during a state of advancement into contact with fixed jaw 116 (e.g., 0.03 to 0.04 inch) which is enough to absorb and deviations in the relative compressing faces of the two jaws and to improve the length consistency of the heated wire seal and cut formation.

Figure 9A:
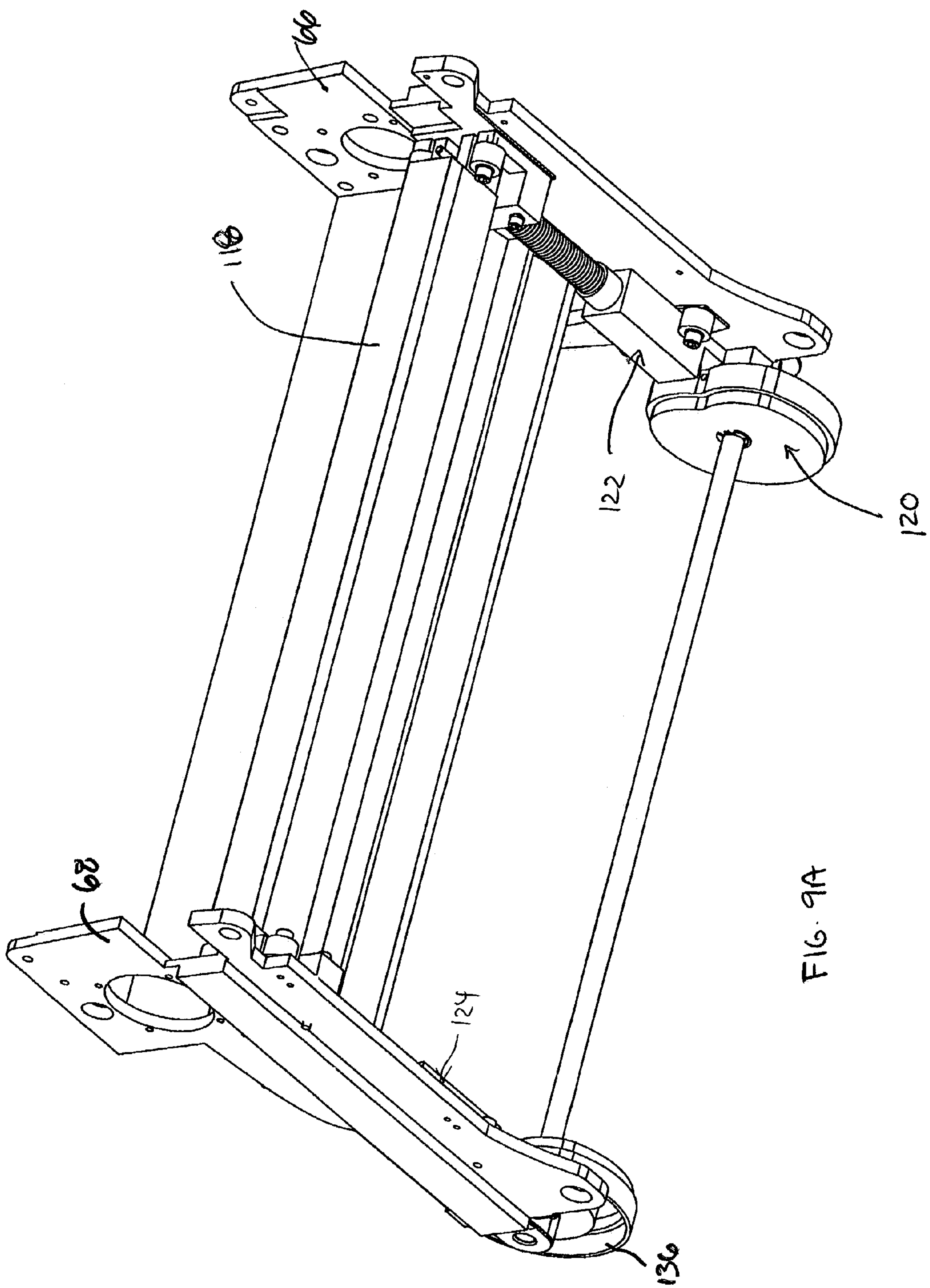
FIG. 9A shows a bottom perspective view of the sealer shifting assembly mounted on the frame structure.
Figure 9B:
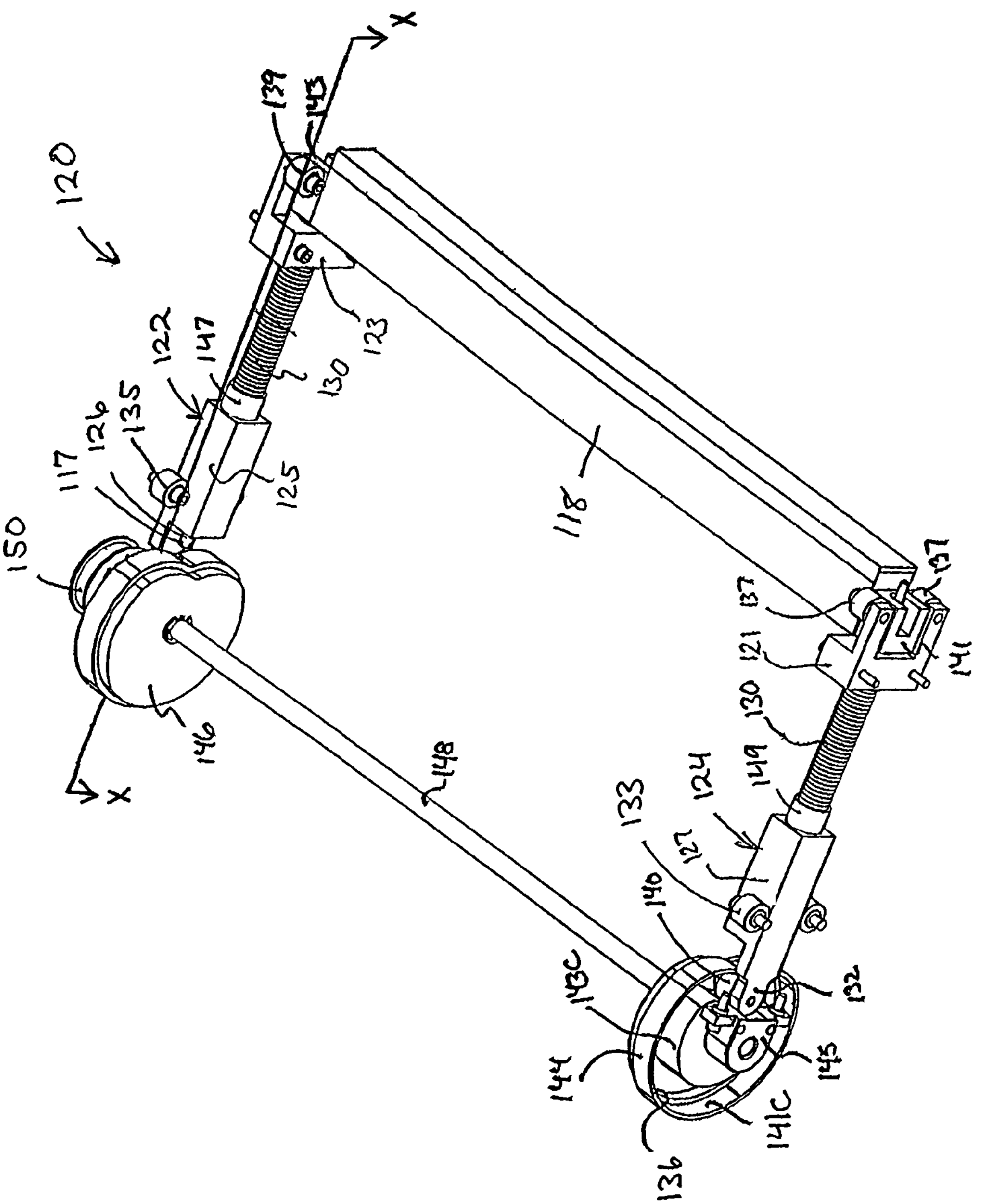
FIG. 9B shows a top perspective view of the sealer shifting assembly alone.
Figure 9C:
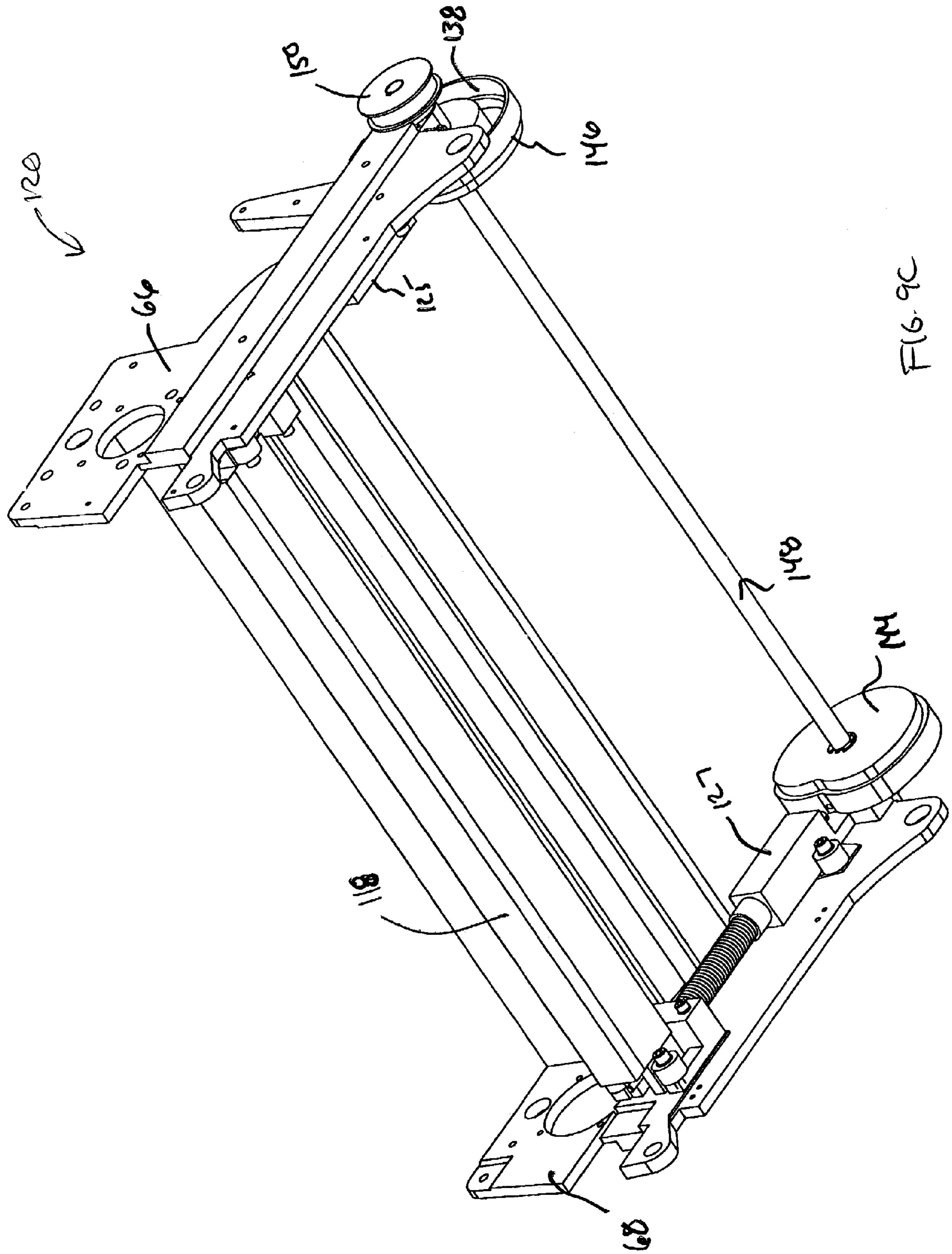
FIG. 9C shows an alternate perspective view of that in FIG. 9A.
Figure 9D:
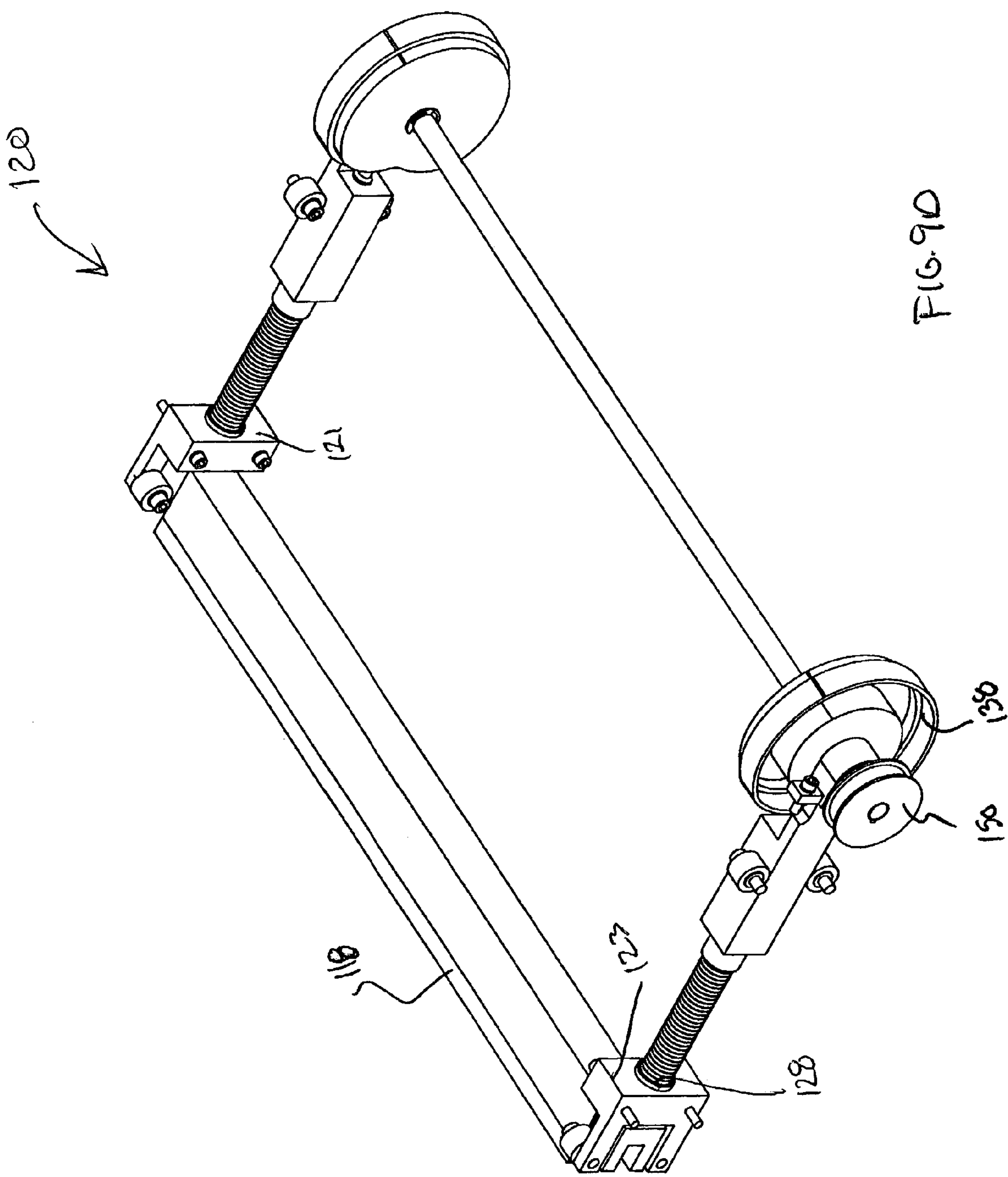
FIG. 9D shows an alternate perspective view of that in FIG. 9B.
Figure 9E:
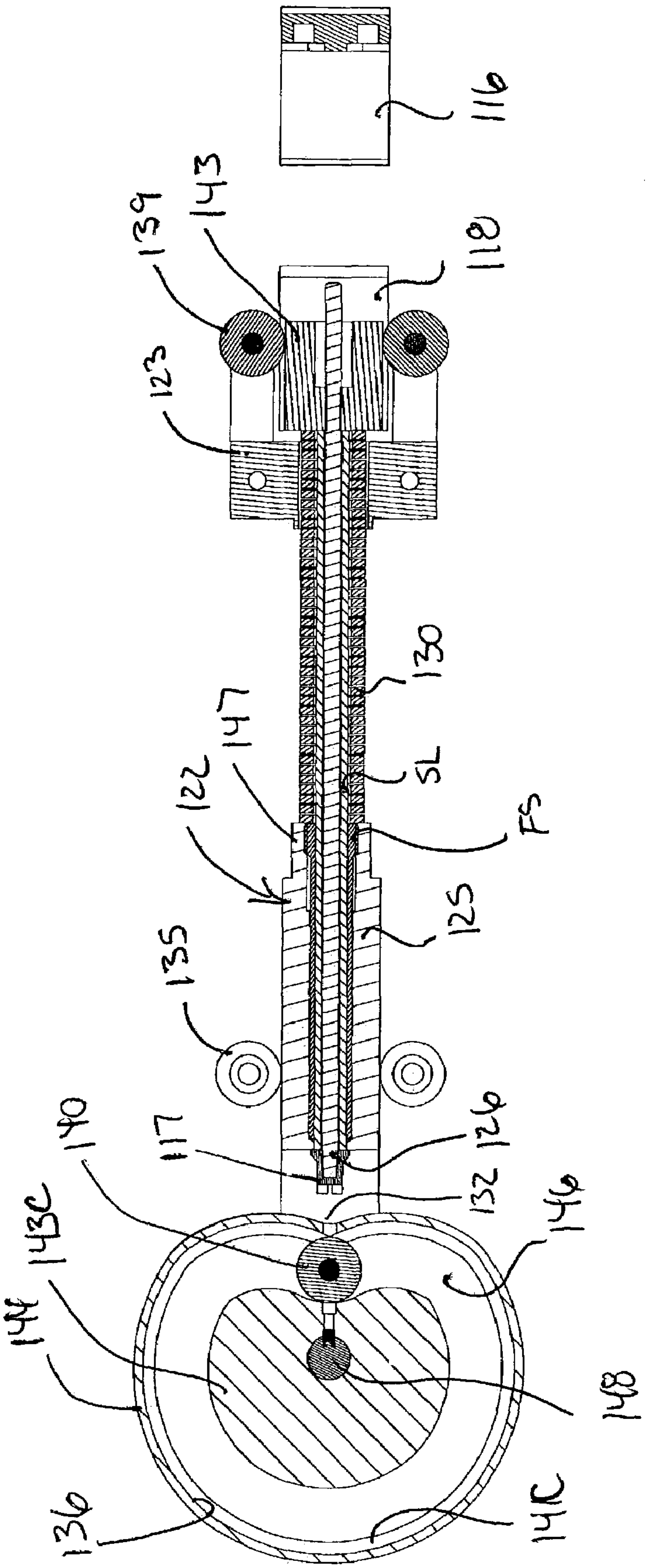
FIG. 9E shows a cross-sectional view along cross-section line X-Y in FIG. 9B.

Each of assemblies 122, 124 further comprise cam roller pin support extension 132 secured at a rear end of housing block 125 which respectively receive cam roller 140. Cam rollers 140 are received within respective cam tracks 136, 138 formed in cams 144, 146 which are shown in FIGS. 9A and 9B to have an indented cylindrical shape or an ear shape with an outer flange wall defining, on its interior surface, a first cam track surface 141C and an inner wall, defining on its outer surface, a second cam track surface 143C (FIG. 9B). Cams 144, 146 are fixed to cam shaft 148 extending between bearing reception ports provided at the rear end of first and second side frames 66, 68. To lock shaft 148 into position on frame structure 68, there is provided bearing block 145 (FIG. 9B). Jaw 118 is confined to reciprocation essentially (as noted above, some degree of play at connection end to provide for flush contact adjustment relative to the operationally fixed jaw 116) along a horizontal plane in forward and rearward travel by guide roller sets 133 and 135 each featuring upper and lower guide rollers which are provided and supported on frame structures 66, 68 and placed in contact with upper and lower surfaces of housing blocks 125, 127. Second sets of upper and lower guide rollers 137, 139 are supported on frame structures 66 and 68 and in contact with the upper and lower surfaces of jaw extensions 141, 143.

Cam shaft 148 extends into driving engagement with drive pulley 150 forming part of drive pulley assembly 152 which further includes pulley belt 154 (FIG. 7). As seen from FIG. 7, side frame 66 includes cam motor support section 156 to which cam motor 158 is secured. Cam motor drive shaft 160 is secured to drive pulley 162 of drive pulley assembly 152. Thus, activation of cam motor 158 leads to drive force transmission by transmission means (represented by the drive pulley assembly in the illustrated preferred embodiment) which in turn rotates cam shaft 148 and cams 144, 146 fixedly mounted thereon to provide for the pushing forward during the push forward cam rotation mode (cam roller 140 riding on a portion of the interior cam track surface 143 to effectuate a push forward to provide for the end seal and cutting function) and the pulling rearward of jaw 118 after the sealing function is completed (can include cutting as sole means of sealing or as a component of multiple seals (non-cutting and cutting) or as a weakening for downstream separation in a bag chain embodiment through control of the level of heat and time of contact with film) by way of cam roller 140 riding on the first cam track surface 141C during a pull back cam rotation mode for cams 140, 142. Alternate transmission means and cam or non-cam push-pull driving means are also featured under the present invention such as a gear based system (e.g., rack and pinion) or hydraulic system for either or both of the drive transmission means or the push-pull driving of the end seal block or jaw 118. However, the illustrated cam arrangement provides for efficient and accurate push and pull movement with controlled force application to help provide improved seals and/or cuts. Thus, blocks 121, 123 and the supported moving jaw 118 are biased forward into a compression sate with jaw 118 which compression is accommodated via compression of spring 130 and sliding of rod 126 if need be in each of assemblies 122, 124. In addition, the spring provides for some degree of play relative to up-down/side-to-side and points in-between. In a preferred embodiment the biasing force is about 75 to 150 lbf with 110 lbf being an illustrative force level. This arrangement provides a non-rigid, compliant system which can accommodates deviations relative to the end seal opposing faces of the jaws in the invention disclosure.

FIGS. 7 and 9 also illustrate the preferred external support plates 156 for cam motor 158, and plate 66 for drive shaft motor 80.

Figure 9F:
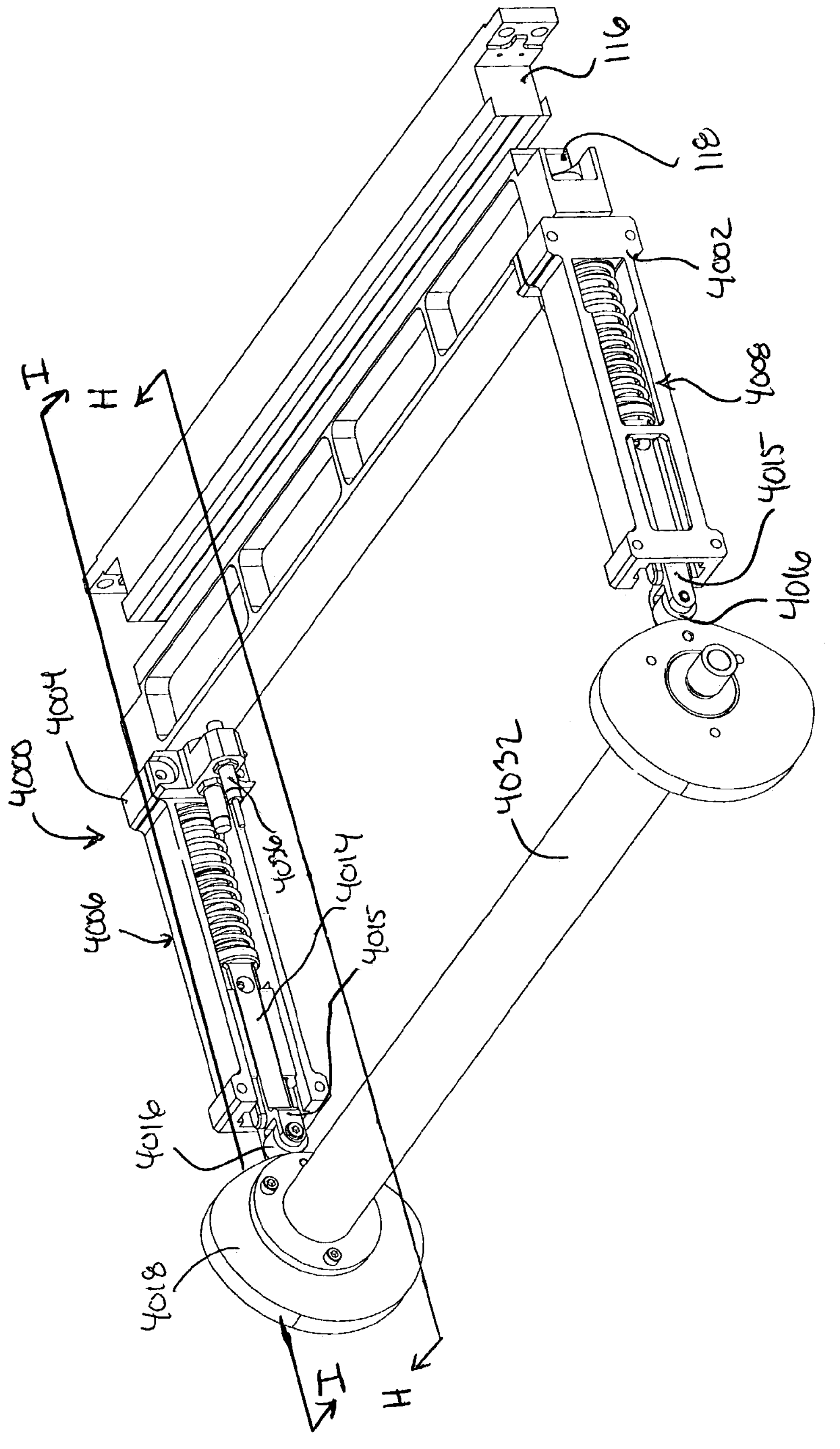
FIG. 9F shows a perspective view of an alternate embodiment of a sealer shifter assembly showing as well a non-sealing mode or retracted position relative to the stationary jaw on which is supported the cross cut and seal wires.
Figure 9G:
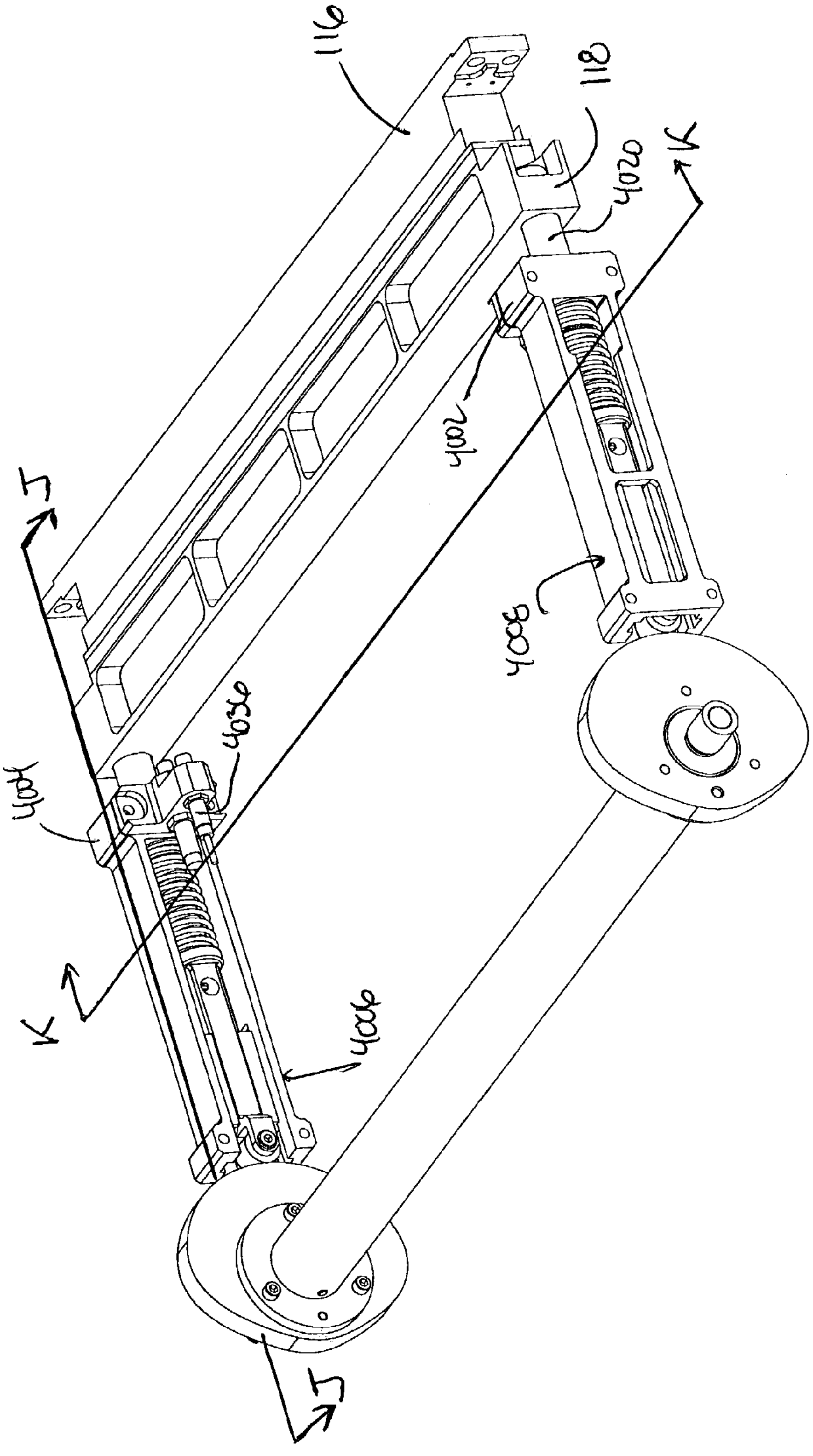
FIG. 9G show a view similar to FIG. 9F but with the moving jaw in a seal or film contact mode relative to the fixed jaw.
Figure 9H:
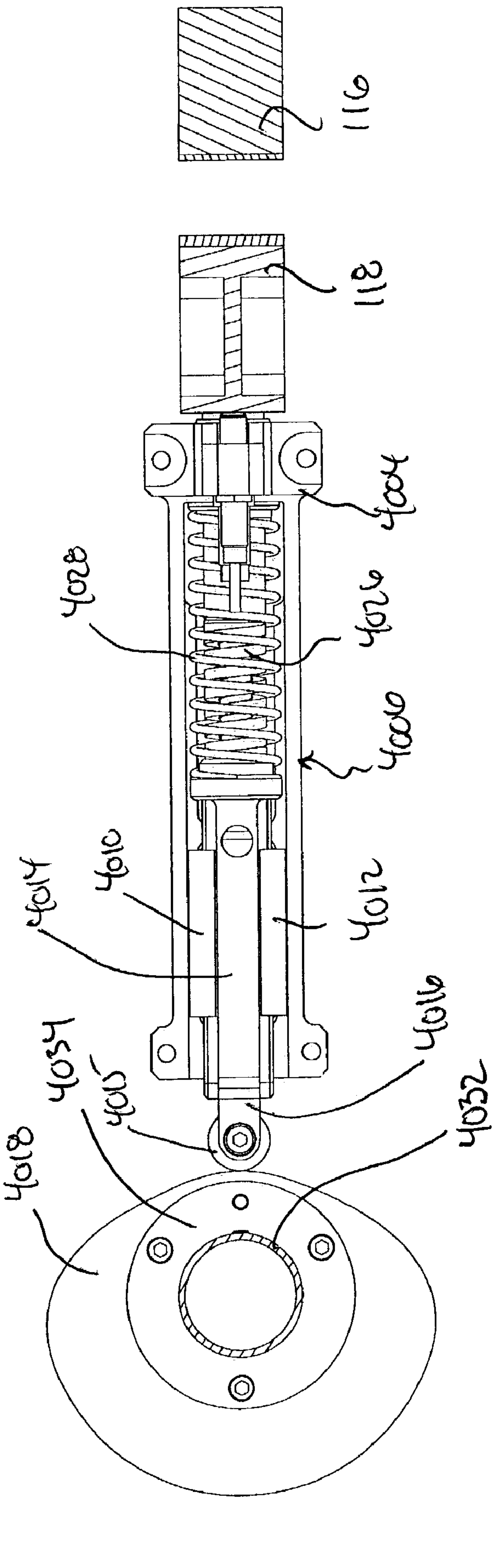
FIG. 9H shows a cross-sectional view of that which is shown in FIG. 9F taken along cross-section line H-H in FIG. 9F.
Figure 9I:
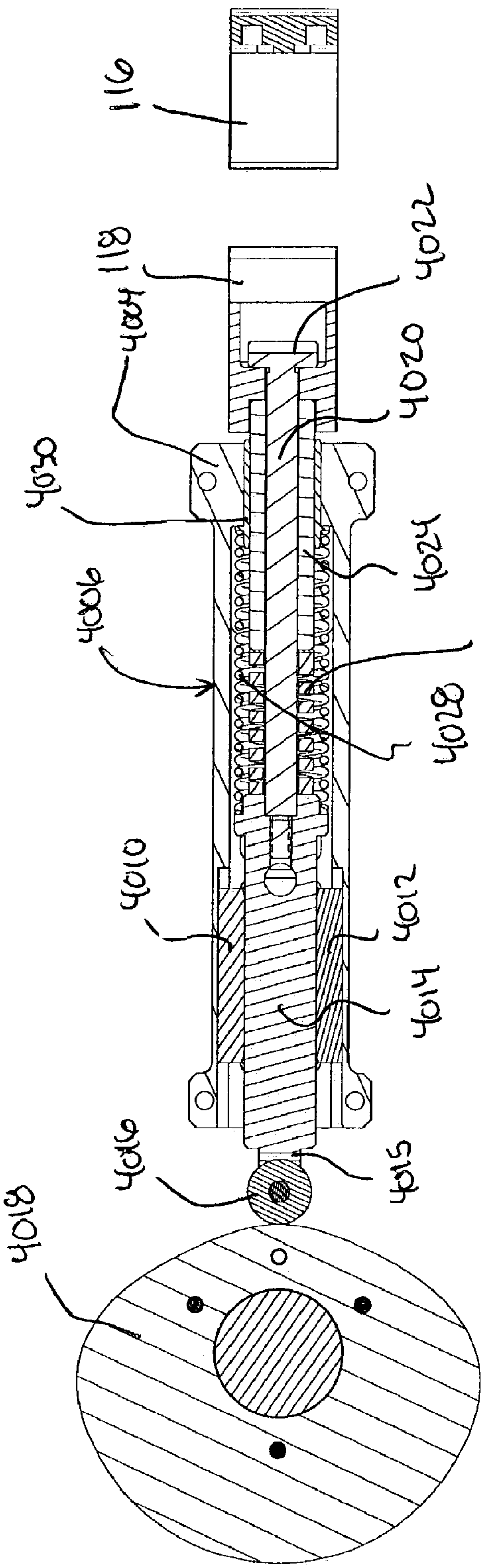
FIG. 9J shows a cross-sectional view of that which is shown in FIG. 9G taken along cross-section line J-J in FIG. 9G.
FIG. 9K shows a cross-sectional view taken along cross-section line K-K in FIG. 9G.

FIG. 9F shows a perspective view of a second embodiment of a moving jaw assembly 4000 which retracts and pushes forward jaw block 118 against the preferably stationary jaw 116 with heated cross cut and seal wires. The rear end of block 118 is connected at opposite ends to respective casings 4002 and 4004 with these casings forming a part of the cam force transmission devices 4006 and 4008. Cam force transmission devices 4006 and 4008 are the same except for their mirror image positioning (and below described home positioner) and thus the discussion focuses on transmission device 4006 alone. Casing 4004 is secured to frame structure 66 of bagger assembly 64 at its expanded ends and has an interior reception chamber formed along its inner side. As seen from FIG. 91, within this chamber is positioned bearing plates 4010 and 4012 which receive in sliding fashion cam rod 4014. The rear end of cam rod 4014 includes cam yoke 4015 which supports cam roller 4016 which rides along cam 4018 having a eccentric shape with a minimum contact thickness shown in contact with roller 4016 in FIG. 91 and a maximum thickness shown in contact with roller 4016 in FIG. 9J.

The forward end of cam rod 4014 includes a threaded center hole receiving push rod 4020 having a first end extending into threaded contact with the center hole and a second end that extends through an aperture in block 118 and has enlarged head 4022. Push rod 4020 is encircled by rod sleeve 4024 having a forward end received with a pocket recess in block 118 and a forward end in contact with first (inner) biasing member 4026, which is preferably a coil spring, compressed between a forward end of push rod 4014 and a rear end of sleeve 4024. Surrounding inner spring 4026 is a second (outer) biasing member 4028, also preferably in the form of a coil spring, received by a flanged end of cam follower 4014 at one end and in contact with an outer flanged sleeve 4030 in contact with the forward enlarged end of casing 4004. Outer spring 4028 is designed to hold the cam follower or cam rod 4014 against the cam, while the inner spring 4026 produces the compression for sealing the jaws at the time of forward extension. In view of these different functions, outer longer spring (e.g., 3.5 inch free length) preferably has a much lower spring constant (e.g., 12 lbs/in) as compared to the inner shorter spring (e.g., 1.75 inch free length) having a higher spring constant (e.g., 750 lbs/in). Cams 4018 and 4018' are interconnected by cylindrical drive sleeve 4032 with annular flanges 4034 and associated fasteners providing a means of securement between the sleeve 4032 and a respective eccentric cam, with the cams being driven by cam motor 158 and associated drive transmission as in the other embodiment.

FIG. 9F illustrates home sensor 4036 which is connected to an extension of casing 4004 and is positioned for monitoring the exact location of the moving jaw 118 at all times and is in communication with the control and monitoring sub-system shown in FIG. 189 and provides position feedback which is useful, together with the encoder information generated by the cam motor 158 in determining current and historic location data.

With reference to FIGS. 6, and 11 to 13 there is illustrated a preferred mounting means featuring base 42, lifter assembly 40 and securement structure 62. Securement structure 62 comprises curved forward wall 164 and vertical back wall 166 which, together with lifter top plate 168, define cavity 169. As shown in FIGS. 11 and 12 securement structure 62 further comprises curving interior frame member 170, which has an outer peripheral edge 171 that provides for dispenser hinge bracket support (discussed below) and a back curved flange section 175 extending outward and integral with frame member 170 as well as outer frame wall 174. Frame wall 174 has a pulley drive assembly reception aperture (e.g., an ellipsoidal slot) 172 formed therein.

Further longitudinally (right side-to-left side) outward of frame wall 174 is mounting plate 176 which, in conjunction with open area 169, provides a convenient location for securement of the electronics such as the system processor(s), interfaces, drive units, and external communication means such as a modem. In this regard, reference is made to co-pending U.S. Provisional Patent Application Ser. No. 60/488,102 "System and Method for Providing Remote Monitoring of a Manufacturing Device" filed on Jul. 18, 2003, and which is incorporated herein by reference describing the remote interfacing of the dispensing system with, among potential recipients, service and supply sources. FIG. 11 also illustrates the supporting frame work for the hinged front access door assembly shown open in FIG. 139 which comprises front access door plate 180 (partially shown in FIG. 13) supported at opposite ends by pivot frame sections 71 and 73. Pivot frame sections 71 and 73 preferably have a first (e.g., lower) end which is pivotally secured to pivot rod 70 and also between which rod 70 extends.

FIGS. 11 and 12 further reveal film roll support means 186 shown supporting film roll core 188 about which bag forming film is wrapped (e.g., a roll of C-fold film; not shown in FIGS. 11 and 12). Film roll support means 186 is in driving communication with film roll/web tensioning drive assembly 190 (partially shown FIG. 11) with motor 58 shown supported on the back side of lifter assembly 40.

Figure 13:
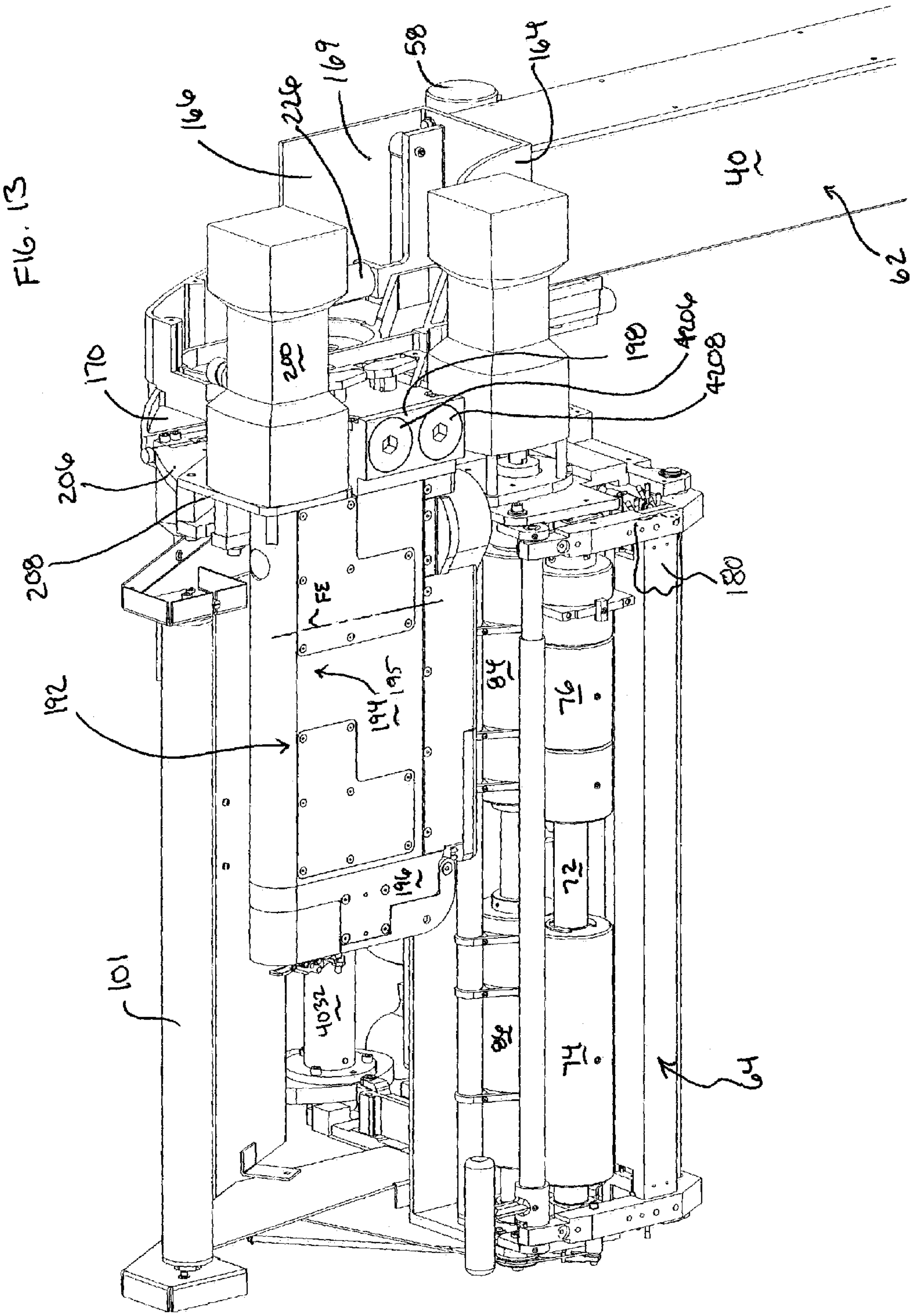
FIG. 13 shows a front perspective view of that which is shown in FIG. 11 together with a mounted chemical dispenser apparatus (dispenser and bagger assembly combination).

FIG. 13 provides a perspective view of bagger assembly 64 mounted on mounting means 78 with dispenser apparatus 192 included (e.g., a two component foam mix dispenser apparatus is shown), which is also secured to support assembly 62 in cantilever fashion so as to have, when in its operational position, a vertical central cross-sectional plane generally aligned with the nip roller contact region positioned below it to dispense material between a forward positioned central axis of shaft 72 and a rearward positioned central axis of shaft 82. As shown in FIG. 13, dispenser assembly 192 comprises dispenser housing 194 with main housing section 195, a dispenser end or outward section 196 of the dispenser housing with the dispenser outlet preferably also being positioned above and centrally axially situated between first and second side frame structures 66, and 68. With this positioning, dispensing of material can be carried out in the clearance space defined axially between the two respective nip roller sets 74, 76 and 84, 86.

Also dispenser assembly 192 is preferably supported a short distance above (e.g., a separation distance of 1 to 5 inches more preferably 2 to 3 inches) the nip contact location or the underlying (preferably horizontal) plane on which both rotation axes of shafts 72, 82 fall. This arrangement allows for receipt of chemical in the bag-being formed in direct fashion and with a lessening of spray or spillage due to a higher clearance relationship as in the prior art. Dispenser apparatus 192 further includes chemical inlet section 198 positioned preferably on the opposite side of main dispenser housing 194 relative to dispenser and section 196. The outlet or lower end of dispenser assembly 194 is further shown positioned below idler roller 101 (e.g., a preferred top to bottom distance for housing 194 is 5 to 10 inches with 7 inches preferred, and it is preferable to have only a short distance between the upper curved edge of dispenser housing 194 and the horizontal plane contacting the lower end of upper idler roller 101 (e.g., 1 to 3 inch clearance with 1.5 inches preferred). In this way the upper, smooth curved edge of dispenser housing 194 helps in the initiation of the C-fold film or like film with the edges being separated and opened up as the film passes from idler roller 101 and along the smooth sides of dispenser housing 194 into the nip roller set. Thus, a distance of about 1 foot ±3 inch is preferred for the distance between upper idler roller axis and the nip roller contact point.

Figure 14A:
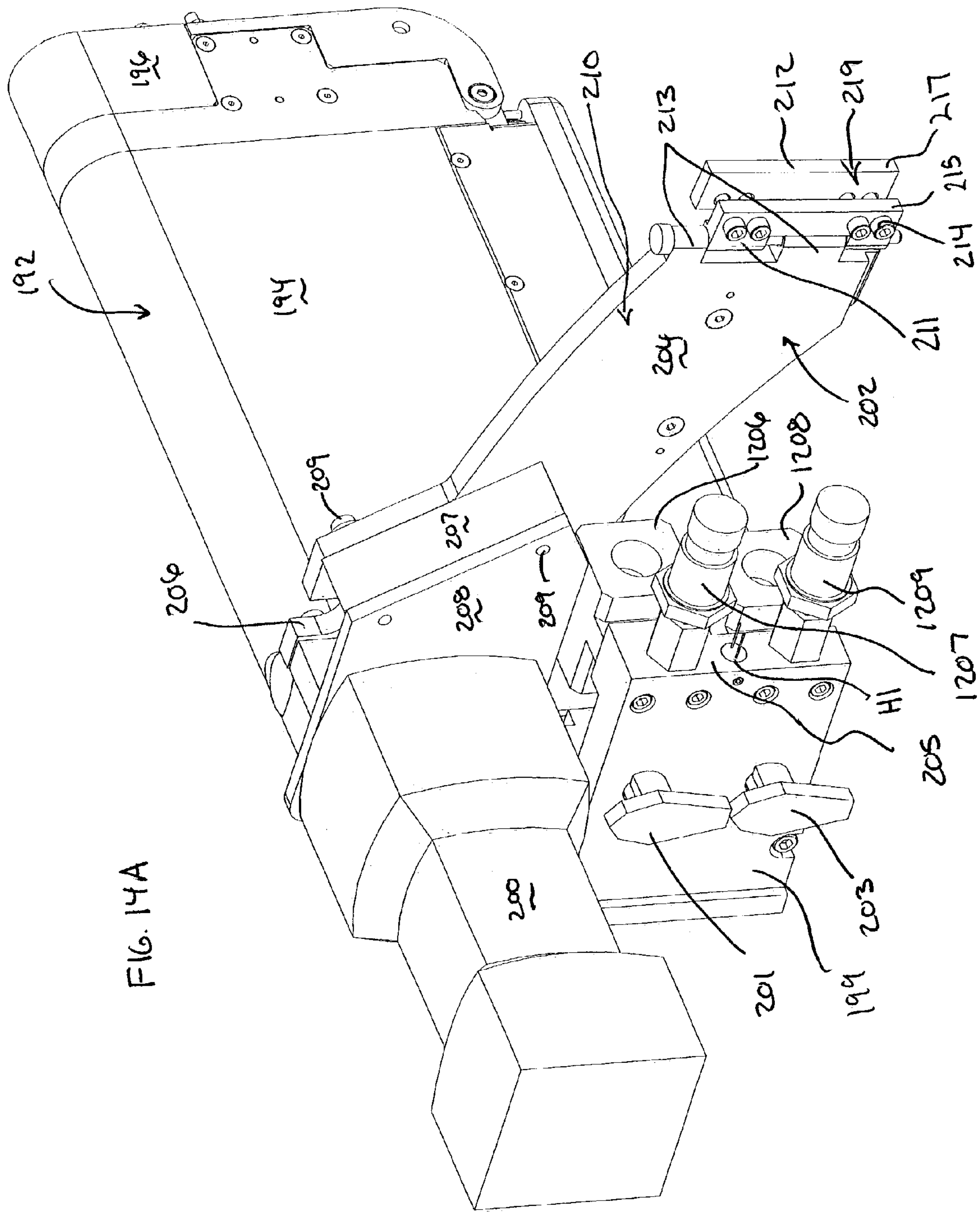
FIG. 14A shows dispenser apparatus separated from its support location.

FIG. 13 also illustrates dispenser motor 200 used for dispenser valve rod reciprocation as described below. Inlet end section 198 comprises chemical shut off valves with chemical shut off valve handles 201, 203 (FIG. 14A) that are large (e.g., a ½ to 1 inch or more in length) because of their placement outside of the film pathway, and thus readily viewed, particularly with color coding (as in blue and red handles) and positioned for easy hand grasping and adjustment without the need for tooling. As shown in FIG. 14A, chemical shutoff valves 201, 203 are supported on manifold housing 205 of main manifold 199 through which the chemicals pass before being forwarded to the manifold housing portion of dispenser housing 194 and are adjustable between chemical pass and chemical blocked settings. The chemical shutoff valves are also positioned well away from the dispenser outlet so as to help avoid the problem associated with the prior art of having foam harden on the valves rendering them difficult to access. There is thus avoided the prior art disadvantages of having valves of relatively small size that are positioned within the confines of the bag being formed and are designed to make it difficult to view the status of the shut off valves and access the valves particularly after a foam coating.

Inlet end section 198 further includes pressure transducers 1207 and 1209 adjacent heater chemical hose and hose heater feed through manifolds 1206 and 1208 which feed into main manifolds 205. Pressure transducers are in electrical communication with the control system of the foam-in-bag dispenser system and used to monitor the general flow state (e.g., monitoring pressure to sense line blockage or chemical run out) as well as to provide pressure signal feedback used by the control system in maintaining the desired chemical characteristics (e.g., pressure level, temperatures, flow rate etc.) for the chemicals in maintaining the desired mix relationship for enhanced foam generation. In this regard, reference is made to FIG. 194 for an illustration of chemical temperature control means in the main manifold 199 and housing manifold 194. FIG. 14A also illustrates manifold heater H1 which also is in communication with the control system for maintaining a desired temperature in the manifold 199. Filter devices 4206 and 4208 seen in FIG. 13 are placed in fluid communication with the heated chemical passing through the manifold and can be made of a relatively large size and also of a fine mesh (e.g., screen mesh size of 100 or more mesh) and arranged so as to present at least one screen section in contact with the through flow of chemical. In view of the filter device's location at the inlet end section 148 they too are also far removed from the chemical dispenser's outlet and thus not prone to hardened chemical coverage (e.g., the inlet end section's 198 closest surface (e.g., the nearest filter's central axis and the closure valves are positioned 4 or more inches and more preferably 6-16 inches from the interior edge of film travel off the dispenser housing). This positioning outside of the film edge provides for the filter enlargement and much greater flexibility in the type and configuration of the filter. As seen, filters 4206 and 4208 are readily accessible and preferably retained in a cylindrical cavity such that a cylindrical filter shape can be inserted in cartridge like fashion. Enhanced removal filters can also be inserted like "depth" filters (100 micron or 50 micron removed or less as in a two stage depth filter with first stage soft outer element and more rigid inner element capable of handling the pressures involved and the chemical type passing therethrough without degradation).

FIG. 14A illustrates dispenser apparatus 192 separated from its support location shown in FIG. 13 and shows main housing 194, dispenser end 196 as well as additional detail as to inlet end section 198 and dispenser motor 200. As seen from FIGS. 13, 14A and 14B and described in part above, many of the components previously placed in the prior art close to the dispenser outlet and between the left and right edges of the film being fed therepast and thus highly susceptible to foam contact, are moved outside and away from the area between the left and right edges of the film. In FIG. 13 there is demarcation line FE representing the most interior film edge with the opposite edge traveling forward of the free end of dispenser system 192. Thus, with a C-fold film the bend edge is free to pass by the cantilevered dispenser system 192 while the interior two sides are joined together with edge sealer 91 while passing along line edge FE. The components which have been moved from the prior art location between the film edges includes the drive motor (and a portion of its transmission), filter screens, electrical wires, chemical hoses and fittings, shut off valves, and pressure sensors.

For example, moving the drive motor 200 for the valving rod outside of the bag area facilitates (i) making the shape of the dispenser more streamlined for smooth film contact as in a smooth upper curvature leading to planar side walls (ii) making for use of a larger, more powerful, and more robust motor and gear box than is possible if it had to be inside the bag, (a requirement that demands the miniaturization of any potentially large components or mechanisms), (iii) the motor will stay cleaner of foam, crystallized isocyanate, sticky B chemicals, and solvents for the life of the system, since it is situated out of harms way, (iv) motor is easier to service than on previous dispenser designs, which required some fine work in a sticky environment, with the motor of the present invention being serviceable without having to open any of the chemical passages or touch any components that handle chemical.

The aforementioned chemical filter screens for filters 4206, 4208 are needed to protect the small orifice ports in the mixing chamber. These screens need to be cleaned out periodically. In the common prior art design, these screens are adjacent to the mixing block. To access these screens you have to work in this area, which can be a sticky and difficult task because of the chemical and foam buildup. A preferred embodiment of the present invention locates the screens of filters 4206 and 4208 in the main dispenser manifold 199, which is completely outside of the bag. This means that the screens retainers will be cleaner and easier to remove than with the prior art design. The screen retainer caps are also made much larger relative to the above noted prior art design. By moving the filters external to the bag forming area, the screens can be made larger avoiding the situation that the smaller the screen surface area, the more often it has to be cleaned or replaced. The screens in previous foam dispensers were located near the mixing chamber, which were always inside the bag. These screens had to be small because of the miniaturization required to keep everything inside the bag. The filter screens and filters 4206, 4208 supporting the screens of a preferred embodiment are located outside of the bag in the main dispenser manifold, where components can be much larger without affecting machine performance in any way. The current design preferably has 10 to 100 times or more the surface area of the screens used in the most common prior art design (e.g., an exposed screens surface area of greater than an inch such as in the 1½ to 3 inch range). Also, with the filter screen area increased capability, the present invention provides for the use of a finer mesh screen without increasing the frequency of required screen cleaning to a noticeable degree. If the screens in the noted prior art design were changed to a finer mesh, it would cause a significant increase in screen clogs and maintenance, because of the increased trapping power of the finer mesh and the undersized screen surface area. Finer mesh screens (e.g., 100 mesh or better) do a better job of protecting the ports in the mixing chamber from particles, debris, and polymeric gunk that sometimes forms in the chemical lines. The mesh size of the screen used in the noted prior art dispenser is roughly the same as the diameter of the port in the mixing chamber. In this situation, the screen is ill suited to provide the recommended level of protection required to keep the ports clean over an extended period. For example, in the hydraulics business, the general rule of thumb is that the size of the hole in the screen mesh should be about 10 times smaller than the size of the orifice that is being protected. The present inventions ratio is about 3 to 1 or more, which is judged adequate for the anticipated needs, but can be increased without significant repercussions as in pressure drop concerns.

Heating the chemical manifolds of the dispenser assembly to a proper temperature range prevents the phenomenon called cold shot, which occurs when the chemical temperature drops in proximity to the dispenser, because of the large mass of relatively cold metal in that area. If the idle period between shots is short, less than 10 seconds, for example, the chemical within the manifolds will not have sufficient time to cool below an acceptable range, and no cold shot will be observed. However, if the idle time exceeds 10 seconds, the problem begins to manifest itself as coarse, poorly cured, sticky foam. Cold shot has an impact on foam efficiency, since it is possible that every shot that the user makes will be affected. If an unheated dispenser has been idle for a long time, say 15 minutes or more, it can take in excess of 1 second to purge the cold chemical and dispense at the correct temperatures with chemical that was residing within the chemical lines. If the operator's average shot length is 4 seconds, then the cold shot phenomenon could potentially affect 25% of the chemical volume that is used. The present invention has the advantageous feature of providing heat sources at strategic locations to provide at least temperature maintenance heating along the entire path of chemical travel starting with a heater in the chemical supply hose initiated within 20 feet or so of the dispenser housing, a heater in the main manifold 205, and a heater in the dispenser housing 194 which has chemical passageways that exit into the mixing module. In this way, from the initiation point all the way to the outlet tip, the chemical is maintained at the desired temperature (maintained in the sense of not being allowed to drop below a desired temperature 130° F. or with the option of applying additional heat to raise the level at to above an initial chemical hose temperature setting).

Figure 58:
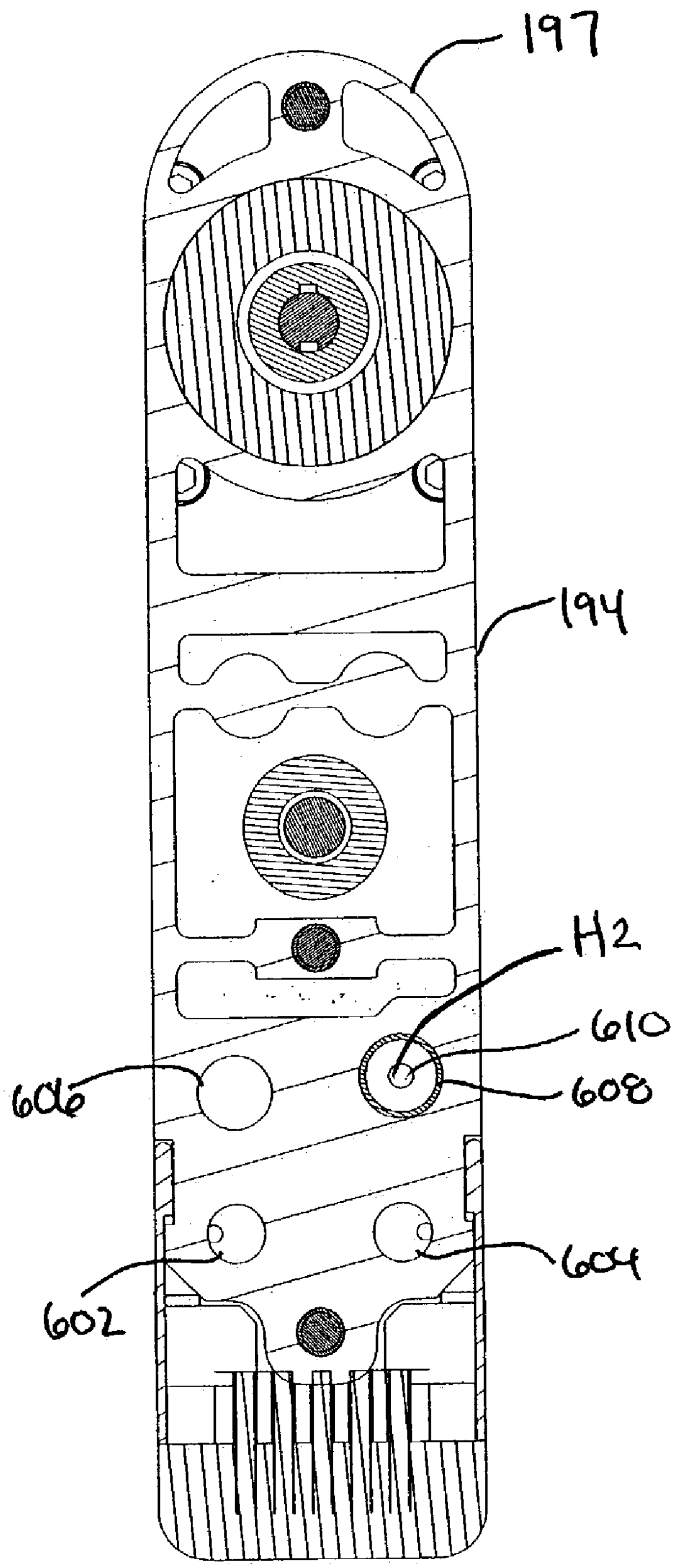
FIG. 58 shows a cross-sectional view taken along cross-section view B-B in FIG. 56.

Manifold heaters to prevent cold shot by maintaining the metal mass temperature in an acceptable zone, which is typically in the 110 to 130° F. range, have been developed in the prior art but not used particularly effectively. The problem is not so noticeable if the manifolds are heated to at least 110 degrees F. At this point, the visual indications of cold shot are reduced to a point where most users will not notice it. In an effort to eliminate cold shot as an issue entirely, the manifolds of the present invention are preferably heated to the same temperature as the chemical lines, which is preferably about 125 to 145 degrees F. The manifold heaters in use in many prior art systems, have a heating power in the 10 to 20 watt range. This is not well suited to do the job as it takes about 15 to 25 minutes for the manifolds to get close to steady state temperature from a cold start. At this low power, the manifolds will only heat up to 110 or 115 degrees F., if the operating environment is not much colder than normal room temperature, and possibly not even get up to that temperature if the room is significantly colder than normal, which is a common occurrence in the manufacturing environment. Under the present invention's "external to bag" manifold positioning and the way the manifolds and dispenser support are designed, there can be used a larger and much more powerful heater than what was possible in the noted prior art design. A preferred embodiment of the present invention has about 300 watts or more of manifold heating power available. A preferred embodiment of the invention uses two cartridge heaters, one is preferably mounted into a drilled hole in the main manifold 199 (the manifold block designated 205) and is represented by H1 in FIG. 14A, and the other (H2—FIG. 58) is preferably installed into an extruded hole in the dispenser support and is of cartridge form meaning it has its own sensors and controls for making adjustments in coordination with a control board processor or with its own processor or reliance can be placed on the control sub-system for the manifold noted above. The cartridge heaters of the present invention can be replaced without having to handle any components that are likely to be in contact with foam, chemicals, or solvents and thus to service one does not have to deal with components that are contaminated with chemicals, solvents, and foam.

Common prior art systems use a small PTC heater, which is situated inside the dispenser manifold that is adjacent the mixing block. A PTC is an abbreviation for Positive Temperature Coefficient. Heaters with this designation are based on thermistors with a resistance vs. temperature curve that has a positive slope, meaning that its resistance goes up as the temperature goes up. Most thermistors are NTC, or Negative Temperature Coefficient, and have a resistance vs. temperature curve that has a negative slope. PTC type thermistors are often used in heating applications because of their self-limiting characteristic; as they get hot, they draw less power allowing for a small PTC heater to heat the dispenser manifold. This approach has the advantage of not needing a temperature sensor or a temperature control circuit, since the PTC is self-regulating and self-limiting. One disadvantage, among many, however, with the PTC approach is that there is no practical way to change the temperature setpoint. The resistance vs. temperature curve of the PTC, in conjunction with the thermal conductivity between the PTC and the adjacent materials, determines the final steady state temperature of the manifold. A preferred embodiment of the present invention has two manifolds (199 and dispenser housing 194 described below), each with its own independent cartridge heater, thermistor (H1 and H2), and control circuit; giving it the capability of controlling each manifold independently and at a wide range of setpoints if necessary (e.g., a number of setpoints falling between 3 to 20). The control circuits and thermistor sensors that are used in the manifolds of the present invention are easily capable of maintaining manifold temperatures to an accuracy of 2 or 3° F., even if ambient temperatures in the work environment vary widely. The present invention also preferably uses the feature of having the temperature setpoints of the manifolds H1 and H2 follow and match the temperature setpoints of the chemical hoses. For example, if the operator sets the chemical line temperatures (e.g., 130 degrees F.) for chemical hose extensions 28' and 30' (see FIG. 103) feeding from the in-line pumps to the dispenser). Thus, the system controller can automatically make the setpoint temperatures of the manifolds match the set chemical hose temperature (e.g., 130 degrees F.) unless instructed otherwise. If the operator later changes the line temperature setpoints to 140 degrees F., the system controller can automatically make the temperatures of the heaters in the manifolds set for 140 degrees F. in the chemical passing therepast.

Figure 72:
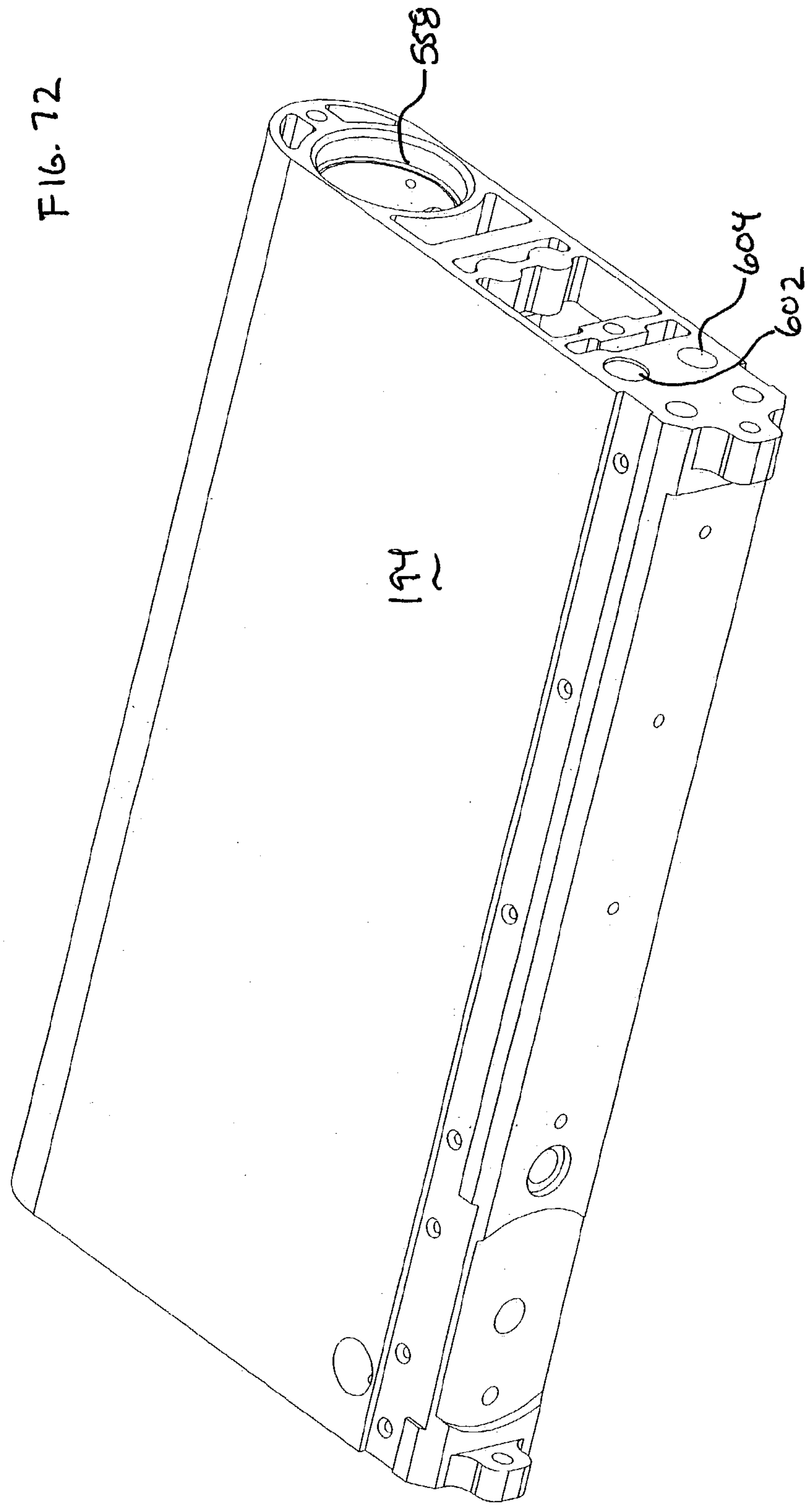
FIG. 72 shows the rear side of the main housing for use in the dispenser apparatus.
Figure 72A:
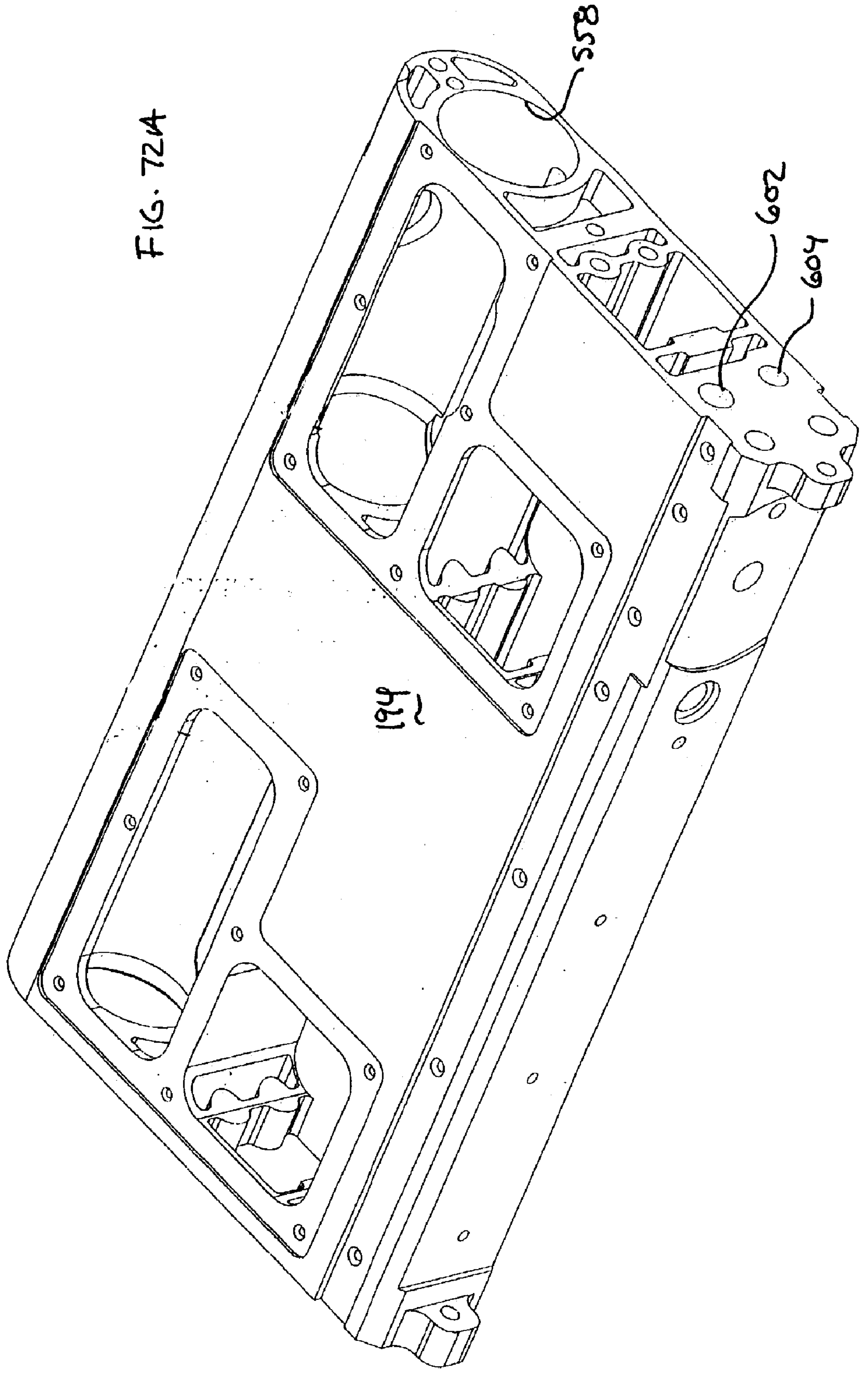
FIG. 72A shows a view similar to FIG. 72, but with access panels removed.
Figure 73:
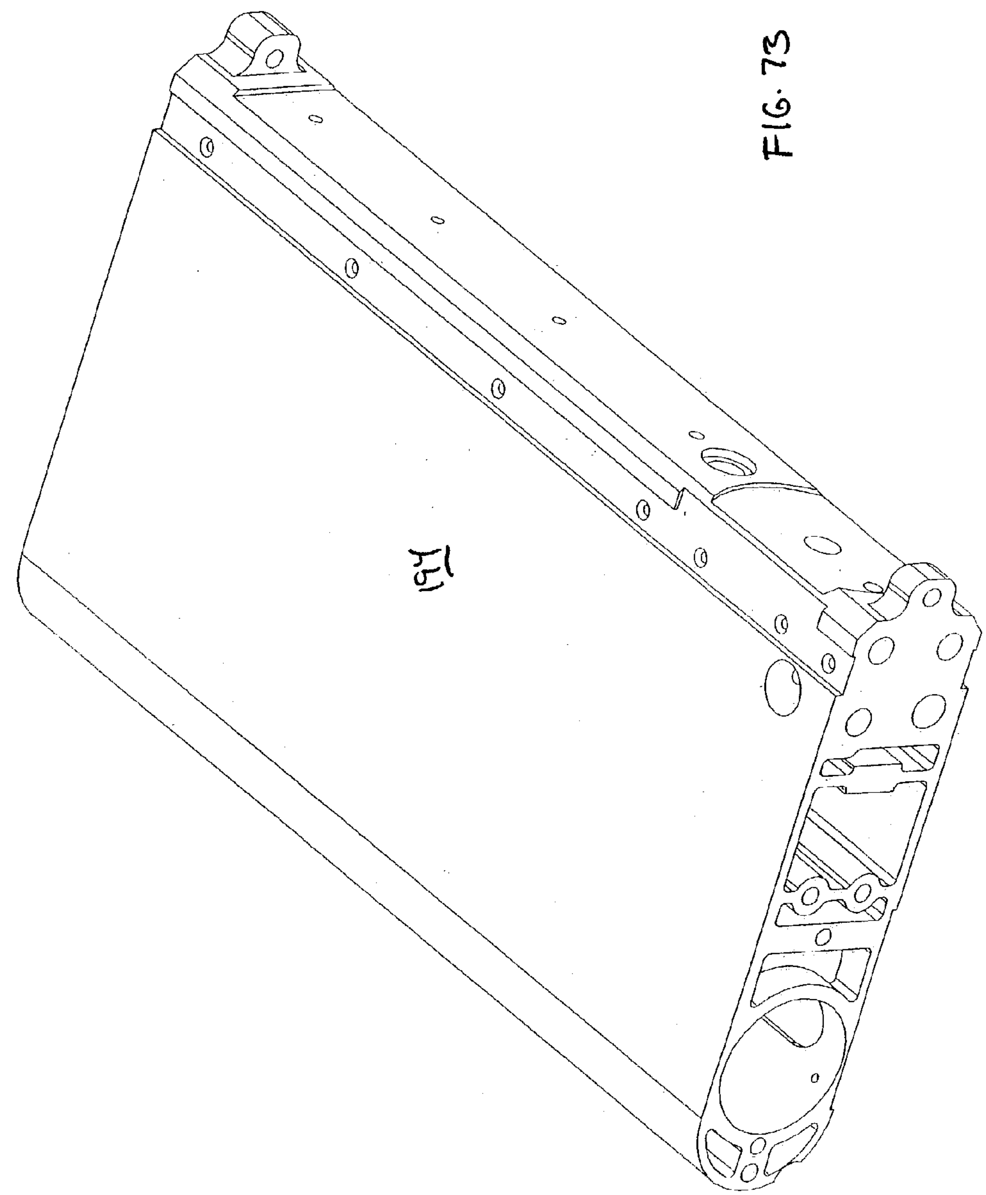
FIG. 73 shows the main dispenser housing on a side opposite of FIG. 72.
Figure 73A:
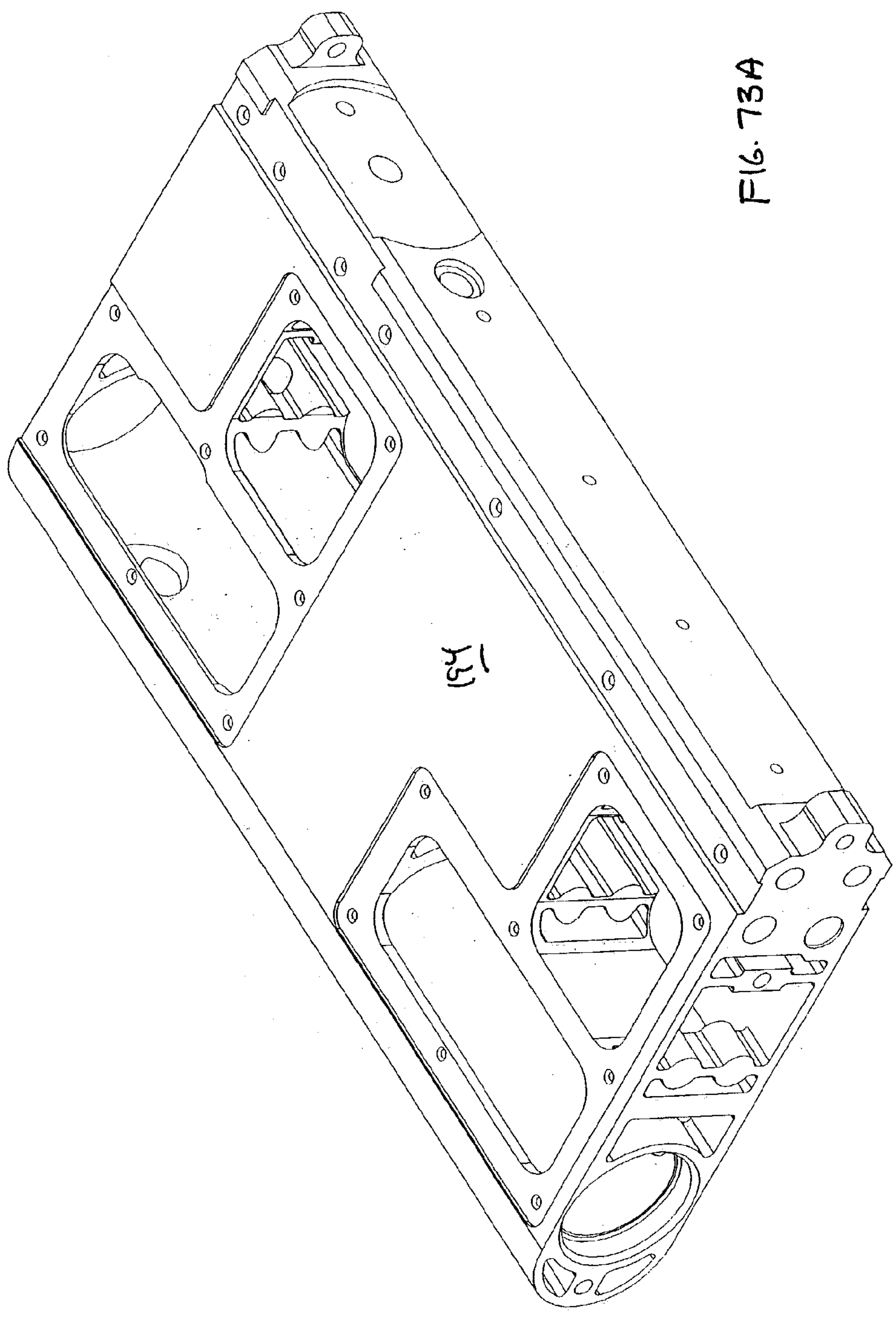
FIG. 73A shows a view similar to FIG. 73, but with access panels removed.

A preferred embodiment of the present invention also has no exposed electrical wires or cables inside of the bag. All electrical connections are made from the outside, or completely isolated inside the dispenser support 194 (which preferably based on an extruded main body as shown in FIGS. 72 and 73).

Common prior art systems have one large multi-conductor electrical (e.g., motor) supply cable that is exposed inside of the bag, often together with a number of single conductor wires inside of the dispenser mechanism that are not protected from the seepage of chemicals and foams. Also, the common prior art designs have chemical hoses that run wide-open right into the middle of the bag, where they are regularly exposed to foam, chemicals, and solvents. These chemical hoses are especially vulnerable because their outer layer is a stainless steel braiding, which presents an obstacle to cleaning when the foam gets into it. Prior art chemical hose fittings, JIC swivel type, are also completely exposed to foam, which can make it more difficult to loosen the fittings, or to re-tighten them.

The conventional dispenser systems shutoff valves for chemical flow are located adjacent to the mixing block. They are fully exposed, right in the middle of the bag, where they are regularly contacted by foam. As seen from FIG. 14A, for example, chemical line shut off valves 201 and 203 are supported by manifold 205 and positioned far off from the bag (e.g., more than 5 and preferably more than 7 inches from the film edge FE).

FIG. 14A further illustrates support bracket assembly 202 comprising main bracket body 204, having bracket plate 206 secured to an exterior bracket plate 208 by way of cross plate 207 with securement bolts 209 on which motor 200 is mounted, with dispensing system 192 also being secured to bracket assembly 202. Bracket assembly 202 further comprises dispenser rotation facilitator means 210 such as the hinged bracket support assembly 219 shown in its preferred positioning with the rotation axis being at its rearward most end whereby rotation of the dispenser from the dispense mode (e.g., a vertical orientation with chemical output along a vertical axis preferred) shown in FIG. 14A to a servicing mode whereupon both the bracket assembly 202 and rigidly (or also hinged by) attached dispenser system 192 are rotated greater than 60 degrees (e.g., 90° transverse to original position) out toward the operator. Bracket support assembly 219 comprises securement clamp plate assembly 212 with opposing clamp plates 215, 217 with bolt fasteners 214 for securement to interior frame member 170 such that support bracket assembly 202 can be hinged (together with the dispenser assembly 192 with driving motor 200 out of the way and forward of the front face 181 of bagger assembly 64 (e.g., a counterclockwise rotation)).

Thus, while dispenser apparatus 92 is preferably designed to have its outlet port vertically close to the bag's end seal location, it is also preferably arranged at a height relative to the upper end of support assembly providing mounting means 78 for the bagger assembly 64 to have freedom of adjustment between the dispensing position and the servicing position (e.g., see the curved forward wall 164 whose curvature provides for added clearance relative to the lower edge of dispenser 192). With this arrangement, when servicing is desired, the operator simply rotates the entire dispenser assembly toward the operator (a counterclockwise rotation for the dispenser assembly shown in FIG. 13 (e.g., a 45-135° rotation with a preferred 90° rotation placing the axis of elongation of housing 194 transverse to the central axis of drive shaft 82)). Rotation bracket support assembly 202 is preferably made rotatable by way of a hinged connection 219 at the rear end of the support bracket 202, although other rotation arrangements are also featured under the present invention such as the dispenser 192 having a rotation access at its boundary region of bracket assembly 202 and dispenser housing 194 or inlet end section 198.

Figure 14B:
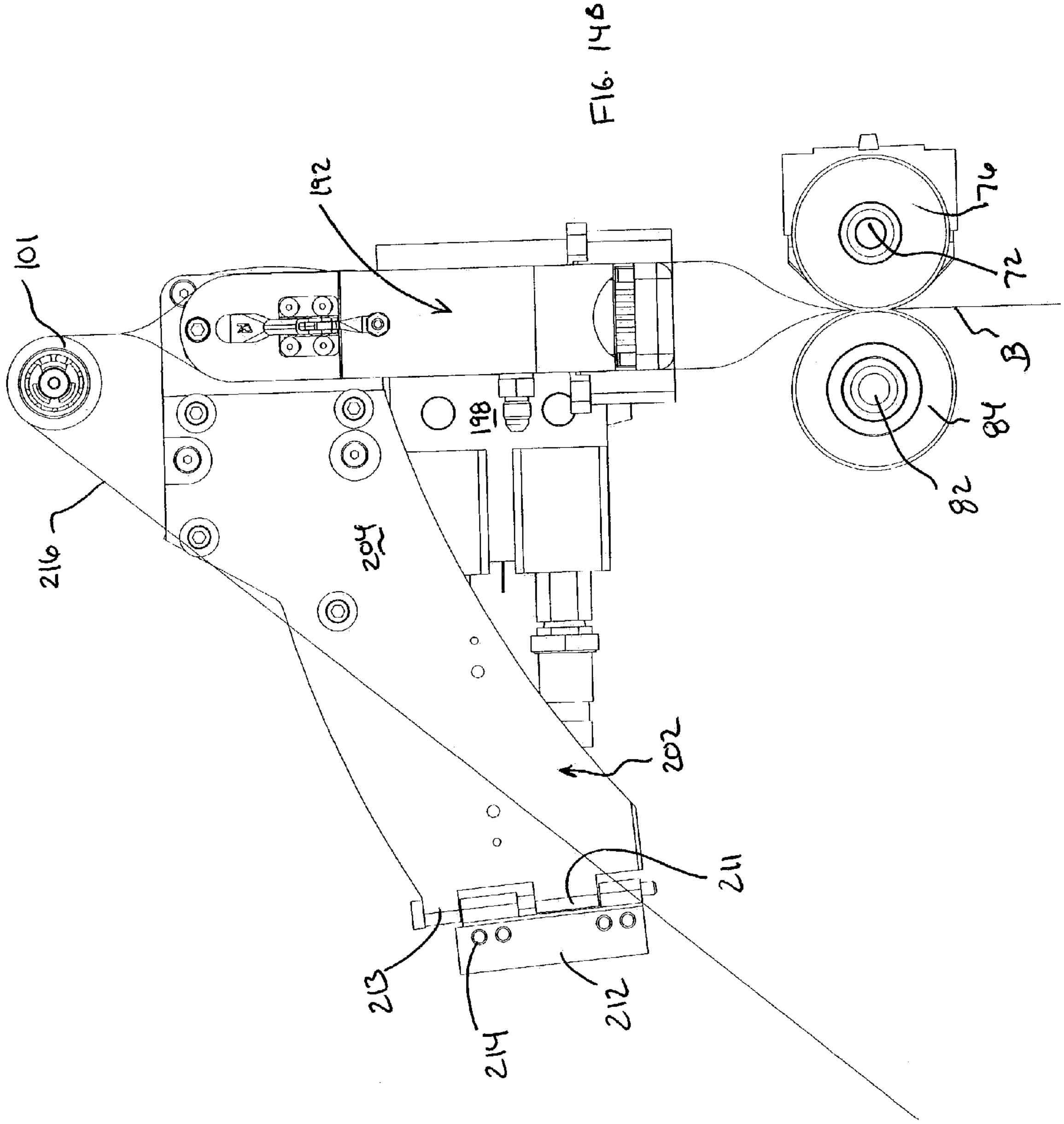
FIG. 14B shows a portion of the film travel path past that dispenser apparatus and nip rollers.

FIG. 14B provides a side elevational view of dispenser system 192 and bracket assembly 202 in relationship to film 216 which in a preferred embodiment is a C-fold film featuring a common fold edge and two free edges at the opposite end of the two fold panel. While a C-fold film is a preferred film choice, a variety of other film types of film or bag material sources are suitable for use of the present invention including gusseted and non-gusseted film, tubular film (preferably with an upstream slit formation means (not shown) for passage past the dispenser) or two separate or independent film sources (in which case an opposite film roll and film path is added together with an added side edge sealer) or a single film roll comprised of two layers with opposite free edges in a stacked and rolled relationship (also requiring a two side edge seal not needed with the preferred C-fold film usage wherein only the non-fold film edging needs to be edge sealed). For example, in a preferred embodiment, in addition to the single fold C-fold film, with planar front and back surfaces, a larger volume bag is provided with the same left to right edge film travel width (e.g., 12 inch or 19 inch) and features a gusseted film such as one having a common fold edge and a V-fold provided at that fold end and on the other, interior side, free edges for both the front and rear film sheets sharing the common fold line. The interior edges each have a V-fold that is preferably less than a third of the overall width of the sheet (e.g., 2½ inch gussets).

As shown in FIG. 14B after leaving the film roll and traveling past lower idler roller 114 (not shown in FIG. 14B—See FIG. 12), the film is wrapped around upper idler roller 101 and exits at a position where it is shown to have a vertical film departure tangent vertically aligned with the nip contact edge of the nip roller sets. Because of the C-fold arrangement, the folded edge is free to travel outward of the cantilever supported dispenser system 192. That is, depending upon film width desired, the folded end of C-fold film 216 travels vertically down to the left side of dispenser end section 196 (from a front view as in relative to FIG. 13) for driving nip engagement with the contacting, left set of nip rollers (74, 86). As further shown in FIG. 14B the opposite end of film 216 with free edges travels along the smooth surface of dispenser housing whereupon the free edges are brought together for driving engagement relative to contacting right nip roller set (76, 84) whereupon the contacting free film edges are subject to edge sealer 91 to complete the side edge sealing for the bag being formed.

FIGS. 12, 15 and 16-21 illustrate the film roll spindle loader adjustment means 218 of the present invention that facilitates the loading of a roll of film for use in bagger assembly 64. Rolls of film vary in weight depending upon the width (e.g., a 12 roll or a 19 inch bag width with weight of, for example, 25 to 35 lbs.) and the amount of film on the roll which is at least partly defined by the radius differential of the rolled film annulus formed between the outer surface of the film roll and the exterior of the roll core 188 (if a core is relied upon), with the preferred outer diameter dimension of the roll being 8 to 12 inches (e.g., 10.5 inches) and the core being 3 to 6 inches with (4 inches being preferred). The film source is preferably a high density polyurethane blend film wrapped about a film core with at thickness of 0.0075 in. times 2 for folded combinations.

Figure 15G:
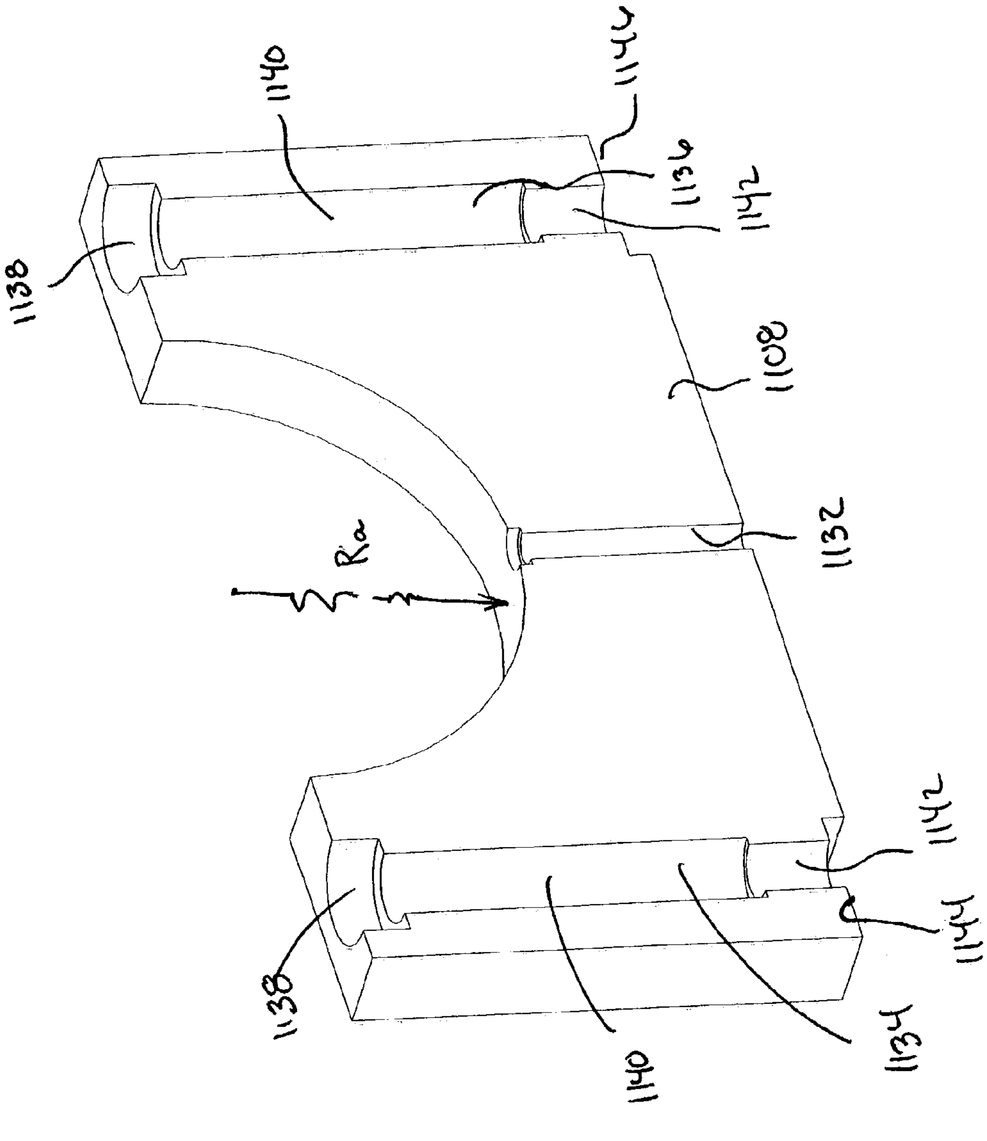
FIG. 15 shows a side elevational view of the dispenser system with spindle roll support in both operational (with the roll supported) and in mounting positions.
FIG. 15A shows a top plan view of the dispenser system with cover housing components in various positions.
FIG. 15B shows a front view of the dispenser system with control panel boards visible.

FIG. 15 provides a left side elevation view of dispenser system 22 with a full bag film roll 220 shown in a ready to use state (ready for film feed or reel out to nip roller set) by way of dashed lines and wrapped about core 188 while being supported on film support means 186. FIG. 15 also illustrates (after film roll run-out and core removal) spindle 222 forming a component of film support means 186 and having been adjusted from the reel out mode to a ready to load (unload) state wherein the axis of elongation of spindle 222 extends transversely to the axis of elongation assumed by the spindle when in a reel out state.

The ability to adjust the axis of elongation of spindle 222 to a location where an operator can simply slide a bag film roll on to the spindle, which roll can weigh 30 lbs or more, past the free end 224 of the spindle and along its central axis greatly simplifies and speeds up roll film loading as compared to many prior art designs that require the operator to load the film roll into the bottom and/or back of the machine at a very awkward angle. This loading requirement for prior art devices can put a great strain on the back and shoulders muscles and cannot be expected to be performed by some operators. Spindle load adjustment means 218 of the present invention includes an embodiment that allows an operator to rotate an empty film roll (spindle) to a position where the spindle points directly at the operator, whereupon the empty roll core can be readily removed and a new film roll with core can be loaded in a fashion that provides for reduced operator stress through the ability to load from the front of the machine where an operator typically stands during general dispensing operation.

Furthermore, in a preferred embodiment spindle load adjustment means 186 operates in conjunction with lock in-position mechanism 226 (FIG. 11A to 11D) that locks or engages the film support means in a operational film feed state, and which can be disengaged (e.g., a control signal based on the processing of a button on the control panel shown in FIG. 15B) to provide for movement of spindle 222 into a loading position. That is, lock mechanism 226 locks the spindle with loaded roll upon locking activation (e.g., following insertion of a new roller spindle 222 and the return of the roll to a ready to feed mode). Upon release activation, lock-in-position mechanism 226 releases film support means from its fixed or reel out state with the spindle axis parallel to driver roller 72 to enable adjustment to the new film roll load state. In a preferred embodiment, there is further provided a release facilitator 864 (FIG. 11D) such as a light load wrapped torsion spring 865 or a compressed helical spring or solenoid driven pusher to initiate the rotation of the spindle toward the load state as illustrated by the rotation arrow in FIG. 12. Thus, release facilitator means is provided such as an electrically activated pusher solenoid, a compressible elastomeric block, or some other rotation facilitator.

Figure 16:
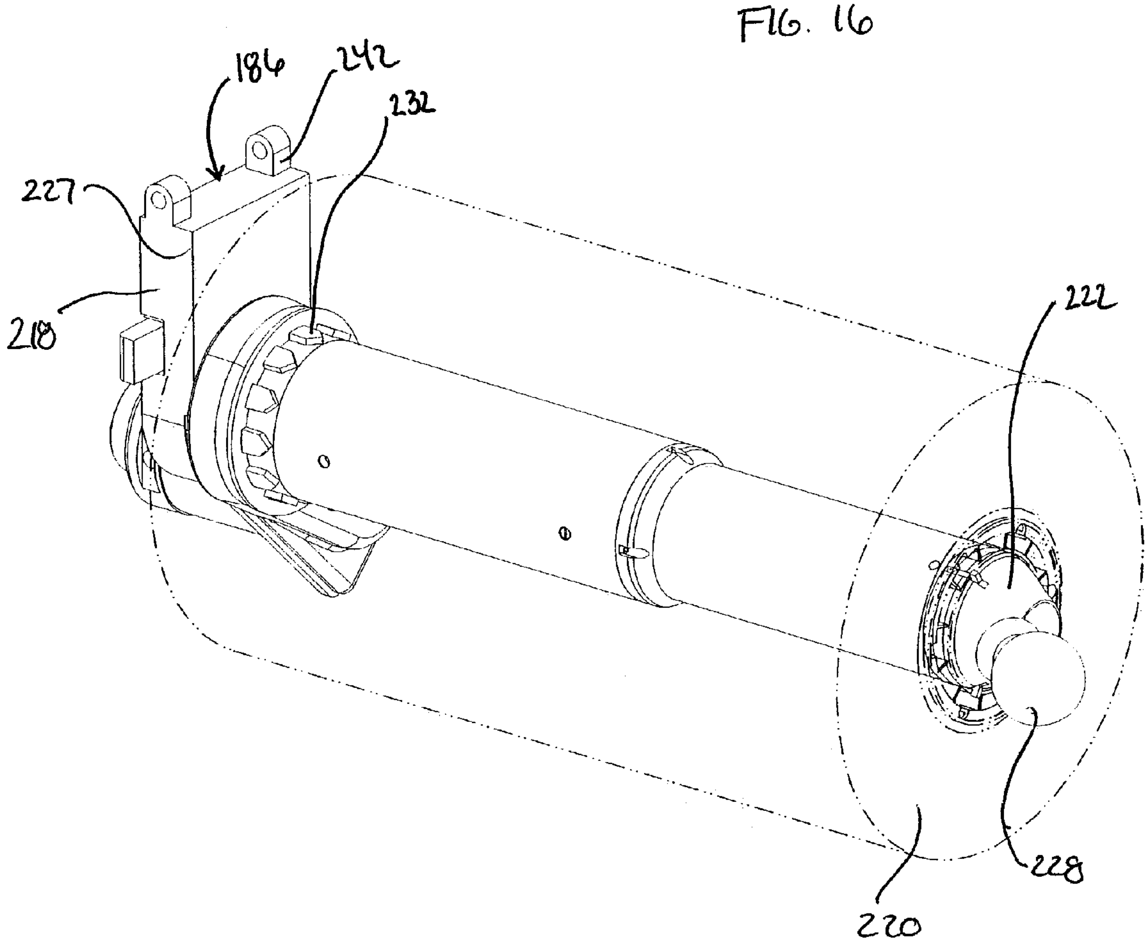
FIG. 16 shown the film support means or film source support of the present invention with a dash line roll mounted thereon.
Figure 17:
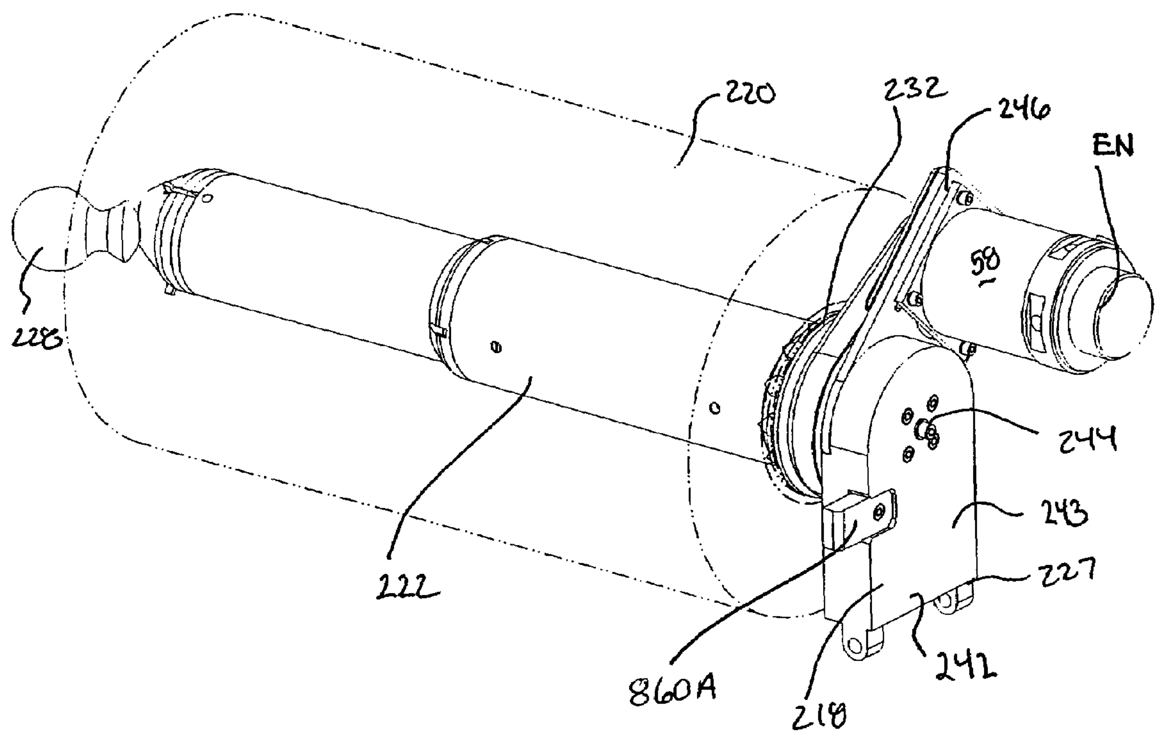
FIG. 17 shows a similar perspective view of that which is shown in FIG. 16, but from an opposite end view showing the web tensioning or film source drive system.
Figure 18:
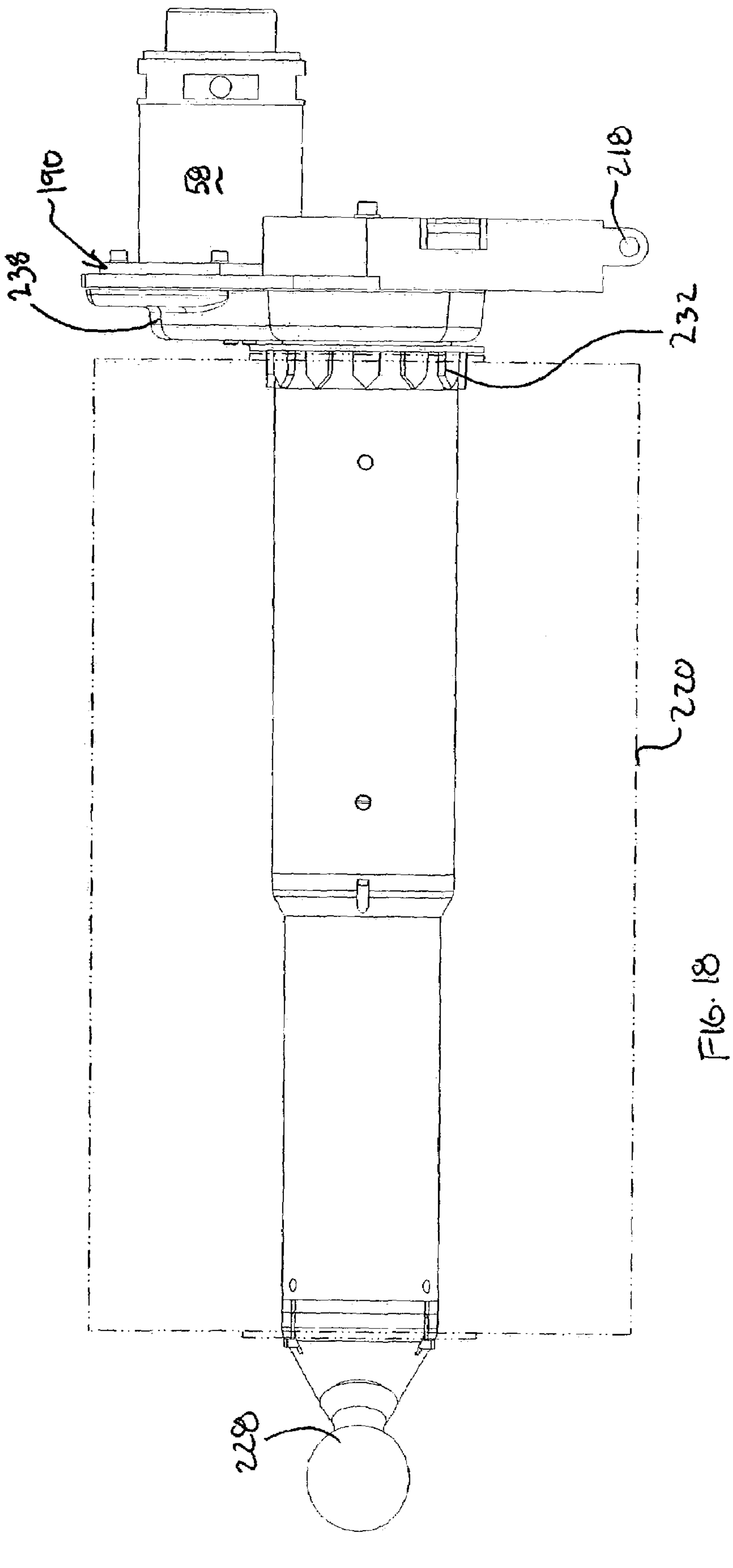
FIG. 18 shows a top plan view of that which is shown in FIG. 16.

With reference to FIGS. 16 and 17, there can be seen pivot support frame structure 227 (or the spindle-to-support connector 218) of spindle load adjustment means 218 to which the non-free or base end of the spindle is connected in a bearing portion of frame structure 227. Spindle locking latch 226 (FIG. 6) locks spindle 222 with film roll 220 in its operational feed mode—automatically upon return rotation from a film load position. In addition, the release mechanism preferably comprises a capture spindle latch mechanism 858 (FIG. 11A) that is solenoid 866 driven (button activated at display panel) into release and has a cam surface 860 (FIG. 12) which rides over and latches a capture portion or latch reception component 860A (FIGS. 12 and 17) of the spindle mechanism when being returned into ready to reel out mode.

FIGS. 16-21 illustrate film roll support means 186 comprising spindle 222 with roll latch 228 for locking the film axially on the spindle. These figures also show drive transmission 238 includes spindle base or proximal end roll engagement means 232. The spindle base end engagement member 232 drives film roll 220 with web tension motor 58 and forms the downstream component of web tension or film source drive transmission 238, with the film source drive means of web tension assembly 190 comprising driver or web tension motor 58 and film source or web tension drive transmission 238.

Figure 19:
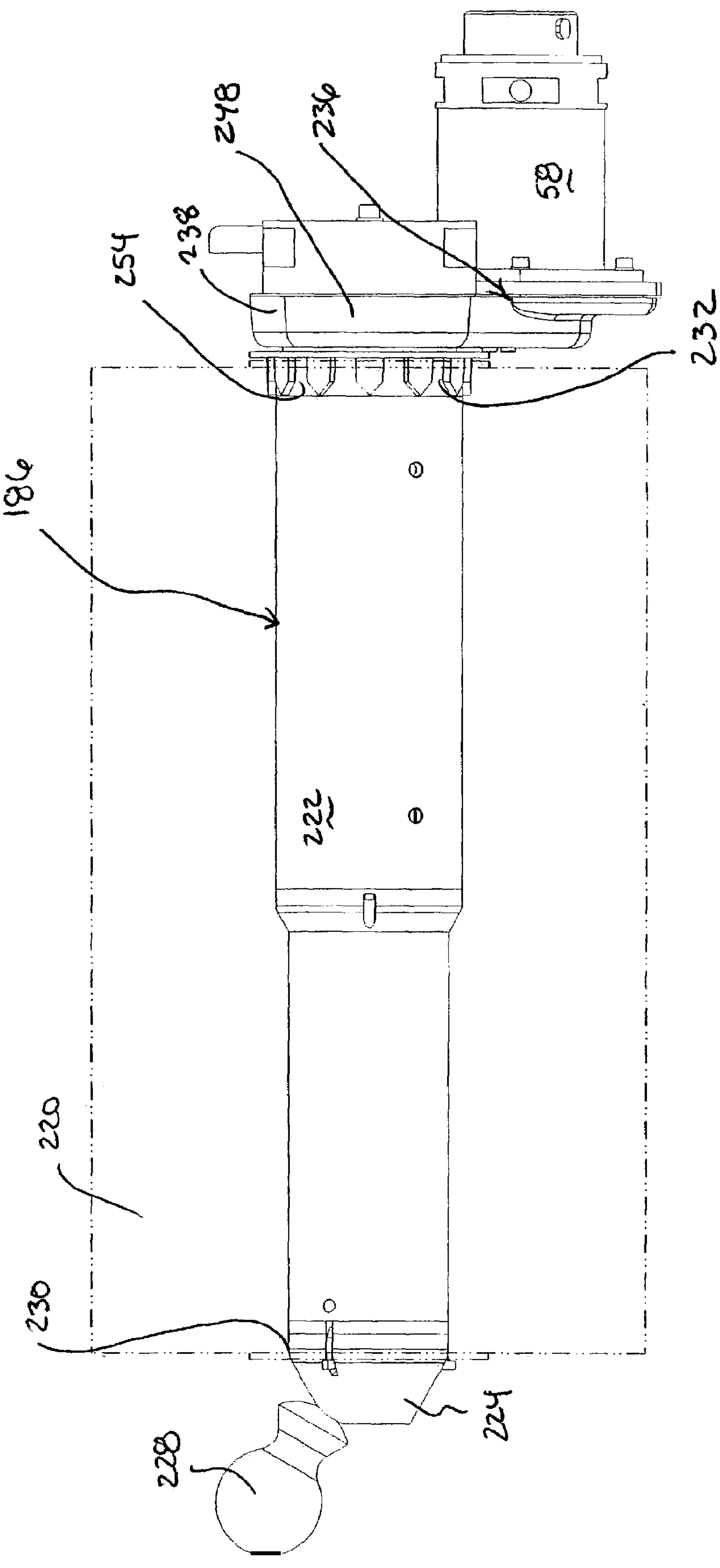
FIG. 19 shows a front elevational view of the film support means.
Figure 20:
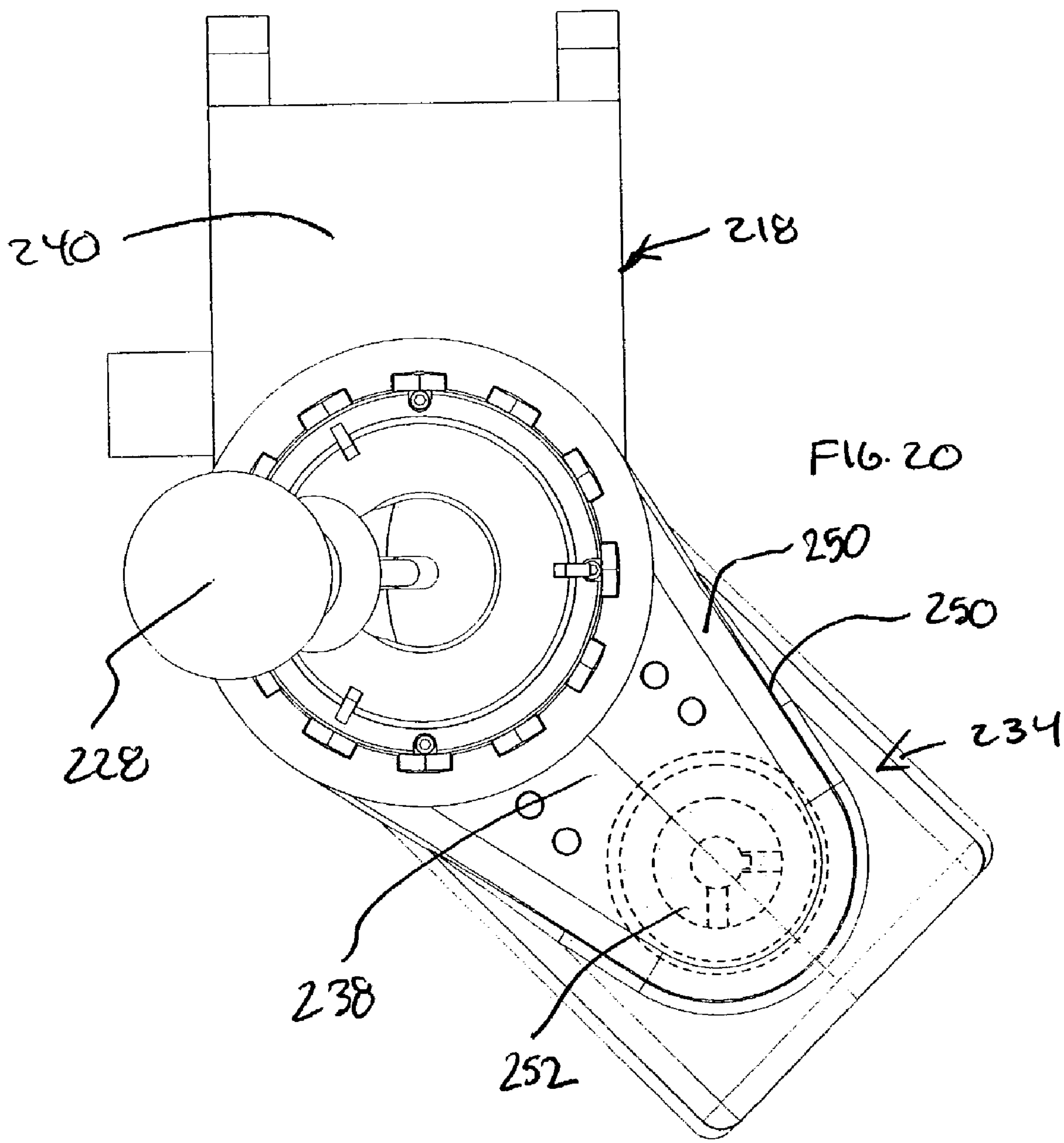
FIG. 20 shows a free end elevational view of the film support means.
Figure 21:
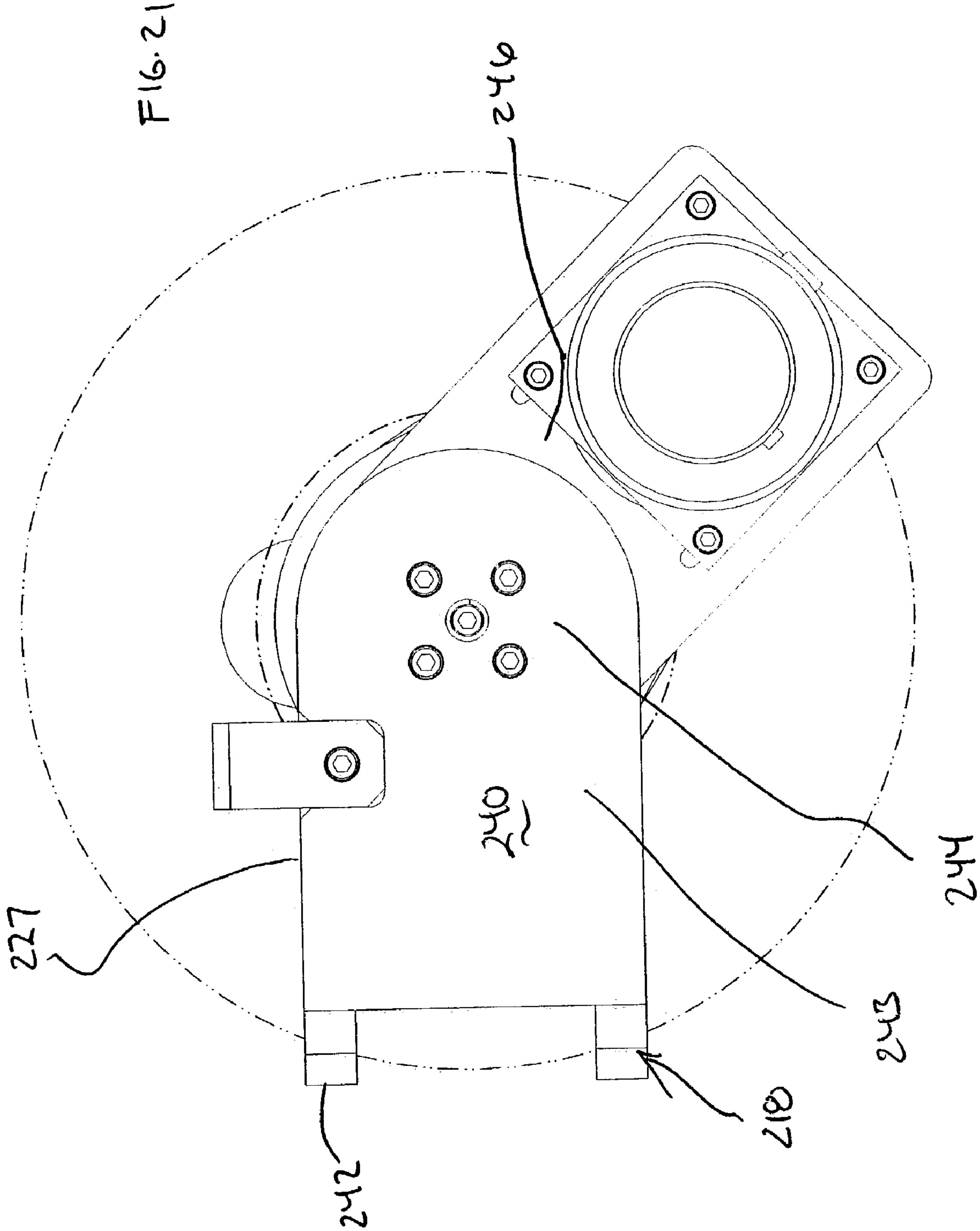
FIG. 21 shows a non-free end elevational view of the film support means.

FIGS. 20 and 21 further illustrates spindle loading adjustment means 218 having load support structure 240 with hinge section 242 at one side of a first support plate (e.g., a metal casting) 243, an intermediate support section 244, aligned with the central axis of spindle 222 and receiving by way of a bearing support the base end of the spindle, and a web tension motor mount support section 246 radially spaced from the noted central spindle axis. As shown in FIGS. 12 and 19, web tension motor 58 is supported by motor mount support section 246 on a first side opposite to the spindle location side (relative to an extension of the axis of rotation of the roller) and is spaced rearward of lifter assembly 40. On the second or spindle location side of motor mount support section 246 and the interconnected intermediate section 244, there is provided support transmission casing 248 (FIG. 19) which encases a preferred embodiment of web tension drive transmission 238. As shown, drive transmission 238 features a timing belt 250 (shown in dashed lines in FIG. 20), driving pulley 252 and a driven pulley (not shown) with the latter being in driving engagement with engagement member 232.

Figure 22:
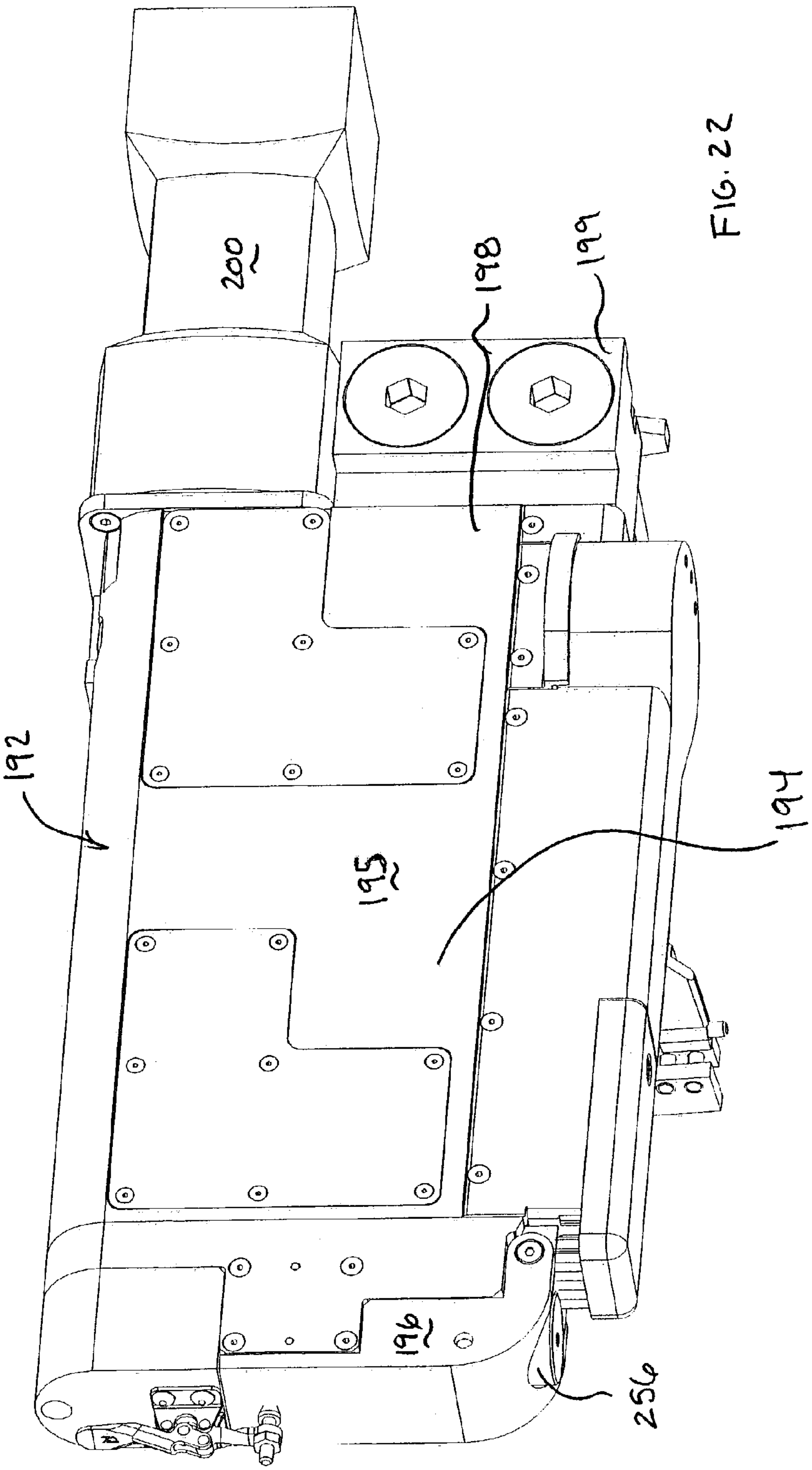
FIG. 22 shows a view of dispensing apparatus similar to FIG. 13, but from a different perspective operation.

FIG. 22 provides a view of dispenser system 192 in similar fashion to that shown in FIG. 13, but from a different perspective angle. FIG. 22 thus shows dispenser housing 194 comprising main housing section 195, dispenser outlet section 196 and dispenser inlet section 198. Dispenser drive motor 200 is shown mounted on dispenser housing 194. FIG. 22 further partially illustrates chemical mixing module 256 from which mixed chemical is dispensed to an awaiting reception area such as a partially completed bag.

Figure 23:
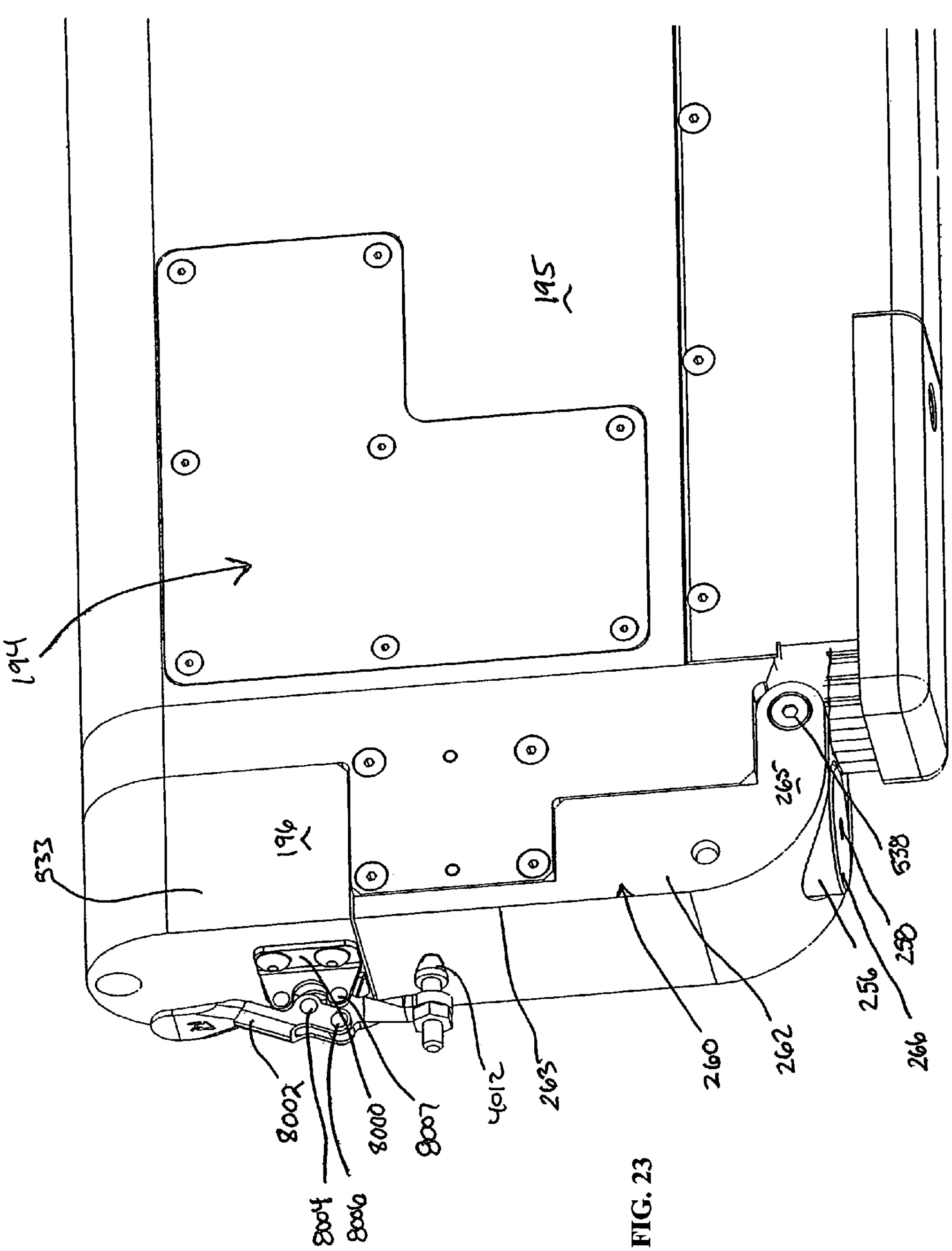
FIG. 23 shows an enlarged view of dispenser outlet section.
Figure 24A:
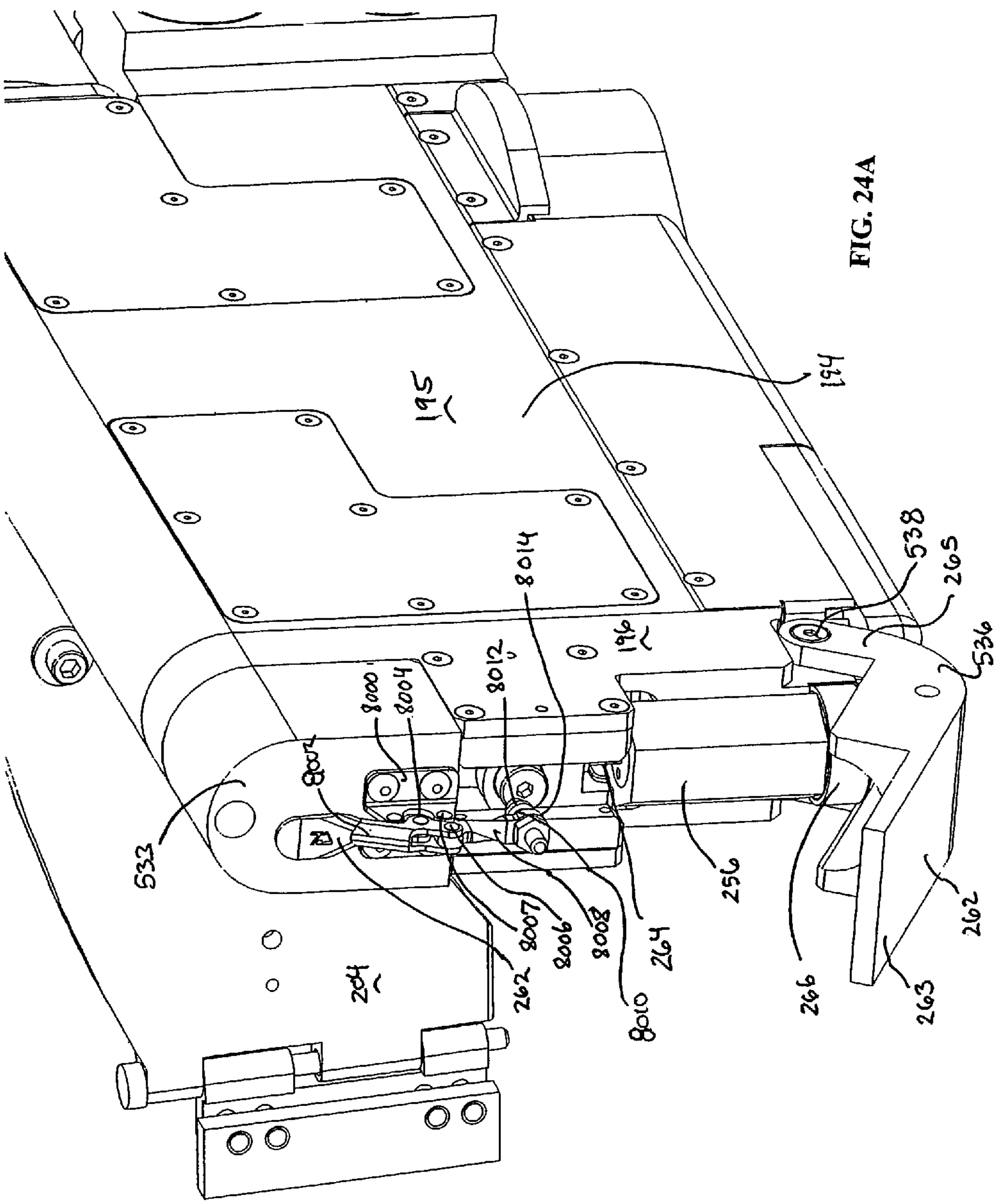
FIG. 24A shows a view similar to FIG. 23, but with the mixing module compression door in an open state and with the mixing module in position.
Figure 24B:
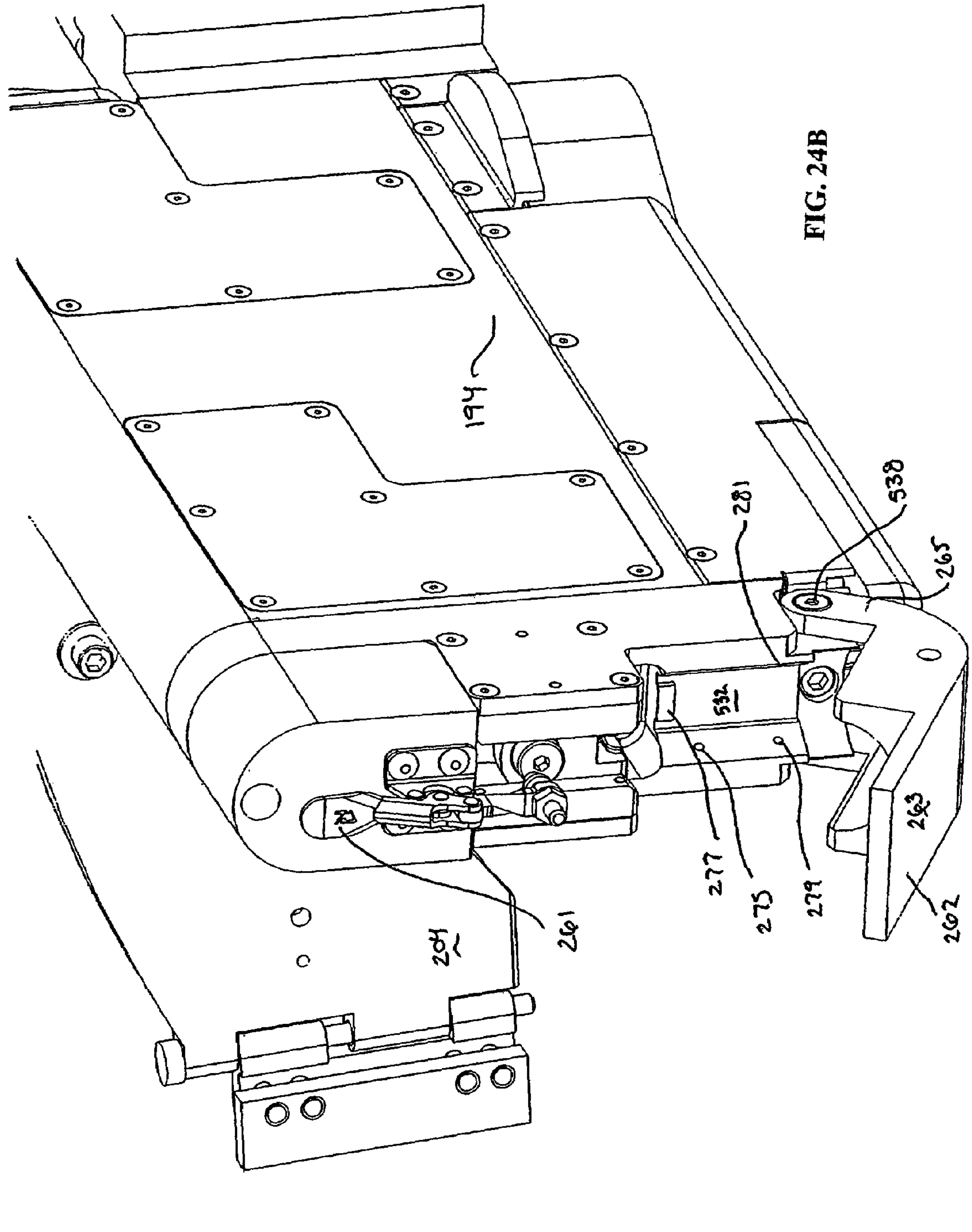
FIG. 24B shows the same view as FIG. 24A, but with the mixing module removed.

FIG. 23 provides an enlarged view of dispenser outlet section 196 and illustrates the outlet port 258 of mixing module 256. FIG. 23 further illustrates mixing module retention means 260 which in a preferred embodiment comprises adjustable door 262 comprising a first, outer, upper mixing module enclosure component 263 and a second pivotable base 265 engagement component with the pivot base shown engaged with hinge 538 (e.g., a pair of hinge screws with one shown in FIG. 23) supported by main housing 194. The first upper component 263 is designed for contact with an upper forward section of main housing section 196 when in a closed mixing module retention and positioning state. FIG. 23 illustrates door or closure device 262 in a closed state while FIGS. 24A and 24B show door 262 in an open state. Door 262 is closed in position relative to a received mixing module 256 sandwiched between the door and the main housing, while providing a biasing function to facilitate a secure compression seal arrangement between the mixing module's chemical and solvent inlet seals and the corresponding chemical feed outlets of the main housing. FIG. 24A illustrates closure device 262 in an open, mixing module access mode with mixing module 256 retained in an uncompressed position relative to main housing 194, and with the free end of valving rod 264 in an upper position and the mixing module outlet end cap 266 in a lower position which can be seen partially jutting out in the FIG. 23 door closed state. FIG. 24B shows a similar view to that of FIG. 24A, but with the mixing module removed.

The mixing module mounting means of the present invention is designed to be entirely functional in a tool free manner which is unlike the prior art systems requiring tools to access the mixing cartridges for servicing or replacement and require that same tooling to replace a mixing cartridge. Also, the area required for tool insertion in the prior art systems is also prone to foam coverage, making accessing and removal even more difficult. The tool free design of the present invention features toggle clamp 262 having its pivot base 8000 secured to dispenser housing 194 preferably at the forward face of upper housing cap 533 and supports in pivotable fashion, at first pivot pin 8004, "over center" toggle level handle 8002 which has a second pivot pin 8006 receiving, in pivotable fashion, compression lever 8008 having at its free end abutment member 8010 and which is supported on base 4002 with a third pivot pin 8007 to provide for over center latching which compression lever is preferably a threaded pin with a compressible (e.g., electrometric) tip 8012 at its interior end and its opposite and fixed by nut 8014 (which renders compression pin 8010 adjustable in the level of compression imposed while in the over center latch mode).

FIG. 23 illustrates the mixing module closure door pivoted up into its closure state and with toggle clamp 262 in its initial contact immediately preceding being put in the toggle or over center latch state upon pivoting lever 4002 into its final over center state (pointing down and not shown in the drawings) which can be achieved with a simple one finger action (same true for release). Preferably tip 8012 is a hard rubber tip and the compression level is factory set so that the hinged door firmly clamps the mixing module when the toggle clamp is closed. Field adjustments can also be made. Various other mixing module mounting closure means are also featured under the present invention such as a rotating disk or lever with a cam riding surface ramp with temporary holding depression or a sliding wedge in bracket supported by housing 194. The toggle clamp provides, however, a system taking advantage of the mechanical advantage of the over center latch and housing arrangement. In the over center closed state with pin tip 8012 in compression sate, tip 8012 makes contact with the upper end of the pivoted door. The electrometric seals about the solvent ports and chemical ports sealing off the interchange between the dispenser housing 194 and mixing module are thus compressed into the desired sealing compression state. Thus, there is provided an easy manner for properly and accurately mounting the mixing module in dispenser 192 of the present invention.

Mixing module 260 of the present invention shares similarities with the mixing module described in co-pending U.S. patent application Ser. No. 10/623,716, and entitled dispenser Mixing Module and Method of Assembling and Using Same, which application is incorporated herein by reference in its entirety. Through the use of mixing chamber shift prevention means (313, FIG. 28A) there is prevented movement of a mixing chamber within its housing due to rod stick and compression and return of the compression means with the mixing chamber and thus there is avoided a variety of problems associated with the movement of the mixing chamber in the prior art. The present invention also preferably features mixing chamber shift prevention means used together with an additional solvent distribution system that together provide a tip management system with both mixing chamber position maintenance and efficient solvent application to those areas of the mixing module otherwise having the potential for foam build up such as the dispenser outlet tip.

Figure 25:
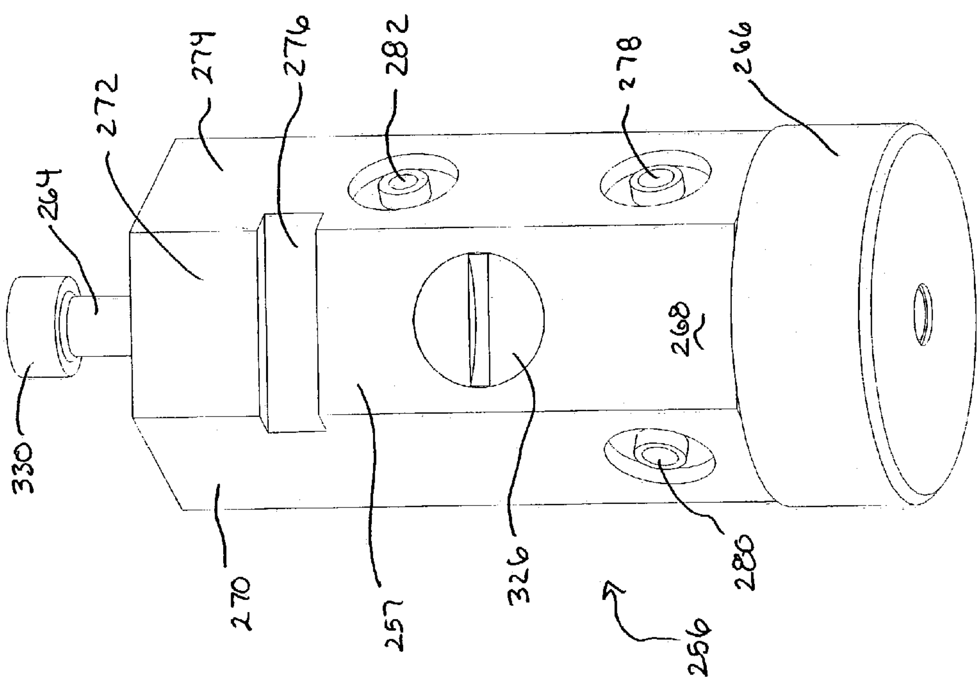
FIG. 25 shows a perspective view of the mixing module showing the mounting face of the same.
Figure 26:
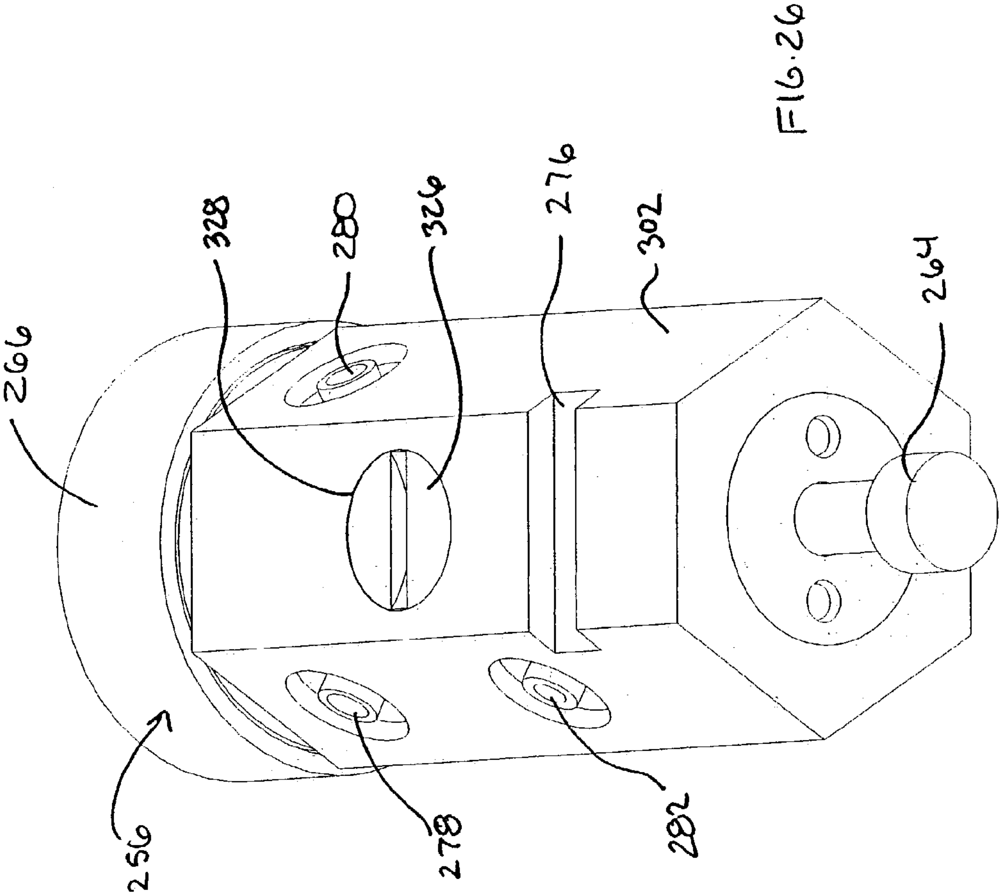
FIG. 26 shows a similar view as that in FIG. 25 but from the valving rod end.
Figure 27:
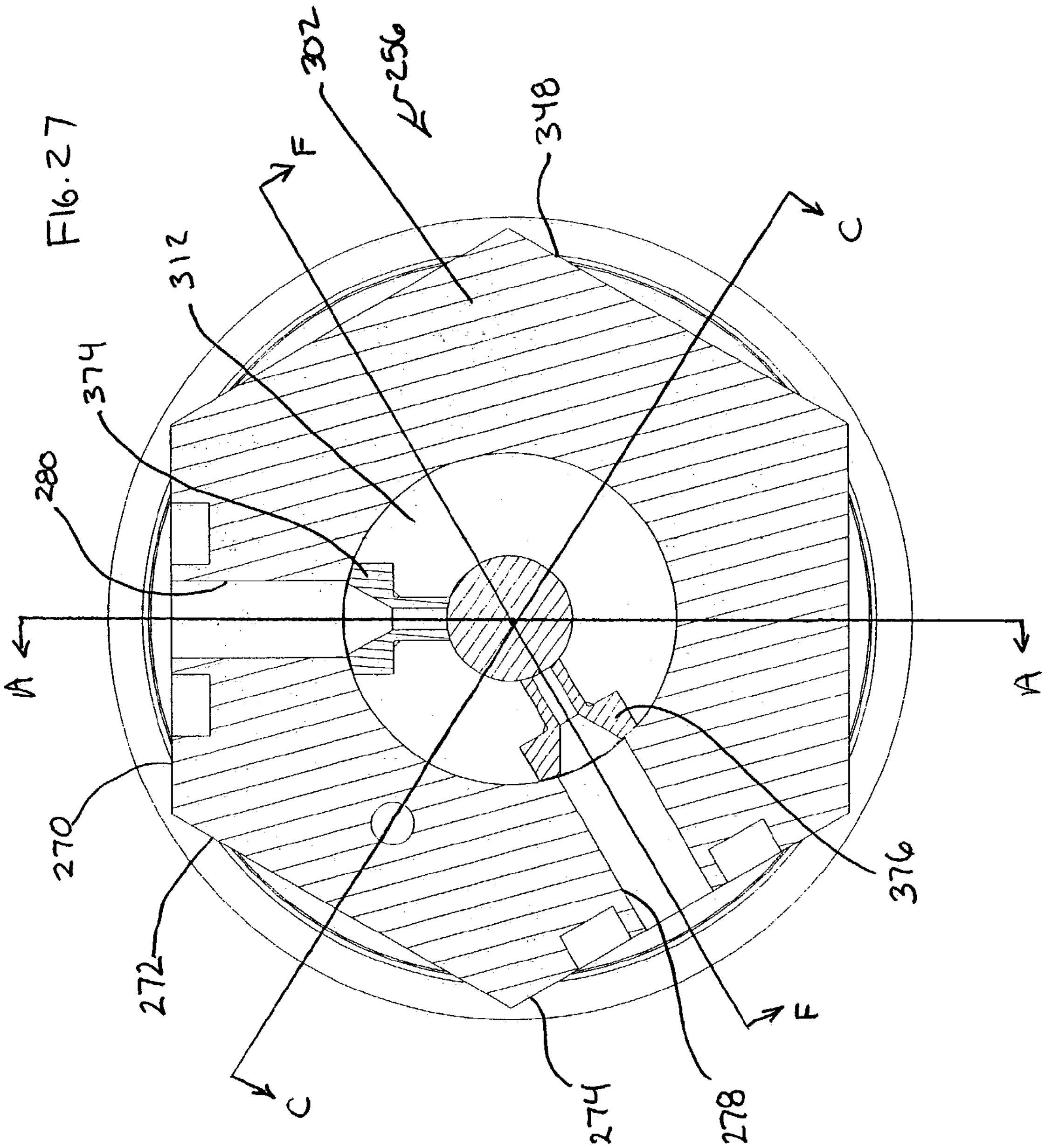
FIG. 27 shows a cross-sectional view of the mixing module taken along cross-section line A-A in FIG. 28.
Figure 66A:
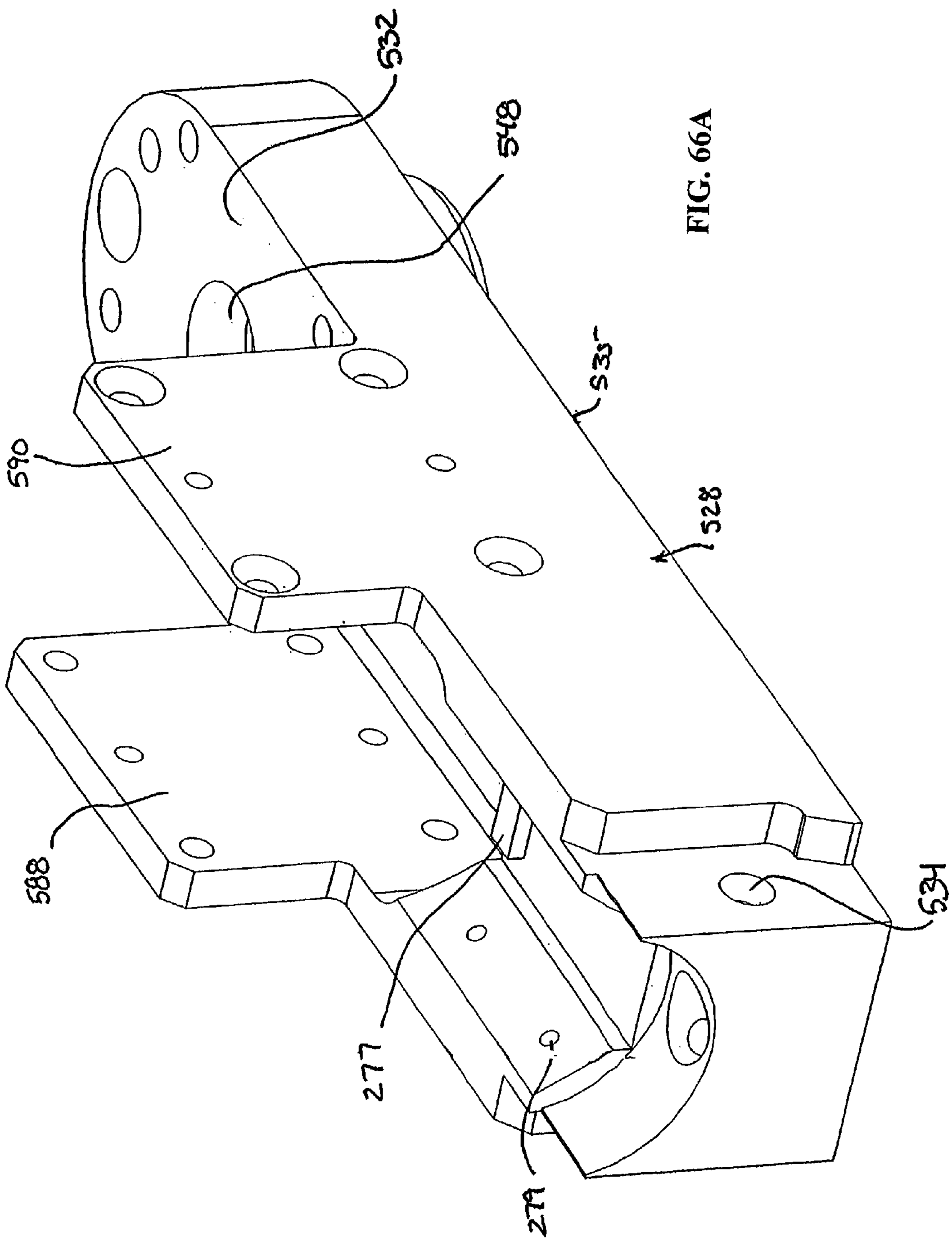
FIG. 66A shows a perspective view of the main housing of the dispenser apparatus.

With reference to FIGS. 25 to 48 there is provided a discussion of a preferred embodiment of mixing module 256 of the present invention. FIG. 25 illustrates the contact side 268 of mixing module housing 257 encompassing mixing chamber 312 with shift prevention means 313 and also, preferably provided with solvent flow distribution means having solvent entrance port 282. Housing 257 features, first, second and third side walls 270, 272 and 274 which together provide housing contact side 268 representing half of the walls of the preferred hexagonal cross-sectioned mixing module. Wall 272 includes main housing positioner 276, with a preferred embodiment being a positioner recess configured to receive a corresponding positioner projection 277 provided in main housing component 532 (FIGS. 248 and 66A). Positioner 276, when engaged by projection 277, acts to position first and second mixing module chemical inlet ports 278, 280 in proper alignment with chemical outlet feed ports 279, 281 of housing module support 532 (FIG. 24B). Similarly, the positioning means for the mixing module further aligns the mixing module solvent inlet port 282 in proper position relative to solvent outlet port 275 (FIG. 24B) of module support housing 532. While a two component system is a preferred embodiment of the present invention, the present invention is also suitable for use with single or more than two chemical component systems, particularly where there is a potential stick and move problem in a mixing or dispensing chamber of a dispenser (mixing being used in a broad sense to include multi-source chemical mixing or the spraying into a rod passageway of a chemical through a single, sole inlet source and an internal intermingling of the sole chemical material's constitution).

FIGS. 27 to 33 illustrate mixing module 256 in an assembled state comprising module housing 302 having a "front "(open) end 304 and a "rear" (open) end 306 with associated front end solvent dispensing front cap assembly 308 or cap covering and back cap 310. Front cap assembly 308 and back (e.g., compression) cap 310 retain in operating position mixing chamber 312, slotted cup-shaped spacer 314 and Belleville washer stack 316 (the preferred form of compression means). Each of the face cap assembly 308, mixing chamber 312, spacer 314, washer stack 316 and back cap 310 have an axial passageway for receiving valving or purge rod ("rod" hereafter) 264. Mixing module 256 also preferably has internal solvent chamber 322 with spacer 314 and back cap 310 preferably formed with solvent reception cavities (323, 324). The Belleville washers in stack 316 are also shown as having an annular clearance space which facilitates solvent flow along the received portion of rod 318 and provides room for limit ring 332 for limiting axial movement of rod 264.

Figure 29:
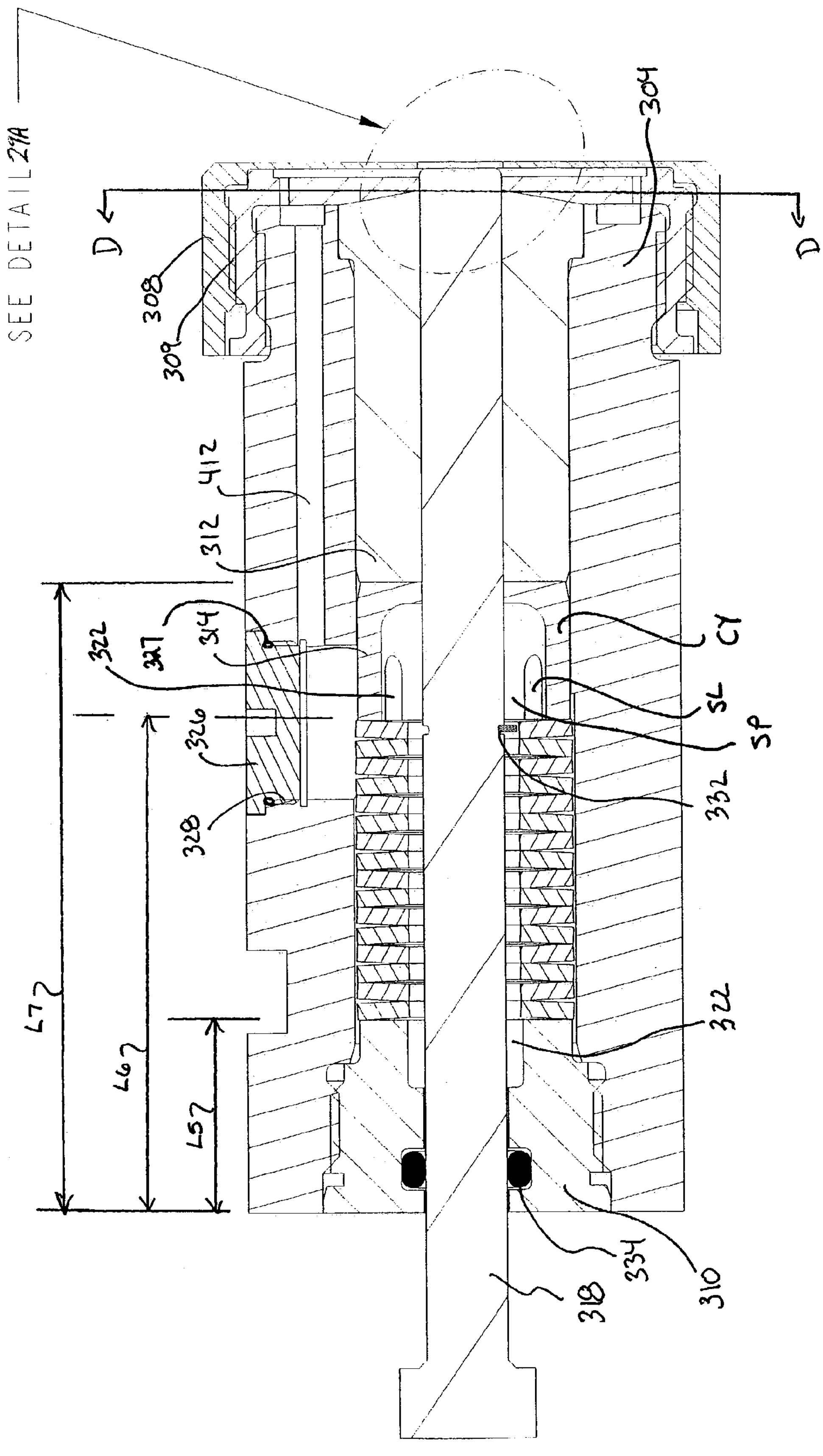
FIG. 29 shows an additional cross-sectional view of the mixing module taken along cross-section line C-C in FIG. 27.
Figure 29A:
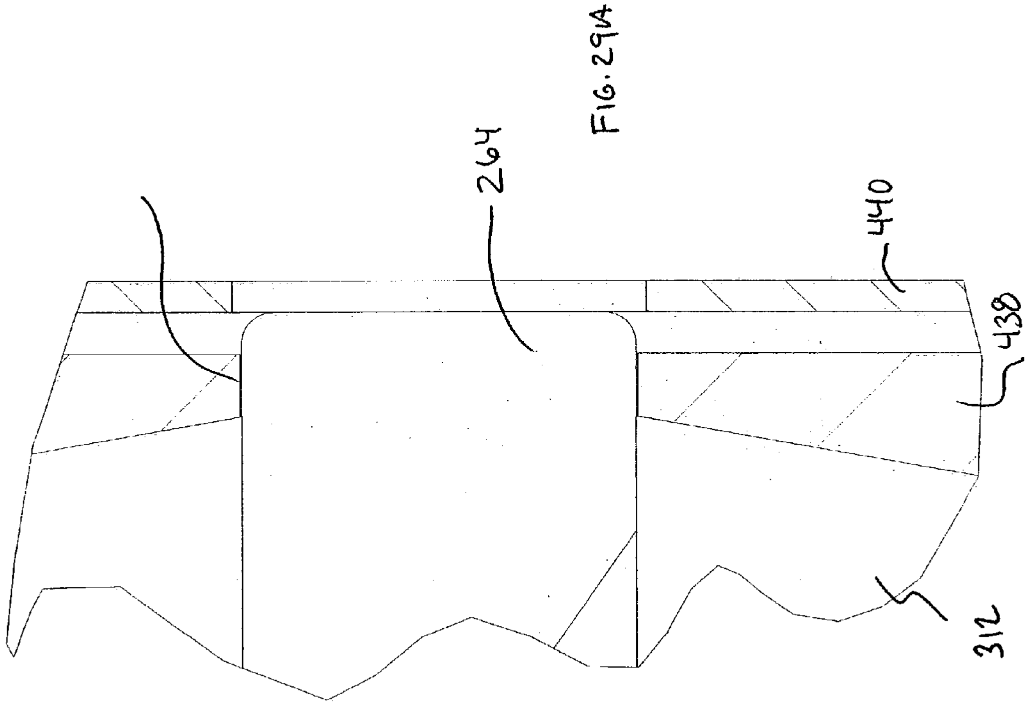
FIG. 29A shows an enlarged view of the circled region in FIG. 29.
Figure 30:
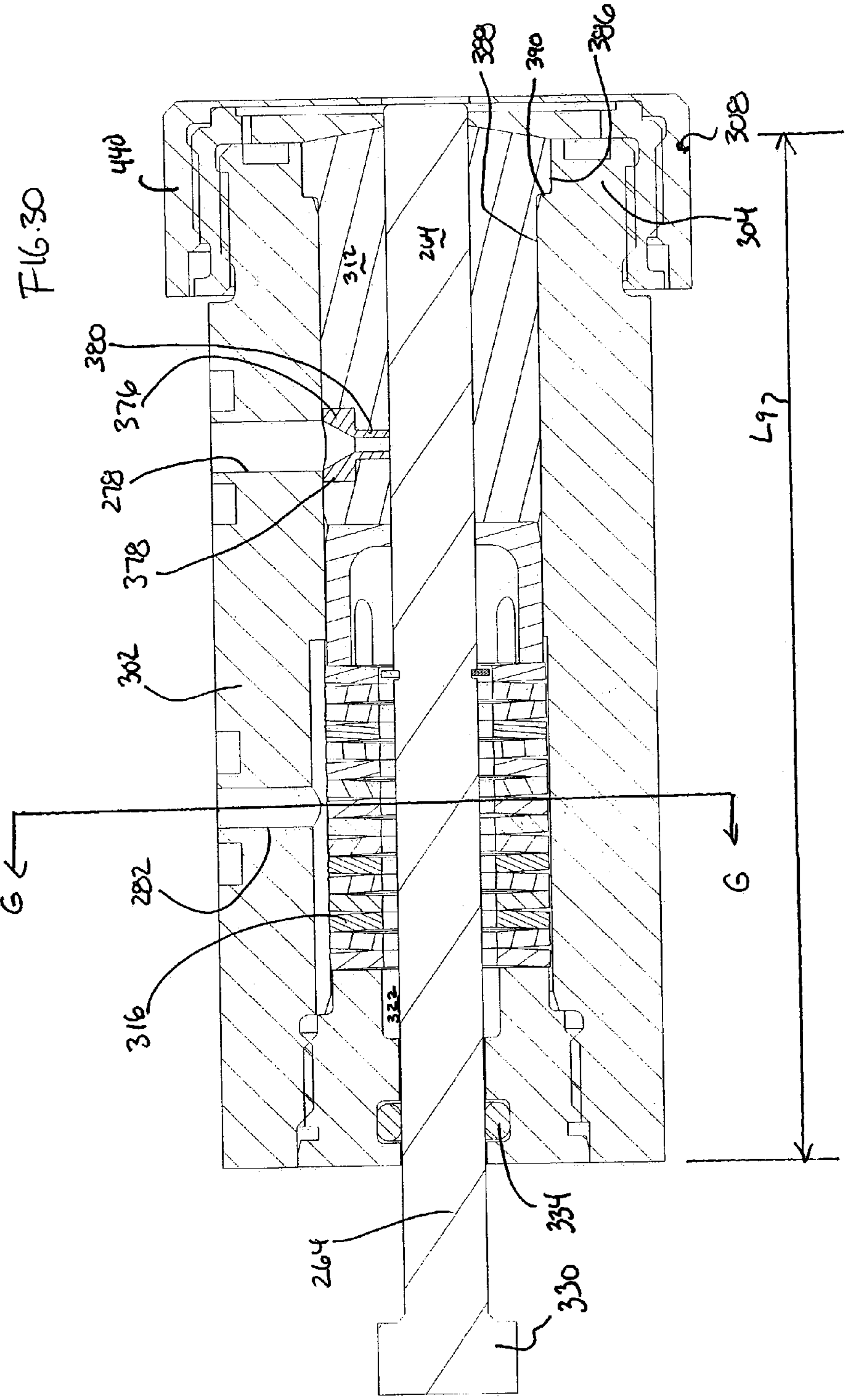
FIG. 30 shows another cross-sectional view of the mixing module taken along cross-section line F-F in FIG. 27.
Figure 31:
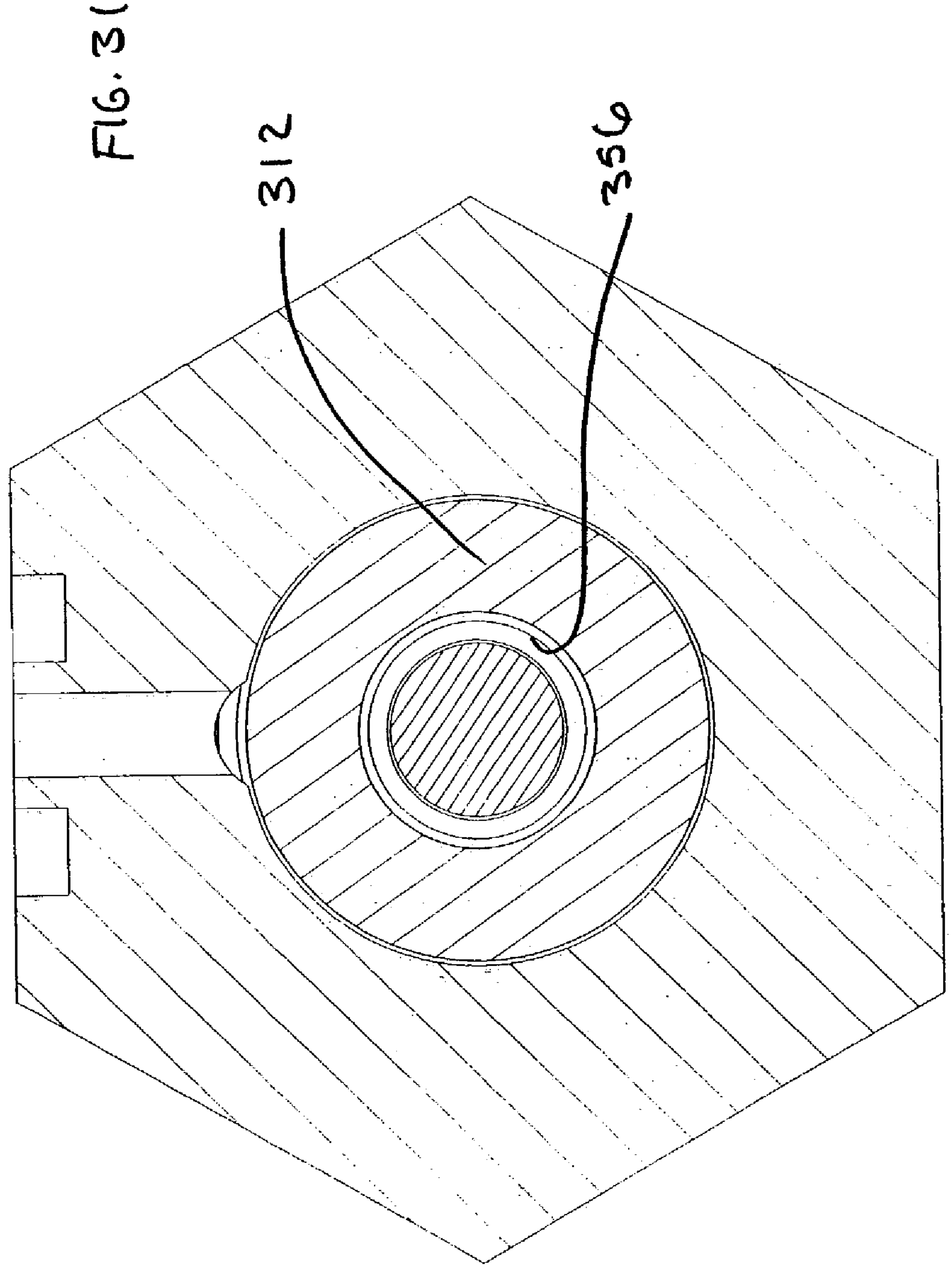
FIG. 31 shows a cross-sectional view of the mixing module taken along cross-section line G-G in FIG. 30.
Figure 32:
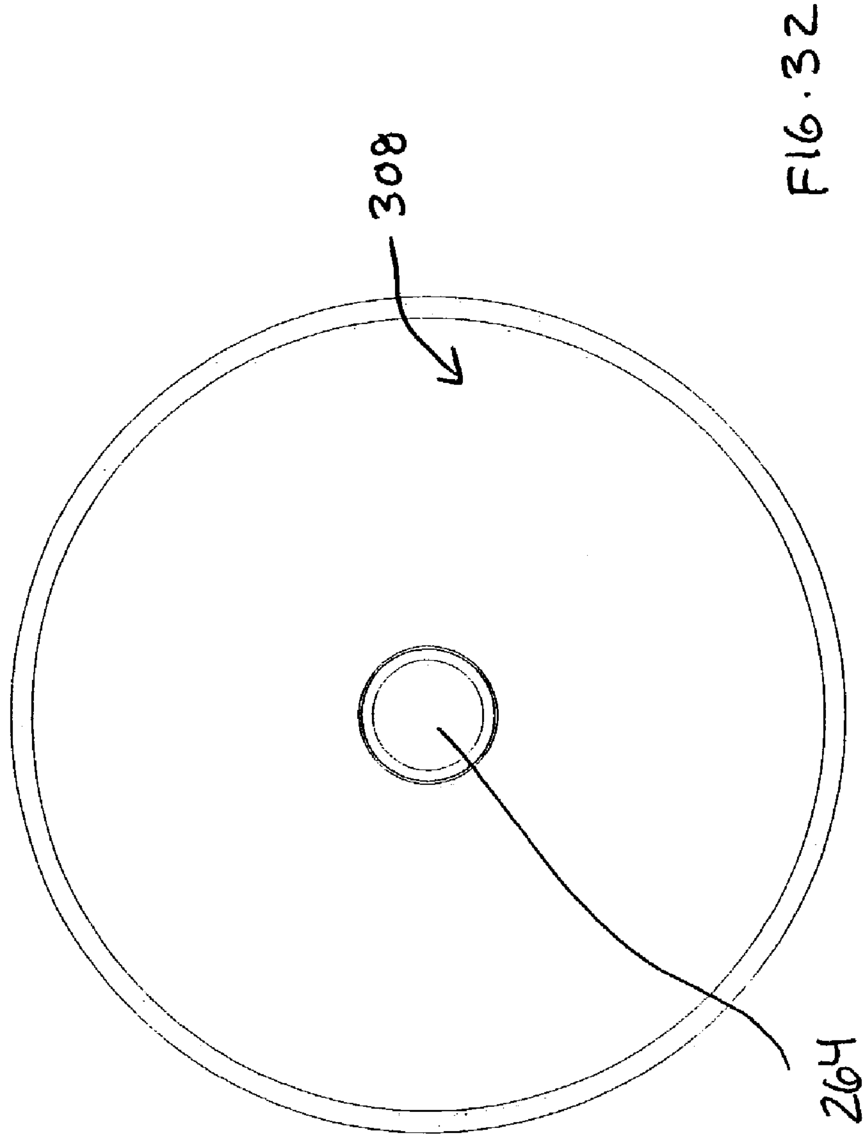
FIG. 32 shows a front end elevational view of the mixing module.
Figure 33:
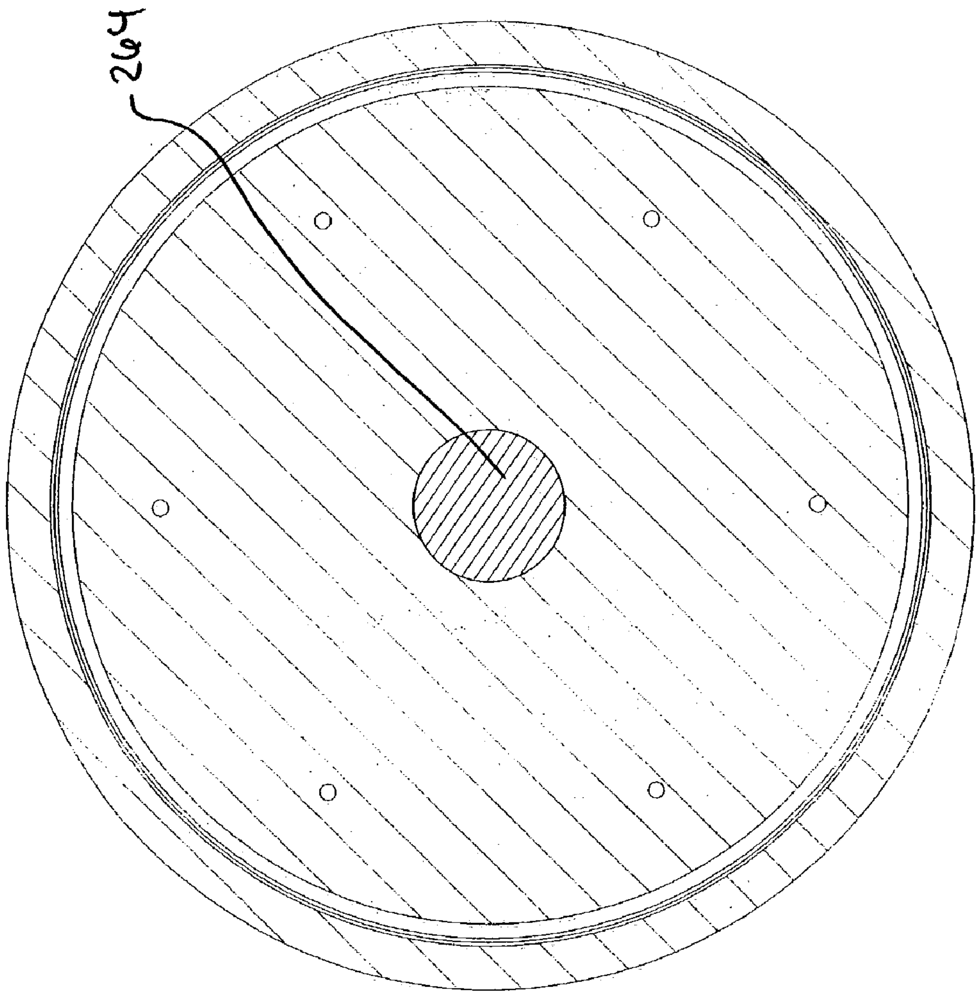
FIG. 33 shows a cross-sectional view of the mixing module taken along cross-section line D-D in FIG. 29.

Solvent cap 326 (FIG. 29), is attached (e.g., threaded) to housing 302 to close off solvent access opening 328 formed in one of the sides (e.g., side wall 272) of the multi-sided housing 302. Solvent cap 326 is preferably positioned to axially overlap part of the internally positioned Belleville washer stack 316 and the spacer 314 positioned between the compression means 316 and Teflon block 312. The Belleville washer stack 316 is also preferably arranged in opposing pairs (e.g., 8 washer pairs with each pair set having oppositely facing washers) which provides a preferred level of 200 lbf. relative to spacer contact with the mixing chamber. Solvent cap 326 provides an access port for emptying and filling the solvent chamber 322 which provides for a pooling of solvent (continuous replenishment flow pooling under a preferred embodiment of the present invention) at a location which retains fluid contact with an exposed surface of the valving rod as it reciprocates in the mixing chamber. As shown in FIG. 30, there is further provided solvent feed port 282 which provides an inlet port for solvent from a separate source (preferably a pumped continuous or periodic flow solvent system as described below) for feeding the flow through dispenser tip cleaning solvent system for the front cap assembly 308 and replenishing solvent chamber 322 after its initial filling via access cap 326.

Valving rod 264 has a reciprocating means capture end 330 (e.g., an enlarged end as in a radially enlarged cylindrical end member) for attachment to a motorized rod reciprocator. Rod 264 axially extends completely through the housing so as to extend out past respective face and back caps 308 and 310. Rod 264 also comprises annular limit ring 332 (FIG. 29) to avoid a complete pull out of rod 264 from the mixing module. A rod contacting seal 334 is further preferably provided such as an inserted O-ring into an O-ring reception cavity formed in back cap 310. Housing 302 further includes chemical passage inlet holes 278, 280 (FIG. 27) formed at midway points across side walls 270 and 274 which are positioned to opposite sides of intermediate side wall 272 in the preferred hexagonal configured housing 302. Wall 348 is preferably diametrically opposed to wall 272. Walls 270 and 274 position chemical inlets 278, 280 in the preferred 120° chemical inlet spacing.

Figure 28:
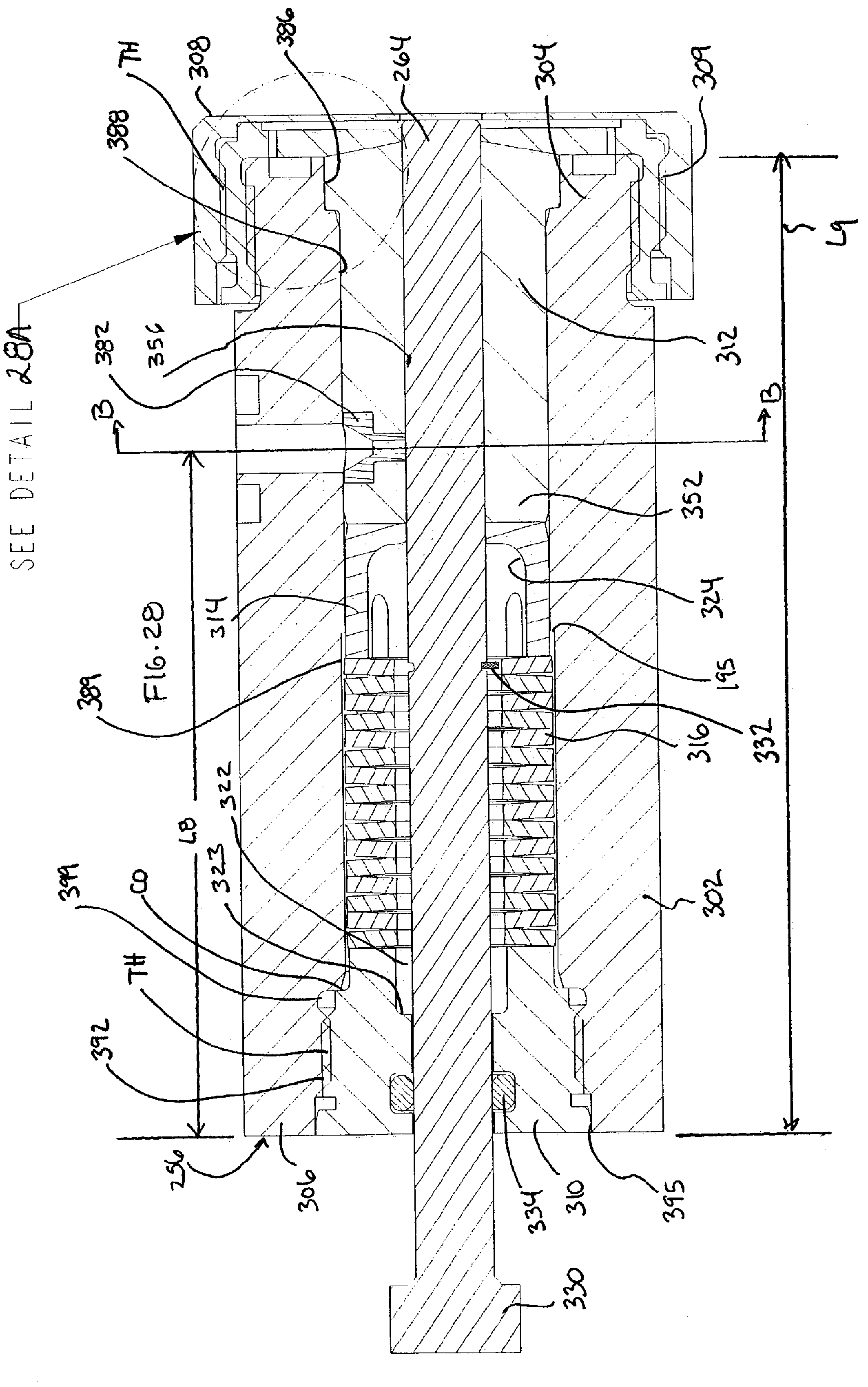
FIG. 28 shows a cross-sectional view of the mixing module taken along cross-section line B to B in FIG. 27.
Figure 28A:
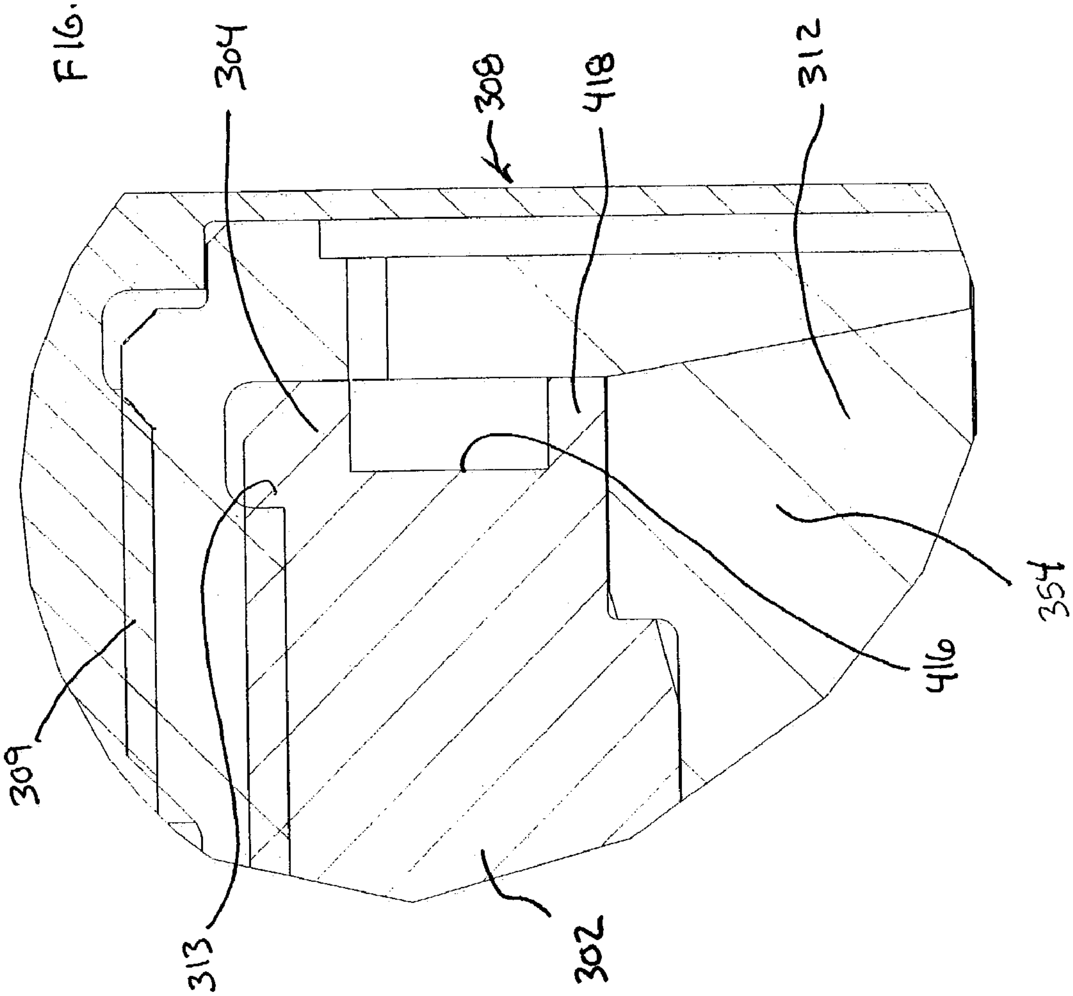
FIG. 28A shown an expanded view of the circled region in FIG. 28.
Figure 29B:
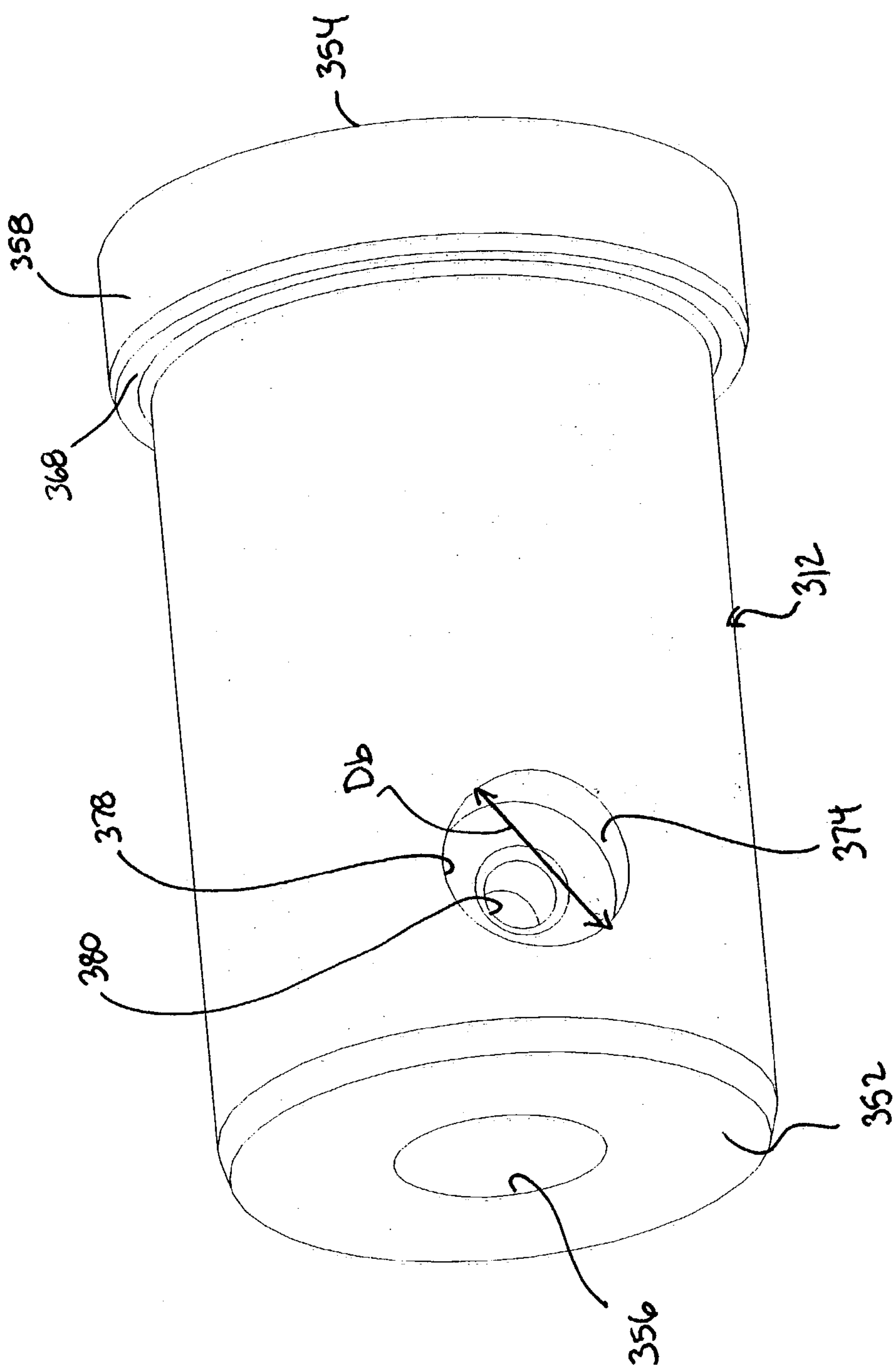
FIG. 29B shows a perspective view of the mixing chamber used in the mixing module.
Figure 29C:
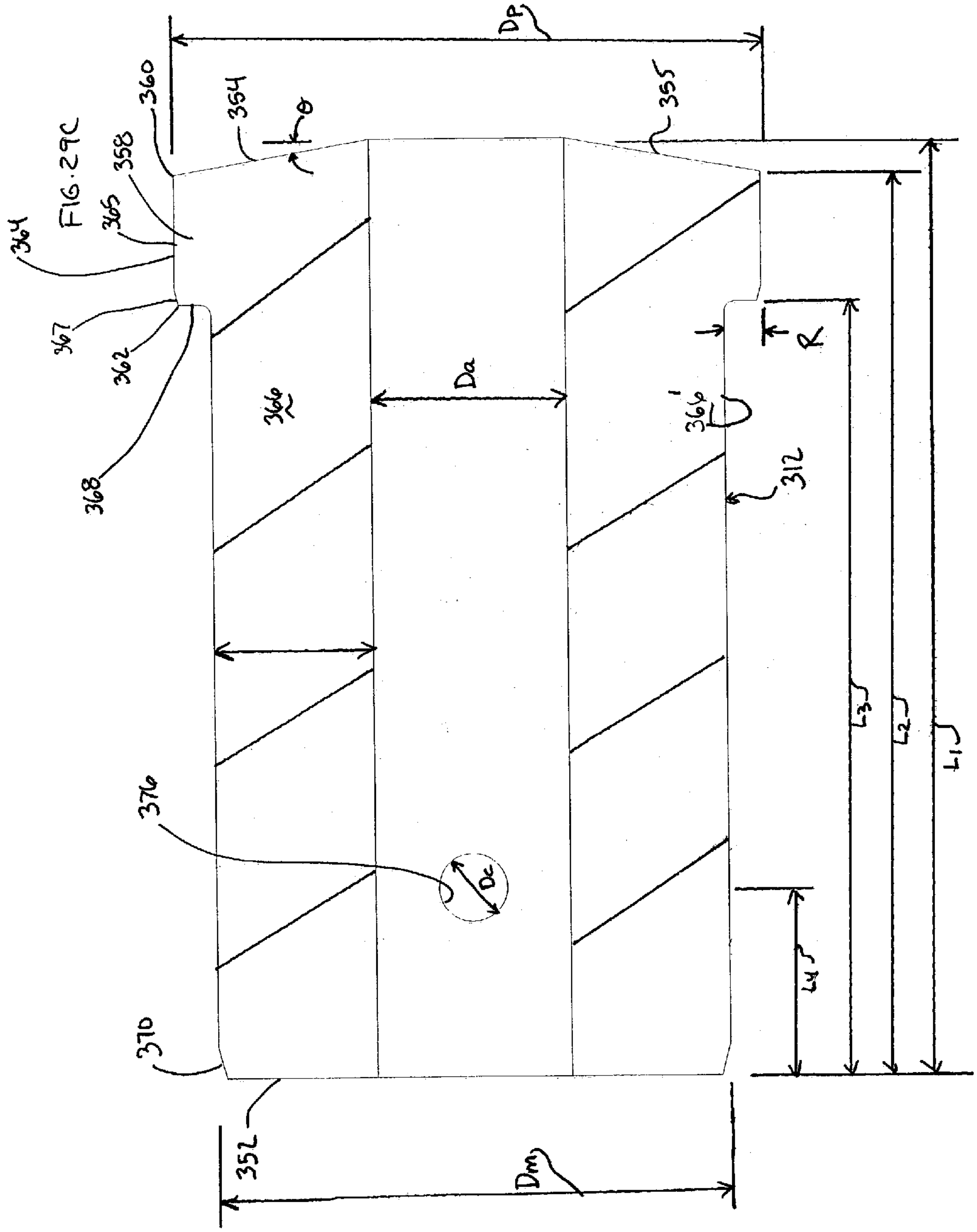
FIG. 29C shows a vertical bi-secting cross-sectional view of the mixing module.

Reference is made to FIGS. 28A, 29B, 29C, 30 and 48 for a further discussion of mixing chamber 312 with locking or rod stick movement prevention means 313. FIGS. 29B and 29C provide different perspective views of a preferred embodiment for mixing chamber 312 which is preferably formed of a low friction material such as one having cold flow capability with Teflon being a preferred material. Mixing chamber 312 has first end (e.g., spacer sleeve contact end or rear end) 352 and second (e.g., front) end 354. As shown in FIG. 29C, axial rod passageway (or through hole) 356 extends along through the central axis of chamber 312 (and also along the central axis of the mixing module housing 302 as well) so as to open out at the first and second ends.

Figure 48:
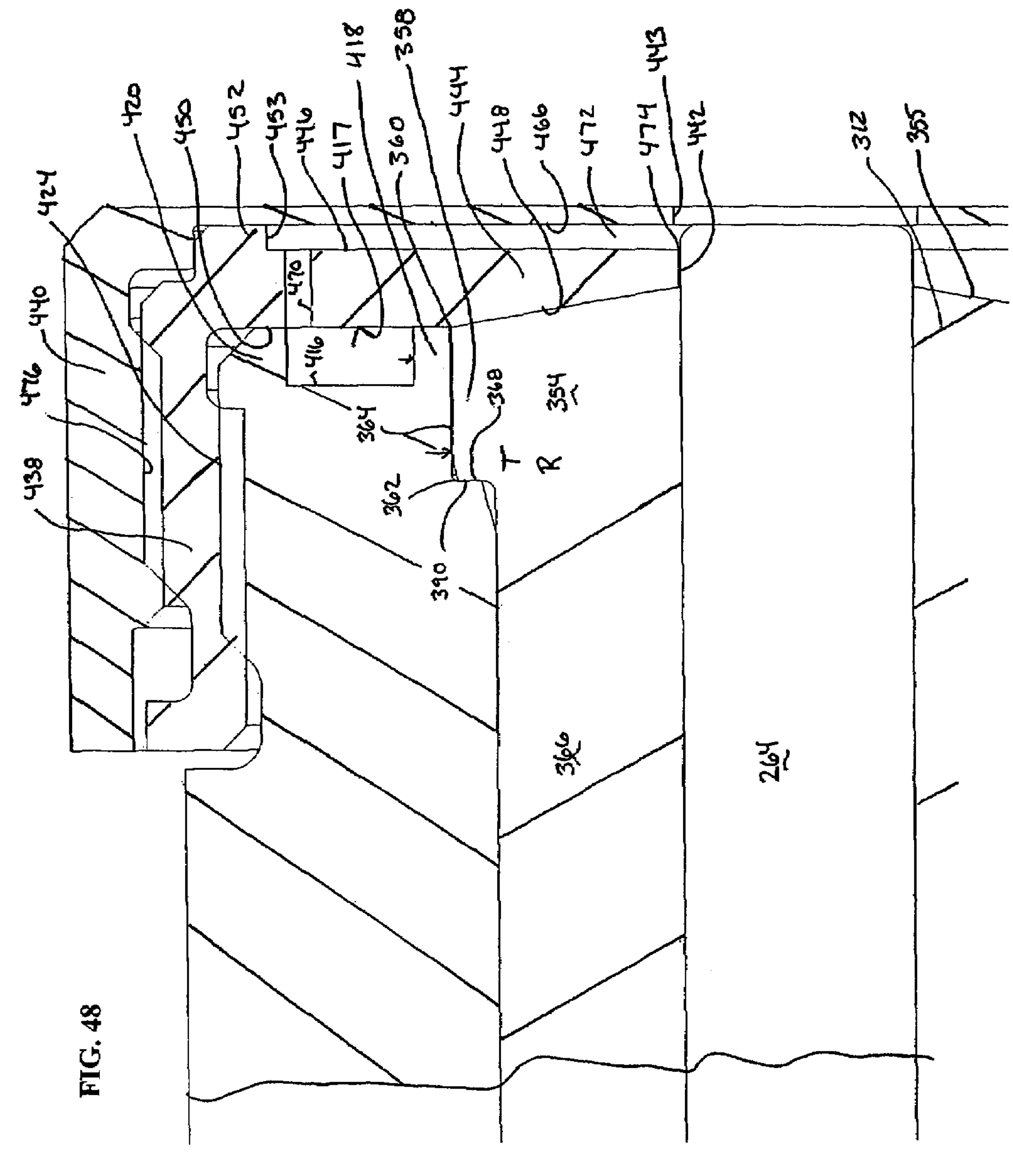
FIG. 48 shows in greater detail a cross-sectional view of the front cap assembly, solvent flow passageways and interlocked mixing chamber of the mixing module.

FIG. 29C shows the preferred configuration for passageway 356 as a continuous diameter passageway of diameter Da (a range of 0.1 to 0.5 inches is illustrative of a suitable diameter range Da with 0.15 to 0.3 inch being a more preferred sub-range and 0.187 being a preferred value for Da). It is noted that any dimensions provided in the present application are for illustrative purposes only and thus are not intended to be limiting relative to the scope of the present invention. FIGS. 29B, 29C and 48 further illustrate locking protrusion 358 forming a part of locking means 313, and which in a preferred embodiment is an annular extension having a forward edge 360 coinciding with the outer peripheral edge of front face 355, and rear edge 362 defining an axial inner edge of peripheral surface 364. Peripheral surface 364 preferably includes a cylindrical section 365 with rear chamfer edge 367. Locking protrusion 358 is preferably integral with main body portion 366, with main body 366 extending from the rear end to the front end of mixing chamber 312 (e.g., entire mixing chamber formed as a monolithic body and also preferably of a common material). As illustrated, the radial interior of step down wall ring 368, extends into main body portion 366 (with the main body being the illustrated cylindrical body extending from the front end to the rear end of mixing chamber 312 with the annular projection 358 extending radially out from a front end region of that main body preferably for 20% or less of the length of main body 312). Rear end 352 of main body portion 366 preferably features a chamfered peripheral edge 370 to facilitate insertion of mixing chamber 312 into the front open end of housing 302 prior to front cap assembly 308 securement to the front end 304 of the housing as by finger threading.

While the illustrated looking protrusion 358 can take on a variety of configurations (e.g., either peripherally continuous or interrupted with common or different length/height protrusion(s) about the periphery of the mixing chamber 312) as well as a variety of axial extension lengths and a variety of radial extension lengths (e.g., a radial distance R (FIG. 29C) between surface 364 and the forward most outer, exposed surface 366' of main body 366, of 0.025 to 0.5 inch with 0.035 to 0.05 inch being suitable). The utilized axial length and radial protrusion for the locking projection 358 is designed to provide a sufficient locking in position function (despite rod stick due to the static friction/adhesion relationship between the rod and mixing chamber) while avoiding an inefficient use of material.

FIGS. 29B, 29C and 48 illustrate step wall 368 of locking protrusion 358 extending off from main body 366 with the overall locking protrusion diameter Dp being preferably of 0.25 to 1.0 inch with a preferred value of 0.56 of an inch. Diameter Dm is preferably 0.35 to 0.75 inch or more preferably a value of 0.49 of an inch with the difference (Dp−Dm=R) representing about 5 to 15% of Dp. Also, with a preferred diameter Da for rod passageway 358 of 0.1 to 0.4 inch or 0.15 to 0.3 inch with a preferred value of 0.19 inch. The main body portion's radial thickness of its annular ring "RT" is preferably 0.1 to 0.5 inch with 0.15 inch being preferred.

Port holes 374, 376 are shown in FIG. 29B and 29C and are formed through the radial thickness of main body portion 366 and are shown circumferentially spaced apart and lying on a common cross-section plane (rather than being axially offset which is a less preferred arrangement). The central axis of each port hole 374, 376 is designed to be common with a respective central axis of inlet passage holes 278, 280, in housing 257 and the respective central axis for chemical output ports 279 and 281 feeding the mixing module. The central axis for port holes 374, 376 also are preferably arranged to intersect the central axis of passageway 356 at a preferred angle of 120°.

Also, port holes 374, 376 preferably have a step configuration with an outer large reception cavity 378 and a smaller interior cavity 380. The step configuration is dimensioned to accommodate ports 382, 384 which are preferably stainless steel ports designed to produce streams of chemicals that jet out from the ports to impinge at the central axis, based on, for example, a 120° angle orientation to avoid chemical cross-over problems in the mixing chamber cavity. As shown in FIG. 29C, diameters Db and Dc are dimensioned in association with the dimensioning of ports 382, 384 with a preference to have the inlet end of ports 382 and 384 of a common diameter and aligned relative to the exit end of housing inlets 340, 342. Ports 382, 384 are shown to have an upstream conical infeed section and a cylindrical outfeed section each representing about 50% of the ports axial length.

FIGS. 29C illustrates length dimension lines L1 to L4 for mixing chamber 312 with L1 representing the full axial length of mixing chamber 312 or the distance from the outer back edge to the forward most front edge. L2 representing the axial distance from the back end 352 to the peripheral edge 360 of locking protrusion 358 (while taking into consideration the inward slope of the mixing chambers front face). L3 represents the axial length between the rear edge 352 to locking protrusion interior edge 362 of surface 364. L4 represents the distance from the rear edge 352 to the central axis of the closest chemical passageway such as the central axis of smaller interior cavity 380. Preferred value ranges for L1 to L4 are as follows: (0.5 to 2 inch with 1 inch suitable), (0.43 to 1.8 with 0.95 inch suitable), (0.5 to 1.0 inch with 0.74 inch suitable), and (0.1 to 0.3 inch with 0.18 inch suitable), respectively.

FIGS. 30 and 48 illustrate front end 304 of mixing module housing 302 having a larger diameter recess 386 which steps down to a lesser diameter housing recess 388. The different recess diameters define step up wall 390 formed between the larger and smaller diameter housing recess 386, 388 which is dimensioned to correspond with step down wall ring 368 of locking protrusion 358. The abutting relationship between walls 368 and 390 establishes an axial no movement locking relationship between mixing chamber 312 and housing 302 when the mixing module is in an assembled state, despite the establishment of a stick relationship between the reciprocating rod 264 and mixing chamber 312. Thus, the mixing chamber is not subject to rod stick movement against compressible comparison means, and avoids problems associated with this movement, such as port misalignment.

The housing configuration is further illustrated in FIGS. 34, 34A, 34B, 35, 36 and 37 showing perspective and cross-sectional views of housing 302 alone. These figures illustrate the above noted step up wall 390 formed between larger diameter recess 386 and interior recess 388 which preferably includes a first radially extending (transverse) section 390' and a sloping, chamfered section 390" defining a conical surface bridging the different diameter cylindrical sections 386, 288 which facilitates insertion of the mixing chamber. Section 390' preferably extends radially transverse to the central axis of the mixing chamber or oblique or in stepped fashion thereto (e.g., conically converging in a forward to rearward direction) which ensures the locking relationship between the housing and mining chamber. For example, with reference to FIG. 34B housing 302 has a radial thickness T1 defining recess diameter D1 (FIG. 35) at its forward most end (e.g., 0.10 to 0.20 inch (0.15 inch) for T1, and 0.5 to 0.75 (e.g., 0.56 inch) for D1, and with a radial thickness increase in going to T2 (e.g., 0.2 to 0.3 (e.g., 2.25 inch) and preferably a corresponding decrease in D2 of 0.4 to 0.6 inch with 0.49 inch being preferred). The reduced diameter housing cavity 388 is formed based on the difference in thickness and/or recess depth and defines housing recess diameter D2 which is bridged by step-up wall 390. Rearward of the recess 388 defining housing surface there is provided a slight step up 394 (FIG. 35, e.g., a 0.007 to 0.01 inch increase in going from D2 to D3) which leads to the larger diameter recess 389. This minor step up 394 and the larger diameter recess 389 provides additional clearance space receiving the mixing chamber in direct contact. The Belleville stack 316 is received within enlarged section 389 of the housing providing a degree of radial clearance to allow for compression adjustments in the compression means. Spacer 314 has an outer diameter generally conforming to D2 and axially bridges step up 394 (See FIG. 28).

Figures 34, 34A, 34B:
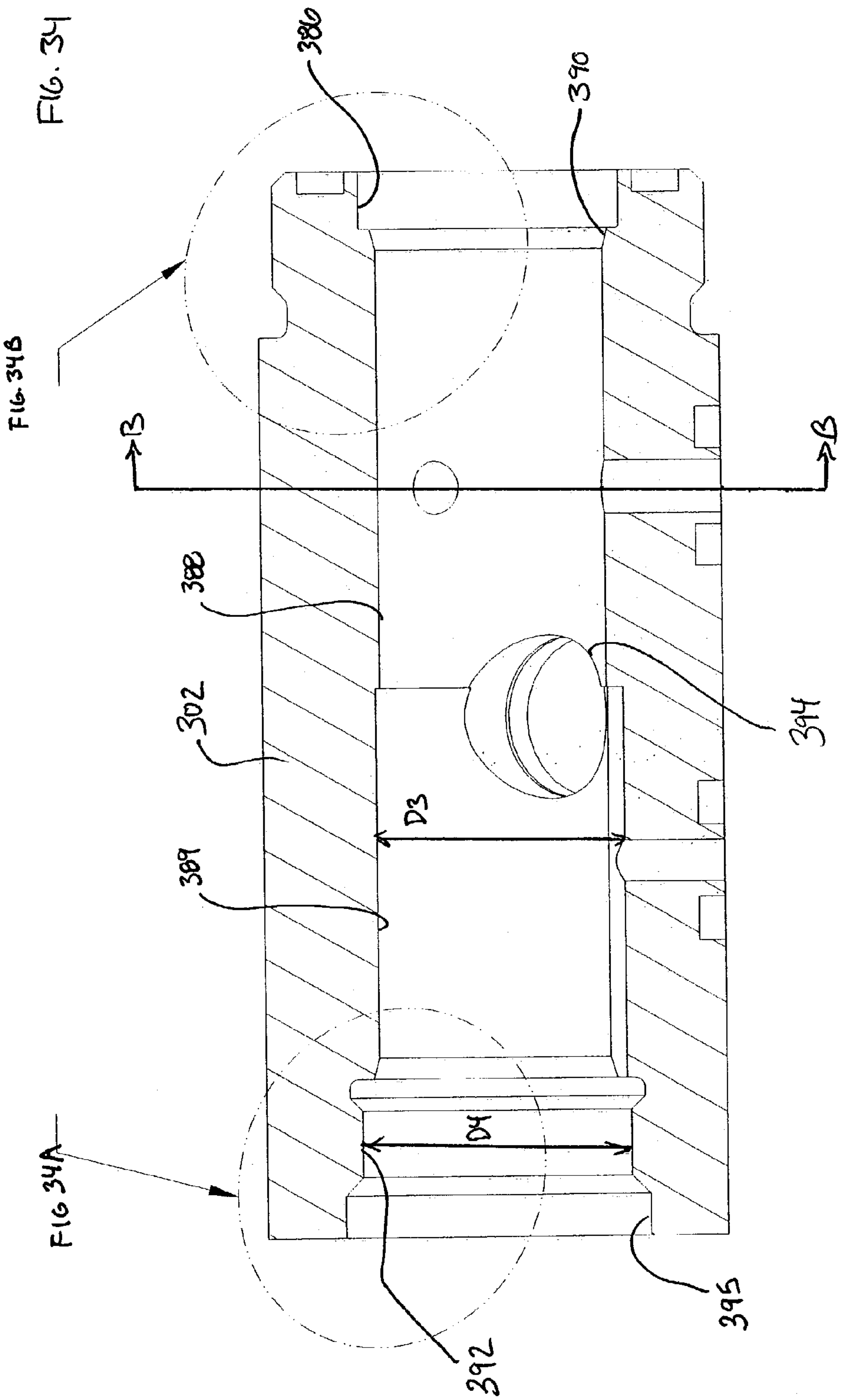
FIG. 34 shows a cross-sectional view of the mixing module housing taken along cross-section line A-A of FIG. 37.
FIG. 34A shows an enlarged view of the circled region at the left end of FIG. 34.
FIG. 34B shows an enlarged view of the circled region at the right end of FIG. 34.
Figure 341A:
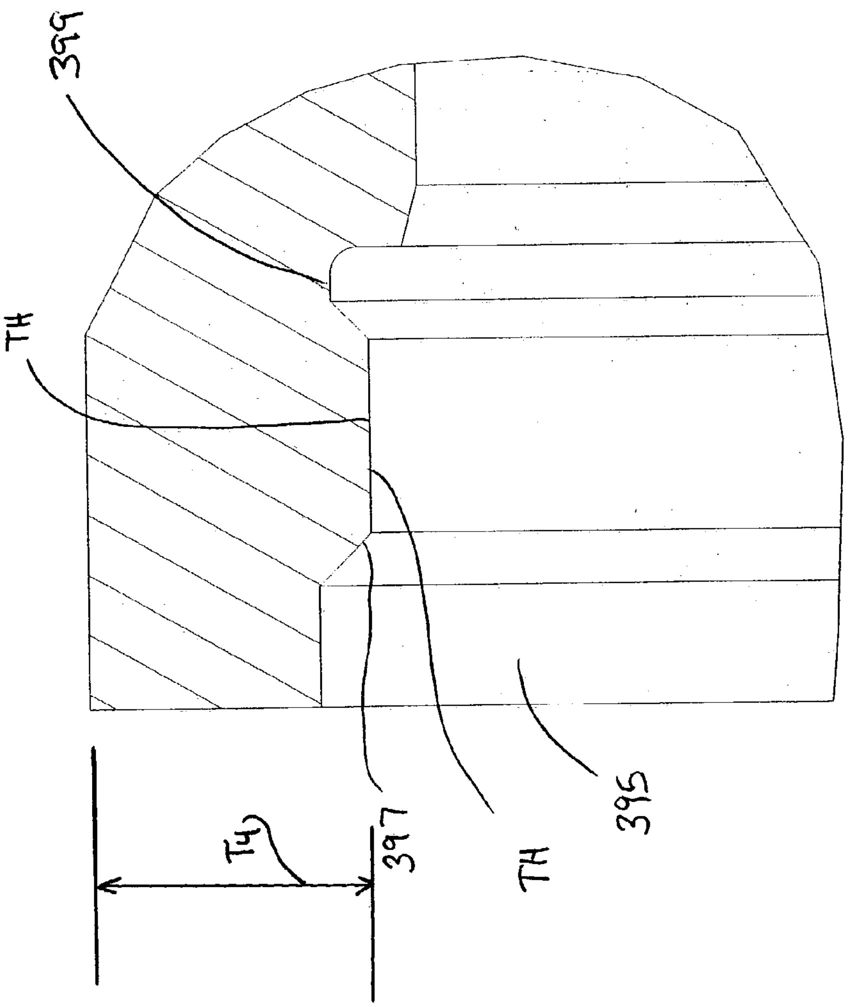
Figure 34B:
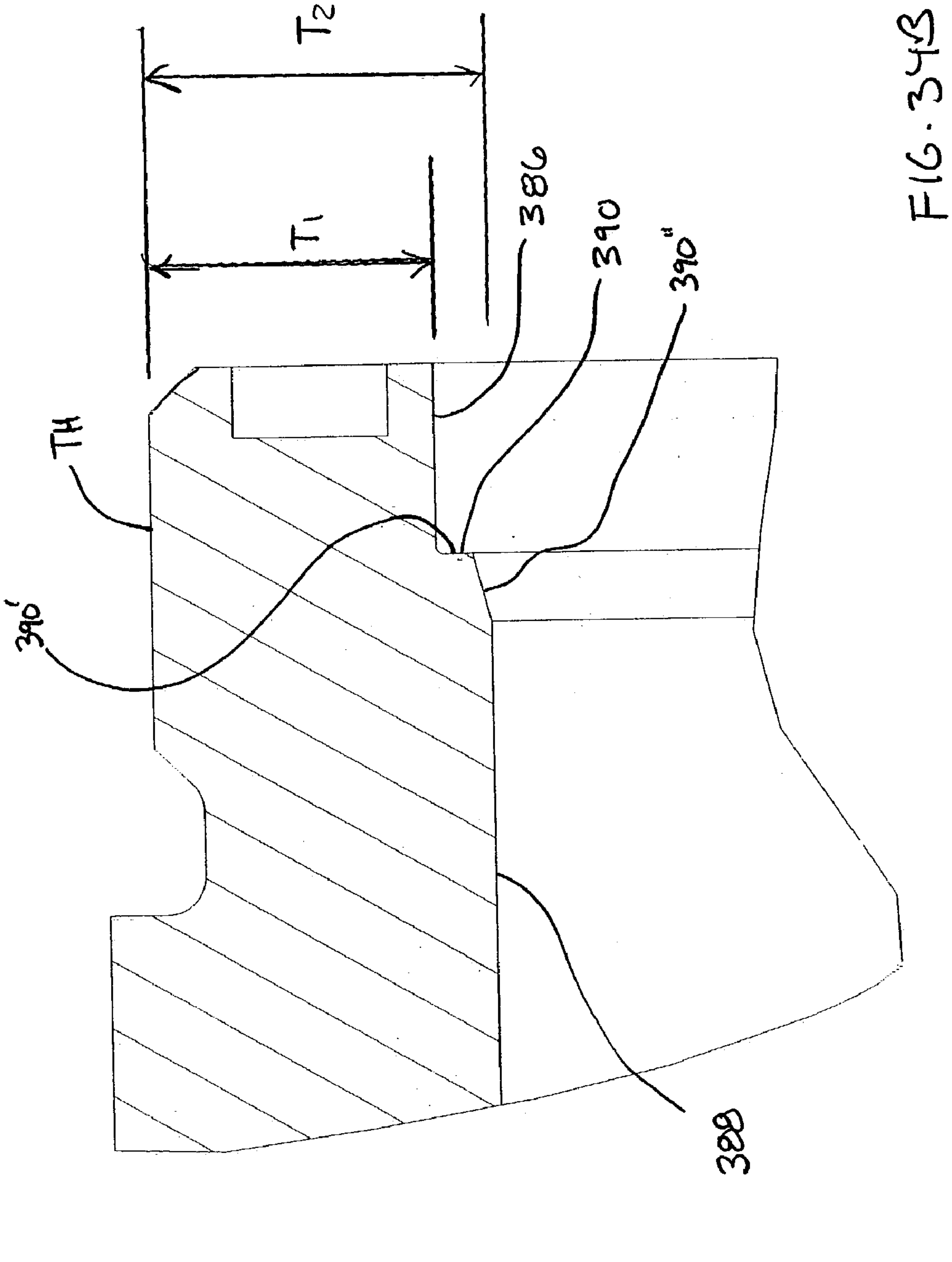
Figure 35:
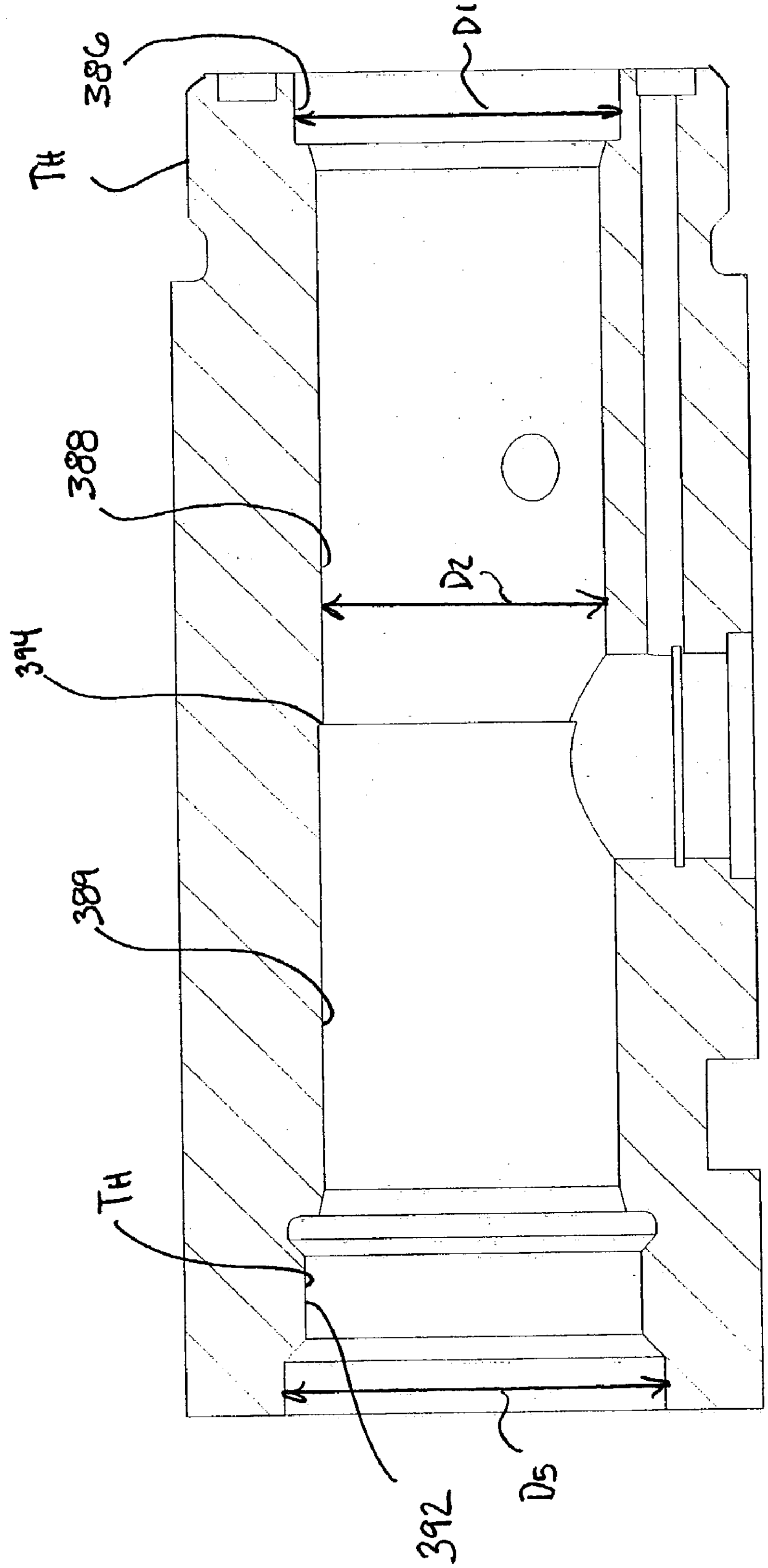
FIG. 35 shows a cross-sectional view taken along cross-section line C-C in FIG. 36.
Figure 36:
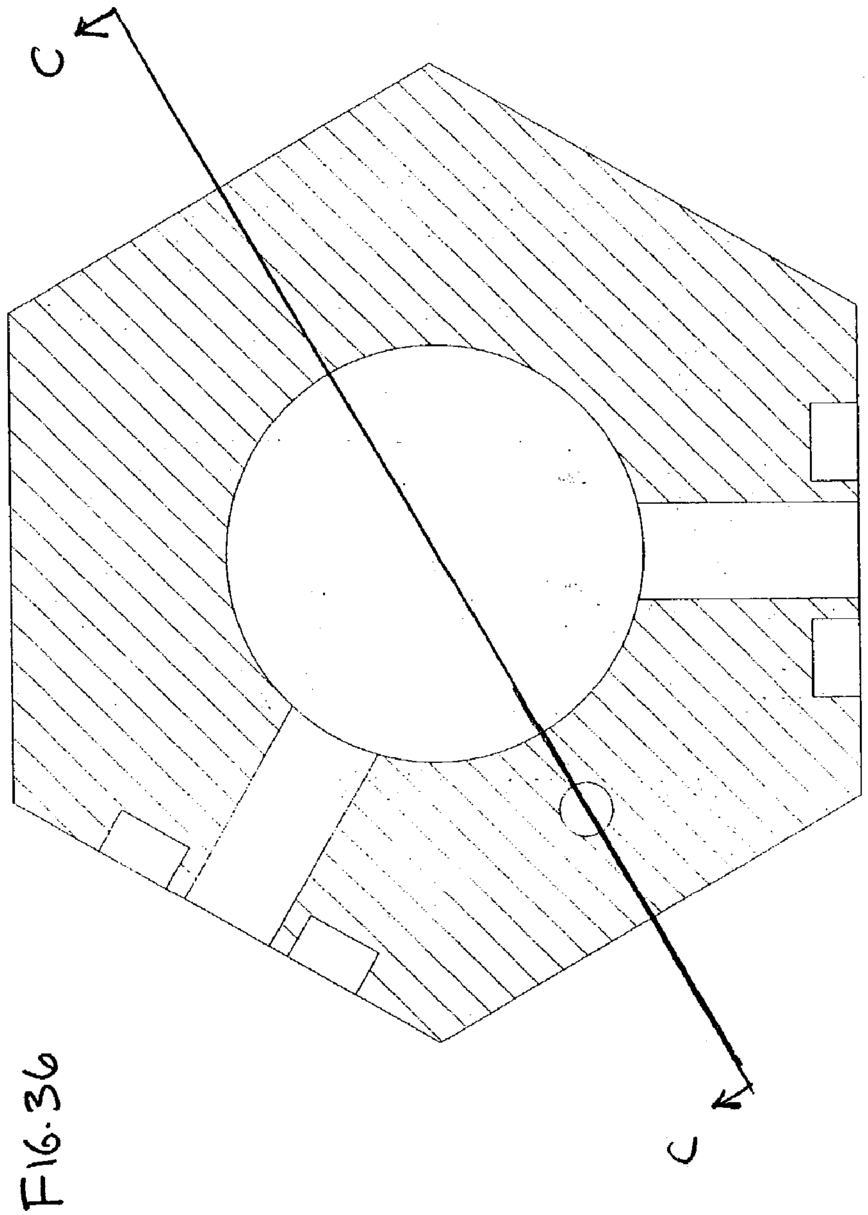
FIG. 36 shows a cross-sectional view taken along cross-section line B-B in FIG. 34.
Figure 37:
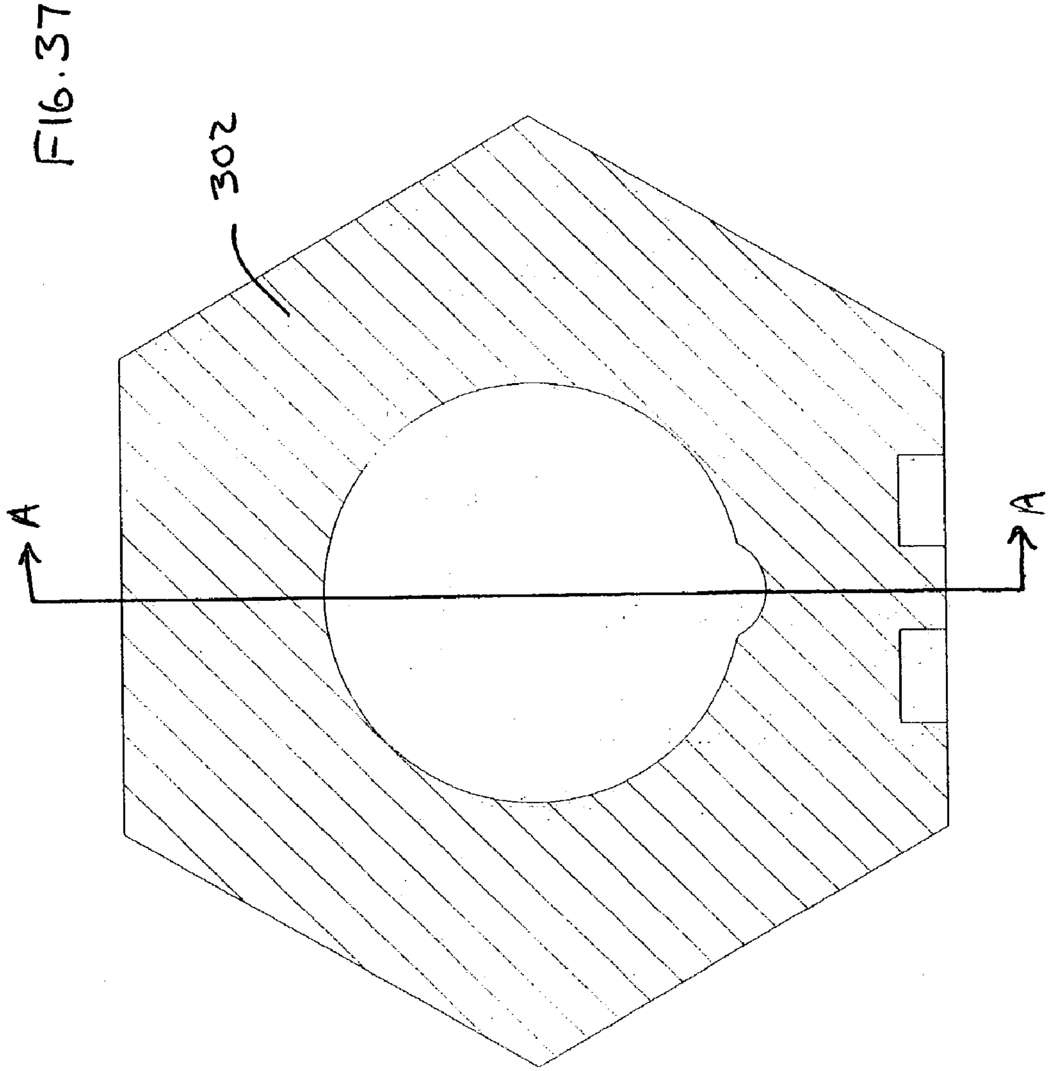
FIG. 37 shows a cross-sectional view taken along cross-section line D-D in FIG. 35.

As seen from FIGS. 28-30, mixing chamber 312 is preferably received entirely within housing recess 388 while Belleville washer stack 316 is preferably received entirely in larger diameter recess 386. Spacer 314 thus extends to opposite sides of step 394. At the rearward end of housing 302 there is provided back cap main reception recesses 392 of diameter D4 (e.g., 0.5 to 0.6 inch or 0.58 inch as shown in FIGS. 34 and 35) and thickness T4 (e.g., 0.25 to 0.3 inch or 0.28 inch FIG. 34A) which opens even farther out at the rear most end to back cap flange reception recess 395 defining diameter D5 (0.6 to 0.7 inch or 0.66 inch FIG. 35).

Recesses 392 and 395 are designed to receive back cap 310 which is dimensioned to occupy the area of recess as 392 and 395 and to also extend inward into recess 386 into contact with compression means 316. In this regard reference is made to FIG. 29 wherein L5 illustrates axial length from the rear end of the housing into the rear end of compression means 316 (e.g., L5 is 0.3 to 0.6 inch or 0.45 inch which is about 10 to 30% or more preferably 20% of the full axial length L9 (FIG. 28) of mixing module 256). L6 illustrates the axial length from rear end 306 of the housing to the central axis of the solvent access opening 328 which also is preferably generally commensurate with the forward end of the compression means 316 and the rear end of spacer compression 314 (e.g., 0.9 to 1.4 inches or 40 to 60%); L7 represents the contact interface between the front end of spacer sleeve 314 and rear end of the mixing chamber 312 (e.g., 1.1 to 1.5 inches or 50 to 65%); and L8 (FIG. 28) representing the distance from the rear end 306 of the housing and the central axis of housing chemical inlet 278 (e.g., 1.3 to 1.9 inches or 55 to 85%).

Reception recess 392 includes means for axial locking in position back cap 310 which means is preferably one that can be removed without the need for first releasing the compression force. In a preferred embodiment a threaded recess is provided having relatively fine threads TH for facilitating axially locking in position back cap 310 at a desired compression inducing setting. As shown in FIG. 34A to opposite axial sides of threads TH there is formed recess 395, which defines larger diameter D5 (e.g., 0.67 inch), provides an annular ridge 397 providing an additional seat with the interiormost end back cap 310 being placed in contact with housing 302 which preferably is preset relative to compression means 316 to provide the desired level of compression in the cold flow material mixing chamber 312.

Historically, packaging foam mixing cartridges have been assembled using clip rings on the back of the compression cap. In order to install the clip ring, the back cap must be forced into the Belleville washer stack, an action that requires about 200 lbs of force to accomplish. This method of assembly of the prior art mixing cartridges requires the use of machines like arbor presses and some special holding and alignment fixtures to put a mixing cartridge together making the process difficult. Also, assembly of these prior art mixing cartridges cannot be done by hand tools normally found in a tool kit. These prior art designs are difficult to assemble, and even more difficult to disassemble, as the clip rings can be difficult to remove with the heavy spring load on the back cap. In view of this, mixing module 256 of the present invention is designed to be easier to assemble and disassemble.

Also, under the Belleville stack compression forces imposed on prior art mixing chambers and mixing cartridges prior art housing tend to deform at their front face when considering the thinness desirability relative to a purge rod front face passageway travel. This deformation can occur in prior art assemblies even after only moderate usage in the field. That is, the front cover of prior art mixing chambers are often swaged onto the housing and the design is not always strong enough to carry the load. This deformation can cause a number of reliability problems for the mixing cartridge. The present invention helps avoid this prior art tendency for the front cap of the housing to deform, or bulge due to the force imposed by the Belleville washer stack on the mixing chamber front face.

A preferred embodiment of the present invention includes the feature of having non-permanent, releasable fixation means for back cap 310, with a preferred embodiment featuring threads TH (FIG. 34A) provided in back cap reception recess 392 or some other releasable fixation means as in, for example, a key/slot engagement (e.g., helical), although fine threads are preferred for facilitating small step compression inducement and release in the compression means contacted by the back cap. The interior threads of the back cap reception recess 395 are designed to mate with the exterior threads on the back cap 310. The opposite front end 304 of housing 302 also preferably is provided with releasable front end closure means as in front cap assembly 308 releasably secured with the exterior of the front end 304 of housing 302 through, for example, exterior threads TH on front end 304 that are designed for threaded engagement with the internal threads of front cap assembly 308 (a preferred embodiment has the front cap assembly in the form of a multicomponent and/or double walled front cap assembly).

This releasable securement relationship at both the front and back of the mixing chamber allows a mechanic of minimal skills, without specific fixture or exotic tools, to assemble and disassemble mixing module 256. The assembly technique under the present invention featuring "releasable securement" (e.g., threaded construction) also has a variety of other advantages. For example, the securement construction is much easier to assemble without the prior art clip ring that holds the back cap in place against the pressure of the Belleville stack. The present invention also provides for easier disassembly in a current foam production setting as the securement construction makes the mixing module easier to rework without sending out to a special service location for a network. In this regard, reference is made to co-pending application U.S. Provisional Ser. No. 60/488,102, filed on Jul. 18, 2003, entitled "A System and Method for Providing Remote Monitoring of a Manufacturing Device", which is incorporated herein by reference, and which describes the automatic or operator requested servicing directly from the dispenser system through use of an internet connection or the like in conjunction with a controller monitoring of sensed information from various dispensing system sub-systems.

The manner of attachment and construction of the assembly of front cap covering 308 (particularly inner front cap component 438 shown in FIG. 43) on the front end of housing 302 provides for a more solid construction in the front cap. For example, the means for releasable connection allows for the front cap to be more easily designed so that it is better able to avoid distortion under load. The present invention is thus designed to avoid the aforementioned problems associated with swaged prior art front caps, including difficulty in proper installation, strength parameters that are difficult to predict, and a tendency for deformation under high load. This ease of assembly and disassembly of the mixing module design in the production setting also makes for easy assembly and disassembly in the field and at any service location.

With the arrangement of the present invention, it is easier to install the mixing chamber 256 from the front, instead of from the rear of the mixing module housing 302. The mixing chamber locking means 358 (FIG. 48) in the front end of the mixing chamber 312 and releasable securement face cap assembly 308 provides the advantage of being able to install a mixing chamber from the front of the mixing module housing as compared to the more difficult rear installation in the prior art housing design. For example, the front loading potential makes it much easier to orient the chemical feed ports in the mixing chamber into correct alignment with the through holes in the mixing module housing. Also, to facilitate the assembly and disassembly of the mixing module of the present invention, the outer cap 440 (FIG. 45) of front cap assembly 308 is preferably provided with a circumferential knurled surface for preferred finger contact only tightening into position and release for access.

An additional feature of the mixing module 256 is that it can be assembled in its entirely, and access to the solvent port is still made possible based on the relative positional relationship between, for example, the threaded solvent cap access port 328 and the spacer sleeve's recessed areas (described below in greater detail). This ability to completely assemble mixing module 256 and then introduce the solvent via solvent cap 326 and the coordinated solvent chamber positioning and solvent chamber forming component portions allows, for example, easy solvent filling without the spillage problem and filling level uncertainties of the prior art. It also makes it easy to open the solvent cap for an initial check as to the solvent level (although less preferable the back cap can be removed as well for a solvent check after the mixing module has been fully assembled as it is much easier to remove and reposition compared to prior art designs). A review of multiple mixing modules filled with solvent and sealed, and then set on the shelf for a few days, prior to being opened, indicated there is often significantly less solvent than originally thought to exist. For example, a solvent chamber may appear to be full after the initial filling operation, but a significant quantity of air can be trapped in the solvent chamber as the viscosity of commonly used solvents can be quite high at room temperature. The trapped air precludes a full fill under the prior art systems. The present invention further addresses this under fill problem through heating of the solvent to around 130° F. before filling. This solvent heating during, for example, initial supplying of the module with solvent represents a preferred step as it lowers the viscosity significantly and works well with the improved visibility and access provided under the present invention's design. During system operation, a similar above 100° F. and more preferably above 120° F. temperature is maintained under the present inventions heated solvent re-supply flushing arrangement which preferably includes passing solvent by manifold and/or dispenser housing heaters placed in line with the solvent flow.

Thus, under the present invention with the large diameter (e.g., 0.25 to 0.75 inch) solvent access cap 326 strategically positioned relative to the solvent chamber to provide solvent chamber access means, the invention provides for complete filling of the chamber in a fashion that is easy and achievable without the introduction of air bubbles or overflows or other problems associated with filling prior art solvent chambers. Because the threaded solvent access hole allows for easy filling, there is also less chance that air pockets will be trapped when the chamber is sealed. Since mixing module life is proportional to solvent quantity, eliminating any trapped air in the solvent chamber is beneficial to prolonged life. Also, an easy refill on the solvent chamber without special tools is possible with the threaded solvent filler cap being readily removed with a small screwdriver any time there is a desire to check conditions on the inside of the mixing module. The solvent chamber therefore can easily be refilled with solvent, and the cap re-installed.

As shown in FIG. 29, O-Ring seal 327 is provided on the solvent cap to help in preventing solvent from leaking as in during shipping. Less leakage means longer life, and the sealed cap can be opened and resealed multiple times with minimal degradation in seal quality. With the solvent access means of the present invention, the mixing module can be initially built and assembled at a manufacturing or assembly site without solvent if long-term storage is required. There are applications that require long-term storage of system mixing modules in warehouses and/or the placement of mixing modules in harsh climates. In these situations, mixing module solvent, and any elastomeric seals in contact with the solvent, can degrade over time if pre-inserted at initial assembly. The present invention provides for either no solvent insertion at the time of assembly or ready access to replace the old solvent and seals after an extended period. This storage feature can be an advantage, for example, in some military applications, as well as in other environments and/or storage needs. Also, solvent cap 326 can be opened and resealed multiple times with minimal degradation in seal quality.

FIGS. 29 and 30 illustrate spacer sleeve 114 having solid cylindrical forward section CY, which is integral with its forward compression contact face, a valve rod reception opening and, at its rear end, a spacer separated by one or more spacer slots SL. These slots are formed between sleeve extensions SP as can be seen by the sequence of extensions and adjacent slotted openings in the sleeve which slots are preferably spaced continuously around the sleeve's circumference. The slots are preferably aligned with solvent housing access opening(s), and in a preferred embodiment, there are multiple spacer extensions SP (e.g., 3-10 with 6 preferred) which provide ready solvent flow access from the capped solvent opening into solvent sleeve reception cavity 322.

Prior to describing the additional upstream components associated with feeding chemical to the dispenser outlet, a discussion of solvent supply system 400 and its in line relationship with the above described mixing module 256 is provided. As described in the background of the present application, the outlet dispenser region or tip area of the mixing module 256 is an area highly prone to hardened foam build up. If not addressed, it can cause problems such as misdirected output shots or spraying into areas external to the intended target. This in turn can further increase build up problems as the misdirected output hardens on other areas of the solvent dispenser system.

With reference to FIG. 3 and FIGS. 49-53 there is illustrated solvent supply system 400 comprising supply tank 402 having solvent conduit 404 providing flow communication between solvent tank 402 and solvent valve control unit 406, which is in communication with the control processor. Downstream from valve control unit, the solvent line is in flow communication with main support housing 194 having a solvent conduit which extends through main housing 194 and opens out into the module support housing 532 (FIG. 66A). From there the solvent passes via port 275 (FIG. 24B) into solvent port 282 (FIG. 25) in mixing module 256 when mixing module 256 is properly positioned in dispenser system 192. Solvent is preferably supplied based on a preprogrammed sequence such as one which provides heavy flow volumes at completion of a use cycle or periodically, over periods of non-use (e.g., overnight prior to a daytime shift) as well as periodically during use (e.g., after a predetermined number of shots (e.g., after each shot to every 5 shots) and/or based on a time cycle independent of usage. Preferably, the solvent flow control activates valve mechanism 408 based on open or shut off signals, with an opening signal being coordinated with solvent pump operation. The controller sub-system is shown in FIG. 196.

Figure 38A:
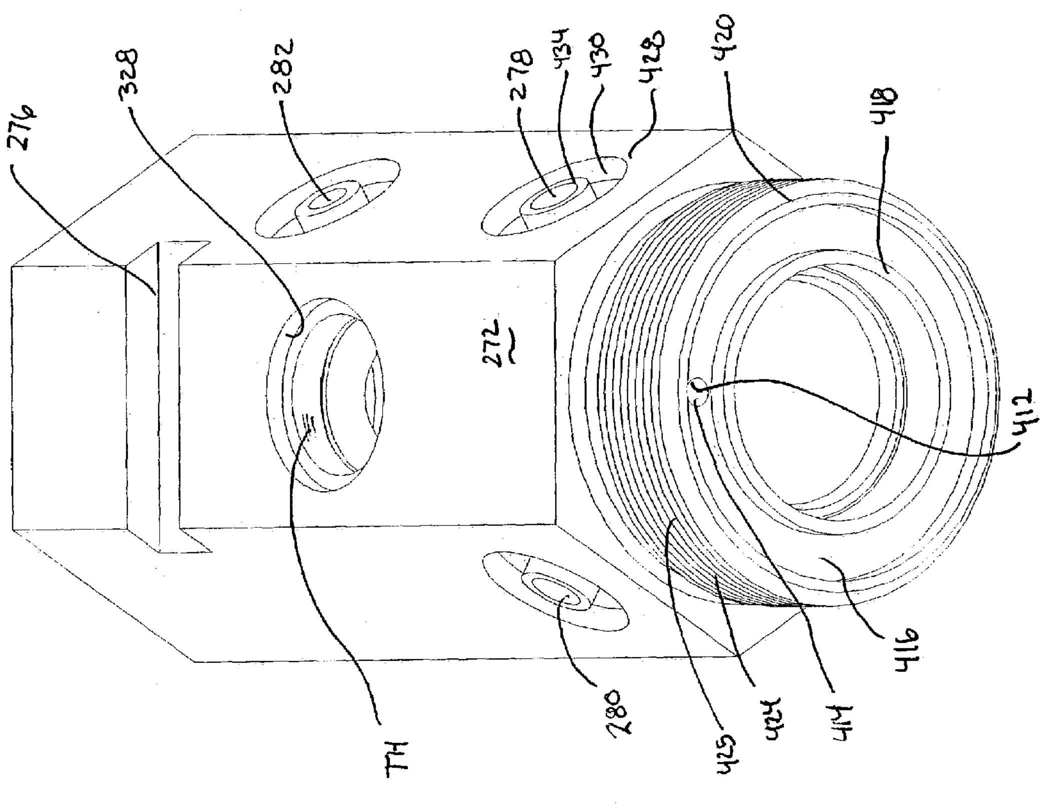
FIG. 38A shows a perspective view of the mixing module housing and the front opening solvent feed passageway formed therein.
Figure 38B:
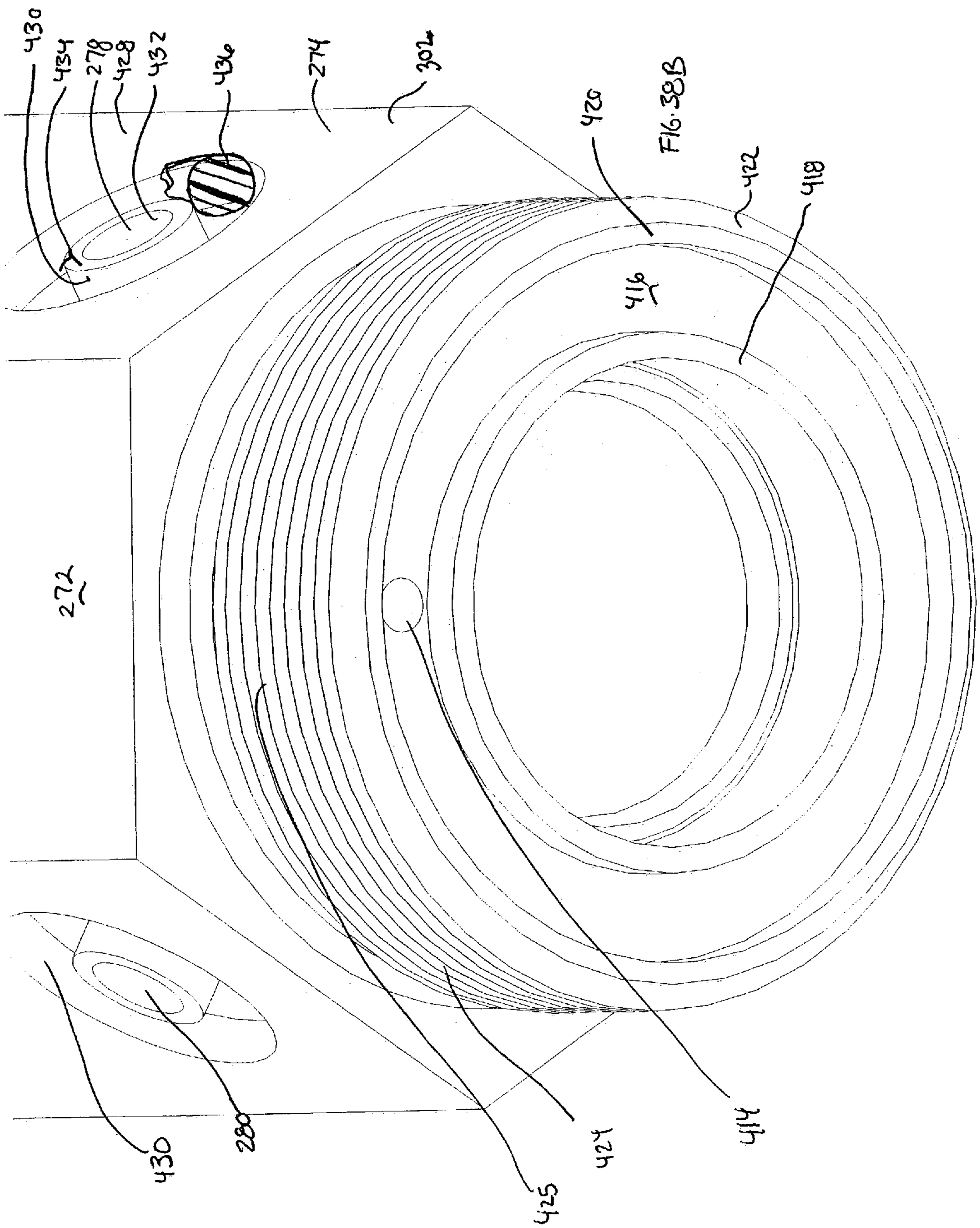
FIG. 38B shows an enlarged row of the front end of FIG. 38A
Figure 39:
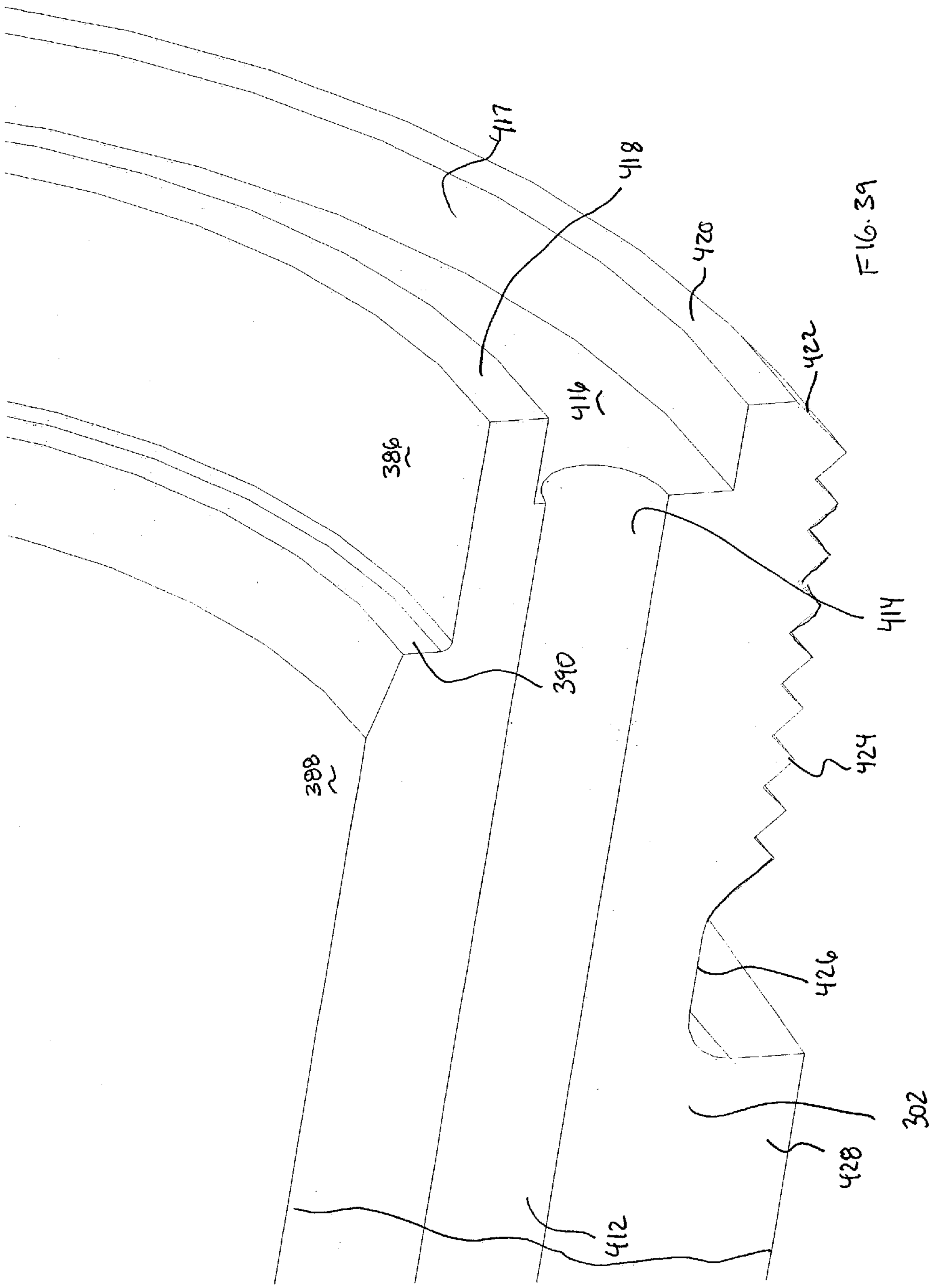
FIG. 39 shows a cut away view of the front portion of the housing shown in FIG. 38B.
Figure 40:
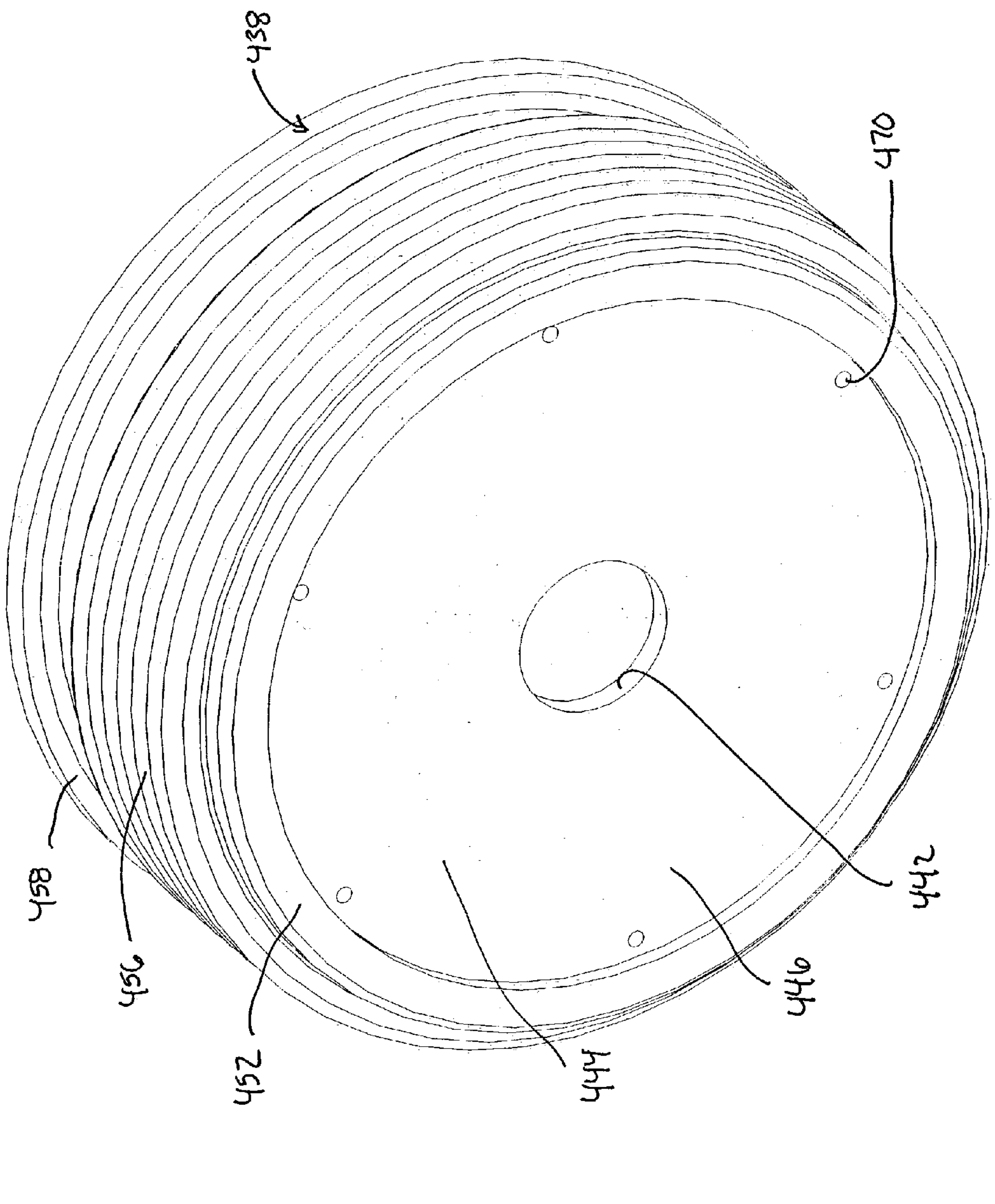
FIG. 40 shows a front or outer perspective view of the inner or interior front cap of the mixing module.
Figure 41:
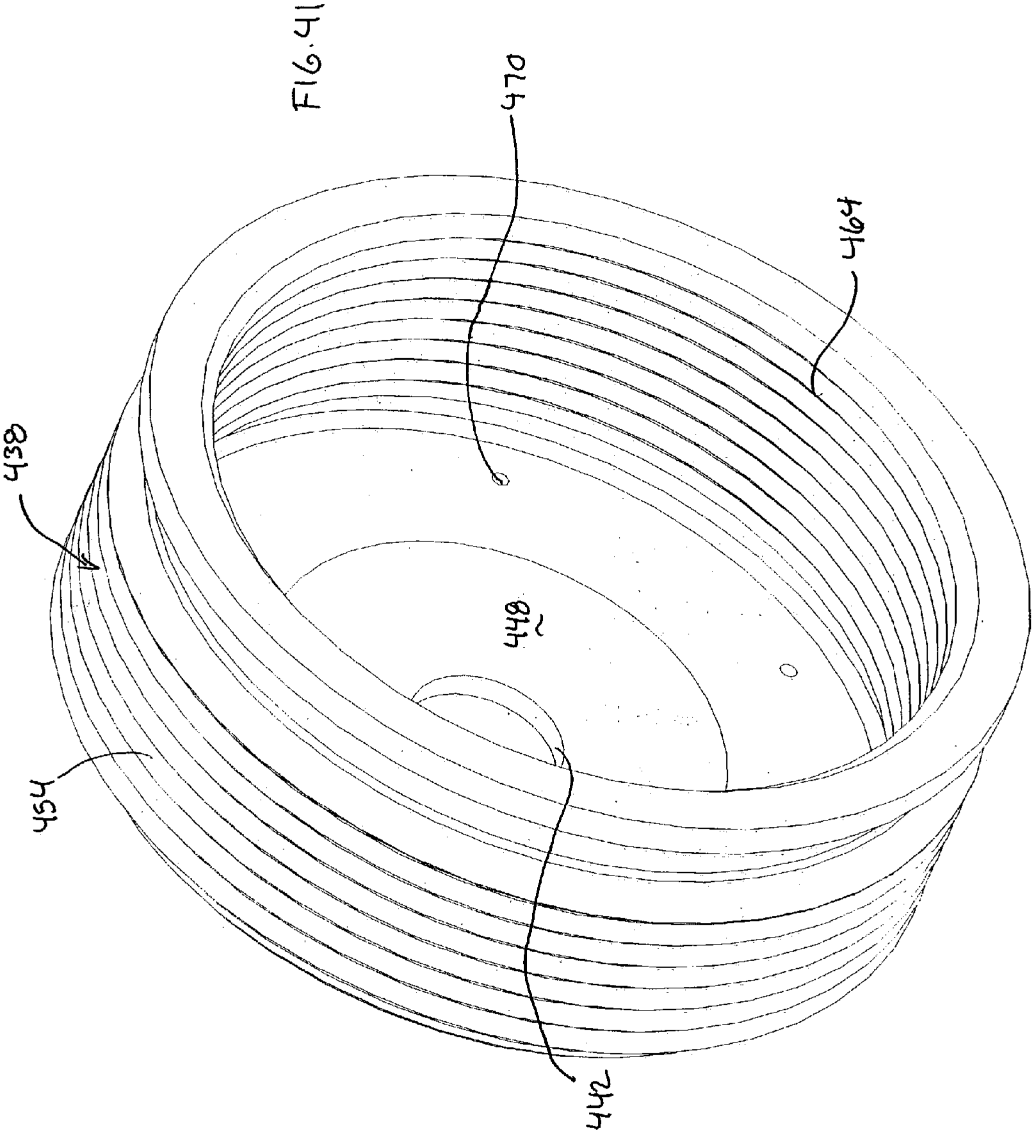
FIG. 41 shows a rear or interior perspective view of the inner front cap.

As seen from a comparison of FIGS. 25, 29 and 30, housing solvent inlet port 282 (FIG. 30) opens into internal solvent chamber 322 as does the separate access solvent opening 328 blocked off by solvent cap 326. FIG. 30 illustrates solvent port 282 having a central axis that is axially positioned on the housing such that its central axis extends through a central region formed between the compression cap 310 and spacer 314. FIG. 29 illustrates solvent passage 412 which is in solvent flow communication with solvent chamber 322 and is preferably formed in the annular thickness of housing 302 such as an annular port opening out into chamber 322 at its rear end and extending axially toward the front end of housing 302 through a peripheral central region of one of the illustrated housing walls. FIGS. 38A, 38B and 39 show solvent passageway with front outlet opening 414. One axial passageway of, for example, 0.04 to 0.08 of an inch (e.g., 0.06 in diameter) is preferred, although alternate embodiments featuring multiple, circumferentially spaced axial solvent passageway (e.g., of the same size or smaller solvent ports diameters can be provided to achieve a desired flushing solvent flow rate through the front of the housing). Outlet opening 414 is formed in recessed front housing surface 416 extending about the circumference of the front end of housing 302. Recessed front housing surface 416, in conjunction with the interior surfaces of circumferential (or peripheral if other than circular cross-section) radially internal flange 418 and radially external flange 420, is formed at the forward end of housing 302. External flange 420 includes chamfered outer wall 422 which defines the outer surface of front flange projection 420. Exterior housing wall 424 is preferably threaded on its exterior with threads 425 and extends into annular recess 426 (FIG. 39) positioned axially internally of main body 428 with the latter preferably defining a portion of the above described hexagonal wall configuration for housing 302.

FIG. 38A and 38B also provide added detail as to chemical inlet ports 278, 280 which are shown as including annular seal recess 430 concentrically extending about the applicable chemical passageway 278, 280 which are defined by the illustrated cylindrical projections 434 inward of the remaining surrounding body portion of hexagonal housing main body 428. FIG. 38B further illustrates seal 436 preferably in the form of an O-ring with seal 436 being dimensioned for compression and/or tensioning (stretched about the inner passageway projection 434) state retention within seal recess 430 (e.g., seal stays in place during handling and shipping and is thus ensured to be in proper position upon mixing module mounting). Thus, for chemical ports as well as the solvent ports in housing 302, sealing means can be provided on the mixing module itself which is beneficial in assuring proper, centered seal positioning despite slight tolerance deviations in the mounting of the mixing module in the dispenser (e.g., avoiding partial obstruction of a housing inlet port).

FIG. 38A also shows the relative positioning of solvent housing inlet port 282, solvent access opening 328 with threads TH, and outlet 414 of solvent passageway 412. Which opens out as surface 416 formed between flanges 418, 420, and extends axially along a line that bisects the solvent access opening 328 and extends along common side wall 272, and preferably parallel to the purge rod passageway.

FIGS. 29A and FIGS. 40-43, and 48 provide additional detail as to the arrangement of front cap assembly 308 which comprises inner front cap 438 and outer front cap 440. Front inner cap 438 performs the function of providing a rigid support for the Teflon mixing chamber 312 subject to the compressive load of compressions means 316. This function being similar to that of the front cap described in co-pending application Ser. No. 10/623,716. filed on Jul. 22, 2003 and entitled "Dispenser Mixing Module and Method of Assembling and Using Same," which is incorporated by reference.

Interior threads 464 are designed for threaded engagement with external threads 425 provided on front projection wall 424 of housing 302 which can involve alternate securement means as described above for the rear cap, but the threaded attachment is preferable to handle the forces involved. The space can also be formed in other ways relative to facing surface portions of the forward and more interior front cap components as in a series of radial channels between opposing outward/interior front cap components. The illustrated double wall with each cap component releasably supported by the front end of the main housing body is preferred as it functions well as providing a full circumferrical solvent wetting of the rod and is easily formed simply by attachment of the preferred releasable outward and interior front cap components. Upon full securement of front inner cap 438 onto the housings front projection wall 424 there is achieved a releasable securement provided by the threaded engagement of the front inner cap's threads 464 to the housing's externally threaded front end. In addition, the threaded securement of threaded surfaces 464 and 425 places the planar radial outer surface 450 of front inner cap 438 into abutment with the forward most surface of annular projection 452 of the Teflon mixing chamber 312. As seen from FIG. 48, this abutting relationship forms a double wall, solvent accumulation disk space 472 between the interior surface 466 of outer front cap 440 and recessed surface 446. Threaded exterior wall 456 of front inner cap 438 provides a threaded attachment location for the outer front cap 440 discussed in greater detail below.

FIGS. 40-43 further show a plurality (e.g., 3 to 10 with 6 shown) solvent flow holes 470 that pass through the forward face wall 444 (e.g., are drilled through the face of the inner cap) to allow solvent flow from the ring groove on the face of the housing 302 to the thin disk space 472 that is created between the outer face 446 of the inner cap 438 and the inner face 466 of the outer cap 440. In a preferred embodiment, there are six solvent cap holes and the preferred hole diameter is 0.015 to 0.03 with 0.020 being preferred. The axial clearance length between the double wall solvent pooling area of the front cap assembly is preferably about 0.01 to 0.05 in with 0.02 in being suitable.

Figure 42:
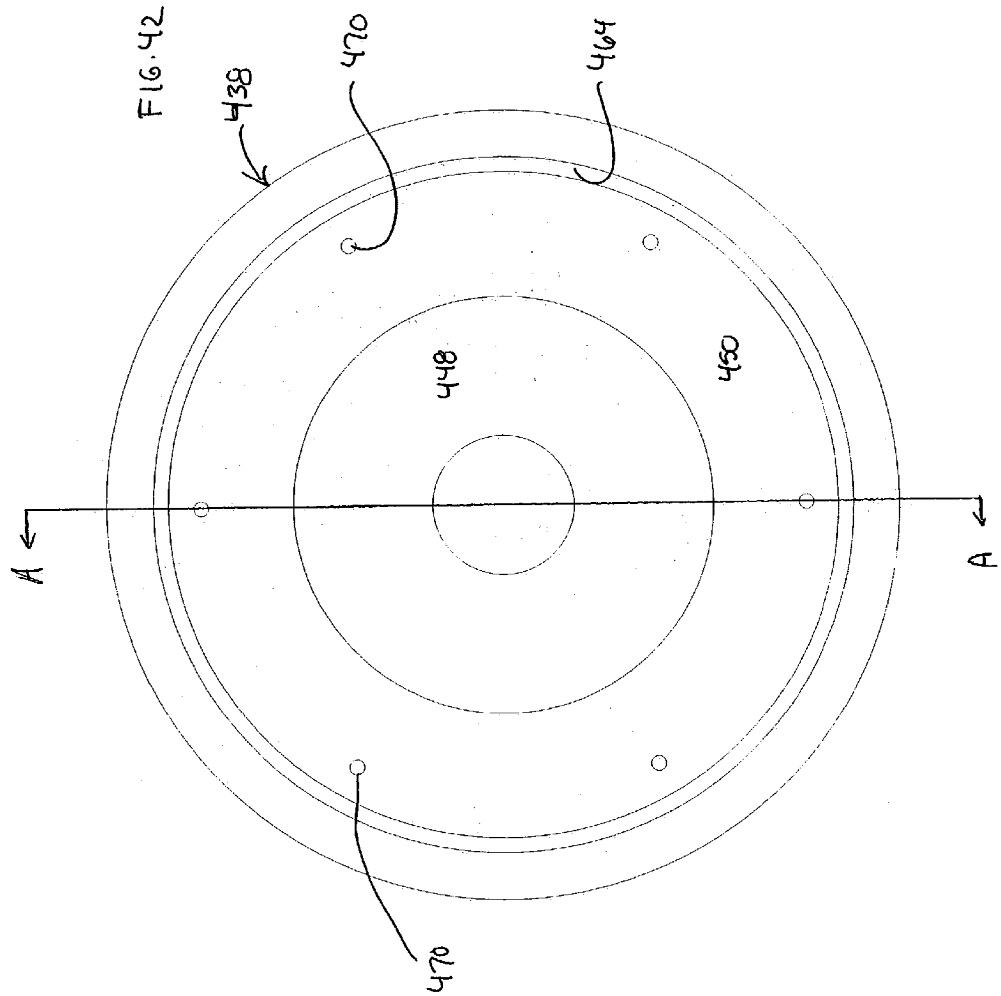
FIG. 42 shows an interior elevational view of the inner front cap.
Figure 43:
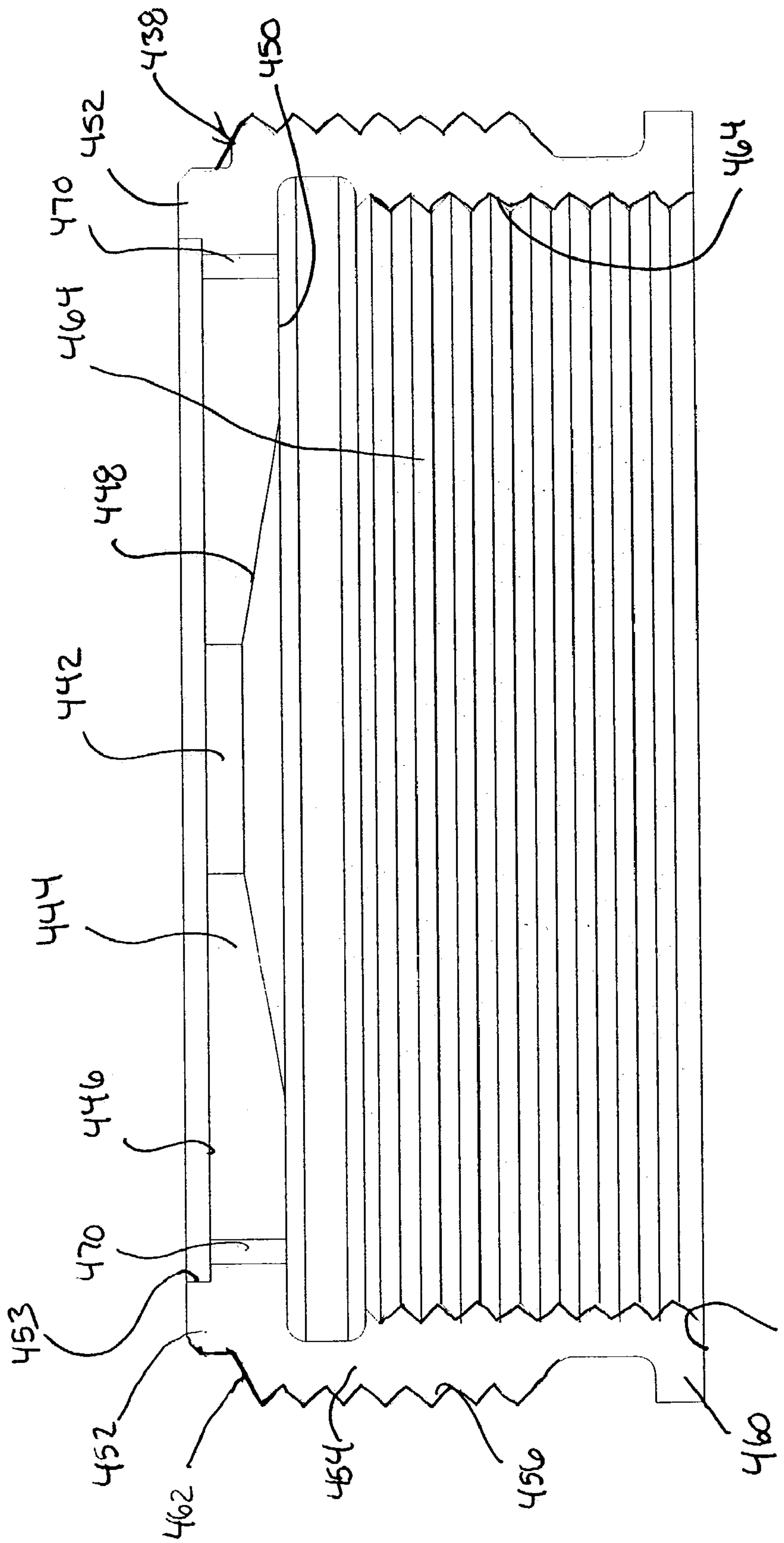
FIG. 43 shows a cross-sectional view taken along A-A in FIG. 42.
Figure 44:
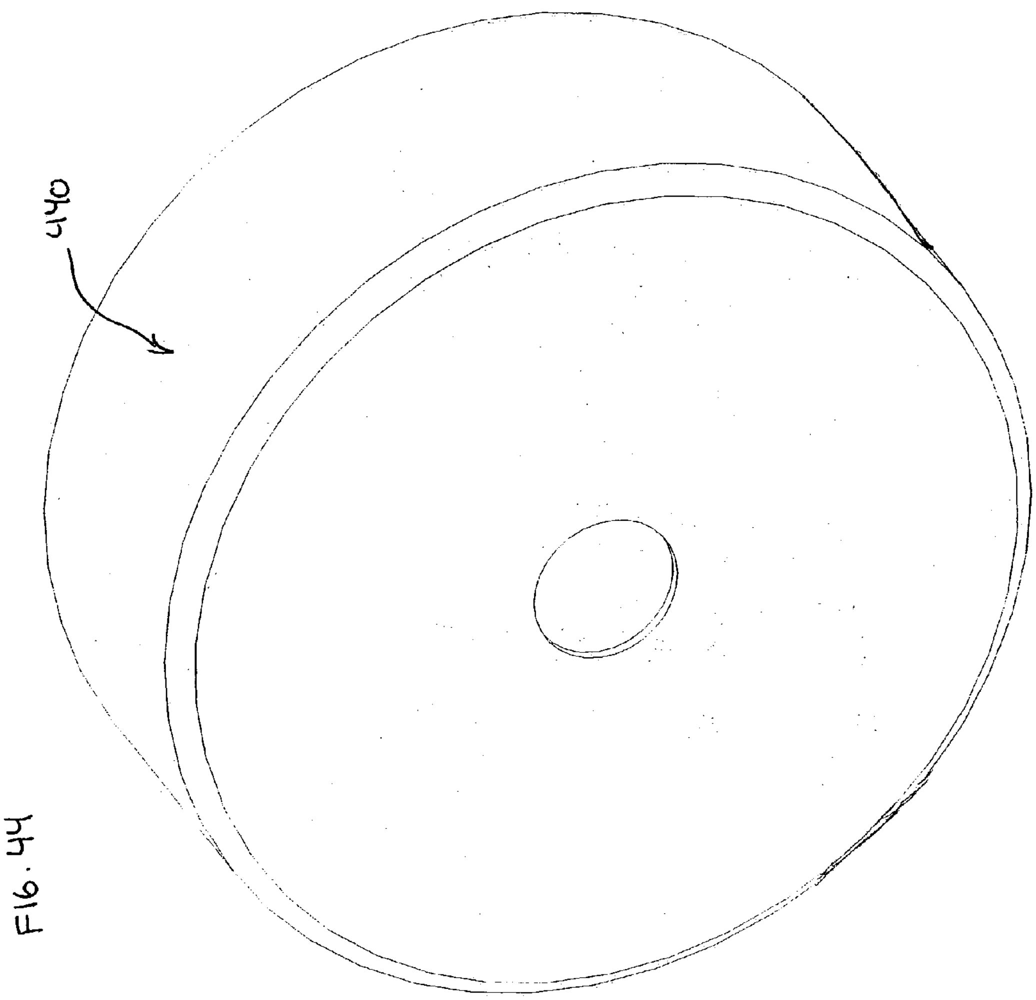
FIG. 44 shows a front or outer perspective view of the outer front cap.
Figure 45:
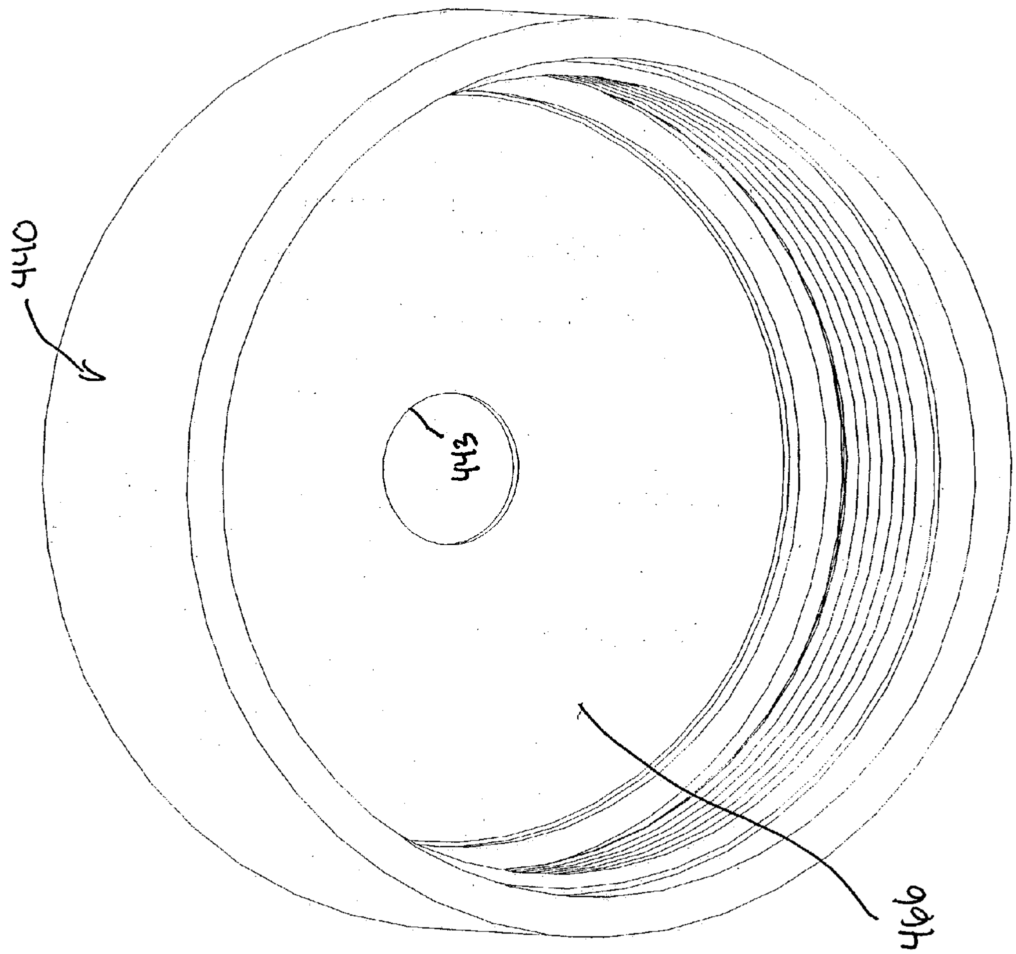
FIG. 45 shows a rear or inner perspective view of the knurled outer front cap.
Figure 46:
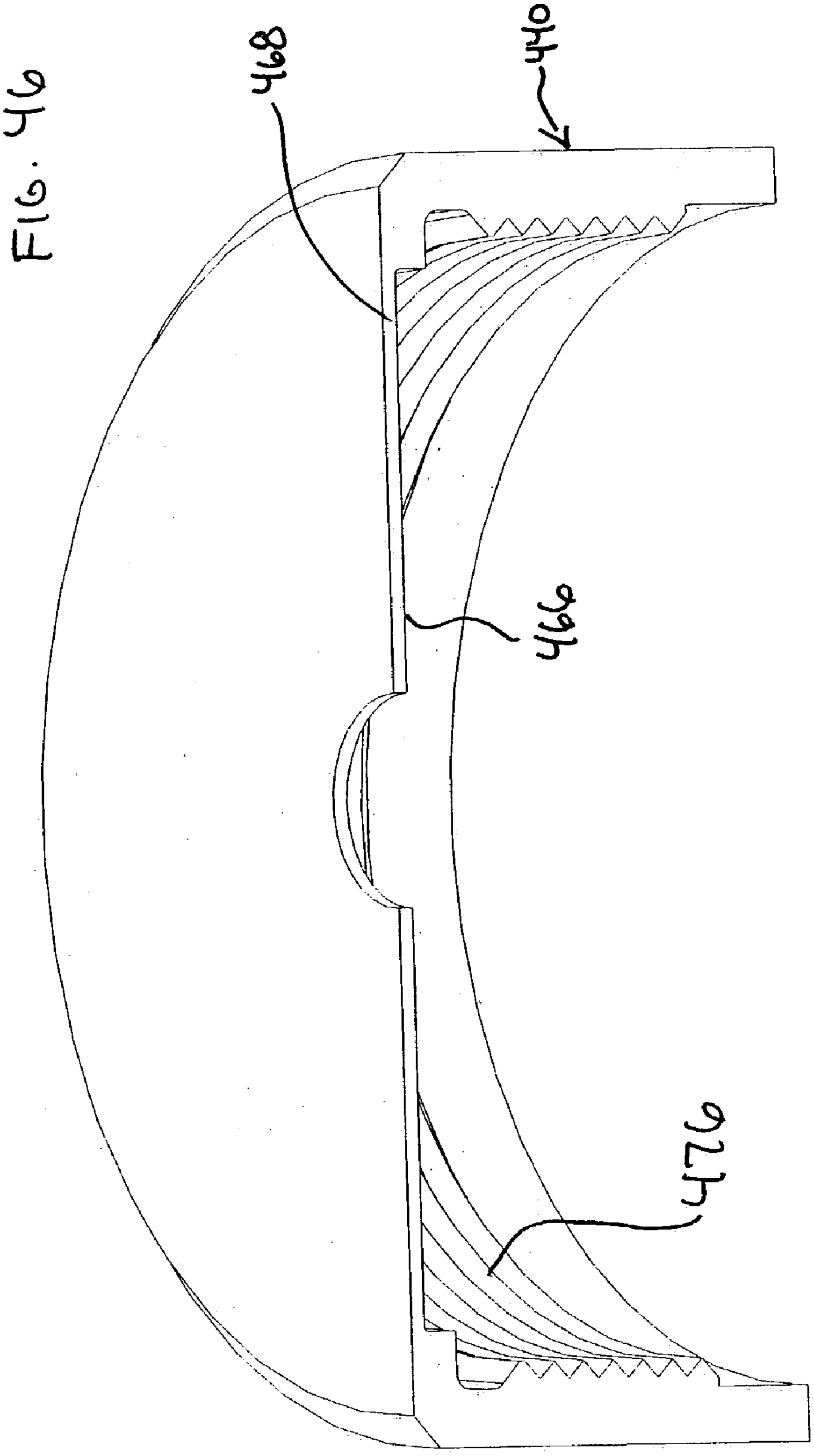
FIG. 46 shows a perspective cross-sectional view of the outer front cap.
Figure 47:
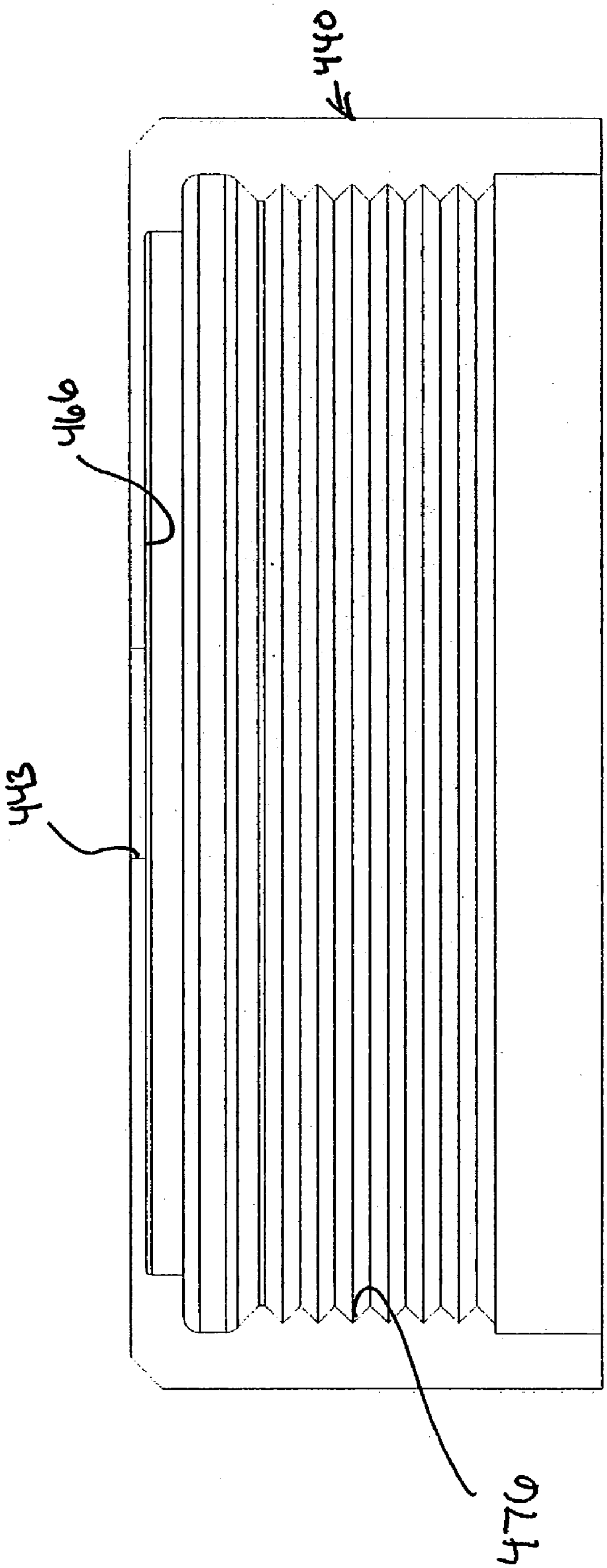
FIG. 47 shows an elevational cross-sectional view of the outer front cap.

In addition, solvent holes 470 are preferably arranged in the radial external portion of forward face wall (e.g., the radial outer quarter region) and just inward (e.g., 0.02 to 0.06 of an inch) of the interior annular wall surface 453. Thus, as shown in FIGS. 42 and 48 solvent face holes 470 are circumferentially equally spaced about front wall 444 (e.g., 6 at 60° spacing) and radially positioned to be in fluid communication with annular solvent recess 417 formed by surface 416 (FIGS. 39 and 48), flanges 418, 420 and covering wall 468 of outer front cap 440. As further shown in FIG. 48, the axially extending solvent holes 470 are preferably arranged so as to have a radially exterior surface aligned with the interior wall surface of outer flange 420.

Inner front cap 438 is preferably made from a high strength material such as steel (e.g., 17-4 PH steel that is hardened to be strong enough to withstand the compression means pressure on mixing chamber 312 without significant deformation, and to minimize material thickness of the front face at the center hole 442 where the inside diameter of the center hole comes in close proximity with the outside diameter of the valving rod 264). That is, the thickness of the central circular edge 442 of the inner front cap in preferably made as thin as possible (e.g., 0.02 inch) as there is lacking the lower friction benefit of Teflon material there. Thus the interior surface 448 of the front inner cap slopes outward while the outer end surface 446 stays planar. As seen from FIG. 48 the outer front cap 440 can be made relatively thin (e.g., 0.03 to 0.06 inch) as it is not subjected to the forces compression means 316 as is inner front cap 438.

FIGS. 44-47 illustrate in greater detail outer front cap 440 which attaches via threads 476 to the front inner cap 438. Outer front cap 440 is designed to be readily removable from inner cap 438 for cleaning (although the below described cleaning member (e.g., steel bristle brush) and associated reciprocation is effective in maintaining the cap clean). That is the entire outer cap 440 can easily be removed, cleaned, or replaced without affecting the integrity of the mixing module. The inner cap on the other hand, since its removal can disrupt and possibly damage the Teflon mixing chamber which has its front face conforming to surfaces 448 and 450 formed therein, is typically not removed for cleaning but is releasable for other purposes such as servicing (e.g., mixing chamber replacement). It is therefore more difficult to reattach the inner cap after removal because the Belleville washers relative to outer cap 440 would have to be compressed to get it back on, although, as explained above in the discussion of the ease of assembly as compared to the prior art, the releasable back end cap can be removed to allow the front inner cap to be threaded on, followed by back cap threading and compression of a positioned mixing chamber or vice versa. Outer front cap 440 is, preferably made from stainless steel to withstand abrasion from the tip cleaning brush bristles (described below). Also, the exterior surface 478 of outer cap 440 is preferably knurled to facilitate hand or toolless removable and insertion onto front inner cap 438.

The cross-sectional view of the front end of mixing module 256 in FIG. 48 shows the solvent path front the ring groove 417 on the front of the housing 302, through the small drilled holes 470 in the front inner cap 438, through the thin disk of open space 472 formed between the inner cap 438 and outer cap 440, and finally out the small gap formed between the radiuses tip 474 of valving rod 264 and the center hole 442 in the outer cap 440. That is a small gap is formed between the tip of the valving rod and the outer cap that allows solvent to exit. Also, the central aperture 445 in outer cap 440 is preferably slightly larger (e.g., 0.005 to 0.010 inch) than aperture 442 to provide for solvent passages in the opening between the outer surface of the rod and the surface forming aperture 442. Accordingly, the solvent outlet onto the rod is in a highly effective location as it maintains a fresh solvent supply on the tip location as well as the area immediately adjacent (common boundary wall) the non-Teflon inner cap portion.

FIGS. 49 to 53 illustrate a preferred solvent tank supply system 400 which includes tank holder 480 which is shown as a cup-shaped with an open top, base and four side walls at least one and preferably all three exposed side walls being provided with view transparent or translucent slot 482 to allow for direct solvent level viewing. Tank holder 480 also preferably comprises mounting plate 484 formed on the back tank holder wall and having mounting means (e.g., a bolt fastener) for mounting tank holder 480 to lifter 40 (FIG. 6) such that the tank holder and solvent tank 402 rise together thus minimizing the length of solvent tubing involved, although the present invention also includes an embodiment where the solvent tank is retained stationary while the lifter rises with extra solvent conduit length provided to accommodate, for example, a two foot rise.

Figures 49, 50, 51, 52, 53:
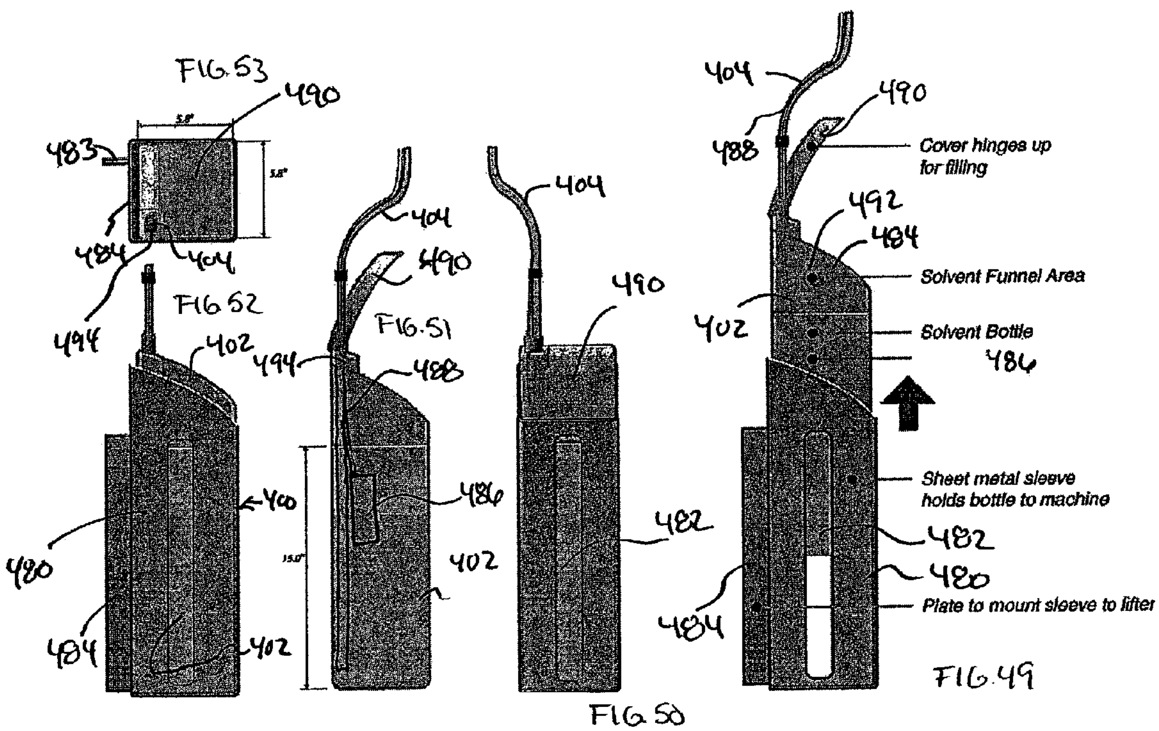
FIG. 49 shows a side elevational of the solvent supply source with the solvent bottle partially removed from the solvent bottle reception sleeve.
FIG. 50 shows back end elevational view of the solvent source combination shown in FIG. 49.
FIG. 51 shows a side elevational view of the solvent supply bottle above.
FIG. 52 shows a view similar to FIG. 49 but with the bottle fully received.
FIG. 53 shows a top plan view of FIG. 52.

FIG. 49 illustrates the bottle shaped tank 484 partially removed from holder 480 while FIG. 51 shows tank 402 completely removed from holder 480 with float 486 and sensor line 488 extending down to monitor the solvent level in tank 484. Sensor line extends together with solvent conduct 404 to the control unit (described below). A two position level detector (e.g., a float and reed type) is provided as tank level sensing means in the illustrated embodiment (e.g., a warning provided at first level and a shut down at a sensed reaching of the second level) with the solvent level detector being in communication with the control figure system of the present invention as illustrated in FIGS. 186 and 196. Tank 402 preferably has a hinged upper lid 490 covering an upper funnel 492 area of bottle and shown closed in FIG. 50 and open in FIG. 49 and 51. Bottle 402 is preferably vertically elongated (e.g., a height of 15 to 25 inches) with a width generally conforming to the width of lifter 40 (e.g., about 4 to 8 inches) so as to provide a small base footprint and to minimize space usage. Tank 402 is preferably a 2 to 4 gallon containers with 3 gallons being well suited for purposes of the present invention. A fill line is provided at a specific volume to facilitate the monitoring and resupply of solvent usage by the control system shown in FIG. 196. FIG. 51 also illustrates solvent conduit 404 extending down close to the bottom of bottle 402 and fixed in position with an upper clamp 494.

Figure 54:
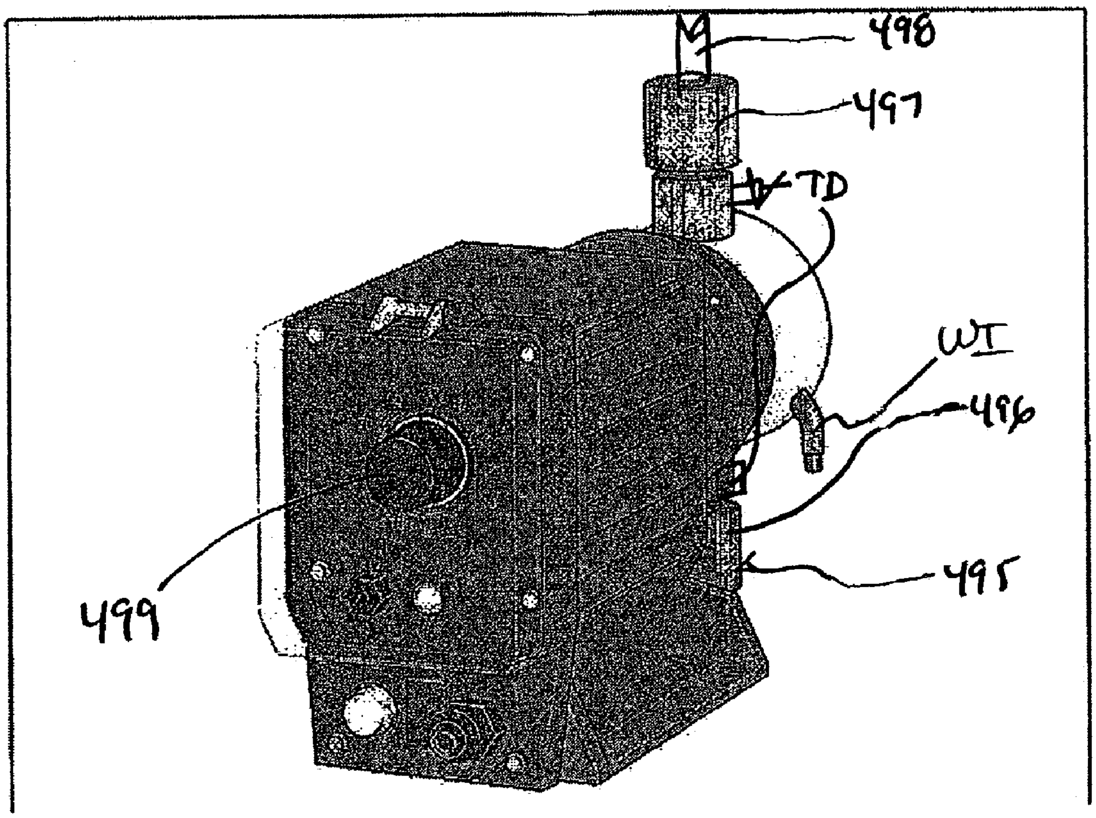
FIG. 54 shows the solvent pump used in the solvent supply system of the present invention.

FIG. 54 illustrates a preferred solvent pump 495 which is mounted at any convenient location such as in the exit port regions of the solvent bottle. Pump 495 has an inlet port 496 which is connected to the outlet end of solvent conduit 404. Pump 495 includes outlet port 497 to which is connected a downstream solvent conduit 498 feeding to the inlet valve 406 feeding manifold 205. A preferred embodiment of solvent metering pump is a solenoid driven diaphragm metering pump such as a Teflon coated diaphragm driven by a solenoid powered by electronic wiring WI and capable of generating over 140 psi. Pump 495 preferably also includes adjustment means 499 for adjusting the volumetric output per stroke of the diaphragm (e.g., a volume shot of solvent per stroke). A suitable pump source of manufacture is a ProMinento® Concept b pump manufactured by ProMinent Fluid Controls, Inc. of Pittsburgh, Pa., USA.

As a means for reciprocating rod 264 and thus controlling the on-off flow of mixed chemicals from the mixing module, reference is now made to the mixing module drive mechanism 500 of a preferred embodiment of the present invention. In this regard, reference is made to, for example, FIGS. 55 to 76 for an illustration of a preferred embodiment of the means for reciprocating purge/valve rod 264 extending in mixing module 256.

Figure 55:
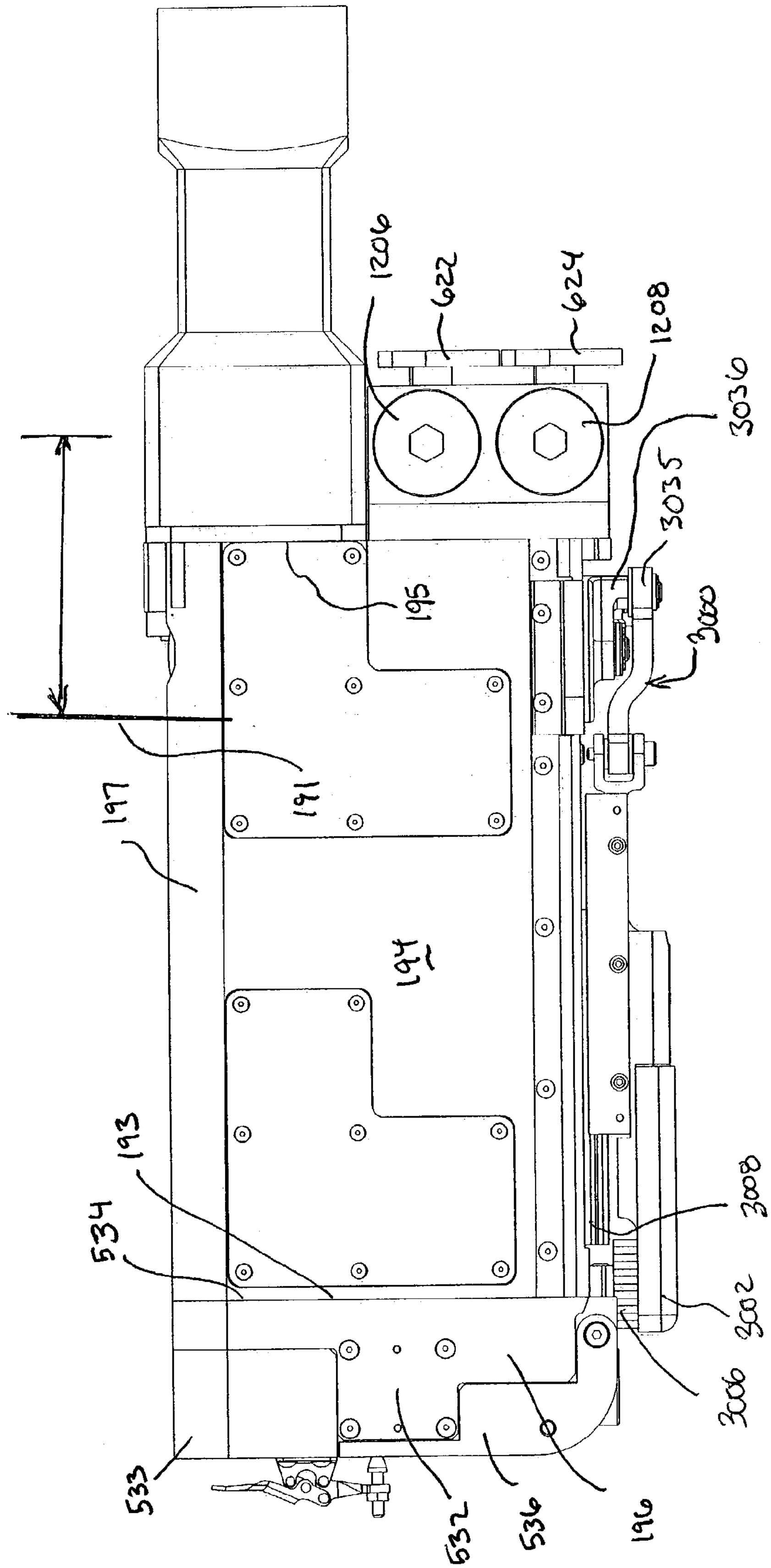
FIG. 55 shows a front elevational view of the dispenser apparatus with means for reciprocating the mixing module rod and with a bottom brush cover plate removed.
Figure 55A:
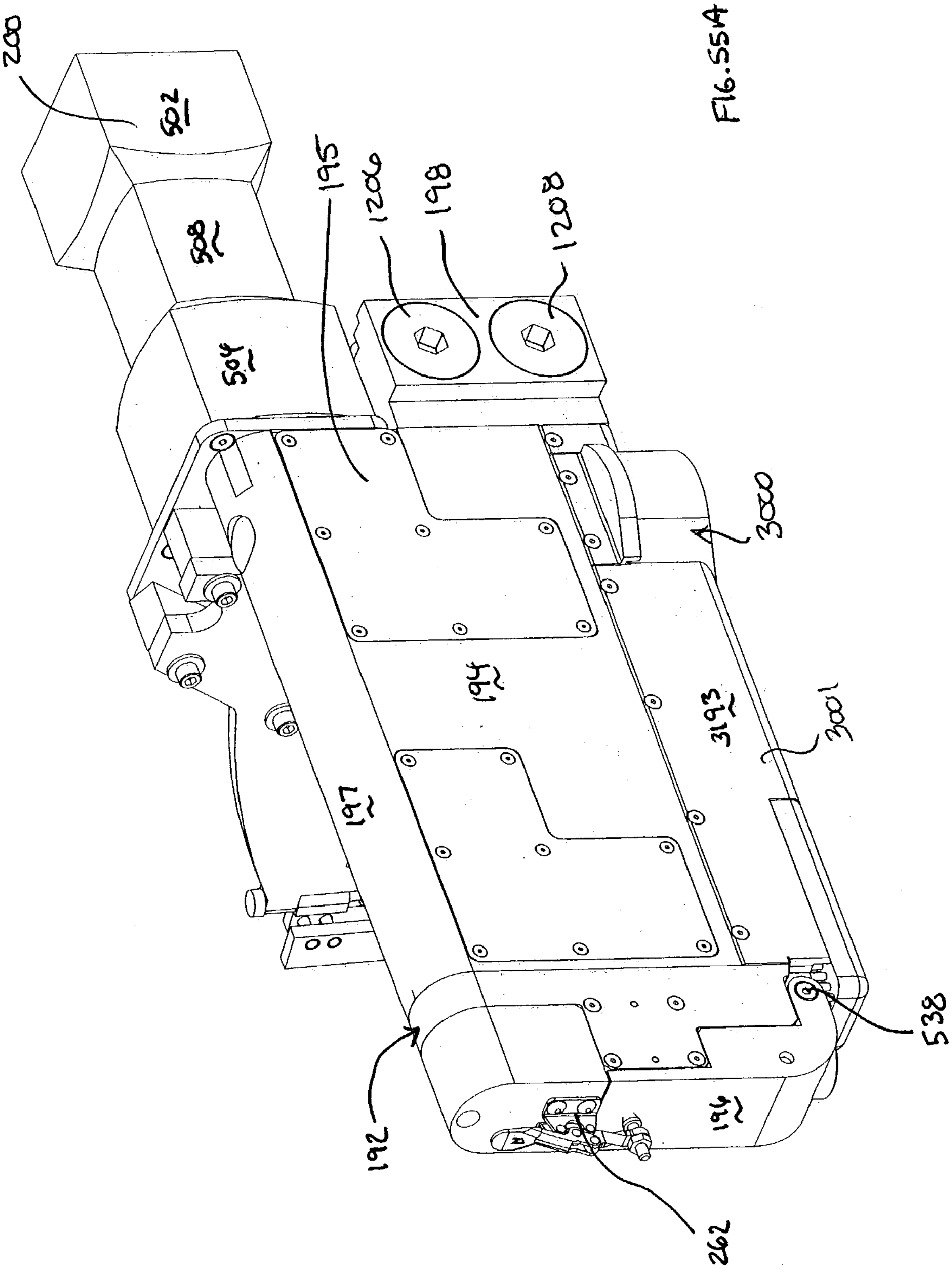
FIG. 55A provides a perspective view of the dispenser apparatus similar to that of FIG. 22 but from a different perspective angle.
Figure 56:
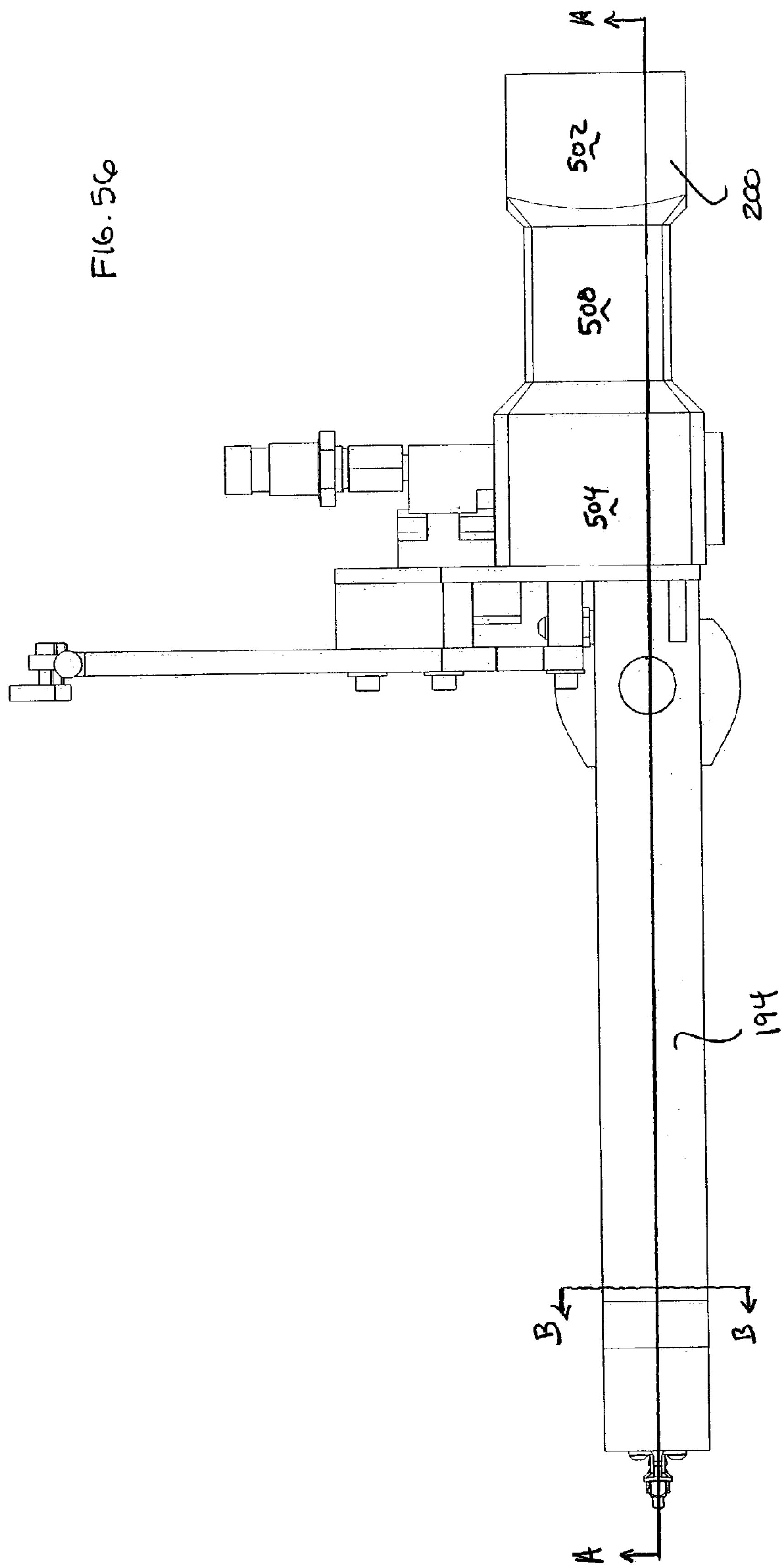
FIG. 56 shows a top plan view of that which is shown in FIG. 55.

FIG. 55A provides a perspective view of dispenser system 192 (similar to FIG. 22 but at a different perspective angle). Dispenser system 192 is shown in these figures to include dispenser housing 194 with main housing 195 section, dispenser end section 196 and chemical inlet section 198, with at least the main housing and dispenser end sections each having an upper convex or curved upper surface 197 corresponding in configuration with each other so as to provide a smooth, non-interrupted or essentially seamless transitions between the two. The preferably parallel side walls of the main housing 194 and dispenser end section 196 of dispenser apparatus 192 also fall along a common smooth plane and are flush such that corresponding side walls of each provide an uninterrupted or essentially seamless transition from one to the next (the access plates shown being mounted so as to be flush with the surrounding dispenser housing side walls with, for example, countersunk screws). Dispenser apparatus thus provides smooth, continuous contact surfaces on the top and sides of the portion of dispenser apparatus 192 forward of line 191 representing generally the back edge location of the film being fed past dispenser apparatus 192.

Figure 59:
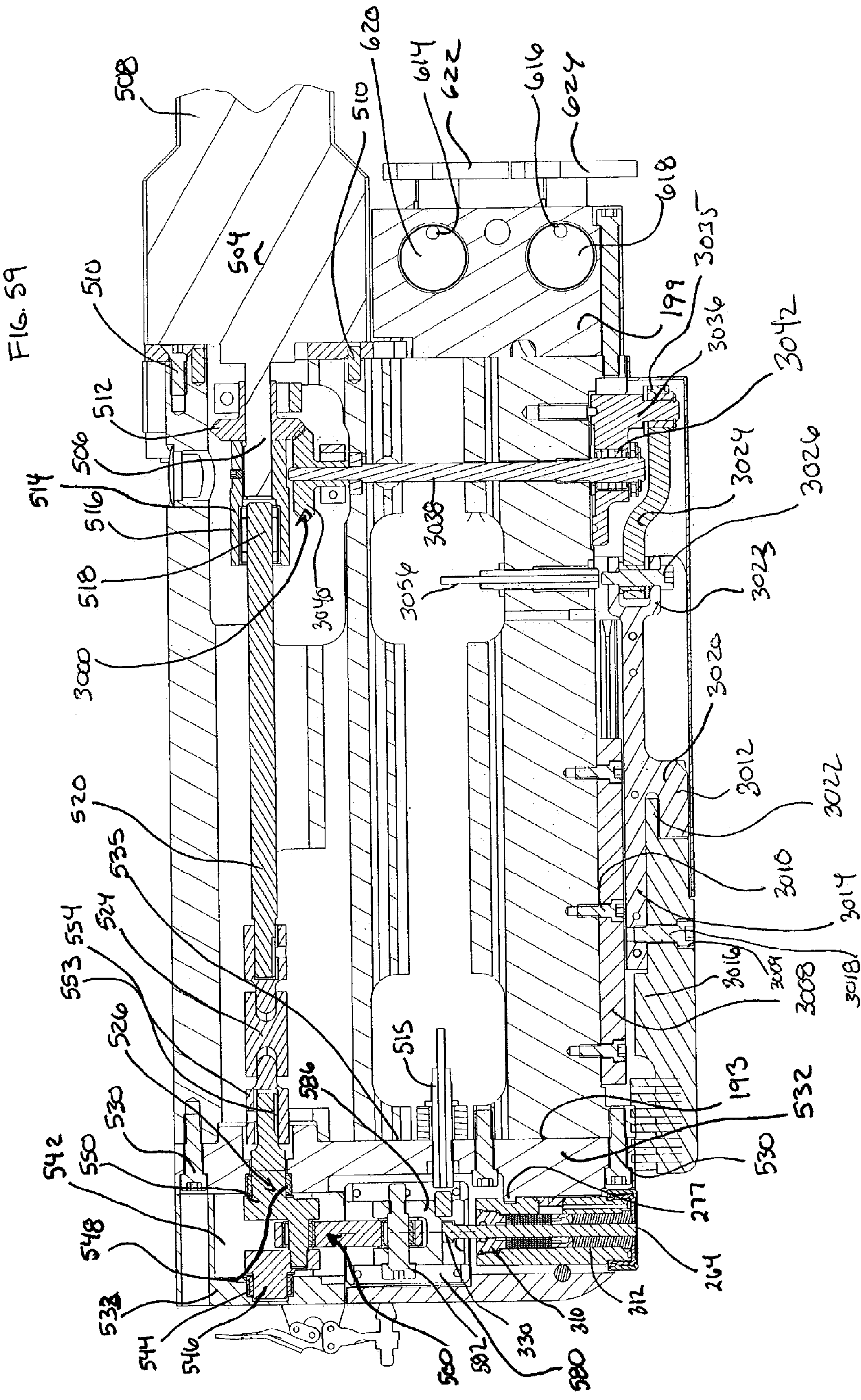
FIG. 59 shows a cross-sectional view taken along cross-section line A-A in FIG. 56.
Figure 64:
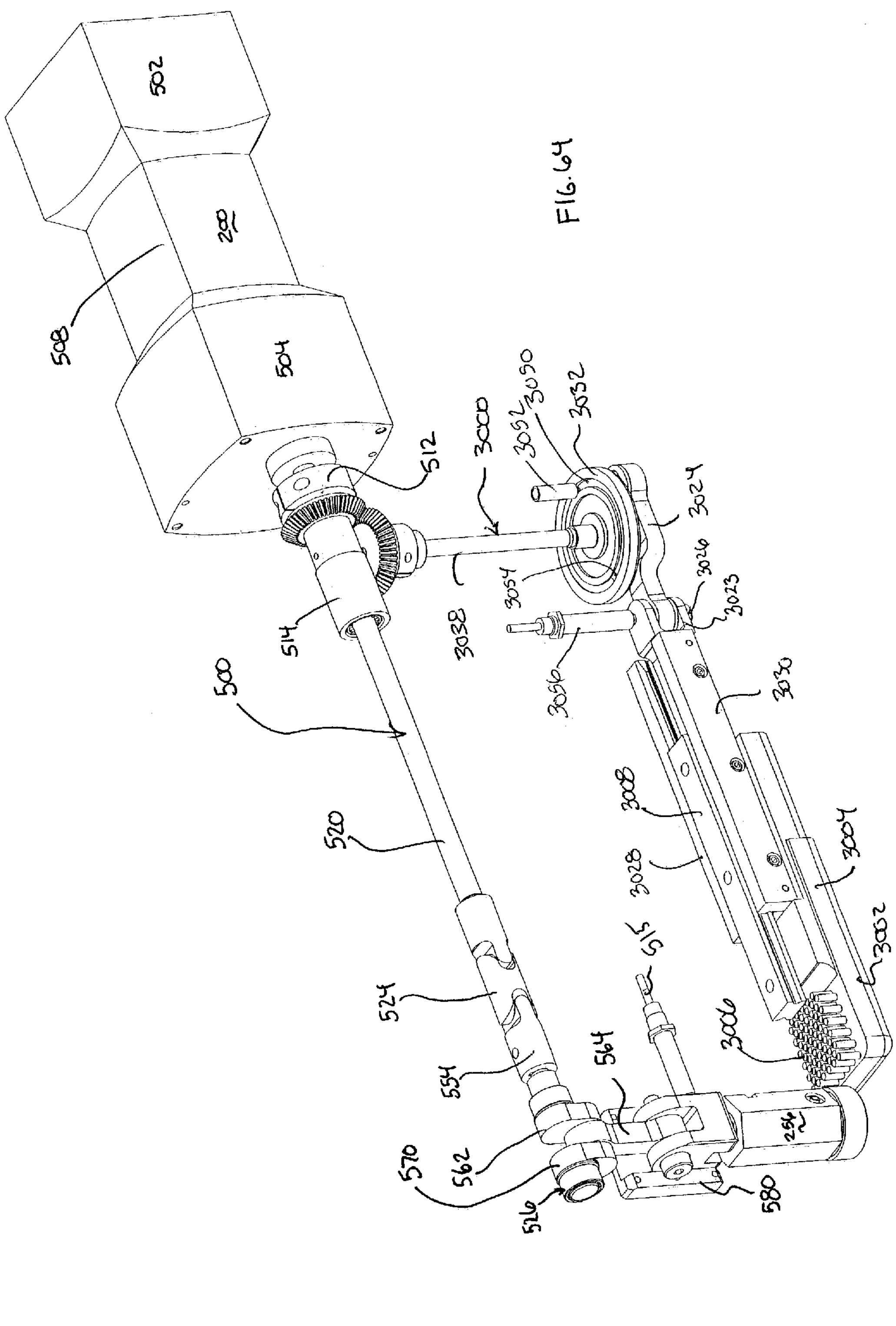
FIG. 64 shows a perspective view of the dispenser (and brush) drive mechanism.

With reference particularly to FIGS. 59 and 64 there is illustrated dispenser drive mechanism 500 which is used to reciprocate rod 264 within mixing module 256 and is housed in dispenser system 192 and, at least, for the most part, is confined within the smoothly contoured housing of dispenser system 192. Dispenser drive mechanism 500 includes dispenser drive motor system 200 ("motor" for short which entails either a motor by itself or more preferably a motor system having a motor, an encoder means and/or gear reduction means). Motor 200 (the system "driver") preferably comprises a brushless DC motor 508 with an integral controller 502. mounted to the back section of the motor and encased within the motor housing, and gear reduction assembly 504. Motor controller 502 provides encoder feedback (e.g., a Hall effect or optically based encoder system) to the controller such as one provided as a component of main system control board which is used to determine speed and position of the various drive components in the drive mechanism 500. FIGS. 186 and 190 illustrate the control system for operating, monitoring and interfacing the data concerning the rod drive mechanism. The motor controller input from the main system control board preferably includes a 0 to 5 volt speed signal from the main system controller, a brake signal, a direction signal and an enable signal. Motor 200 farther preferably includes a gear-reduction front section 504 out from which motor output drive shaft 506 extends (FIG. 59). The motor drive source is located in the central section 508.

Figure 65:
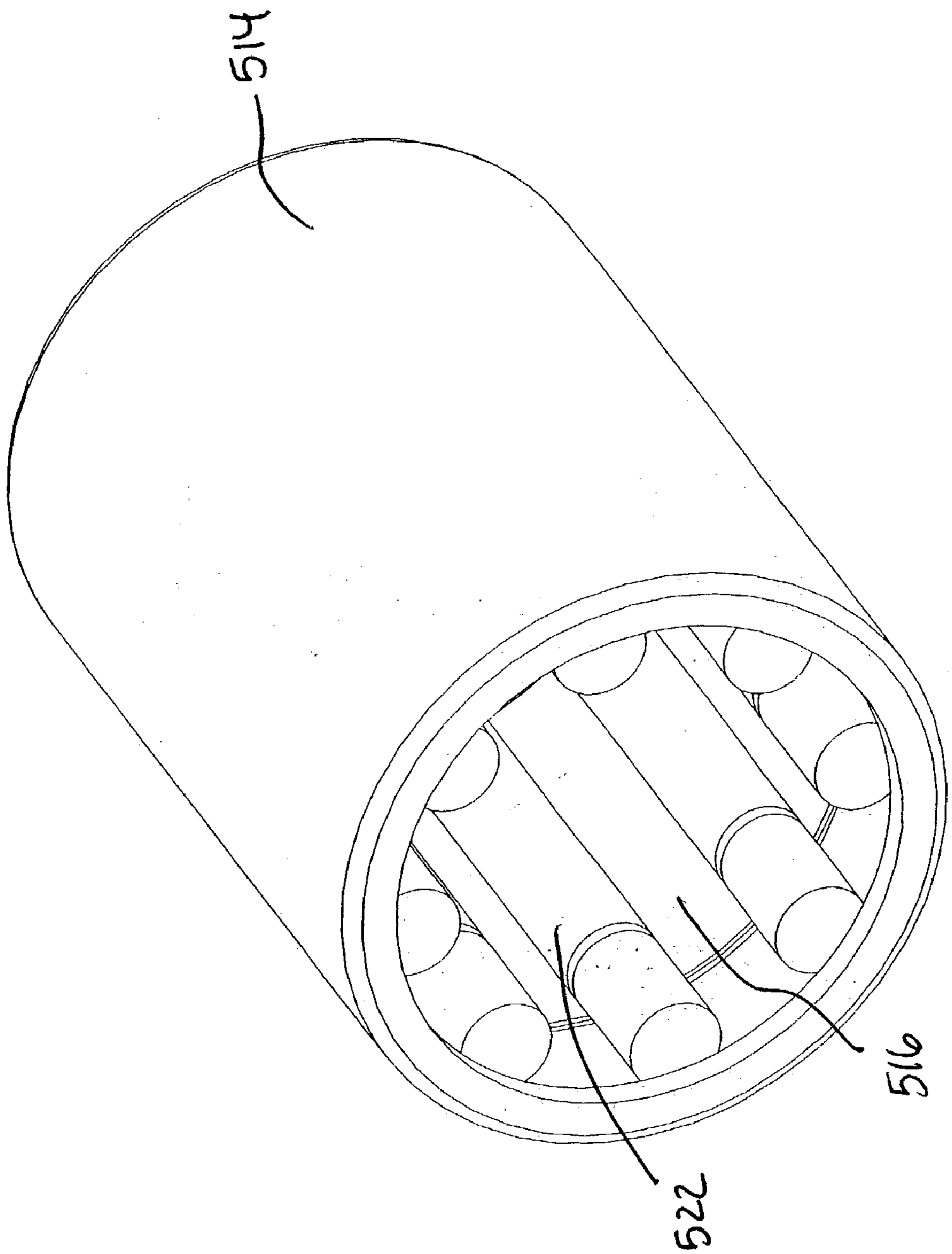
FIG. 65 shows a one way clutch for use in the main dispenser drive mechanism.

As seen from FIG. 59, front section 504 of motor 200 is mounted with fasteners 510 (e.g., pins and bolts) to the rear end dispenser housing 194. As shown by FIGS. 59 and 64, output shaft 506 has fixed thereon bevel gear 512 and one-way clutch 514. One way clutch 514 (FIG. 65) is fixedly attached to drive shaft 506 and has clutch reception section 516 receiving first end 518 of main drive shaft 520. Clutch reception section 516 includes means for allowing drive transmission during one direction of rotation (e.g., clockwise) such that rod 264 is reciprocated in mixing module 256, while one way clutch 514 freewheels when drive shaft 506 rotates in an opposite direction (e.g., counter clockwise) such that bevel gear 512 can drive the below described tip brush cleaning system rather then the reciprocating rod. This provides an efficient means of assuring the timing of any dispenser tip brushing and dispenser output avoiding an extension of this cleaning brush described below at a time when chemical is being output. FIG. 65 further illustrates the interior rollers/cam lock up mechanisms 522 of one way clutch 514 which provide for device lock up to transmit torque when rotating in a first direction with near zero backlash. It is noted that clutch 514 is included in a preferred embodiment of the invention wherein motor 200 is dual functioning and reversible in direction based on the control system's instructions, (e.g., reciprocation of valving rod and reciprocation of a cleaning brush or some other means for clearing off any material that accumulates at the end of the dispenser). A single function embodiment wherein motor 200 is used for opening and closing the mixing module only with or without another driver for the cleaning brush is also featured, however, under the present invention (e.g., either without a tip cleaning function or a tip cleaning system which derives power from an alternate source).

In a preferred embodiment the second end of main drive shaft 520 is connected to flexible coupling 524, although other arrangements, as in a direct force application without flexible coupling 524, is also featured under the present invention. Flexible coupling 524 is in driving engagement with dispenser crank assembly 526 (FIG. 64). Dispenser crank assembly 526 is contained in dispenser component housing (see FIGS. 55 and 66A). Dispenser component housing 528 is a self contained unit that is connected to the front end of main housing portion 195 as previously discussed and forms forward dispenser end section 196. The connection is achieved with suitable fasteners such as fasteners 530 shown in FIG. 59 (three shown in cross-section). Dispenser component housing 528 comprises main crank (and mixing module) support housing component 532 (see FIG. 66A) and upper dispenser housing cap 533 (FIG. 66B), with support housing 532 having a generally planar interior end 535 for flush engagement with the forward end 193 of support housing 194. Dispenser component housing 532 includes pivot recesses 534 (one shown—FIG. 66A) to which is pivotably attached closure door 536 (see FIGS. 22 and 60 for a closed closure door state and FIG. 24 for an open closure door state) by way of pivot screws 538 (one shown) or the like.

Figure 60:
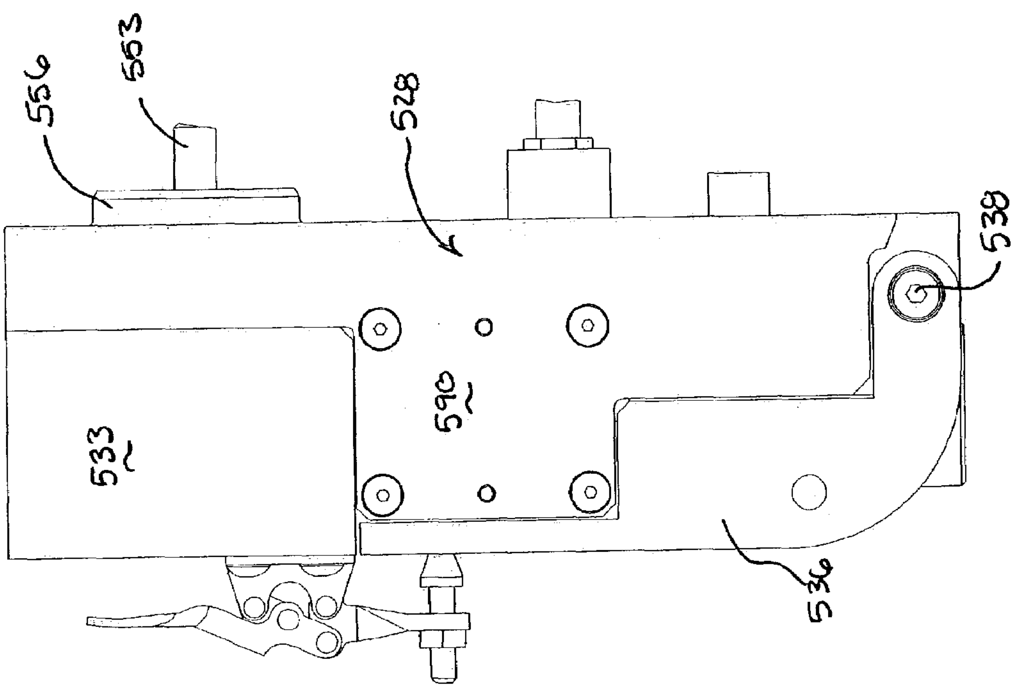
FIG. 60 shows a front elevational view of the dispenser end section of the dispenser apparatus.
Figure 61:
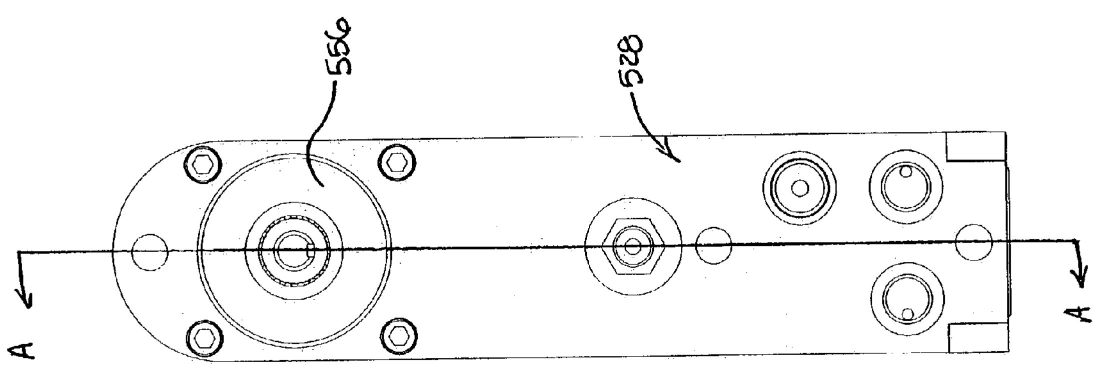
FIG. 61 shows a rear end view of that which is shown in FIG. 60.
Figure 66B:
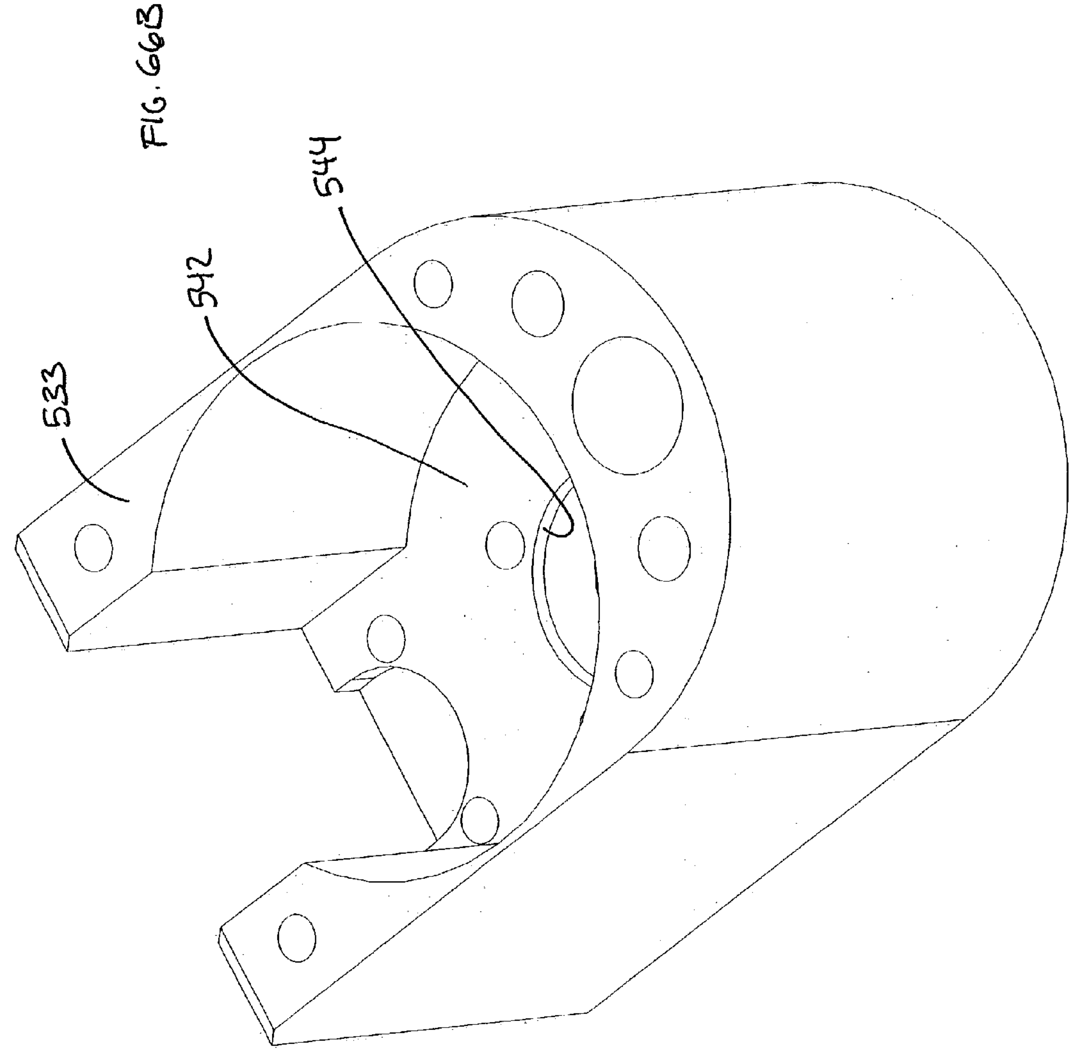
FIGS. 66B shows a perspective view of the dispenser housing cap (capped end of housing).
Figure 67:
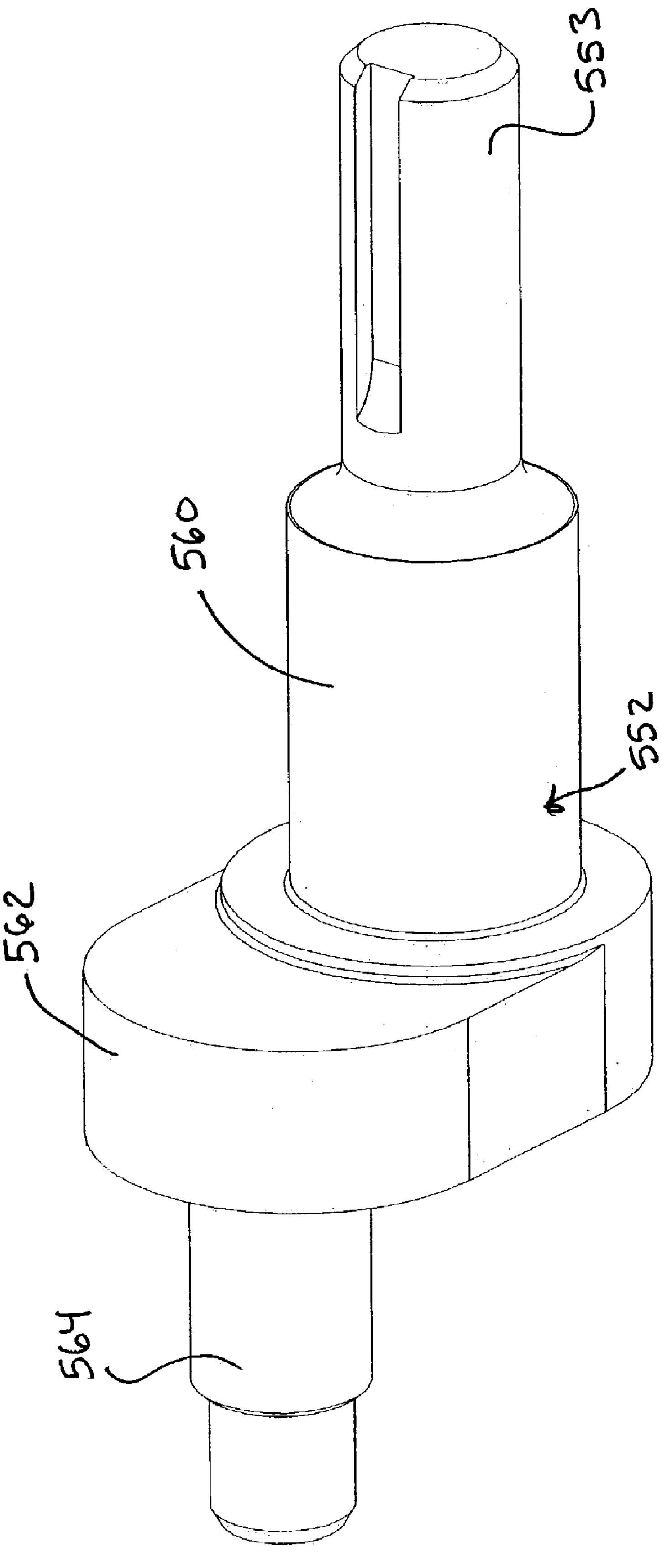
FIG. 67 shows a perspective view of a first half (larger) of the dispenser crank assembly.
Figure 68:
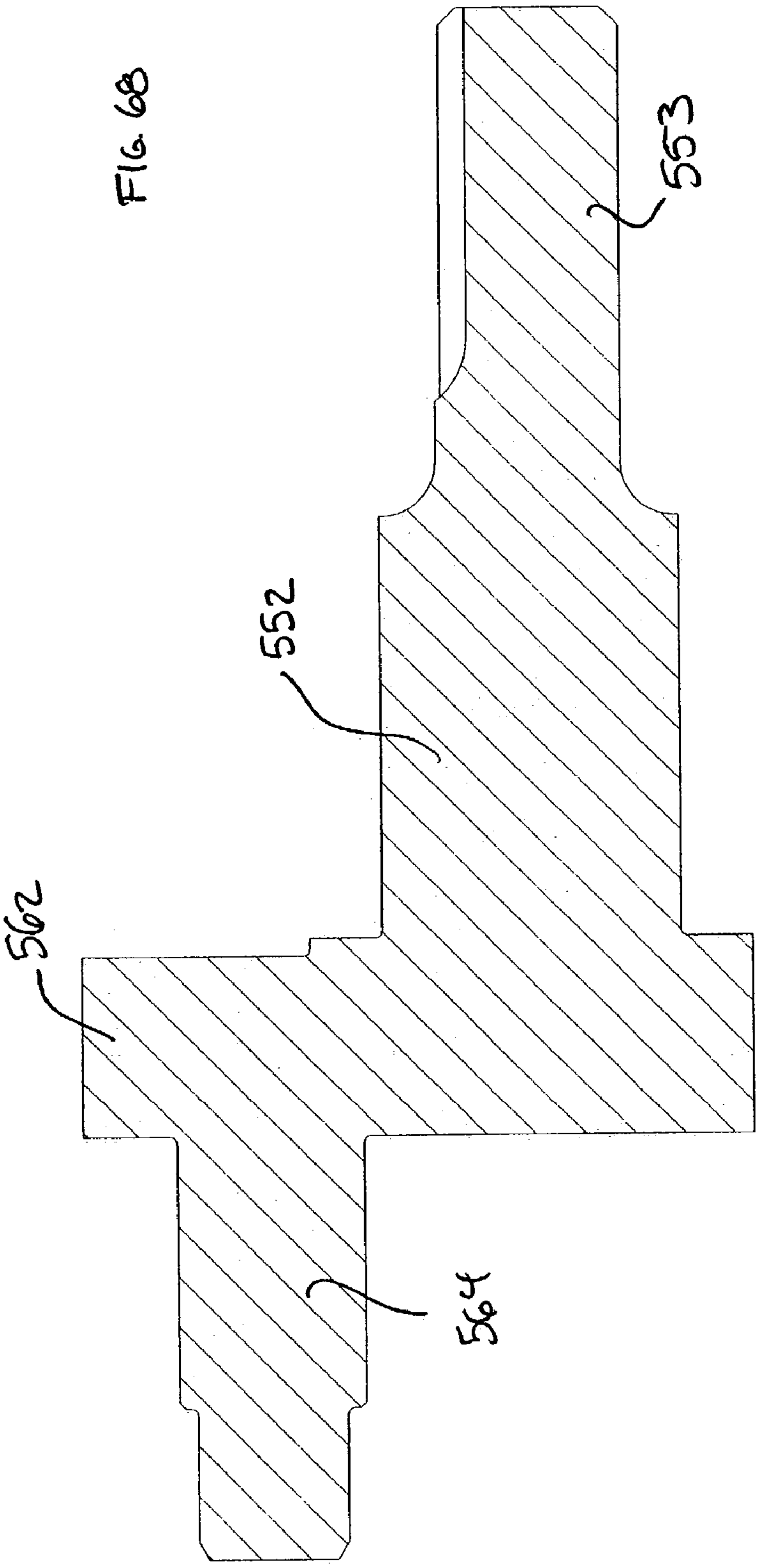
FIG. 68 shows a cross-sectional view of that which is shown in FIG. 67.
Figure 69:
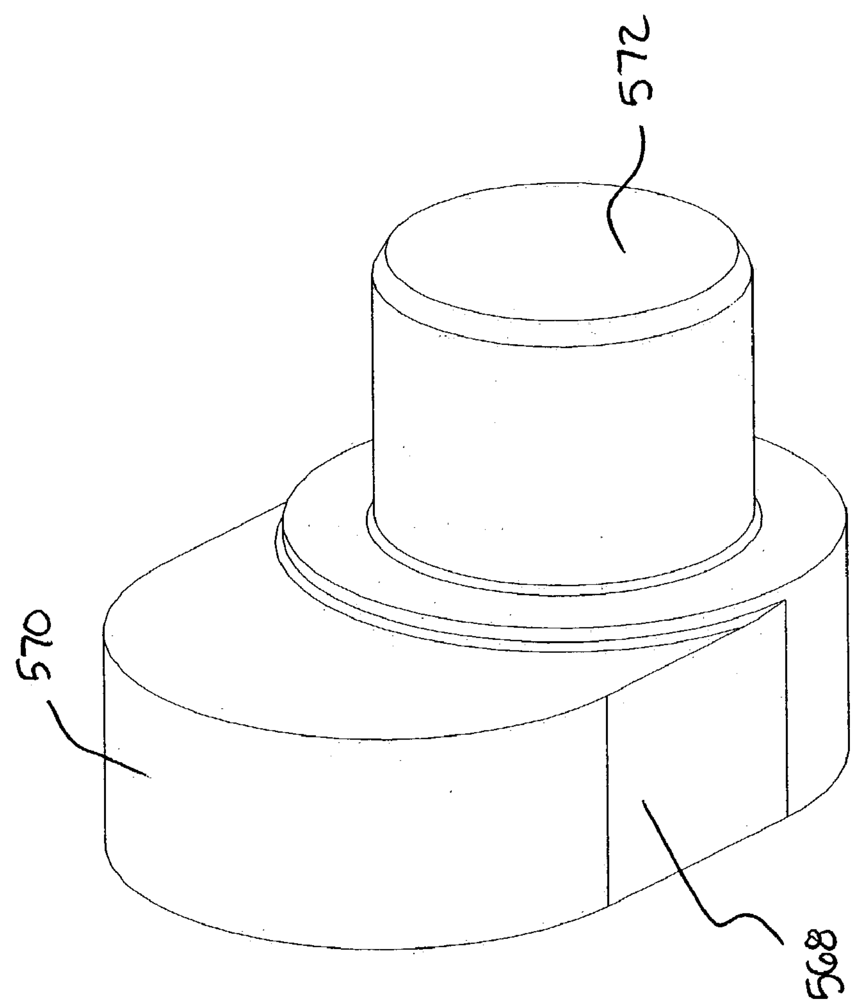
FIG. 69 shows a perspective view of a second half (smaller) of the dispenser crank assembly.
Figure 70:
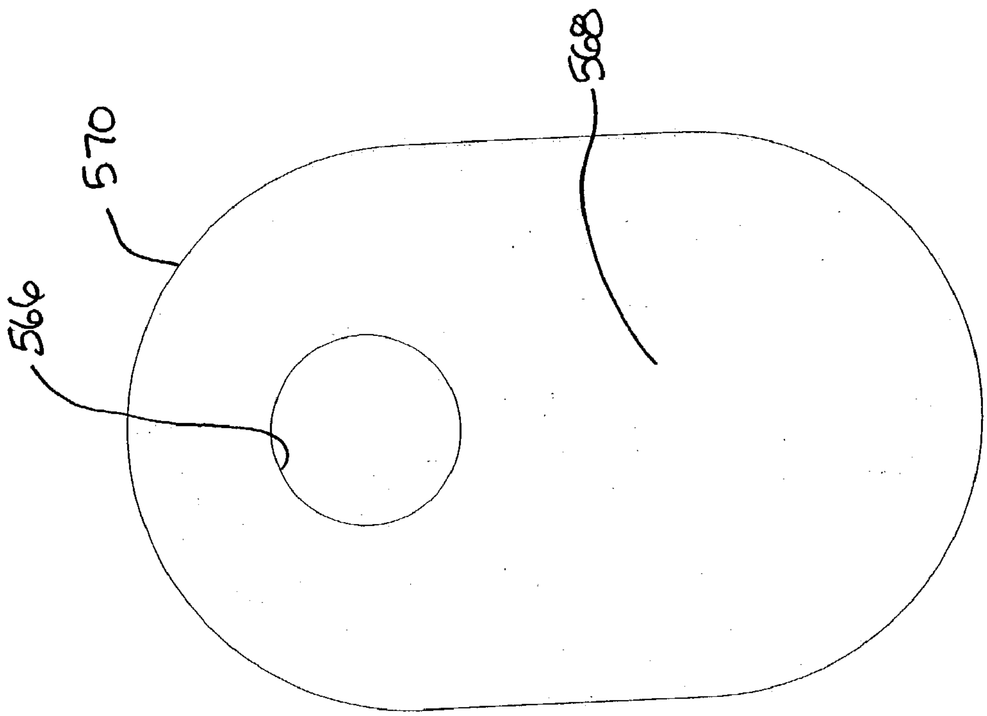
FIG. 70 shows a left end elevational view of that which is shown in FIG. 69.
Figure 71:
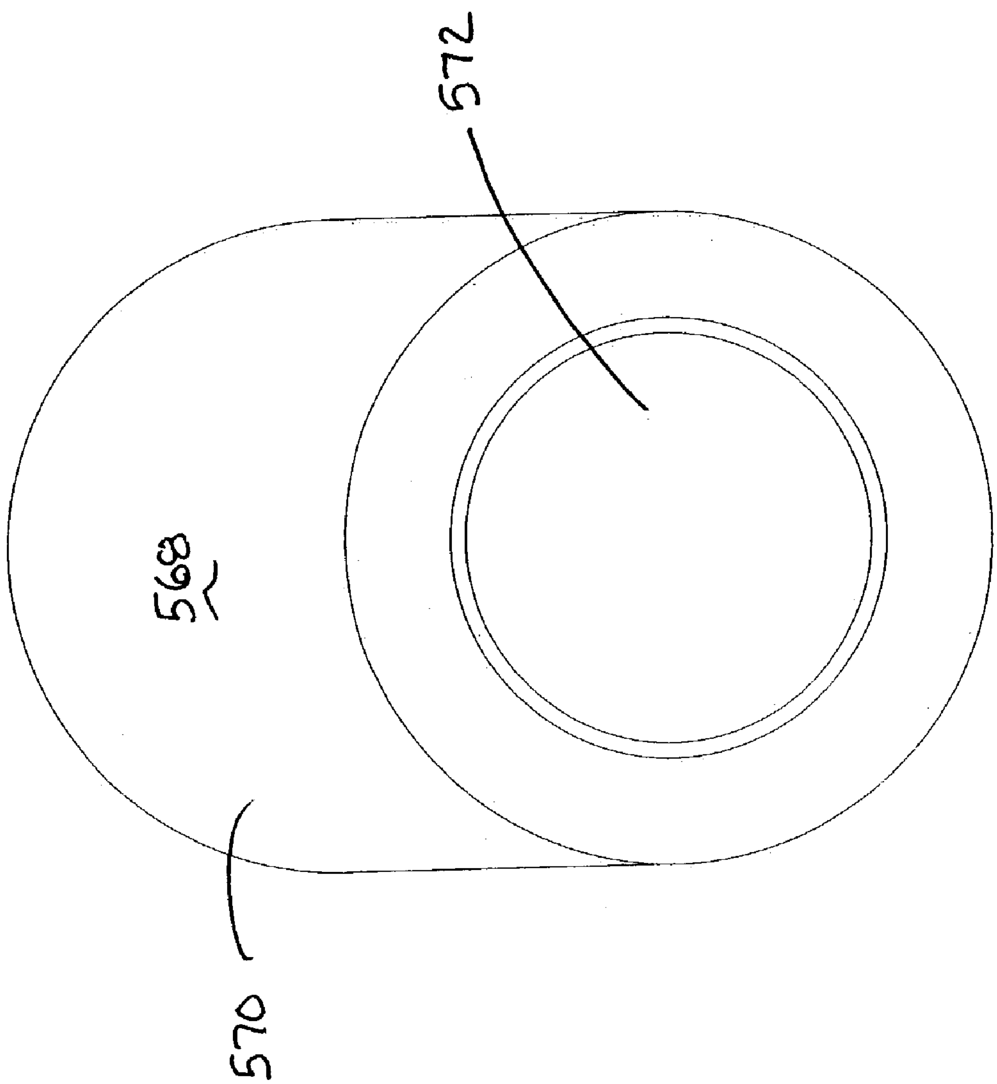
FIG. 71 shows a right end elevational view of that which is shown in FIG. 69.

Dispenser housing cap 533, illustrated in FIGS. 59, 60 and 66B is secured to the top front of support structure 194 and is shown as having a common axial outline with support structure 194 (such that all potentially film contact surfaces of dispenser 192 are made with a non-interrupted smooth surface). FIG. 66B illustrates housing cap 533 having a large crank clearance recess 542 and a bearing recess 544 sized for receipt of a first of two bearings such as the illustrated first (forwardmost) needle bearing 546 shown in FIGS. 59 and 62. Housing cap 533 is secured in position on the forward top face of main crank support housing component 532 by suitable fasteners (not shown). Bearing recess 544 is axially aligned with inner bearing recess 548 provided on the forward face of housing component 532 (FIG. 66A). Inner bearing device 550 (FIG. 59) represents the second of the two bearings within cap 533 and is received in inner bearing recess 548. Crank assembly 526 has opposite ends rotatably received within respective inner and outer bearings 545, 550 and is preferably formed of two interconnected components with a first crank assembly component 552 being shown in FIGS. 67 and 68 with key slot shaft extension 553 designed to extend past the innermost surface of main housing component 532 and into driving connection with the forward flexible coupling connector 554.

For added stability and positioning assurance, rear end 534 of housing component 532 further includes annular projection 556 (see FIG. 61), that is dimensioned for friction fit connection with circular recess 558 (FIG. 72) formed in support housing structure 194. First crank assembly component 552 further includes bearing extension 560 sized for bearing engagement with inner bearing 550 and is positioned between slotted shaft extension 553 and inner crank extension 562. Inner crank extension is elliptical is shape and has bearing extension 560 having a central axis aligned with a first end (foci) of the ellipsoidal inner crank extension and crank pin 564 extending forward (to an opposite side as extension 560) from the opposite end (foci) of inner crank extension 562. Crank pin 564 has a reduced diameter free end which is dimiensioned for reception in pin reception hole 566 formed in outer crank extension 568 of second crank component 570 having a peripheral elliptical or elongated shape conforming to that of the first crank component. At the opposite end of the elliptical extension 568, and aligned with the central axis of first or inner bearing extension 560, is provided outer or second bearing extension 572. Second bearing extension 572 is dimensioned for reception in outer bearing 546.

Figure 62:
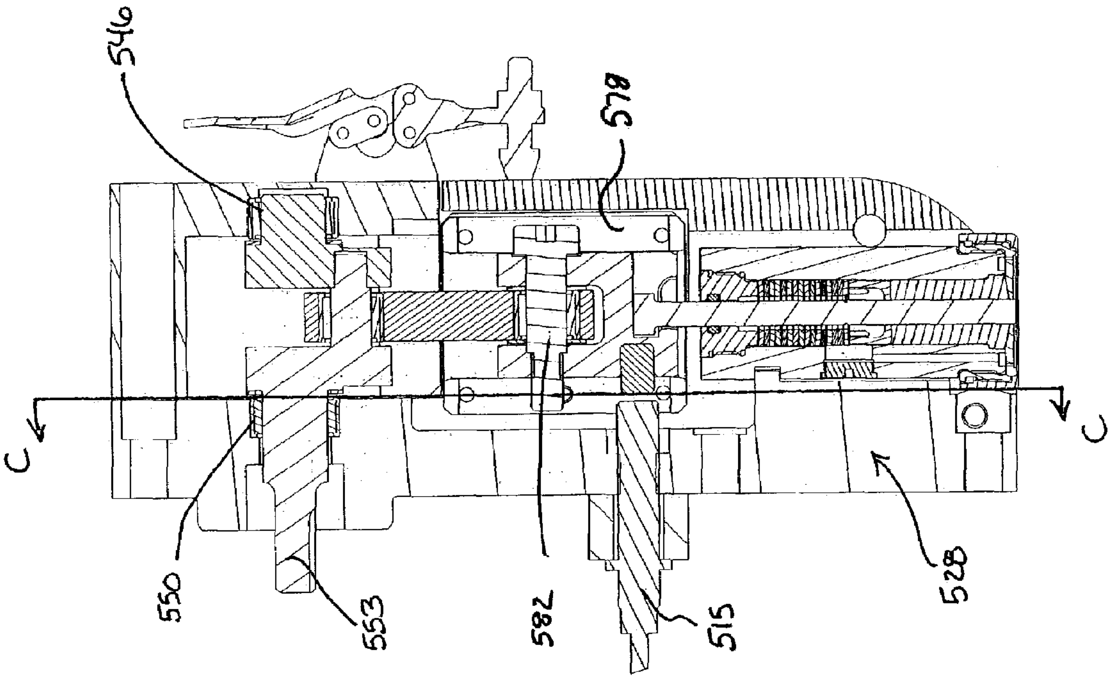
FIG. 62 shows a cross-sectional view taken along A-A in FIG. 61.
Figure 63:
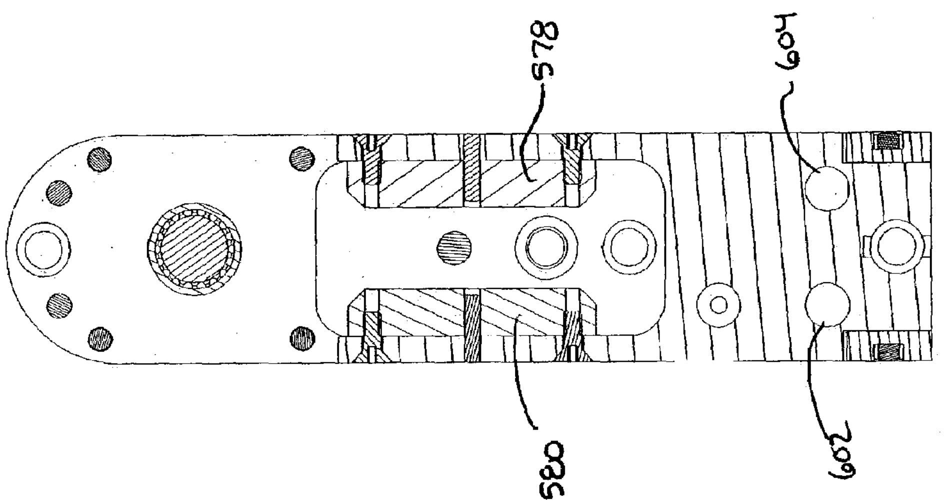
FIG. 63 shows a cross-sectional view taken along cross-section line C-C in FIG. 62.
Figure 74:
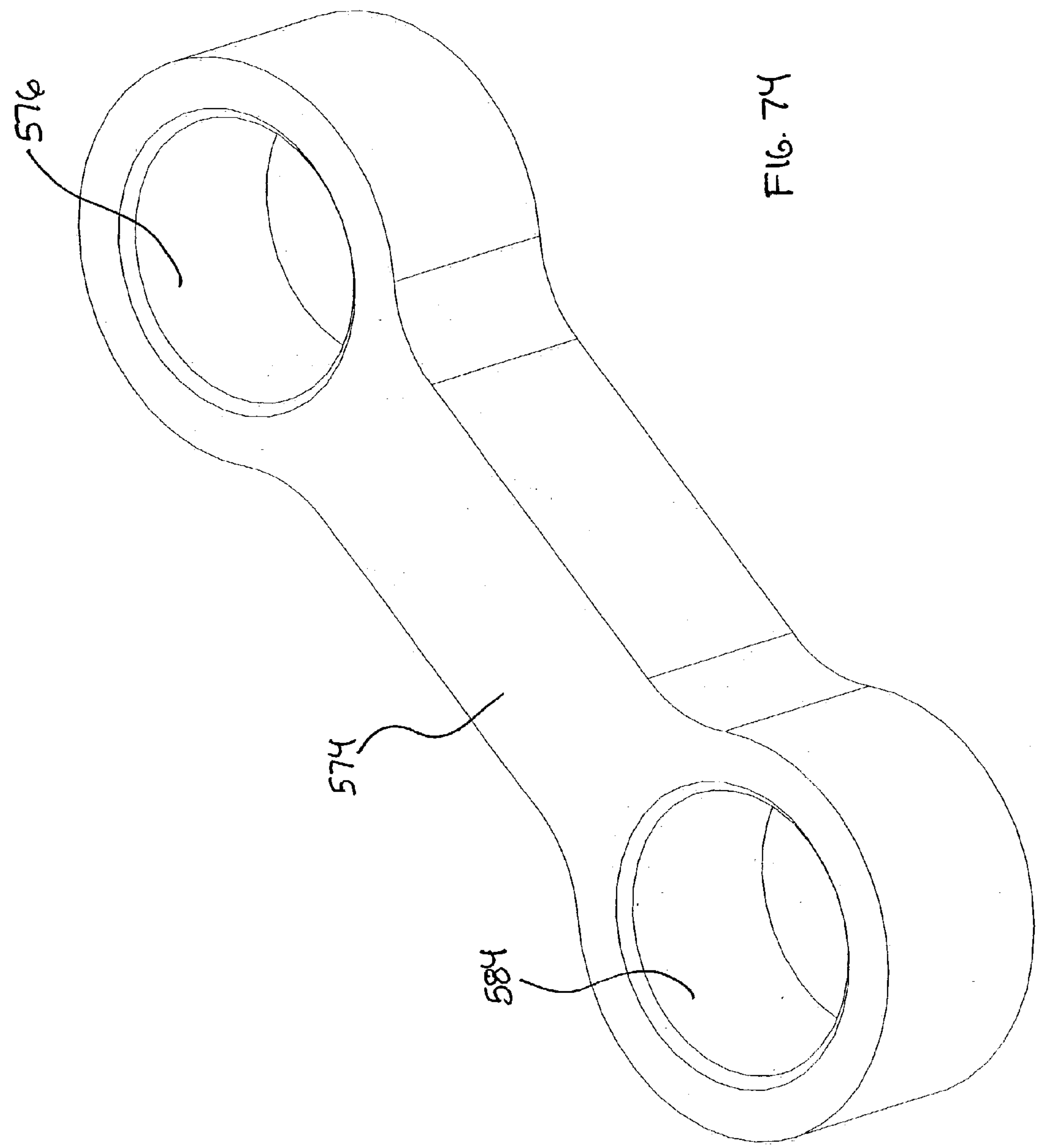
FIG. 74 illustrates the connecting rod used in the dispenser drive mechanism.

FIG. 74 illustrates connecting rod 574 having first looped connecting end 576 designed for driving connection with respect to crank pin 564. This upper connection is shown in cross-section in FIG. 59 and in perspective in FIG. 64. FIG. 64 shows connecting rod 574 extending down between a parallel set of guide shoes 578, 580 (both shown in cross-section in FIG. 63) and into engagement with hinge pin 582 as shown in FIGS. 59 and 62 (where one of the two sliding plates is removed in cross-section). Hinge pin 582 is received within second looped connecting end 584 of connecting rod 574 and is secured at its opposite ends to slider mechanism 586 which functions in piston like fashion as it slides between and in contact with guide shoes 578, 580. Thus, connecting rod 574 functions as means to connect the crank assembly to the slider mechanism which provides for a translation of the rotation of the main drive shaft 520 into linear motion of the slider within the two guide shoes.

Figure 75:
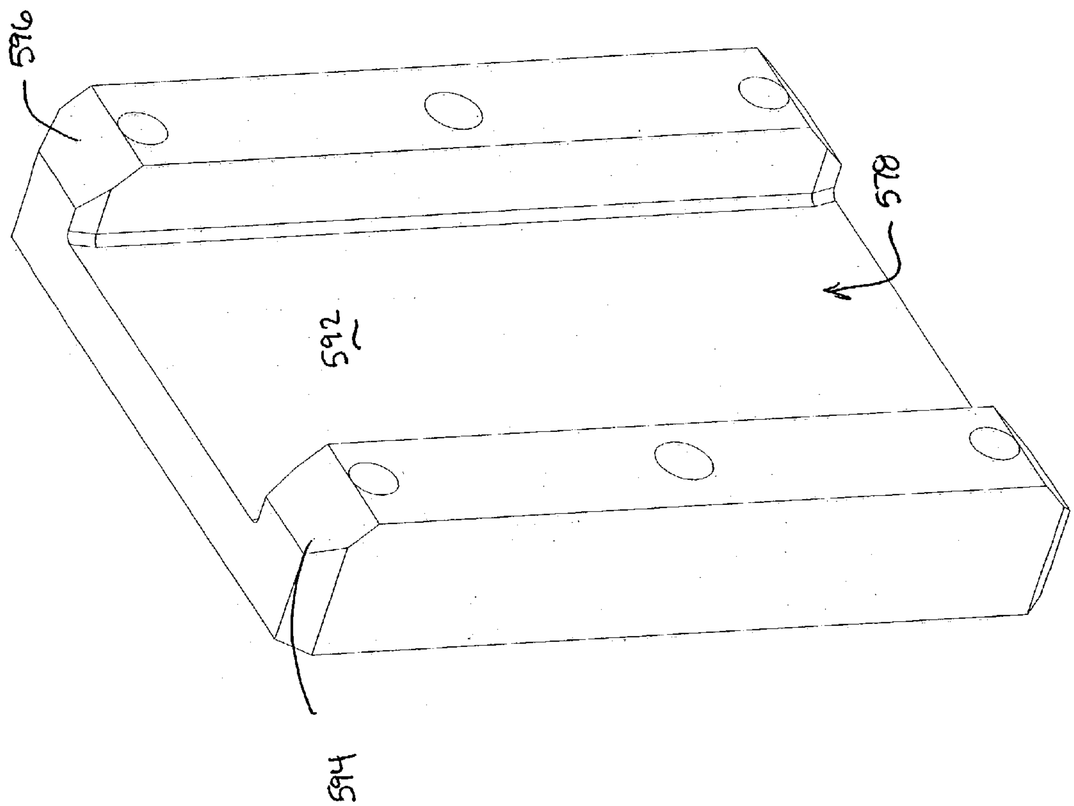
FIG. 75 shows one of the guide shoes used in the dispenser drive mechanism.

FIG. 75 illustrates one of the two guide shoes 578 with the opposite one being the same but for its fixation position to an opposite one of the two main housing component's shoe support brackets 588 and 590 shown in FIG. 66A. As seen from FIGS. 59 and 60, shoe support brackets 588 and 590 support corresponding shoes 578 and 580 in mirror image fashion with the back wall 592 of each flush against an interior surface of a corresponding bracket and with flange rims 594 and 596 extending out toward each other to define a peripherally closed sliding area. Fastener holes are formed in each bracket and in the flange rims for fastening the shoe assembly together (e.g., four larger corner bolts with two smaller intermediate bolts holes aligned in each as depicted in FIGS. 60 and 66). Thus, the guide shoes provide means for guiding piston 586 (FIG. 76) as it slides linearly in response to the forces transmitted from connecting rod 574. A preferred material for the guide shoes is "TORLON" material of DuPont, because it has high load bearing properties coupled with low sliding friction, although other materials can be relied upon to provide a sliding piston guiding function under crank and connecting rod loads.

Figure 76:
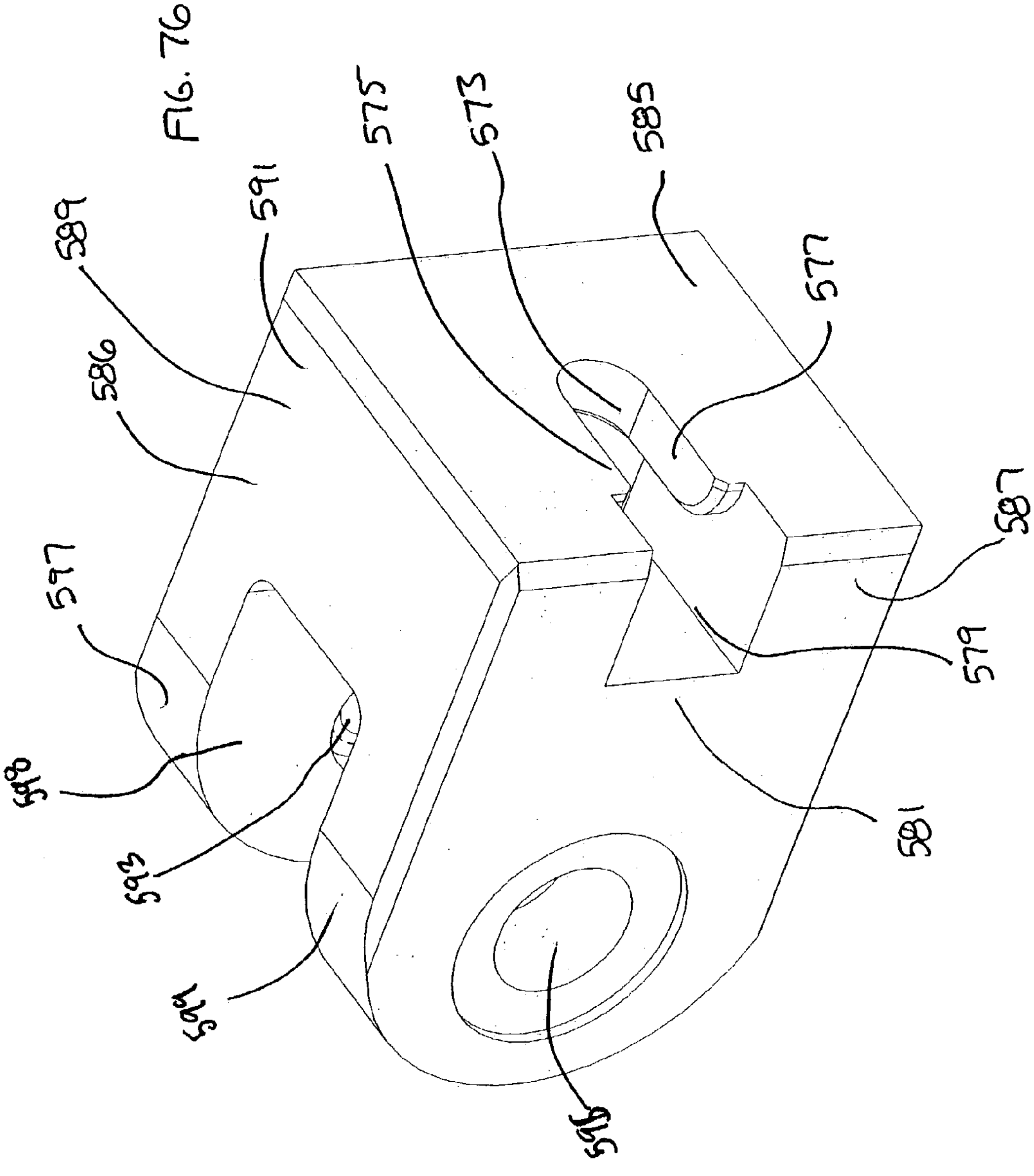
FIG. 76 shows the piston or slider that is utilized in the dispenser drive mechanism.

FIG. 76 illustrates slider mechanism 586 having upper trunnion end 598 with forward trunnion extension 599 and rearward trunnion extension 597. In trunnion extensions 597 and 599 there is formed pin reception holes 595 and 593 for receipt of respective ends of hinge pin 582 (e.g., a threaded engagement although threading not shown). As seen from FIG. 76, trunnion end 598 has smooth side walls at the base of extensions 597 and 599 which extend into smoothly contoured semi-circular upper trunnion extension portions. Slider mechanism further includes rod capture base 591 having smooth shoe contact side walls 589 and 587 as well as base bottom 585 within which is formed rod capture recess 583 which has an enlarged rod end insert opening that opens out at front face 581 and an elongated base slot 573 that narrows in opening width in its rear portion due to the extension of two opposing rod capture ribs 577 and 575. At its rear end, slot 573 has a curvature matching the curvature of the enlarged rod head 330 of rod 264 and capture recess extends rearward past the rear end of slot 573 so as to provide a capture reception region relative to the enlarged head of rod 330 shown in FIG. 25, for example. Accordingly the connecting rod 574 converts the rotational motion of crank arm or connecting rod 574 into linear motion in the slider mechanism 586 which in turn, based on its releasable capture connection with the enlarged end 330 of rod 264, reciprocates rod 264 within the mixing chamber to purge and/or perform a valve function relative to the chemical mixing chamber feed ports.

The mixing module drive means of the present invention, which derives its power from motor 200 and achieves rod reciprocation, is highly effective in the environment of a mixing module dispenser in that it coordinates its cycle of high force push and pull levels with the ends of travel of slider mechanism 586 which corresponds with the reciprocation end points of the rod 264 between a forward purge extension to a rearward (upward in the illustrated FIG. 64) valve open retracted position. The calculated pulling or pushing force is over 1000 lbf at these two. positions. This higher pushing/pulling force will not necessarily be applied to the mixing module as it is only applied when needed (e.g., the drive mechanism will only apply enough force to move whatever is attached to it). If the item does not want to move (e.g., stuck), the drive mechanism can generate its maximum force level attributable to the system at that point to break any resistance to movement. This feature is well suited for the mixing module's characteristics as the high force is available at the start of the opening stroke, exactly where it is needed, because this is the location where prior art mixing modules have a tendency to bind up if they are left idle for even a few minutes. For example, if urethane is building up on the inside diameter of the mixing chamber, it will bond the valving rod to the chamber. The drive mechanism of the present invention can effectuate rod reciprocation even if there is a lot of urethane buildup, unlike the prior art wherein an increase in "stick" from urethane build up which often occurs at the end of idle periods and/or when the solvent runs out or gets contaminated. In the prior art systems the binding forces can be high enough to stall, for example, the drive mechanism of the prior art mechanisms leading to a shut down signal and/or breakage of a rod or some other component.

The placement of the motor 200 external or out away from the film edging and bag forming area allows for a much more robust motor than utilized in the prior art (e.g., a weight difference of, for example, 7 pounds (for drive motor, gearbox and controller) relative to for example 12 ounces for a typical prior art systems motor, gearbox and controller positioned inside or between the film edges). A conventional motor drive system sized for insertion between the bag film edges (e.g., a ball screw motor drive system) has about 200 pounds when operating at optimum performance levels which was not often the case. This difference provides in the present invention, for example, a torque of at least 5 to 10 times greater than the noted prior art motor and the capability to run at peak torque for the full life of the motor. The preferred motor type for the mixing module driver of the present invention is a brushless DC motor (for example, a Bodine Brushless Torque motor with RAM of 100 to 2000 RPM. The built in encoder of the present invention's brushless motor provides for accurate dispenser use and avoidance of cold shots in that a preferred embodiment of the invention features a built in encoder that generates a position feedback signal to the control means (i.e., a closed loop system unlike the prior art open loop system). Thus unlike the prior art systems that run open loop and have no way of knowing the positioning of the mixing module rod relative to the axial length of the mixing module passageway and direction of travel therein, the present invention's closed loop arrangement allows the controller to monitor at all times the status of the drive system and hence whether the mixing module is in an opening or closing cycle. This information is valuable in monitoring the drive performance and the early flagging of potential problems (e.g., build up of hardened foam in the mixing chamber) before the potential problems build up to a level causing major problems. FIGS. 59 and 62 further illustrate drive mechanism home position sensor 515 that identifies the starting position of the drive mechanism so as to provide added feedback for performance monitoring of the mechanism including operation of the encoder itself. If there is sensed a position problem by the home sensor (e.g., a broken crank) a stop signal is generated to prevent additional system damage (similar functions can be provided by the moving jaw home sensor 4036 as well as the cleaning brush reciprocation system home sensor 3056 discussed below). FIGS. 186 and 190 illustrate the control system and with FIG. 190 showing the mixing module home sensor in conjunction with the chemical dispensing and tip cleaning control and monitoring sub-system.

As described in the background section the outlet tip region of a dispensing mixing module is a particularly problematic area with regard to foam buildup and disruption of the desired foam output characteristics. Once the output nozzle is sufficiently blocked, the foam stream is deflected from its normal path and can easily be deflected 90° if left unattended having negative consequences in the build up of essentially non-removable foam in other areas of the dispensing system. It is believed that left unattended such a build up can happen in as little as 20 shots. The aforementioned features of the present invention's tip management means including providing a solvent supply system to the front end of the mixing module with a high pressure solvent pump, flow through or flushing/continuous replenishment solvent chamber, heated solvent and directed tip region flow of solvent through the face of the mixing module and around the valving rod is highly effective in precluding build up. However, even with the advantages or arrangement described above, foam can accumulate at the tip of the dispenser in a softened state during solvent flow supply with the potential to harden during periods where the system is shut down and during times in which solvent flow may not be provided. The present inventions tip management means thus preferably includes an auxiliary cleaning component which is directed at physical removal of any chemical build up in the tip region or outlet port region of the mixing module such as in a wiping or brushing fashion. In a preferred embodiment there is provided a brush or a alternate physical chemical build up removal means preferably connected with means for reciprocating or moving that cleaning member (e.g., brush) between cleaning contact and non-contact states relative to the nozzle tip.

FIGS. 55, 55A, 59, 64 and 179-184 illustrate various features of a preferred embodiment of physical nozzle tip cleaning means 3000.

FIG. 55 shows physical nozzle tip cleaning means 3000 (which preferably works in conjunction with the solvent or chemical cleaning means as part of an overall tip management system) with its cover removed while FIG. 55A shows cover 3001 (multi or single unit casing) includes at the bottom region of the dispenser 192. As shown in FIG. 64 nozzle tip cleaning means 3000 comprises a physical contact with tip cleaning member 3002 preferably formed of a brush having brush base 3004 with a plurality of bristles (e.g., plastic; but more preferably steel). The bristles are arranged and of a height to come in contact with the nozzle outlet tip most proven to foam build up with the amount of contact being preset (or adjusted with height adjustment means as in wedge adjustments (not shown) to have the bristles deflect to some extent to achieve improved wiping, while avoiding an over contact or unnecessary degree of contact with the nozzle end. This relative spacing can be seen from FIG. 59 unit, for example, an overlap similar to the thickness of the outer and inner front cap components combined. FIG. 59 illustrate linear slide base 3008 which is secured to the underside of main dispenser having 194 by fasteners 3010. Slide base 3008 is preferably formed of TORLON 4301 of DuPont, a high performance plastic used in harsh bearing applications and includes V-Shaped grooves extending along its elongated body. FIG. 59 also illustrates line or slide yoke or brush drive transmission connection means 3012 having an extended forward end 3014 which lies flush on a central axial elongation area of brush base 3002. Forward end 3014 is fastened to brush base 3002 with fastener 3010. Yoke 3012 includes a hook section 3020 with a notch which receives flange extension 3022 of the brush base. As its opposite end, yoke 3012 includes U-Shaped connector 3023 with vertically spaced legs having a central aperture in each. One end connecting rod 3024 is received between the legs and held in place by threaded pin 3026 which pivotably receives rod 3024. First and second linear slide rails 3028 and 3030 are secured the respective sides of yoke 3012 and include projections that ride within the elonged recesses of linear slide base 3008 (or vice versa). Connecting rod 3024 is secured to crank 3032 by way of its pivot extension 3034 extending into the aperture in the looped yoke end 3031. Crank 3036 is secured to the bottom end of shaft 3038 which extends through a corresponding series of vertically aligned holes in dispenser housing 194 with suitable bearing mounting into one way clutch 3042 which joins crank 3032 for rotation in one direction of shaft rotation 3038 and freewheels when a shaft 3038 rotates in the opposite direction. At the top end of shaft 3038 there is connected bevel gear 3040 which is connected to the previously described bevel gear 512.

Thus, when motor 508 rotates in a first direction (e.g., clockwise) it reciprocates the mixing module rod (e.g., opens and closes the chemical ports to the mixing chamber while purging the same) and when it runs in the opposite direction it drives the cleaning component (e.g., brush). Motor 508 turns main drive shaft 520, which turns smaller drive shaft 3038, arranged perpendicular thereto, through the bevel gear connection. One way clutch 3042 at the lower end of drive shaft 3038 only transmits rotation when turning in a predetermined direction. If the shaft 3038 is rotating in the opposite direction, shaft 3038 will free ride in clutch 3042 and not activately reciprocate the cleaning brush (at which time main shaft 520 is activately transmitting reciprocating force to the rod) when the shaft 3038 is rotated in the opposite direction (at which time main shaft 520 is not rotated due to the one way clutch 516 being in a freewheel state relative thereto) shaft 3038 is rotating in a direction which turns crank 3036 driving connecting rod 3024 which translates the rotary motion of the shaft 3038 to liner motion in the brush slide assembly. Brush 3002 is preferably mounted to an aluminum yoke, attached to the TORLON slider centered between the two side bearings 3028, 3030, which support the yoke assembly as it moves back and forth. The brush base is preferably machined of a polypropylene plastic, with the bristles being arranged of a sufficient width to sufficiently clean the nozzle and is arranged in a grid pattern or spiral pattern. The brush can easily be replaced when warn by removal of the fastener. The number of reciprocating strokes is determined by the controller which instructs motor 508 as to which direction to turn as shown by the control arrangement shown in FIG. 190. In a preferred embodiment, the brush is reciprocated a multiple number of times sufficient to clean all build up subjected to solvent application, again based on controller input (automatic or operator set). That is, the number of brush reciprocation's (time motor running in certain direction) and the period between cycles (time between off states or switching from one direction to another direction) is based on the needs of the system (e.g., solvent type, chemical type, length of inactivity etc.). For example, an extra cleaning cycle both with regard to solvent application and brushing is preferably performed when the system has an extended multi-hour period of shut down such as during a nighttime shut down or other long idler periods (servicing). Preferably this cleaning cycle is performed with the solvent above (e.g., 150 to 160° F.) its normal (e.g., 130° F.) heated temperature (a controller interface relationship between reciprocating brush control and solvent pump supply and manifold heaters (see FIG. 194)). The higher temperature increases the solvation power of the dispenser cleaning solution and extended brushing period will help remove any preexisting build up from the last dispenser run period.

FIG. 64 illustrates some additional features of the physical nozzle tip cleaning means. As shown, the upper, relatively flat side of crank 3032 features groove 3050 of semi-circular cross-section that concentrically encircles the center hole of the crank. Spring loaded plunger 3052 is mounded (e.g., on housing 194) so its retractable tip rides in the groove. Plunger 3052 allows the crank to rotate freely in the brush operating direction because of the nature of the groove design with its ramp up arrangement with wall drop off 3054 which does not preclude crank rotation in the noted direction, but will lock up the crank (relative to a free ride state) if the crank moves in the opposite direction. This feature avoids the possibility of the brush being accidentally moved when the valving rod is the one being moved by the motor such as if there is a minor degree of friction drag in the slip clutch or the brush is in some way accidentally hit in a direction that would force it forward, during potential dispensing of foam, although the cover essentially protects against such an event.

FIG. 64 further illustrates proximity sensor 3056 for home position determination. Thus, in conjunction with the encoder of motor 508, the actual position of brush 3006 relative to its reciprocation travel can be monitored at all times in similar fashion to the location of the reciprocating rod with the proximity sensor 515 (e.g., position monitoring means) ensuring proper operation of the encoder based position monitoring system. Either of these sensors can be moved up or downstream relative to the respective transmission lines in which they exist.

With reference to FIGS. 58-63, 72 and 73, there is illustrated the chemical feed housing conduit system 600 passing from the inlet section 198 of dispenser apparatus 192 (via manifold 205) to dispenesr housing 194. Chemical outlets (see FIGS. 58 and 72) 602 and 604 corresponding with those in the chemical front end dispenser housing component 528 feeding into the mixing module housing 302. Chemical conduits 602 and 604 are preferably formed in conjunction with an extrusion process used in forming the basic structure of main housing 194 (e.g., main housing section 195). As further shown in FIG. 58 positioned above conduits 602 and 604 there is a second set of conduits with conduit 606 providing a solvent flow through passageway in main housing 194 and with the adjacent conduit 608 providing a cavity for reception of a heater cartridge 610 (or H2) (e.g., an elongated cylindrical resistance heater element) that is inserted into conduit 608 and has its electrical feed wires (not shown) feeding out the inlet end 198 side to the associated power source and control and monitor systems of the control means of the present invention as shown in FIG. 194. Heater cartridge 610 features a heat control sub-component system which interfaces with the control means of the present invention as illustrated in FIG. 194 and, is preferably positioned immediately adjacent (e.g., within an inch or two or three of the two chemical conduits 602 and 604) and runs parallel to the chemical passage to provide a high efficiency heat exchange relationship relative to the main housing preferably formed of extruded aluminum. The heat control sub-system of the present invention preferably is designed to adjust (e.g., automatically and/or by way of a temperature level setting means) the heater to correspond or generally correspond (as in averaging) with the temperature setting(s) set for the chemicals passing through the heater wires associated with the chemical feed lines 28' and 30' so as to maintain a consistent desired temperature level in the chemicals fed to the dispenser. Heater cartridge 610 is also within an inch or two of the solvent flow through passageway and thus is able to heat up the solvent flow being fed to the mixing module (e.g., a common 130° F. temperature). A temperature sensor is associated with the heater cartridge which allows for a controller monitoring of the heat output and the known heat transmissions effect on the chemical passing through the adjacent conduit through the intermediate known material (e.g., extruded aluminum).

Figure 57:
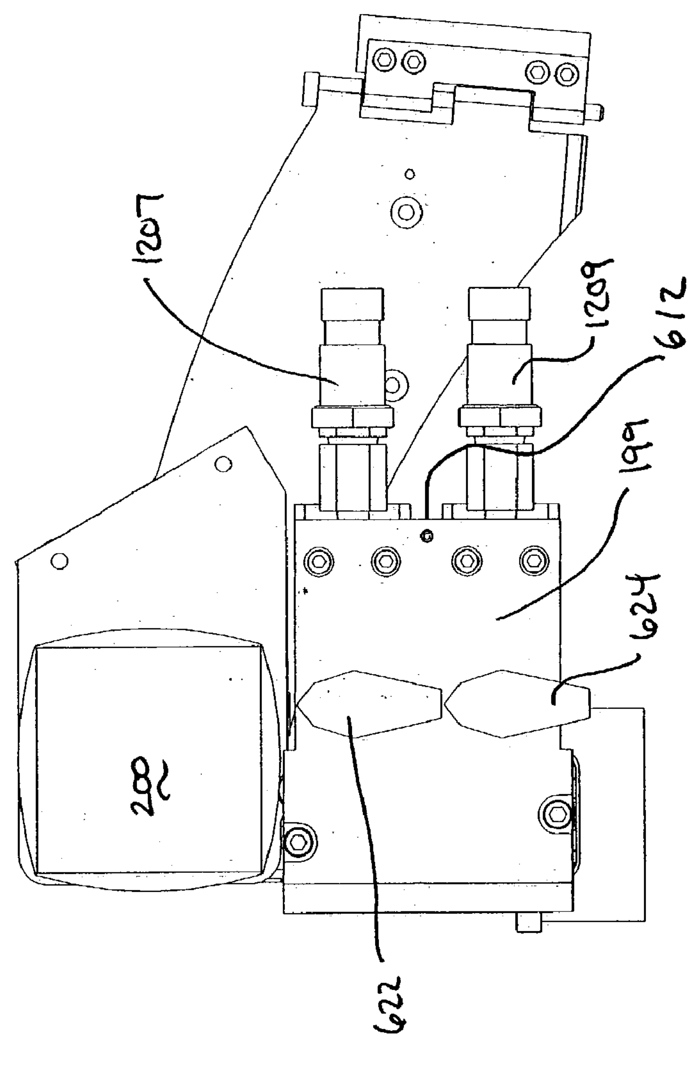
FIG. 57 shows a right end and view of that which is shown in FIG. 55 (with the brush cover added).

With reference to FIG. 57 there is illustrated inlet manifold 199 formed of block 205 with the manifold cavities including one to inlet manifold heater 612 which functions in similar fashion to heater 610 in heating the surrounding region and particularly the chemical flowing through manifold 199 to preferably maintain a consistent chemical temperature level in passing from the heater wire conduit exits to the mixing module. Heater 612 also includes a temperature monitoring and control means associated with the main control board of the present invention to monitor the temperature level in the manifold block and make appropriate heat level adjustments in the manifold block to achieve desired chemical output temperature(s), as shown in FIG. 194.

FIGS. 57 and 59 also illustrate manifold 199 as having A and B chemical passageways 614, 616 which feed into corresponding main housing A and B chemical conduits 602 and 604 also running adjacent the manifold heater 612 to maintain a desired temperature level in the chemical for all points of travel through the main manifold 199. The cross-section in FIG. 59 illustrates filter reception cavities 618, 620 within which are received filters 4206 and 4208 (FIG. 55) which are readily inserted (e.g., screwed or friction held) into place so as to receive a flow through of respective chemicals A and B. Chemicals A and B passing through manifold 199 are also subject to flow/no flow states by way of chemical shutoff valves 622 and 624 which feature readily hand graspable and turnable handles and are preferably color coded to correspond with the A and B chemicals. Pressure sensing means (e.g., transducers) 1207 and 1209 also sense the chemical pressure of the chemicals passing in manifold 199 and convey the information to the control board where a board processor determines whether the pressure levels are within desired parameters and, if not, sends out a signal for making proper system adjustments as in a reduction or increase in pump output. FIG. 195 shows the control system schematic for monitoring and adjusting chemical pressure in the dispensing system.

With reference to FIG. 2 there can be seen chemical hose extensions 28' and 30' for chemicals A and B extending into a bottom connection with manifold 199 (not shown if FIG. 2) via threaded plugs 626 and 628 and extend down though extendable support assembly 40 which houses the remaining portions of chemical A and B feed hose extensions extending between the manifold and cable and hose management system 630 shown in FIG. 103 which retains the coiled hoses and cable assembly 50. As further shown in FIG. 2, chemical hose extensions 28' and 30' have ends 43 and 45 extending down into connection with in-line pump assembly 32 having pumps 44 and 46. As explained below, chemical hoses are heated chemical hoses, again under control of the control system as illustrated in FIG. 193.

Figure 77:
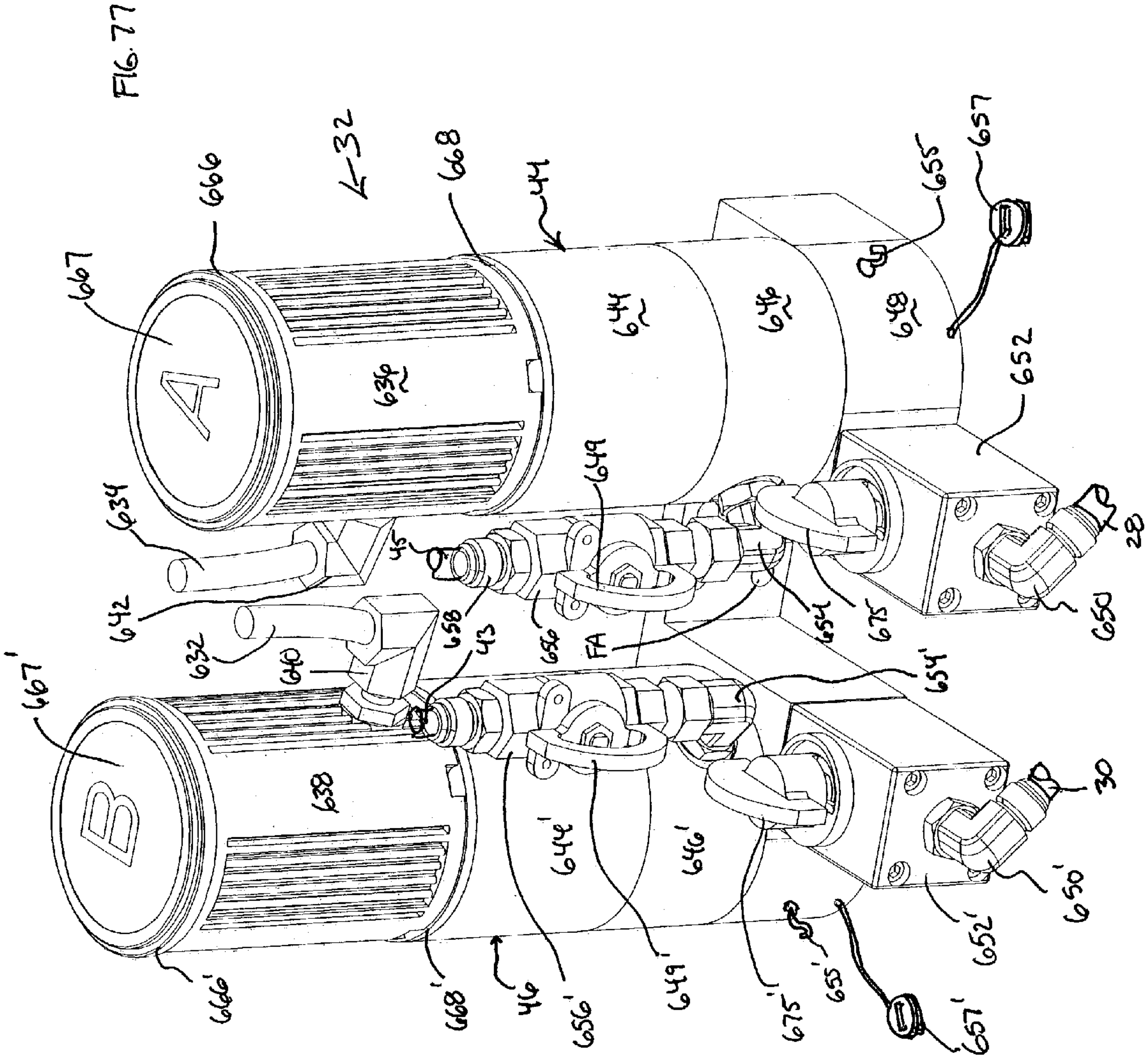
FIG. 77 shows the in-line pump assembly of the preferred embodiment of the present invention.
Figure 77A:
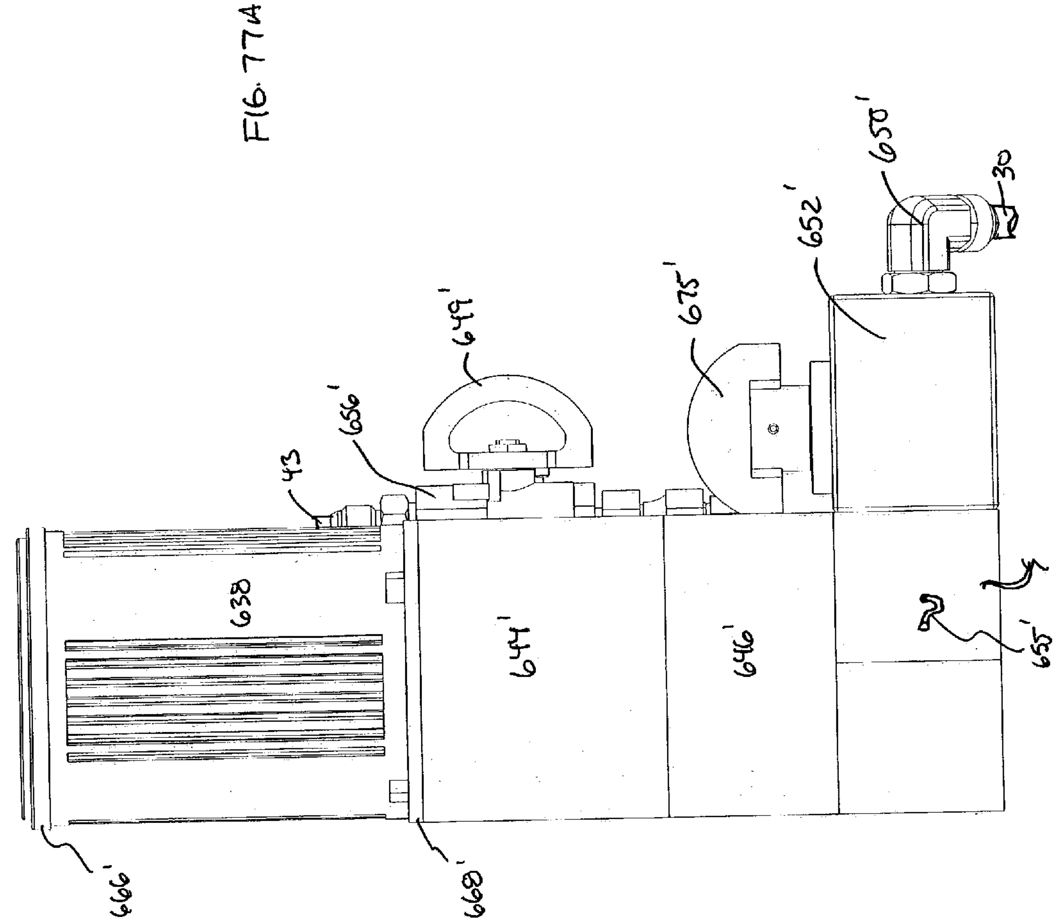
FIG. 77A shows a side elevational view of the in line plump assembly of the present invention.

FIG. 77 provides an enlarged perspective view of in-line pump system 32 shown in FIG. 2 as being mounted on base 42 and featuring in-line pump assembly 44 for chemical A and in-line pump assembly 46 for chemical B. As shown in FIG. 77, pump assemblies 44 and 46 have similar components but have offset extremity extensions that provide for a compact (space minimizing) arrangement for mounting on base 42. For example, pump motor electrical cables 632 and 634 feeding A chemical pump motor 636 and B chemical pump motor 638 (and preferably part of the cable and coil assembly), are arranged with relatively angled offset supports 640 and 642 attached to the respective motors circumferentially offset but by less than 15 degrees to provide for closer side-by-side pump assembly positioning. Chemical A pump assembly 44 further comprises pump coupling housing 644 which is sandwiched between pump 636 above and the below positioned chemical outlet manifold 646. Below outlet manifold 646 is positioned chemical inlet manifold 648. The downstream end of heated chemical conduit 28 is shown connected at angle connector 650 to inlet valve manifold 652 secured to the input section of chemical inlet manifold 648. Extending out of chemical outlet manifold 646 is another angle connector 654 extending into chemical outlet valve assembly 656 which is connected at its upper connector end 658 to chemical A hose extension 45 leading into hose and cable management system 630 (FIG. 103). The corresponding components in the chemical B pump assembly 46 are designated with common reference numbers with dashes added for differentiation purposes. Also, the following discussion focuses on the chemical A pump assembly 44 only in recognition of the preferred essentially common arrangement of each of the chemical A and B pump assemblies. FIG. 77A provides a side elevational view of the pump assembly 46 and thus a different view of the aforementioned pump assembly components.

Figure 78:
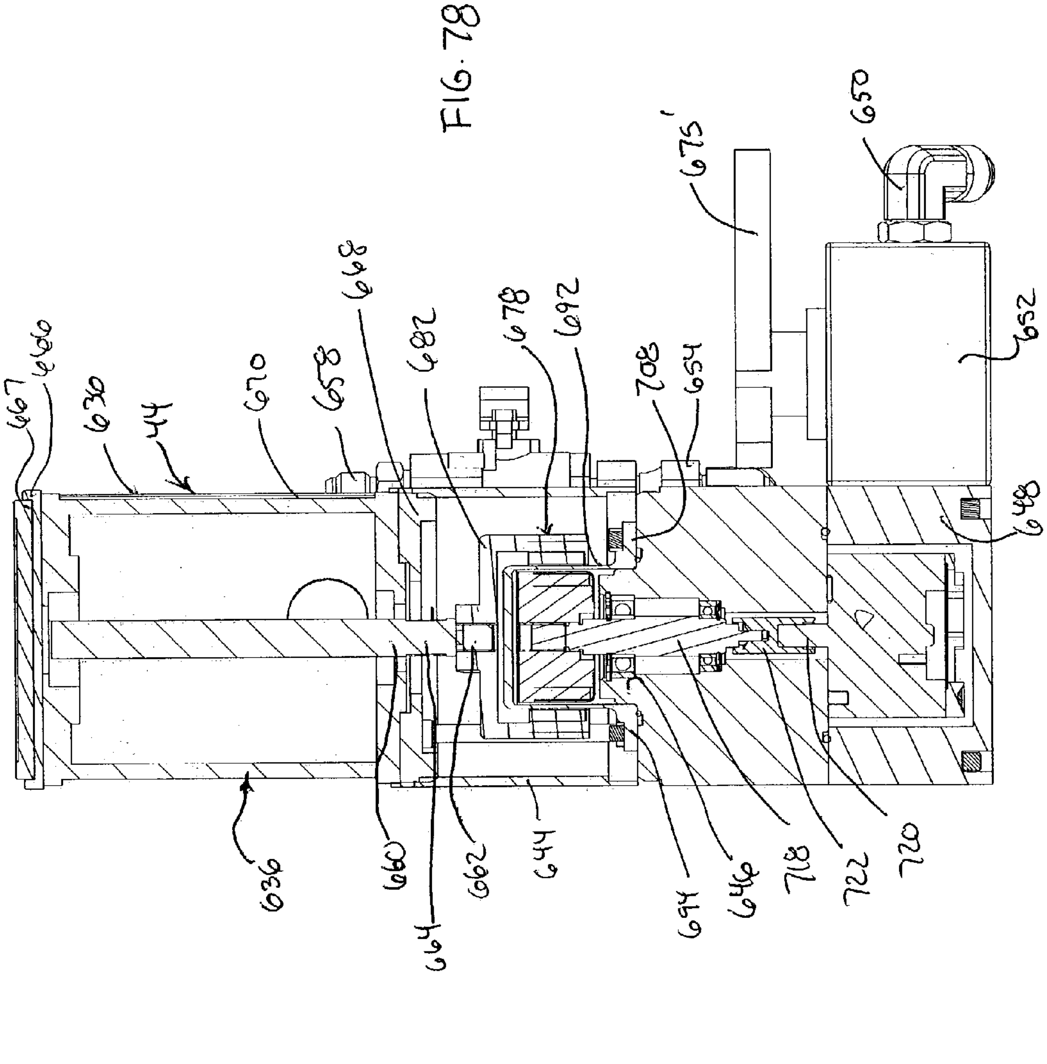
FIG. 78 shows a cross-sectional view of the in-line pump assembly.
Figure 79:
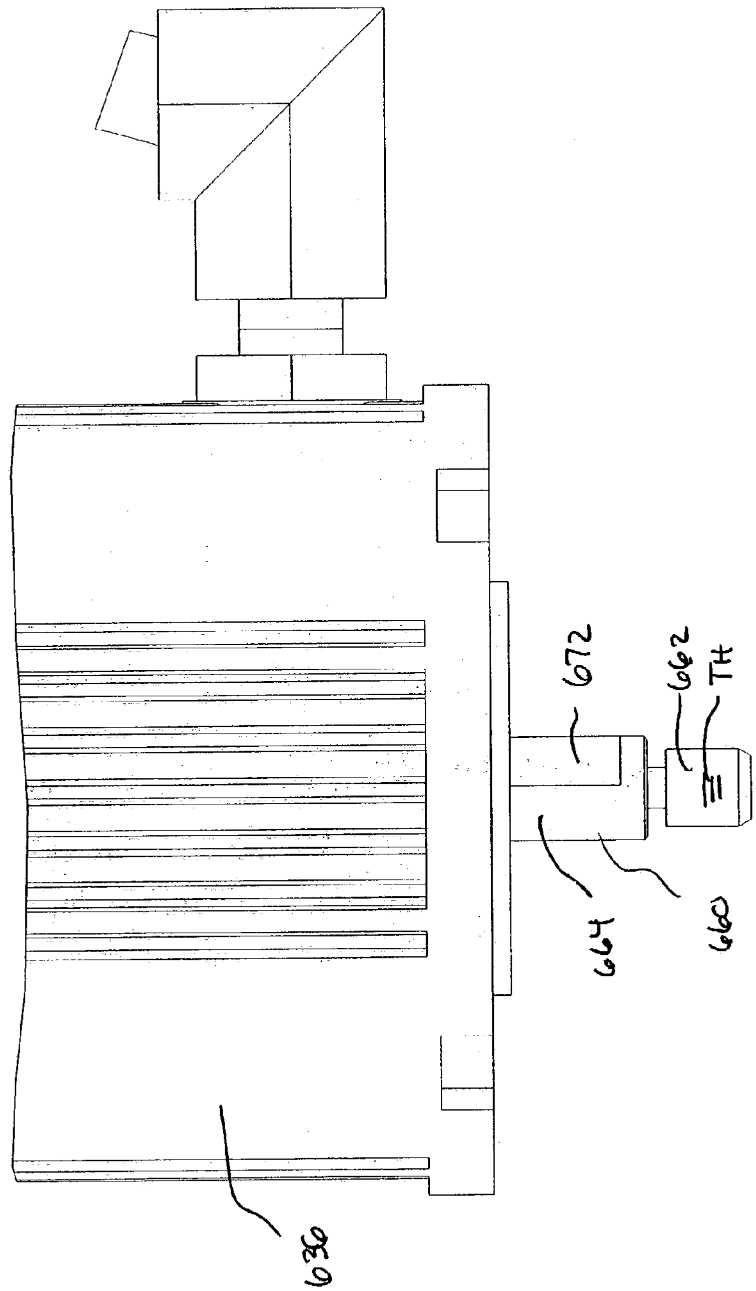
FIG. 79 shows a cut away bottom view of the pump motor and electrical feed.
Figure 80:
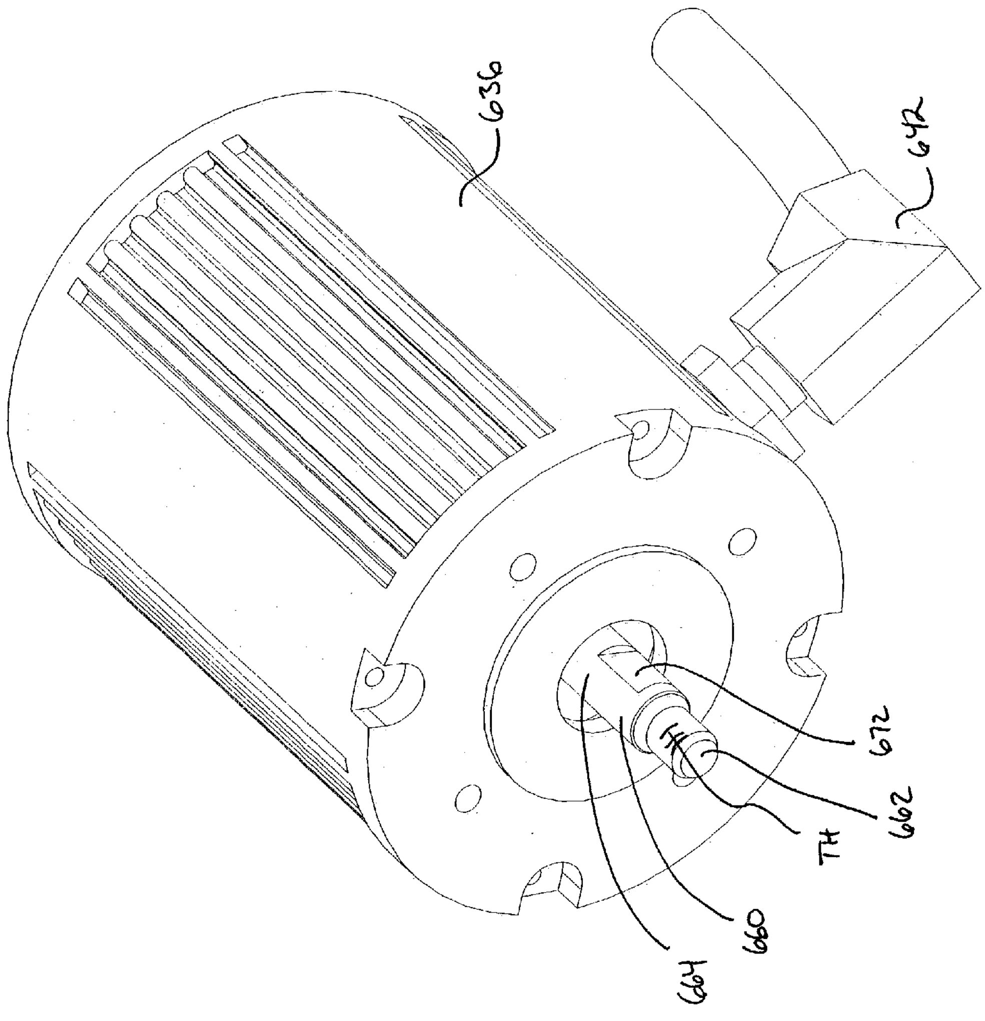
FIG. 80 shows a perspective view of the pump motor showing the threaded output shaft.
Figure 81:
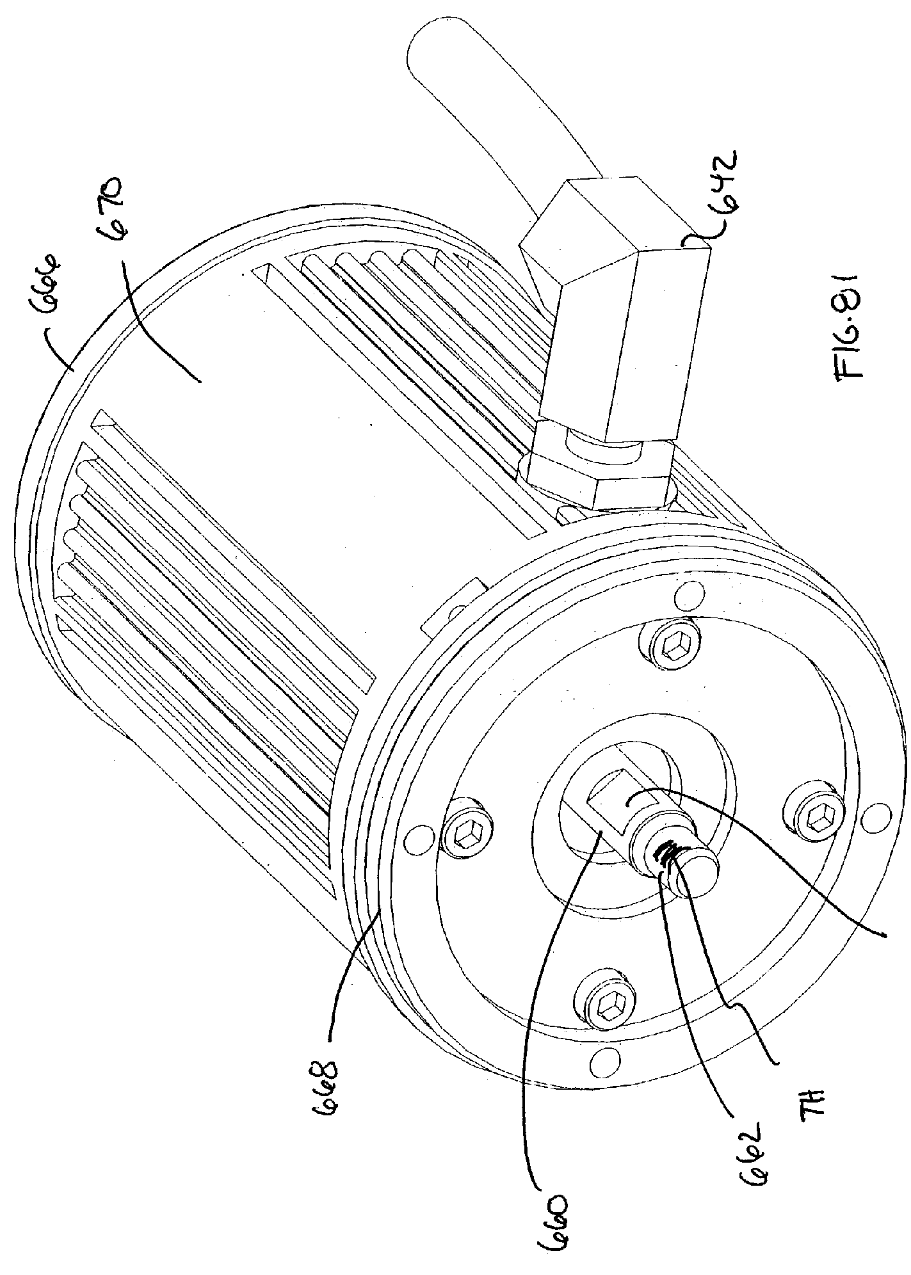
FIG. 81 shows a similar view to that of FIG. 80 with an added connector housing adapter plate.
Figure 82:
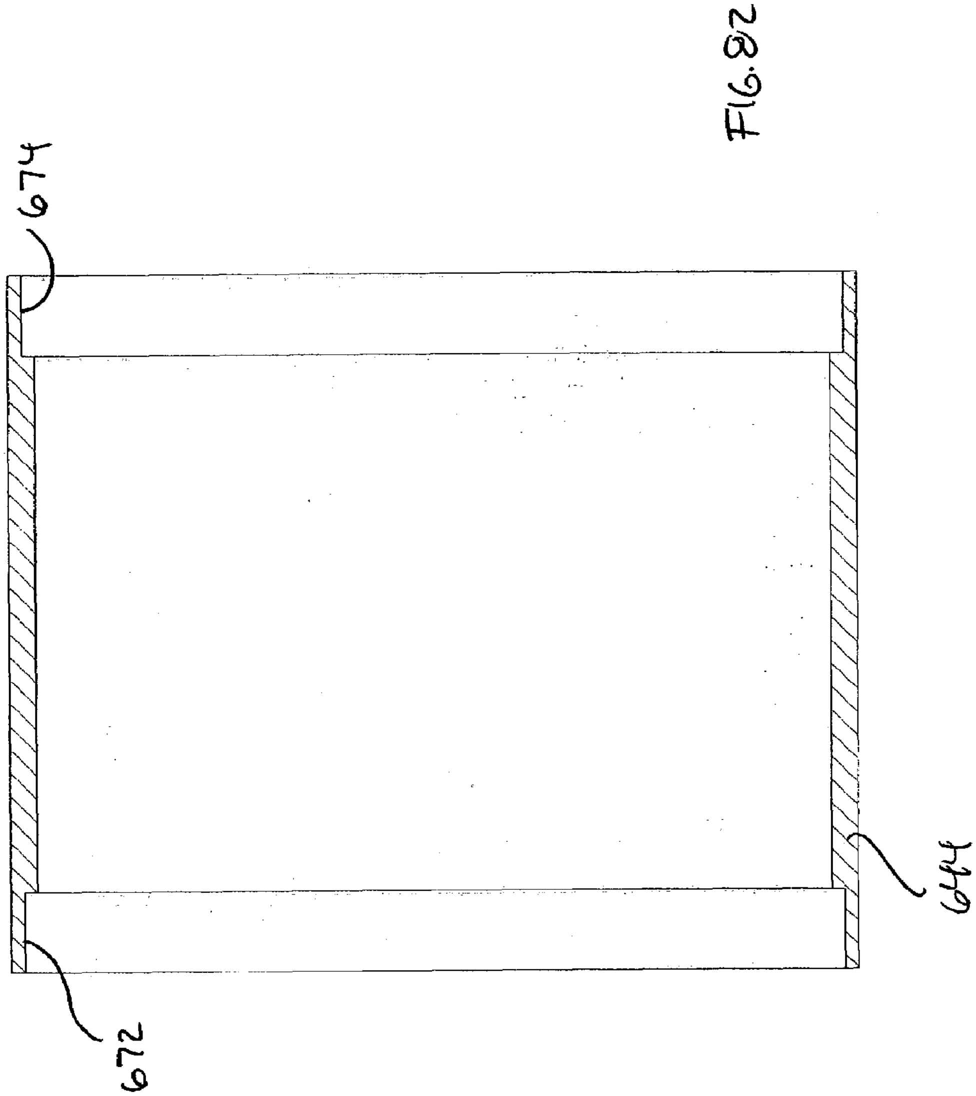
FIG. 82 shows a cross sectional view of the connector housing for connecting the pump motor and outlet manifold of the in-line pump assembly.

FIGS. 78-81 illustrate in greater detail the preferred embodiment for pump motor 636 for chemical A (same design for chemical B) with FIG. 78 showing the motor casing being free of an internal motor component for draftsperson's convenience. In a preferred embodiment a brushless DC motor with internal encoder mechanism is utilized. As shown in FIGS. 78 and 79, pump motor 636 features a threaded output shaft 660 having left handed threaded end 662 extending from main shaft section 664. FIG. 80 provides a full perspective view of pump motor 636 as well as the strain relief angle connector 642 for electrical cable connection. FIG. 81 shows a view similar to FIG. 80 but with added top and bottom adapter plates (666, 668) secured to the motor housing 670. The top adapter 666 provides a recess for receiving the color and letter coded (A in this instance) identifying plate 667 (FIG. 77) while bottom adaptor plate 668 functions as a positioning means with its reception ring properly centering shaft section 664 when the adapter plate 668 is received by coupling housing 644 shown in FIG. 82. FIGS. 80 and 81 also illustrate housing coupling 644 having a notched portion 672. Coupling housing 644 has upper and lower stepped shoulders 674 and 676 with upper shoulder 674 designed to frictionally retain the aforementioned adapter plate 668, while lower stepped shoulder is designed for frictional and/or fastener engagement with a corresponding notched lower end in chemical outlet manifold 646 (the threaded connection of the shaft maintaining to some extent the assembled pump assembly state).

Figure 83:
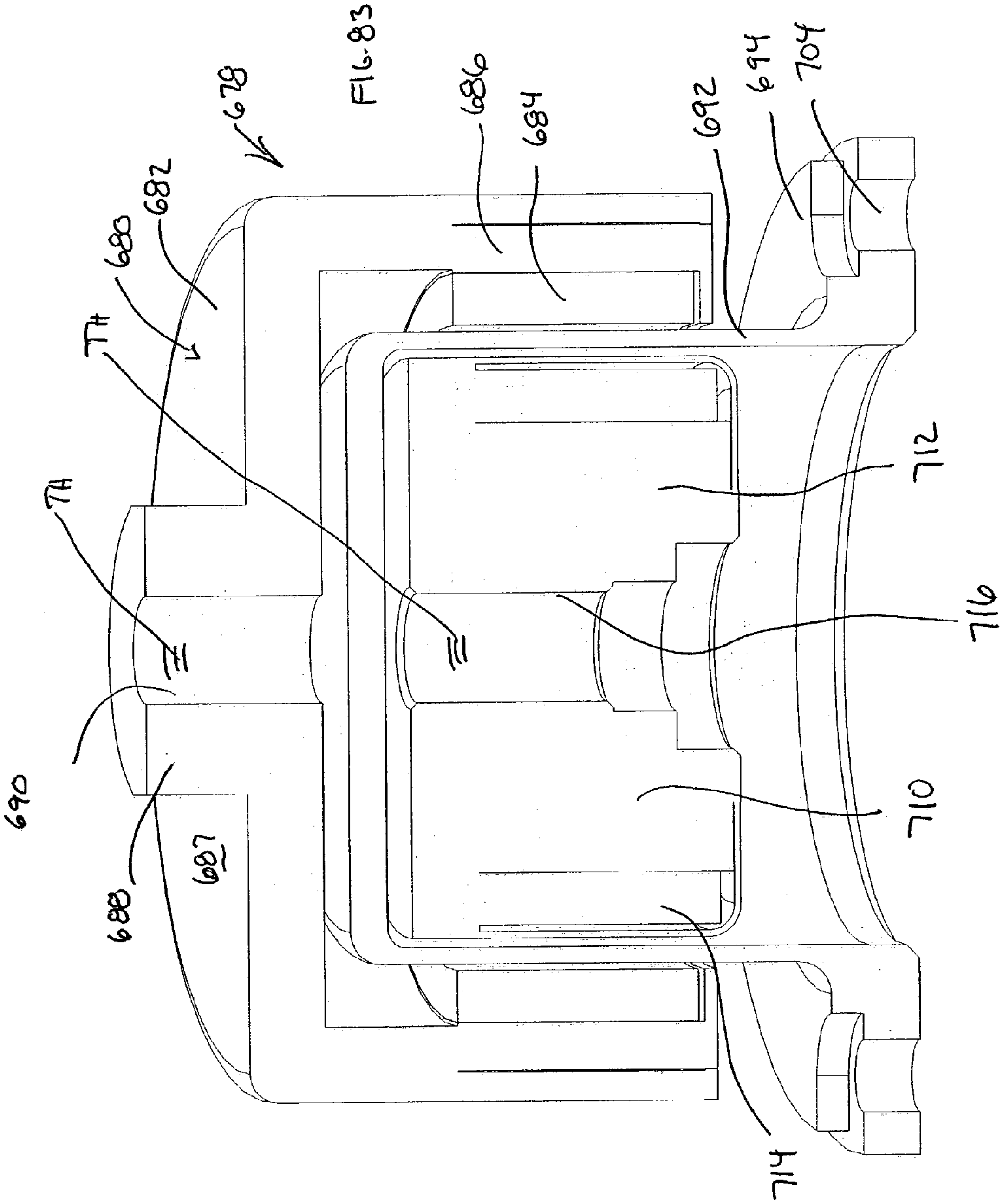
FIG. 83 shows a cut away view of the magnetic coupling assembly.
Figure 84:
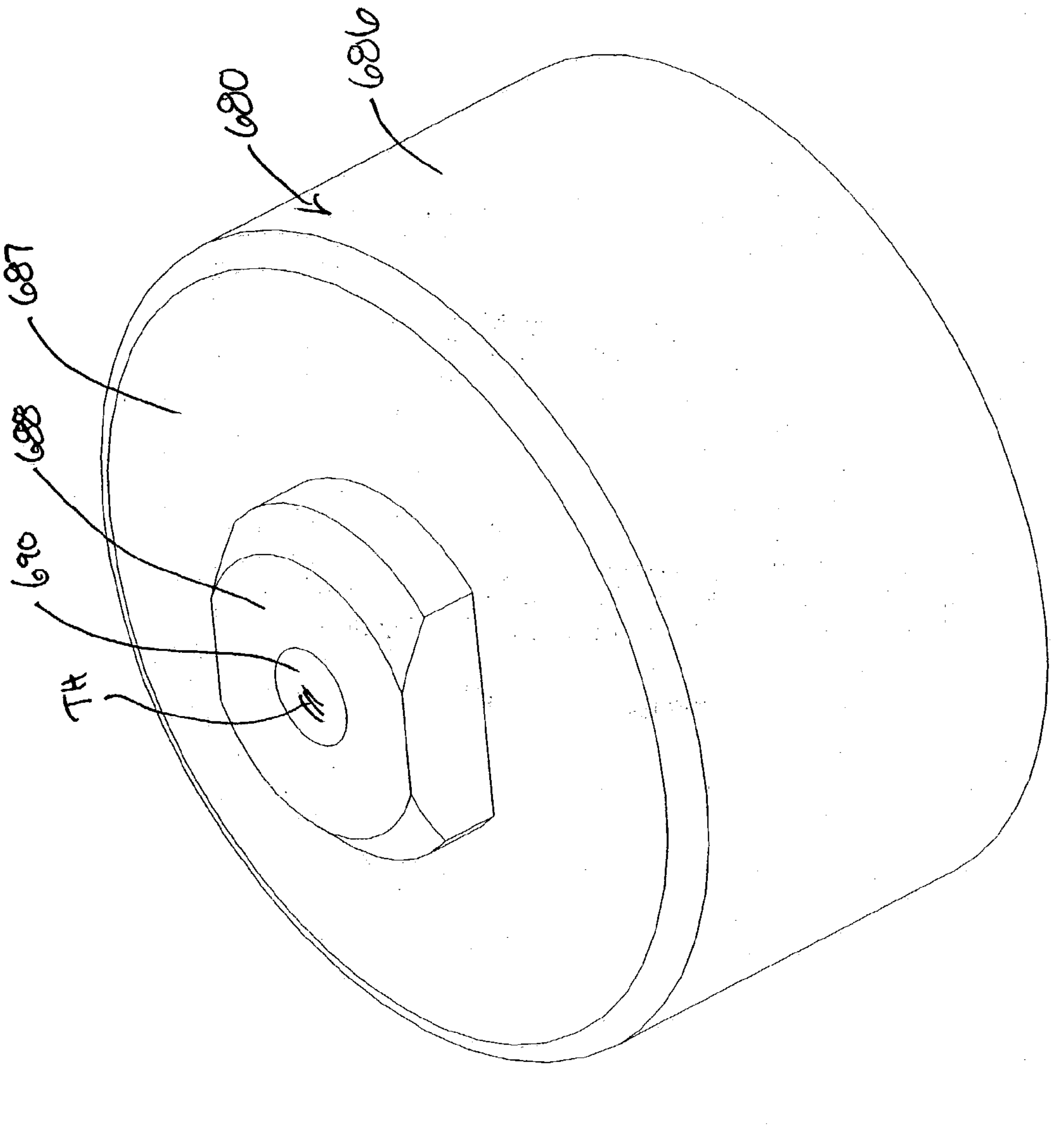
FIG. 84 provides a perspective view of the outer magnet assembly.
Figure 85:
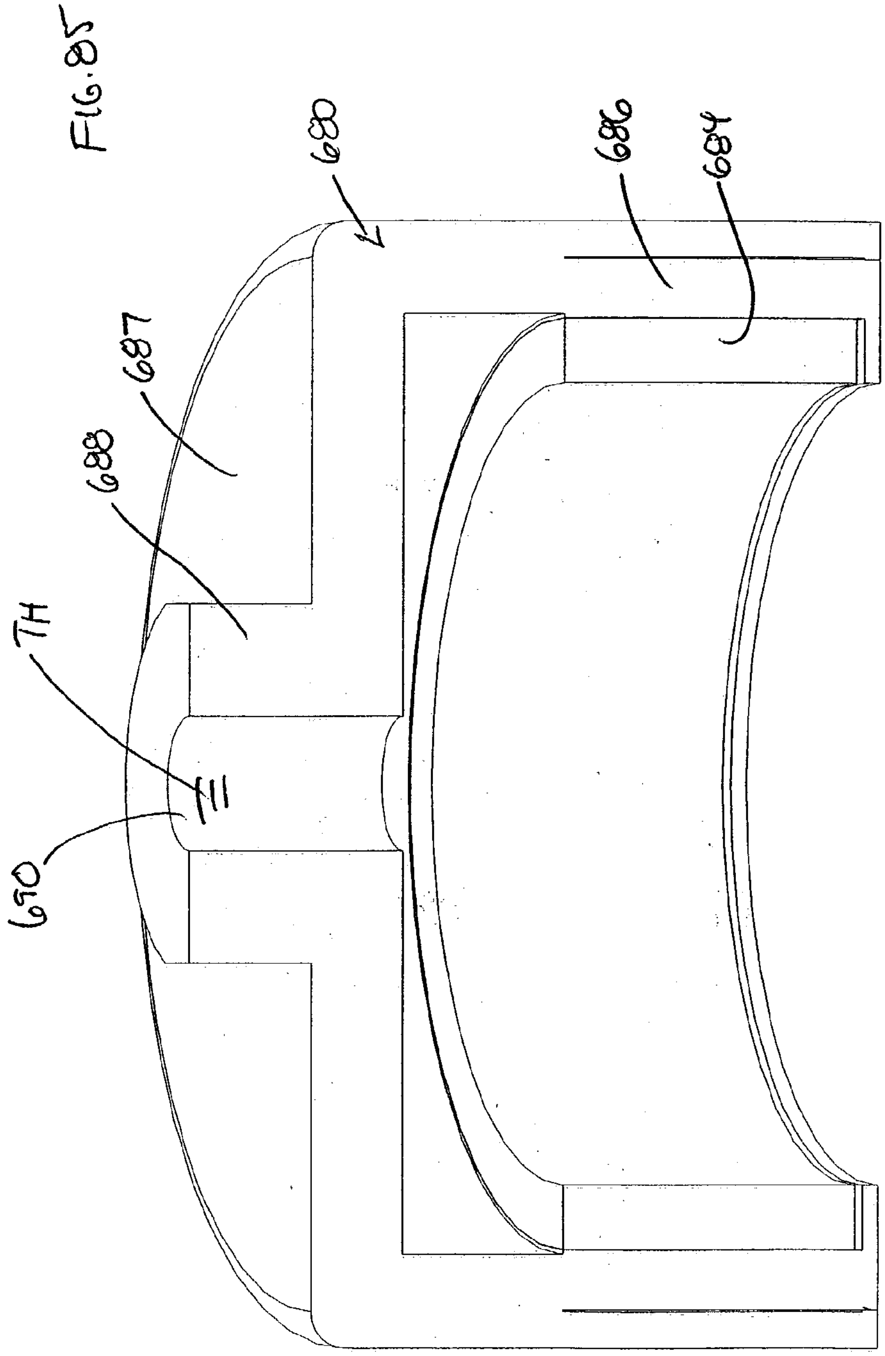
FIG. 85 shows a cross-sectional view of the outer magnet assembly.

Coupling housing 644 houses magnetic coupling assembly 678 shown in position in the cross-sectional view of FIG. 78. FIG. 83 provides a cutaway view of magnetic coupling assembly 678 having outer magnet assembly 680 with drive shaft coupling housing 682 and magnet ring 684 secured to an inner surface of cylindrical coupling housing wall 686. FIGS. 84 and 85 provide a perspective and cross-sectional view of outer magnet assembly 680 having an upper wall 687 with a central protrusion 688 with, as shown in FIG. 85, a threaded inside diameter 690 designed for threaded engagement with the threaded end 662 of pump motor drive shaft 660 via the left hand threaded end 662. Thus, drive shaft coupling housing 682 is placed in threaded engagement with drive shaft 660 and positions its supported magnet ring 684 about shroud 692. Ring 684 is preferably of a magnet material having high magnetic coupling strength such as the rare earth magnet material (e.g., Neodymium). Ring 684 is also preferably magnetized with multiple poles for enhanced coupling power.

Figure 86:
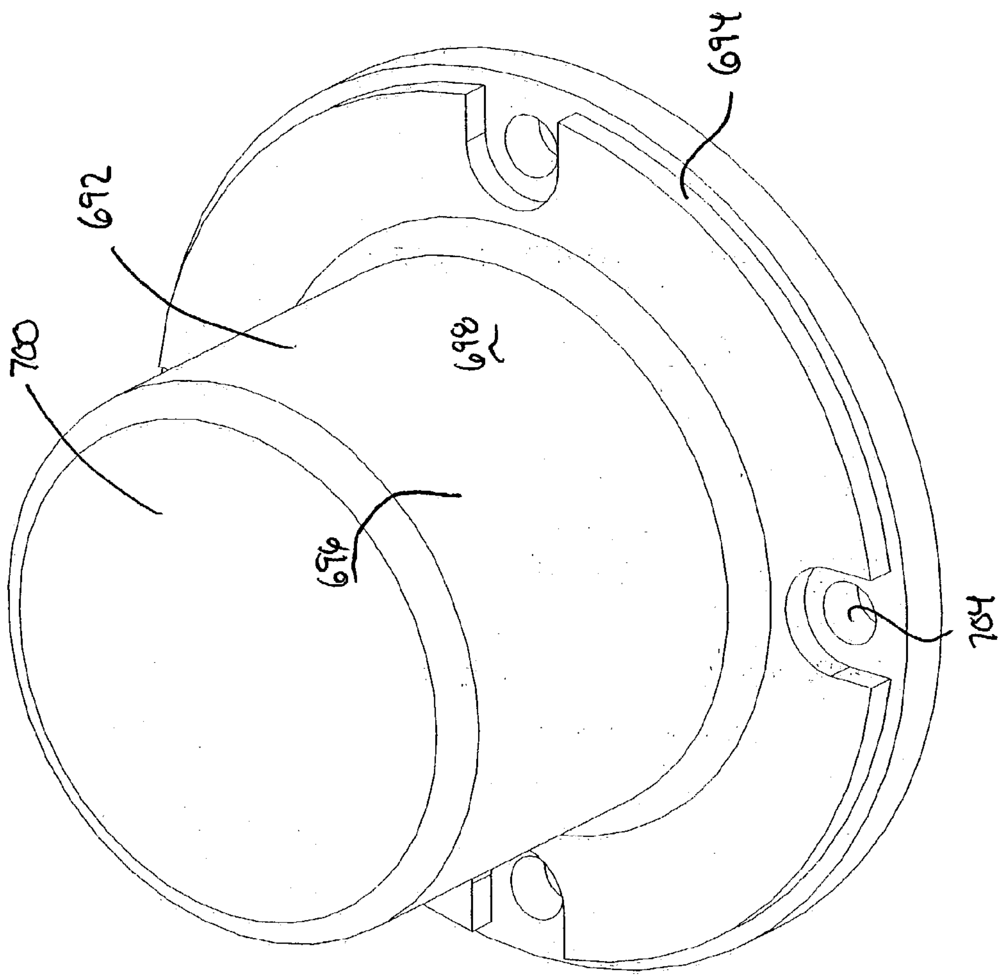
FIG. 86 shows a perspective view of the magnet coupling assembly shroud.
Figure 87:
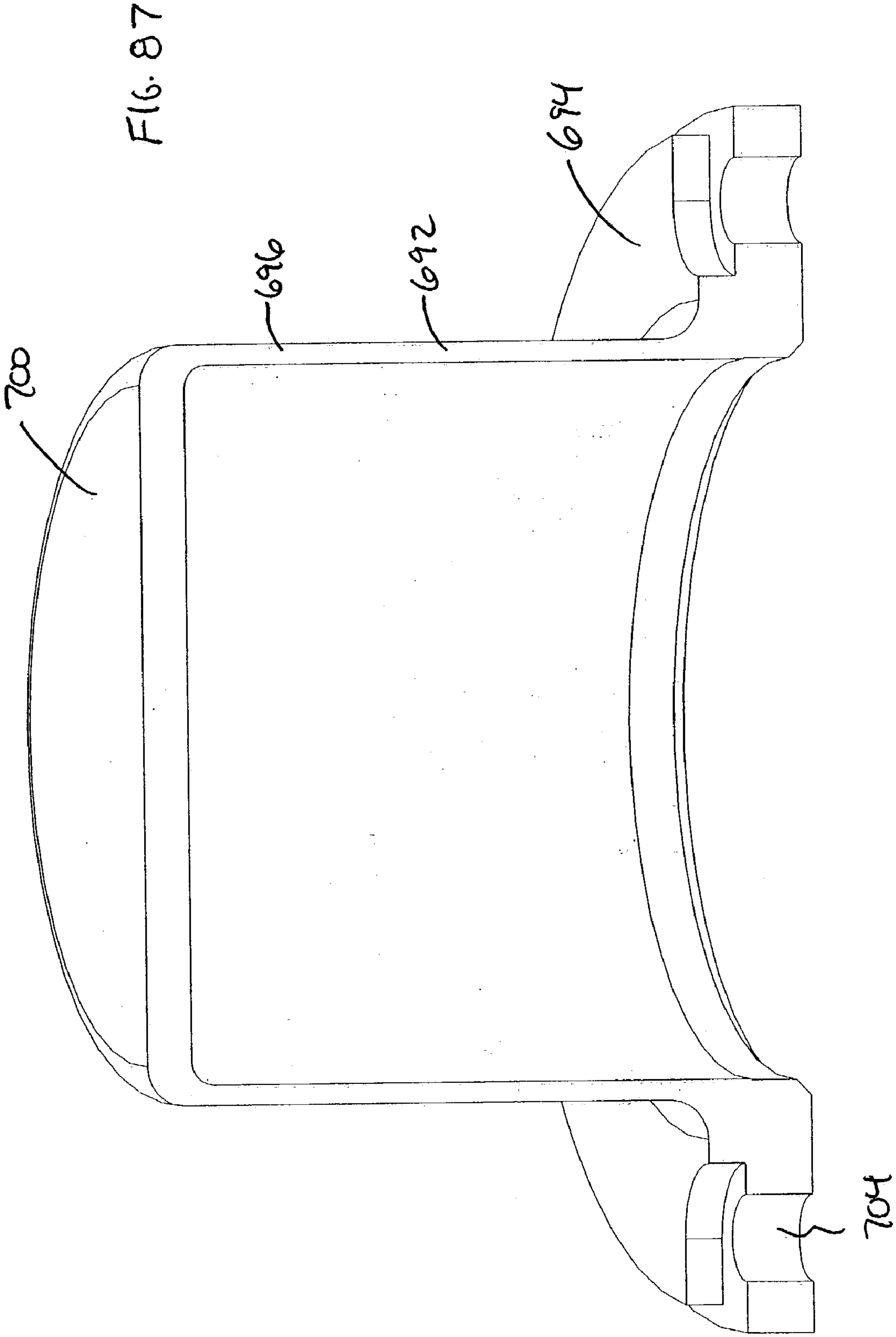
FIG. 87 shows a cross-sectional view of the shroud.
Figure 88:
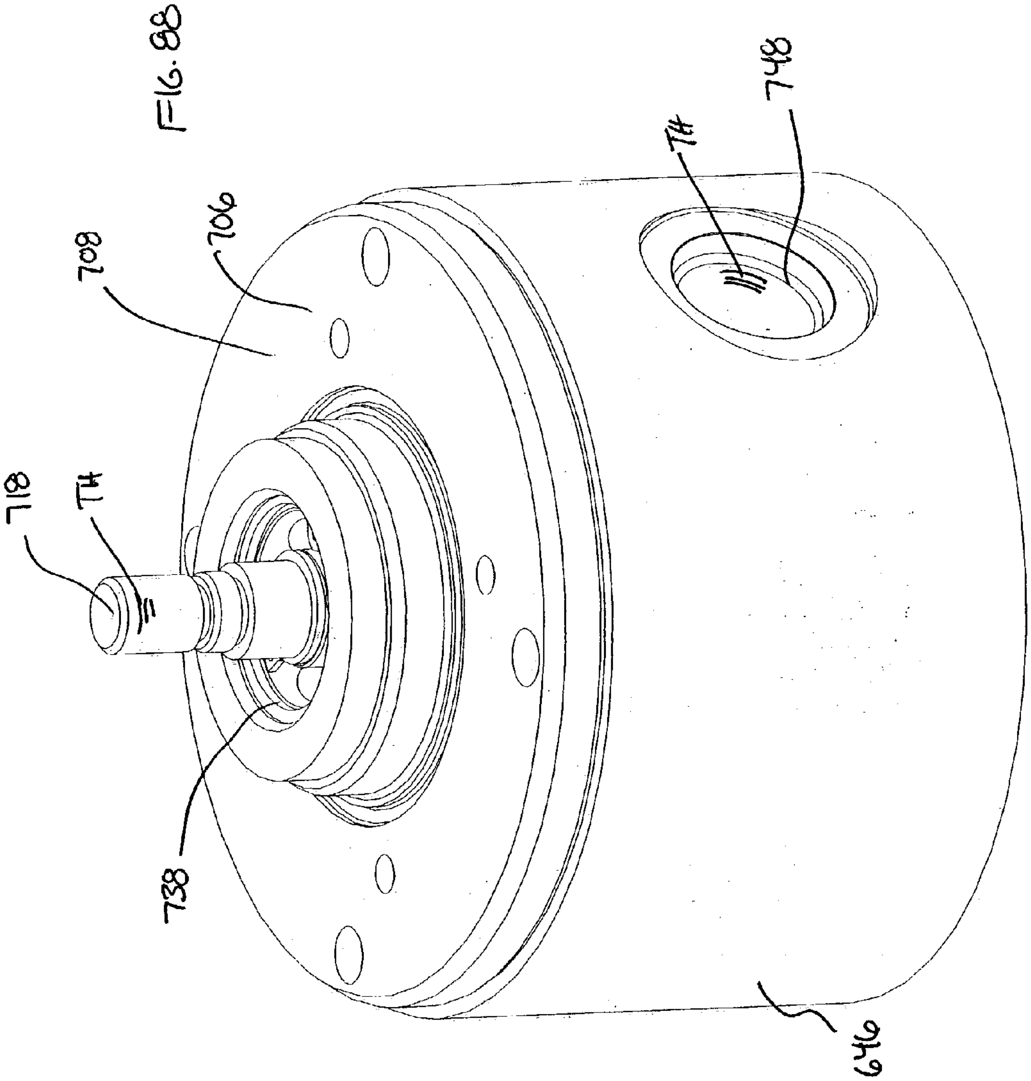
FIG. 88 shows a perspective view of the outer magnet assembly.

Shroud 692 is shown in operative position in FIG. 78 having its based secured to the upper surface of chemical outlet manifold 646. FIGS. 86 and 87 further illustrate shroud 692 in perspective and in cross-section, and show shroud 692 having a top hat shape with base flange 694 and cup-shaped top 696 extending upward therefrom and having shroud side wall 698 and top 700 which together define interior chemical chamber 702 (the same chemical being pumped from the respective chemical pumps). Base flange 694 is shown as having a plurality of circumferentially spaced fastener apertures 704 that are positioned for securement to corresponding fastening means 706 on the upper surface 708 of chemical outlet manifold 646 as shown in FIG. 88. Preferably there is a static seal relationship between the bottom of the shroud and the receiving upper surface of the outlet manifold 646 as in an O-ring seal relationship (not shown).

FIGS. 78, 83, 89A and 89B show inner magnet assembly 710 positioned within the inner chemical chamber 702 of shroud 692 which acts to separate the inner and outer magnet assemblies (680 and 710) and isolates the chemical. Inner magnet assembly 710 comprises a main housing body 712 which supports along its exterior circumference inner magnet ring 714 and has threaded center hole 716. Outer magnet assembly 680 positions the threaded inside diameter 690 of the outer magnet assembly 680 in axially alignment with the threaded central hole 716 of inner magnet assembly 710 but to the opposite side of top 700 of the isolating shroud 692. Also, by way of the illustrated cup shape in outer magnet assembly 680, its side wall extends down to place outer magnet ring 684 in a generally vertically overlapping and concentric arrangement (to opposite sides of the side wall of the isolating shroud) relative to inner magnet ring 714 supported by inner main housing body 712. Inner magnet ring 714 is preferably formed of the same magnet material and with multiple poles as its outer counterpart. As seen from FIG. 78 the central threaded hole in inner magnet assembly 710 connects with bearing shaft 718 (e.g., a left handed thread) which, in turn drives pump shaft 720 by way of the preferred intermediate flexible coupling 722 (components 718, 720 and 722 working together to provide inner pump drive transmission means). The magnet coupling achieved under the present invention thus provides means to transmit torque from the motor to the pumping unit without the need for a connecting drive shaft and its problematic drive shaft seal. That is, the pump motor (636, 638) is provided with a magnet (e.g., less than one or two inches, for example) but the pump and motor drive shafts never contact each other although the magnet assemblies generate a magnetic field arrangement that magnetically locks the motor and pump drive shafts together. As noted in the background, this sealed arrangement avoids the problem in the prior art of drive shaft seal degradation such as from iso-crystal build-up which can quickly destroy the softer seal material.

Figure 89A:
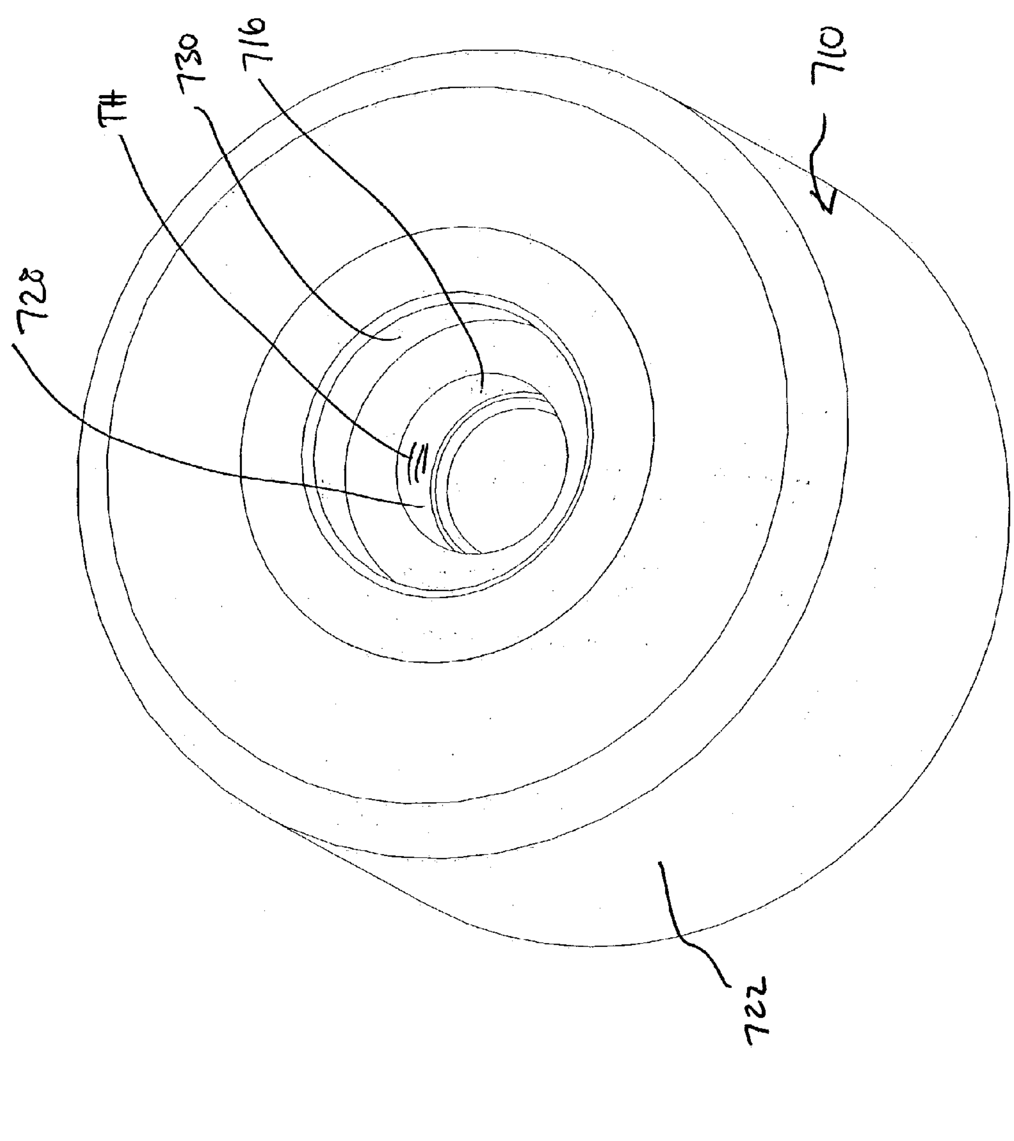
Figure 99B:
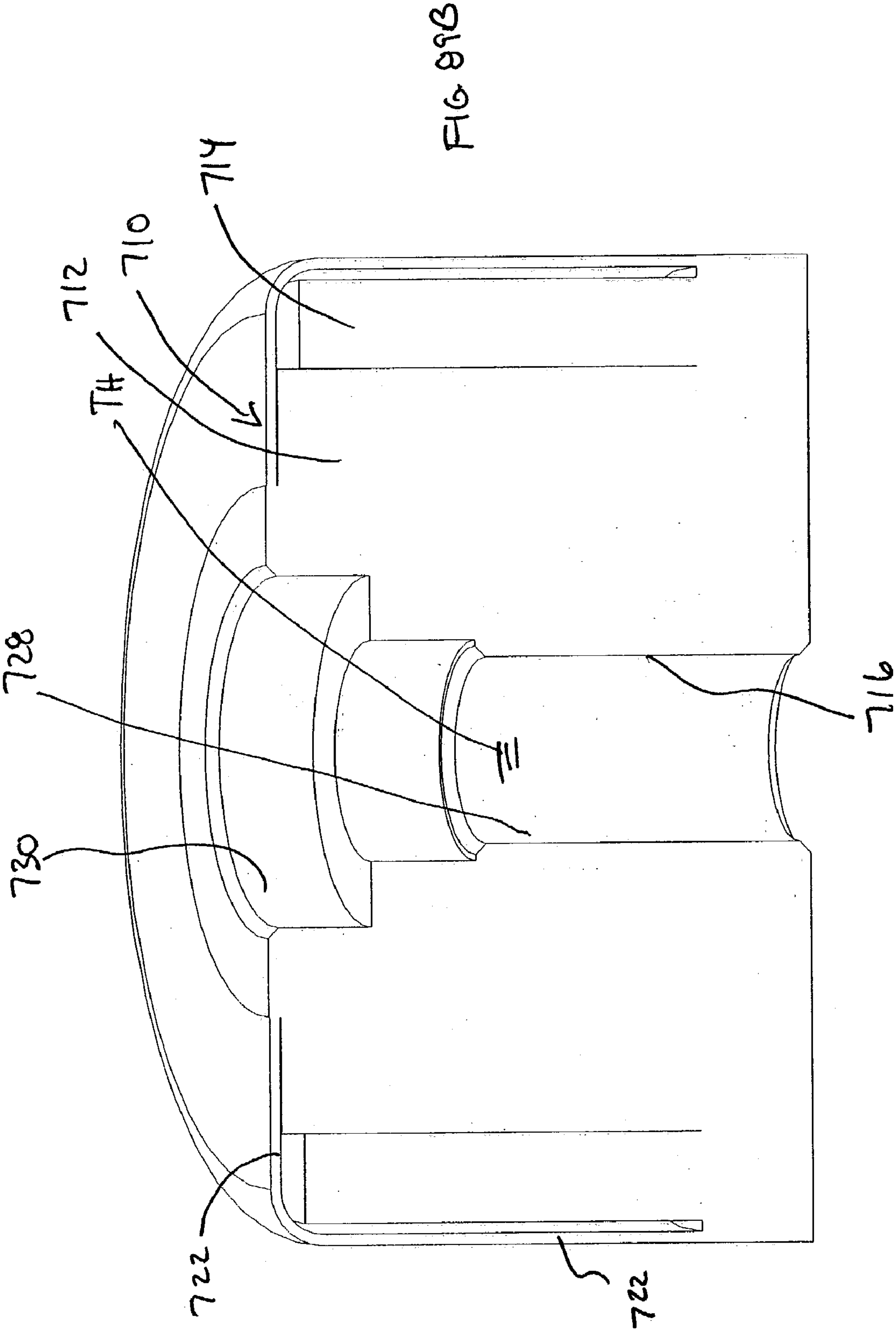

Shroud 692 is preferably made of a material (e.g., steel) that does not interfere with the magnetic locking of the inner and outer magnet rings and is relatively thin. FIGS. 89A and 89B further illustrate inner magnet assembly 710 having outer encasing layer or covering 722 (e.g., a polymer laminate) that protects inner magnet assembly 710 from adverse chemical reactions from either of the contacting chemicals A or B. Also, as seen by FIG. 92, to provide for added stability, bearing shaft 718 has first, enlarged bearing section 724 extending below the smaller diameter uppermost threaded shaft section 726, and the central through hole 716 of inner magnet assembly 710 has a smaller diameter threaded section 728 which engages with threaded uppermost shaft section 726 and a larger reception recess 730 which receives enlarged bearing section 724 with the step shoulder between sections 724 and 726 contacting the corresponding step shoulder between sections 728 and 730.

Figure 92:
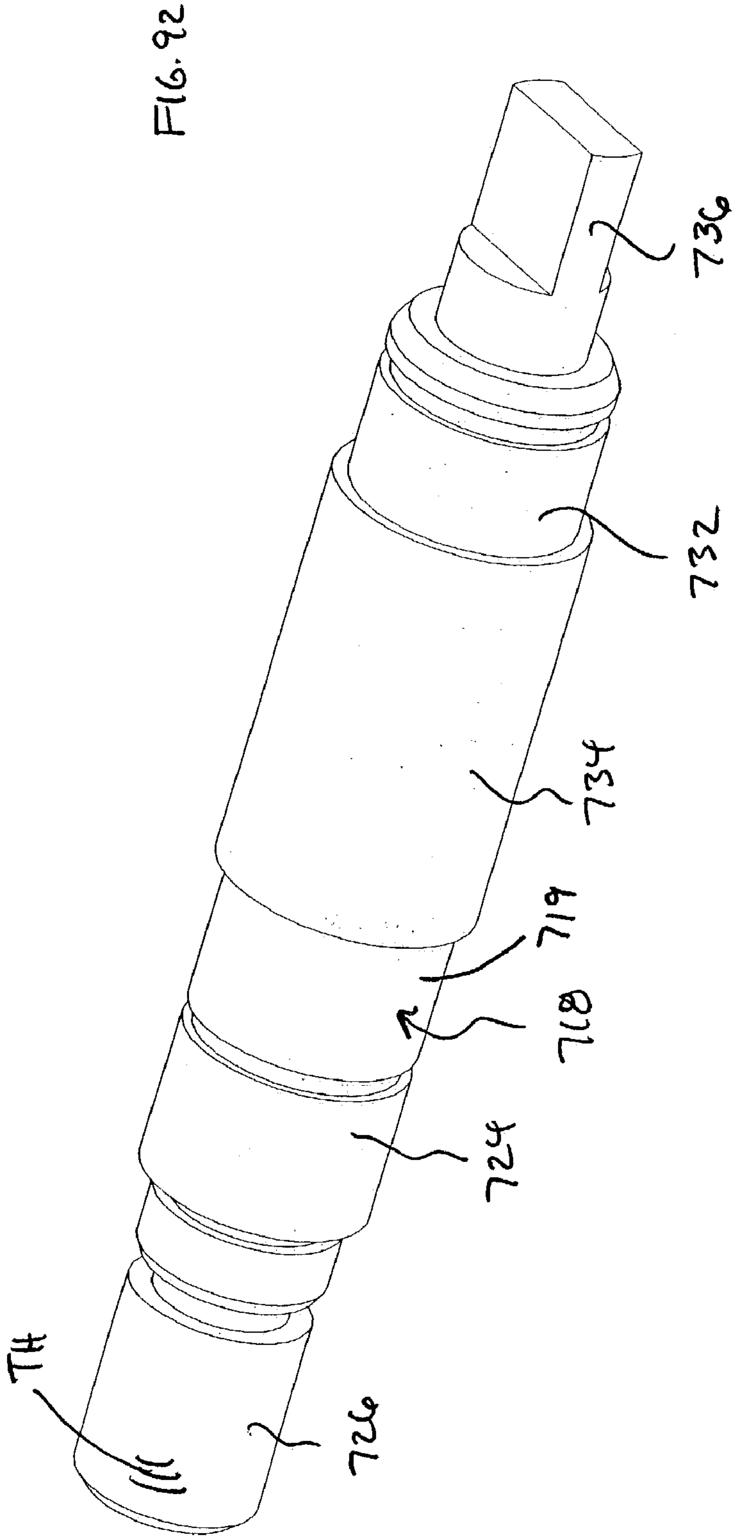

FIG. 92 also illustrates shaft 718 having second bearing contact surface 732 spaced from first bearing contact surface 724 by enlarged separation section 734 and intermediate section 719. Second bearing contact surface 732 extends into shaft flex head connector 736 forming the end of shaft 718 opposite threaded end 726.

Figure 90:
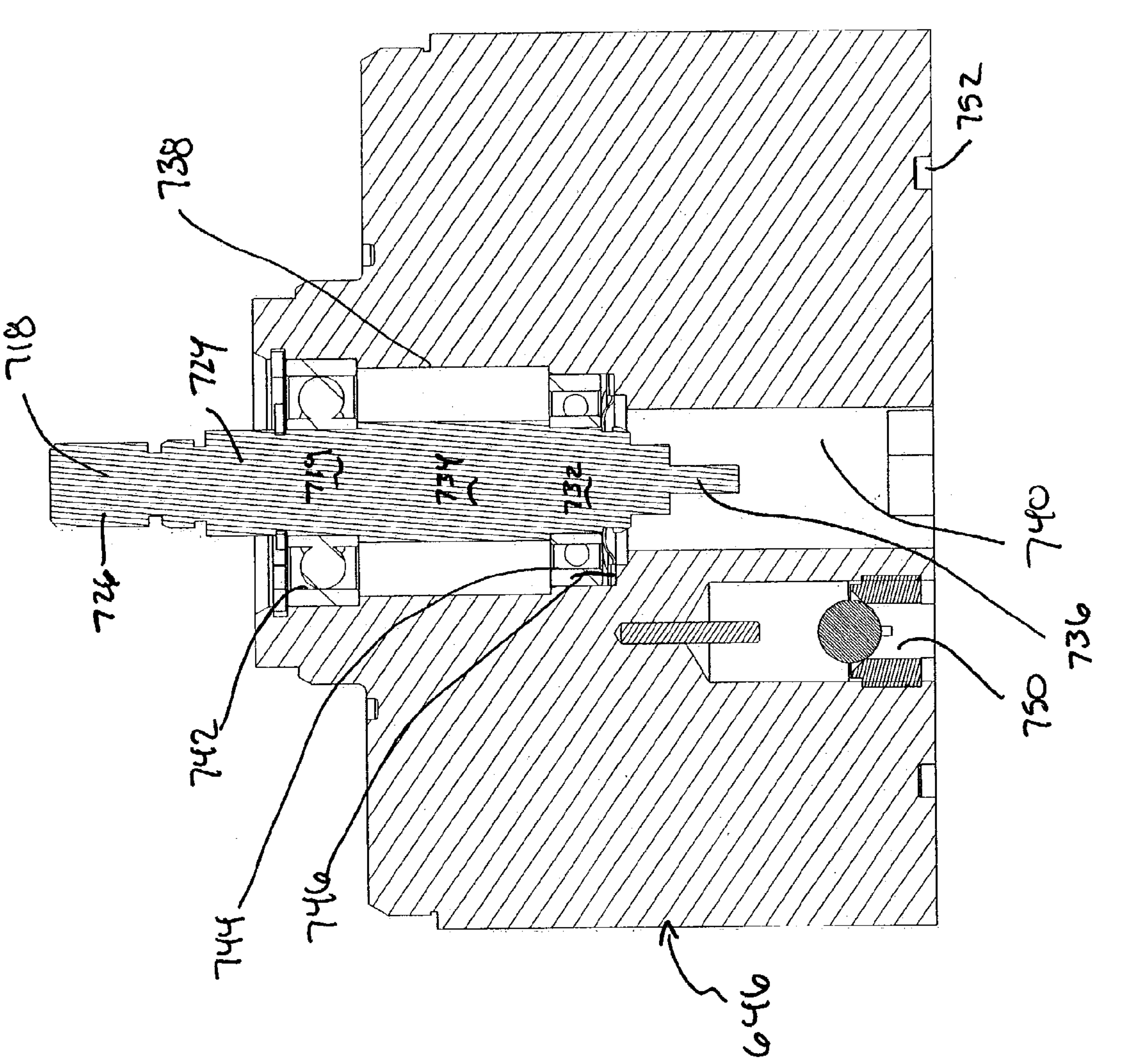
Figure 91:
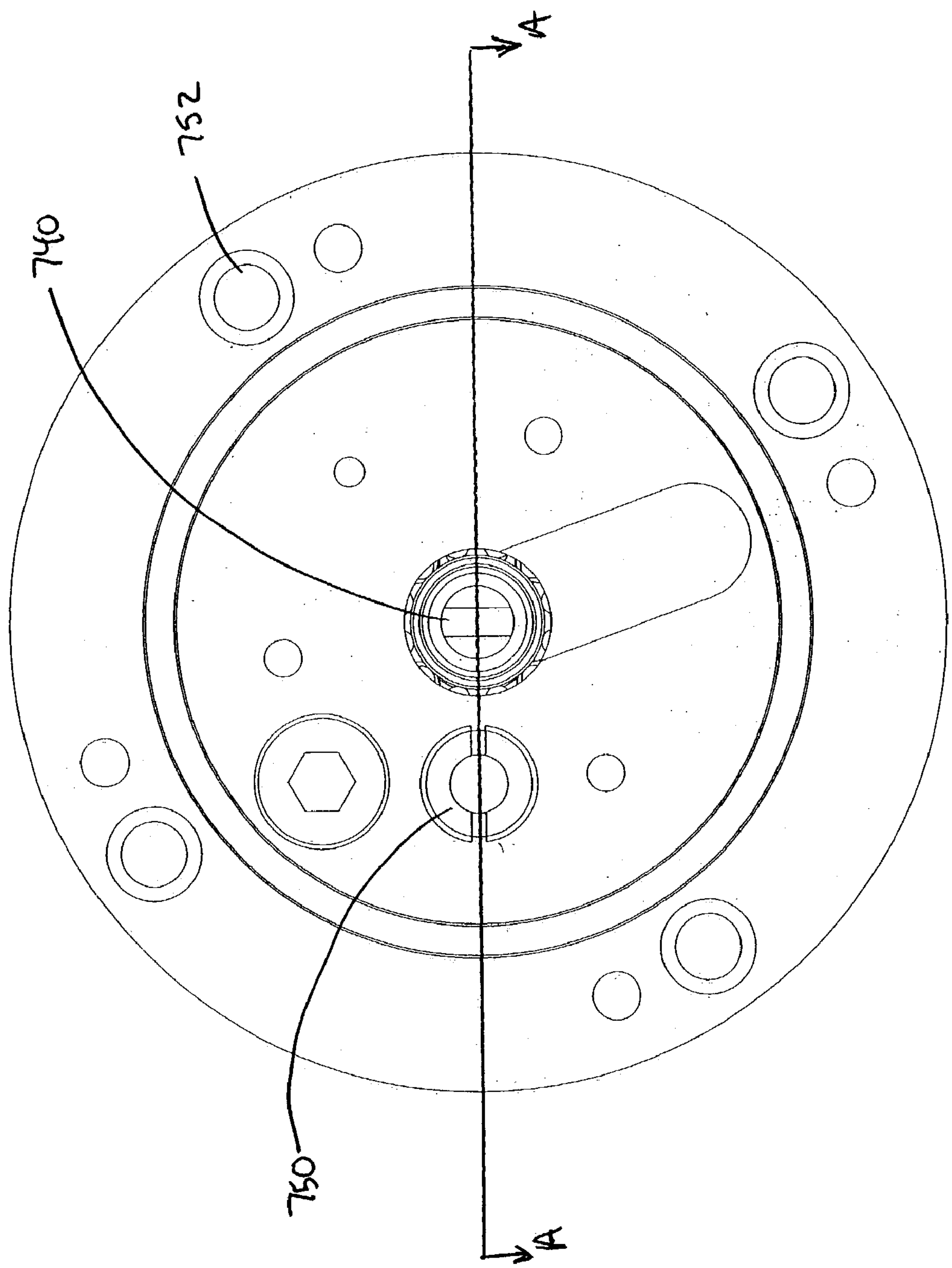
FIG. 91 shows a cross-sectional view of that which is shown in FIG. 9F taken along cross-section line I-I in FIG. 9F.

FIGS. 88, 90 and 91 illustrate bearing shaft 718 received within bearing reception region 738 formed in the upper, central half of outlet manifold assembly 646. Bearing reception region 738 opens into a smaller diameter shaft end reception region 740 which forms the remaining part of the overall through hole extending through the center of outlet manifold 646. FIG. 90 illustrates the compact and stable bearing shaft relationship with outlet manifold 646 wherein first and second ring bearings 742, 744 are received in bearing reception region 738 in a stacked arrangement with the lower bearing ring (e.g., a caged ball bearing ring) supported on the step shoulder 746 of outlet manifold 646 and the upper bearing ring supported on a step shoulder defined by enlarged separation section 734 of shaft 718. This twin bearing support arrangement helps minimize vibration and side load on the below described pump head. The relatively short shaft 718 (e.g., less than 3 or 4 inches in length) has its flex connector end 736 received within shaft end reception cavity 740. FIG. 88 illustrates chemical outlet port 748 which preferably is threaded for connection with an angle connector as in angle connectors 654 or 654' shown in FIG. 77.

FIGS. 90 and 91 further illustrate backflow prevention means 750 shown as ball check valve positioned at the pump head side or lower end of outlet manifold 646. FIG. 91 illustrates a bottom view of the same which includes an illustration of check valve 750 as well as mounting alignment recesses 752. In addition rupture disc 754 is threaded into the base of the outlet manifold as protection against over pressure by blowing out at a desired setting (e.g., 1440 psi).

Check valve 750 helps avoid backflow and maintain line pressure to minimize the work required from the pumping unit during idle periods. Bearing shaft 718 supports the pump side of the magnetic coupling unit and drives the pump head shaft.

Figure 95:
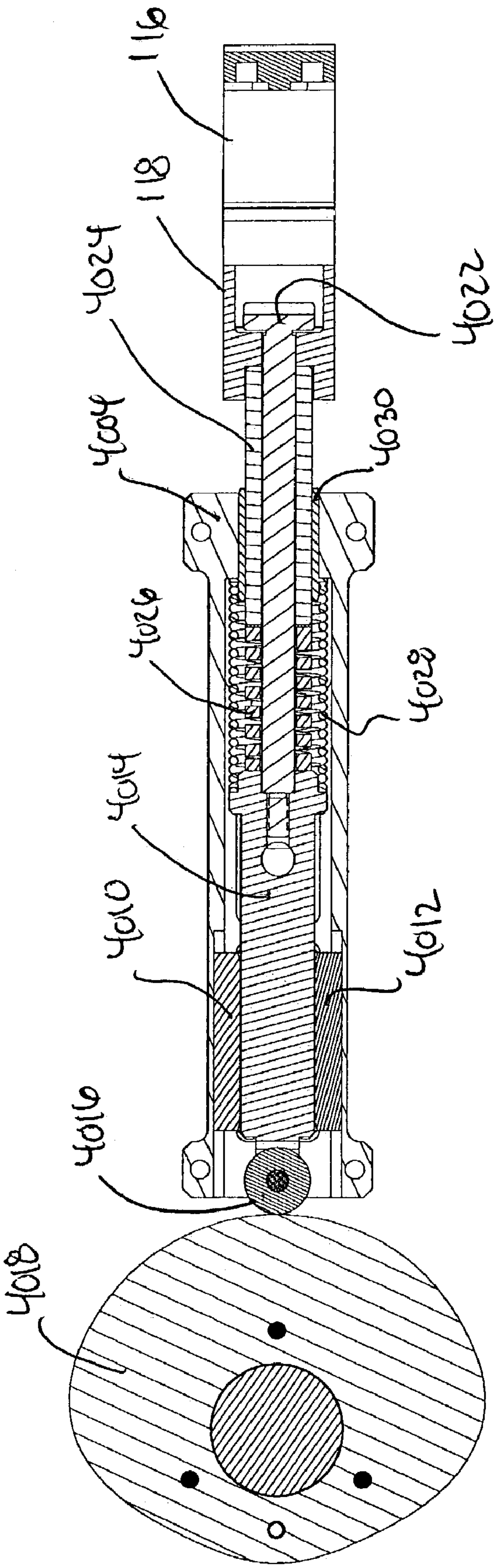
Figure 9K:
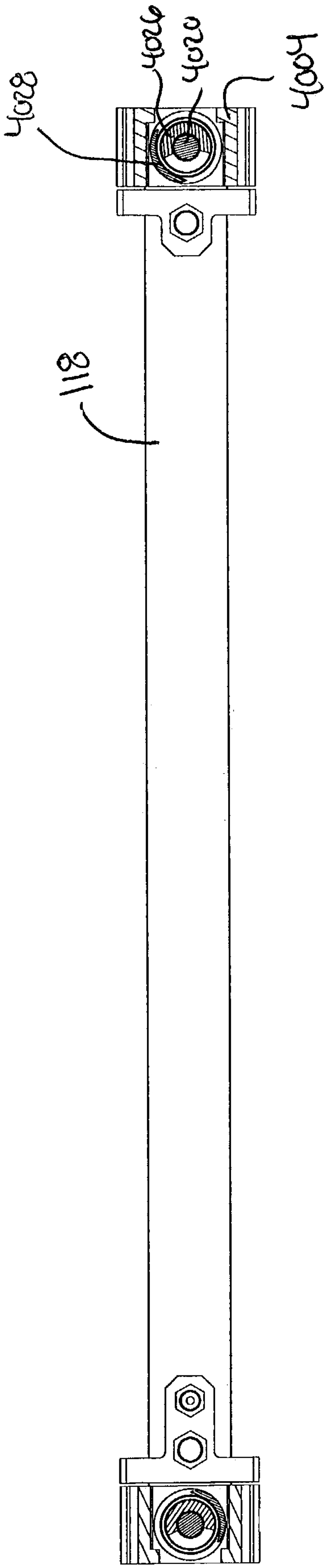
Figure 10:
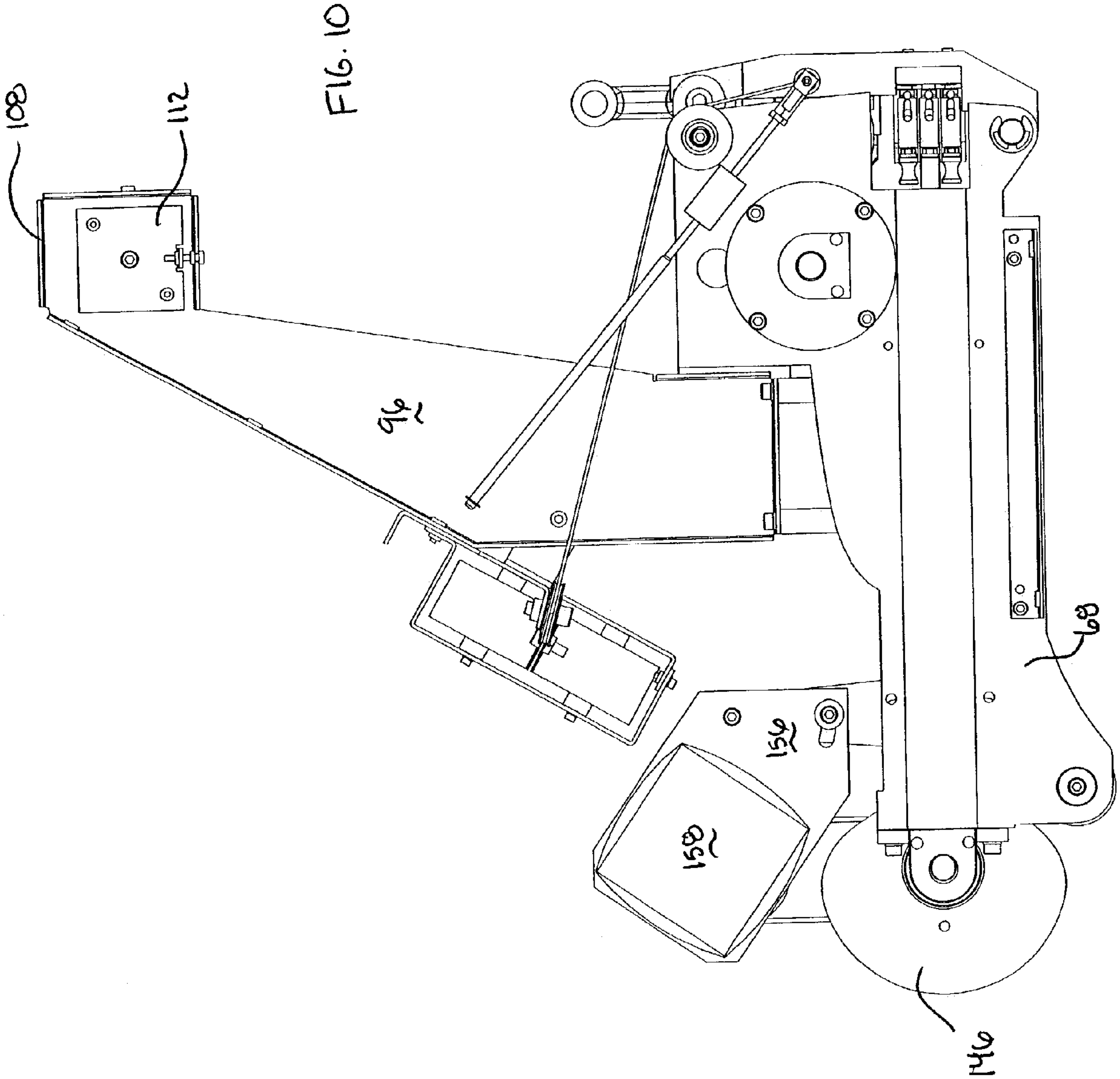
FIG. 10 shows a left side elevational view of that bag forming assembly.
Figure 93:
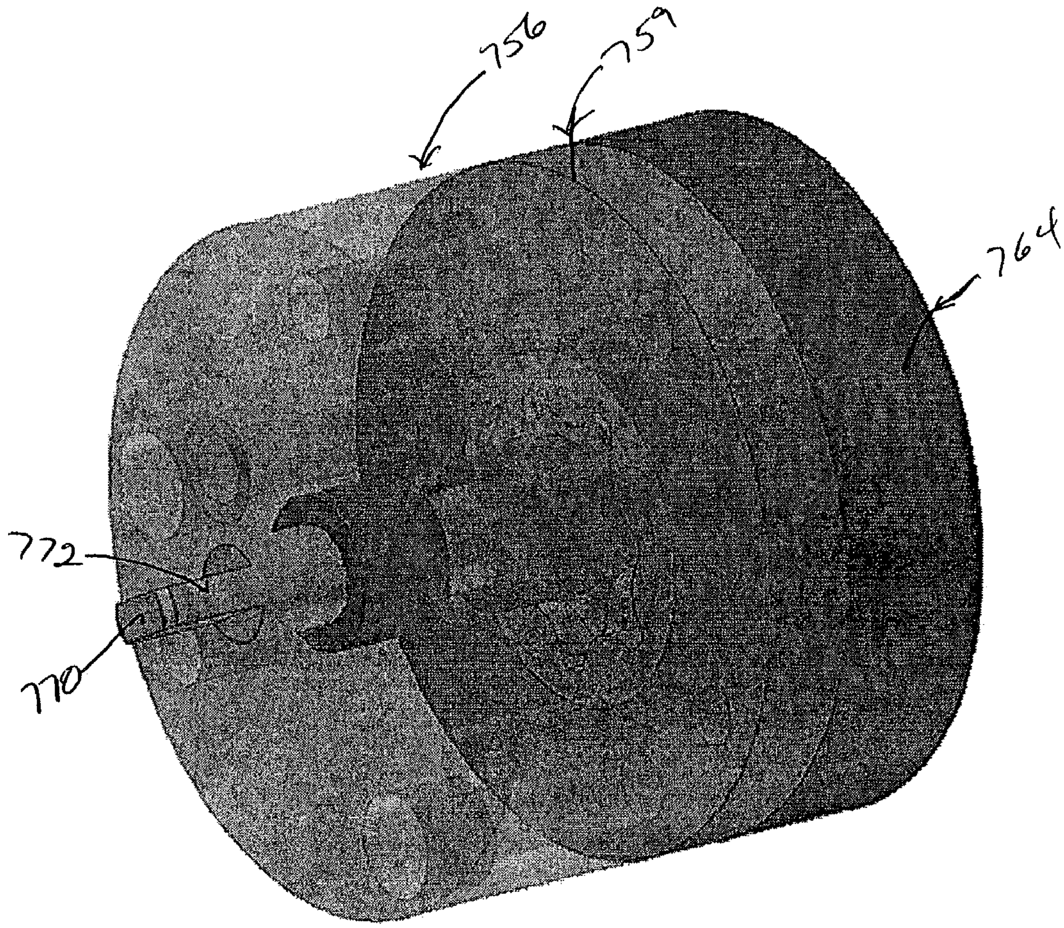
Figure 93A:
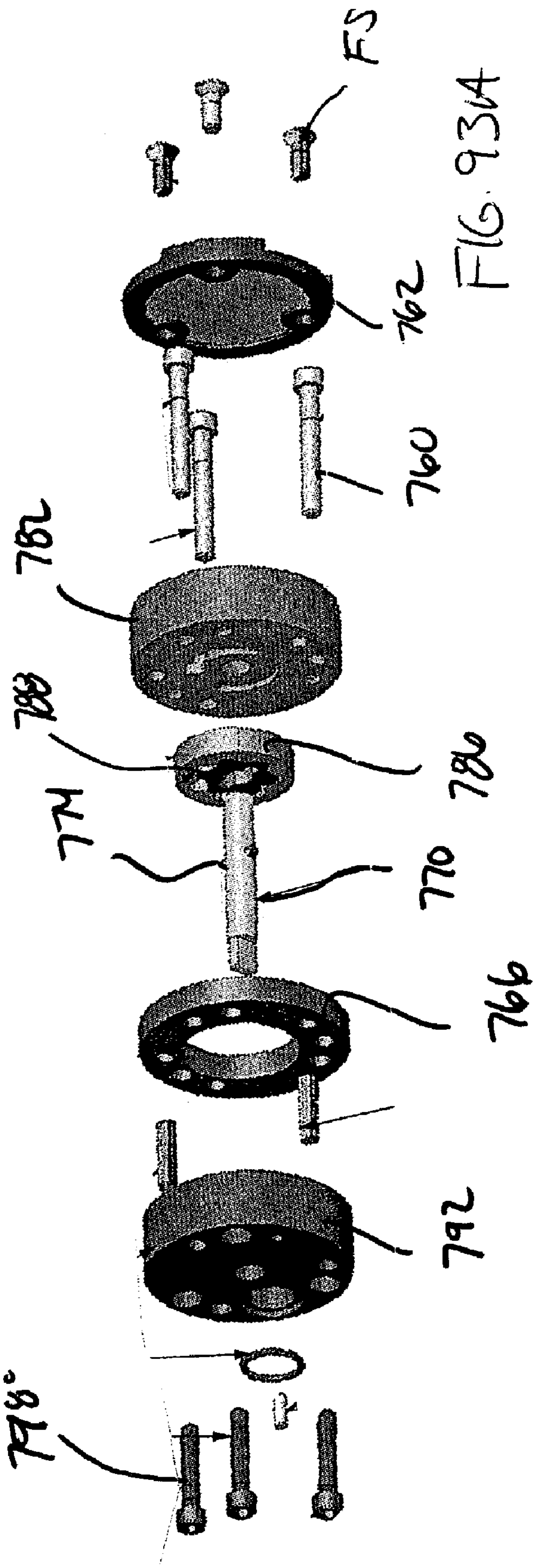
Figure 94:
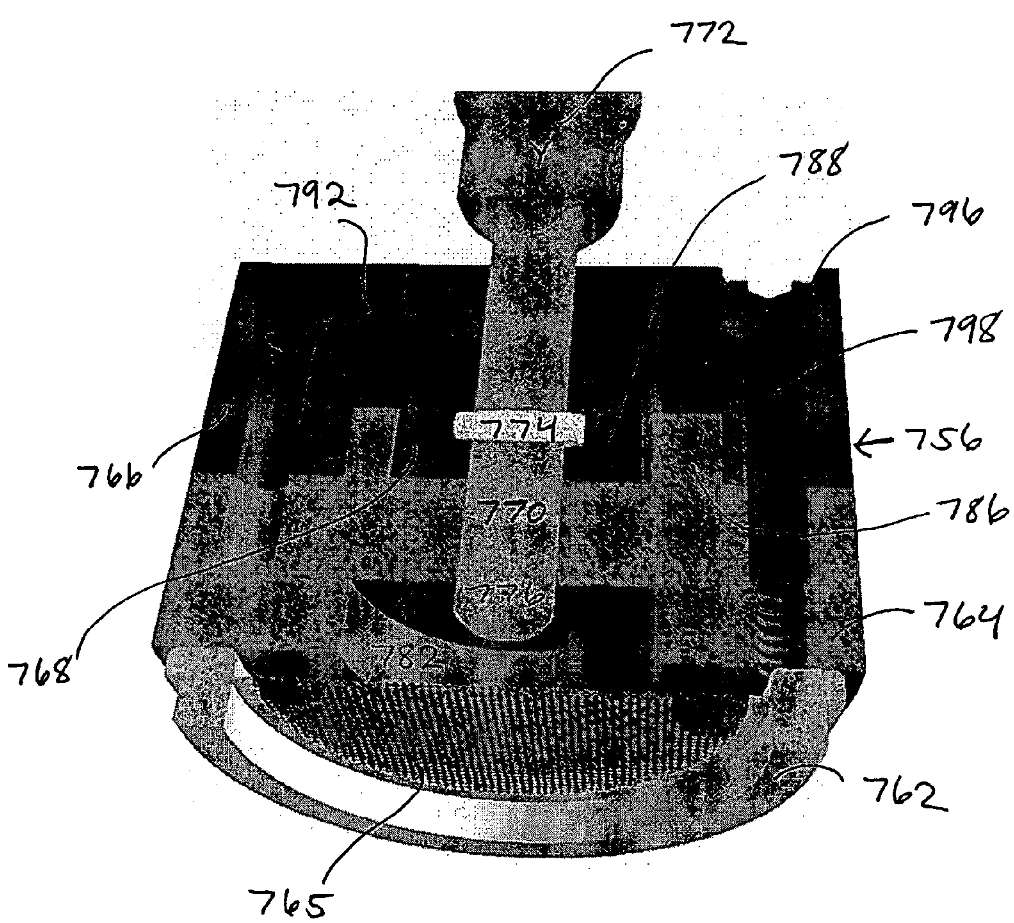
Figure 95:
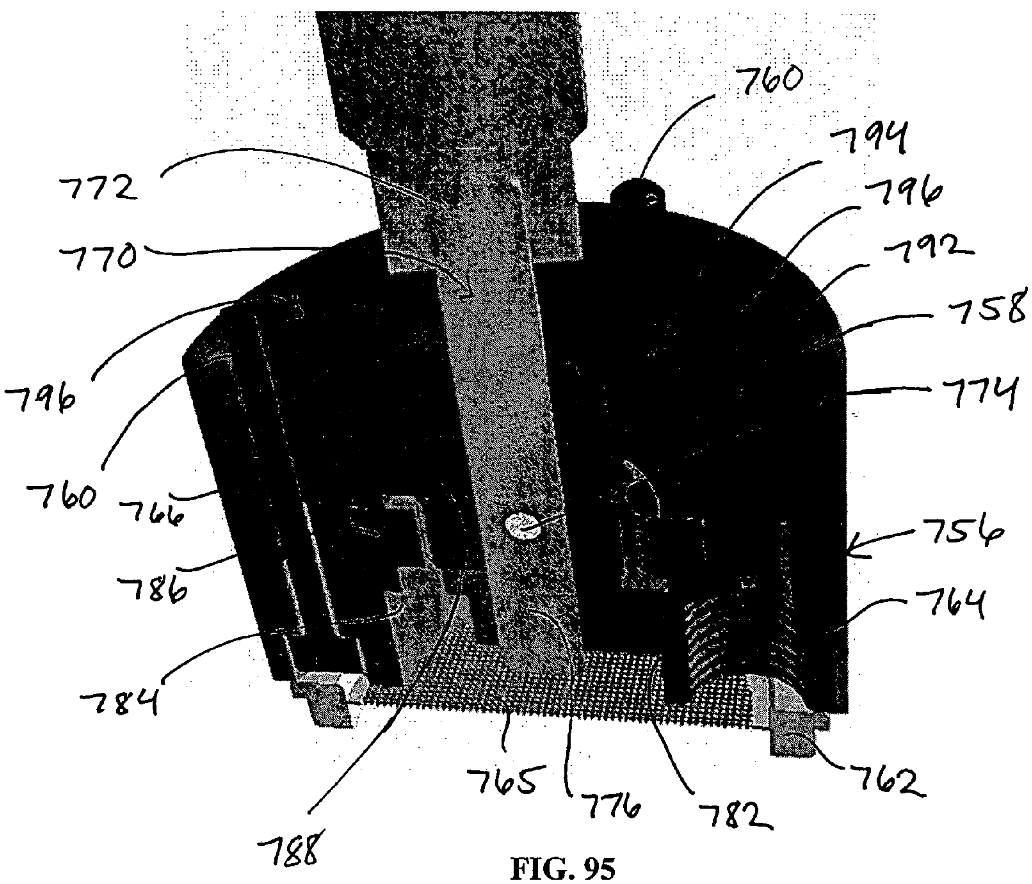
Figure 96:
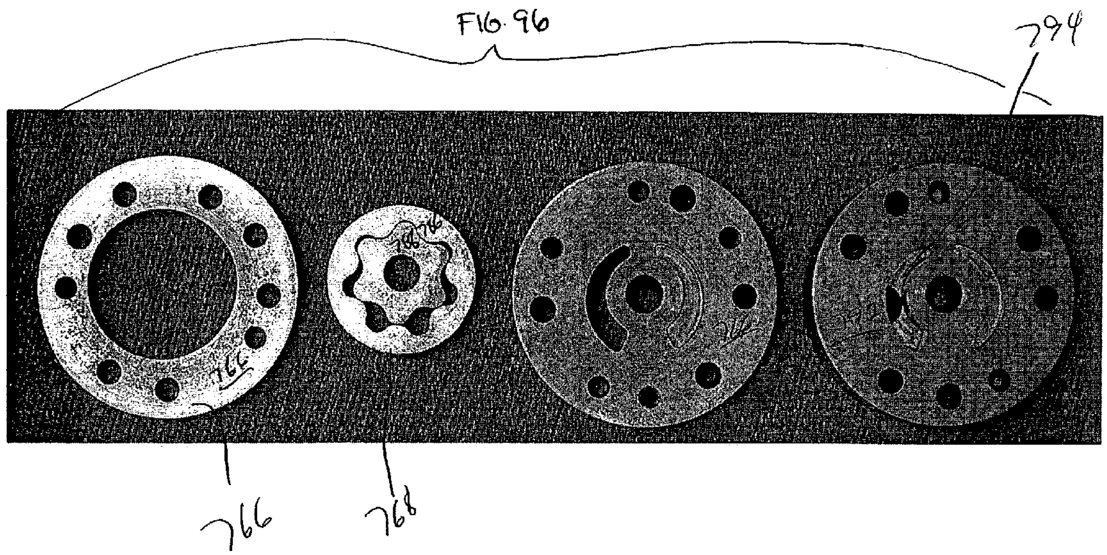
Figure 97:
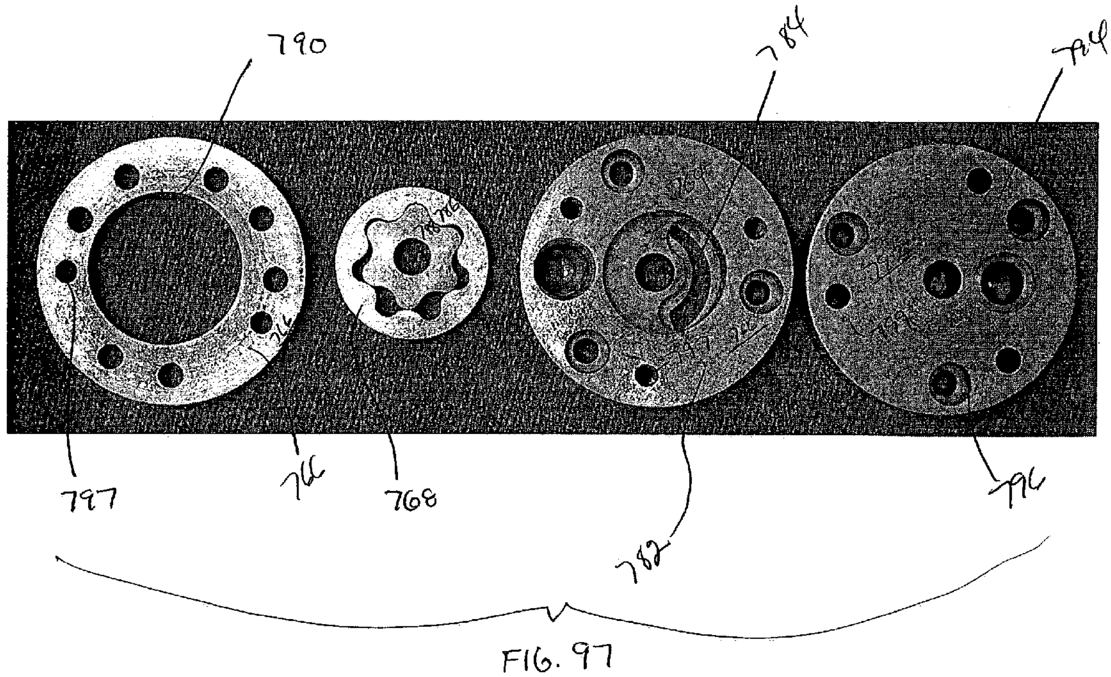

In a preferred embodiment, there is attached a gerotor pumping unit to the base of the outlet manifold. In this regard, reference is made to FIG. 93 providing a rendering of pump head 756 in an assembled condition and FIG. 93A showing an exploded view of the same. FIGS. 94 and 95 provide different cross sectional views of pump head 756 and shows locating pins 760 designed for reception in alignment recesses 752 (FIG. 91) at the base of outlet manifold such that pump head 756, with its chemical output port 758, is placed in proper alignment with the input port 750 at the bottom of outlet manifold 646. As shown in FIGS. 93-97, pump head 756 is a multi-stack arrangement comprising a plurality of individual plates with FIG. 96 showing the unassembled set of plates with a view to the interior surface of each and FIG. 97 showing the same plates but with an outer or exposed surface presentation (the below described center or intermediate plate 766 and gerotor unit 768 having a common appearance on either side). FIGS. 94 and 95 illustrate base annular ring 762 which provides a clearance space relative to filter 765 (e.g., a 30 to 40 mesh being deemed sufficient in working with the 100 mesh screens in manifold 199, for example) sandwiched between ring 762 and bottom or base plate 764 of pump head 756. Center plate 766 is stacked on base plate 764 and held in radial alignment by way of drive shaft 770 which has an upper connecting end 772, an intermediate drive pin 774, and an extension end 776 extending into bottom plate central recess 782 providing a cavity above filter 765. The solid central region of bottom or base plate 764 defining the base of recess 782 and the chemical access passageway 784 for chemical having just passed through filter screen 765 and into recess 782. The chemical is then received by gerotor unit 768 comprised of outer gerotor ring 786 and inner gerotor ring 788 each preferably formed of powdered metal.

Gerotor unit 768 is received within the eccentric central hole 790 of center plate 766. As seen from FIGS. 96 and 97 a preferred arrangement features an inner gerotor section 788 having 6 equally spaced teeth in a convex/concave arrangement. The interior of outer ring 786 also features seven concave cavities extending about a larger inner diameter relative to the outer diameter of the interior positioned gerotor gear with, for example, a 0.05 inch eccentricity. The concave recesses generally conform to the convex projections of the interior gerotor plate with the relative sizing being such that when one interior ring tooth of the interior gerotor pump plate is received to a maximum extent in a receiving concave cavity in outer ring 786, the diametrically opposite interior tooth of the interior gerotor pump plate just touches one of the outer ring projections along a common diameter point while the adjacent teeth of the inner ring have contact points on the exterior side of the adjacent two projections of the outer ring (e.g., within 15° of the innermost point of those two teeth). The upper (relative to the Figures) left and right teeth of the inner ring extend partially into the cavity adjacent to the one essentially fully receiving the inner ring tooth. The left and right teeth extend into those outer ring reception cavities moreso than the remaining teeth with the exception of the noted essentially fully received tooth. The geometry of the gerotor of the present invention takes into account the characteristics of isocyanate which has a tendency to wear out prior art configured gerotor tips in the A chemical which reduces pump efficiency and negatively effects foam quality. Isocyanate does not provide a good or suitable hydrodynamic boundary layer between the rotating teeth of the gerotor assembly and an associated excessive contact between the inner and outer rotor and rings at specific location on each tooth leading to rapid wear. The illustrated geometry of the gerotor of the present invention takes into account these prior art deficiencies and is directed at providing a minimized degree of pump element wear and loss of pumping efficiency, which if lost can lead poor chemical ratio control and a resultant loss in foam quality.

FIGS. 94 and 96 further illustrate top plate 792 which includes outlet port 794 which feeds into the bottom of outlet manifold 646 via conduit 750 with check valve control. As seen from FIGS. 95 and 97, there are a plurality of recessed fastener holes 796 formed in the top plate that are designed to receive extended fasteners 798 with one representative bolt type fasteners 798 shown in FIGS. 93A and 94 as extending through reception holes in each plate with preferably at least a lower plate having threads to interlock all plates into a pump unit with the gerotor unit nested within the same, and pin 774 precluding pull out of drive shaft 770 until unit disassembly. Also, as seen from FIG. 95 alignment pins 760 are also elongated so as to extend through aligned holes in each plate as in alignment holes 799 and 797 for central plate 766 and top plate 792 (FIG. 97). Alignment pins have enlarged heads 795 that are received as shown in FIG. 95 and preferably locked in place upon annular ring 762 fixation to bottom plate 764 via fasteners F5.

Figure 98:
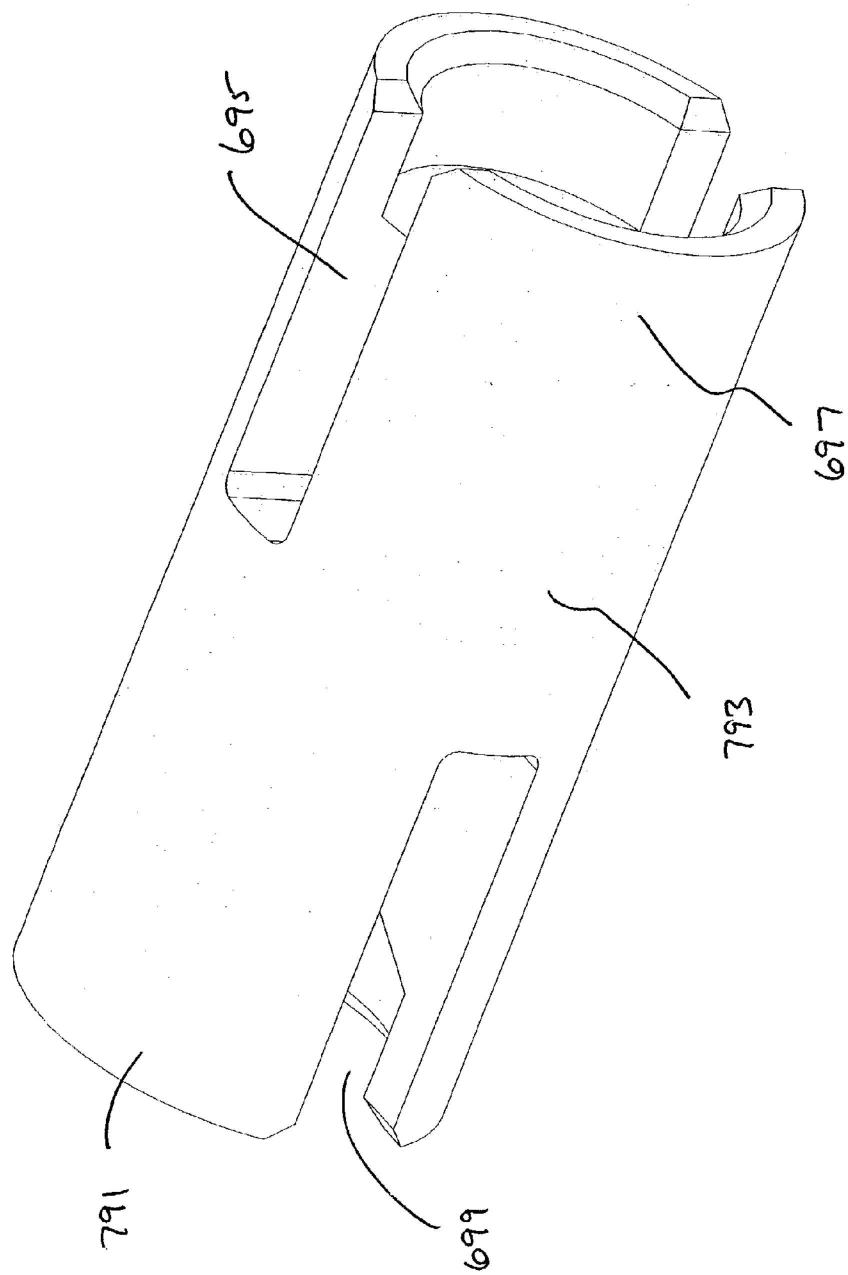

FIG. 98 illustrates flex coupling 793 having slotted bearing shaft connection end 791 with slot 699 receiving lower, dual flat sided flex connector end 736 of bearing shaft 718 (FIG. 92) for a torque transmission connection as shown in FIG. 78. Flex coupling 793 includes drive shaft connection end 697 having a shaft reception slot 695 rotated 90 degrees relative to slot 699 and designed to fully receive the upper, dual flat sided end 772 of drive shaft 770 (FIGS. 78 and 95). Flex coupling 793 allows for accommodation of some misalignment between the bearing shaft and drive shaft, and helps to avoid premature failure of output manifold bearings or the load bearing surfaces of the pump itself.

As seen from FIGS. 77, 78 and 99 and 100, chemical inlet manifold 648 has a recessed region 693 for receiving the above described gerotor pump assembly as well as fastener reception holes 691 that extend through the inlet manifold to provide for connection with outlet manifold 646 in the stacked arrangement shown in FIG. 78 (preferably with a compressed O-ring there between as shown in FIG. 78). FIGS. 99 and 100 also illustrate inlet manifold 648 having flat bottom surface 689 which can be placed on base 42 of the foam-in-bag dispenser. Fastener flange 649 also provides for fastening the pump assembly into a fixed position relative to base 642 (e.g., via fastener holes FA to a suitable flange reception area in base 42). FIGS. 99 and 100 further illustrate chemical inlet port 687 formed in side wall 685 which wall is planar and surrounds port 687 and has fastener holes 683 (e.g., four spaced at corners in the planar wall surface 685). Fastener holes 683 an, planar surface 685 provide a good mounting surface and means for mounting inlet valve manifold 652 shown in FIGS. 101 and 102. Inlet valve manifold is shown to have chemical line angle connector 650 in threaded engagement with housing block 681 having a longitudinal chemical passage 679 with outlet 665 for feeding inlet port 687 of inlet manifold 648 so that chemical can be fed to the gerotor unit. Housing block also has a vertical recess for receiving ball valve insert 677 which is connected at its end to grasping handle 675 (or an alternate handle embodiment as represented in FIG. 78 with handle 675') which is used to rotate valve insert 677 to either align the ball units passageway with the chemical passageway or block off the same. FIG. 101 further illustrates mounting face 673 which has a seal ring recess 669 for receiving an O-ring and also illustrates the outlet ends of fastener holes 671 aligned with holes 683 for releasable, sealed mounting of inlet valve assembly 652 on inlet manifold 648.

FIG. 103 illustrates housing 663 forming part of the hose and cable management system of the present invention. As seen from FIGS. 1-5, cable management housing 663 has a left to right width that conforms to the combined width of solvent tank 402 and extendable support assembly 40 and is also mounted on base 42 so as to provide a compact assembly that is readily mobile to a desired location. As seen from FIGS. 1, 3 and 4 housing 663 houses chemical A pump assembly 44 and chemical B assembly 46 with the exception of the quick connect inlet valve manifolds 652 and 652' connected to heated chemical hose lines 28 and 30. As seen from FIG. 103, housing 663 includes cable side housing section 661 and pump side housing section 569. These two sections are designed to mate together to form the overall housing configuration and have fasteners to connect them together. On the pump side section 659 there is provided quick release access cover 653 which covers over an access cut-out 651 provided in housing 663. In a preferred embodiment, cover 653 is readily removed without fasteners (e.g., a slide/catch arrangement or a hinged door arrangement with flexible tab friction hold closed member (not shown)) and sized so as to provide for direct access to the inlet ports shown in FIG. 99 for the inlet manifolds 648, 648' and the fastener holes 683 and also overlapping valve handles 649, 649' (FIG. 77) for shutting off the outlet lines 43' and 45 leading out from outlet manifold 646. Thus, with the inclusion of inlet valve manifolds 652, 652' at the end of the heated chemical hose lines 28, 30 an unpacked foam-in-bag system can be rolled into the desired location, and the inlet valve manifolds readily fastened to the inlet pump manifolds 648 and 648', and when the system is ready for operation, inlet manifold valve handles 675 and 675' can be opened with handles 649 and 649' also placed in an open position for allowing chemical flow to the dispenser of the foam-in-bag system. If servicing is desired, the valve handles 649 and 649' are closed off to isolate any downstream chemical, valve handles 675, 675' are closed off to avoid any chemical outflow from the heated hoses and the inlet manifold valves 652, 652' unfastened and removed. While in this valve closed situation, the flow of isolated chemical out of the pump head unit itself is minimal, there is also preferably provided block off caps 657, 657' which are fixed in position close to the inlet manifold ports and can be quickly inserted as by threading or more preferably a soft plastic friction fit. Caps 657 and 657' are also preferably fixed on lines to the pump assembly so as to always be at the desired location and FIG. 77 shows capture hooks 655 and 655' for mounting the caps in an out of the way position during non-use.

Hose and cable management means 663 receives within it portions of the chemical conduit hoses 28' and 30' running from the outlet of the in-line pumps to the dispenser and portions of electrical cables that originate at the dispenser end of the heater hoses. Between the dispenser and the management means 663, the cables and hoses substantially (e.g., less than 2 feet exposed) or completely extend within the adjustable support 40. Thus, there are no dangling chemical hoses or umbilical cables outside of the foam-in-bag system's enclosure areas, with the possible exception of the chemical feed hoses 28 and 30, which supply chemicals from the remote storage containers, but can be fed directly from the service to the positioned lower pump inlet (e.g., a protected ground positioning and need not be heated, although a manifold type heater or a hose heater can be provided on the upstream side of the in-line pumps (e.g., to avoid situations where the chemical being fed to the in-line pumps is lower than desired) (e.g., below 65° F.)). A feature of the hose and cable management means of the present invention is that it can accommodate the lift of the bagger assembly which is shown in FIG. 5 in a raised position (e.g., a 24 inch rise from a minimum setting). The ability of the cable management to both enclose and still allow for extension and retraction of the hose and cables provides a protection factor (both from the standpoint of protecting the cables and hoses as well as protecting other components from being damaged by interfering cables and hoses) as well as an overall neatness and avoidance of non-desirable or uncontrolled hose flexing.

In a preferred embodiment there is provided a dual-coil assembly 635 for the cable and hose sections enclosed in the housing. This dual-coil assembly includes one static or more stationary hose (and preferably cable) coil loop assembly 633 and one expandable and contractable or "service" coil loop assembly 631. For clarity, only the chemical coil hoses are shown in the housing in the dual loop configuration although the power cables are preferably looped either together with the hoses or in an independent dual-coil set. In the embodiment shown in FIG. 103 the hoses are marked at appropriate intervals and tied together (ties 629 shown) at these marks to create a static oval (e.g., a 15" to 20" (e.g., 17") height or loop length L and a 7" to 12" (e.g., 10.5") width) coil loop 633 which has its free hose ends 632 and 634 in connection with the internalized pump assemblies' respective chemical outlets. The downstream or non-free end of static loop 633 merges (a continuous merge) into the upstream end of service coil 631 shown having less coil loops of about the same width when the system is at its lowest setting but longer length coils (e.g., 20-30" (24") L X 8-12" (10.5") width). The length of each hose 28' and 30' is preferably less than 25 feet (e.g., 20 feet) and preferably long enough to accommodate the below described chemical hose/heater of about 18 feet ±2 feet in coil assembly with the static loop set having about 3 to 7 coil loops and moving coil 631 preferably having less (but longer length coils) such as 1 to 4 coils with 2 being suitable. Thus, the vertical length of the cable set 631 is vertically longer than the stationary coil set in its most expanded state and the reverse (or equality) is true when the non-stationary coil is in its most contracted state.

Housing section 661 further includes cable and hose guide means 3467 which is shown in FIG. 103 to include separation panel 639 which is fixed in position at an intermediate location relative to the spacing between main panels 647 and 645 of housing sections 569 and 661. Separation panel 639 is shown with a planar back wall (no lower abutment flange unlike the opposite side) facing main panel 645 and an opposite side having mirror image curved mounts 643 and 641 with curved or sloped upper facing surfaces that are designed to generally conform with the generally static or fixed loop curvature of coil assembly 633. Service coil 631 is positioned between panel 639 and housing back wall of section 645 and in an extended states extends down below the lower edge of panel 639. Panel 639 has an upper cut out section 629 which provides space for an overhanging of the fixed loop and service loop merge portion 631 such that the static coil portion is on the opposite side of panel 639 as the service loop. As shown in FIG. 103 the downstream ends 625 and 627 of the internal chemical A and chemical B conduit extensions 28' and 30' within the hose (and preferably cable) manager are arranged to extend vertically out of an open top of the house and into a reception cavity provided in the hollow support 40 positioned in abutment with housing 663 as shown in FIG. 2.

With the hose and cable management of the present invention, as the lifter moves up the service coil assembly contracts and gets smaller (tighter coil), while as the lifter moves down the service coil assembly expands back and gets larger or extends down farther. The hose sections in the static coil are arranged so as to avoid any movement as the movement requirement associated with a lifting of the bagger is accommodated by the larger coil loop or loops of the service coil assembly which, because of the larger size, is better able to absorb the degree of coil contraction involved. The number of each coil set depends upon the lifting height capability of the bagger assembly. In addition the arrangement of the housing and the separator panel help in ensuring proper and controlled contraction and expansion. Preferably the hoses and cables are also banded with colored shrink tubing to aid in the manual process of winding the coils within their respective enclosures or housing sections, which typically occurs in the factory before initial ship out and in limited service situations. Lining up the colored guide bands on each hose or cable will help ensure that the coil is wound correctly as a bad winding can cause serious damage to the system when the lifter goes up, as it can lift with over 500 lb. An additional advantage of the cable and hose management means of the present invention is the protection given to the heater wire lines within each of the chemical hoses extending downstream from the pump assemblies. By isolating the chemical lines, and providing limited and controlled motion for everything inside, the hose manager protects the heater wires from excessive bending, pulling, twisting and/or crushing-that could cause the heater wire to fail prematurely (e.g., these forces associated with uncontrolled movement and improper positioning of the hoses also represents a common cause of broken thermistors in the heater wire line representing one of the most common chemical conduit heater system failures).

FIG. 103 further illustrates mounting block 623 having a first side mounted to the housing and a second side attached to base 42 so the shorter dimension of the housing's base hangs off in cantilever fashion off the back flange of the base. The temperature in the two heated coiled chemical source hoses 28' and 30' in the cable and hose managing means preferably have temperature sensors to facilitate maintenance of the chemical at the desired temperature. The coiled hoses 28' and 30' are each provided with an electrical resistant heater wiring and feed through assembly and extend between the in-line pump assemblies 44 and 46 and output to the dispenser (e.g., manifold 199) or, if an in-barrel pump is utilized, between the in-barrel pump at the chemical source to the dispenser. Providing the chemical to the dispenser at the proper temperature provides improved foam quality. As an example, chemical precursors for urethane foam usually are heated to about 125 to 145° F. for improved mixing and performance (although various other settings are featured under the present invention such as below 125° F. to room temperature through use of catalyst or alternate chemicals, or higher temperatures above 145 degrees F. (e.g., 160 to 175° F. range) of different characteristic foam in higher density polyurethane foam).

FIG. 104 shows the heater conduit electrical circuitry or means for heating the chemical while passing through chemical hose 28' (or 30') provided in the hose management means and coiled for over a majority of their length preferably over 75% of their overall length. FIG. 104 shows heater element 804 having a lead that extends from a schematically illustrated feed through block 807 providing means for separating a chemical contact side from an air side, with the heater element wiring received within the chemical hose and a feed wire extending externally to the feed through 87 to a control component in electrical connection with a source of power as in a 220 volt standard electrical source connection. FIGS. 104 to 110A illustrate various components of the heated chemical hoses 28' and 30' extending for about 20 feet between the outlet of the in-line pumps and manifold 199 mounted on dispenser housing 194. FIGS. 186 and 193 illustrate the control system designed to place and maintain the chemical at the desired temperature at the time it reaches the manifold 199. By increasing or decreasing the amperage level to the below described chemical hose heater the desired temperature can be maintained. Also, with the design of the present invention an 18 foot heater element in the chemical conduit will be sufficient to provide a uniform temperature to the rather viscous and difficult to uniformly heat chemical processors A and B. The electrical heater in the hose extends from its mounting location with the feedthrough (mounted on the dispenser) back down through the coil toward the outlet of the in-line pump (or barrel pump) but need not extend all the way to the pump, as having the control and feedthrough end of the chemical hose heater at the dispenser end allows for the upstream end of the hose heater which first makes contact with chemical in the hose, to be located some length away from the pump source end such as more than 18 inches (which avoids an insulating wrapping of that end of the hose heater).

FIG. 104 illustrates feedthrough 807 in electrical connection with the control board with electrical driver and temperature sensor monitoring means by way of a set of wires extending from the air side of feedthrough 807. FIG. 109 illustrates electrical cable 801 received within the air side potting AP and the chemical side potting CP, with the potting epoxy utilized being suitable for the temperatures, pressure and chemical type involved such as the chemicals A and B. A suitable epoxy is STYCAST® 2651 epoxy available from Emerson Cumming of Billenca, Mass., USA.

The electrical cable set 801 is comprised of four separate leads 801A, 801B, 801C, 801D with 801A providing the electrical power required for heating the heater element 804 to the desired temperature and with 801B in communication with the return leg extending from the end of the heating element that is farthest removed from the feedthrough 807 and with 801C and 801D, providing the leads associated with the thermistor (or alternate temperature sensing means). The control schematic of FIG. 193 shows the chemical hose heater driver circuit and temperature monitoring sub-system of the control system of the present invention. FIG. 104 also illustrates in schematic fashion the control means 803 which is preferably provided as part of an overall control console or board for other systems of the illustrated foam-in-bag assembly as shown in FIG. 186. The driver for the hose heaters preferably receive power from a typical commercial grade wall outlet. When the heater element of the present invention is drawing full power (e.g., at start up to get the chemical up to the desired temperature), the voltage differential from one end of the heater coil to the other is typically the full AC line voltage, which varies depending on local power with a heater coil drawing at about 9 amps at 208 volts AC. FIGS. 107 and 108 illustrate the feedthrough plate alone while FIG. 109 illustrates feedthrough connector assembly 810 having feedthrough 807 comprised of an outer feedthrough housing block 812 and an interior insert 814 preferably formed of a material that is both insulating and can be sealed about the terminals (e.g., a molten glass application, although other insulating means as in, for example a material drilled through with an adhesive insulative and sealing injectable material filling in a gap) as shown in FIGS. 107 and 108 with the illustrated glass insert having extending therethrough to opposite sides terminals $T_1$ to $T_4$. As shown terminals $T_1$ and $T_3$ are more robust or larger terminals and are designed to handle a higher amperage than the smaller pins $T_2$ and $T_4$ with the larger preferably being 12 amp terminals and the smaller preferably being 1 amp terminals. Terminals $T_1$ to $T_4$ extend out to opposite sides of the feedthrough and are embedded in the AC and AP pottings providing casings with casing CP covering all exposed surfaces of the chemical side of terminals T1 to T4 and the associated wire connections shown bundled on the chemical side and generally represented by BS. Casing AP or the opposite side also cover all exposed surfaces of terminals T1 to T4 as well as the wire lead connections (e.g., solder and exposed wire portions) so as to leave no exposed, non-insulated regions susceptible to human contact (a deficiency in prior art systems).

FIGS. 109A, 109B, and 109C illustrate feedthrough connector 810 in combination with dispenser connection manifold DCM. As shown in FIG. 109B, feedthrough plate 807 is secured (note corner bolt fastener holes) to an end of manifold DCM. As shown in FIG. 109C, dispenser connection manifold DCM for one of the chemicals (e.g., A) as well as the corresponding dispenser connection manifold DCM' are secured at their projections PJ having central chemical port CCP (adjacent bolt fastener apertures to each side). FIG. 104 also illustrates relative to the chemical side of the feedthrough which is received within the chemical hose 28' and 30', the coiled resistance heater 804. FIG. 109A provides a cut away view of the heated chemical hose manifold 1206 (see FIG. 14A for an illustration of its mounting on the dispenser together with the other chemical hose manifold 1208) which houses feedthrough connector assembly 810. FIG. 109A also shows the coiled heater element 804 received directly in the chemical side potting CP and connected to one of the robust terminals (e.g., T1) while the return leg wire (not shown—included together with the thermistor wires on the chemical side 801C' and 801D') traveling in the interior of the coil extends through the potting CP and is connected to the other robust terminal (T3). The last 18 to 24 inches of the coiled heater wire extending from the chemical potting is preferably wrapped or coated or covered in some other fashion with an insulative material as the chemical B is somewhat conductive and thus this covering avoids leakage in the area of metal components such as the receiving manifold 1206. The remained of the coiled heater wire need not be covered (except for perhaps the run out portion of the wires extending out of the heater coil wire to bypass the thermistor head which occupies much of the interior of the coiled heater wire) thus saving the expense and cost associated with prior art heater coils extending from the pump end toward the dispenser. This wrapped end WR is represented in FIG. 109 but is removed in FIG. 109A for added clarity. The opposite cable group 801 on the air side extends a short distance (e.g., less than 2½ fee such as 2 feet) to the controller thus reducing umbilical line cost for the heater element. FIG. 109A further illustrates O-ring or some alternate seal received with an annular recess ORR in the feedthrough contacting end of manifold 1206 and placed in sealing compression against feedthrough upon fastening the two together. Thus chemical being fed through chemical hose 28' exits the end of the hose 28' at the enlarged head HE with manifold engagement means (e.g., a threaded connection of a male/female connector—not shown). Also, although not shown in FIG. 109A, the solvent entering the chamber in manifold 1206 is fed out of the chemical port CCP shown in FIG. 109B and into the main manifold 199.

FIG. 106 provides a cross-sectional view taken along line H-H in FIG. 109 showing the wires 801B', 801C' and 801D' and heater coil 804 received within hose casing HC which is a flexible and includes a Teflon interior TI and a strengthening sheath SS and outer covering OC. Although not shown for added flexibility the outer housing preferably has a coiled or convoluted configuration which extends to the interior conduit surface and which improves flexibility despite the fairly high pressures involved. The convolutions form a non-smooth, corrugated or ridged interior surface in the liner TI's interior surface (see below regarding the modified coiled heater element free end insert to facilitate the feed in of the coil into the hose conduit).

Teflon inner lining has a preferred ½ inch of open clearance for chemical flow and reception of the thermistor and heater wires. The illustrated hose 28' is designed for handling the aforementioned pressures for the pumped chemicals (e.g., 200 to 600 psi) together with the flexibility required associated with the described environment including pressurization and bending requirements. Stainless steel swivel fittings (JIC or SAE type) are preferably provided on each end of any fittings between a chemical hose and any inlet manifold or other receiving component of the chemical pump assembly. The illustrated internal heater 804 is designed to be able to heat the chemical derived from the source which is typically at room temperature (which can vary quite a bit (e.g., −30 to 120° F. depending on the location of use) and needs to be heated to the desired temperature (e.g., 130° F.) before reaching the dispenser mixing chamber—with a length of 20 feet for the chemical hose being common in many prior art systems. In a preferred embodiment, an internal resistance heater wire 804 is snaked through the chemical hose conduit and is not physically attached to the inside diameter of the hose and the heater element of the heater wire is formed of uninsulated wire with a coil configuration being preferred and with a round or rectangular wire configuration (e.g., a ribbon wire) also being preferred. A preferred material is Nichrome material for the chemical hose heater wires.

The coiled heater element section of the heater wire received in the hose has a length which is sufficient to achieve the desired heat build up in the chemical but unlike the prior art arrangements (wherein the electrical connections are at the pump end and the heater wire had to extend for about the same length of the chemical hose to avoid cold shot potential), the present invention does not have to match the length of the chemical hose as there can be an unheated upstream section in the chemical hose leading up to the closest, first chemical end tip of the heater wire. The outside diameter ODW (FIG. 106) for the heater coil (e.g., 0.35 inches) is made smaller than the hose fittings which the heater coil must be passed through.

As shown by FIGS. 110 and 110A, the feed out leads 801C and 801D' extend out from terminals $T_2$ and T4 (less robust terminals) within the chemical conduit out to a chemical temperature sensor 828 assembly, which in a preferred embodiment includes a thermistor sensor THM glass rod thermistor device 830 encapsulated within thermistor casing 832. Glass rod thermistor device preferably comprises a 0.055 to 0.060 diameter glass rod thermistor device 830 of a length about 0.25 inches with less than a half of its overall length exposed (e.g., a ¼ length exposure or 0.09 of a 0.25 inch long rod) by extending axially out from the central axis of the illustrated cylindrical casing 832. Running internally within glass rod 830 is a pair of platinum iridium alloy leads (PI) leading to the thermistor sensing bead BE which is positioned at (and encompassed by) the end of the glass rod. The thermistor device is preferably rated at 2000 ohms at room temperature with a +/−0.5° F. accuracy and is designed for operating at high efficiency within a 125 to 165° F. range. The glass bead BE is provided within the thermistors glass casing which is designed free of cracks and bubbles to avoid undesirable chemical leakage to affect the bead. The thermistor device is further rated for a liquid environment of up to 1000 psi and designed to withstand the potential contact chemicals as in water, glycols and polyols, surfactants, and urethane catalysts and being able to operate within an overall temperature environment of 32 to 212 degrees F.

Thermistor casing 832 is preferably formed of epoxy (e.g., an inch long with a diameter which allows of insertion in the heater element coil—such as a 0.190 inch diameter) which encapsulates the leads 801C', 801D' (e.g., two foot long wires with 24 AWG solid nickel conductor with triple wrap TFE tape and with etched end insulation for improved bonding to epoxy). Inside casing 832 is also the noted portion of the thermistor glass rod 830 and stripped nickel leads 834 bowed for strain relief and welded or silver soldered to the platinum thermistor leads 836 with the latter extending both through the cylindrical casing and having a preferred thickness of 0.002 to 0.004 inch diameter and preferably welded or soldered to the nickel leads. The epoxy forming the casing is preferably transparent or translucent and should be thermal expansion compatible with the glass rod so as to avoid cracking of the same under thermal shock. As depicted in FIG. 193, the hose temperature control system senses the chemical temperature by measuring the resistance of the thermistor bead centered in the heater coil. The thermistor is designed to change resistance with temperature change, with a preferred design featuring one that has 2000 ohms at room temperature (e.g., 70° F.), and about 400 ohms at 130 degrees F.).

FIGS. 105 and 105A illustrate in greater detail a section of heater wire 28' (or 30' as they are preferably made in universal fashion) with outer hose conduit casings removed to illustrate the heater means received within that casing along having coiled heater wire 804 and associated wiring having a thermistor sensing means 828 (FIG. 110). FIG. 105 illustrates the section of chemical hose 28' in which the thermistor extends and thus includes a heater element return leg detour wherein the return leg 838 extends from its travel within the conduit to run for a period out of the coiled heater wire 804 so as to run parallel for a period and then and extends into connection with a corresponding (unoccupied) one of the heavy duty terminals T1 or T3. Return leg 838 is preferably made from an insulated piece of round Nichrome or Nickel wire in a non-coiled form with suitable insulation as in PTFE of PFA insulation, in extruded or wrapped tape form. The return leg 838 that is opposite the one attached to the feedthrough terminal is attached to the end of the heater coil that terminates as coil. The heater coil and the return leg combine to close the heater circuit, so the same current that flows through the heater coil will also flow through the return leg.

As shown by FIG. 105, since the thermistor and leads for it extend from electrical connections at the dispenser end of the heated conduit the thermistor sensor's bead BE is placed in direct contact with the incoming flow of chemical. This provides for a fast response to changes in chemical temperature. That is, if the thermistor bead on the end face of the epoxy cylinder faces away from the flow as it is in prior art systems, its thermal response time will be increased, and accuracy of the temperature control will suffer. In other words prior art systems that extend the thermistor from the in barrel pump toward the dispenser instead of the opposite direction of the present invention fail to place the temperature sensor in contact with the incoming chemical flow direction unless an effort is made to reverse the direction in a prior art system which is a difficult and time consuming job that that can readily result in breakage of the delicate thermistor rod. In addition, the arrangement of the present invention is unlike prior art systems where the thermistor leads have to be taken outside the potted thermistor assembly and changed in direction by 180° as they exit the coil and run along together with the return leg. This 180° redirectioning was difficult to accomplish without damaging the coil or the thermistor leads. The prior art also featured Teflon shrink tubing in this difficult to manufacture section of the heater wire with Teflon shrink tubing being a material difficult to work with from the standpoint of high temperature requirements (in excess of 600° F.), requirements for adequate ventilation to remove toxic fumes, and uneven shrink qualities which can necessitate reworking.

As seen from FIG. 105, only the return leg for the heater coil runs outside of the hose around the thermistor assembly and the thermistor leads never have to leave the inside diameter of the heater coil and do not have to be looped 180 degrees to face the thermistor into the direction of chemical flow. In the transition zones (840, 842), where the return leg 838 exits and re-enters, the chemical hose and exiting or entering portion of the wrapped return leg is covered with ordinary (non-shrink) tubing as in Teflon tubing. Also, because of the positioning of the thermistor assembly (e.g., exact location within two feet of the in-line pump assembly if utilized or the dispenser if an alternate pump system is utilized which is a location positioned internally within the chemical hose and at a location not normally flexed or bent).

Accordingly, under the present invention, the thermistor is not as easily subject to mechanical damage when the chemical hose is flexed in its vicinity. This enhanced thermistor reliability is advantageous since flexing is a leading cause of thermistor failure, which is the foremost cause of heater wire failure, and changing heater wires is a difficult, time consuming, and messy job, so avoiding such failures is highly desirable. Also, there are advantages provided under the design of the present invention of having the heater wire connections (e.g., heater wire feedthrough) of the present invention positioned close to the electronics control (e.g., control board) to preferably within 4 feet and more preferably within 2 feet. In this way, the length of the electrical umbilical therebetween can be significantly reduced down-from a standard 20 foot length in the industry to about 2 feet for example. Also, the umbilical cables are contained in the above described cable and hose management system, which avoids added complications such as having to use robust (SJO rated) wiring, because of the protective inclusion of the cable within the enclosure. An added benefit in the ability to place the shorter length umbilical connection within the housing 636 (e.g., formed of sheet metal) provides protection of the same from electromagnetic interference (EMI) from the outside world and emits less EMI to the outside world such as other controlled systems in the foam-in-bag system. This feature enhances reliability and provides for easier certification as under the European CE certification program concerning EMI levels. A reduction down in the length from, for example an 18 foot long prior art umbilical cord with thermistor leads down to, for example a 2 foot length umbilical with significant cost savings relative to the often custom engineered, triple insulated wire, with nickel conductor.

FIGS. 112 and 113 illustrate an additional feature of the present invention associated with the heated chemical hoses 28' and 30' which have convolved interior surfaces. FIG. 112 illustrates an alternate free-end chemical hose insertion facilitator 844. FIG. 112 shows a generally spherical tip 844 (e.g., referenced as the "true ball" embodiment) which is preferably comprised of Teflon body which is machined or otherwise formed. As seen from FIG. 113, tip 844 has a heater coil insertion facilitator end 846 and a chemical hose insertion end 848. In the illustrated embodiment end 846 has a cylindrical configuration with sloped insertion edge 850 and a spherical or ball shaped end 848 connected to it. This arrangement provides for a rapid connection of end 846 in the free end of the heater coil as in, for example, a crimping operation wherein the insertion end 846 is crimped within the confines of a portion of the free end of the coiled heater element 804. This design also avoids a requirement for shrink Teflon tubing or any type of tubing or wrap as the ball tip end is positioned far enough away from the end of the chemical hose so that leakage currents are negligible. The relative sizing is such that the ball tip diameter has a diameter that is larger than that of the heater coil diameter but smaller than the inside diameter of the hose conduit 28 and any hose fittings to provide for threading the heater coil within the protective sheathing. For example a size relationship wherein the inside diameter of the hose conduit lining (e.g., Teflon) 802 is about ½ inch, the ball diameter is made less than 0.5 inch and sufficient to allow for chemical flow (e.g., 0.2 to 0.30 inch, which generally corresponds to its axial length (e.g., a less than 20% slice in the true ball configuration and placed flush with the front end cylindrical extension). The cylindrical extension 846 preferably has a ½ inch axial length and a 0.20 inch diameter. The thermistor cylinder described above preferably has a 0.22 inch diameter. Other means of attachment than crimping include, for example, mechanical fasteners and/or adhesives or threading inserts, wrappings, formations, etc. The insertion facilitator 844 of the present invention provides for enhanced heater wire sliding or insertion through the braided flex cable 28 (or 30) relative to prior art designs such as the ones where the coil end is provided with a potted cylindrical block with a non-bulbous, generally pointed end. The present invention's design avoids the tendency to have the inserted pointed end of the prior art tip to catch along the hose convolutions.

FIG. 114 shows an alternate embodiment of a chemical hose insertion end 844' (corresponding components being similarly referenced label with an added dash) formed from a rod of Teflon material. As in the earlier embodiment the axial length of the coil insertion end (which extends away from the bulbous insertion end) is preferably between a ½ inch to one inch (V1) to provide sufficient crimping or securement connection surface area. The maximum diameter V3 of the bulbous hose insertion smoothly contoured end 848' is preferably about 0.260 inch, while the smoothly contoured head (half oval cross-section) has an axial length $V_2$ of abut a ¼ inch with $V_4$ for extension 844' being about 0.20 inches to provide for a tight fit in the heater coil 804 before being crimped.

With reference back to the earlier described FIGS. 2 and 16-21 and the below described FIGS. 115 to 138, there is described a preferred embodiment of a film unwind system of the present invention. FIGS. 115 and 116 provide a cross sectional view of the film support means 186 with support extension 222C of spindle 222 supporting film roll 220 locked in position thereon and with spindle supported engagement member 232 providing driving communication from the web tension drive transmission 238 directly to film roll via a film roll core insert. Under the present invention web tension is monitored and controlled with the controller sub-system illustrated in FIG. 192 (preferably in conjunction with the controller sub-system 191 used for film advance and web tracking). Web tension motor 58 is mounted on spindle load adjustment means 218 (FIG. 16) that includes hinge section 242 or a support-to-spindle connector for achieving the previously described spindle load rotation between a load and film unwind state. FIGS. 115 and 116 illustrate in greater detail the rotation drive arrangement for the spindle which includes web tension drive transmission 238 with main gear 900 encircling stationary support shaft extension 906 extending axially in and is received by hub pocket HP (FIG. 15) formed in load support structure 240 and is fixed there with fastener 908 Attached to main gear (e.g., see fastener 911 in FIG. 115) is stub shaft 910 which rotates together with main gear 900. Between fixed axial shaft 906 and the rotating stub shaft there is located first roller bearing 912. Stub shaft 910 includes a free end minor step down over which is slid and fixed in position the illustrated radially interior cylindrical extension sleeve 914. At the free end of fixed axial shaft 906 there is located a second roller bearing 915 which is in bearing contact with the rotating interior cylindrical extension sleeve 914.

FIGS. 115 and 116 further illustrate spindle spline drive 917 which includes engagement member 232 and outer sleeve 918. Engagement member 232 is shown independently in FIGS. 117 to 122 while FIGS. 115 and 116 show spindle spline drive 917 received by fixed interior cylinder 914 in a rotation transmission manner when the sliding or telescoping sleeve 918 is locked in position via locking fastener 934, but with the capability to axial slide along sleeve 914 when locking fastener 934 is released. The interior annular surface 924 of outer cylindrical sleeve 918 is mounted over and onto the outer flange extension 920 of engagement member 232 of spindle spline drive 917, and fixed in position through use of fasteners 921 extending through fastener holes 922 shown formed in a thickened base region 926 of engagement member 232 as best shown in FIG. 120. Fasteners 921 are threaded through fastener holes 922 into threaded reception holes formed in the abutting edge of outer cylindrical shaft 918. Radial extension flange 928 extends radially off base region 926 out for a distance sufficient for film roll contact retention as shown in FIGS. 115 and 116. Thus, when fastener 934 locks cylindrical sleeves 914 and 918 together, the connection of engagement member 232 to outer sleeve 918 provides for transmission of the rotation gear 900 and stub shaft rotation to roll 20. Intermediate cylindrical shaft 932 has an inner surface which is concentrically spaced relative to the outer surface of interior cylindrical sleeve 914 and has an open forward end into which is inserted the base of roll lock assembly 228. The free end of the outer cylindrical sleeve 918 has a radially inward extending annular bearing ring BR in contact with sleeve 932.

FIGS. 115 and 116 illustrate a relatively short (e.g., 12 inch roll) extension state in the roll support wherein there is spacing "SP" between the interior end of stub shaft 910 and the engagement member of spline drive 917 (e.g., 6 to 10 inches). Upon detaching locking fastener 934 (one or a plurality of circumferentially spaced fasteners), the combination of engagement member 232 and outer sleeve 918 can be slid to reduce spacing SP while annular ring BR slides on sleeve 932. When SP is reduced down a sufficient amount, drive spline 917 is sufficiently placed away from the opposite core plug 977 location to handle a larger axial length roll, (e.g., a 19 inch roll). For example, with spacing SP down to 0 to 6 inches, there is a provided a more elongated roll length support arrangement. In a preferred arrangement SP is reduced by 7 inches to switch from a 12 inch roll to and 19 inch roll. Upon such a reduction of SP empty fastener hole 934' becomes aligned with empty thread hole 934' and fastener 934 inserted to lock into the mode.

Thus, spindle 222 is comprised of a plurality of cylindrical sleeves that fit tightly into a telescoping assembly, either extending or contracting to provide for different film width usage on the same support spindle. The ability to adjust for different film width provides the overall system with much greater versatility then prior art systems, with the ability to drive the roll adding web tensioning capability having the below described advantage. While only two roll film widths (e.g., 12 inch and 19 inch) are illustrated in the preferred embodiment, variations are featured under the present invention including the number of adjustment options (e.g., three, four, five or more) or limiting the device to one size whereupon the telescoping arrangement can be removed, or various other roll width support adjustment means being provided as in a helical groove having a series of holes with a spring electronically controlled latch or with a geared or hydraulic telescope arrangement as means for adjusting spindle roll reception length as a few examples.

As noted FIGS. 117 to 121, engagement member 232 of spline drive 917 (which is preferably a plastic or metal molded member as in a casting or plastic injection mold product) features a plurality of locking members 952 which are shown in the referenced figures as being a plurality of protrusions spaced (preferably equally) about the circumference of base region 926.

In a preferred embodiment the protrusions or means for engaging are teeth shaped and feature a sloped lead in section 964 and a tooth base 962 presenting a straight line side contact surface extending parallel to the axis of rotation. Also in a-preferred embodiment the lead in sections 964 are provided by a triangular extension with the apex positioned at a location spaced farthest from the base, with the apex shown being one that is circumferentially centered relative to the opposite straight side walls of the base presenting a "house profile" plan configuration. The base is preferably at least about 50% and more preferably about 60-80% of the total axial length of the tooth to ensure good rotational engagement with the corresponding roll plug 977 described below, which in a preferred embodiment features similar shaped teeth pointed in the opposite direction such that the triangular, sloped or divergent apex portion are less than the total base axial length. In this way, there is a portion of base side wall to base side wall contact between the teeth of the roll core plug and the teeth of the spline drive engagement member. Also, there is preferably a friction fit contact between the adjacent base portion of the roll film drive plug received within the roll film core and the base of the spindle spline drive or engagement member 232 (a minimum of circumferential play, as in less than a ⅛ inch play, between adjacent most different source teeth enhances web tension control is preferred). For example, in a preferred embodiment there are 12 teeth on each of the roll drive plug (997, FIG. 12) and the spindle drive spline engager each occupying about 15° of the supporting base surface for the radially protruding teeth and each spaced by about 15° so as to provide a no play circumferential engagement that is preferred for good web tension control relative to the offset but similarly spaced teeth of the below described roll insert. A variety of alternate roll film drive plug and spindle drive spline engagement means are also featured under the present invention such as a set of deflectable tabs that preferably have curved or cammed surfaces designed for receipt within reception cavities in one or the other of the interengaging members with the deflectable cam surfaced tabs being adjustable in the axial direction with sufficient separation force but arranged for non-adjustable rotational drive engagement. Alternate engagement means includes, for example, axially extending pins or fasteners in one that are received in corresponding recesses in the other for rotational drive engagement.

The mate and lock means of the present invention, illustrated by the intermeshing protrusions for each of the spindle drive spline and roll drive spline (997, FIG. 132), with the web tension motor 58, facilitates providing a positive drag or drive to the film 216 (FIG. 14B) of the film source roll 20. For if the core 188 (FIG. 12) were allowed to slip on the outside diameter of roll spindle 222, web tensioning at the preferred level of control would be made more difficult to achieve. Spindle spline drive engager 232 is thus sized to properly mate both axially and radially with roll film drive 997 which in turn is preferably sized to provide a no slip interrelationship relative to the core 188 having the film wrapped thereon.

FIGS. 117 to 121 illustrate engagement member 232 (monolithic preferred but can be multi-component as well) of spline drive 917 well suited for providing accurate web tensioning and having a cylindrical section 938 extending the full axial length from radial base 926 out to the rim 940 with a smooth interior surface 924 which provides for the axial adjustment shown in FIGS. 123 and 124 when the locking fastener 934 is disengaged. As seen from FIG. 118, radial extension flange 928 extends radially out from the base end of cylindrical section 938 and has a roll side surface out from which extends thickened base region 926 (forming teeth 952) that extends toward rim 940 but ends axially short of rim 940 so as to define step down wall 942 (FIG. 120). Step down wall 942 extends radially inward into the thinner cylindrical free extension portion 920 of cylindrical section 938 (while the preferred embodiment features a cylindrical configuration for the spindle and roll drives, various other configurations are also featured under the present invention which are compatible with a supported film source as well as various other meshing arrangements which provide for rotational drive transmission while preferably also allowing for axial sliding off and on of rolls when roll latch 228 is released).

FIGS. 118, 120 and 121 further illustrate fastener holes 922 being aligned so as to open out at open ends 948 (FIG. 120) close to the radial inner edge of step down wall 942 where, upon insertion of outer cylindrical shaft 918 with its rim thread apertures (FIG. 116), fasteners 921 can be inserted through the four holes (with enlarged fastener head end recesses 950 as shown in FIG. 120) and threaded into aligned holes in the rim of outer cylindrical shaft 918. The fastener holes are shown in FIGS. 120 and 121 as being aligned with the thickest regions of the thickened base region where the teeth 952 are formed. With reference to FIG. 122 there can be seen teeth 952 and the parallel straight edges 954, 956 at their base and the sloping mating initiation edges 958, 960. As seen from FIG. 122, thickened base region 926 preferably represents about ⅔ of the entire length of cylindrical section 938 with a ⅓ of that length represented by free extension portion 920 with exterior surface 944. Within the exterior surface of thickened base region 926, the tooth base 962 represents about ⅔ of the axial length of thickened base region 926, with the remaining ⅓ occupied by the sloped mating tooth portion 964 (shown separated by an imaginary dashed line in FIG. 122).

FIGS. 125 to 129 provide additional views of embodiments of roll latch (or roll retention latch) 228 with the cross sectional view of FIG. 128 illustrating its mounting on the end of cylindrical shaft 932. Roll latch 228 includes outer housing 966 having a handle adjustment slot 983, an upper handle reception recess 963, an interior central recess 969 for receiving axial adjusting and biased pivot ball contact plate 968. Plate 968 is shown attached to housing 966 by way of a plurality of springs 990 (FIG. 129) and slidingly received within cylindrical recess 972 formed in insert plug 974. Insert plug is attached (e.g., screw(s) 975) to the open end of tubular shaft 932 and has a Z-shaped cross section so as to share a common peripheral surface with that of shaft 932 at its outer end and to provide a stop or limit to plate 968. Housing 966 is fastened to plug 974 by way of fasteners 976. Ball end securement means 978 receives and captures the pivotable ball 980 of lever 982. Lever 982 has an opposite end section extending into an axial cavity in the handle 984. Handle 984 further includes a curved lower end 986 which functions in cam fashion to facilitate movement between a lock mode wherein the handle is in contact and fixed in position on a peripheral edge of the housing's cavity 963 and slot 983 and plate 968 is pulled axially within housing 966 so as to compress biasing springs 990. This positioning causes sliders SL to move causing an outward rotation of the radially adjustable retention members or catch levers 988 in to a roll lock position as shown in FIG. 127.

Upon on operator adjusting the handle so as to have the handle cam surface move from the periphery of the housing into handle catch recess 963 the springs are free to axially move the plate away from the housing causing the sliding pins to draw in the locking levers upon contact with the pivotable lever ends and counterclockwise rotation of the levers. Thus upon adjustment of the handle, catch levers 988 (preferably three or four equally circumferentially spaced about the housing) are moved between the above noted lock location and into an unlocked location wherein the handle lever is generally aligned axially with the central axis of shaft 932 and received within handle cavity 963 with the latches 988 in a retracted state allowing for the removal or insertion of roll core 220. As shown in FIG. 126 a spherical ball 984 without surface extension 986 is suitable as well for the handle. A comparison of plate 968 in FIGS. 125 and 126 illustrates the sliding axial adjustment that is relayed by slider pins 992 into radial adjustment of catch levers 988. FIG. 126 also illustrates three catch levers in operation.

FIGS. 130 and 131 provide a perspective and a cross-sectional view of roll assembly 994 (a 12 inch version illustrated although a, for example, 19 inch version would have the same features but for an axially longer core and film roll) comprising core 996 (e.g., a 4" outer diameter core) with roll film drive or core plug 997 and roll support core plug 998 positioned at the opposite open ends of core 996.

FIGS. 132 to 134A illustrate roll film drive core plug 997 designed for mounting and rotation transmission with spindle spline drive 917 as described above. As shown in the cross sectional view of FIG. 134, roll film drive core plug 997 includes a peripheral flange 995 having a core plug rim contact surface 996' for limiting the degree of insertion of core plug in core 996. The core plugs at each end are preferably sized for tight frictional fit with the interior surface of the core which are preferably formed of a cardboard material, although friction enhancing serrations or some other more permanent position retention means as in fasteners or sharpened catches, spring biased tabs are also featured under the present invention. Alternatively, non-disposable cores can be manufactured out of plastic or the like combining the core and core insert compounds into a single monolithic device.

Figure 132:
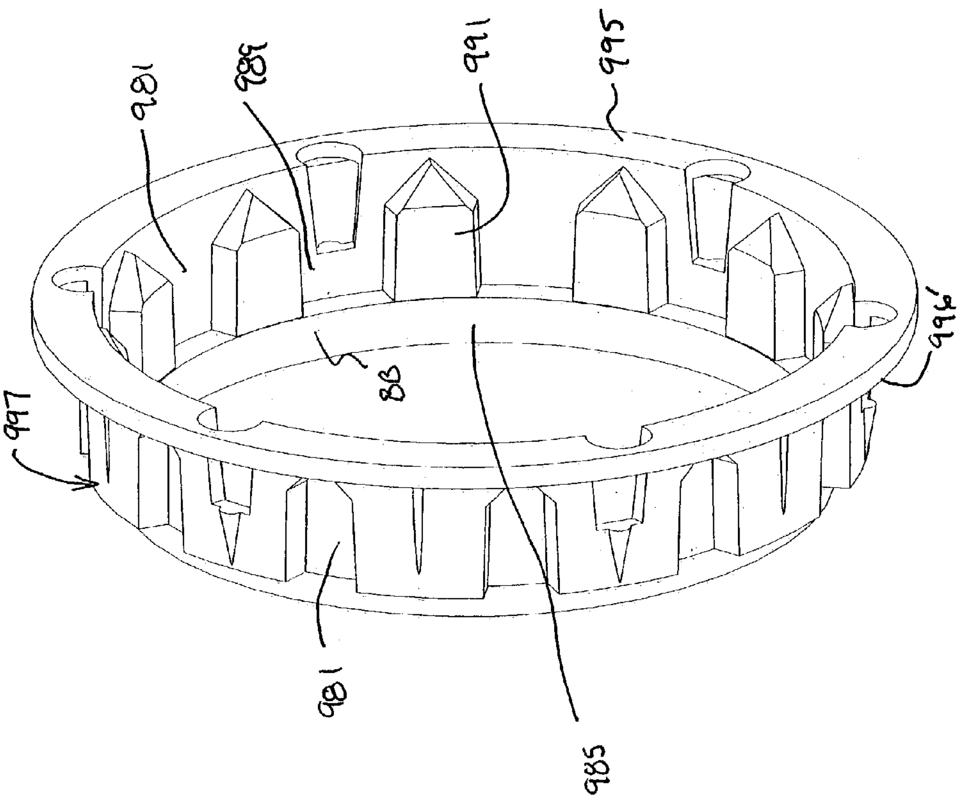
Figure 133:
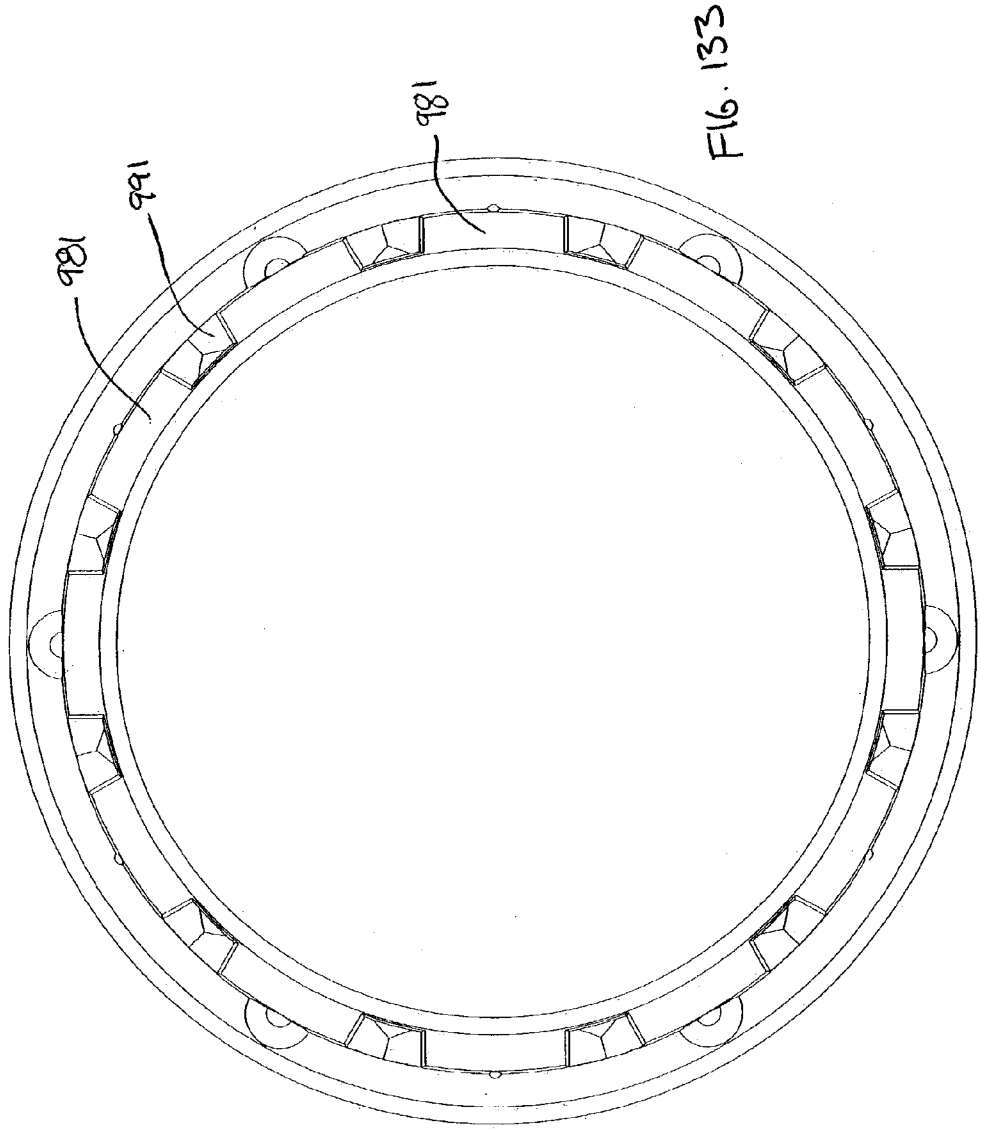
Figure 134:
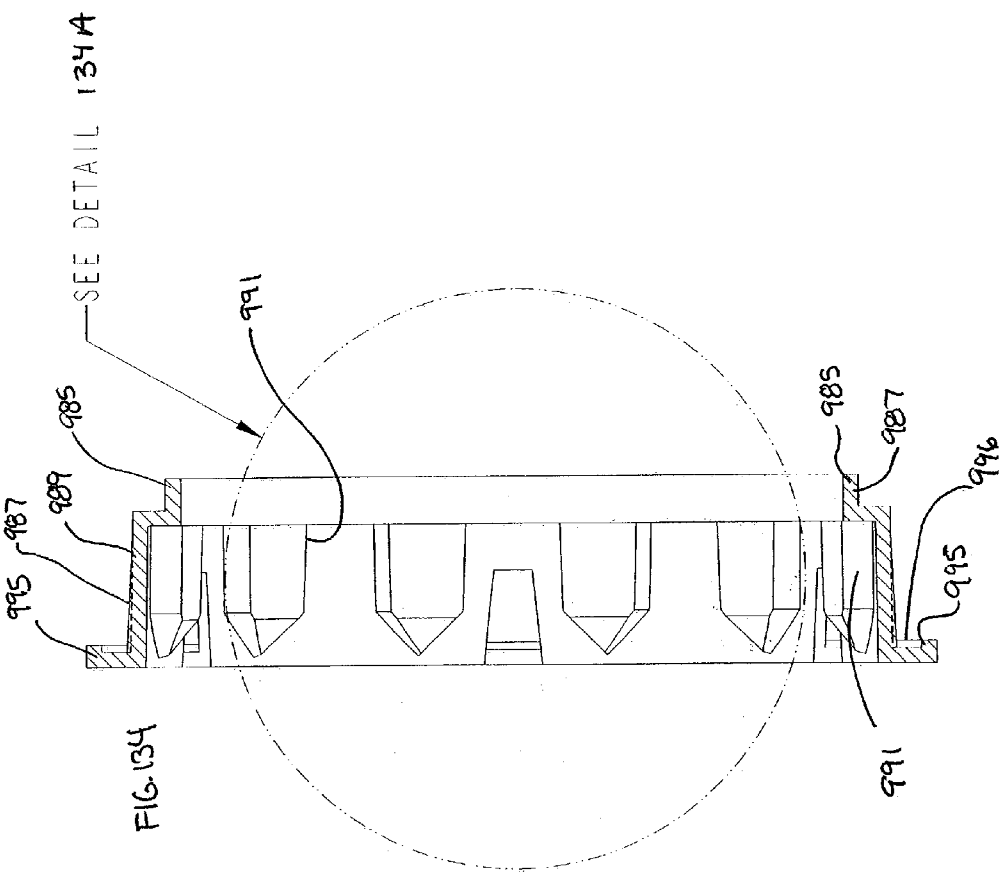
Figure 134A:
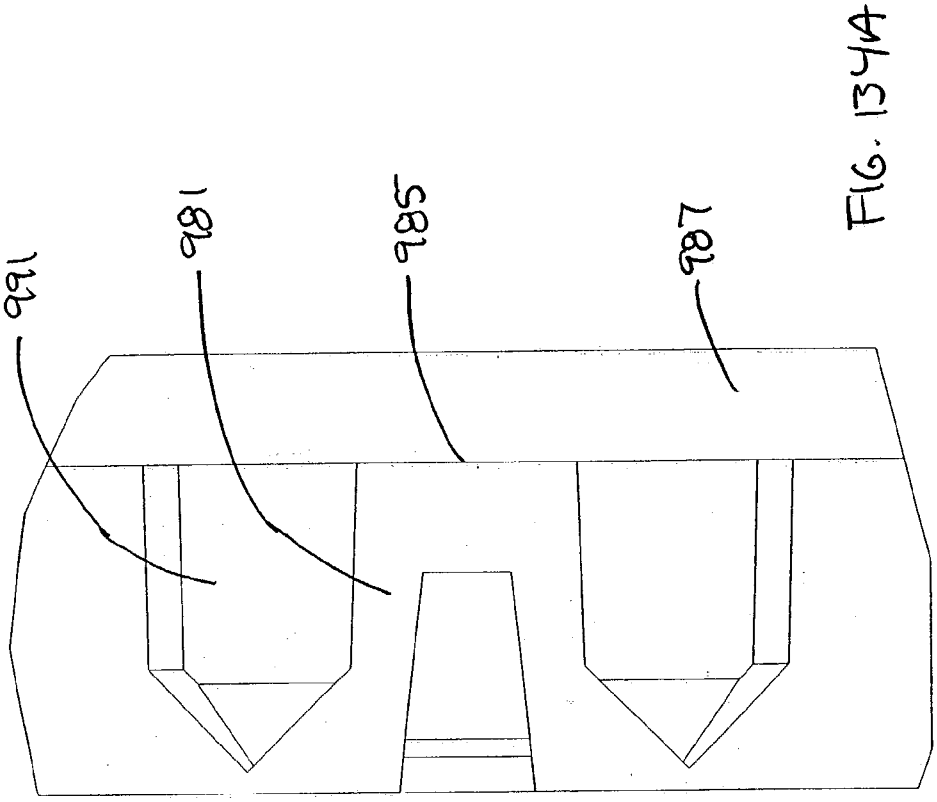
Figure 135:
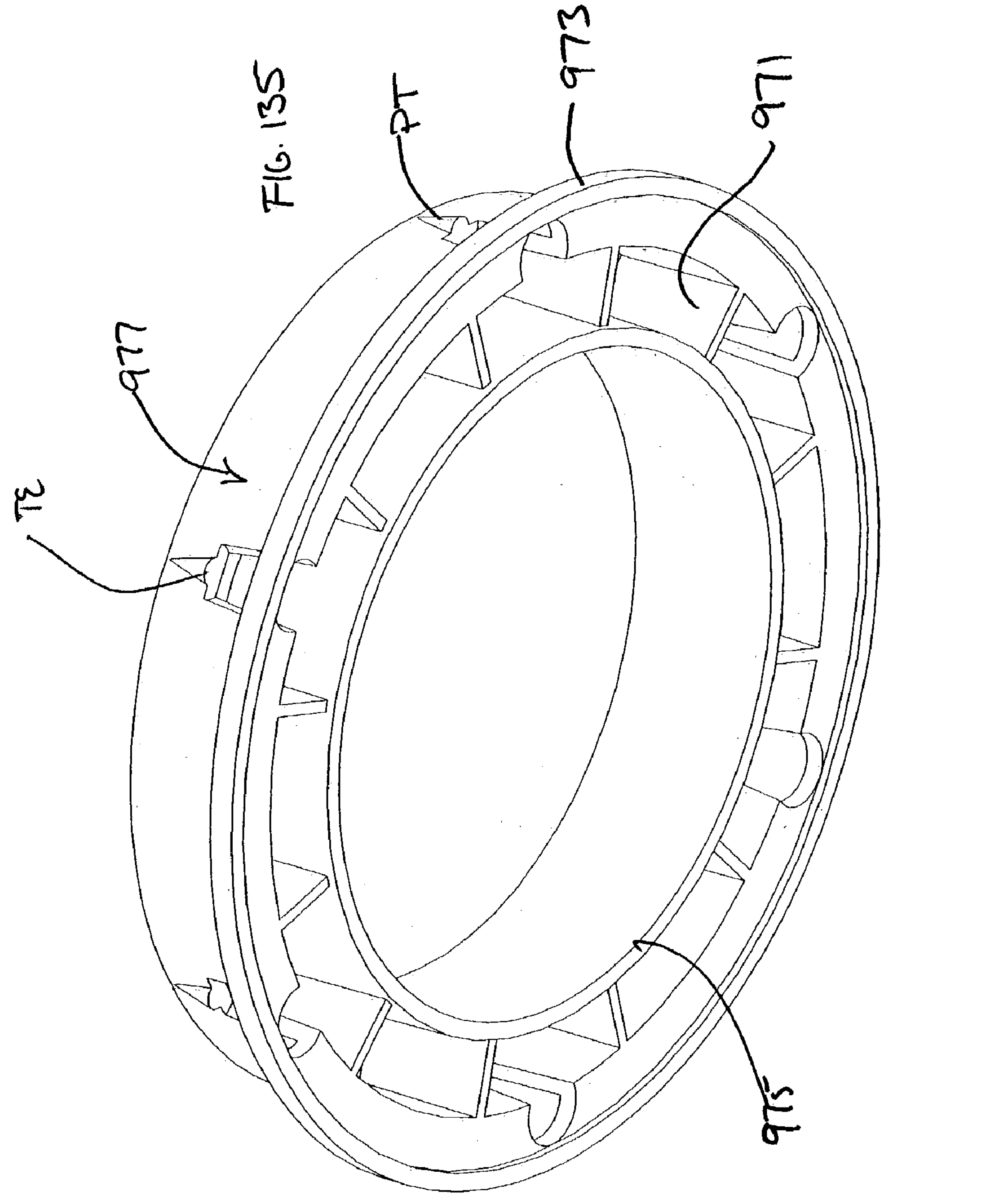
Figure 136:
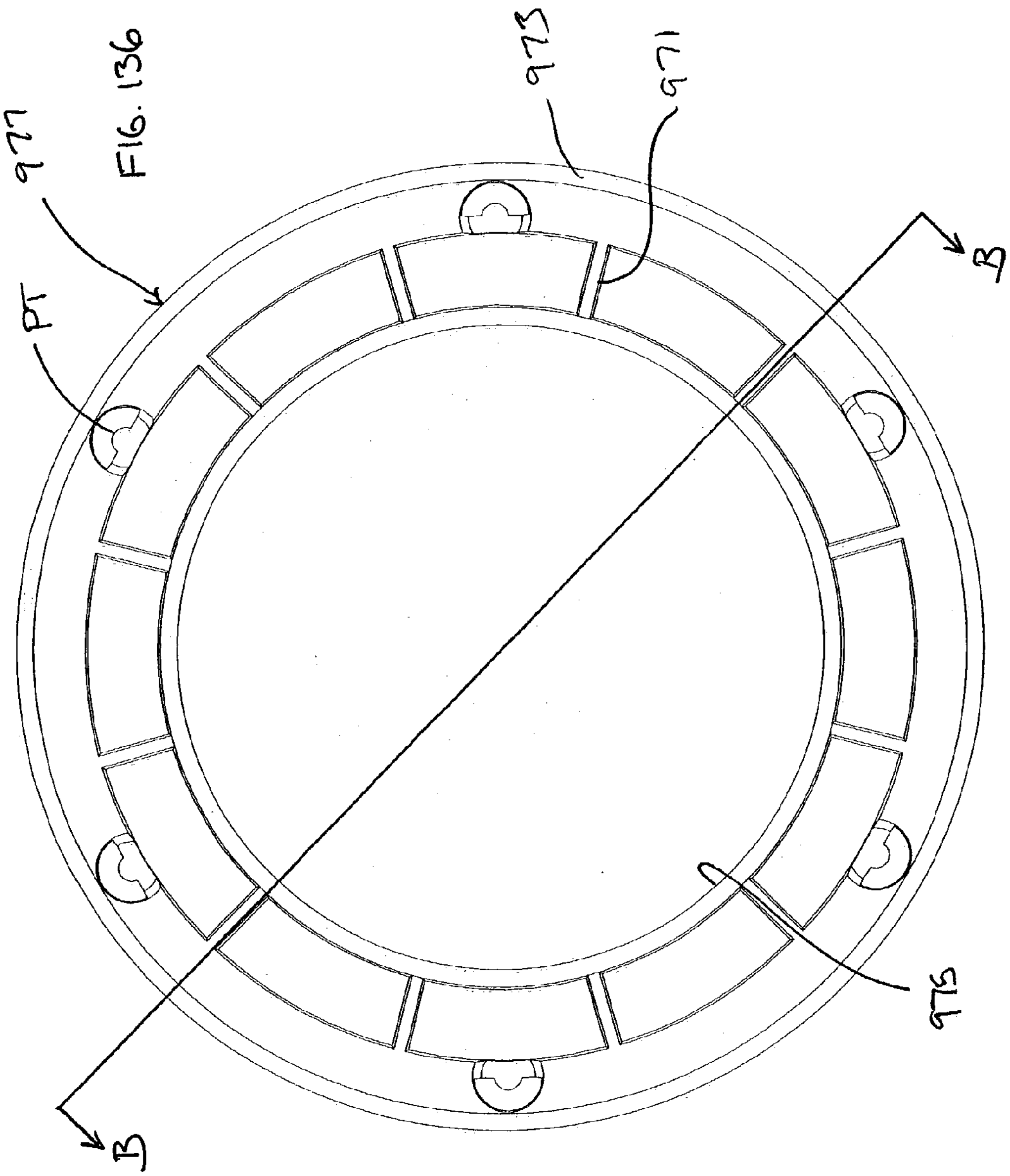
Figure 137:
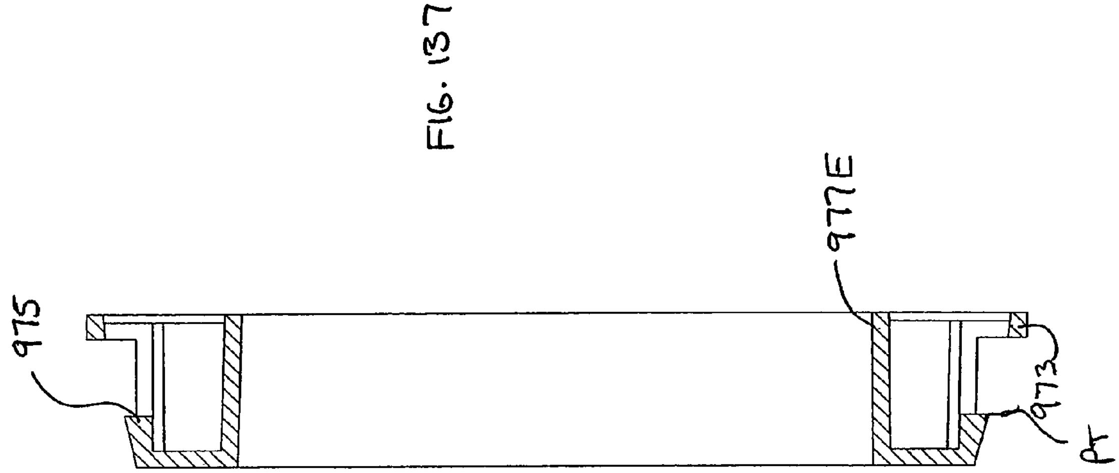
Figure 138:
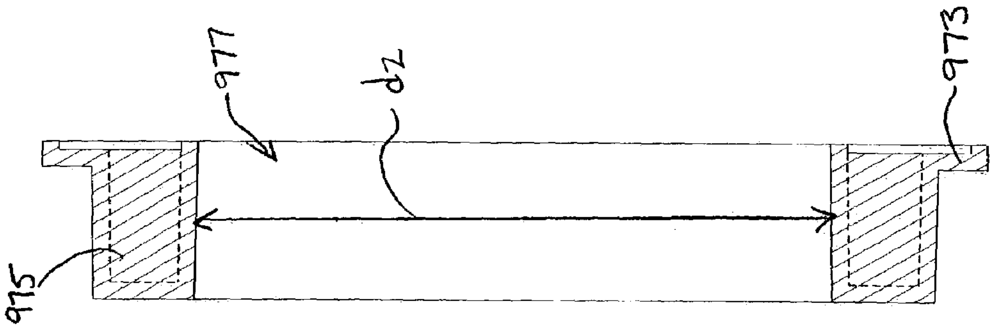

As with the spindle spline drive 917, the illustrated roll film drive core plug 997 is preferably an injected molded monolithic element that is designed to mate with spindle spline drive at the base of the roll spindle 222. As shown at FIG. 132, plug 997 includes interior teeth 991 formed as thickened portions formed on an interior surface of a continuous cylindrical extension 989 which extension further includes a free cylidrical extension 987 shown stepped in by FIG. 134 and having an edge rim 985. FIG. 132 illustrates that the teeth can be formed by radially extending depressions corresponding with the inwardly radially extending teeth 991 which are separated by the adjacent non-radially extending or neutral sections 981 formed between and at the base of the teeth. This relationship provides for the above described mating with the spindle spline drive engagement member 232. Also as shown in FIG. 132 there is a common base band BB which is the interior surface of edge rim 985 and extends about the roots of the teeth 991. The sizing of the teeth are similar to those described above for engagement member 232. Also the interior surface of band 985 is generally commensurate with the interior planar surface of teeth 991 and thus represents the portion slid along spline until meshes in supported fashion with the base of the spindle drive assembly.

FIGS. 135 to 138 illustrate roll support core insert 977 which is preferably formed with a double walled cylindrical section 975 having an outwardly extending flange at a first end 973 which provides an insertion limitation means relative to the core as it is slid into position into the open end of the roll film core. In addition, double walled cylindrical section preferably has a plurality of strengthening spokes 971 circumferentially spaced about the circumference of the core plug and in between the respective walls of the double wall cylinder. Also, radial protrusions PT extend out and enhance fixation of roll core insert 977 within core 996 upon the forward transverse edge TE embedding in the softer material of the core. The combination of the two roll film core plugs provide sufficient axial support relative to the preferably cardboard or plastic roll core either in a suspended state relative to the outer cylindrical sleeve 918 or in frictional contact over the length of the outer spindle cylinder. An embodiment of the invention features a spindle that has two axially spaced film roll mounting surfaces 222A and 222B (FIG. 115) of different diameter, with the interior one 222B being larger in diameter than the other mounting surface 222A which mounting surfaces are dimensioned relative to core inserts of the film roll which core inserts are dimensioned of different sizes at interior edges 977E and 985 (see FIGS. 134), so as to limit mounting of the film roll in only one axial orientation.

With reference to FIGS. 9, 12 and 14B, there is illustrated the path of film exiting the film roll supported on the spindle extends tangentially off the top of the film roll and into contact with the forward side of idler roller 114, and then up as shown in FIG. 14B into engagement with the rear side of upper idler roller 101 where it is redirected downward. From idler roller 101, film 216, in its preferred C-fold form, is separated over a portion of its non-fold side (the fold side passing externally and in front of the front end 196 of the dispenser 192) and then brought back together as both sides of the film enter the nip roller assembly comprised of drive nip roller pair 84 and 86 supported on shaft 82 and driven nip roller pair 74,76 on shaft 72 (in a preferred embodiment a pair of rollers is supported on each shaft with a preferred intermediate spacing although alternate arrangements are also featured under the present invention such as single, full length rollers provided on each shaft). Reference is again made for FIGS. 17-21 following the above explanation as to how the roll core is locked in place and is rotated and (electronically) controlled based on its relationship with the spline drive driven by web tension motor in communication with a controller preferably with a general or web tension dedicated processor. FIG. 192 illustrates the control and interfacing features of the film tensioning sub-system (as well as the spindle latch release sub-system). This ability to control film tension and to counteract film slacking events provides advantages over the prior art devices relying on braking for example, in an effort to avoid film slacking.

The present invention thus features electronic (e.g., digital signal) web tension control that provides for film tensioning and tracking. Film tension and tracking relates to how the film is handled once it is loaded into the machine. Any film handling or bag making system is only as good as its ability to control tension and to provide proper tracking for the moving web. Poor control of web tension has a negative effect on web tracking, which can cause all sorts of problems with bag quality. The preferred present invention features means for providing active, digital control of web tension, provided by, for example, the illustrated DC motor/encoder 58 driver (motor), which is mounted directly to the film roll spindle and the transmission line from the motor to the roll as explained above. The motor torque, hence web tension, is accurately controlled by the system processors, and based on algorithms installed in the system processors to carry out the below described web tensioning functions.

Under the arrangement of the present invention, the active control capability allows the present invention to adjust tension in the web in response to the rapidly changing dynamics of the bag making process. This type of active web tension control is beneficial with this application, because it can even move the roll backwards, unlike prior art passive or braking web tensioning systems wherein web tension may be lost if the film drive rollers run in reverse, which such prior art devices do at the end of every bag making cycle to pull the film away from the cross-cut wire. For example, the web tensioner on a commonly used prior art device provides web tension via a set of spring loaded drag plates that are positioned to drag on the ends of the film roll. This has proven to be a system with significant room for improvement.

Under the present invention tension control is available while the system is in an idle mode. During idle mode, the web tension torque motor of the present invention pulls back on the film (being fed through the system by the nip rollers and associated nip roller driver) with a slight torque, just enough to keep the film from going slack. The motor torque for the web tension driver, hence the web tension, are controlled by the main system control board in conjunction with a correspondingly designed motor control circuit (e.g., tach motor encoder EN—FIGS. 17 and 192) that allows the system to control torque via the control of current through the motor windings.

The present web tensioning means is also active in controlling tension while dispensing film. For example, while running, the web tensioning control takes into consideration dynamic changes, such as inertia and roll momentum changes based on the continuous decrease in mass of roll film. For example, in a preferred embodiment, film level monitoring is achieved through a continuous monitoring of the DC motor on the film unwind shaft (film roll support) and compared to the film advance motor. For instance, the rotational momentum of the film roll is considered in the calculation of motor torque when the roll is starting or stopping. When starting film drawing, the torque on the motor will be rapidly reduced so as not to over tension the web. When stopping film drawing, the torque on the motor will be rapidly increased so that the film roll's own momentum does not overrun and cause the web to become slack. The web tensioning device thus works in association with the film feed rollers and other sensors such as system shut down triggering.

In a preferred embodiment of the invention, tension calculation includes consideration of film roll diameter by way of knowledge of the tach sate of the film advance motor and web tensioning motor. The control system of the present invention and the web tensioning device of the present invention provide for adjustment in the torque in the web tension motor based on, for example, the amount of film left on the spindle. Motor torque will generally be higher when there is less film on the roll, to make up for the loss of moment arm due to the smaller radius film roll. The encoder on the back of the web tension motor, in conjunction with data on speed of the film drive motor on the nip rollers, provides the information that the control system uses to calculate film roll diameter using standard formulation.

An additional advantage of the web tension system of the present invention is in the ability of the system to sense when out of film as well as when approaching a film run out state (roll diameter sensed at a minimum level and signal generated as in an audible sound—so as to facilitate preparation for roll replacement when the roll does run out as described below). Encoder EN on the back of the web tension motor 58 provides the system controller with the ability to sense a run out of film on the film roll. If the roll runs out of film, the web tension motor will have nothing to resist the torque that it is generating, so it will start to spin, more rapidly than normal, in the reverse direction. This speed change is sensed by the encoder, which is monitored by the system control board, which will quickly shut the system down as soon as it occurs. This provides an efficient out-of-film sensing mechanism, and uses no extra components. Thus the present system can be run until it completely runs out of film, and then safely shuts down. An added benefit with such a system is that there are no wasted feet of film left on the roll, and the audible or some other signaling means indicating running low allows the operator to be in a ready to replace state when the system does indeed shut down upon completion of a film roll.

In addition to the web tension system rapidly detecting an out-of-film situation, the web tension system of the present invention also provides a film jam or the like safety check and shut down. For example, if there is a film jam somewhere in the system, and the film can no longer move forward in response to the turning of the drive and driver rollers 74, 76 and 84, 86 or nip rollers (a likely occurrence in response to a major foam-up), the nip rollers keep turning, but the web tension motor stops turning as there is sensed no film feed occurring. In other words, the system controller sees that the encoder pulses from the web tension motor are not keeping up with the speed of the film as determined by the speed of the film drive motor on the nip rolls. The discrepancy causes a quick shutdown, and can save the system from further damage. Once again, no additional components are required for this feature illustrating the multifaceted benefits associated with the web tensioning and monitoring film unwinding means of the present invention.

By utilizing, for example, the control and monitoring system of the present invention with the film tension and film advance/tracking sub-systems of the present invention, there can be achieved high performance web tensioning under the present invention. The web tensioning, control and monitoring involves, in one technique, the calculation of film roll size to determine motor torque. That is, the film drive motor (that drives the aluminum nip roller) has an encoder signal that allows the central processing unit to monitor its speed of rotation, by counting the number of pulses received during a known time. The motor produces about 200 encoder pulses per revolution.

Since the film does not slip between the two nip rollers, if you know the diameter of the driven nip roller and its speed of rotation, you can easily calculate the web velocity.

Web Velocity=(Roller RPM)×(Roller Circumference)

Where:

Web Velocity is measured in inches per minute

Roller RPM is the revolutions per minute of the film drive roller

Roller Circumference is the circumference of the film drive roller measured in inches. Calculated as (Π×Roller Diameter)

The other motor on the web path is located on the film unwind spindle. Its purpose is to provide web tension so that the web does not become slack during operation. Slackness in the web will usually lead to film tracking problems, which are highly problematic to the foam-in-bag process.

The web tension motor must not be allowed to over-tension the web, as this can create serious problems like film stretching, tearing, or slippage in the nip rolls.

This motor also has an encoder output, which, for example, provides 500 pulses per revolution. This encoder output is used, in conjunction with the encoder signal on the film drive motor, to calculate the diameter of the film roll on the unwind spindle. The film roll diameter gets smaller as the film is used, and suddenly gets larger when a roll is replaced.

The roll diameter can easily be calculated, when the film is moving at a steady speed, by comparing the web velocity to the angular velocity of the film roll as it unwinds.

Roll Diameter can be calculated as follows:

Roll Diameter=(Web Velocity)/[Π×(RPM of Web Tension Motor)]

Where web velocity is calculated by the formula shown above, and the RPM of the Web Tension Motor is measured by the encoder on the output shaft of the web tension motor. For instance, RPM of the web tension motor can be calculated by dividing the number of encoder pulses received per minute by the number of encoder pulses in a complete revolution.

The film roll diameter is informative because the torque output of the web tension motor is preferably adjusted as a function of the diameter, to maintain web tension, as measured in pounds per inch of web width, at a constant level. The tension motor torque will track armature current very closely, with a response time measured in milliseconds.

Motor Torque is related to Web Tension in the following equation. This equation applies to the greatest extent if the motor and the web are moving at a constant velocity, or are stationary. If the motor and the web are accelerating or decelerating, the equation relating these two variables involves further adjustment which takes into consideration the acceleration of deceleration with associated acceleration/deceleration formulas.

Motor Torque=Desired Web Tension×Web Width×Film Roll Diameter/2

Where:

a) Web Tension is measured in Pounds per Inch of Web Width b) Web Width is measured in inches c) Roll Diameter is measured in inches d) Motor Torque is measured in Inch-Pounds The central processor controls the torque output of the web tension motor by, for example, measuring and controlling the current flow through the armature coil of the motor. In a preferred embodiment, the web tension motor is a Permanent Magnet DC Brush Motor. In this type of motor, output torque is directly proportional to armature current. The intention of this control system is to maintain within the parameters involved a constant web tension.

As noted above, the web tension motor can be used in other situations to help keep web tension constant, or to change it as desired.

For long idle periods, where the system is left idle for long periods, the web tension can be reduced to a lower level than what is normally used during operation. This will extend the life of the motor, by reducing current flow through the brushes.

For a starting of web motion, during the start of the bag making cycle, the web has to be accelerated to its final velocity. This means that the web has to yank the film roll to get it moving, an act that inherently increases the web tension because the film roll has rotational inertia. During these acceleration periods, the web motor torque can be reduced to compensate for the increase in tension that is inherent to accelerating the film roll. This reduction is preferably based on trial runs and a monitoring of performance of the web tensioner forgiven roll settings.

At the end of the web motion, or the end of the bag making cycle, the film roll has to stop, or a lot of slack will be induced into the web. Since the rotational inertia of the film roll is quite high, the web tension motor torque must be increased to prevent the roll from overrunning the web as it comes to a stop. As with the start of motion, this torque profile is typically determined through trial runs.

The encoder output on the web tension motor also provides shutdown information that is useful to machine operation. For example, if the nip rolls are turning, and the web tension motor is not turning, then something has jammed the web. An immediate machine shutdown is required. If this happens at the end of a film roll, it probably means that the tape holding the film to the core is too strong, and the film cannot pull off the paper core. This appears to be a jam as far as the machine control system is concerned.

Also, if the web tension motor turns in reverse of its direction of rotation when the film is unwinding, then the roll is out of film. When the film pulls off the core, at the end of a roll, this is the expected shutdown mode.

Another problem with film feed in prior art systems is poor web tracking. Web tracking refers to the direction of the film as it runs through the machine. If tracking is good, the film runs straight and true through the machine, with the centerline of the web path being very close to the centerline of the nip rollers. If web tracking is poor, the film will track to the left or to the right, with the centerline of the web shifted from the centerline of the nip rolls. Tracking becomes an issue when the film tracks away from the edge seal wire. This results in a bag without an edge seal, which can easily become a bag that leaks foam on the operator, the product that the operator is trying to package, or simply onto the factory floor. In the present invention there is provided a web tracking adjustment means represented by the adjustment mechanisms 98 and 100 (earlier described with reference to FIG. 7) which feature screw adjustable plates that the upper shift idler roller either horizontally, vertically or both. The means is preferably used at the factory for offsetting any tolerance deviations that might lead to off line tracking, and locked in place prior to shipment. However, the adjustment mechanism can also be adjusted by the operator such that field adjustment is possible if needed.

A comparison of FIG. 7 with the film advance/tracking controller sub-system shown in FIG. 191 illustrates the control systems arrangement for carrying out the film advance and monitored. As shown, the control board comprises, for example, the central processing unit working in conjunction with a field programmable gate array ("FPGA") and control circuitry receiving signals and sending data on the real time characteristic of the film advance. The FPGA can receive programmed data input from the memory stored in the processor upon machine start up, for example. FIG. 7 illustrates the drive roller shaft 82 being driven by driver 80 whose output shaft is in direct engagement with the roller shaft via step down gearing 1000 of driver 80, with driver 80 also preferably comprising a brushless DC motor 1002 with encoder sensor 1004 as in the previous discussed motor 200 for the mixing module drive assembly. As described above, the control board film advance sub-system shown in FIG. 191 can thus monitor, via the encoder sensor, the status of the drive roller shaft 82 with fixed roller set 84 and 86. As shown in FIG. 7, for example, each roller (84, 86) includes slots for receiving canes 90 supported on fixed rod 92 to help avoid undesirable film back travel. This monitoring is useful for monitoring general tracking of film feed and, as noted above, can be used in conjunction with the web tension driver encoder to monitor system conditions like the above noted film out condition.

FIG. 198 provides an illustration of a film advance versus tension motor ratio and its use in monitoring the relationship between roll usage and the interrelationship between the film advance and web tension tachometer feed to the control system. The "shot number" along the X-axis illustrates a history line of the number of dispensed shots for a given bag volume and foam output volume (useful in comparison from one roll to the next as to film usage). This information is useful in the monitoring of film re-supply needs as described in the above noted provisional application entitled "System and Method For Providing Remote Monitoring of a Manufacturing Device". As described in that application, the remote monitoring, and re-supply of material capabilities facilitated with the control system of the present invention.

For example, three main supply requirements for a foam-in-bag dispenser are film (for bags), chemicals (for foam) and solvent (to prevent foam build up in the valving/purge rod and a tip of dispenser). To monitor solvent, there is provided a certain volume solvent container (e.g., 3 gallons) that is in line with a metering pump (e.g., a pump that dispensers a fixed volume of fluid with every cycle (e.g., 0.57 ml based on a preferred 3 pump pulses of 0.19 ml per bag cycle). The controller thus receives signals from the pump as to cycles and/or correlates with bag cycle history such that by monitoring the number of cycles of known solvent volume usage there can be determined usage of solvent and when re-supply is needed. The solvent container also has a float valve or the like which signals when a first low level is reached and sends out a warning via controller interfacing. There is also provided an even lower level sensor that when triggered shuts down system to prevent purge rod binding and other problems involved with no solvent flow is provided. With the monitoring of solvent level based on usage and/or container levels, a new supply of solvent can be automatically sent out from a supplier when there is reached either a certain level of closed amounts or a container level signal following a review of history of usage for machine (re-supply could be triggered by the first low signal or at a higher level depending on re-supply time etc.).

A somewhat similar arrangement is provided to monitor the chemical usage for re-supply, for example. The preferred gerotor pump system used to pump the chemical to the dispenser is not a fixed volume pump per se so there is monitored with the controller the chemical mass of each bag produced is maintained in the database. This is a calculated field based on the 'dispenser open time' and the respective flow rate standard with the know source supply (e.g., a 55 gallon drum) a monitoring of usage and re-supply needs can be actively made by the controller.

One way to monitor the film usage is to use the encoder on the nip roller set to determine number of rotations and with estimated film passage length per rotation can compare against overall length on a roll of film or film source. Under the present invention there is an alternate way to monitor film usage and that is to utilize facets of the above noted web tensioning comparison wherein the output of the film tensioning system (e.g., the encoder of a web tension torque motor having a torque drive transmission system in direct engagement with a roll core drive insert) and the output of a motor driving the nip roller set are used with the controller to compare the interrelationship, and with a review of roll unwinding charcteristics a determination can be made as to how much film has been fed out from the roller. The comparison of motor torque method is the preferred method since it is independent of the machine keeping track of when a roll of film is changed and how much film is on the roll. The DC motor on the film unwind shaft is constantly being monitored and compared to the film advance motor to compensate for the continual decrease in mass of a roll of film.

Operator servicing under the present invention is also greatly facilitated. For example, FIG. 139 provides an enlarged view of the roller set assembly shown in FIG. 7 as well as a close up view of the front door latch handle 87 which is a component of the adjustable front panel access means 1006 for gaining access to the below described components as depicted in FIG. 140. As shown in FIGS. 139 and 140, door access latch handle 87 is fixed to door latch rod 85 which has opposite end cam latches 1008 and 1010 non-rotatably attached to latch rod 85. Cam latches 1008 and 1010 are shown in FIGS. 139 and 140 as having hook or engagement means designed to engage with the stub pin supports 1012 and 1014 (FIG. 7) supported on upper forward regions of first and second side frames 66 and 68. Front face pivot frame sections 71 and 73 also have a top end connected with door latch rod 85 and are positioned inward and in abutting relationship with respective cam latches 1008 and 1010. The opposite ends of front face frame sections 71 and 73 are pivotably attached to front pivot rod 70 secured at its ends to the left and right side frames 66 and 68.

As seen from FIG. 140, front face frame sections 71 and 73 feature bearing support platforms 1016 and 1018 receiving in free roll fashion the opposite ends of shaft 72. Bearing support platforms are shown as being releasably attached to the interior side of front face frame sections 71 and 73 to facilitate servicing or replacement of the preferably knurled aluminum driven nip rollers 74, 76 as well as edge seal 91 shown in FIG. 140 sandwiched between its bearing mount 1022 also supported on shaft 72. Unlike rotating rollers 74 and 76, however, edge seal 91 remains stationary as the shaft rotates internally within bearing mount 1022. For opposite free edge film or non-C fold film embodiments a similar edge seal as 91 can be positioned at the opposite end of shaft 72.

FIG. 140 also illustrates heater jaw 1024 with its sealing face 1026 exposed upon adjustment of the access panel into the panels exposed, service facilitating state (rotated down in the illustrated preferred embodiment). FIG. 139 illustrates the front of heater jaw assembly 1024 in its operational position aligned with the aforementioned moving jaw 118. The preferred embodiment features having the heating wires (cutting as well as sealing in the preferred embodiment shown) used to cut and seal the end of one bag from the next on the heated jaw 1024 and to have the heated jaw 1024 fixed in position relative to moving jaw 118. A reversal or sharing as to heat wire support and/or wire backing support movement are also considered alternate embodiments of the present invention. Having the moving mechanism positioned out of the way under the bagger assembly is, however, preferable from the standpoint of stability and compactness. Also, having the heater wires on the accessible door facilitates wire servicing as described below. Heater jaw assembly 1024 is shown rigidly fixed at its ends to the front face pivot frame sections to provide a stable compression backing relative to the moving jaw 118 and is positioned, relative to the direction of elongation of frame sections 71 and 73 between the aforementioned driven roller set and the pivot bar 70 to which the bottom bearing ends 1028 and 1030 of frame sections 71 and 73 are secured.

With the cam latches and handle in the front face closed mode (shown in FIG. 139 and FIG. 7 with latches 1008 and 1010 engaged with pin stubs 1012, 1014), the driven rollers are positioned in proper nip location in relationship to the drive rollers 84 and 86 that are preferably of a softer high friction material as in an elastomer (e.g., natural or synthetic rubber) to facilitate sufficient driving contact with the film being driven by the rollers. In addition to proper film drive positioning brought about by the latched front access door arrangement, the heater jaw is also appropriately positioned to achieve a proper cut and/or seal relationship relative to the opposite jaw. As shown by FIGS. 2, 15 and 15A, front access door is preferably enclosed or covered over with front access panel 1032, which is shown in FIG. 15A to be pivotable about a vertical access and then slideable back along side frame 68 as shown by the same door referenced 1032A in FIG. 15A to provide for rotation down of the frame sections 71 and 73 (which can also be provided with an integrated outer cover facings supported, for example, as the exterior of heater jar 124). FIG. 15B shows a side elevational view of front access door 181 in a flipped down state ready for sevicing (FIG. 15B also shows the spindle in the replace roll mode-although to avoid contact between the spindle and front access door it is preferable to carry out the roll servicing and front access door component servicing at separate times as it provides for a more compact overall system). As shown in FIG. 15A and face plate 1034 is secured at its opposite ends to the frame sections 66 and 68, and supports touch pad button set 1036 for operator manipulation (e.g., a set of bag size control panel buttons). The buttons are connected by electrical wires to the aforementioned control board in a fashion which does not interfere with the pivoting open of the front face plate 181 and supported front panel 1034. The control board is in communication with a modem or the like for remote data exchange as described as described in Provisional Patent Application Ser. No. 60/488,102, filed on Jul. 18, 2003 and entitled "A System And Method for Providing Remote Monitoring of a Manufacturing Device" which is incorporated herein by reference. FIG. 15B provides a front view of the bagger assembly similar to FIG. 3 but with a ghost line outline of the interior components and of a possible conveyor line CL for automated or supported feeding of boxes or the like to receive a foam filled bag. As seen, main front panel 1032 extends from the top of the bagger assembly down past the upper edge of the front face panel 1034 supporting button set 1036 when the assembly is in an ready for operation mode. As seen from FIG. 15A, following a pivoting and sliding away of main face panel 1032 into a service mode position, access can be had to the dispenser and other components of the bagger assembly, as front face panel 1034 is exposed and free to rotate about its lower horizontal pivot axis to provide access to the components supported by pivot frame sections 171 and 173 as shown in FIG. 140.

FIG. 140 also illustrates the ease of accessibility to either the drive or the driven roller set provided by the flip open feature of the present invention. Whether it be access for cleaning where the rollers need not be removed or freedom to remove any of the rollers for replacement or roller servicing, the flip open access feature of the present invention renders such activity easy to achieve. FIGS. 139 and 140 also illustrate removable drive shaft exterior bearing retention block 1038 and interior bearing extension block 1040 with the former having releasable fasteners which upon removal allow for the larger sized exterior bearing block to be removed and the entire drive roller assembly axial slid out form the bagger assembly.

The flip open front door access means of the present invention provides easy access to the sealing jaws, seal wires, cut wires, and the various substrates and tapes that cover the jaw face(s). Opening the door provides full visibility, greatly easing the task of servicing the sealing jaws to provide the inevitably required periodic maintenance (e.g., cleaning of melted plastic build up and/or foam build up).

With reference to FIGS. 140 to 144, there is provided a discussion of the heated wire supporting jaw 1024 and the easily accessible and serviceable supported cut and sealing wires. FIG. 141 shows the complete heater jaw assembly 1024 and FIG. 143 shows an enlarged view of the left end of heater jaw assembly 1024. As shown, heater jaw assembly 1024 includes base block 1042 which is a solid bar formed of, for example, nickel chromium plated steel having good heat resistance and heat dissipation qualities as well as minimal load deflection and thermal expansion qualities. For enhanced heat resistance and avoiding heat build up in the base block, there is preferably provided a high heat resistance thermal barrier layer 1044 (shown in cut away in FIG. 141) between the heated resistance wires 1046, 1048 and 1050 (preferably in a seal/cut/seal wire sequence). Barrier 1044 is preferably a removal barrier to avoid degradation of a more expensive and less easily replaced component of the system. An adhesive Teflon tape is well suited for this purpose. Base block 1042 features opposite end indented sections 1052 and 1054 forming underlying projection supports for electric contact housings 1056 and 1058 formed of an insulating material (e.g., plastic) and having internal electrical connectors which are designed to transfer current between the fixed electrical wire connectors 1060 extending out from the housing's bottom and the housing's interior plug reception contacts (not shown) and to provide information to the controllers heat wire control and monitoring sub-systems as shown in FIG. 187. As a preferred embodiment provides both sealing and cutting means together relative to the just formed and just being formed bag border, there is featured seal wires 1046 and 1050 positioned to opposite sides of the intermediate cut wire 1048. Because of their different functions, seal wires are preferably flat or ribbon wires that provide for a strip area seal (SE1, FIG. 111) at the bottom of a just being formed bag and the top (SE2) of a just formed bag. As the intermediate wire 1048 is providing a cutting function a circular cross section wire is utilized.

FIGS. 142 and 143 show that each seal and cut wire has opposite ends fixedly secured (weld or solder preferred) to one of the illustrated support plates 1062 which are flat metal conductive plates having an enlarged conductor pin securement base leading to a converging extension to which the ends of the seal and cut wires are secured (see FIG. 142 and 143). Conductor pins 1064 are provided at each end of the heater wires and each features grasping pin head 1066 with cylindrical base 1064 which receives and secures in position conductor pin extension 1068 and an upper recessed section for easy grasping. Leaf type spring members can also be provided in either the male or female portions of the pin connection. Pin extension 1068 preferably has a threaded base or upper end to which threaded nut 1070 is secured to compress plate 1062 into a fixed level relative to the bottom of grasping pin head 1066. The portion of pin extension to be received in the electrical contact housing 1058 is elongated and thus is fixed in position by way of a sliding friction fit in one of the conductive reception ports 1072 provided in contact housing 1058, although an optional expansion leaf spring 1074 embodiment such as illustrated in dashed lines in FIG. 143 is also featured under the present invention. Each reception port 172 is maintained insulated at the plate 1062 level by barriers 1076 (e.g., a plastic flange extension in the injection molded reception housing block 1056). Also, the upper end of each reception port is recessed relative to the upper exposed surface of the heating jaw base block (or upper surface of layer 1044 when utilized) such that the thickness of the fully threaded and plate compressing nut 1070 places plate 1062 at the desired suspension height level away from the base block's upper surface. To achieve the desired seal versus cut differential, there can be implemented, for example, variations in relative height of the wires 1046, 1048 and 1050 from the block as noted above and/or, differences in wire material or form (e.g., as in the illustrated ribbon versus circular cross-section wire forms) and/or electrical power supply via the control. As seen from FIG. 143 a significant portion of the ends of the wires extend over at least a third of the upper surface of the plates 1062 so as to provide secure engagement and to facilitate the maintenance of high tension and minimal intermediate "droop" deflection.

In addition to the access door opening providing easy access to the heater wires, the heater wire conductor pairs connection in the heater jaw assembly is such that they can be quickly removed and replaced without tool requirements and there positioning, upon return relative to the underlying support, is ensured at a precise location. Heater wires generally last for over 100,000 bag cycles, although a cleaning at every 5000 or so cycles is likely to be required for good performance. The access door allows for quick and easy periodic checks (e.g., operator determined or based on a prompt from the control means to the display panel described in greater detail below). Also the ease of access allows for a quick check as to the condition of the covering layer on the moving and fixed jaws which is usually a Teflon tape that typically requires replacement after every 20,000 to 30,000 bag cycles. The moving jaw also preferably has a silicone rubber pad SR supported by the jaw base (See FIG. 140) which typically requires replacement in prior art systems at about 100,000 bag cycles. This too is made easy to accomplish as the jaws can be readily accessed and readily removed, if desired. Also, the control means preferably monitors the number of bag cycles and can prompt the operator when the number of bag cycles suggests cleaning or replacement is in order as with the other components made more easily accessible by the flip open door, or induce an automatic order as described in Provisional Patent Application filed on Jul. 18, 2003 and entitled "Control System For A Foam-In-Bag Dispenser," which is incorporated by reference.

FIGS. 139 and 140 also illustrate door movement limitation means or door stop 1078 which comprises connection rod 1080 extending through fixed reception member 1082 having a passage through which the rod extends and a base secured to the fixed frame 68. At the free end of rod 1080 there is provided clip 1084 to prevent a release of the rod from member 1082 and a stop means to limit the downward rotation of the fixed jaw and front access door. The opposite end of connector rod 1080 is connected to part of the flip open access door such as front face pivot frame structure 71. Thus, the hinged access door is precluded from rotating freely down into contact with fixed frame structure of the bagger assembly. Additional damping means DA is preferably also provided as illustrated in FIG. 9, 139 and 140 featuring a pair of constant force negator springs arranged in mirror image fashion to counteract forces generated by the springs at their fixed positing on the support extending up from framestructure 88. The negator springs are held in a bracket support BT and connected by way of a cable past the two illustrated redirection pulleys to connection to hinged front door. The coil spring damper thus allows for controlled opening of the relatively heavy front access door with supported roller set, fixed jaw and other noted components. Damping means other than the illustrated coil arrangement or also featured in the present invention, such as a hydraulic dampening device and/or helical spring member to provide greater control during the rotation undertaken by the hinged access door.

An additional advantage provided by hinged access door is the ease in which the film can be threaded through the nip rolls (or released as, for example, when a change in film size is desired). The threading of film through the rolls is simplified, as the operator now has an easy way to separate the nip rolls as opposed to the difficult threading or pushing and drawing of film between the fixed roller sets of the prior art which prior art technique leads to a significant amount of film being wasted before a smooth and hopefully properly aligned/tracking film threading is achieved (e.g., it is estimated that on average 5 to 10 feet of film is wasted in the threading procedure before the film straightens and smoothes). Under the present invention, the access door can be opened to further separate apart the nip roller sets and the film played out into position (e.g. by hand or by using a feed button on the control panel) between the nip rollers and the film tends to naturally stay flat or, if not flat, a quick wiping action will achieve the same whereupon the operator merely needs to close the access door (using the handle 87 to lift up and then rotate the access door's cam latch into locking position). The only film wasted is the length of film that extends beyond the cutting wire, prior to the first cut being made.

An addition advantage of the access door flip open feature is easy access to the edge sealer assembly 91AS. Edge sealer assembly 91AS is described in greater detail below and comprises replaceable edge seal arbor mechanism 1104 featuring arbor base 1108 and a heater wire supporting arbor assembly 1106 with, for example, plug in ends similar in fashion to those described above for the end sealer and cutter wires. Thus the access provided by the door allows for either replacement, servicing or cleaning of the entire edge sealer assembly 91AS or individual components thereof such as the arbor or just the double pin and heater wire combination or the below described high temperature heater wire under support. One of the standard prior art edge sealers typically requires cutter wire servicing about every 20,000 to 30,000 bag cycles or less. As noted above, the prior art are considered to have a high service requirement as compared to the present invention, and thus under the present invention, the service cycle can be set greater than 30,000 for this service feature, again preferably with prompting by the control system which monitors the number of bags formed and can either visually and/or audibly provide the operator with such prompting (e.g., menu screen as described in U.S. Provisional Application No. 60/488,009. filed Jul. 18, 2003 and entitled "Push Buttons And Control Panels Using The Same," which is incorporated by reference.

An additional not easily accessed and difficult to service component of the dispenser system is the roller canes 90 (FIG. 7) used to prevent undesired extended retention of the film on the driving nip roller. With the access made available by the access means of the present invention, an operator or service representative can readily clean or replace a cane 90. As seen from FIG. 140, and the view of the driven roller assembly shown in FIG. 144 with driven shaft 72 and driven rollers 74 and 76, as well as the cross-sectional view of the same in FIG. 145, edge seal assembly 91 is mounted on shaft 72 which is preferably a precision ground steel support shaft supporting aluminum (knurled) driven rollers 74 and 76. Edge seal assembly 91 is shown as well in FIG. 7 on the right side of driven shaft 72 (viewing from the front of the bagger) in a side abutment relationship with driven roller 76. The cross sectional view of FIG. 145 shows driven roller 76 preferably being formed of multiple sub-roller section with driven roller 76 having three individual sub-roller sections 76*a* and 76*b* which are included with edge. Edge seal assembly 91AS includes edge seal 91 and roll segments 1100 and 1102.

Thus with this positioning, edge seal 91 is the sealer that seals the open edge side of the folded bag. The open edge side is produced by folding the film during windup of the film on core 188 (FIG. 11), so the folded side does not need to be sealed and can run external to the free end of the suspended dispenser. The present invention features other bag forming techniques such as bringing two independent films together and sealing both side edges which can be readily achieved under the design of the present invention by including of an additional edge sealer assembly on the opposite driven roller such as the addition of a seal assembly as a component of roller 74*a*. The open side edge side of the film is open for accommodating suspended dispenser insertion and is sealed both along a direction parallel to the roller rotation axis via the aforementioned heated jaw assembly and also transversely thereto via edge sealer assembly 91AS.

FIGS. 146 to 152 illustrate in greater detail a preferred embodiment for edge seal assembly 91AS featuring first and second sub-rollers 1100 and 1102 and edge seal arbor mechanism 1104 having arbor assembly 1106 on the film contact side of the driven roller and arbor base 1108 on the opposite side. FIG. 149 illustrates each sub-roller 1100 and 1102 has a pocket cavity 1110 and 1112. FIGS. 151 and 152 illustrate sub-roller 1102 with pocket cavity and with the cavity interior surface 1114 having a pair of screw holes 1116 spaced circumferentially (diametrically) around it, that open out at the other end as shown in FIG. 151. Thus, edge seal roller 1102, which is positioned on the side of the edge seal 91 that is closest to the center of elongation of shaft 72, is attached to adjacent driven sub-roller 76*b* by insertion of screws SC (FIG. 145) through screw or fastener holes 1116 and into receiving thread holes formed in driven sub-roller section 76*b*. This arrangement thus ensures that the sub-roller 1102 will not drag with the edge seal unit, causing it to rotate more slowly than the rest of the driven nip rollers. Sub rollers 76*a* and 76*b* are each secured to shaft 72 with a fastener as shown in FIG. 145 as is roller 74. The edge seal sub-roller 1100 positioned on the outer side closest to the adjacent most end of driven shaft 72 is attached to the closest of the shaft collars (in FIG. 145) 1120 positioned at the end of driven shaft 72 and secured to the shaft to rotate together with it. Shaft collar 1120 forces edge seal sub roller 1100 to also rotate as a unit with the shaft 72 in unison with sub-roller 1102 but is independent of that sub-roller except for the common connection to shaft 72.

FIG. 149 shows that extending within and between pocket cavities 1110 and 112 is edge seal sleeve 1122 which is shown alone in FIG. 153 and functions as a means for providing a site of attachment for the edge seal base 1108 and a positioner for arbor assembly. Sleeve 1122 includes a cylindrical housing having an axially centrally positioned slot 1124 that extends circumferentially around for ½ of the circumference of the sleeve 1122 and occupies about a third of the entire axially length of sleeve 1122. Sleeve 1122 further includes fastener hole 1125 positioned on the solid side of sleeve 122 diametrically opposite to slot 1124. In addition to locating arbor base 1108, sleeve 1122 further functions as means for supporting cylindrical roller bearing 1126 which is preferably secured by way of a press fit into the sleeve and arranged so that the driven shaft 72 runs through the center of the bearing 1126 and the large radius on the bottom surface of the arbor assembly rests on the exposed (slot location) surface of the bearing's outside diameter. Rollers 1128 or other bearing friction reduction means are arranged around the interior or inside diameter of the roller bearing and protect the surface of the bottom surface of arbor assembly so that the arbor assembly is unaffected by the rotating shaft and thus not worn down by that rotation. This provides for the feature of precision positioning and maintenance of the compression depth of the below described edge seal wire into the surface of the elastomeric or compressible material of the opposite drive roller 84 (FIG. 7) to be maintained which provides for high quality seals to be formed and extends the life of arbor assembly 1106. In other words, the seal compression depth, which controls the length of the sealing zone (and venting zone) and the pressure of the sealing wire on the film has a significant influence in the quality of the edge seal. FIG. 149 further illustrates seal rings 1130, 1133 positioned around the opposite axial ends of bearing 1126.

FIGS. 155 and 156 illustrate arbor base 1108 of edge seal arbor mechanism 1104 with FIG. 156 showing a cross section taken along cross section vertically bisecting the arbor base shown in FIG. 155. Arbor base 1108 functions as an edge seal base unit to provide a mounting base for arbor assembly 1106. As shown in FIG. 150 arbor base 1108 has a central semi-circular recess that has radius Ra which is the same as the radius Rs of the exterior of sleeve (FIG. 150). The interior radius RB of sleeve 1122 conforms to the exterior radius of bearing 1126 and with the interior radius of bearing 1126RC conforms to the exterior radius of shaft 72 such that the edge seal unit is able to stay in place as the roller bearings accommodate the rotation of shaft 72 and as the adjacent sub-rollers 1100 and 1102 rotate. Arbor base 1108 is formed of an insulative material such as Acetyl plastic which is machined to have the illustrated configuration. Fastener hole 1125 in sleeve 1122 is also in line with fastener passage 1132 formed in arbor base 1108 such that sleeve can be mounted to the arbor base 1108 with a small flat head screw, for example. FIG. 156 also shows electrical pin reception passageways 1134, 1136 formed in the enlarged side wings of arbor base 1108 with each having an enlarged upper passageway section 1138 (FIG. 156) which opens into an intermediate diameter inner passageway 1140 which in turn opens into a smaller diameter lower passageway section 1142. The lower passageway section 1142 opens out at the bottom into notch recesses 1144 and 1146.

FIG. 150 further illustrates elongated cylindrical, electrically conductive contact socket sleeves 1148 and 1150 nested in intermediate passageway 1140 for each of the passageways 1134 and 1136. Socket sleeves 1148 and 1150 are dimensioned for mating with bottom electrical contact pins 1152 and 1154 having enlarged heads 1156, 1158 for sandwiching electrical contact leads 1160, 1162 and 160', 1162' to the base edge of the arbor base provided within a respective one of notched recesses 1144 and 1146. Thus the electrical contact leads 1160, 1160' and 1162, 1162' are held in position and placed into electrical communication (e.g., power and/or sensing electrical lines) with the interior of sleeves 1148 and 1150 via respective contact pins 1152 and 1154. FIG. 188 illustrates the control sub-system for controlling and monitoring the performance of edge seal 91.

Figure 168:
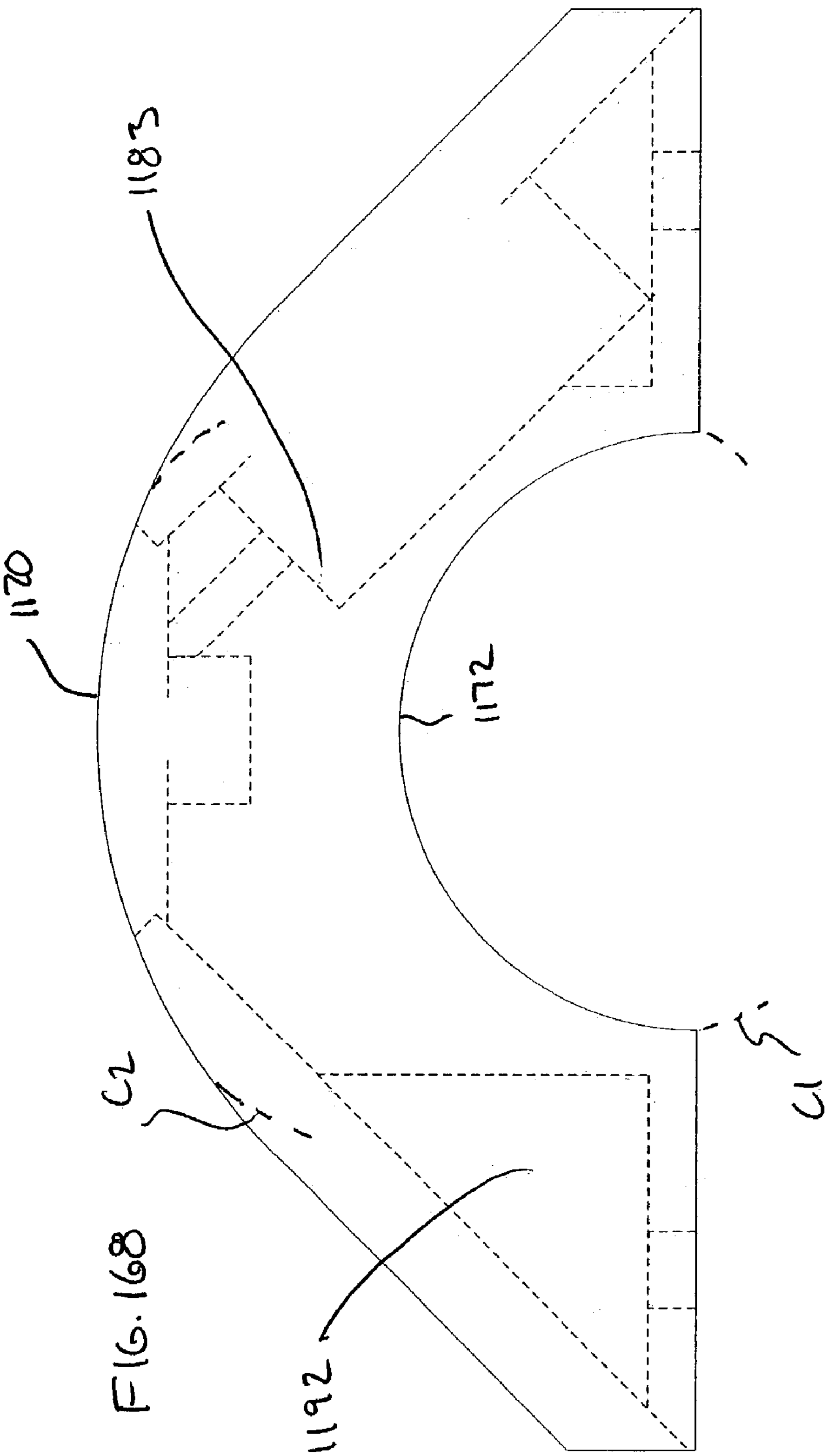
Figure 168A:
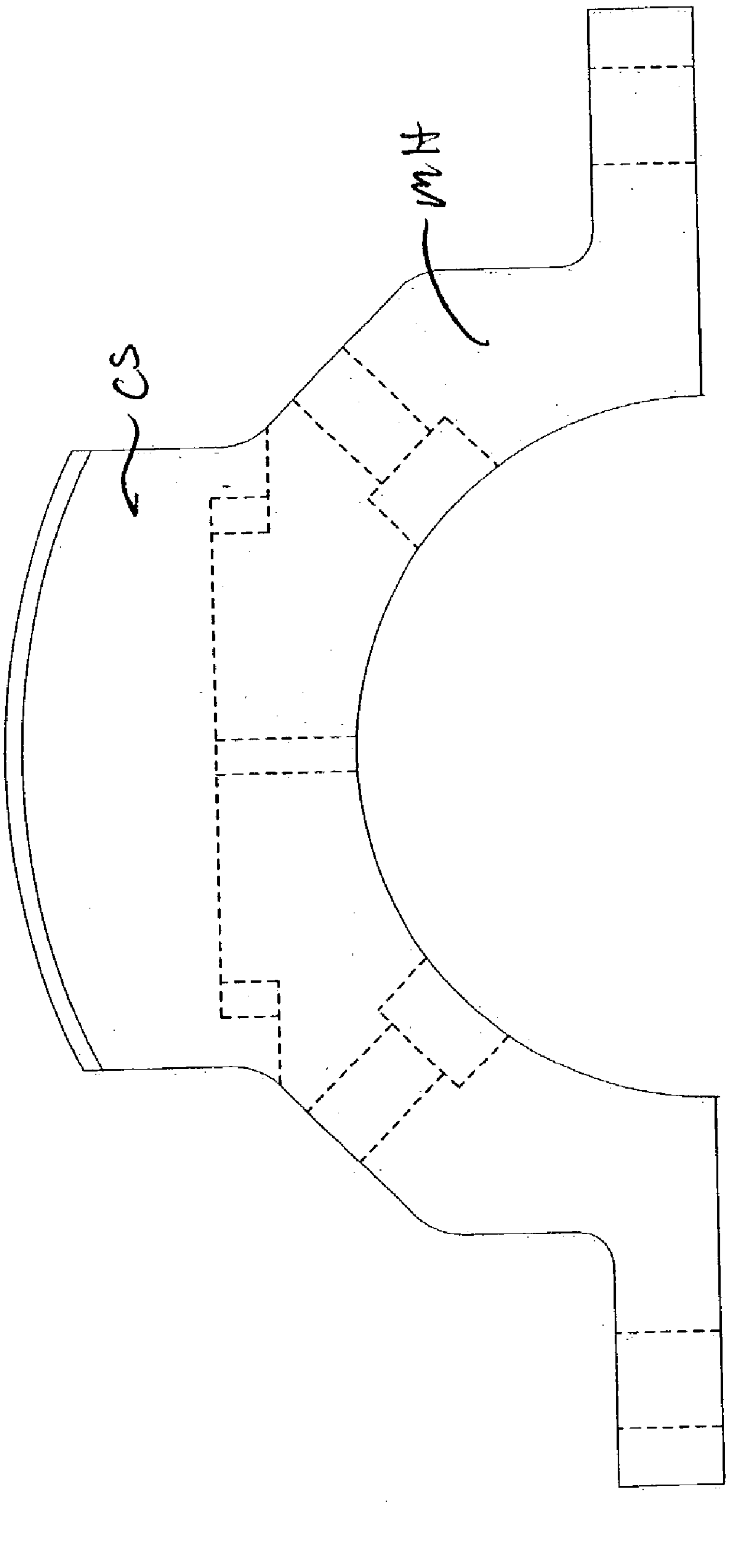
Figure 169:
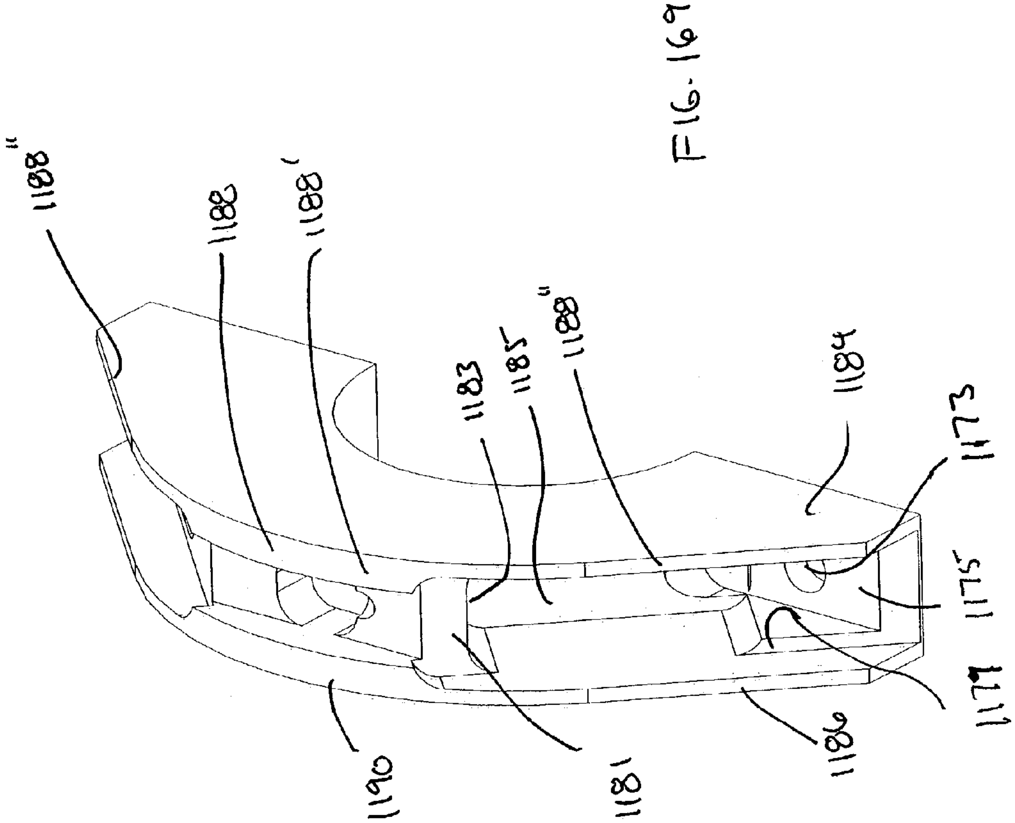
Figure 169A:
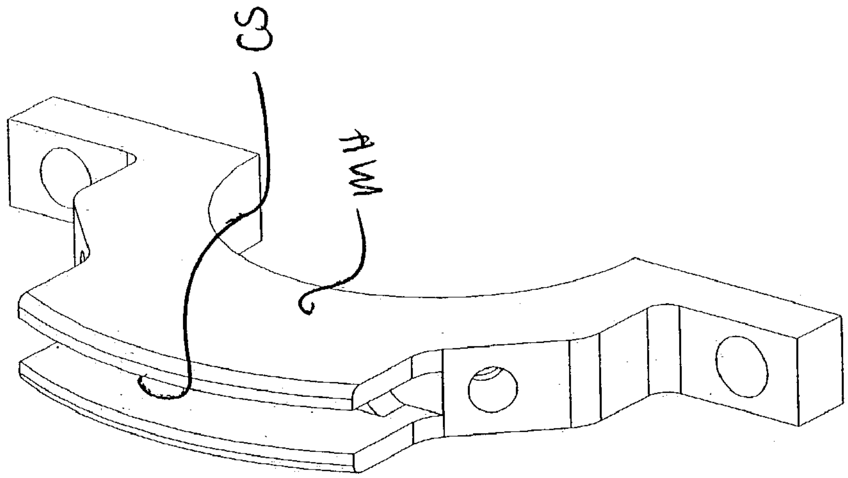

FIGS. 157 to 178 provide illustrations of a preferred embodiment of edge seal arbor mechanism 1104 which functions to position an edge seal wire 1182 in a stationary and contact state relative to film being fed therepast and which is designed to provide a high quality edge seal in the bag being formed. Edge seal arbor mechanism 1104 comprises arbor assembly 1106 and the aforementioned arbor base 1108. FIGS. 157 to 163 illustrate arbor assembly 1106 having arbor housing 1168 having an outer convex upper surface 1170, central bottom concave recessed area 1172 conforming in curvature to the exterior diameter of bearing 1126 and outer extensions 1174 and 1176 which extend out to a common extent or slightly past the wing extensions of arbor base 1108. FIG. 168 illustrates a preferred arrangement for the intermediate portion of upper convex surface or profile for housing 1170 (between the straight slope sections as in 1188" described below) and concave lower surface 1172 which share a common center of circle and with FIG. 168 illustrating in part concentric circles by way of concentric sections C1 and C2 (e.g., diameters for example, of 1.25 inch for C1 and 2.5 for C2 partially shown in FIG. 168 with dashed lines).

As shown in the cross-sectional view of FIG. 159, arbor assembly 1106 further comprises contact pins 1178 and 1180 extending down from respective outer sections 1174 and 1176, and sized to provide a friction fit connection in the arbor base 1108 in making electrical connection with respective electrical contact sleeves 1148 and 1150. Pins 1178 and 1180 are preferably very low in resistance so as to minimize alterations in the below described sensed parameters associated with the edge seal heater wire 1182 being powered via the connector pins 1178 and 1180, which are preferably of similar design as the plugs 1068 (FIG. 143) used in the end seals/cutter wires. A suitable connector features the gold sided flex pin connectors available from the Swiss Company "Multicontact" having a very low ohm characteristic. Thus, as shown by FIGS. 146 and 150, two lead wires extend out from each of the insertion holes for pins 1178 and 1180 powering the heater wire. Lead lines 1160 and 1160' are preferably the power source lines and more robust than parallel sensor lines 1162, 1162' which are less robust as they are designed merely as a sensor wire leading to the control center for determination of the temperature of the edge seal heater wire. A similar arrangement is utilized for each of the seal/cut bag end heater wires 1046, 1048, 1050.

The edge seal system of the present invention provides for the measurement and control of the temperature of the seal wire (e.g., the edge seal wire and cross-cut/seal wire(s)). This is achieved through a combination of metallurgic characteristics and electronic control features as described below and provides numerous advantages over the prior art which are devoid of any direct temperature control of the sealing element. The arrangement of the present invention provides edge sealing that is more consistent, shorter system warm-up times, more accurate sizing of the gas vents (e.g., a heating to melt an opening or a discontinuance of or lowering of temperature during edge seal formation, longer sealing element life, and longer life for the wire substrates and cover tapes).

Under a preferred embodiment of the present invention control is achieved by calculating the resistance of the sealing wire, by precisely measuring the voltage across the wire and the current flowing through the wire. Once the current and the voltage are known, one can calculate wire resistance by the application of Ohm's law:

$$\text{Resistance}=\text{Voltage}/\text{Current or } R=V/I$$

Voltage is preferably measured by using the four-wire approach used in conventional systems, which separates the two power leads that carry the high current to the seal wire, from the two sensing wires that are principally used to measure the voltage. In this regard, reference is made to the above disclosure regarding the use of low ohm connector plugs to avoid interference with sensed voltage and current readings and the discussion above concerns leads 1060, 1060', 1062 and 1062', two of which provide the wires for sensing.

This technique of using finer sensor wires eliminates the voltage loss caused by the added resistance of the power leads, and allows a much more accurate measurement of voltage between the two sensing wire contact points. This feature of avoiding potentially measurement interfering added resistance is taken into consideration under the present invention as the measurements involve very small resistance changes, in the milliohm range, across the sealing wire (e.g., 0.005 Ω). While this discussion is directed at the monitoring and controlling of the edge seal wire, the same technique is utilized for the cross-cut and cross-seal wires.

Under a preferred embodiment, current is calculated by measuring the voltage drop across a very precise and stable resistor on the control board and using Ohm's law one more time. The voltage and current data is used by the system controls to calculate the wire resistance in accordance with Ohm's law. Resistance is preferably calculated by the ultra fast DSP chips (Digital Signal Processing) on the main control board, which are capable of calculating resistance for a sealing wire thousands of times per second.

To determine and control temperature (e.g., changes in duty cycle in the supplied current), the measured resistance values must be correlated to wire temperatures. This involves the field of metallurgy, and a preferred use of the temperature coefficient of resistance ("TCR") value for the seal wire utilized.

TCR concerns the characteristic of a metallic substance involving the notion that electrical resistance of a metal conductor increases slightly as its temperature increases. That is, the electrical resistance of a conductor wire is dependant upon collisional process within the wire, and the resistance thus increases with an increase in temperature as there are more, collisions. A fractional change in resistance is therefore proportional to the temperature change or $$\frac{\Delta R}{R_0} = \alpha \Delta T$$

with "α" equal to the temperature coefficient of resistance or "TCR" for that metal.

The relationship between temperature and resistance is almost (but not exactly) linear in the temperature range of consequences as represented by FIG. 197 (e.g., 350 to 400° F. sealing temperature range and 380 to 425° F. cutting temperature range for typical film material). The control system of the present invention is able to monitor and control wire temperature because it receives information as to three things about every seal wire involved in the dispenser system (edge seal and end seal/cut wires).

(1) The electrical resistance of the wire involved at the desired sealing temperature (this is achieved by choosing wires that provide a common resistance level at a desired heating wire temperature set point (with adjustment possible with exceptence of some minor deviations due to the non-exact linear TCR relationship)).

(2) Approximate slope of the resistance vs. temperature curve at sealing temperature; and (3) The measured resistance of the wire at its current conditions.

Thus, in controlling the edge seal wire under the present invention there is utilized a technique designed to maintain the seal wire at its desired resistance during the sealing cycle. This in turn maintains the wire at its desired temperature since its temperature is correlated with resistance. The slope of the R vs. T curve or data mapping of the same can also be referenced if there is a desire to adjust the setpoint up or down from the previous calibration point calibrated for a wire at the set point temperature (e.g., an averaged straight line of a jagged slope line). Initial wire determination (e.g., checking whether wire meets desired Resistance versus Temperature correlation) preferably involves heating the wires in an oven and checking to see whether resistance level meets desired value. Having all wires being used of the same resistance at the desired sealing temperature setpoint greatly facilitates the monitoring and control features but is not essential with added complexity to the controller processing (keeping in mind that a set of wires sharing a common resistance value at a first set point temperature may not have the same resistance among them at a different set point temperature due to potentially different TCR plots). In this regard, reference is made to FIG. 199 illustrating a testing system for determining temperature versus resistance values for various wires. The test system shown in FIG. 199 is designed to determine the resistance of the wires at three temperatures, Ambient, 200 F. and 350 F. This test was performed on wires in a "Tenney" thermal chamber (from Tenney Environmental Corp.) at the desired temperature. The instrumentation used to measure the resistance was an Agilent 34401A Digital multimeter using 4-Wire configuration. Temperature measurements were taken with a thermocouple attached to the wire under test. Temperature measurement was taken using the Omega HH509R instrument. Ambient temperature was set at 74.6 F. (The Fluke measurement device being replaceable with the same Omega model).

As can be seen from the forgoing and the fact that different metals and alloys have different TCR's, the proper choice of metal alloy for the sealing element can greatly facilitate the controlling and monitoring of sealing wire temperature. For a desired level of accuracy, the wire must deliver a significant resistance change so that the control circuits can detect and measure something. The above described controller circuit design can detect changes as small as a few milliohms. Thus, there can successfully be used wires with TCR's in the 10 milliohm/ohm/degF range.

Some currently commonly used wire alloys, like Nichrome, are not well suited for the wire temperature control means and monitoring means of the present invention because they have a very small TCR, which means that their resistance change per degree F of temperature change is very small and they do not give the preferred resolution which facilitates accurate temperature control. On the other hand, wires having two large TCR jumps in relation to their power requirements (also associated with resistance and having units ohms/CMF) can lead to too rapid a burn out due to the avalanching of hot spots along the length of the wire which is a problem more pronounced with longer cross-cut wires as compared to the shorter edge seal wires used under the present invention. For the edge seal of the present invention, an alloy called "Alloy 42" having a chemical composition of 42 Ni, balance Fe with (for resistivity at 20° C.) an OHMS/CMF value of 390 and a TCR value 0.0010 Ω/Ω/° C. Alloy 42 represents one preferred wire material because it has a relatively high, (yet stable) TCR characteristic. The edge seal wire has improved effectiveness when length is ½ inch or less in preferred embodiments. Another requirement of the chosen edge seal wire is consistency despite numerous temperature cycle deviations, which the Alloy 42 provides.

For lower seal heat requirements, there is the potential for alternate wire types such as MWS 294R (which has shown to have avalanche problems when heated to too high a level) and thus has limited usage potential and thus is less preferred compared to Alloy 42 despite its higher TCR value as seen from Table II. As an example of determining TCR wire characteristics, Table I below illustrates the results of tests conducted on a one inch piece of MWS 294R wire. The testing results are shown plotted in FIG. 199.

TABLE I

EDGE SEAL WIRE MWS 294R

| TEMP | RES |
|---|---|
| AMB. | .383 |
| 110 F. | .325 |
| 120 F. | .320 |
| 130 F. | .305 |
| 140 F. | .278 |
| 150 F. | .269 |

TABLE I-continued

| EDGE SEAL WIRE MWS 294R | |
|---|---|
| TEMP | RES |
| 160 F. | .262 |
| 170 F. | .263 |
| 180 F. | .264 |
| 190 F. | .279 |
| 200 F. | .297 |
| 210 F. | .316 |
| 220 F. | .350 |
| 230 F. | .350 |
| 240 F. | .365 |
| 250 F. | .380 |
| 260 F. | .392 |
| 270 F. | .396 |
| 280 F. | .418 |
| 290 F. | .430 |
| 300 F. | .422 |

TABLE I-continued

| EDGE SEAL WIRE MWS 294R | |
|---|---|
| TEMP | RES |
| 310 F. | .440 |
| 320 F. | .425 |
| 330 F. | .430 |
| 340 F. | .426 |
| 350 F. | .428 |

As seen from the above table for the typical heater wire levels, the MWS 294R wire (29 Ni, 17Co., balance Fe) shows a relatively large resistance jump per 10° F. temperature increases (with an increase of about 0.012 ohms per 10° F. being common in the plots set forth above and illustrated in FIG. 197) and features an OHMS/CMF value of 294 as seen from Table II below setting forth some wire characteristics from the MWS® Wire Industry source. Using the testing device shown in FIG. 199, a TCR plotting can be made and an X-axis to Y-axis correlation between desired temperature set point and associated resistance level can be made for use by the controller as it monitors the current resistance level of the wire and makes appropriate current adjustments to seek the desired resistance (temperature set point level). While Alloy 42 can be used for the cross-cut seal in certain settings, in a preferred embodiment a stainless steel ("SST 302") wire also available for MWS® Wire Industries is well suited to use as the cross-cut wire in providing sufficient TCR increases (TCR of 0.00017—toward the lower end of the overall preferred range of 0.00015 to 0.0035, with a more preferred range, at least for the edge seals being 0.0008 to 0.0030, and with the preferred OHMS/CMF range being 350 to 500 or more preferably 375 to 400).

TABLE II

| | | RESISTIVITY AT 20° C. | | COEFFICIENT OF LINEAR EXPANSION | TENSILE STRENGTH | | POUNDS PER CUBIC | APPROX. MELTING POINT |
|---|---|---|---|---|---|---|---|---|
| MATERIAL | COMPOSITION | OHMS/CMF | TCR 0-100° C. | BETWEEN 20-100° C. | MIN. | MAX. | INCH | (° C.) |
| MWS-875 | 22.5 Cr, 5.5 Al, 5 Si, .1 C, bal. Fe | 875 | .00002 | .000012 | 105,000 | 175,000 | .256 | 1520 |
| MWS-800 | 75 Ni, 20 Cr, 2.5 Al, 2.5 Cu | 800 | .00002 | .000014 | 100,000 | 200,000 | .293 | 1350 |
| MWS-675 | 61 Ni, 15 Cr, bal. Fe | 675 | .00013 | .0000137 | 95,000 | 175,000 | .2979 | 1350 |
| MWS-650 | 80 Ni, 20 Cr | 650 | .00010 | .0000132 | 100,000 | 200,000 | .3039 | 1400 |
| Stainless Steel | 18 Cr, 8 Ni, bal. Fe | 438 | .00017 | .000017 | 100,000 | 300,000 | .286 | 1399 |
| ALLOY 42 | 42 Ni, bal. Fe | 390 | .0010 | .0000029 | 70,000 | 150,000 | .295 | 1425 |
| MWS-294 | 55 Cu, 45 Ni | 294 | .0002* | .0000149 | 60,000 | 135,000 | .321 | 1210 |
| MWS-294R | 29 Ni, 17 Co, bal. Fe | 294 | .0033 | .0000033 | 65,000 | 150,000 | .302 | 1450 |
| Manganin | 13 Mn, 4 Ni, bal. Cu | 290 | .000015** | .0000187 | 40,000 | 90,000 | .296 | 1020 |
| ALLOY 52 | 50.5 Ni, bal. Fe | 260 | .0029 | .0000049 | 70,000 | 150,000 | .301 | 1425 |
| MWS-180 | 22 Ni, bal. Cu | 180 | .00018 | .0000159 | 50,000 | 100,000 | .321 | 1100 |
| MWS-120 | 70 Ni, 30 Fe | 120 | .0045 | .000015 | 70,000 | 150,000 | .305 | 1425 |
| MWS-90 | 12 Ni, bal. Cu | 90 | .0004 | .0000161 | 35,000 | 75,000 | .321 | 1100 |
| MWS-60 | 6 Ni, bal. Cu | 60 | .0005 | .0000163 | 35,000 | 70,000 | .321 | 1100 |
| MWS-30 | 2 Ni, bal. Cu | 30 | .0013 | .0000165 | 30,000 | 60,000 | .321 | 1100 |
| Nickel 205 | 99 Ni | 57 | .0048 | .000013 | 60,000 | 135,000 | .321 | 1450 |
| Nickel 270 | 99.98 Ni | 45 | .0067 | .000013 | 48,000 | 95,000 | .321 | 1452 |

*TCR at 25-105° C.
**TCR at 25-105° C.
Note: Available in bare or Insulated

The temperature of the seal wire can be readily changed under the current invention by changing the duty cycle pulses of the supplied current within the range of 0 to 100%.

Maintaining the sealing wire at the correct temperature helps improve the consistency of the seals, since wire temperature is the main factor in producing seal in the plastic film. Other advantages of the present invention includes:

(A) Temperature controlling of the edge seal will not only improve sealing performance, it will also improve reliability since the present design can avoid the prior art problem of thermally stressing the components of the seal mechanism;

(B) The seal wire avoids overheating and damaging the substrates, cover tapes, or the wire itself, a problem which exists in prior art designs;

(C) The response time of the sensing circuit is extremely fast because the temperature sensor is the heater itself. The heater element and the temperature sensor are at the same temperature, which is ideal for accurate control.

(D) Thermal Lags and Overshoots are avoided. Even the smallest thermocouples, RTD's, or thermistors have longer response times than the response time available under the present invention.

(E) It no longer matters if the system is located in a hot factory or a cold factory. The seal wire temperature can be easily maintained consistent regardless, and the resultant seals will correspondly be the same. The ambient temperature was a significant problem with the prior art seal wire system designs that lack temperature control.

(F) Duty cycle will no longer be an issue, unlike prior art designs, wherein the higher the duty cycle the hotter the seal wire becomes noting that the seal wires run the coolest when they are first used after a long idle period leading to temperature variations in use which can have a noticeable affect on seal quality.

(G) A temperature-controlled wire will not overheat and produce the phenomenon called ribbon cutting. Ribbon cutting occurs when the wire gets so hot that it cuts right through the film instead of sealing the two layers together. Ribbon Cutting is quite common in the prior art designs and can be a cause of leaky bags.

(H) Vent sizing can be more accurate.

Figure 164:
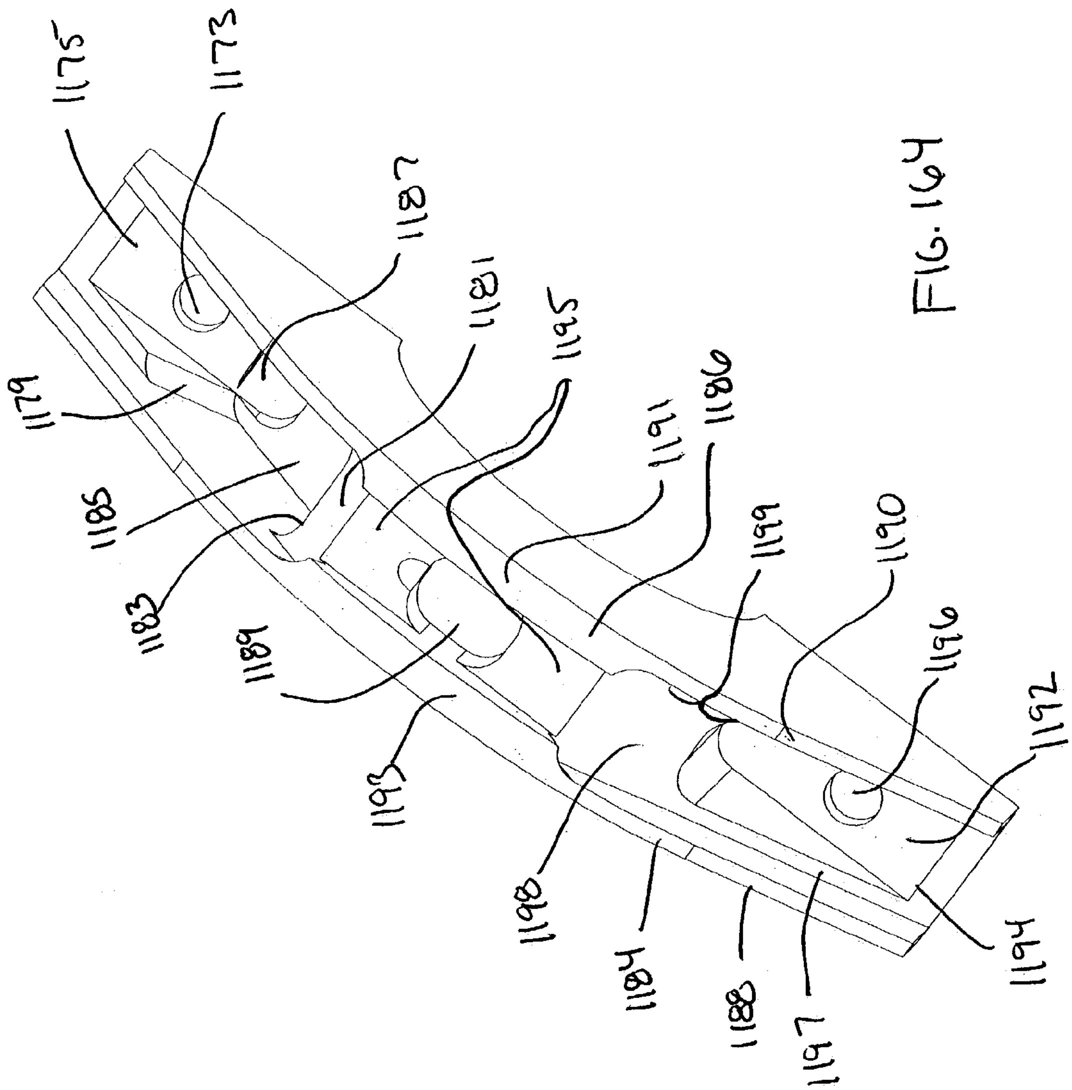
Figure 164A:
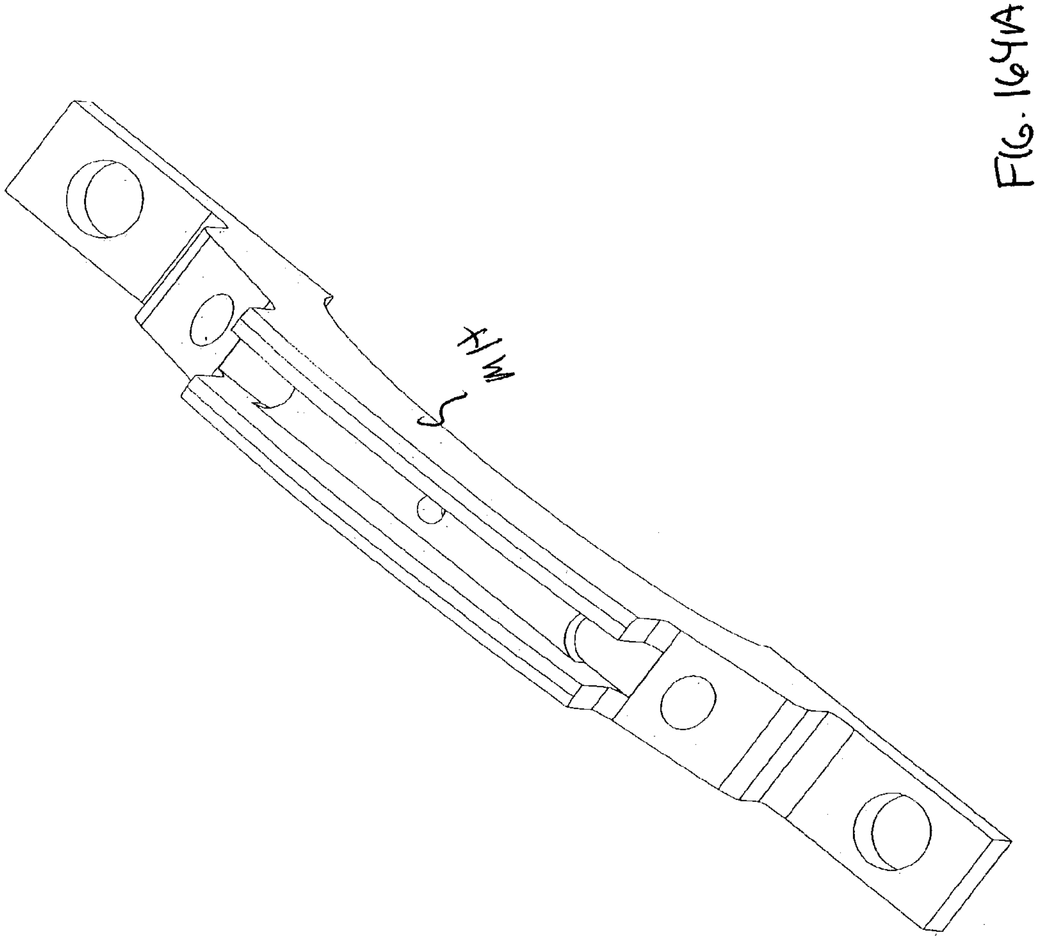
Figure 165:
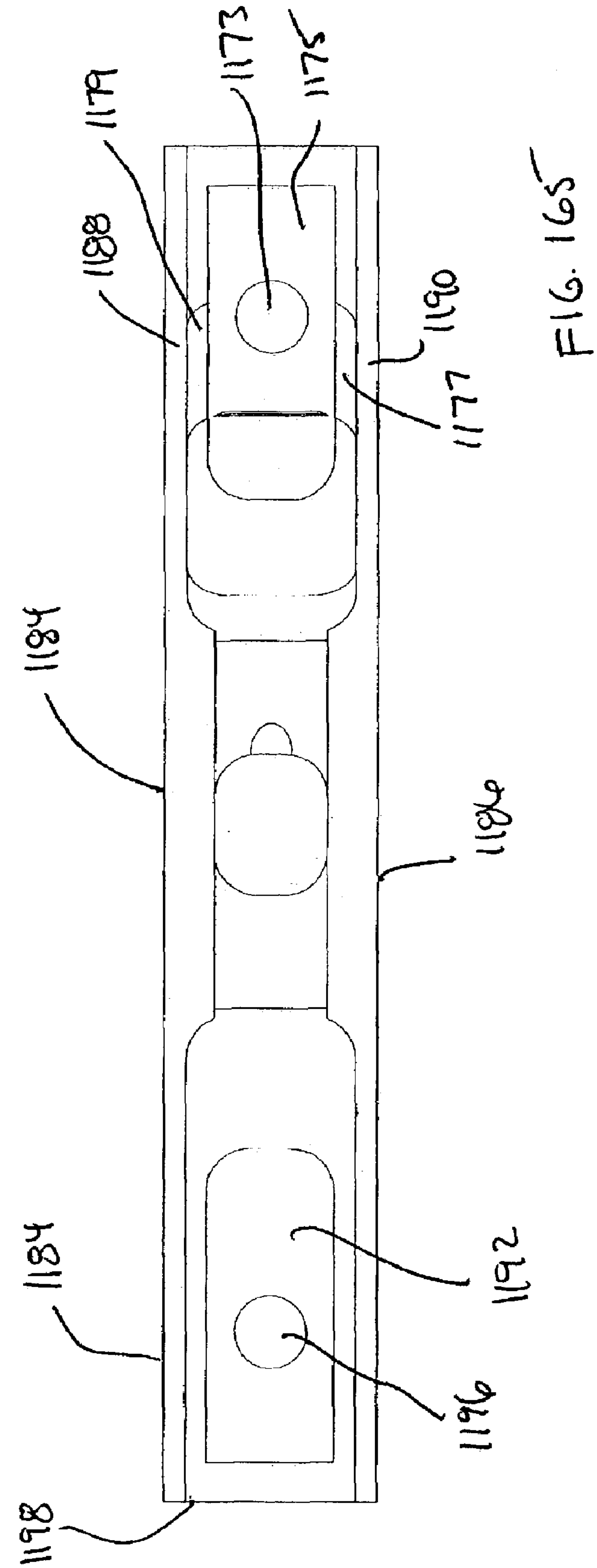
Figure 165A:
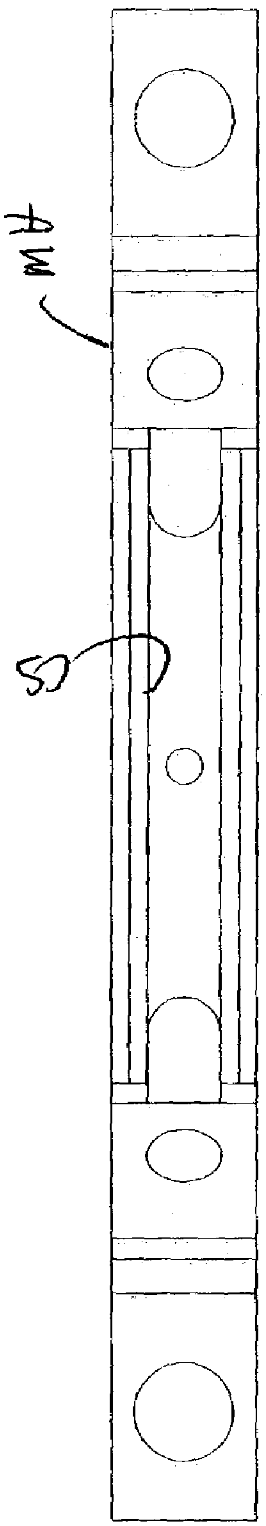
Figure 166:
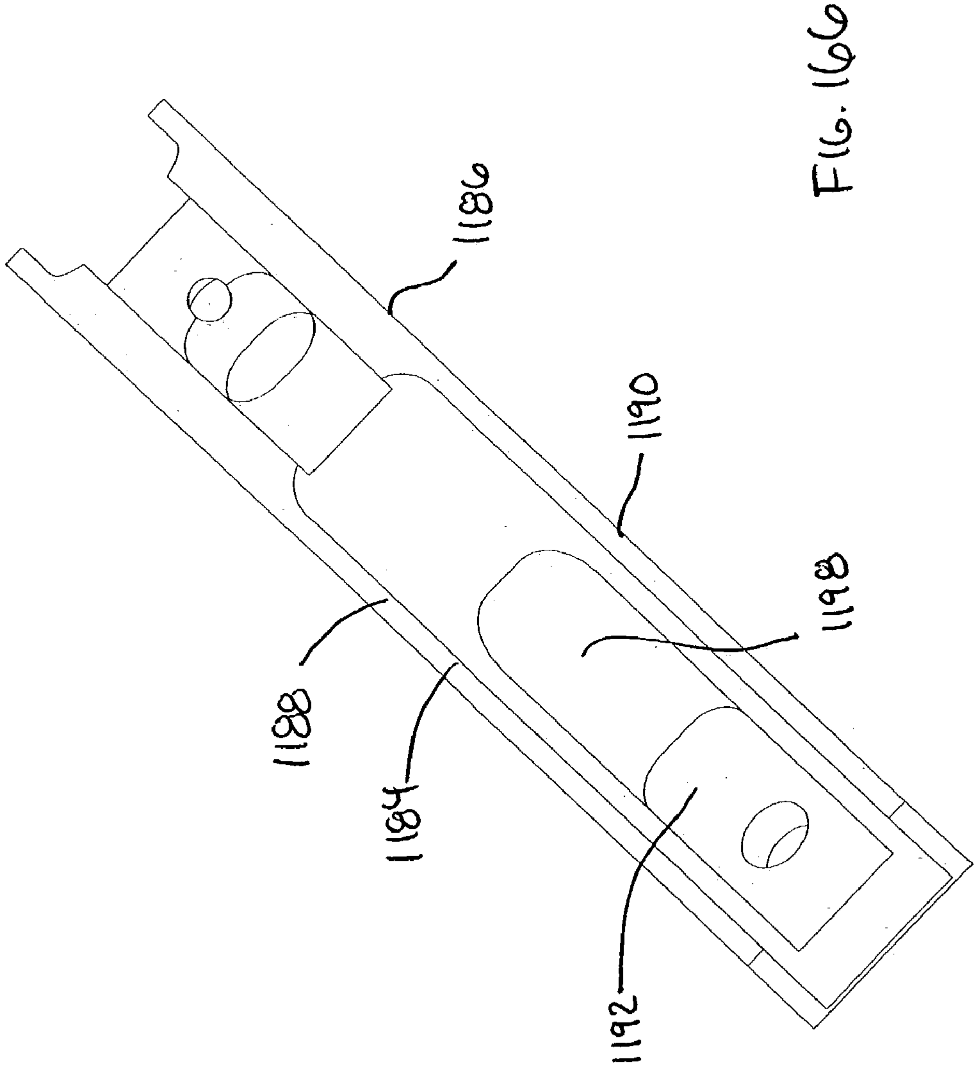
Figure 166A:
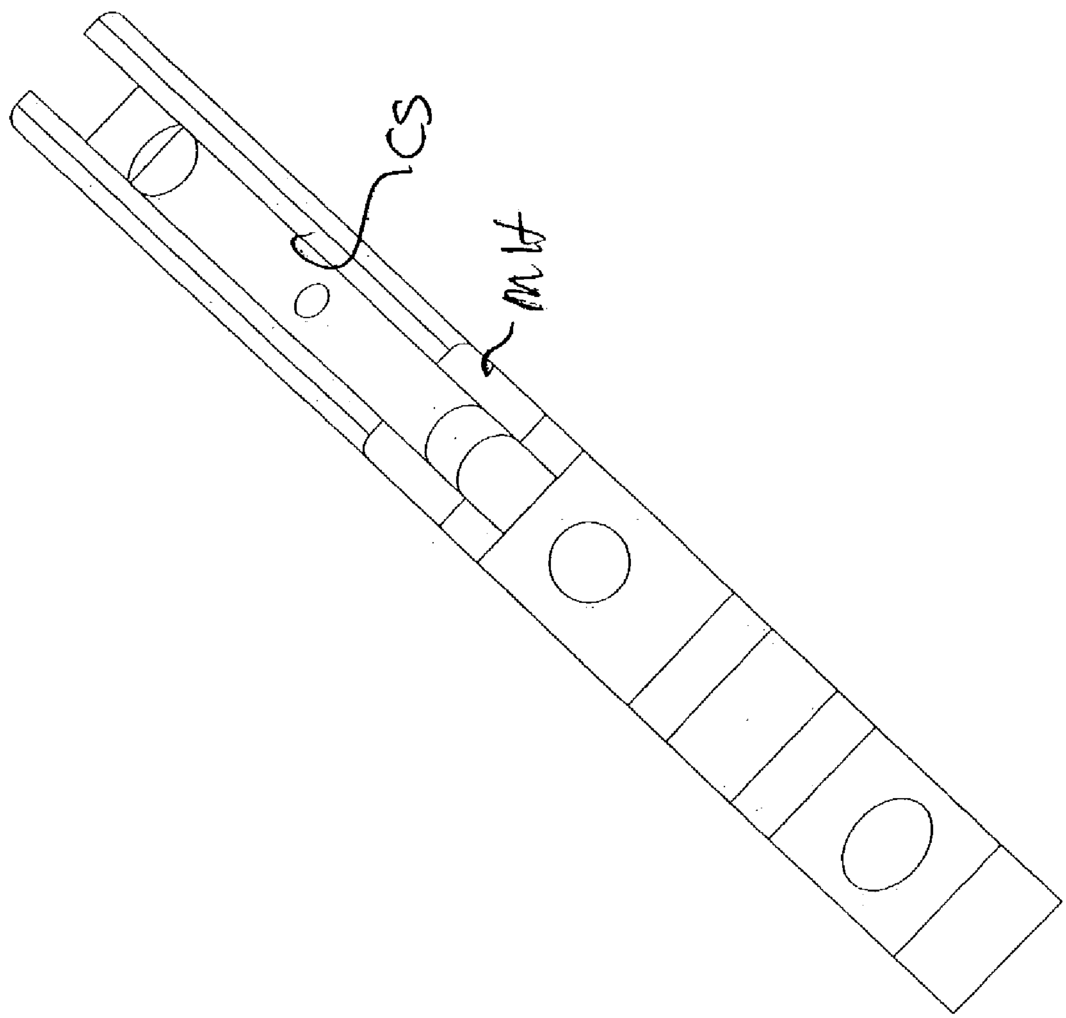
Figure 167:
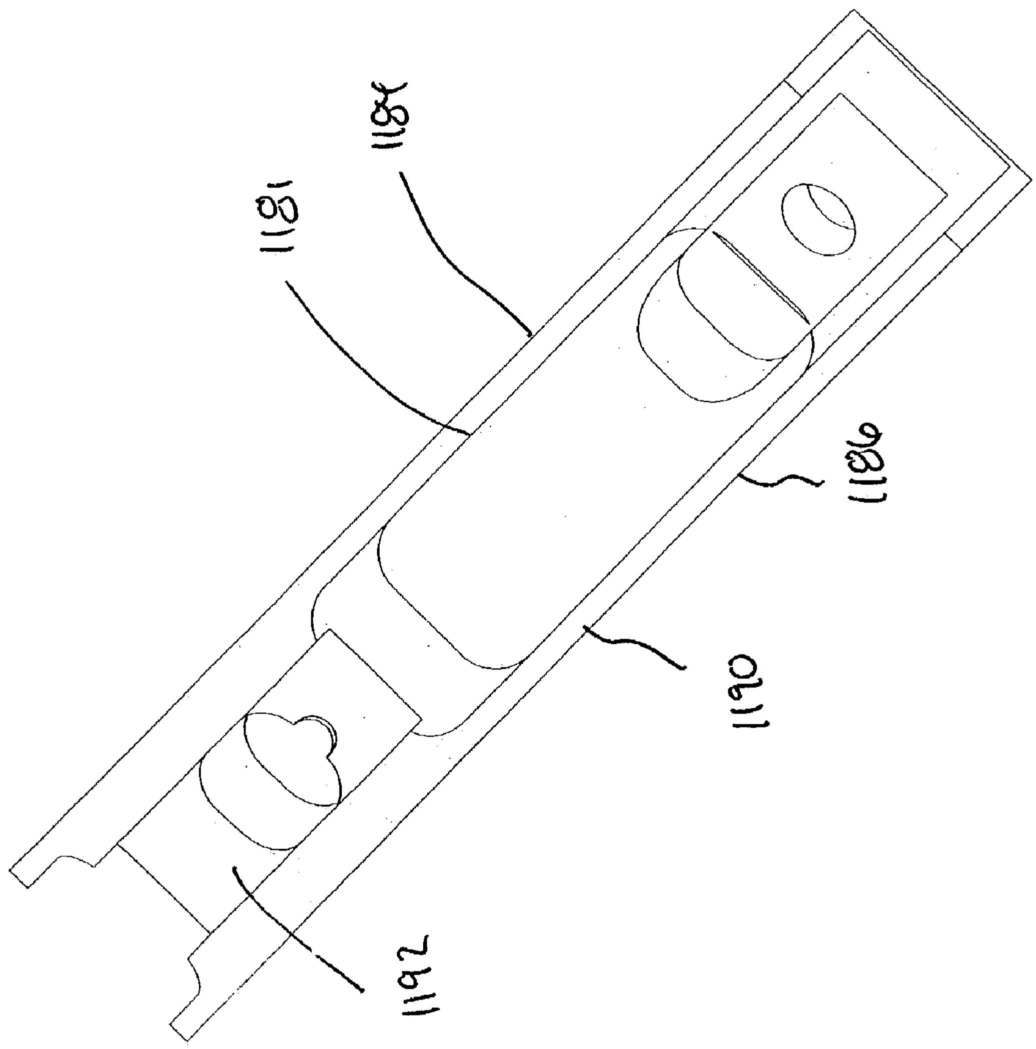
Figure 167A:
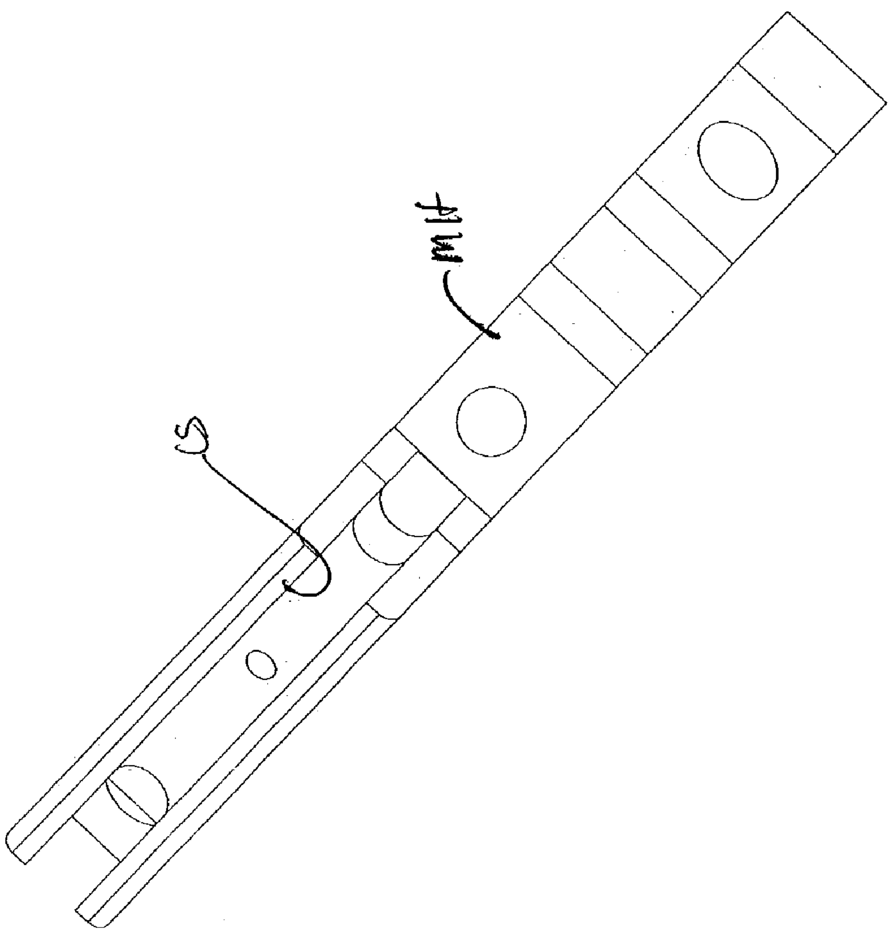

As described above, the thickness of arbor housing 1168 for the edge seal supporting the desired wire (e.g., one having resistance increase of 0.005 (more preferably 0.008) or more per 10° F. jump in temperature in the typical seal/cut temperature range of the film like that described above) is designed for insertion within slot 1124 in sleeve 1122. FIGS. 164 to 169 illustrate arbor housing 1168 with its bridge-like configuration having opposite side walls 1184 and 1186 with upper rims 1188 and 1190. As seen from FIG. 169 each rim has a circular intermediate section represented by 1188' and straight edge sloping sections (opposite sides) represented by 1188" which place the arbor assembly components not involved in the compression edge seal wire function removed from the elastomeric drive roller. Between rims 1188 and 1190 there is provided a series of arbor assembly reception cavities. The illustrated reception cavities include non-moving end connector reception cavity 1192 having horizontal base 1194 with pin aperture 1196, and with cavity 1192 (FIG. 164) being defined at its upper edge with enlarged base horse-shoe shaped rim 1198 being bordered on opposite sides by rails 1199 and 1197. Rim 1198 opens into intermediate reception cavity 1195 which is preferably a horizontal planar mount surface bordered by thicker side rail sections 1193 and 1191. Centrally positioned within intermediate cavity there is located central cavity 1189 which extends deeper into arbor housing 1168 than intermediate reception cavity 1195. As shown in FIG. 164, to the opposite side of intermediate section, there is provided moving end connector reception cavity 1187 which includes sliding slope surface 1185 extending out from a transverse wall 1183 having an upper edge forming the outer edge of smaller based horse-shoe shaped rim surface 1181 having notched side walls bordered by sloped outer contact surfaces 1179, 1177 (FIG. 164, 165). Further provided is second horizontal base surface 1175 with second pin aperture 1173 formed therein.

As shown in FIG. 159, pin connectors 1178, have threaded upper ends with pin 1178 having its upper threaded end receiving nut 1169 below horizontal base 1194 and extended through house cavity 1167' and fixed in position with nut NU. Pin 1180 has it upper end threaded into a threaded cavity 1167 formed in non-moving connection block 1165 having a bottom flush with horizontal base 1194. Non-moving connector block 1165 has a configuration that generally conforms to the profile of cavity 1192 so that block 1165 slides either vertically or horizontally into and out of cavity 1192 but 1192 during installation, and after that is prevented from any appreciable movement in a side to side, inward or rotational direction.

Figure 171:
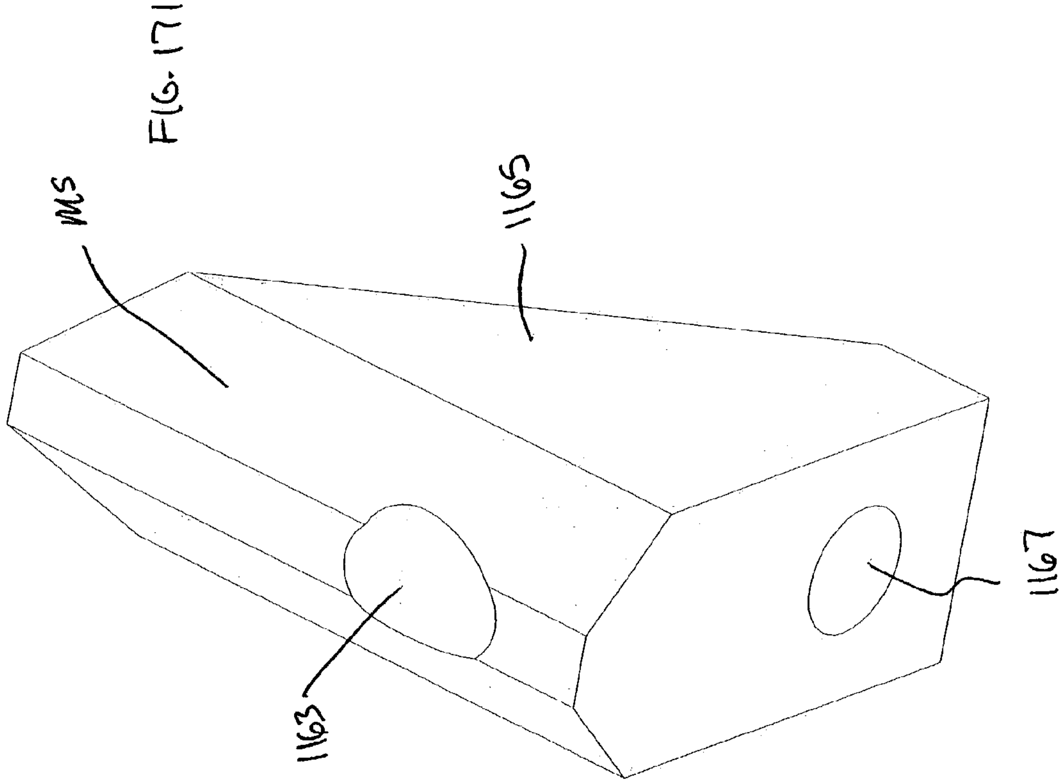
Figure 171A:
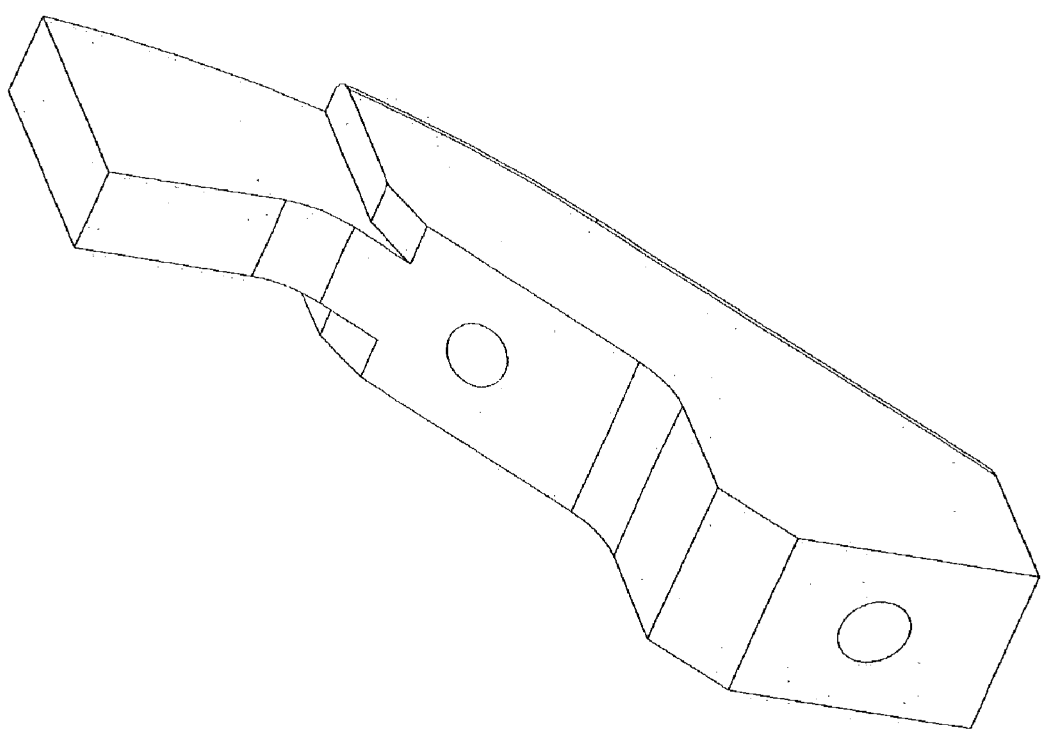

FIGS. 170 to 172 illustrate in perspective and in cross-section non-moving connector or mounting block 1165 and is preferably formed of a brass material. There is additionally formed in block 1165 sloping (down and in from an upper outward corner) reception hole 1163 having a central axis of elongation that extends transverse to the planar sloped surface 1161. As seen from FIG. 171, the side edge from which reception hole 1163 opens is a multi-sided side edge MS.

Arbor assembly 1106 further includes ceramic plug 1159 which is illustrated by itself in FIGS. 173A and 173B, and has insertion projection 1157 and head 1155. Ceramic plug 1159 has side walls 1153, 1151 (includes coplanar or co-extensive surfaces for both head end plug) which are separated apart a distance that generally conforms to the opposing inner walls of thick-end rail sections 1191, 1193 for a slight friction sliding fit. Similarly, central cavity 1189 has a generally oval configuration that conforms to that of projection 1157 for a snug fit. Head 1155 has underside extension surfaces extending out from opposite sides of the top of projection 1157 and defines a surface designed to lie flush on intermediate planer surface defining intermediate cavity 1195 such as a common flush horizontal surface arrangement. Ceramic plug 1159 has an upper convex surface 1149 which, as shown in FIG. 159, matches the curvature of 1170 of arbor housing 1168 and terminates out its ends at the outer edges of intermediate cavity 1195.

Arbor assembly 1106 further comprises moving mounting block 1147 illustrated in position within arbor housing 1168 and alone in FIGS. 174 to 177. As shown in FIGS. 174 to 177, moving mounting block 1147 has an electrical plug reception hole 1145 that extends transversely into moving mounting block 1147 from upper planar surface 1143. Electrical plug reception hole 1145 is preferably threaded and is designed to receive and hold an electrical connection 1117' with lead connector 1145' clamped down (FIG. 150). In similar fashion lead connector 1145 is clamped down by nut NU". Block 1147 further includes planar bottom surface 1141 which is placed flush on sloping upper surface 1161, and planar side walls 1139 and 1137 spaced apart to generally coincide with the side walls defined by arbor housing 1168. Block 1147 further includes convex (three sloping flat sides forming a general curvature) end walls 1135 and 1133. Interior passageway 1131 (FIG. 177) extends between end walls 1135 and 1133 and opens out at a central vertical location in the middle sub-wall of the convex end walls. At the end closest to the central plug 1159 there is formed notch 1129 which extends from end 1133 inward with an upper level commensurate with an upper level of passageway 1131 and downwardly to open out at bottom surface 1141. The interior end of notch 1129 includes transverse enlargements to form a T-shaped cross-section TC as shown in FIG. 175.

FIG. 159 further illustrates slide shaft 1127 received within housing 1168 at one end and designed to extend into interior passageway 1131 so as to provide a means for guiding slide movement along guide shaft 1127 in said moving mounting block 1147. Between the end surface 1183 of the arbor housing and the convex end surface 1135 of the adjacent moving mount block, there is positioned outward biasing means 1125 which in a preferred embodiment comprises conical spring which biases moving mounting block 1147 outward along slope surface 1179. The T-shaped slot facilitates adding the conical spring on to the system (i.e., allows for finger grasping in holding its position as the guide is passed through the center of the spring). FIG. 159 further shows upper nut NU which fixes conducting pin 1178 in position and sandwiches first arbor conductor lead 1145' between the planar surface 1175 and nut NU. Threaded fastener 1117' is threaded within threaded part 1145" in the moving block and through the base region of end connector plate 1113 (1111) in FIG. 178 and also through the looped end of electrical lead 1145' so as to compress them into electrical communication. Moving block 1147 is preferably formed of the same material as non-moving block 1165 as in electrically conducting base. Moving block 1147 is also sized as to have an operative position inward from the end of the conducting pin extending upward from planar surface 1175.

Heater wire assembly 1119 comprises the aforementioned heater wire 1182 connected at its ends to respective arbor assembly wire plates 1113 and 1111 shown in FIG. 128, which are similar to those described above for the heater wire end seal wire support plates 1062 (FIG. 143). Plates 1111 and 1113 have an enlarged portion with conductor screw aperture and a tapering, elongated end for welded, soldered or alternate securement means to fix edge seal heater wire 1182 to the plates at opposite ends of the heater wire. Heater wire insert plugs 1117 and 1115, are preferably of a screw type for threaded attachment to the respective mounting blocks. Thus, the screws are extended through the central apertures formed in plates 1113 and 1111 so as to hold the plates and the connected wires in fixed position relative to the mounting blocks 1147 and 1165. Thus moving mounting block 1147 acts as a tensioner device in the edge seal heater wire as soon as the heater wire and plates combination are secured by the threaded screws to the respective blocks and the blocks are received within the respective arbor housing cavities. Since the tensioner means of the present invention maintains edge seal heater wire 1182 under tension at all time (the biasing means is preferably a relatively small spring as to avoid over tensioning and stretching the heater wire) 1182. The moving block is under spring tension and moves in a linear fashion as it is guided by the guide shaft 1127 to keep the edge seal wire taught. The movement makes up for the normal variations in wire length and for the thermal expansion of the wire while the moving block moves along the loosely fitting, preferably stainless steel guide shaft 1127 (to avoid binding).

The edge seal heater wire 1182 is centered on the curved upper head surface of plug 1159 which is formed of a high heat resistant material such as a ceramic plug. Plug 1159 is preferably able to withstand over 450° F. and more preferably over 650° F. (e.g., up to 1500° F. available in conventional ceramics) without ablation or melting of the underlying face of the plug coming into contact with the heater wire and without any Teflon taping.

Thus, as the film is driven by driven roller set through the nip region, the film is compressed against the compressible material roller and heated to a level which will bond and seal together an edge seal (or seals if more than one involved). The present invention, provides a stationary support and accurate positioning of the edge seal heater wire, both initially and over prolonged usage as in over 20,000 cycles, as the core precludes any underlying heater wire or support backing material melting or softening which can cause deviations in the location of the edge seal and degrade edge seal quality. The deviation in positioning over time as the heater wire sank into the backing material was one of the problems leading to poor edge seal quality in prior art designing.

FIGS. 146 to 173 illustrate one embodiment of the edge seal support means ES' (FIG. 150) of edge seal assembly 91AS with its arbor mechanism and bar with edge seal heated wire and associated connectors. A second embodiment the edge seal means support (ES—FIG. 150A) is represented by the "A" versions of 146 to 172 together with FIG. 173C and 173D. As seen there are general similarities between embodiments and thus the emphasis below are the differences.

FIG. 146A to 149A illustrate the alternate embodiment of edge seal support ES' in position relative to edge seal 91A ("A" added for the same or related components relative to the first embodiment). As seen from FIGS. 146A and 149A support ES' features a modified sleeve to roller segments clamping means featuring components which include annular wedge ring P1, threaded block P2, and threaded cylinder P3 with threaded fastener FS is associated with external block P2 and internally threaded with cylinder P3 and with annular wedge ring P1 completing the connection due to sleeve 122A being fixed in position thereunder with fastener 1132A received in the opposite, internal end of threaded cylinder 3.

As further seen from FIGS. 149A, 150A, and 159A, the support ES' represents a new preferred embodiment from, for example, the standpoint of symmetry in design to the left and right of ceramic head CH of the same ceramic described above or of, for example, VESPEL brand high temperature plastic of DuPont received within the central reception cavity CS defined by main housing MH having pin connectors 1178A and 1180A as shown in FIG. 159A. Shoes SH1 and SH2, together with fasteners F1 and F2, are used to secure in position head CH (e.g., a sliding friction positioning is suitable between the interior most ends of the shoes). Shoes SH1 and SH2 are thus designed to sandwich head CH within slot CS with fasteners F1 and F2 being utilized to secure shoes SH1 and SH2 to housing MH Head CH supports heater wire segment W with upper end UE conforming to the head's CH convex curvature. The shoes are formed of a conductive material so as to provide for an electrical conduction of current from the pins, 1178A and 1180A to head CH. Head CH preferably has, in addition to upper wire segment ω, two side wire extensions EX that are placed in contact with the interior ends of the shoes to complete the circuit. Because rollers 1100 and 1102 are of a non-conducting material together with the arbor housing unit supporting the shoes, there is sufficient electrical insulation provided relative to the conductive shoes when the edge seal assembly is assembled.

FIG. 186 shows an overall schematic view of the display, controls and power distribution for a preferred foam-in-bag dispenser embodiment which provides for coordinated activity amongst the various sub-assemblies like that for the foam-in-bag dispenser system described above (and for which component reference numbers are provided in addition to the key legend of FIG. 186A). The present invention preferably comprises an electrical package comprised of two board assemblies, the main control board and an operator interface. The boards are interlinked via a single shielded cable, which can be separated up to 8 feet.

The operator interface includes an LCD display, keypad, control board and enclosure. It can be separated from the bag machine via a single shielded umbilical cord. Because the operator interface is a separate item from the rest of the machine, different interfaces can be either separate or integrated. For example, the display panel with button control 63 in FIG. 3 is preferably pivotably attached to the front of the dispenser and provides for both control of dispenser system and initiating other functions such as remote access via a modem or the like to a service provider Provided below are some preferred electrical specifications for a display system.

| | |
|---|---|
| Display: | 240 by 128 pixel graphic LCD display |
| Keypad: | 4 keys, 1 optical dial, 16 positions with push button for selection On main cover, 8 keys, 1 LED |
| PCB Size: | 7.5" × 4.5" × 1.5" W × H × D |
| Connectors: | 1) 9 pin Amp connector to main control box<br>2) 9 pin RS232 D-sub connector for PC connections |

Software or programmed hardware for monitoring, for example, chemical parameters is preferably included with examples provided below (noting the processor and FPGA exchange described above as one ex ample of a preferred processor/sub-system interrelationship):

| | |
|---|---|
| Recorded Shot (dispensed chemical) Data: | 1) A and B temperatures<br>2) A and B pressures<br>3) Time and date<br>4) A and B amounts dispensed |
| PC Programmable Variables: | 1) A and B ratio<br>2) A and B specific gravities<br>3) User interface menus on/off |
| Shot History: | Last 300 shots, download via PC |

The shot history allows the operator to monitor and keep track of usage of the noted sub-system (with similar possibilities for other sub-systems such as those illustrated in FIG. 186). In addition to the software programming the personal computer interface for parameters like those outlined below is utilized.

| | |
|---|---|
| Real Time Data: | 1) A and B temperatures<br>2) A and B pressures<br>3) A and B pump RPM's<br>4) Update rate: 2/second |
| System Options: | 1) Menus On/Off<br>2) Set time and date<br>3) System options |
| Download Code: | Download new operating system stored on PC hard drive |

A preferred embodiment of the invention places all electrical controls, power supplies, and associated equipment into one main control box which mounts on the side on the bag machine. Provided below are some illustrative examples of electrical control and power supplies for a preferred embodiment of the invention.

| | |
|---|---|
| Preferred Power | 180 to 255 VAC 30 Amp |
| Chemical Pumps: | 1) Pressure transducer:<br>a) 5 VDC supply<br>b) Pressure range: 0 to 1000 PSI<br>c) Output voltage: 0.5 to 4.5 VDC<br>2) Tachometer: Signal comes from brushless motor driver<br>3) Pump motor:<br>a) Brushless motor<br>b) Speed 20 to 3000 RPM's<br>c) Power requirements: 230 VAC, 3 amps max<br>d) Direction: Forward<br>4) One pump will operate at max RPM, the other specified by ratio and specific gravity |
| Chemical Heaters: | 1) Supply voltage 230 VAC<br>2) Heater wattage: 2200 watts, continuous duty A & B<br>3) Temperature sensor: 2000 ohm NTC thermistor |
| Emergency Stop: | Automatically shuts off all high power (pumps, hose heaters, etc.) and low power (cross cut and seal, film advance motors, etc.). Leaves power to user interface and some of the control box. Currently one switch mounted to cover hinge (activates when cover is raised). |
| Film drive motor: | 1) Type<br>a) Power requirements: 24 VDC, 5 amps<br>b) Source: 24 VDC switching power supply<br>c) Control: built into motor<br>d) Direction: Forward and reverse<br>2) Signals<br>a) Tachometer from motor, 216 pulses per revolution (logic)<br>b) Speed: 0-5 VDC speed voltage input<br>c) Direction: Logic level, 0 to 5 VDC<br>d) Brake: Logic level, 0 to 5 VDC<br>e) Enable: Logic level, 0 to 5 VDC<br>f) Fault: Input from motor; logic level, 0 to 5 VDC |
| Dispenser drive motor: | 1) Type<br>a) Power requirements: 24 VDC, 5 amps<br>b) Source: 24 vdc switching power supply<br>c) Control: built into motor<br>d) Direction: Forward<br>2) Signals<br>a) Tachometer from motor, 216 pulses per revolution (logic)<br>b) Speed: 0-5 vdc speed voltage input<br>c) Direction: N/A<br>d) Brake: Logic level, 0 to 5 VDC<br>e) Enable: Logic level, 0 to 5 VDC<br>f) Fault: Input from motor; logic level, 0 to 5 VDC |
| Cross cut jaw drive motor: | 1) Type<br>a) Power requirements: 24 VDC, 5 amps<br>b) Source: 24 VDC switching power supply<br>c) Control: built into motor<br>d) Direction: Forward<br>2) Signals<br>a) Tachometer from motor, 216 pulses per revolution (logic)<br>b) Speed: 0-5 vdc speed voltage input<br>c) Direction: N/A<br>d) Brake: Logic level, 0 to 5 VDC<br>e) Enable: Logic level, 0 to 5 VDC<br>f) Fault: Input from motor; logic level, 0 to 5 VDC |
| Film tension motor: | 1) Type:<br>a) Power requirements: 24 VDC, 5 amps,<br>b) Control: Constant current<br>c) Direction: reverse<br>2) Tachometer<br>a) 5 VDC supply<br>b) Speed range: 0 to 500 RPM<br>c) Resolution: 100 pulses per revolution<br>d) Output voltage: square wave, 0 to 5 VDC |
| Solvent system: | 1) Solvent pump<br>a) Type: ProMinent Concept b metering pump<br>b) Power requirements: 230 VAC<br>c) Control: contact closure<br>2) Pressure transducer<br>a) 5 VDC supply<br>b) Pressure range: 0 to 300 PSI<br>c) Output voltage: 0.5 to 4.5 VDC<br>3) Solvent level sensor<br>a) Contact closure, qty: 2 |
| Top and bottom seal wire: | 1) Power requirements: 300 watts<br>2) Material: Stainless steel 304 band, TOSS 2 mm × 0.1 mm tapered band<br>3) Control: Resistive measurement to derive temperature |

-continued

| | |
|---|---|
| | 4) Cycle time: 0.8 seconds |
| | 5) Temperature control: overall wire +/−15° F. |
| Cross Cut: | 1) Power requirements: 200 watts |
| | 2) Material: Stainless steal 304 wire 0.3 mm diameter |
| | 3) Control: Resistive measurement to derive temperature |
| | 4) Cycle time: 0.8 seconds |
| | 5) Temperature control: overall wire +/−15° F. |
| Edge Seal: | 1) Power requirements: 15 watts |
| | 2) Material: .0025 × .018 Alloy 42 wire |
| | 3) Control: Resistive measurement to derive temperature |
| Discrete inputs: | 1) Rating: 24 VDC 100 mA max |
| | 2) Inputs: 5 programmable inputs |
| Discrete outputs: | 1) Rating: 24 VDC 100 mA max |
| | 2) Outputs: 5 programmable outputs |
| Roll Film Sol: | 1) 24 VDC 1.5 amps |
| Intelligent I/O | 1) One port, protocol TBD |
| Manifold heater: | 1) Power rating: 100 watts max each, 200 watts total |
| | 2) Power requirements: 32 VAC |
| | 3) Temperature sensor: 2000 ohm NTC thermistor |
| | 4) Temperature range: 90 to 130° F. |
| | 5) Qty: 2 sensors, 2 heaters |
| Alarm: | 1) Buzzer, piezoelectric mounted on control board, qty: 1 |
| Main Contactor: | 1) 30 amp double pole single toggle contactor. Controls power to all high voltage devices and motors |
| Machine Lifter: | 1) Power requirements: 24 VDC, 120 watts max |
| | 2) Controlled via switches located on user interface |
| Tip Cleaning: | 1) Power requirements: 24 VDC, 148 watts max |
| | 2) Solenoid operates only when all bag making module motors are off |

System Integration and Remote Access

An addition preferred feature of the invention is to provide an intelligent interface between the bag machine and the customer packaging operation. To allow remote access by the bag machine supplier via standard telephone service or some other convenient connection.

Data Interface: Built into each machine, discrete I/0 along with an intelligent data port for bar code data entry.

Remote Interface: Dial up interface for bag machine manufacturer (and/or service provider) personnel (real time data, shot history, etc) or automated data gathering.

What is claimed:

1. A film supply apparatus for a foam-in-bag dispenser system, comprising:

a support member;

a spindle supported by said support member, said spindle having a support extension for receiving a roll of film for use;

and a spindle-to-support connector, with said spindle-to-support connector supporting said spindle for adjustment of said spindle between a film feed to dispenser mode position and a film roll replacement position different than said film feed to dispenser mode position, and said film supply apparatus further comprising a roll retention latch provided at a free end of said spindle, and wherein said roll retention latch includes a handle which is adjustable between a first position where the roll is axially slideable off said spindle and a latch position wherein said roll is precluded from axial sliding off of said spindle which latch position includes said handle itself moving into an axial abutment position relative to the roll received on said spindle.

2. The film supply apparatus of claim 1 wherein said roll retention latch includes a radially adjustable retention member that is adjusted into a roll latch position upon adjustment of said handle such that both said radially adjustable member and said handle present an axial slide barrier to the roll being retained.

3. A film supply apparatus for a foam-in-bag dispenser system, comprising:

a support member;

a spindle supported by said support member, said spindle having a support extension for receiving a roll of film for use;

and a spindle-to-support connector, with said spindle-to-support connector supporting said spindle for adjustment of said spindle between a film feed to dispenser mode position and a film roll replacement position different than said film feed to dispenser mode position, and said film supply apparatus further comprising a lock in-position mechanism which fixes said spindle in said film feed to dispenser mode position, and wherein said lock in-position mechanism comprises a latch that includes a latch component which is positioned for deflecting contact with a latch reception component such that a rotation of said spindle from said film roll replacement position to said film feed to dispenser mode position automatically moves said latch into a latch state following deflection.

4. The film supply apparatus of claim 3 wherein said latch is supported by said support member and said latch reception component is support by said spindle.

5. The film supply apparatus of claim 4 wherein said latch component includes a cam surface along which said latch reception component rides along during the deflecting contact.

6. The film supply apparatus of claim 3 wherein said latch component includes a cam surface along which said latch reception component rides along during the deflecting contact.

7. The film supply apparatus of claim 3 further comprising release facilitator means for initiating and facilitating rotation of said spindle from said film feed to dispenser mode position to said film roll replacement position upon release of said latch.

8. A film supply apparatus for a foam-in-bag dispenser system, comprising:

a support member;

a spindle supported by said support member, said spindle having a support extension for receiving a roll of film for use;

and a spindle-to-support connector, with said spindle-to-support connector supporting said spindle for adjustment of said spindle between a film feed to dispenser mode position and a film roll replacement position different than said film feed to dispenser mode position, and wherein said spindle has two axially spaced film roll mounting surfaces of different diameter, with an interior one being larger in diameter than a more outer one of said mounting surface which mounting surfaces are dimensioned relative to core inserts of the film roll which core inserts are dimensioned of different sizes so as to limit mounting of the film roll in only one axial orientation.

9. The film supply apparatus of claim 8 further comprising a film feed roller set and a film source driver, and said film source driver being arranged to move film backwards or in a direction opposite to a direction of film feed induced by said film feed roller set.

10. The film supply apparatus of claim 8 further comprising an idler roller over which the film travels in going between said film source support and said film feed roller set, and said film supply apparatus further comprising film web tracking adjustment means which alters said idler roller orientation to have said film properly track in traveling through said film feed roller set.

11. The film supply apparatus of claim 8 wherein a border between said mounting surfaces is within an intermediate region of the roll once mounted.

12. The film supply apparatus of claim 8 wherein said mounting surfaces are arranged with portions that extend within the roll between the ends of the roll once mounted.

13. A film supply apparatus for a foam-in-bag dispenser system, comprising:

a support member;

a spindle supported by said support member, said spindle having a support extension for receiving a roll of film for use;

and a spindle-to-support connector, with said spindle-to-support connector supporting said spindle for adjustment of said spindle between a film feed to dispenser mode position and a film roll replacement position different than said film feed to dispenser mode position wherein said support extension includes a pair of telescopically sliding sleeves adjustable in axial length for accommodating different axial length film rolls, and wherein said support extension further comprises a central shaft internally received within said pair of sliding sleeves and a bearing providing bearing contact between said central shaft and an outermost one of said pair of sleeves defining the free end of said spindle.

* * * * *